US012263922B2

(12) United States Patent
Campbell

(10) Patent No.: US 12,263,922 B2
(45) Date of Patent: Apr. 1, 2025

(54) EQUIPMENT, SYSTEMS AND VESSELS, FOR THE EFFECTIVE CLEANUP AND RECOVERY OF A BROAD RANGE OF FLOATING CONTAMINANTS

(71) Applicant: Robert Marshall Campbell, Miami, FL (US)

(72) Inventor: Robert Marshall Campbell, Miami, FL (US)

( * ) Notice: Subject to any disclaimer, the term of this patent is extended or adjusted under 35 U.S.C. 154(b) by 0 days.

(21) Appl. No.: 17/707,858

(22) Filed: Mar. 29, 2022

(65) Prior Publication Data

US 2022/0363353 A1 Nov. 17, 2022

Related U.S. Application Data

(60) Provisional application No. 63/167,615, filed on Mar. 29, 2021.

(51) Int. Cl.

| | |
|---|---|
| ***B63B 35/32*** | (2006.01) |
| ***E02B 15/08*** | (2006.01) |
| ***E02B 15/10*** | (2006.01) |

(52) U.S. Cl.

CPC .......... *B63B 35/32* (2013.01); *E02B 15/0842* (2013.01); *E02B 15/104* (2013.01); *E02B 15/106* (2013.01)

(58) Field of Classification Search

CPC ... B63B 35/32; E02B 15/0842; E02B 15/104; E02B 15/106; E02B 15/046; Y02A 20/204

See application file for complete search history.

(56) References Cited

U.S. PATENT DOCUMENTS

| | | | | |
|---|---|---|---|---|
| 3,219,190 A * | 11/1965 | Fridtjof | E02B 15/046 | 210/523 |
| 3,684,095 A * | 8/1972 | Ayers | E02B 15/0842 | 210/923 |
| 3,688,506 A * | 9/1972 | Marcocchio | E02B 15/0842 | 405/63 |
| 3,847,816 A * | 11/1974 | DiPerna | E02B 15/046 | 210/776 |

(Continued)

FOREIGN PATENT DOCUMENTS

EP 0005411 A1 * 4/1979

*Primary Examiner* — Benjamin F Fiorello

(74) *Attorney, Agent, or Firm* — Javier Sobrado; The Brickell IP Group, PLLC

(57) ABSTRACT

A system for removing contaminants from a body of water, may include a vessel, having contaminant cleanup and recovery equipment that may have at least one intake port capable of removing floating contaminants from the body of water to be transported to the recovery vessel. The system may further include a first towboat and a second towboat. The system may also include a first containment boom capable of being connected to the first tow boat and to a starboard side of a vessel. The system may also include a second containment boom capable of being connected to the second tow boat and a port side of the vessel, such that during operation the first and second towboats extend out from the vessel such that the first and second containment booms gather the floating contaminants from the body of water and channel them to the at least one intake port.

13 Claims, 103 Drawing Sheets

(56) References Cited

U.S. PATENT DOCUMENTS 4,310,415 A * 1/1982 Webb .................. E02B 15/0878 405/63
4,319,858 A * 3/1982 Jaffrennou .............. E02B 15/06 405/68
4,356,086 A * 10/1982 Oberg ................... E02B 15/048 210/115
4,388,188 A * 6/1983 Morris .................... E02B 15/08 405/71
4,834,880 A * 5/1989 Lundin ................. E02B 15/104 210/776
5,015,399 A * 5/1991 Eller ..................... E02B 15/046 210/776
5,047,156 A * 9/1991 Sullivan .................. B63B 35/32 210/776
5,114,272 A * 5/1992 Brunhoff ................. E02B 15/08 405/72
5,183,579 A * 2/1993 Eller ..................... E02B 15/048 210/776
5,262,048 A * 11/1993 Zimmerman ........... C02F 1/681 210/232
5,409,607 A * 4/1995 Karlberg ............... E02B 15/048 210/923
5,472,597 A * 12/1995 Carro .................... E02B 15/047 210/923
5,667,337 A * 9/1997 Lazes .................. E02B 15/0842 405/63
6,221,256 B1 * 4/2001 Kimura ................... E02B 15/06 210/170.11
9,169,610 B2 * 10/2015 Wood ...................... E02B 15/10
2011/0297597 A1 * 12/2011 Di Bella ............... E02B 15/045 210/170.05
2013/0313181 A1 * 11/2013 Zotov ..................... B63B 35/32 210/242.4
2015/0090646 A1 * 4/2015 Sebo ....................... B63B 35/32 210/141
2016/0010300 A1 * 1/2016 Pizzi ..................... E02B 15/104 210/396
2022/0136196 A1 * 5/2022 Covington ............ E02B 15/046 114/61.27

* cited by examiner

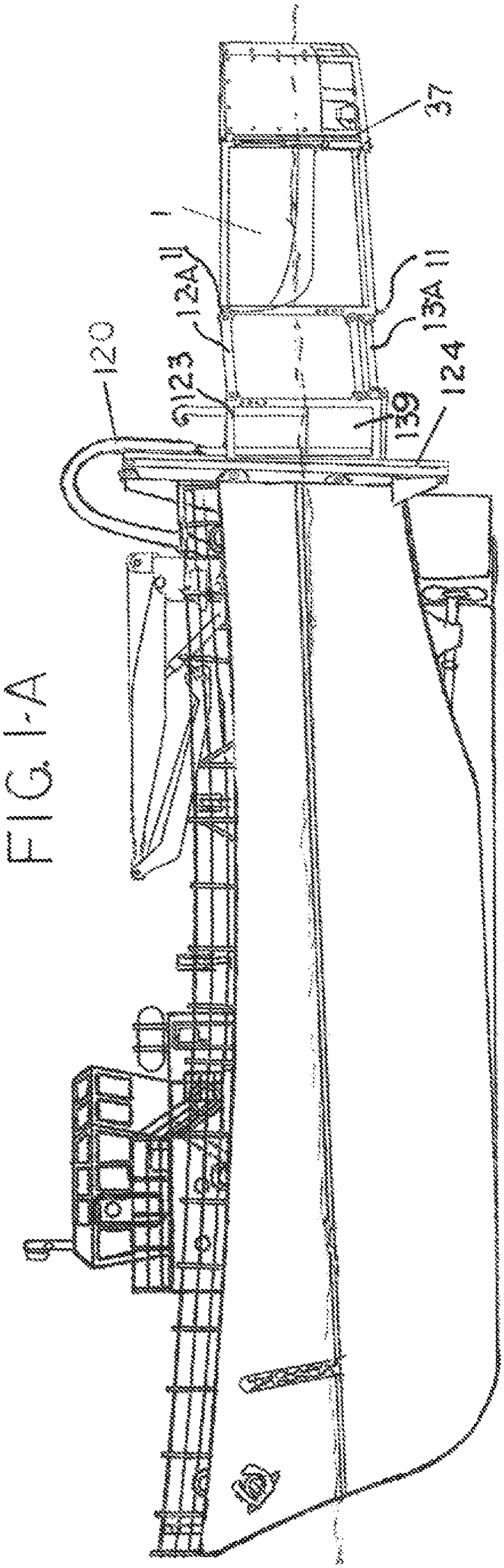
FIG. 1-A
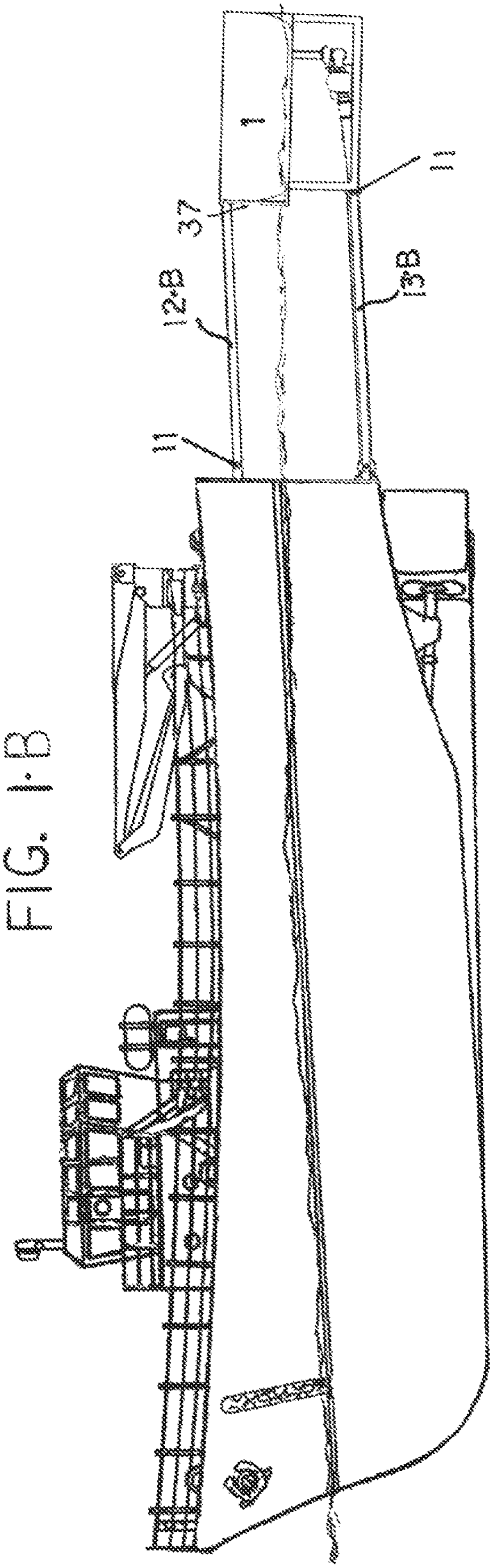
FIG. 1-B

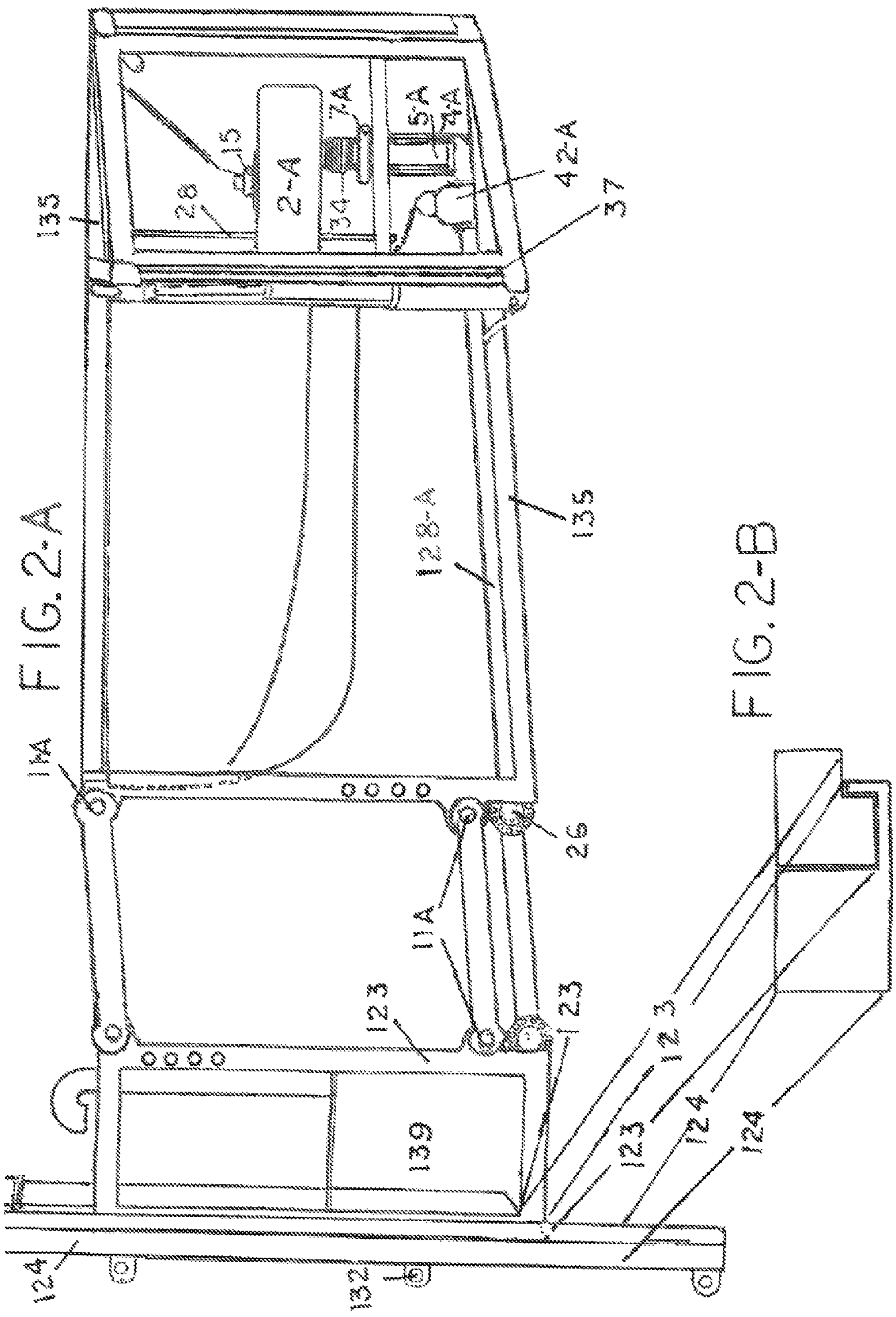
FIG. 2-A
FIG. 2-B

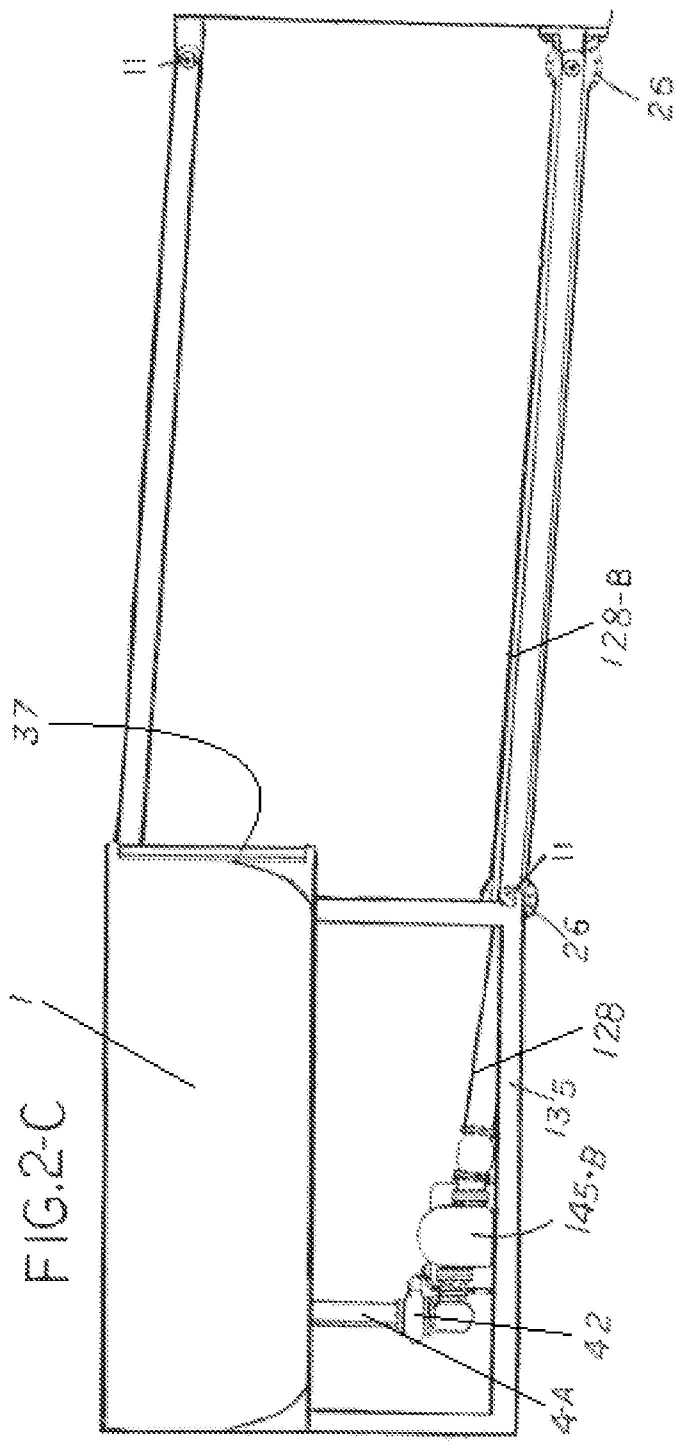
FIG. 2-C

FIG. 3-A
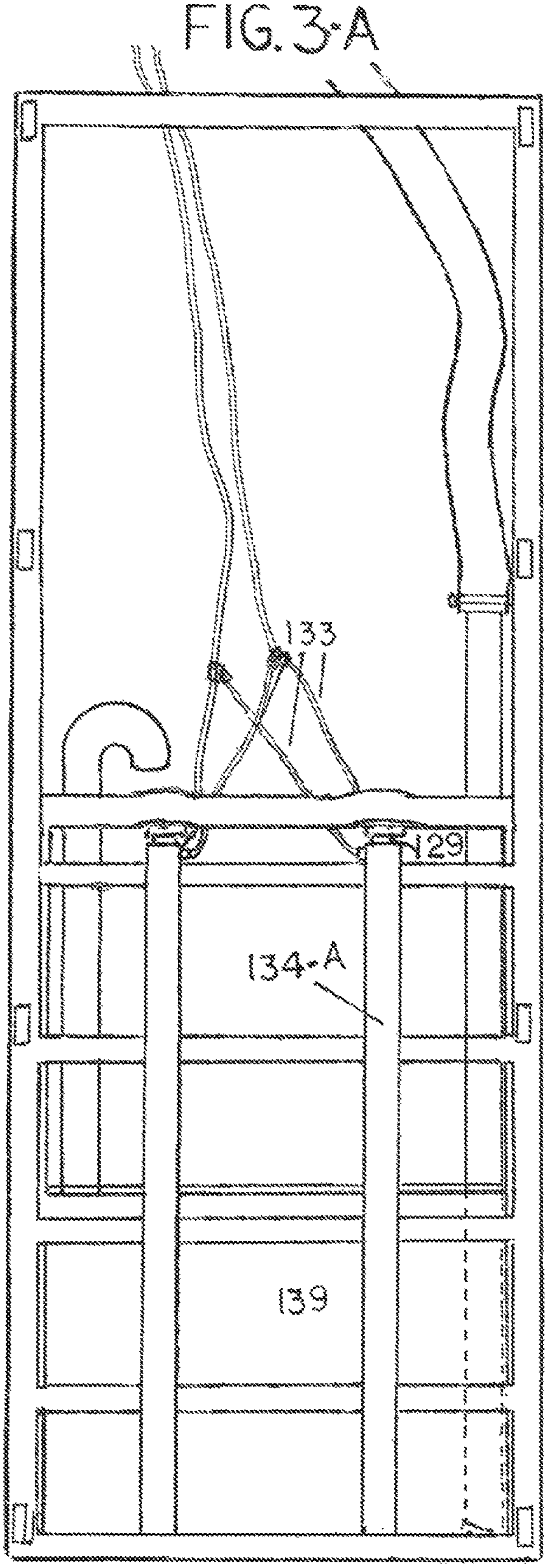
FIG. 3-B
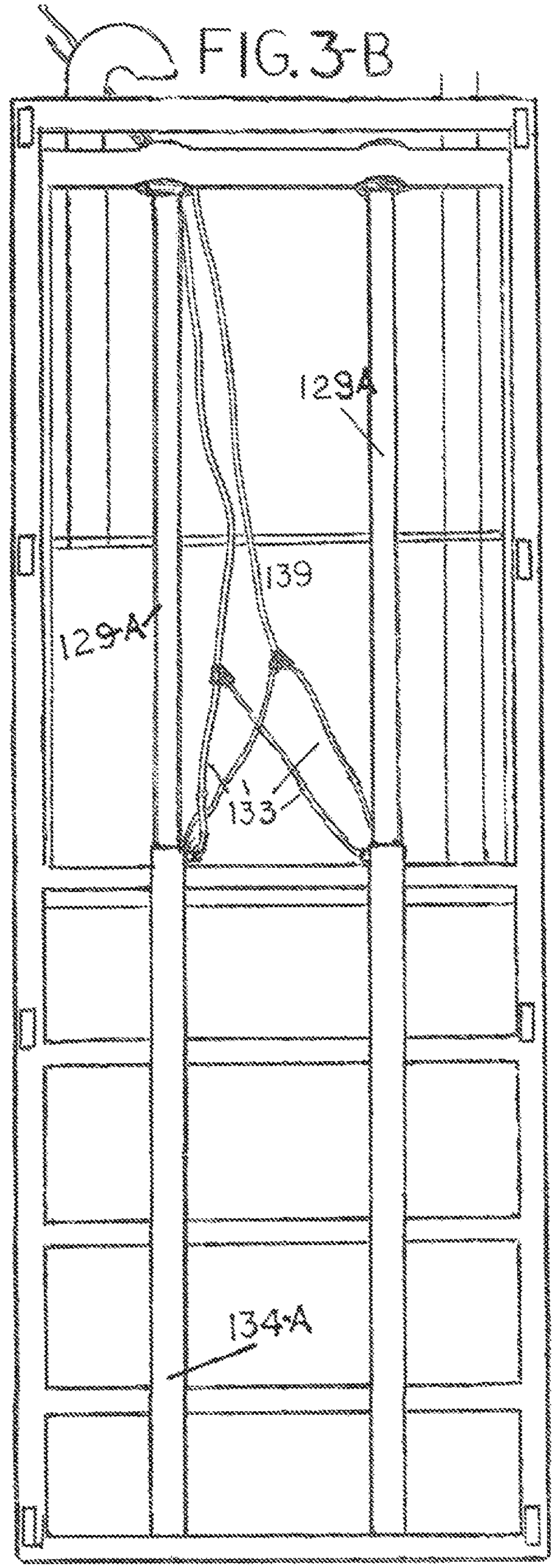

FIG-4-A
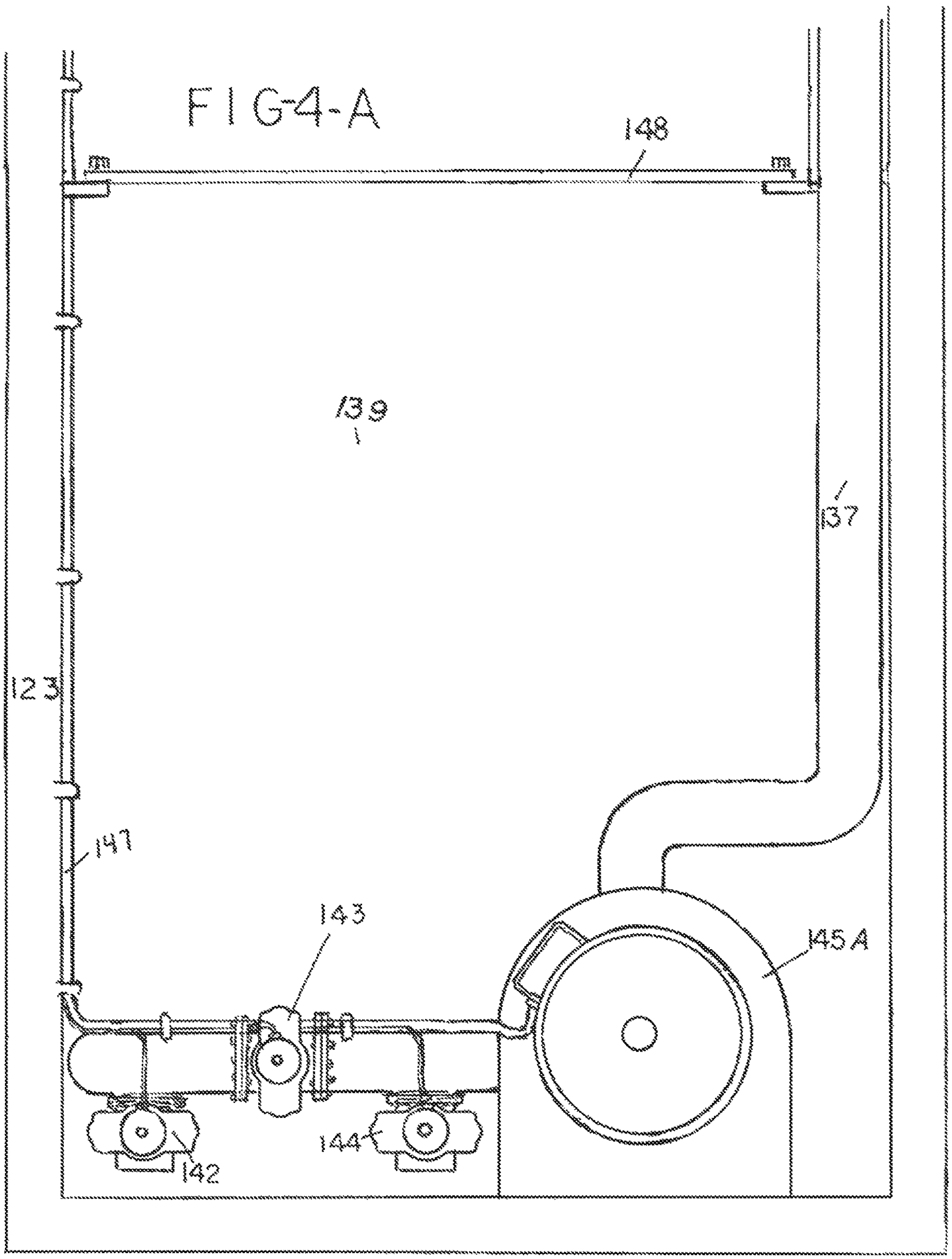

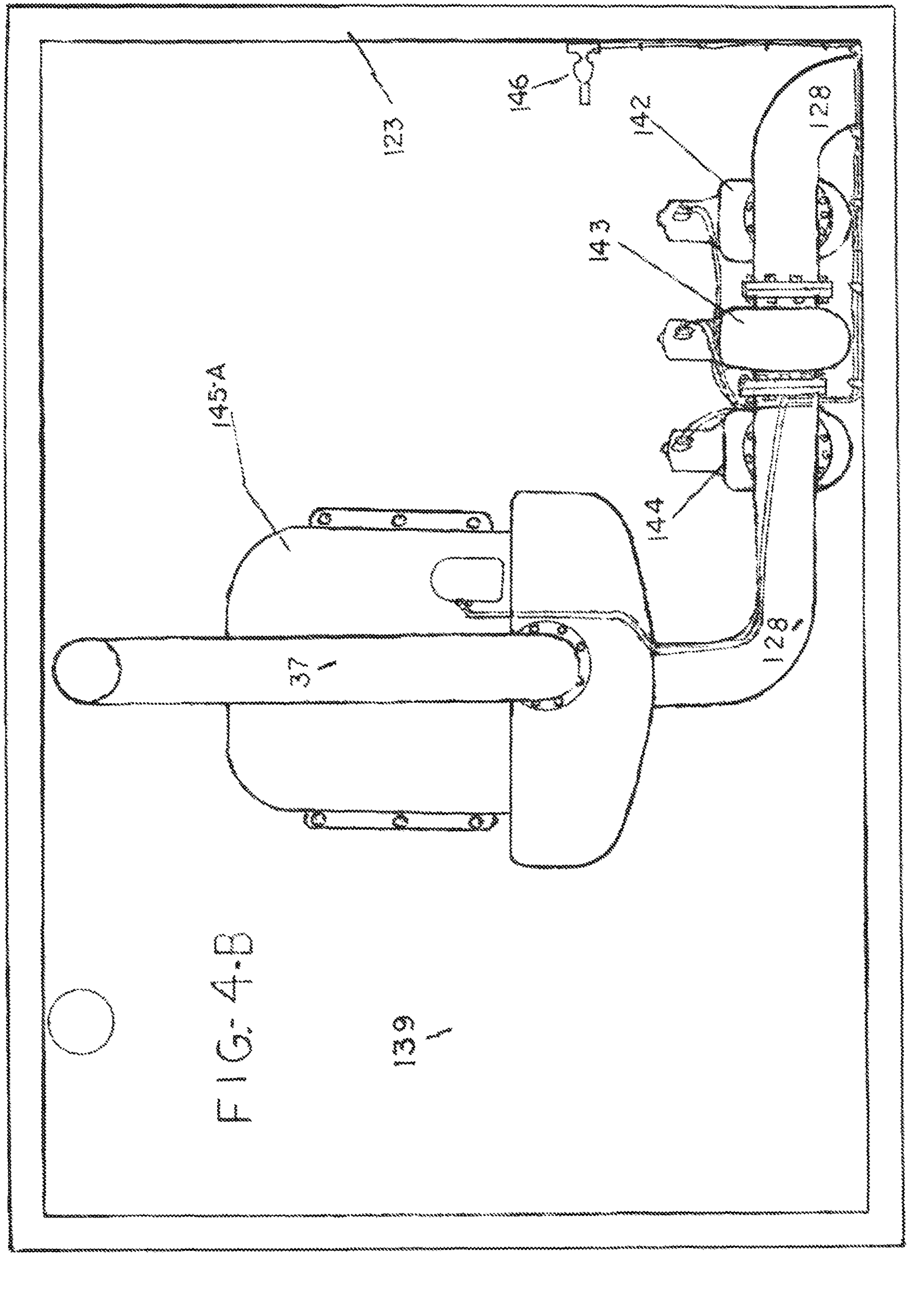
FIG. 4-B

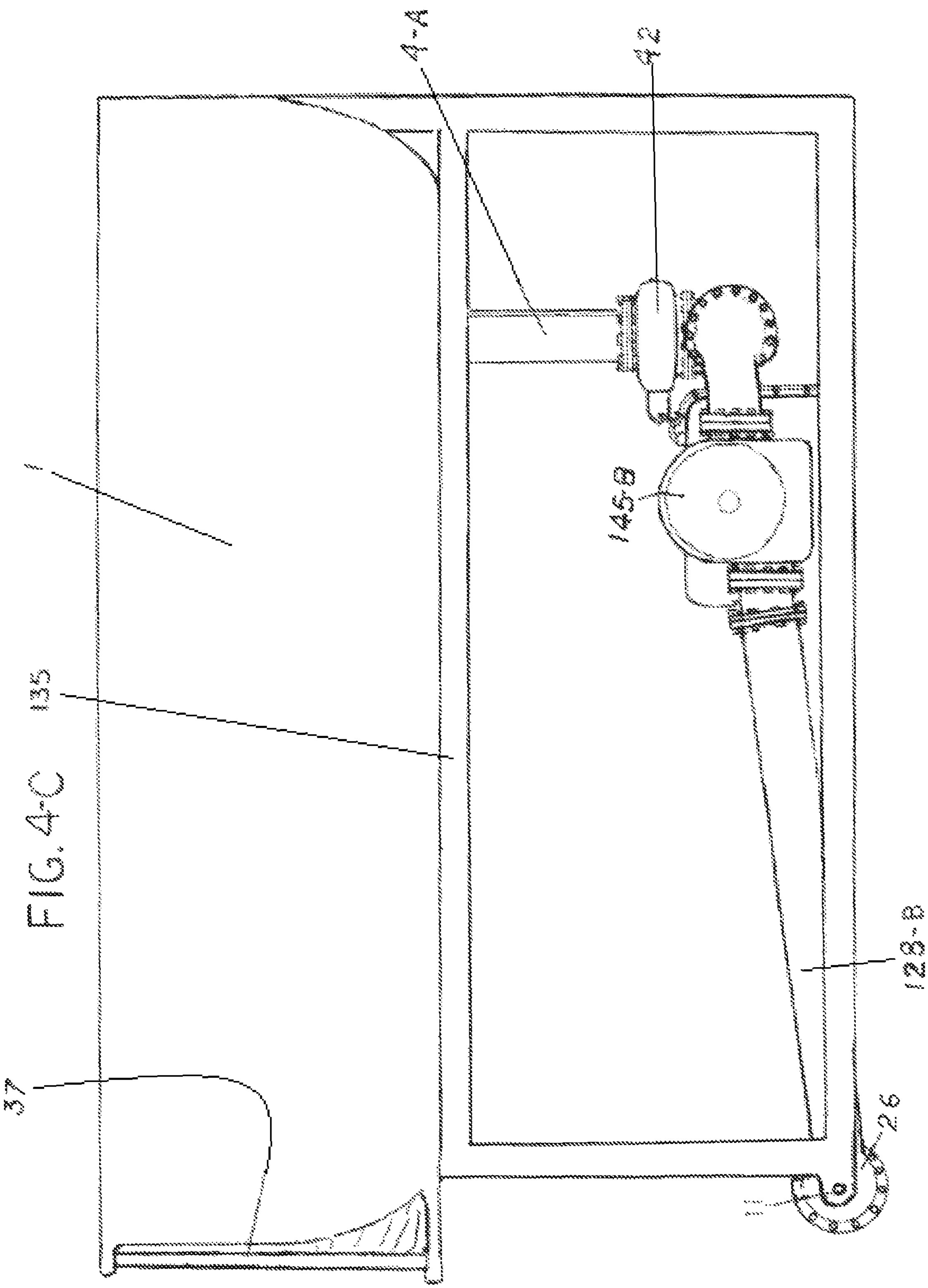
FIG. 4-C

FIG. 5-A
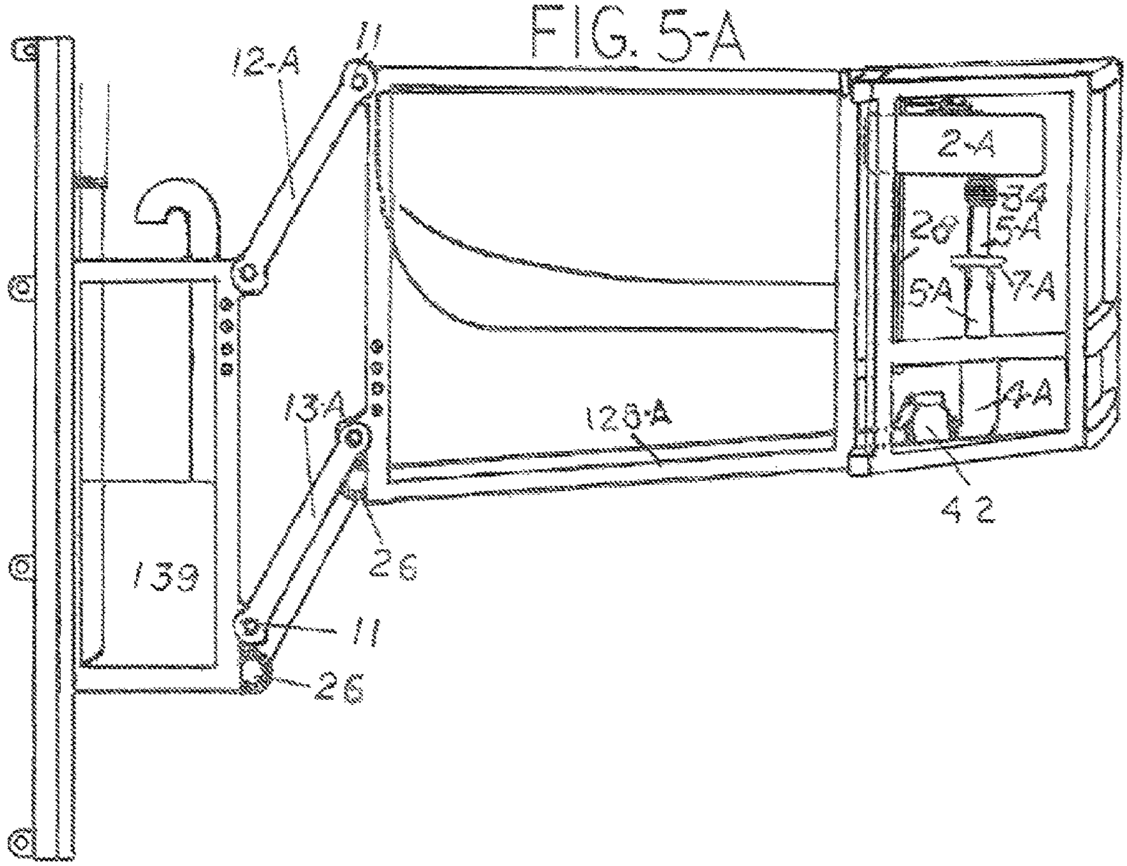
FIG. 5-B
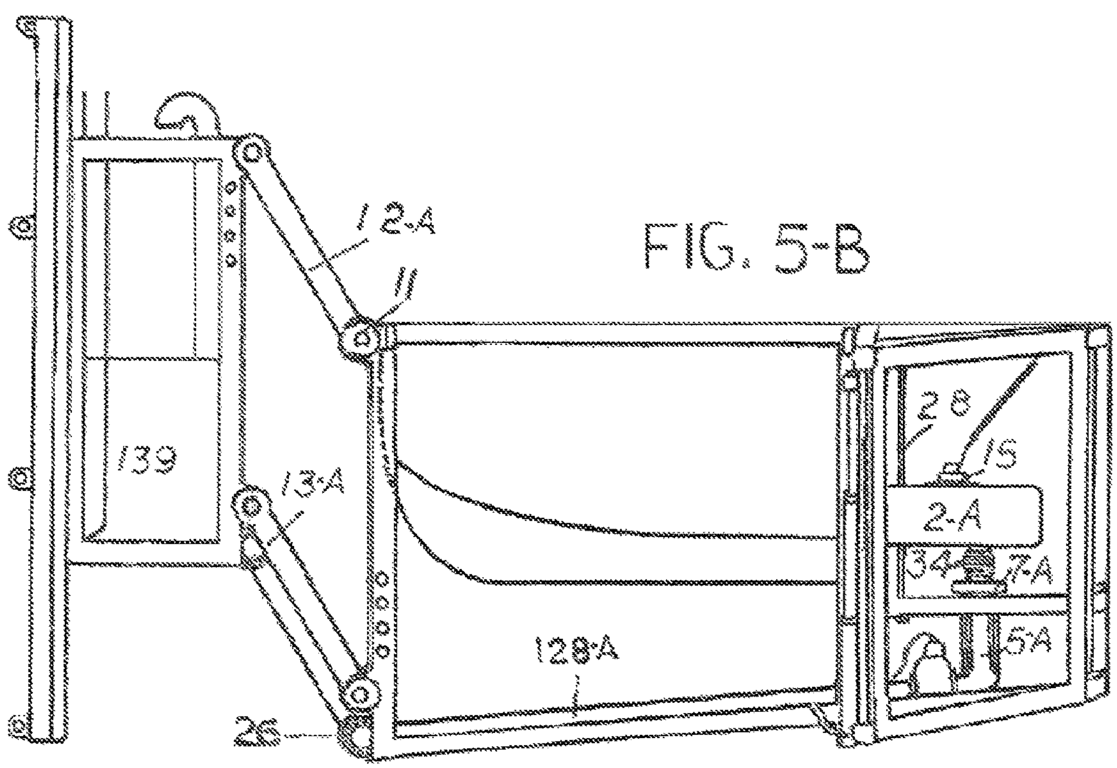

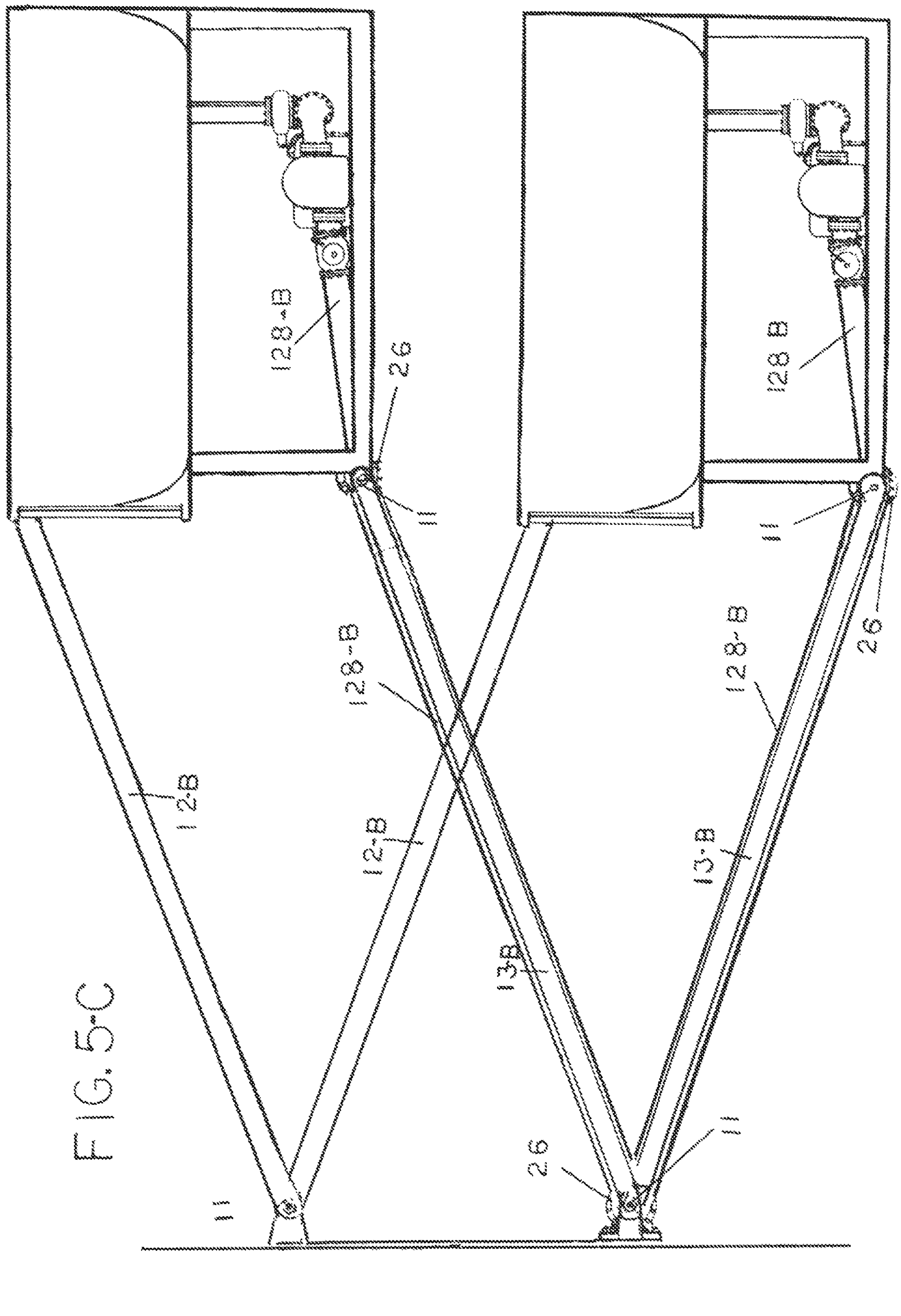
FIG. 5-C

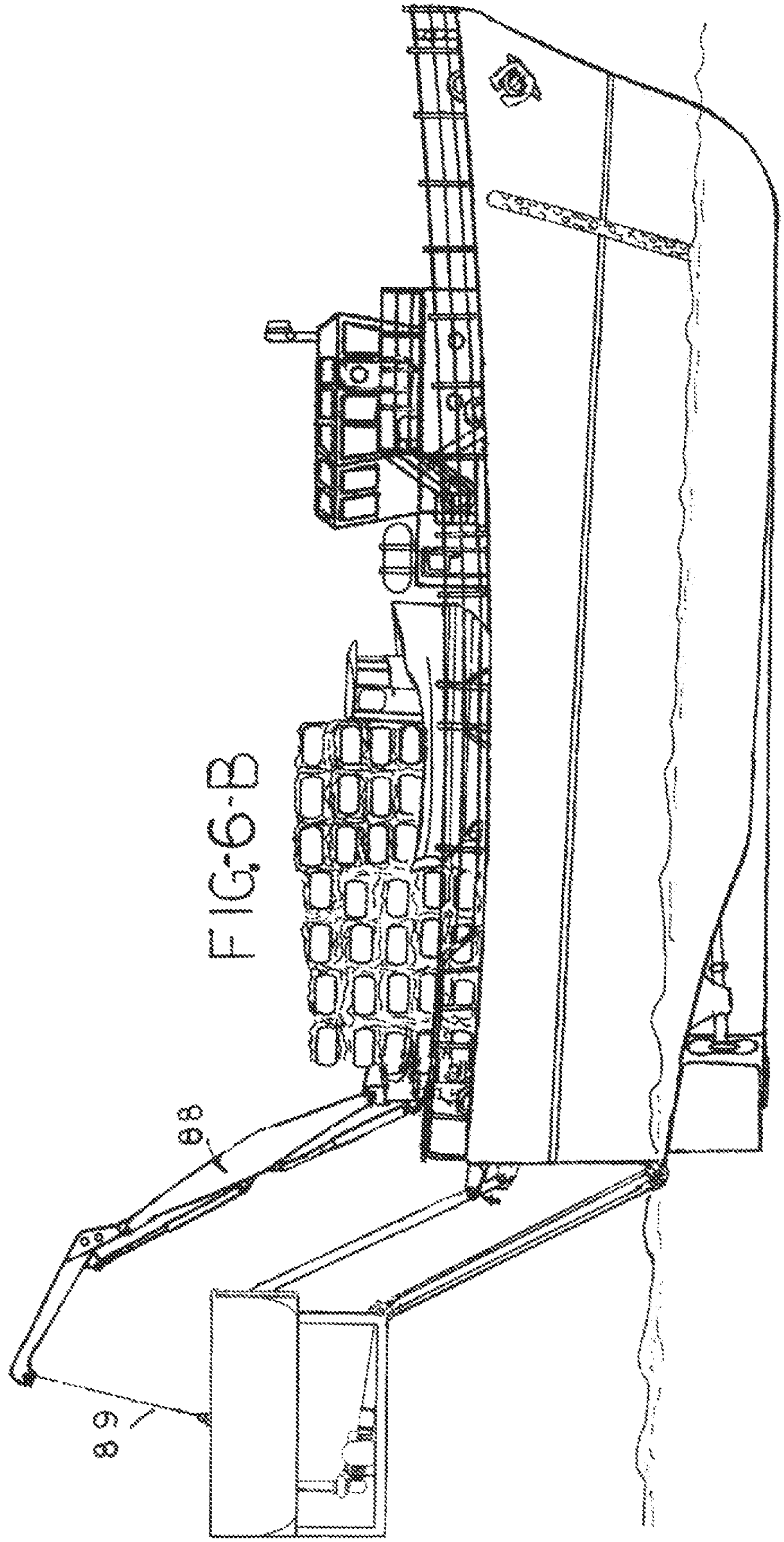
FIG-6-B

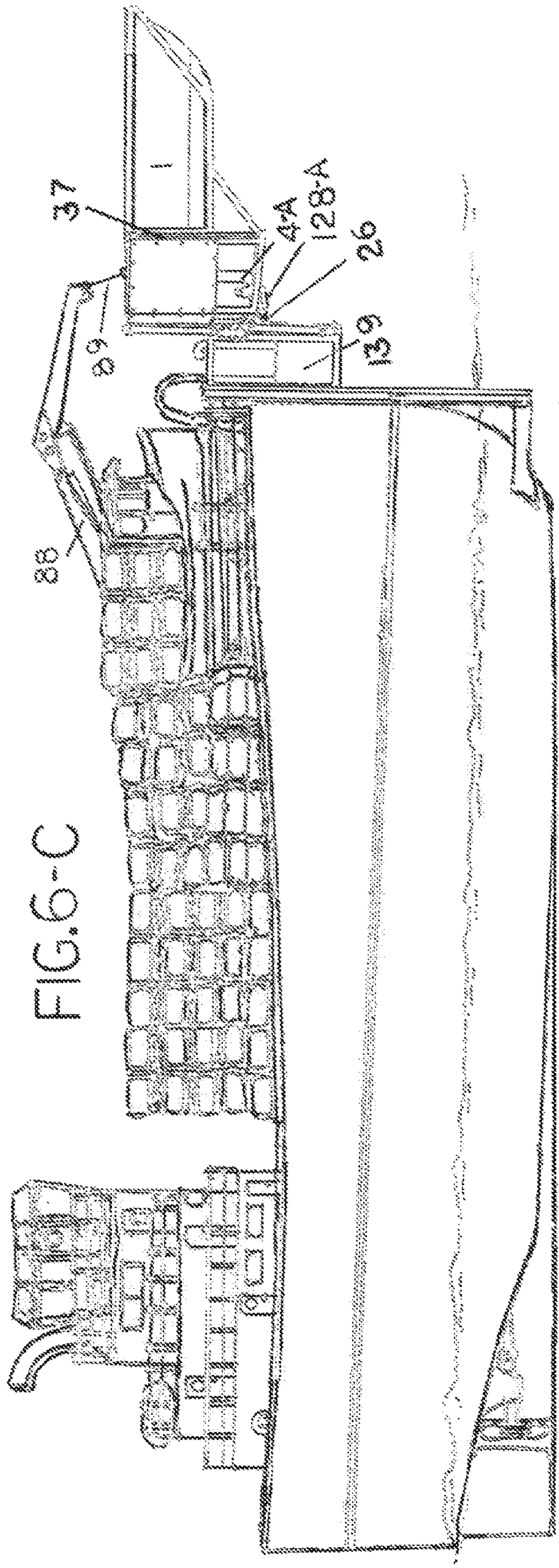
FIG.6-C
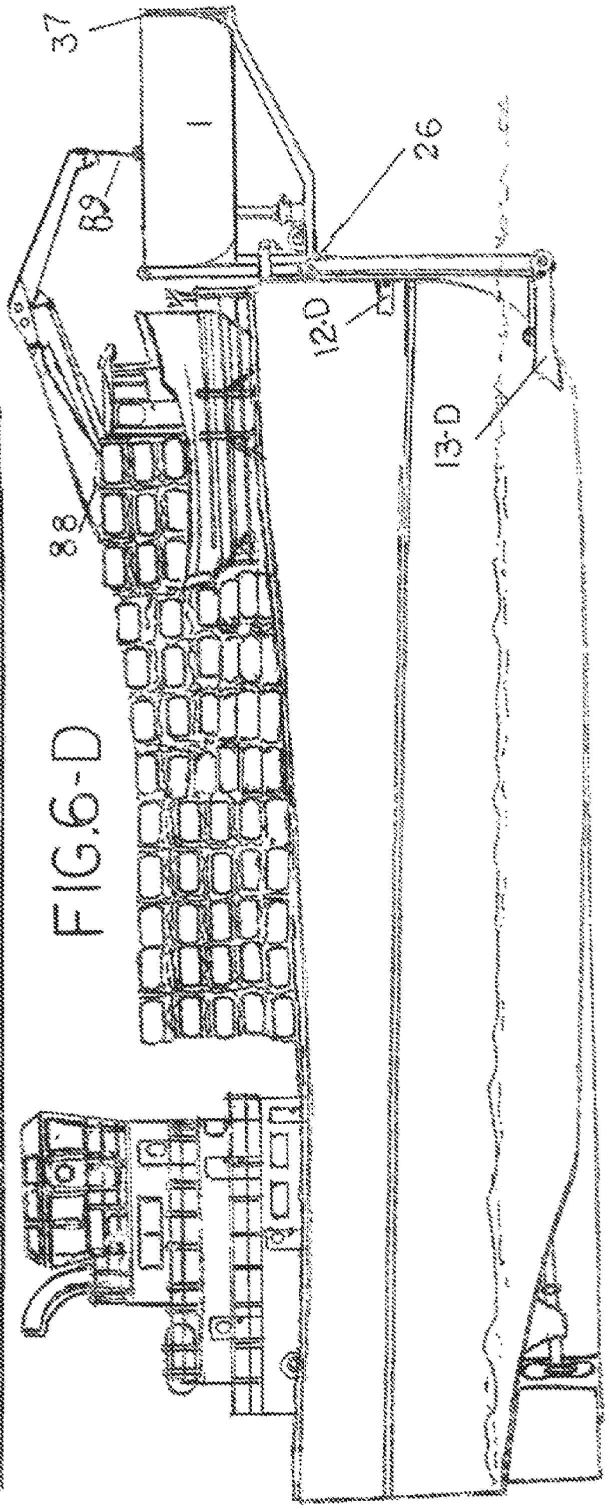
FIG.6-D

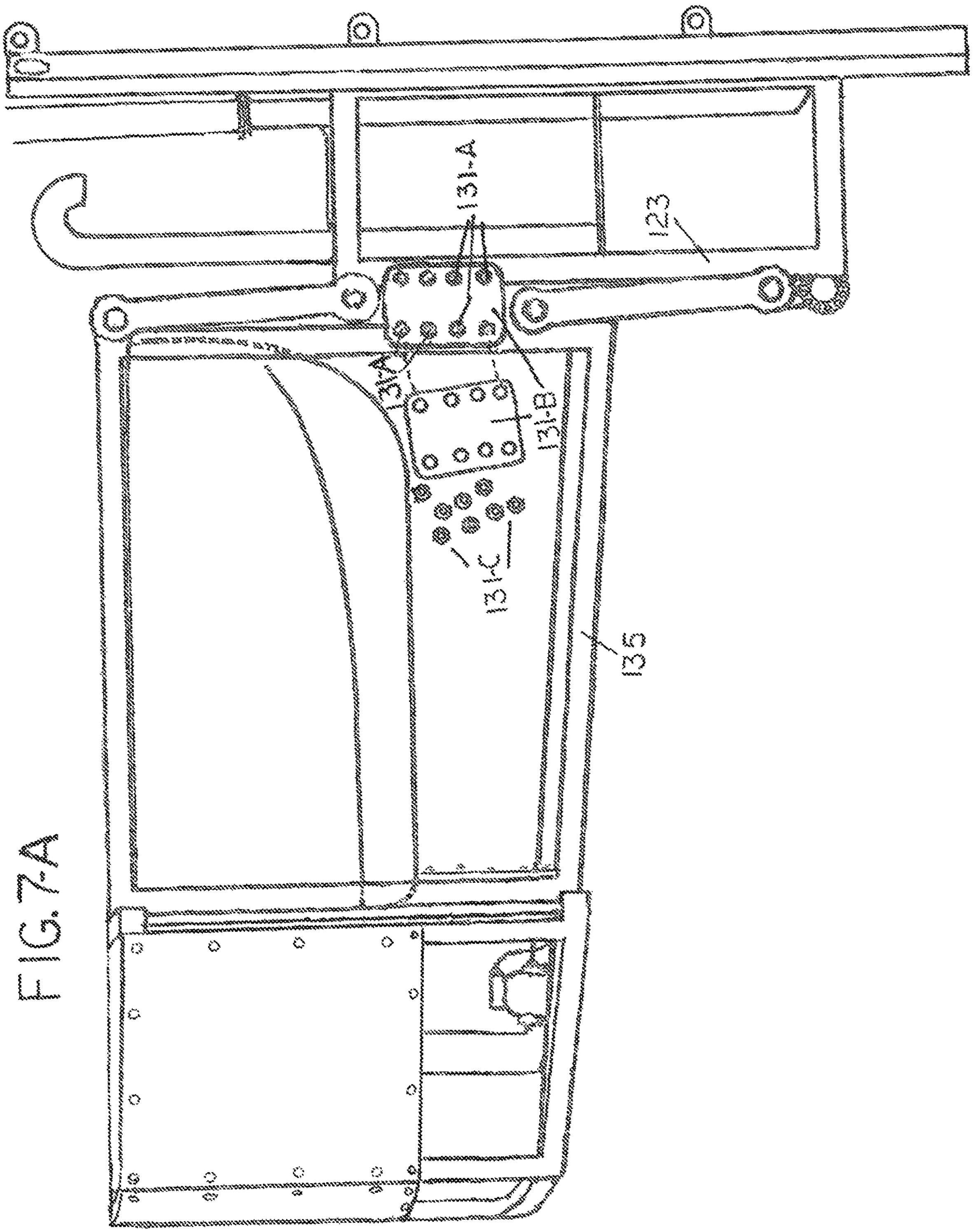
FIG. 7-A

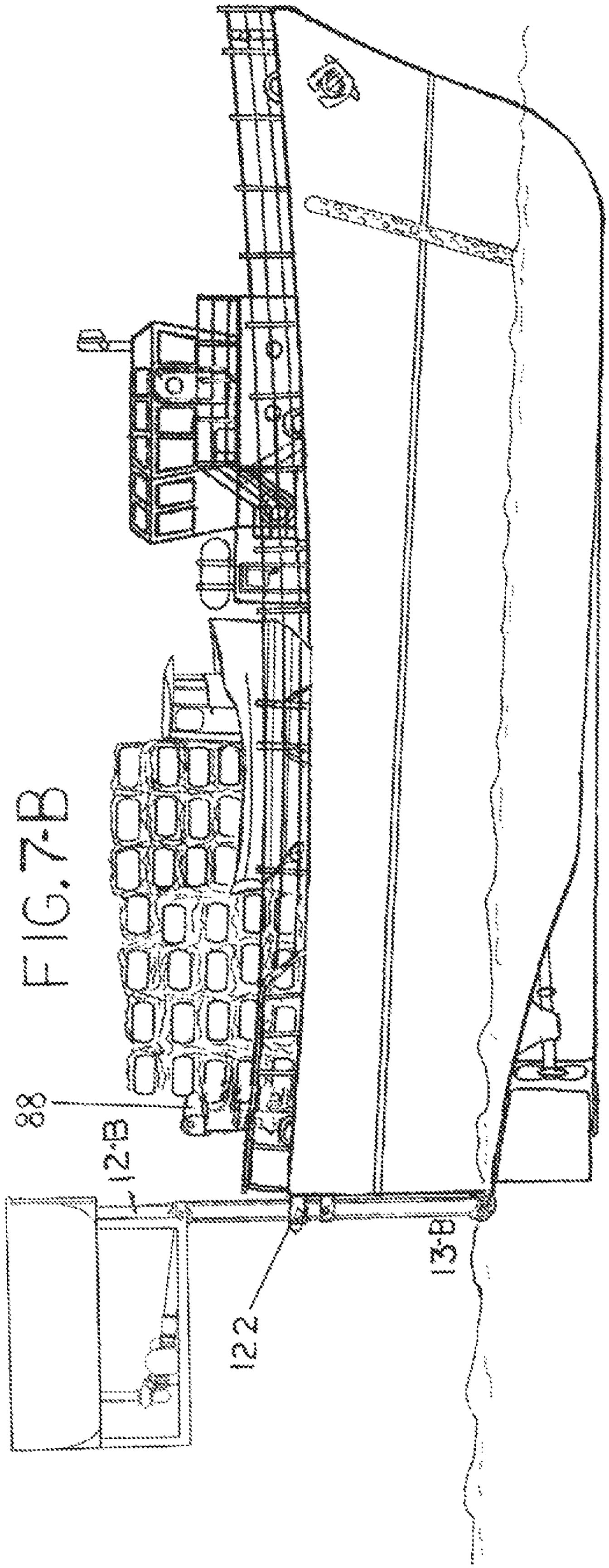
FIG. 7-B

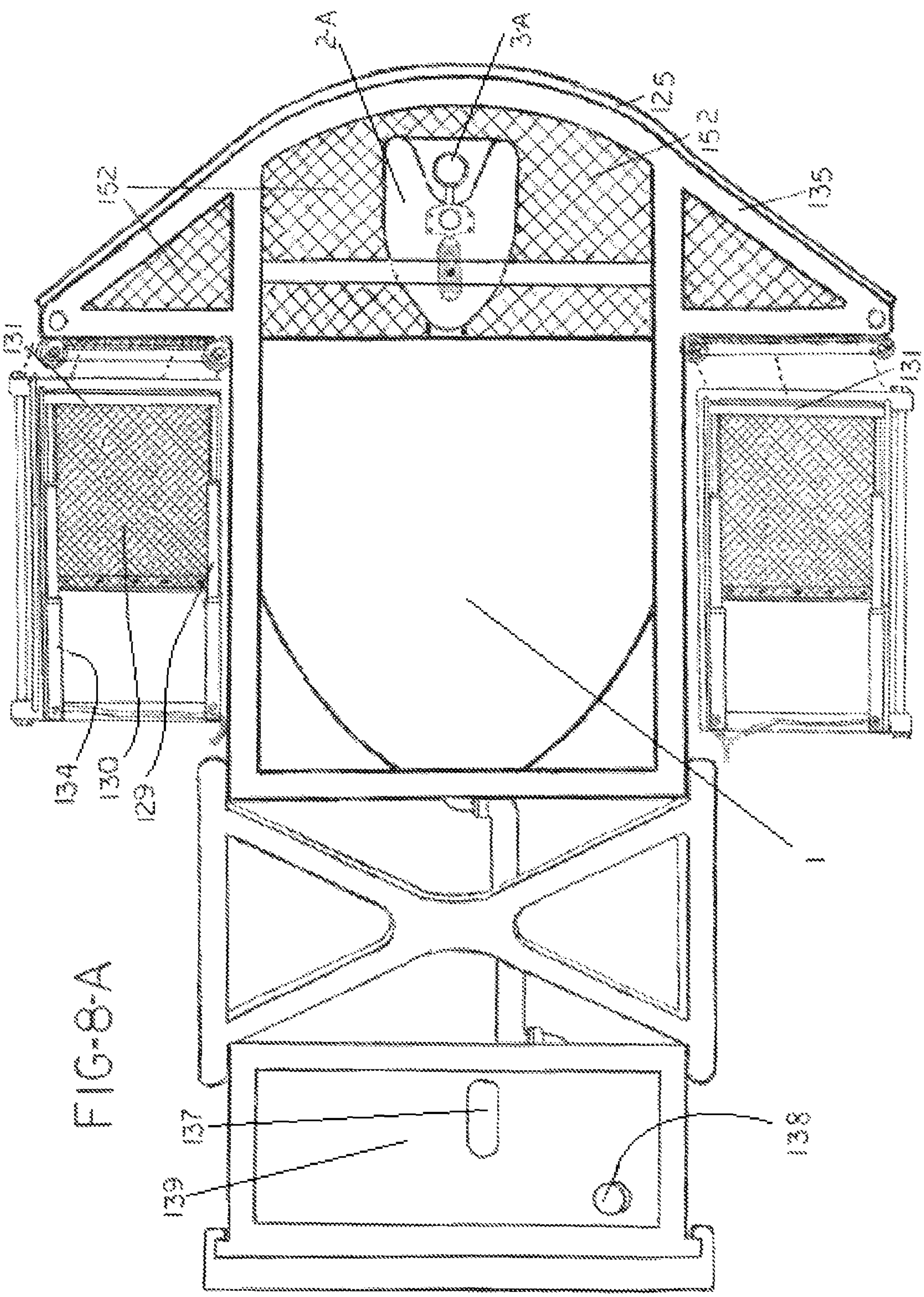
FIG-8-A

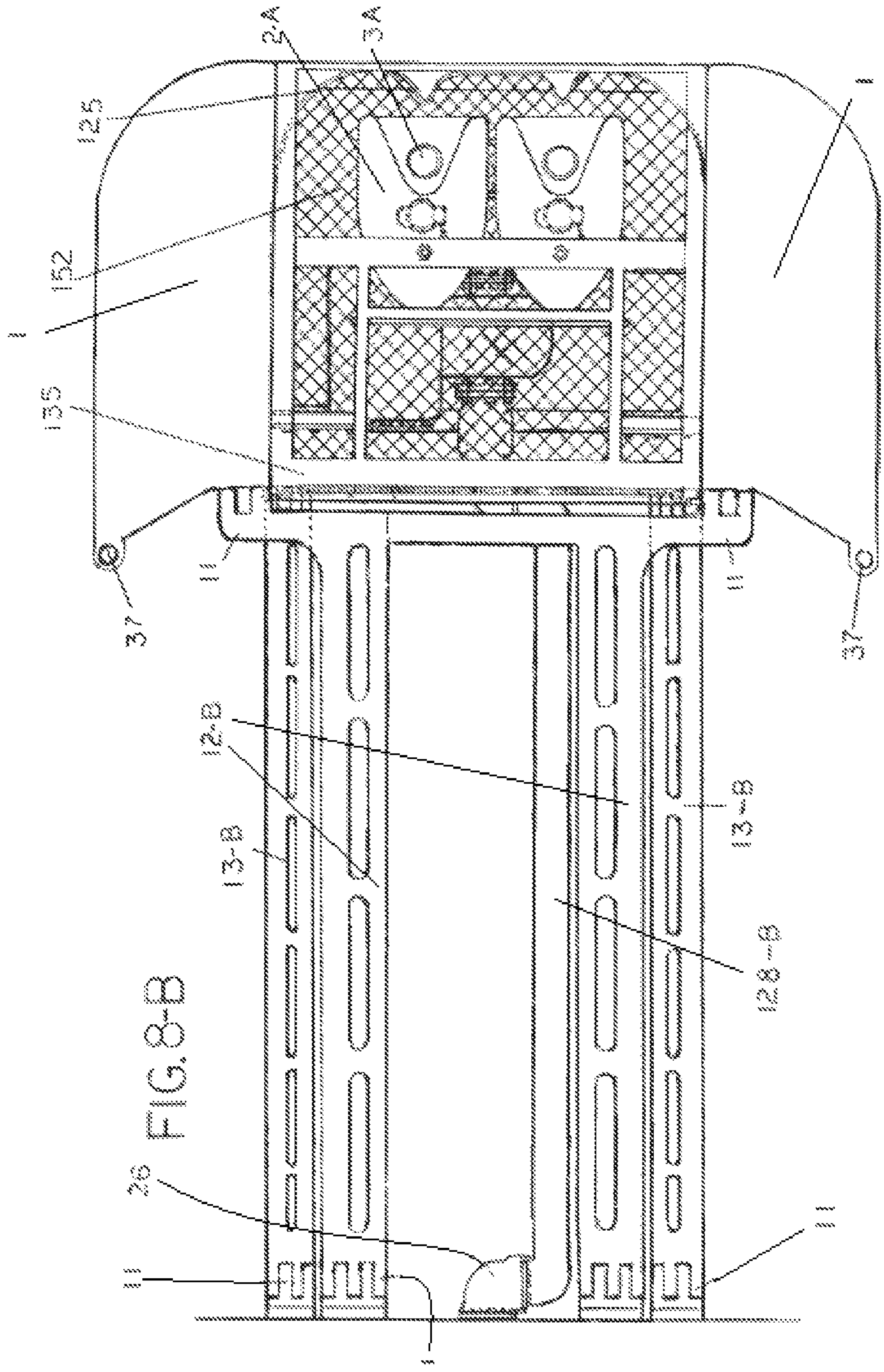
FIG. 8-B

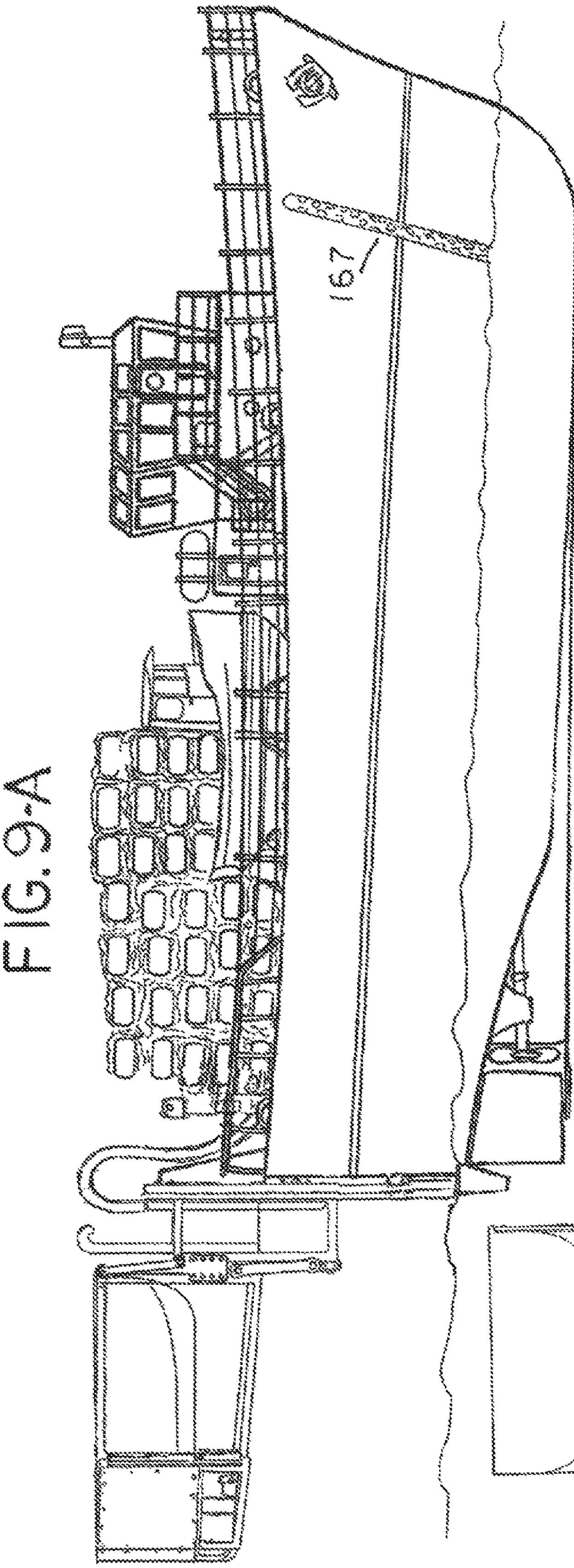
FIG. 9-A
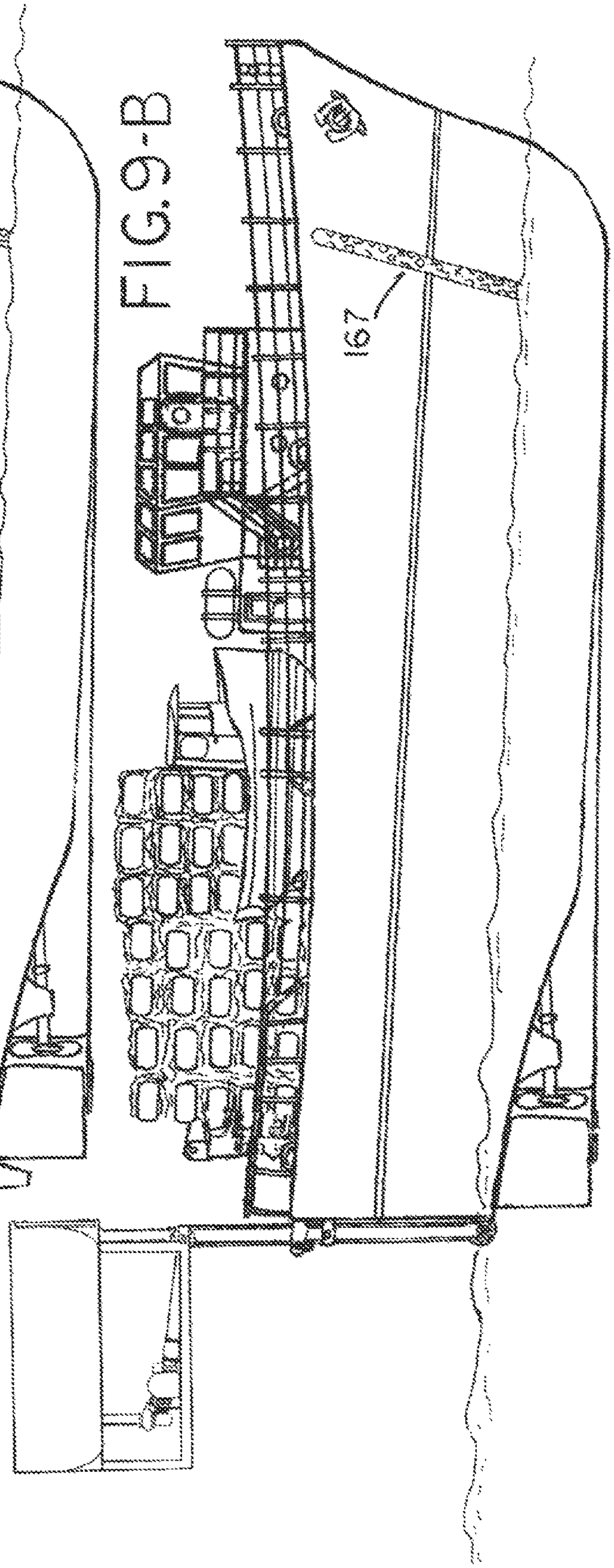
FIG. 9-B

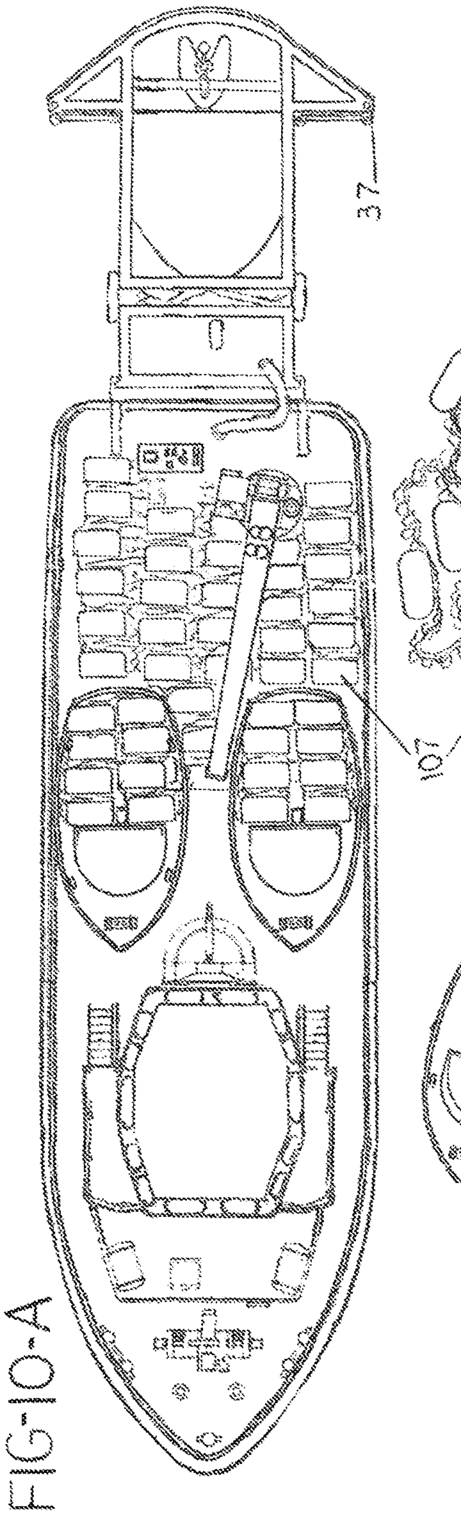
FIG-10-A
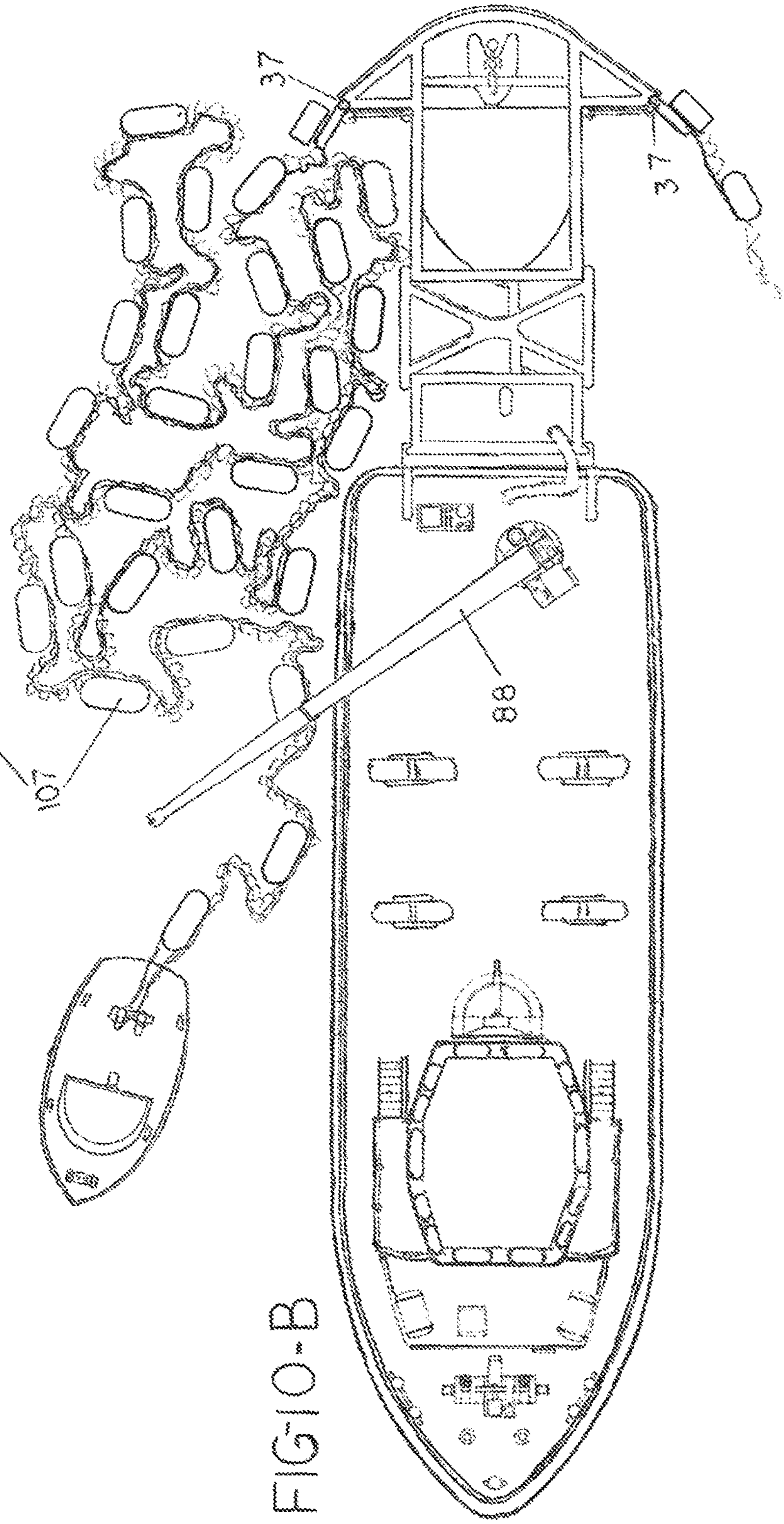
FIG-10-B 1
23
35
37
37-A
39
88
107
108
153
153-A
154

FIG. 12-C
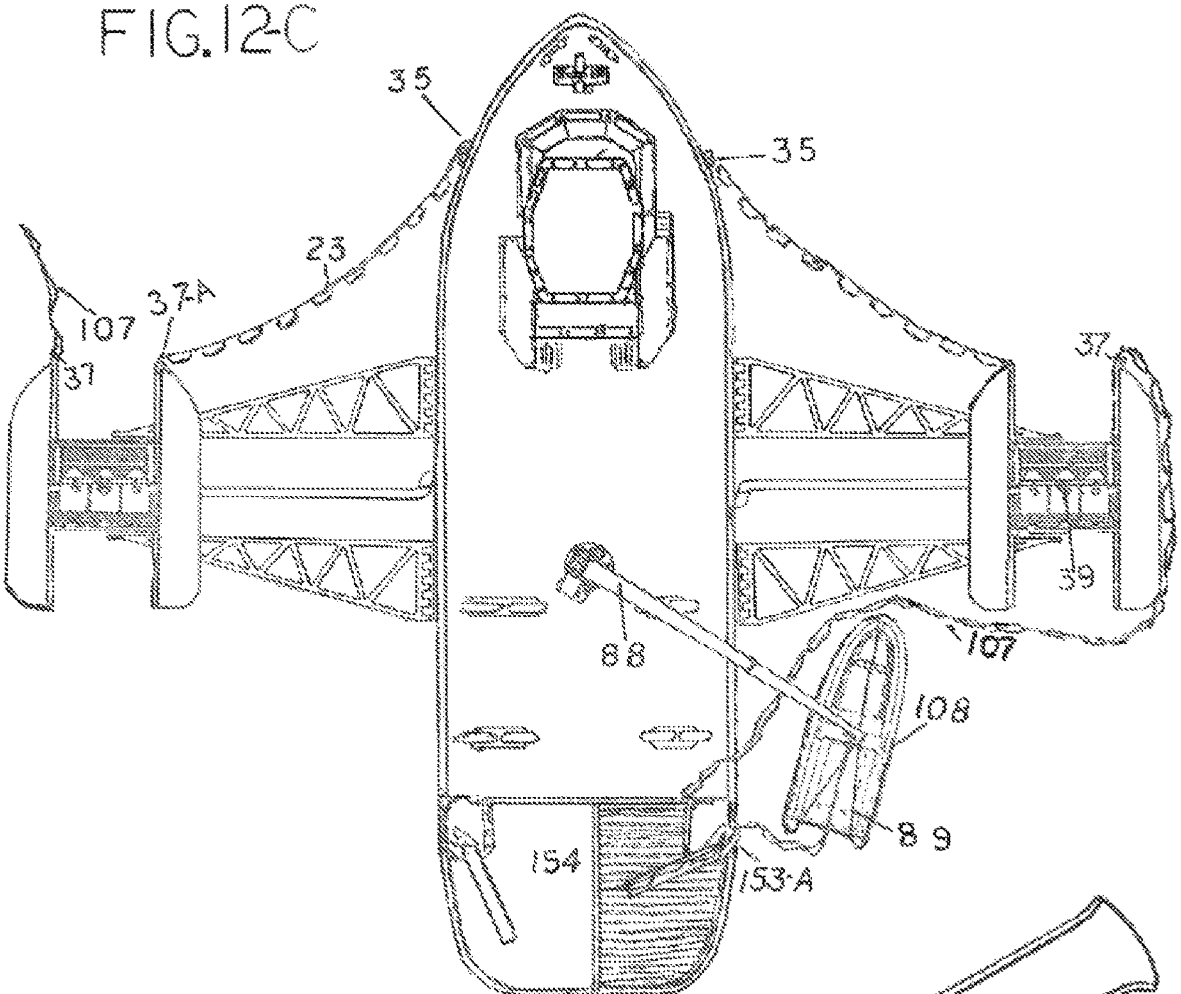
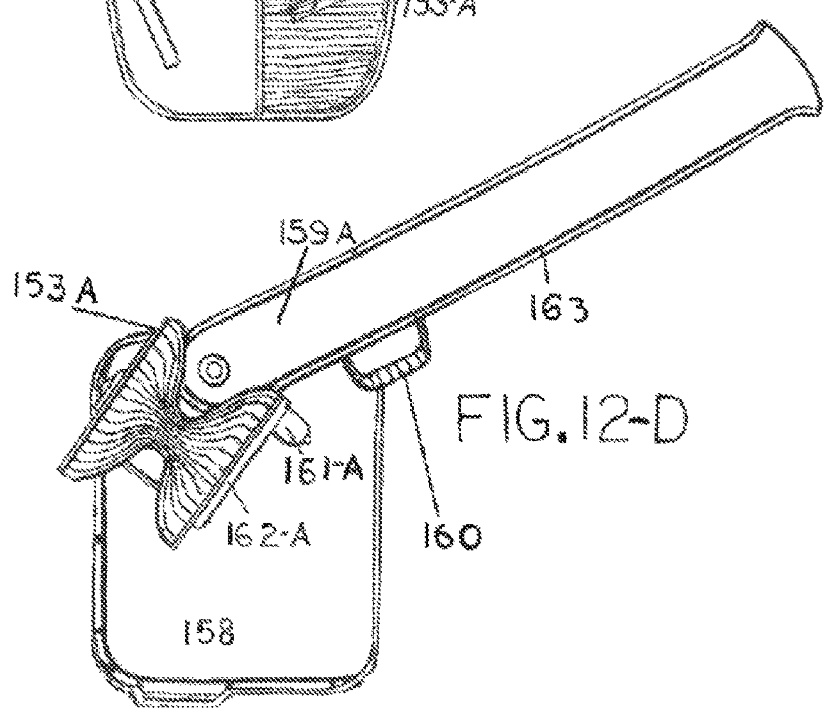
FIG. 12-D

FIG. 18-A
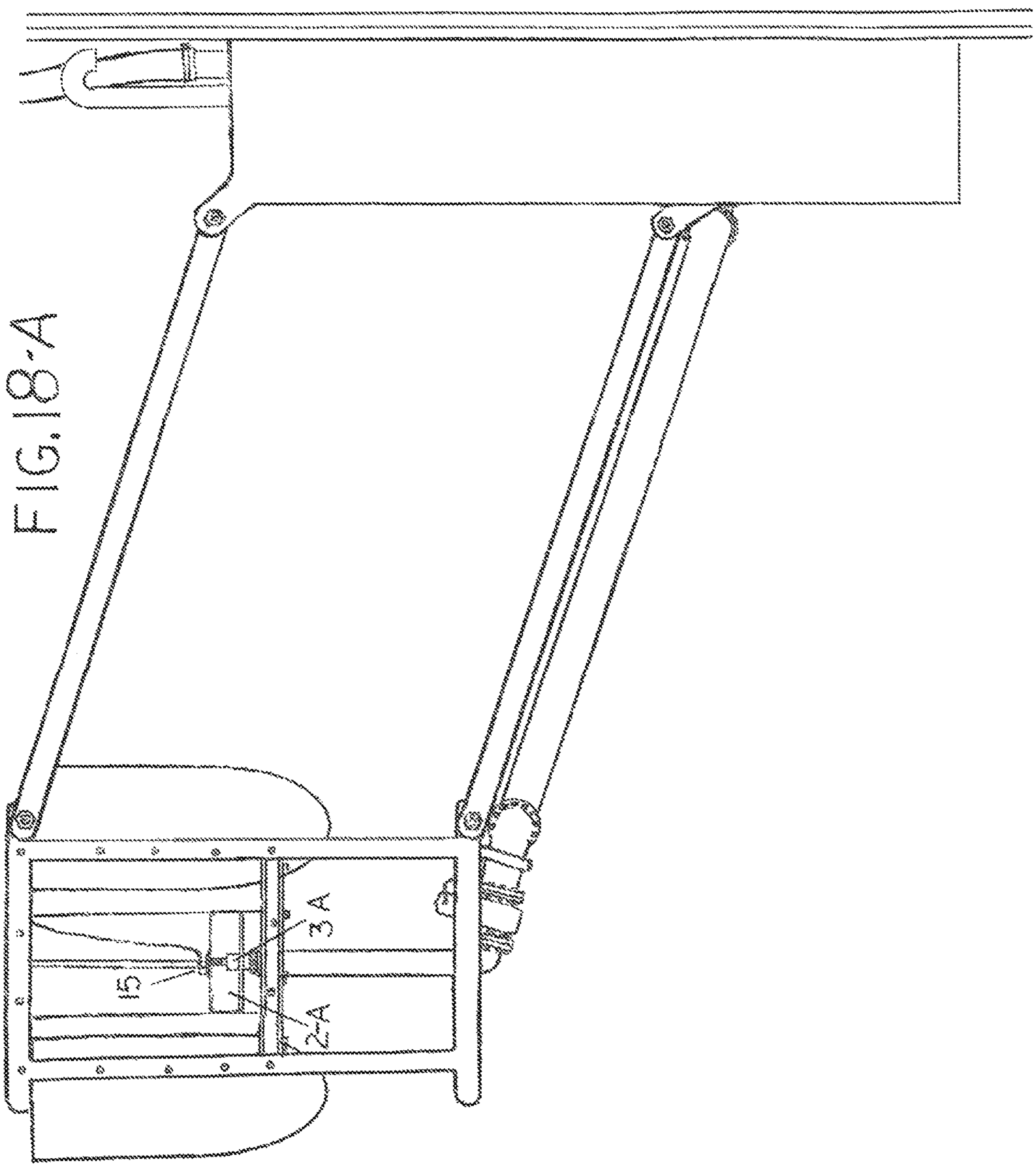

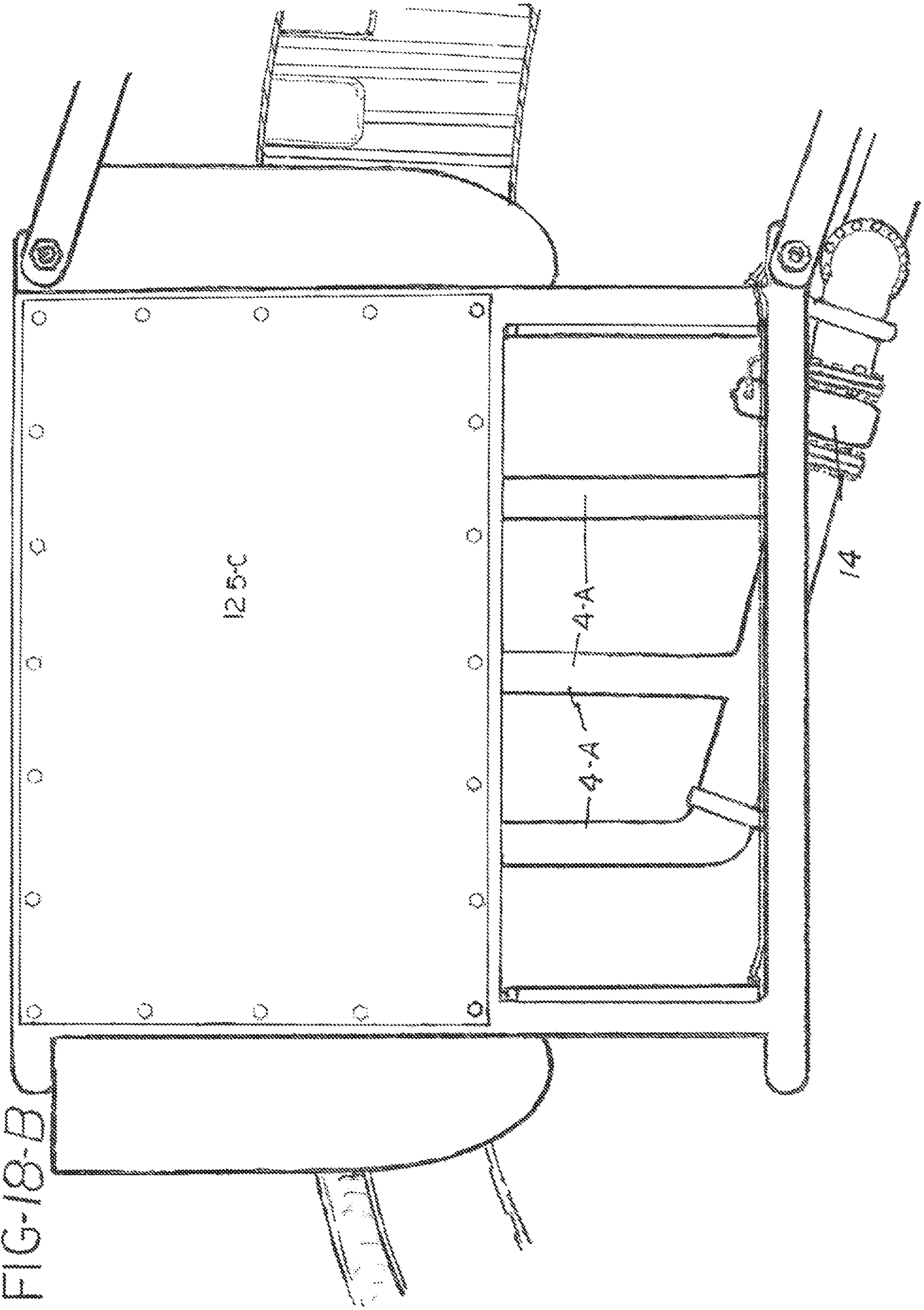
FIG-18-B

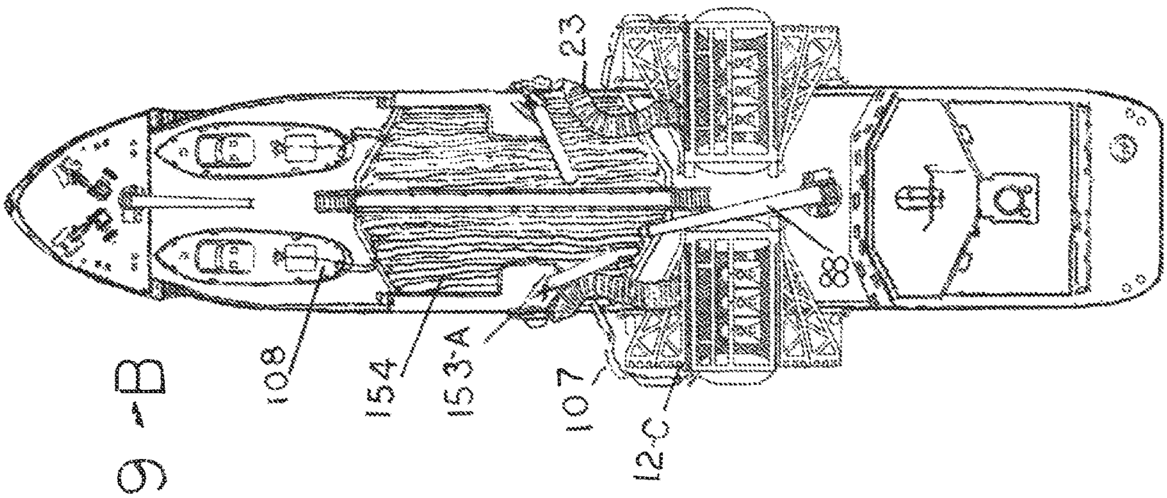
FIG.19 -B
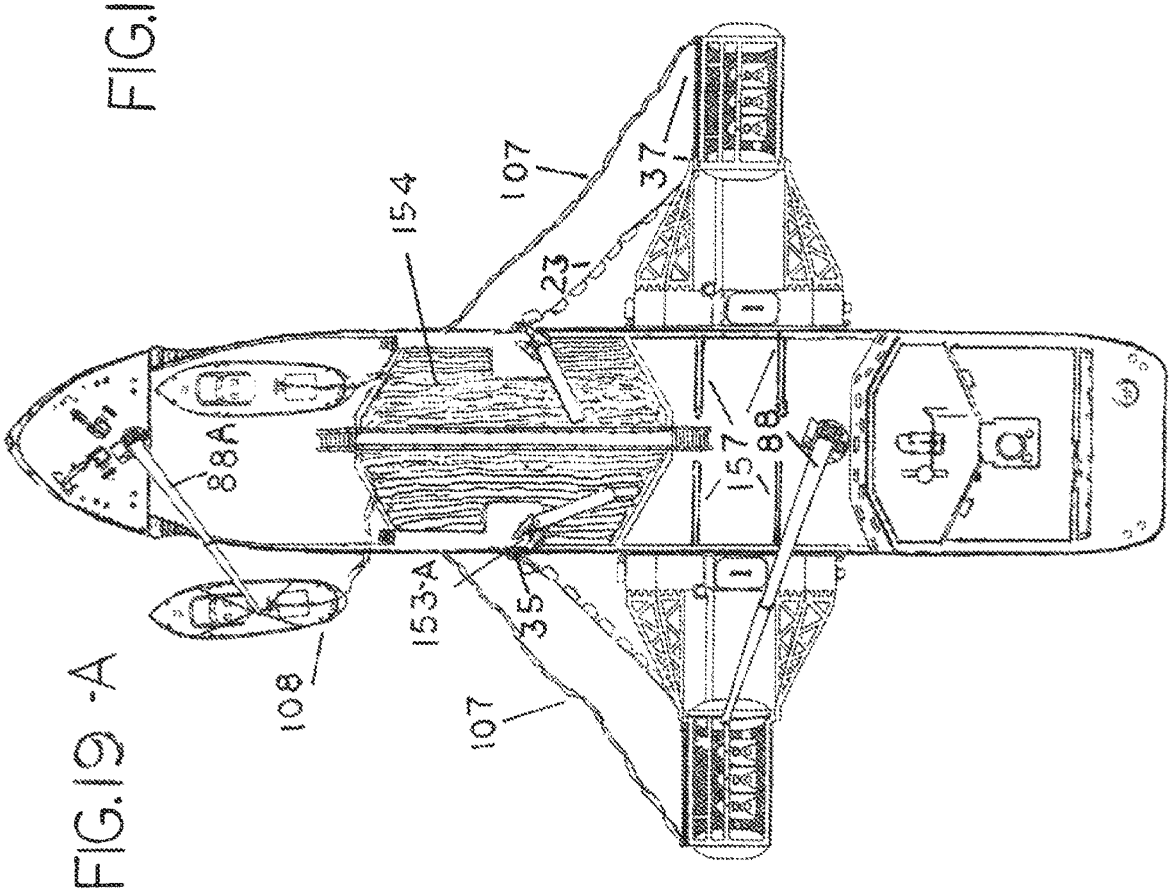
FIG.19 -A

FIG. 20-A
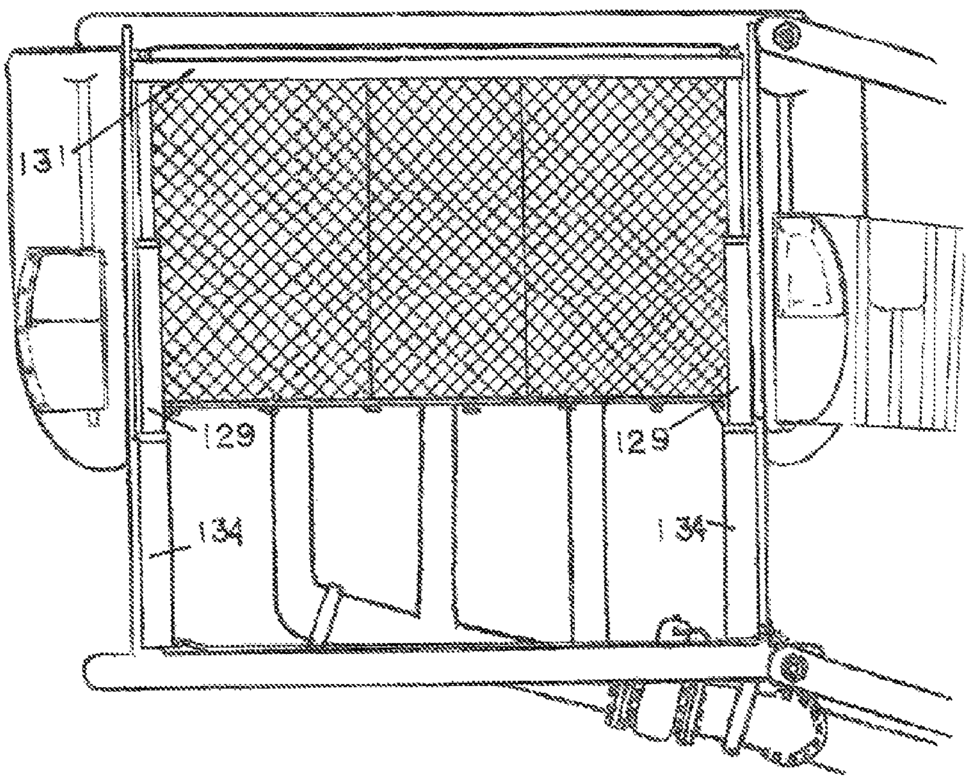
FIG. 20-B
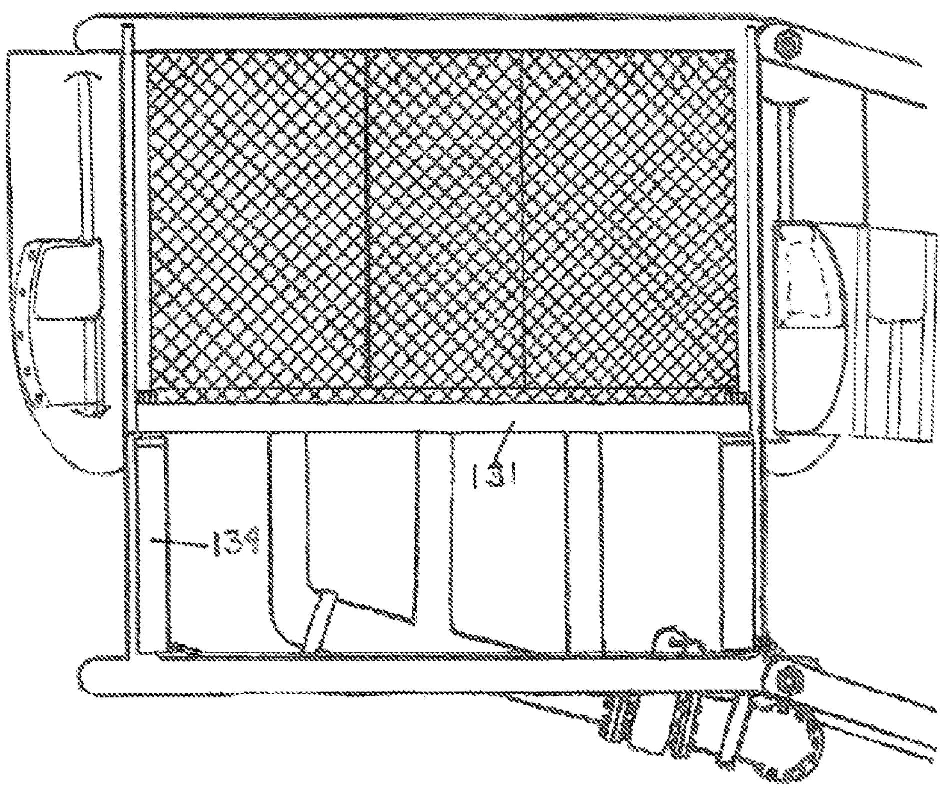

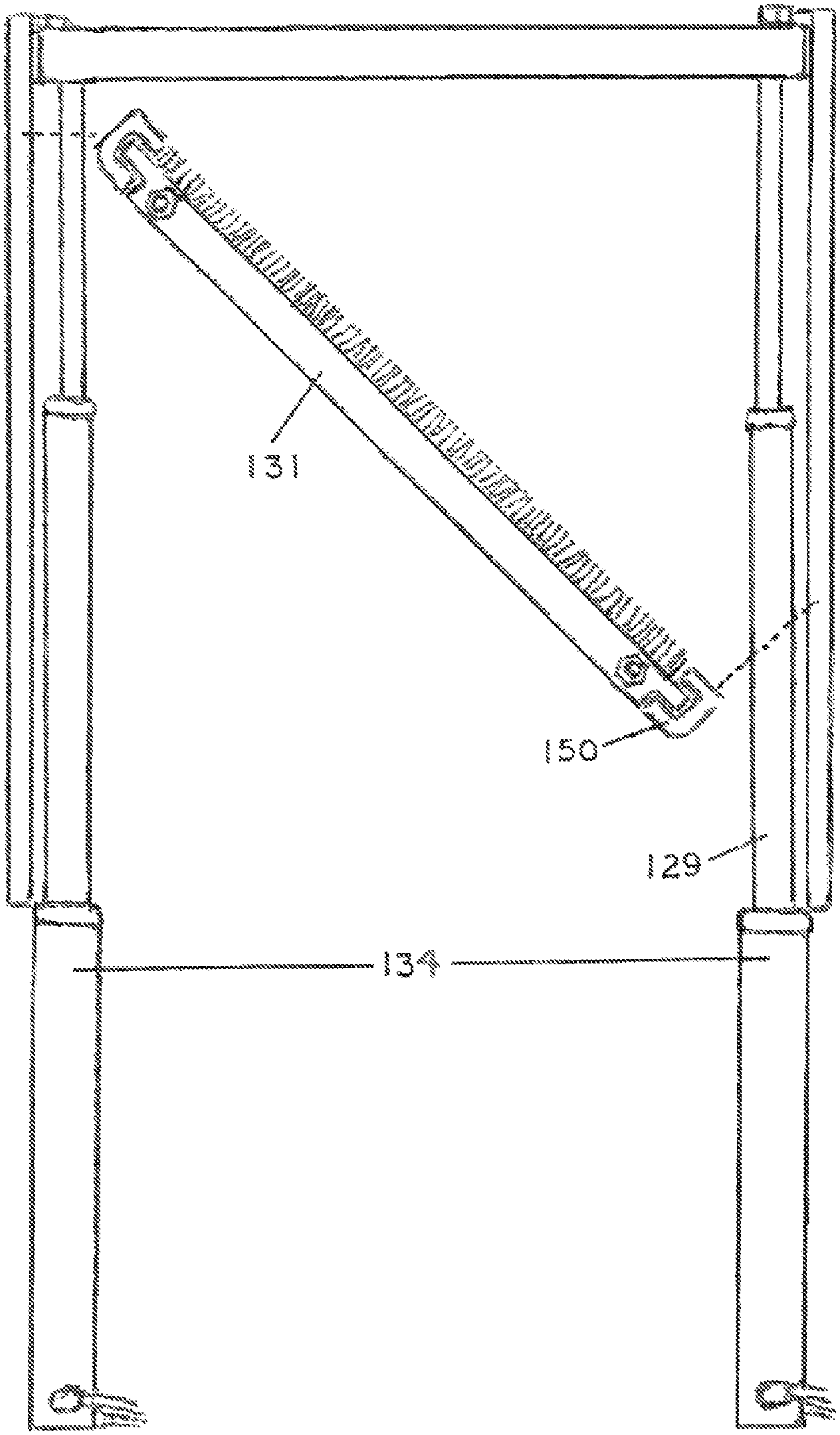
FIG. 20-C

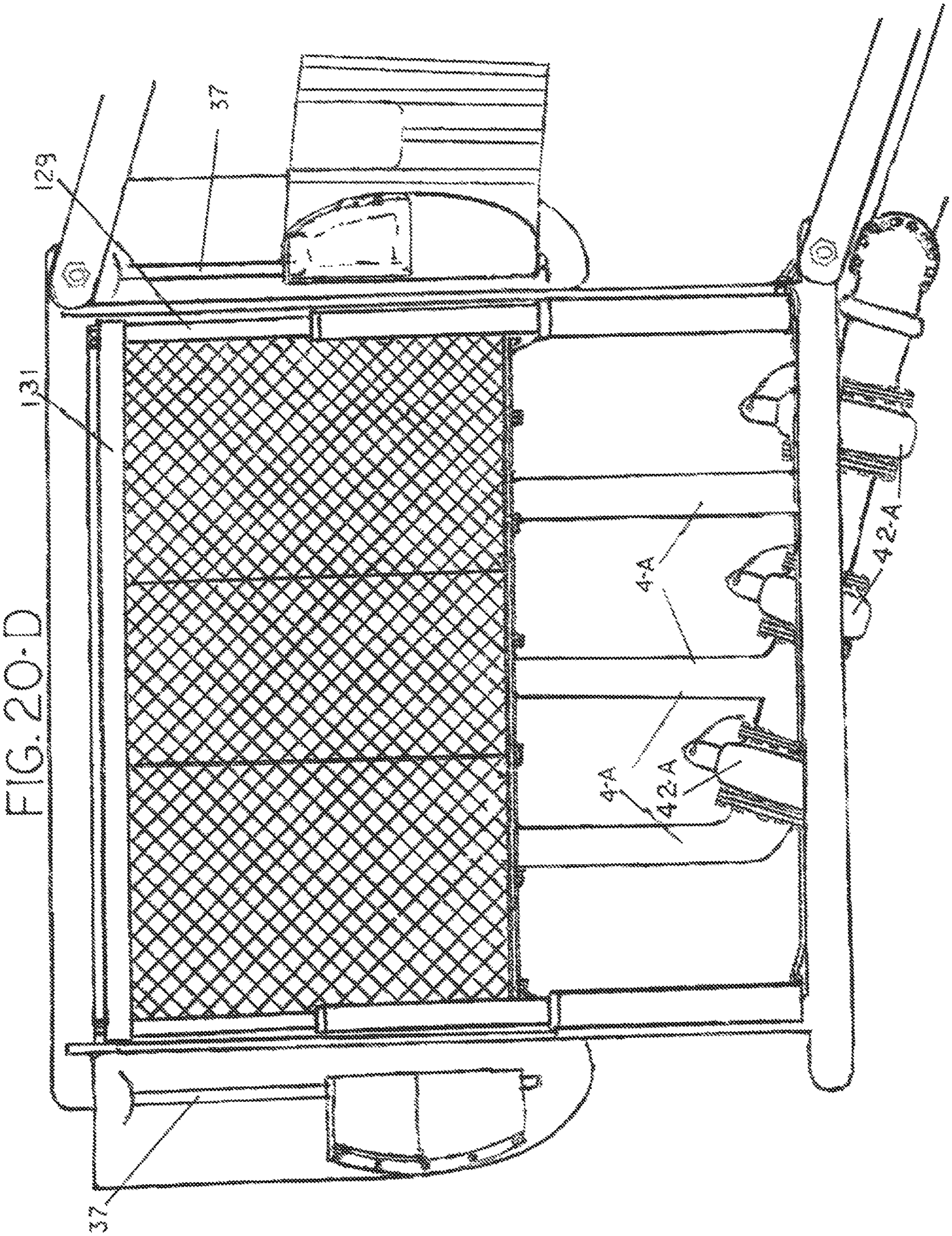
FIG. 20-D

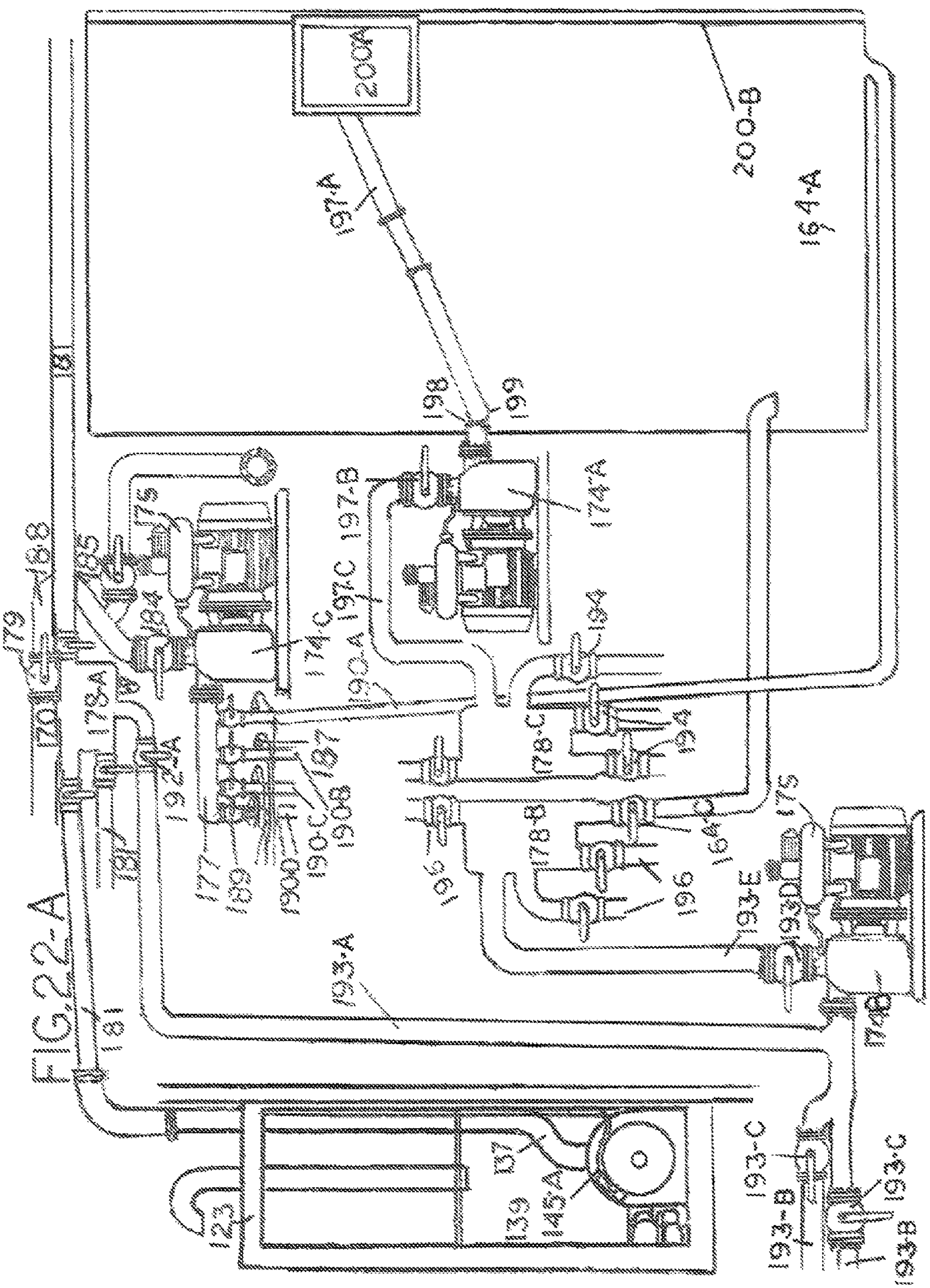
FIG. 22-A

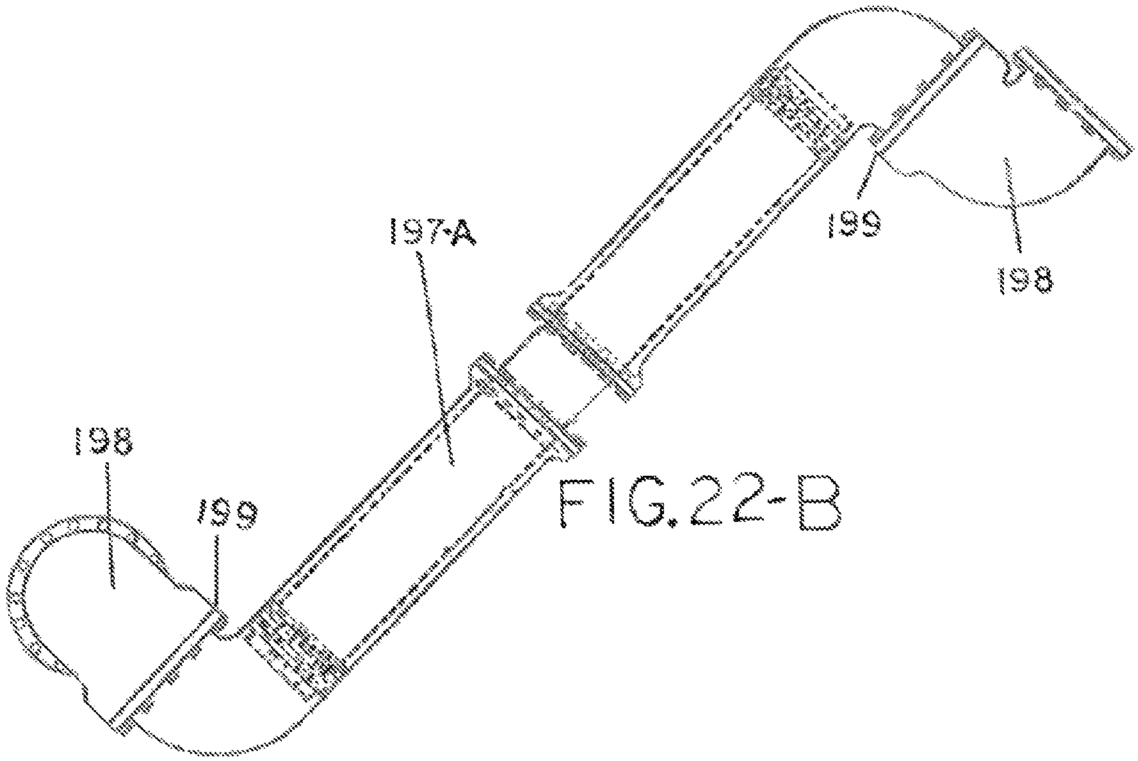
FIG. 22-B
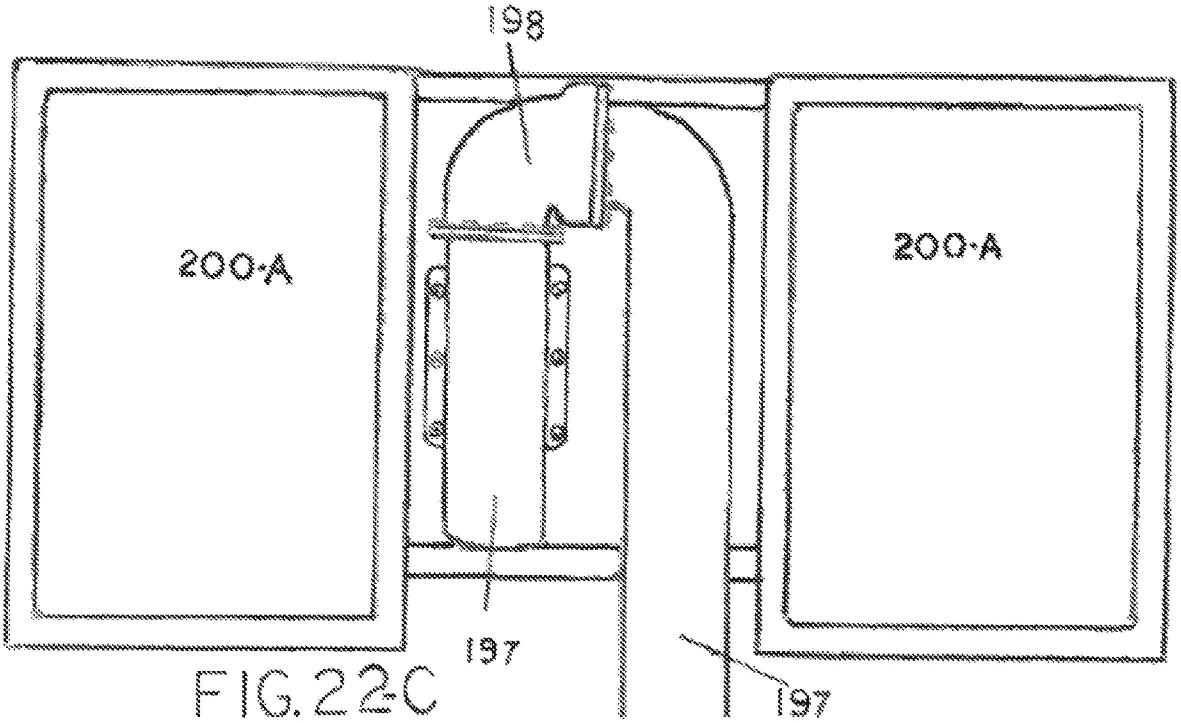
FIG. 22-C

FIG.24-A
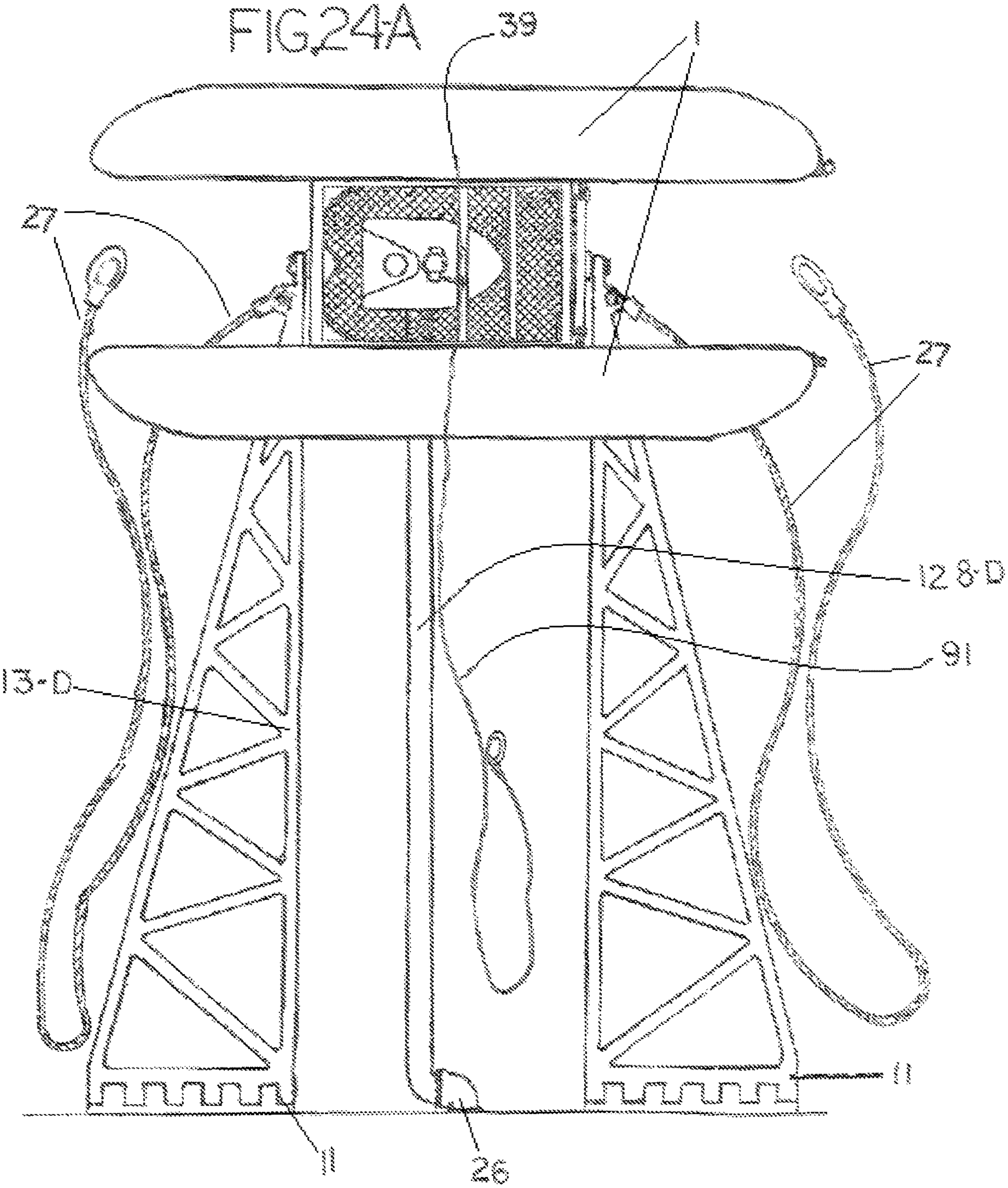

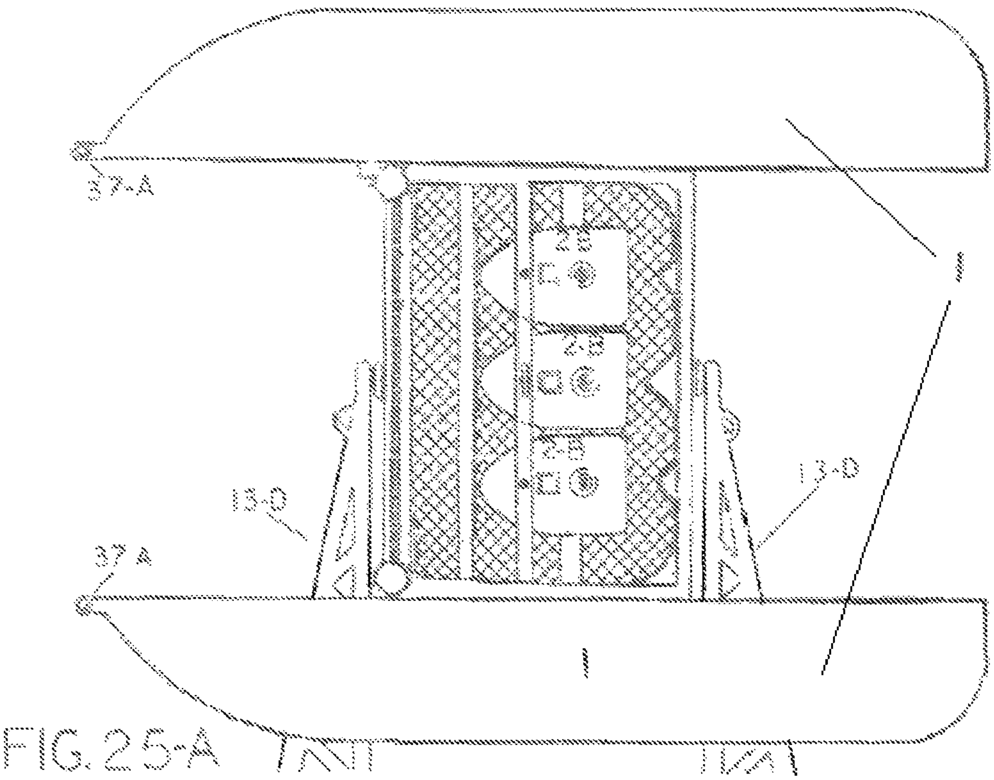
FIG. 25-A
FIG. 25B
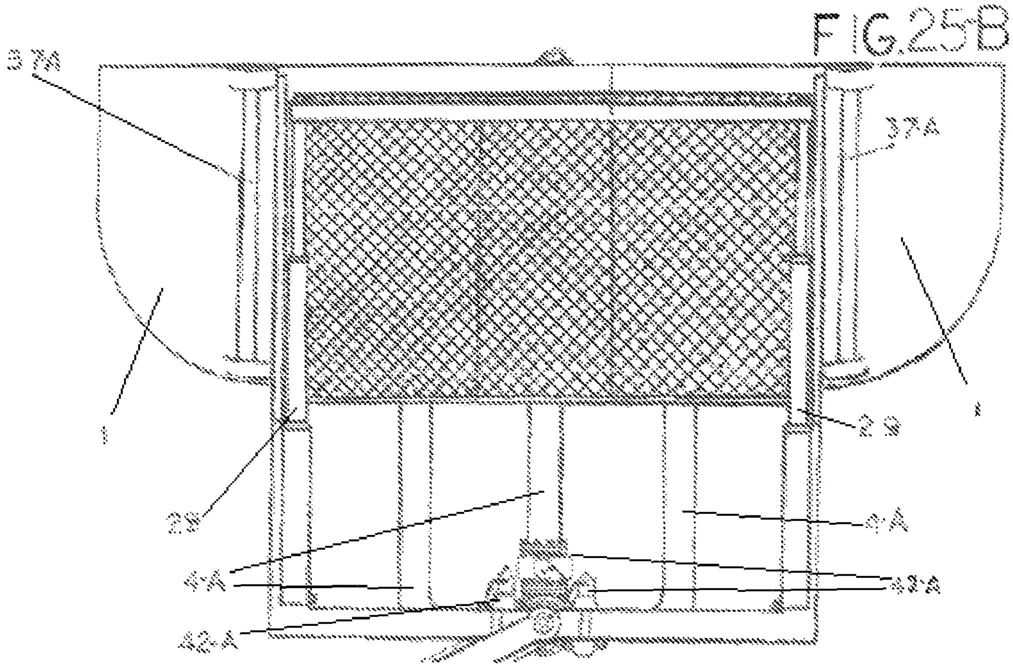

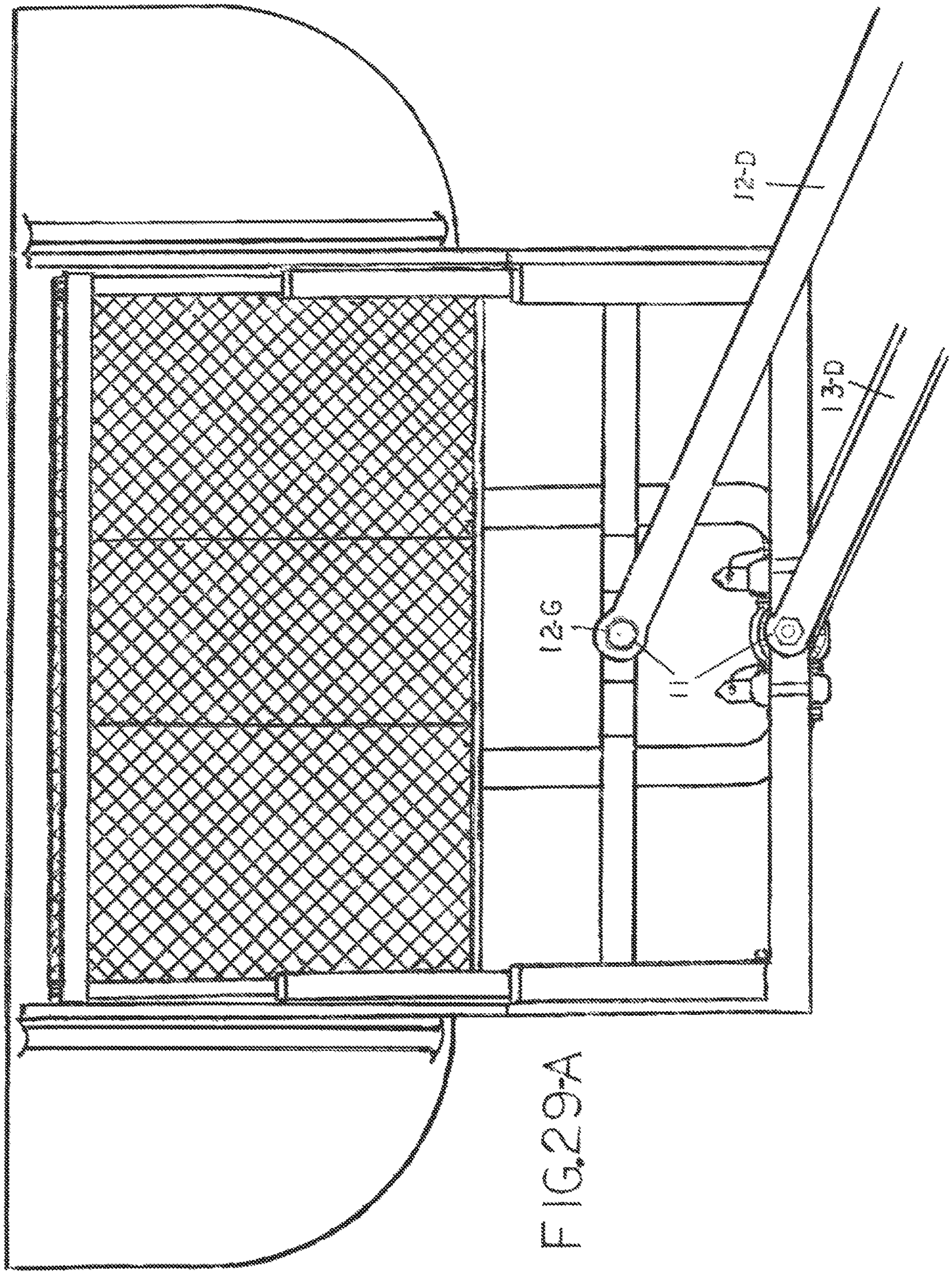
FIG. 29-A

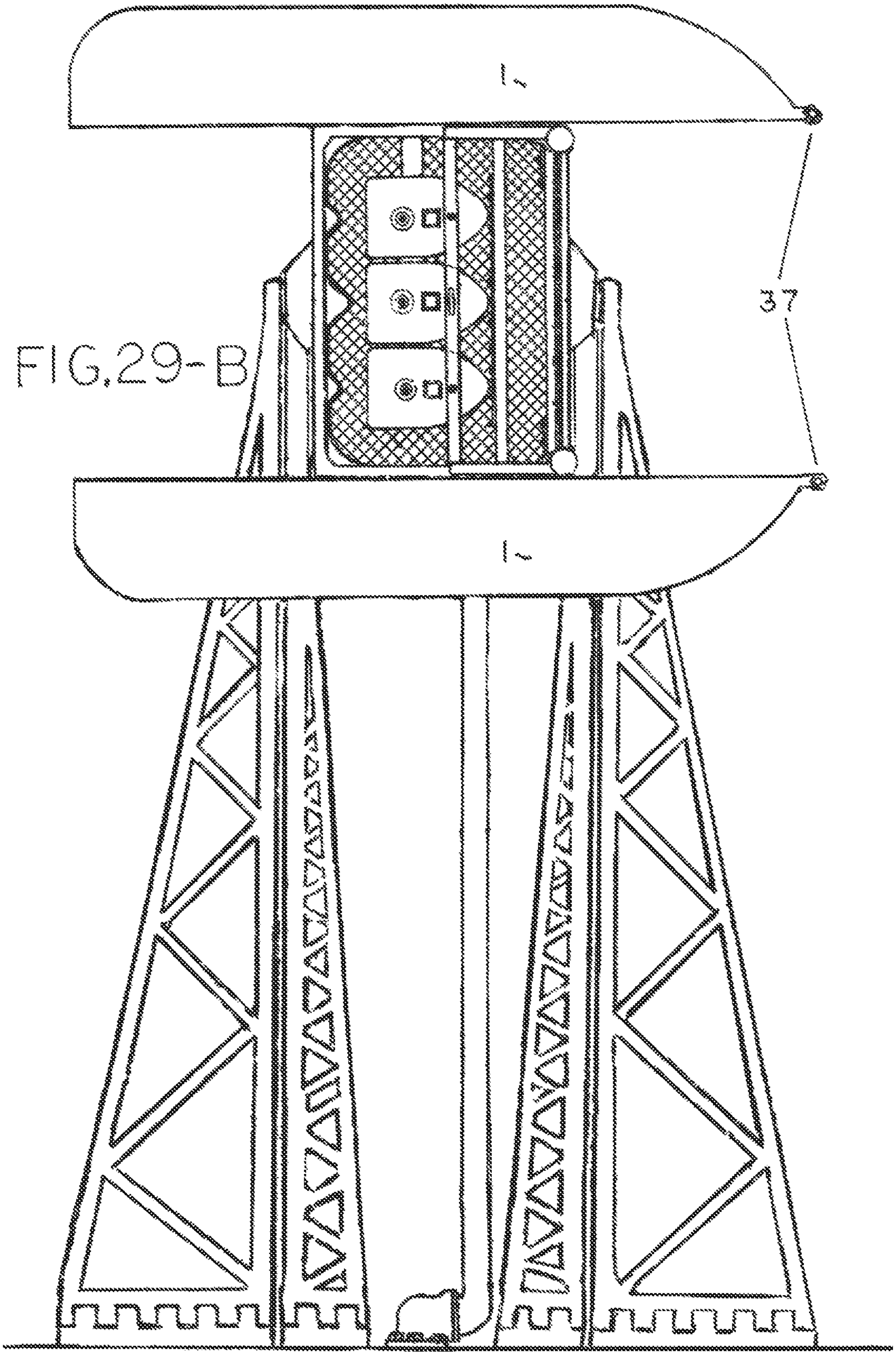
FIG.29-B

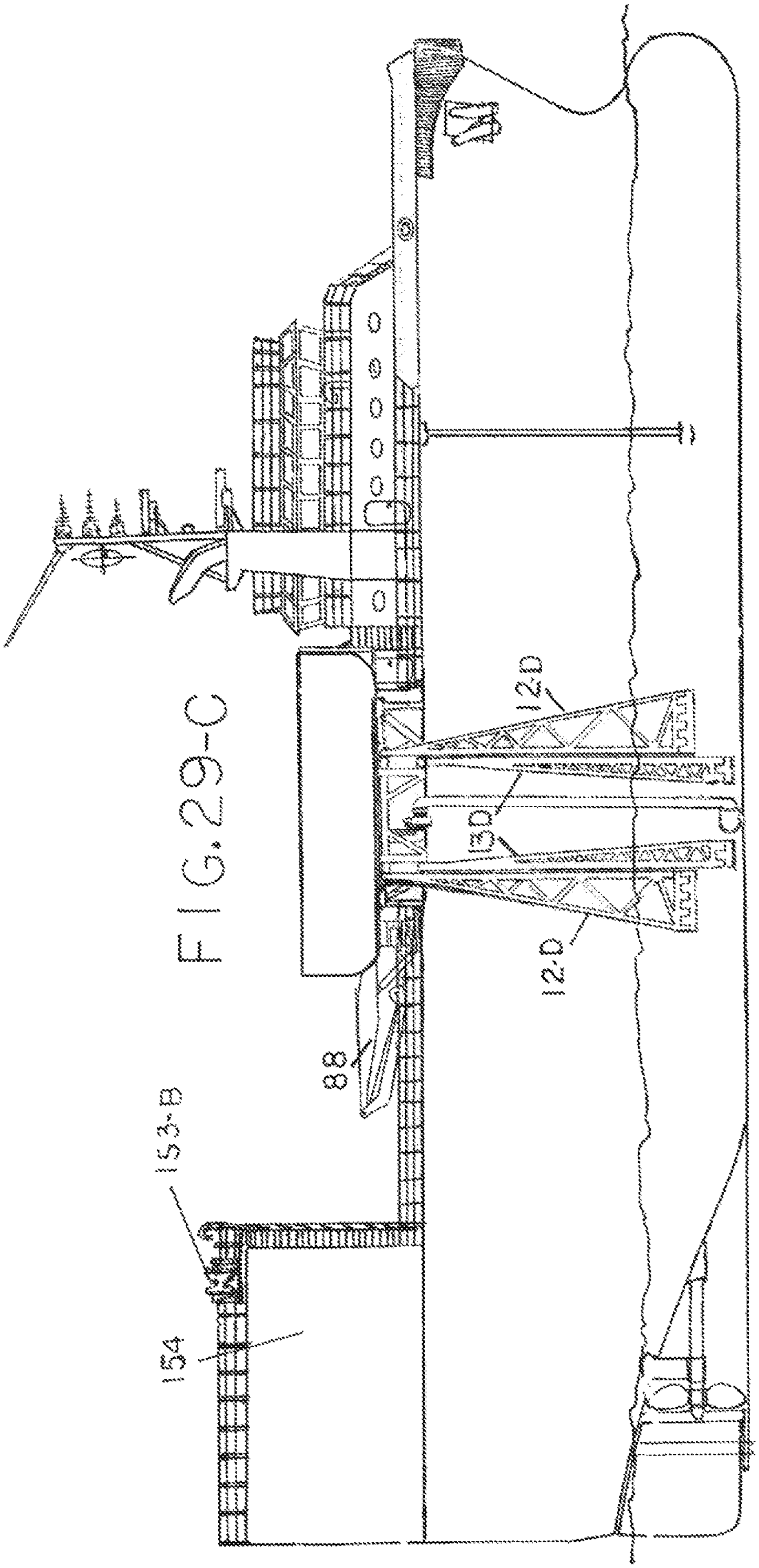
FIG. 29-C

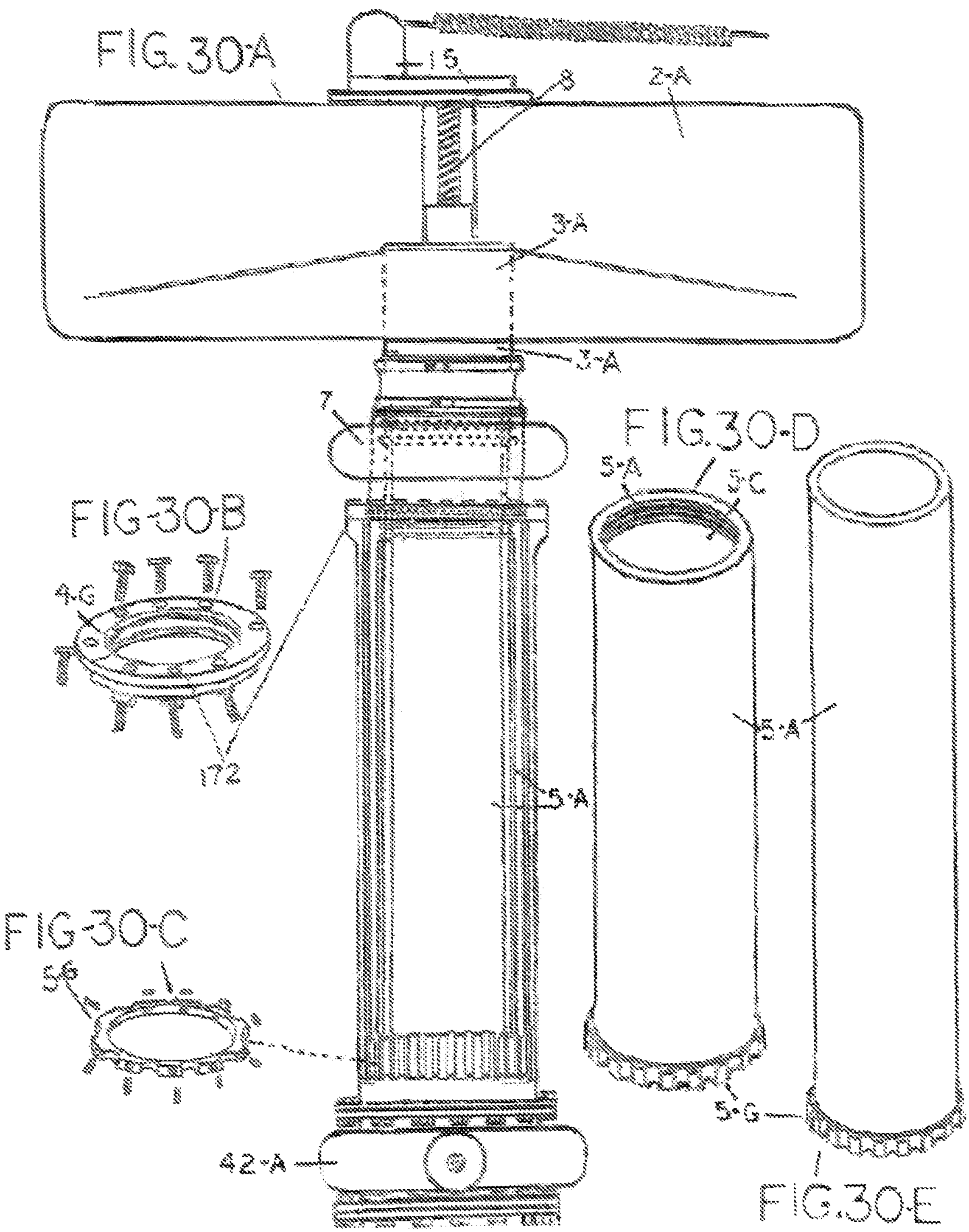
FIG. 30-A
15
8
2-A
3-A
3-A
7
FIG. 30-D
5-A
5-C
FIG-30-B
4-G
172
5-A
5-A
FIG-30-C
56
5-G
42-A
FIG. 30-E FIG-31-B
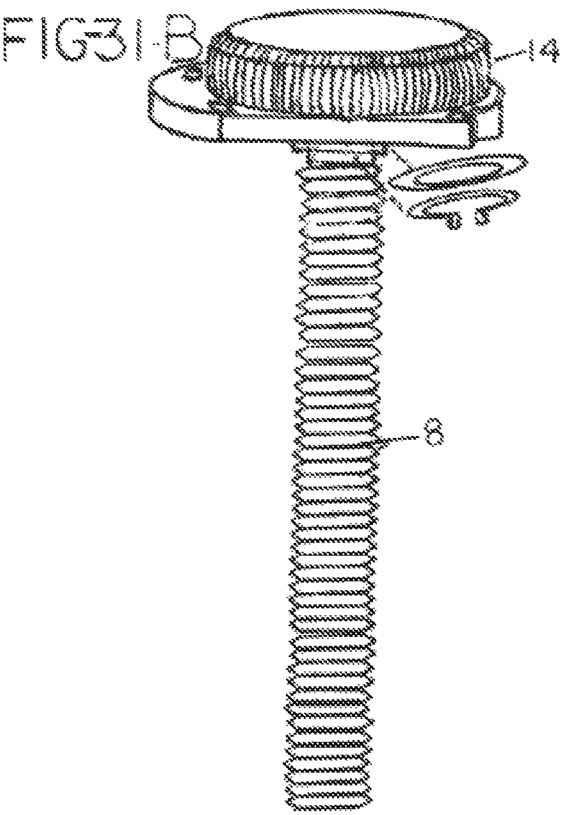
FIG-31-C
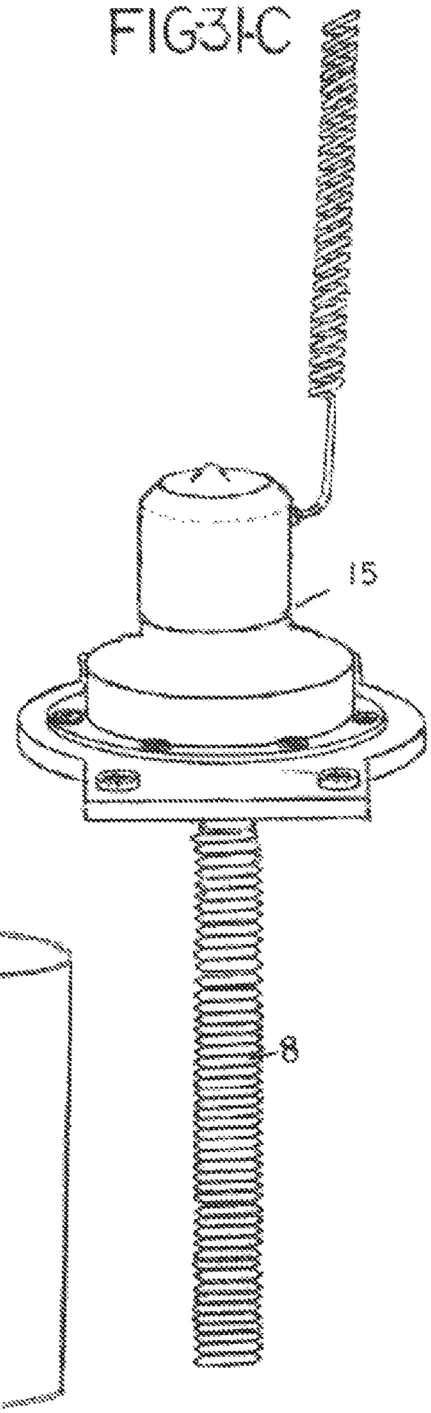
FIG-31-A
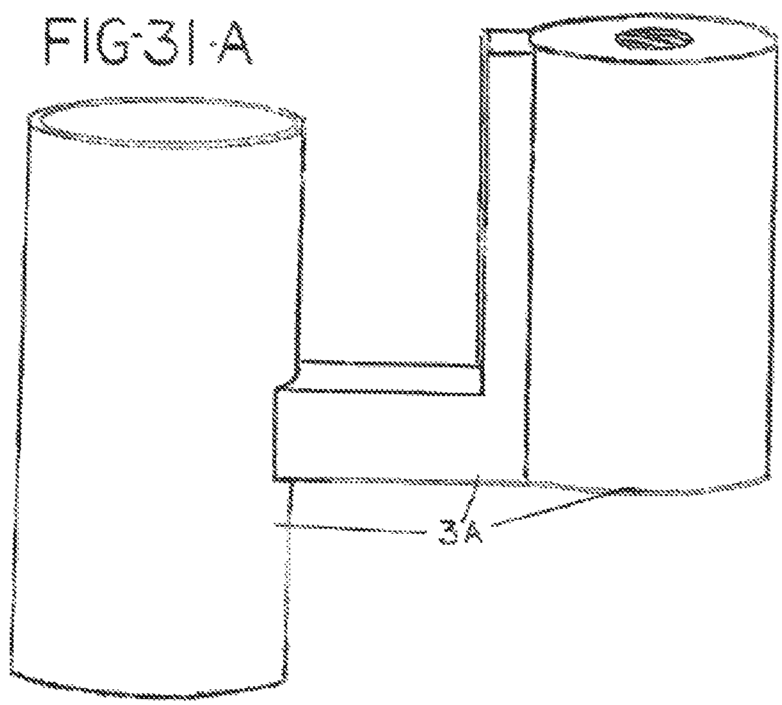

FIG.31-D
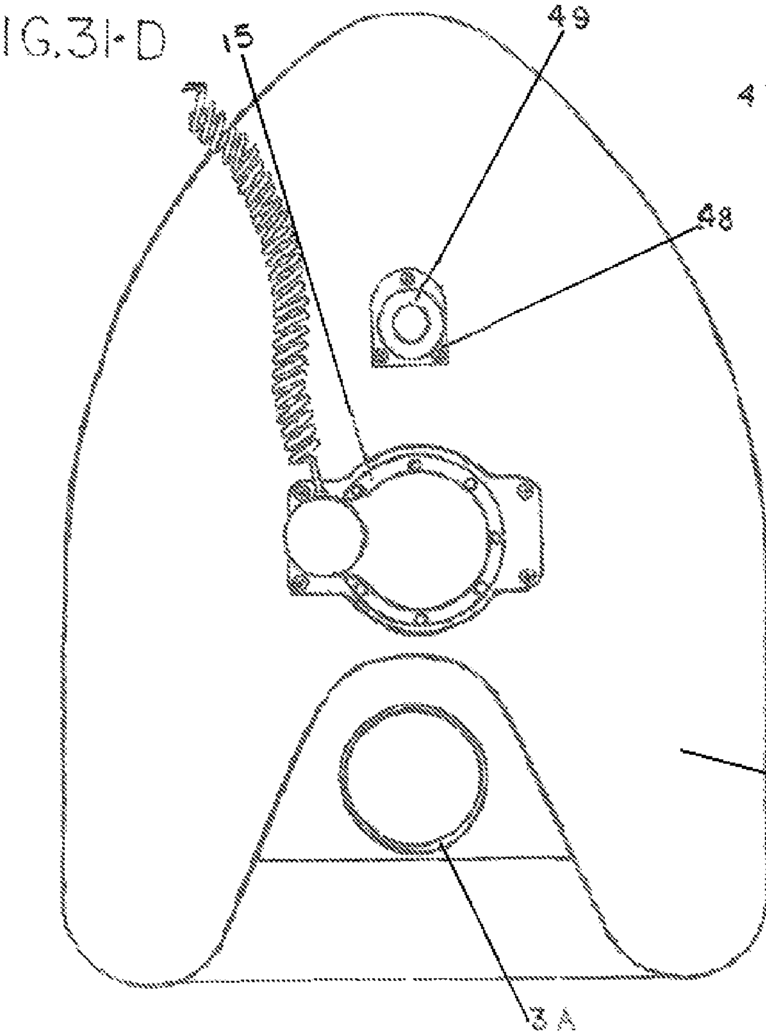
FIG.31-E
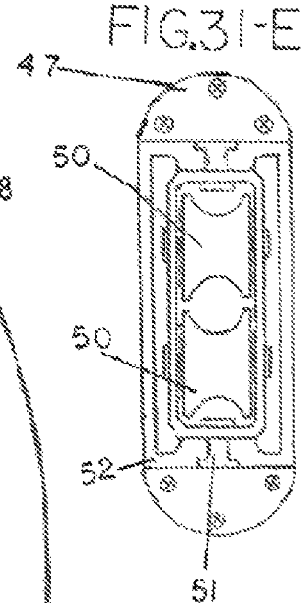
FIG.31-F
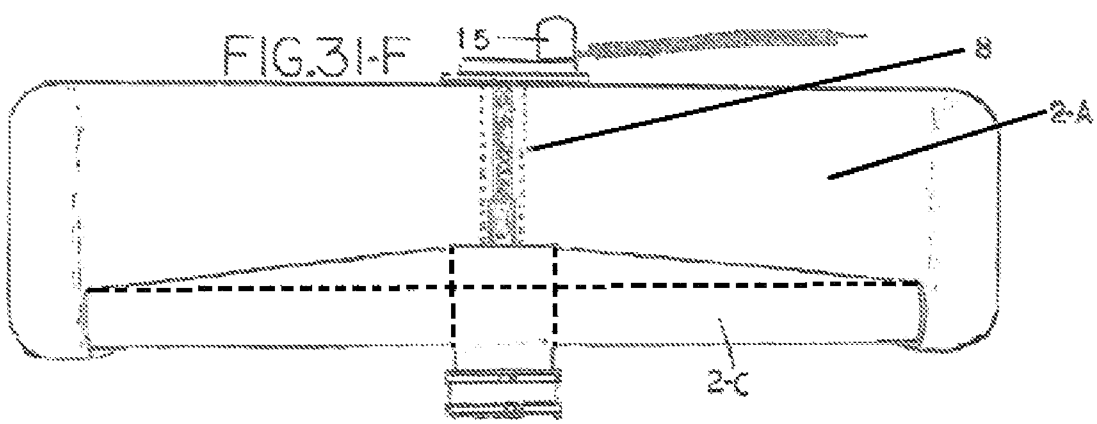

FIG. 33-A
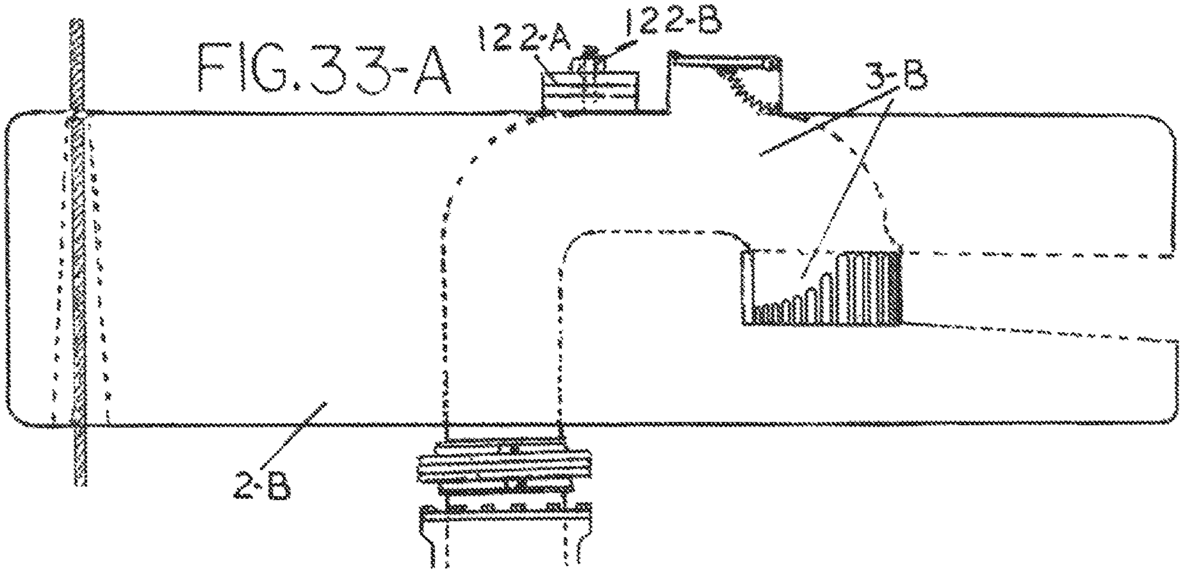
FIG. 33-B
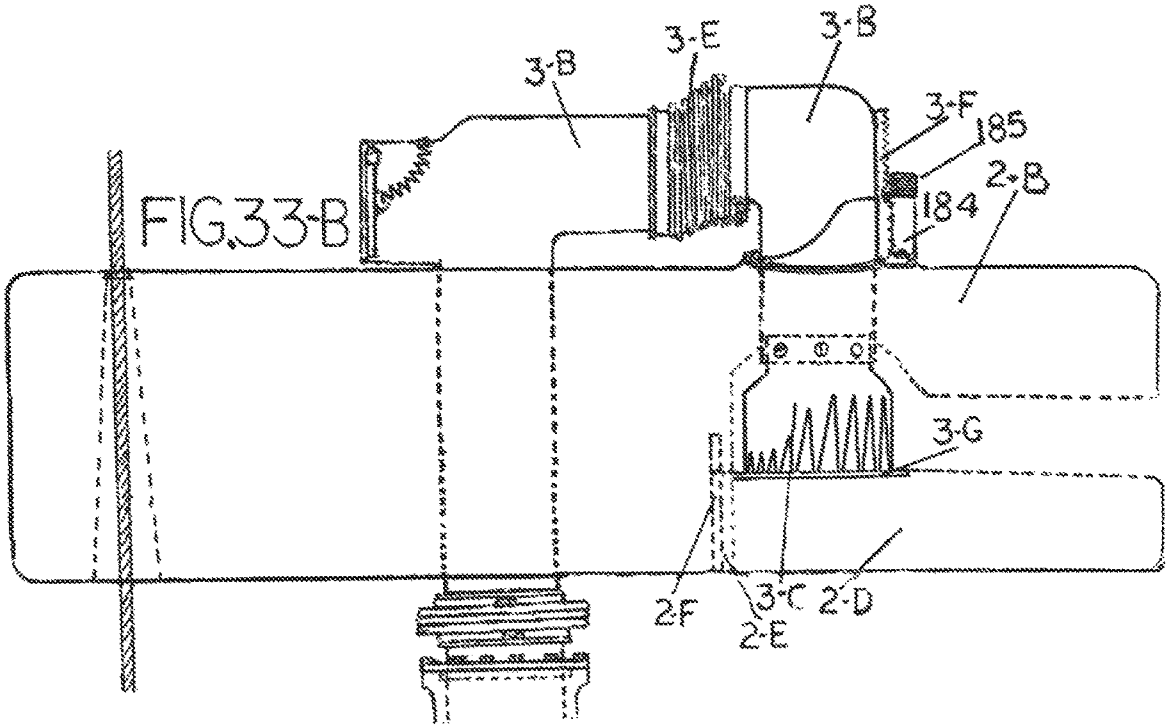

FIG. 33-C
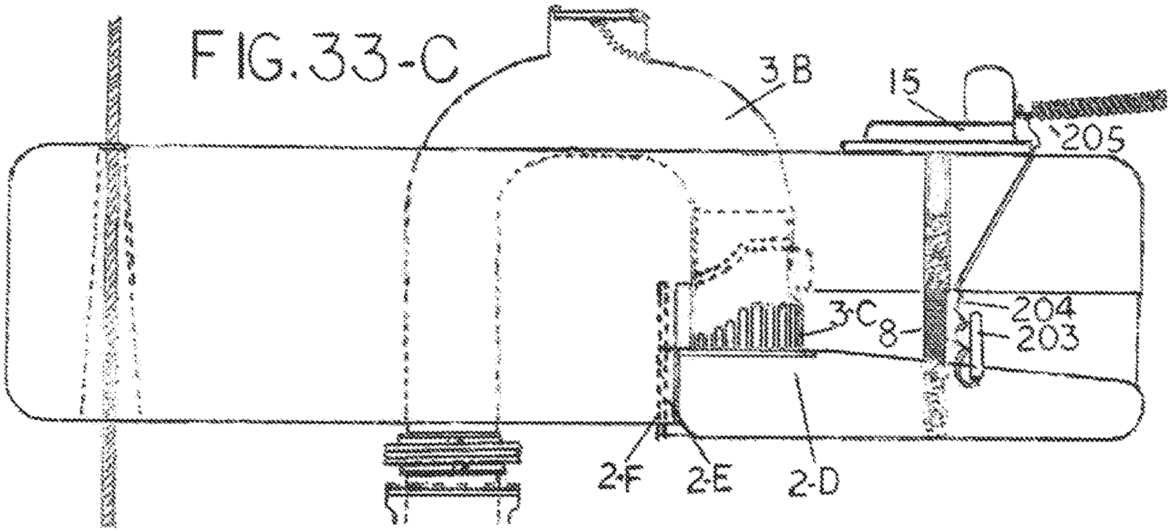
FIG. 33-D
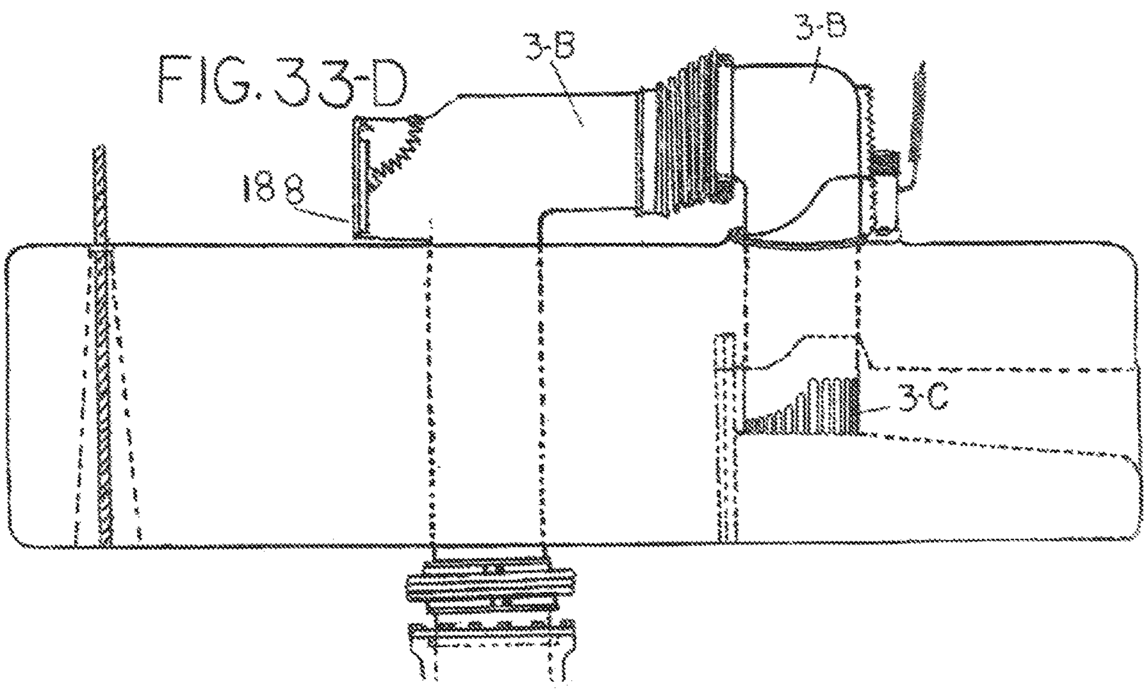

FIG.34-A
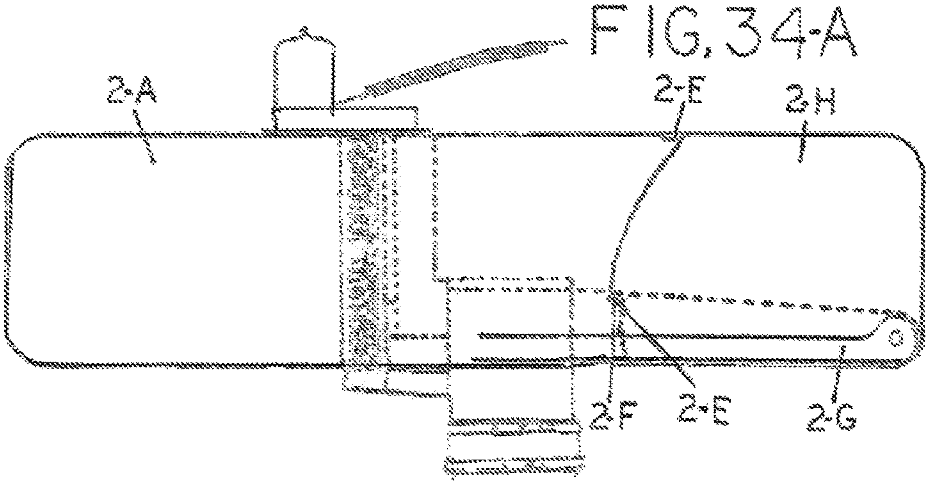
FIG.34-B
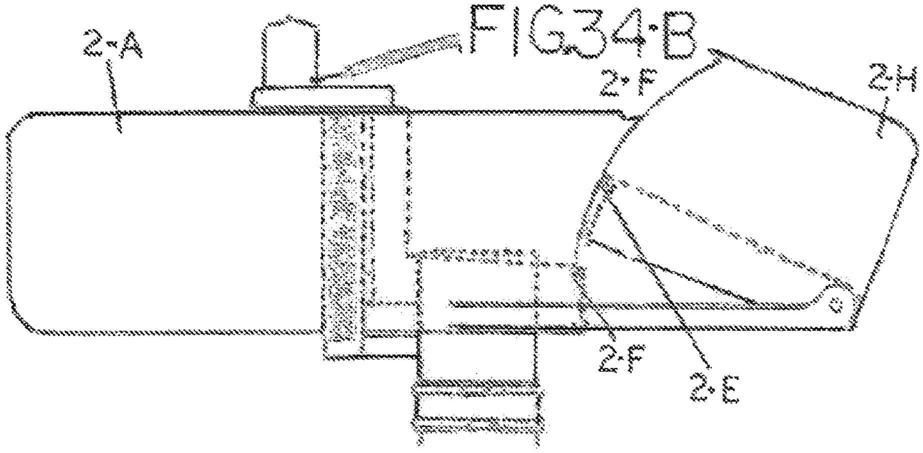
FIG.34-C
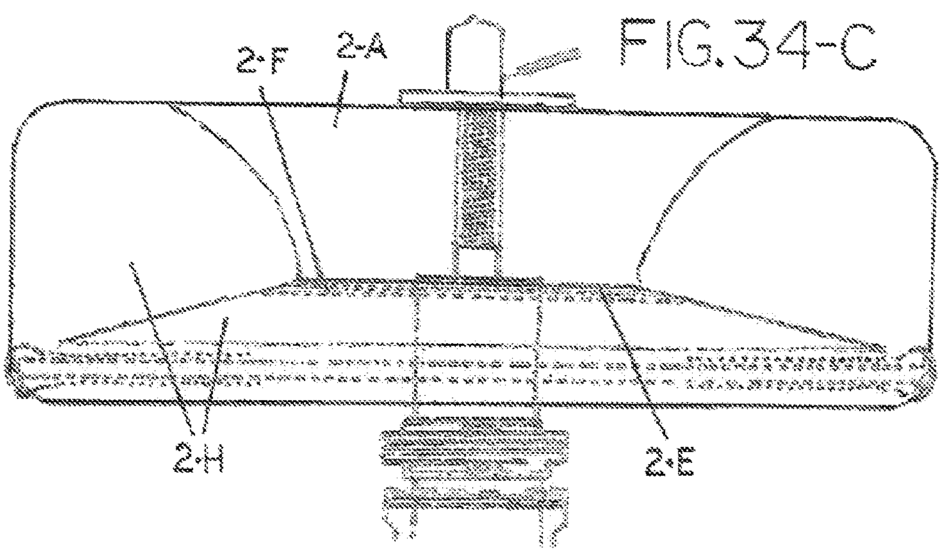

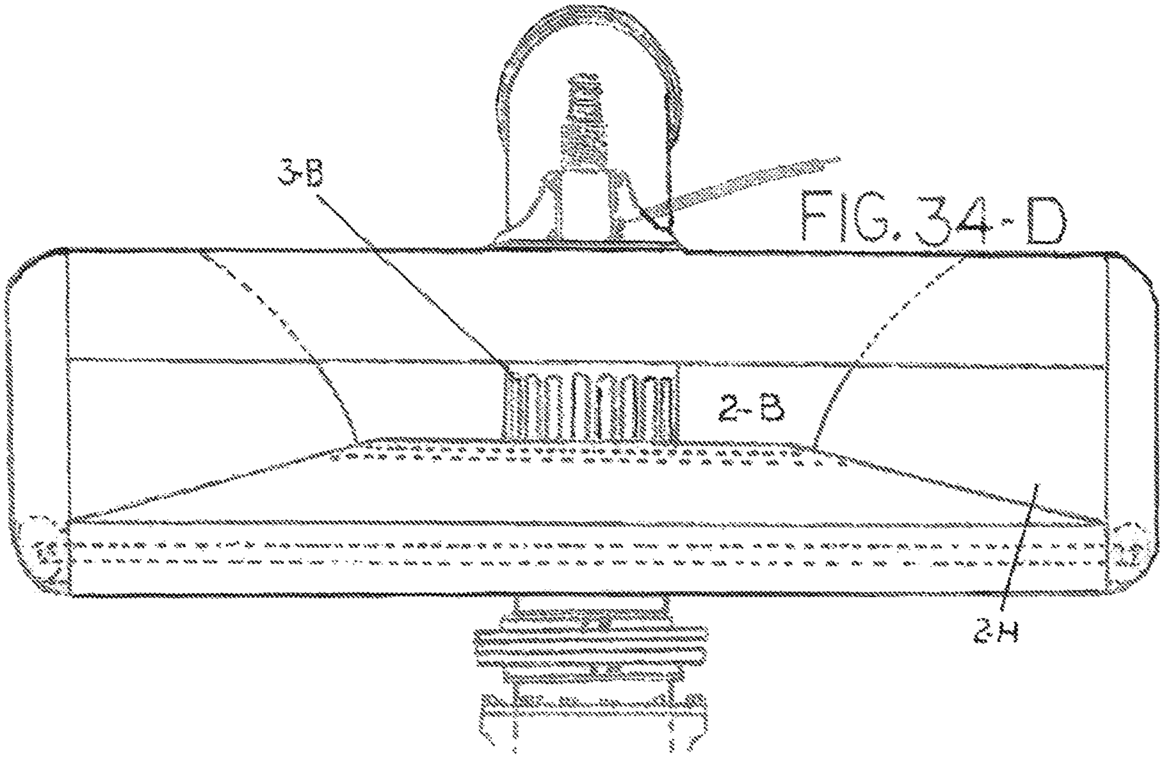
FIG. 34-D
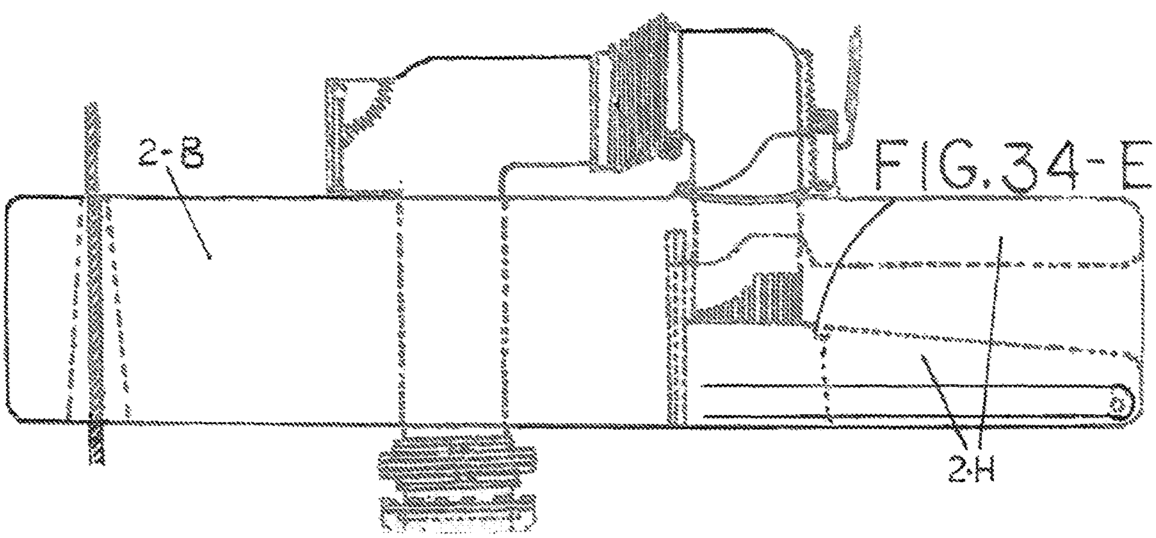
FIG. 34-E

FIG. 34-F
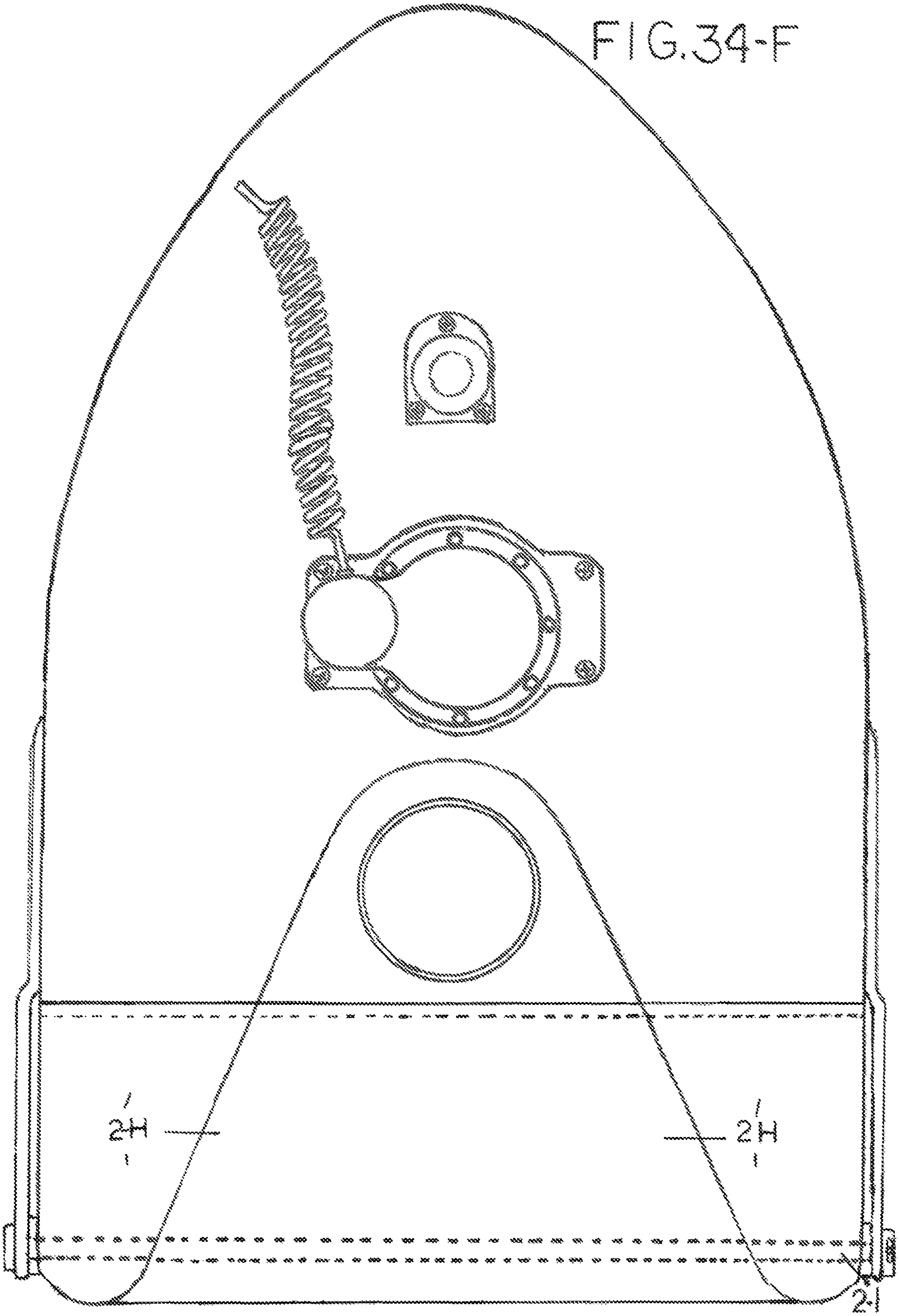

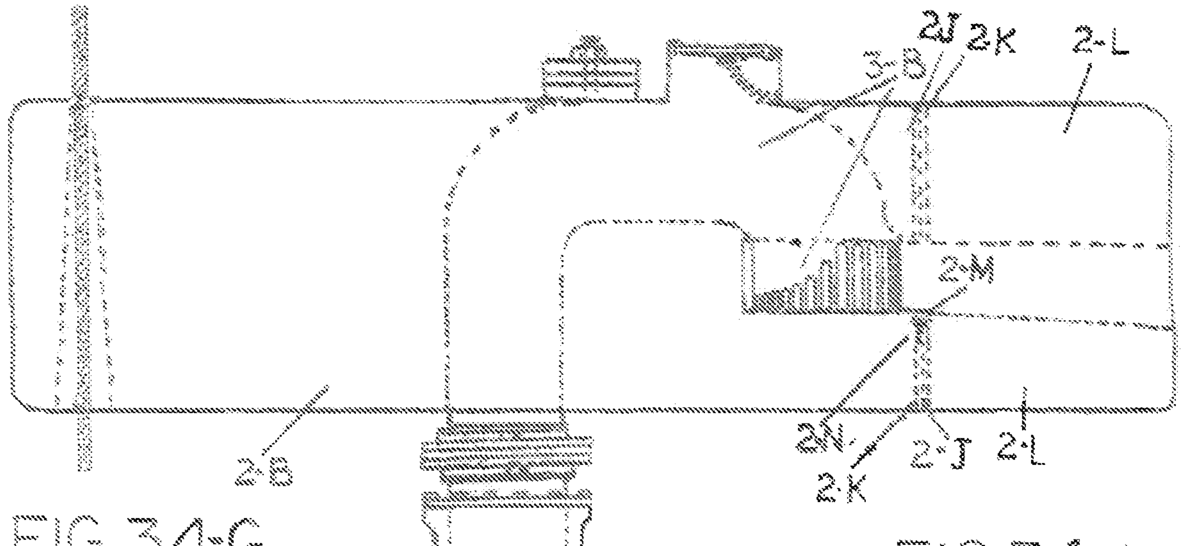
FIG. 34-G
FIG. 34-J
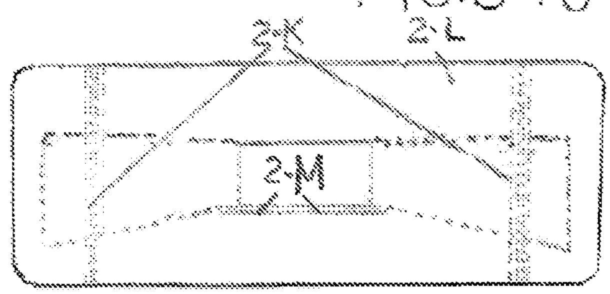
FIG. 34-H
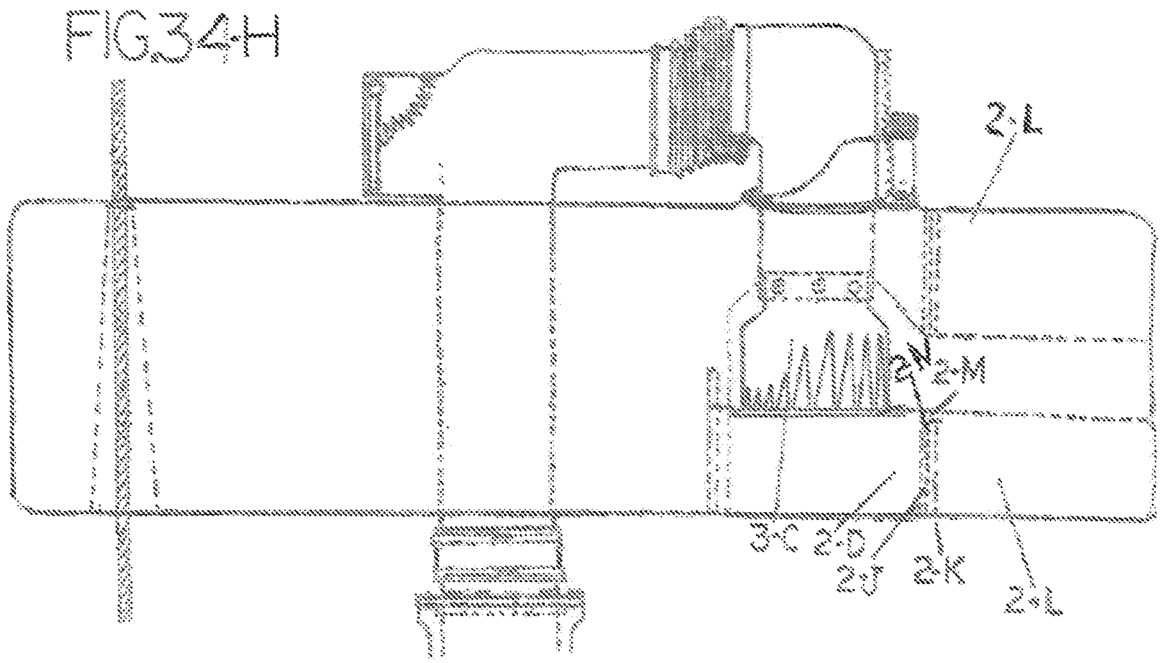

FIG. 34-I
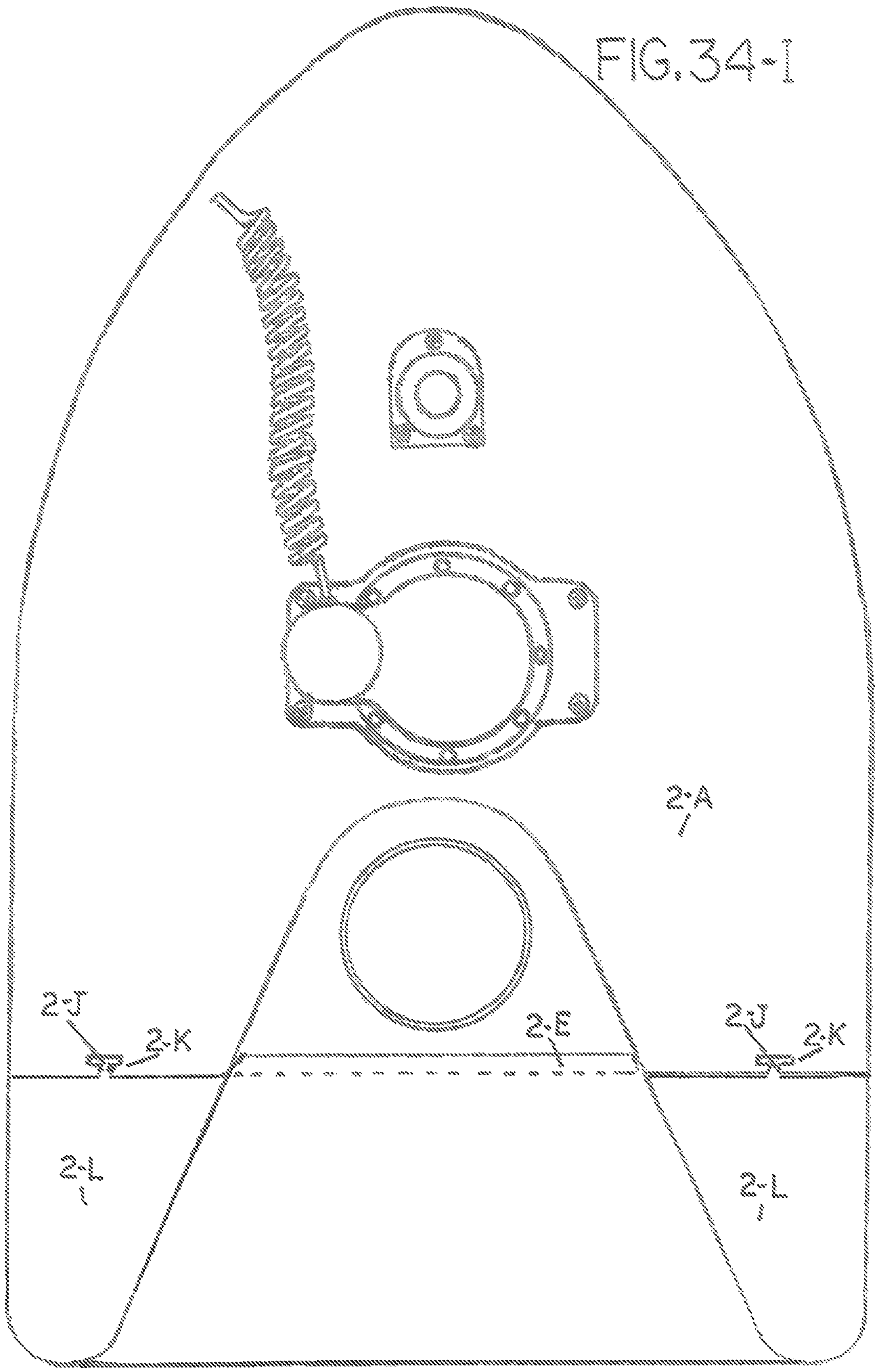

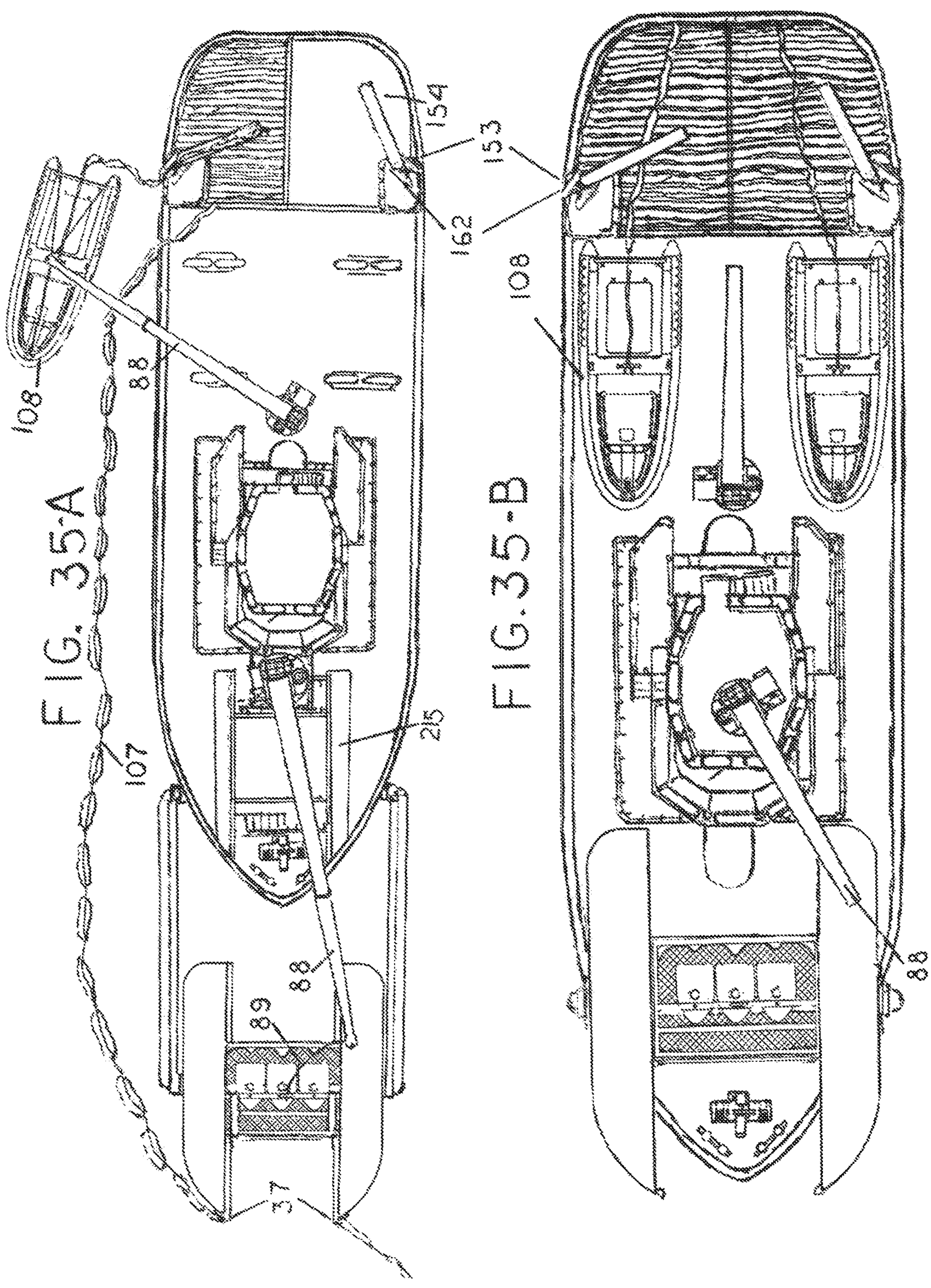
FIG. 35-A
FIG. 35-B

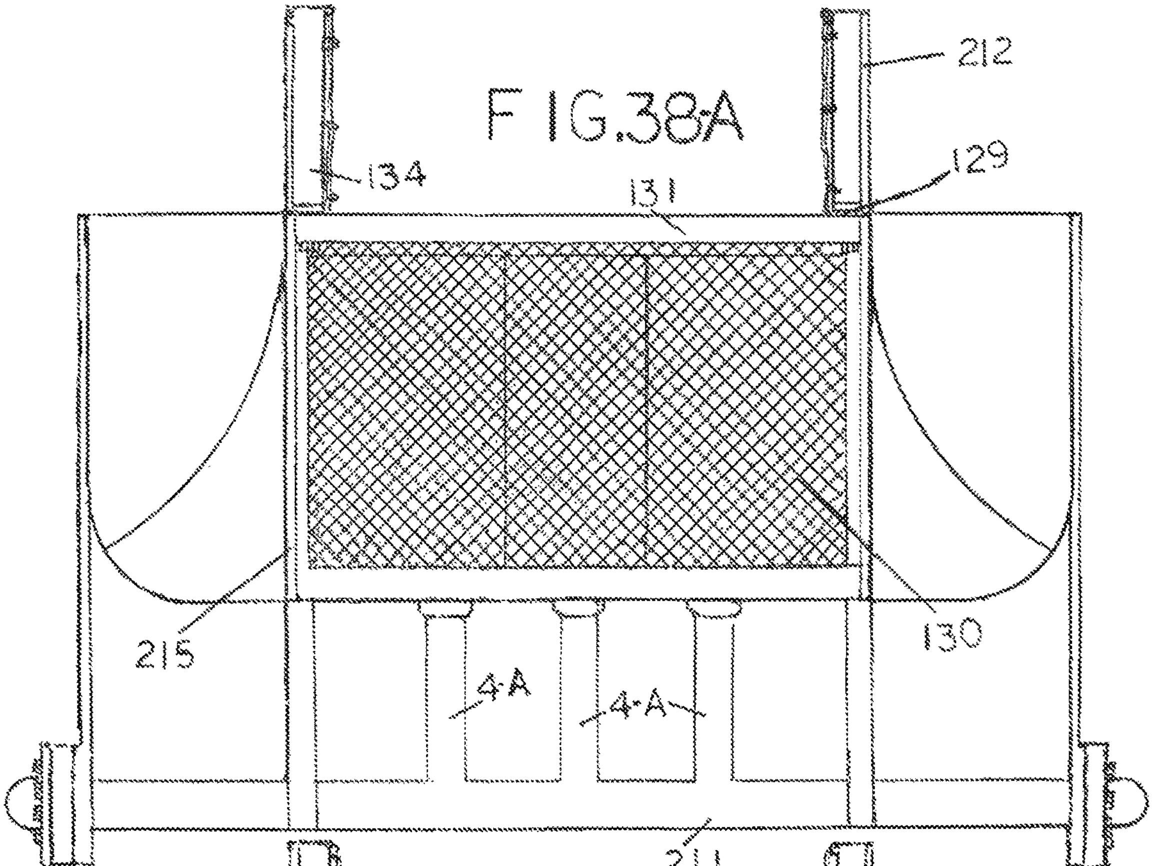
FIG.38-A
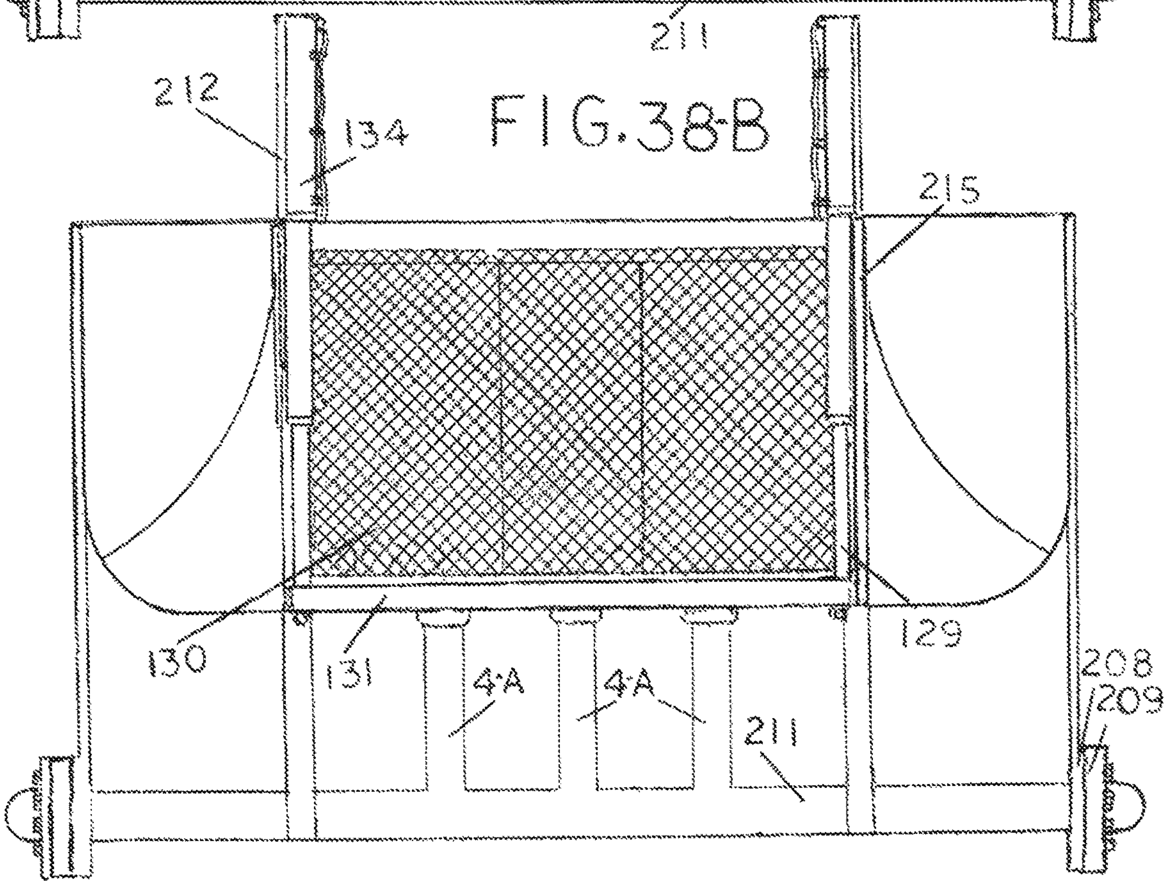
FIG.38-B

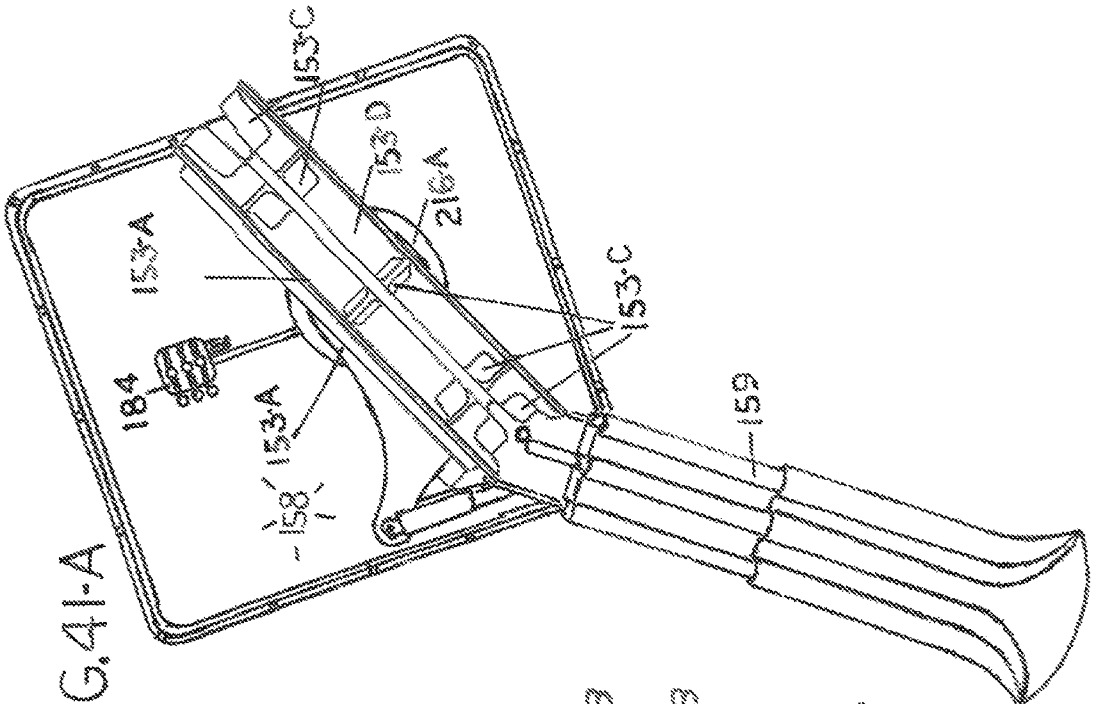
FIG. 41-A
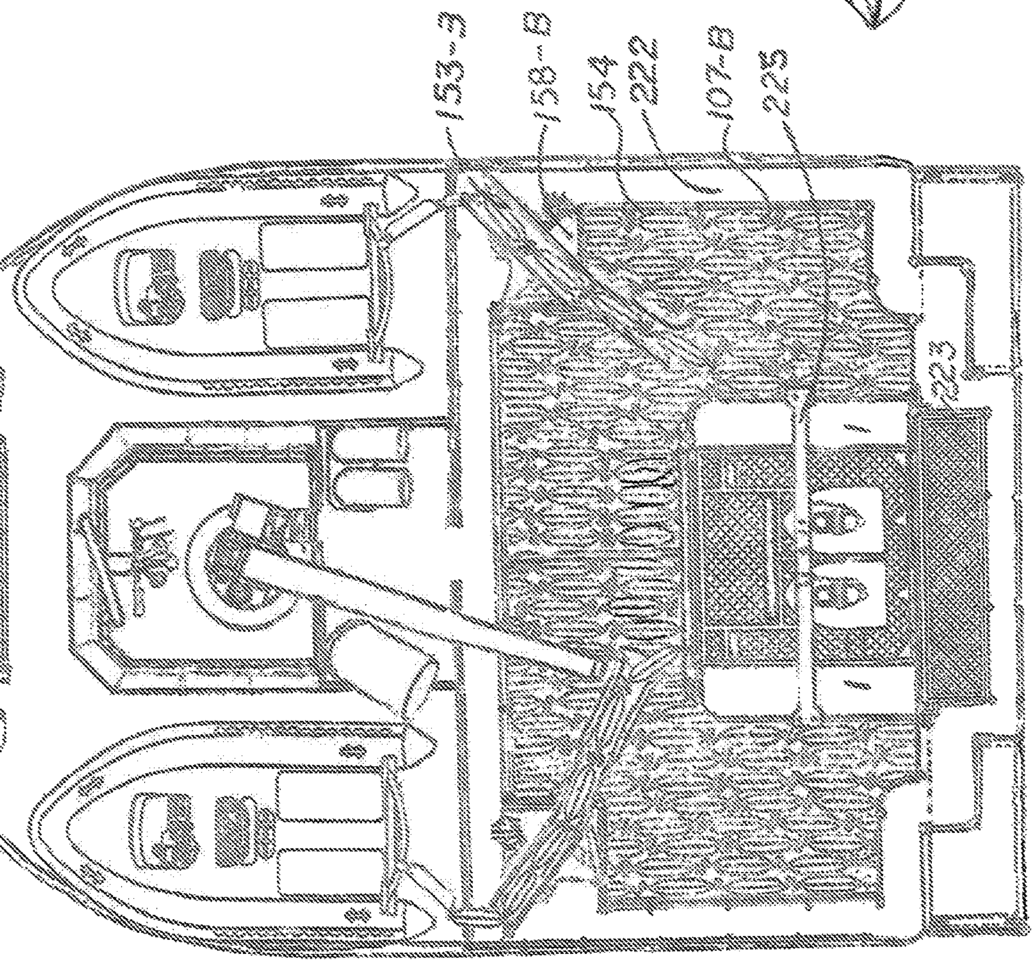
FIG. 40

FIG. 41-E
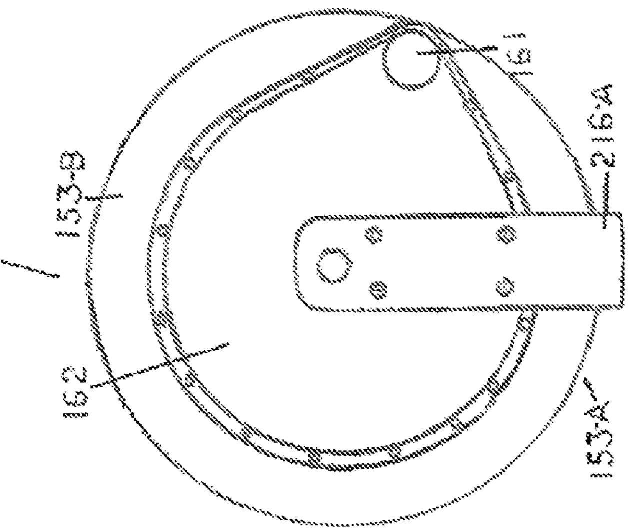
FIG. 41-D
FIG. 41-C
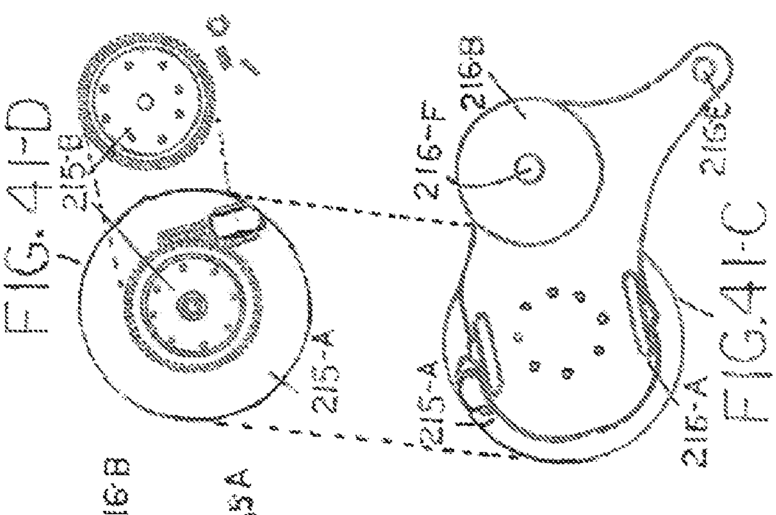
FIG. 41-B
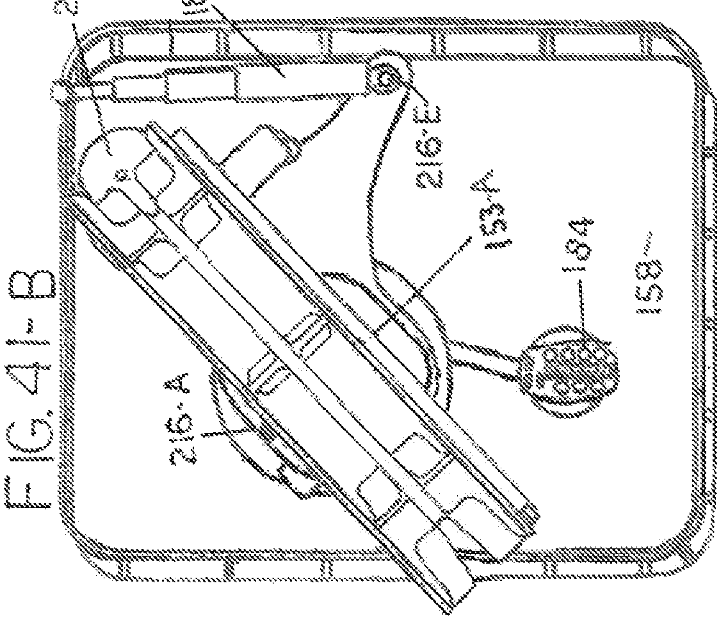

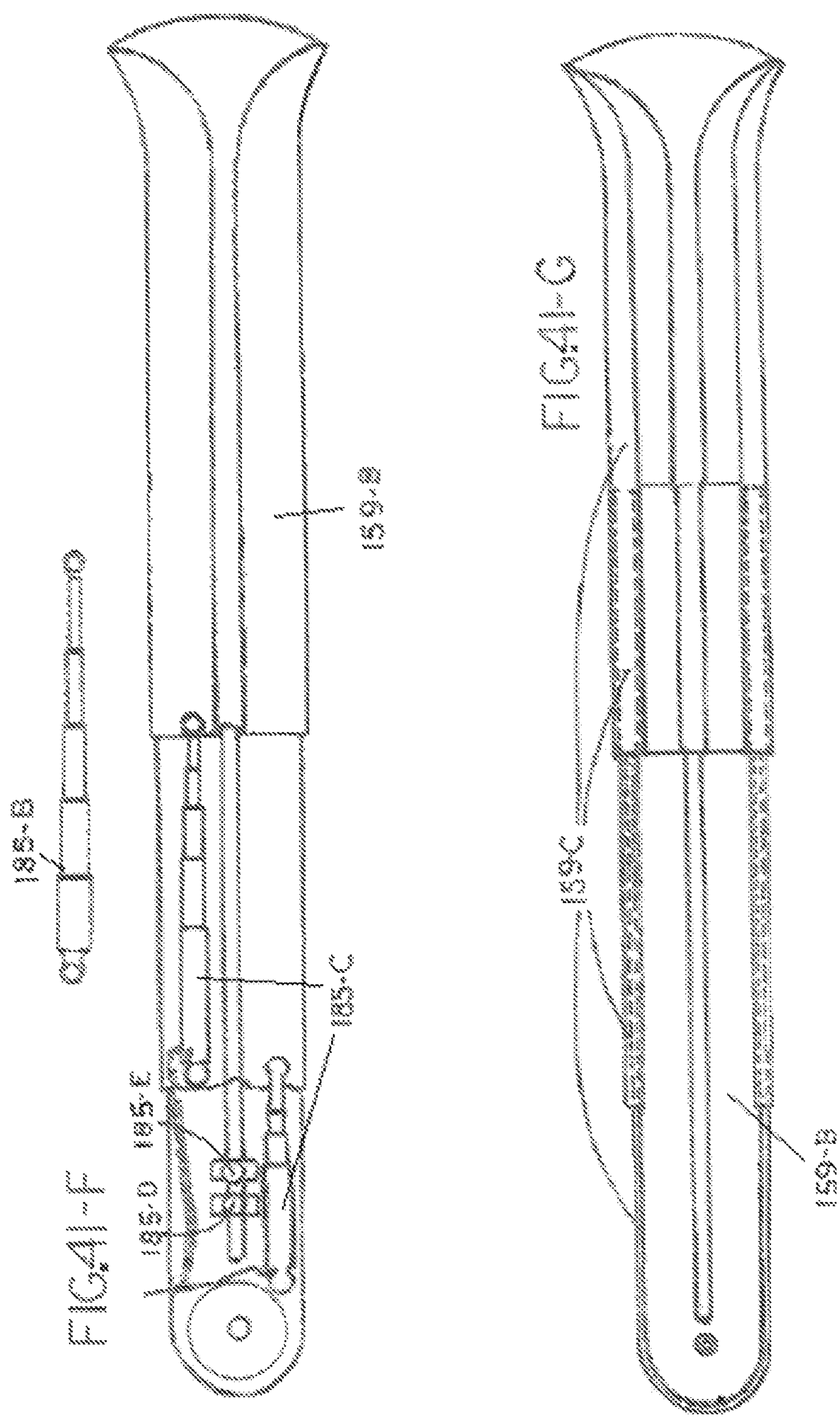
FIG.41-F
FIG.41-G
159-B
185-B
185-C
185-D
185-E
159-C

FIG.43-A
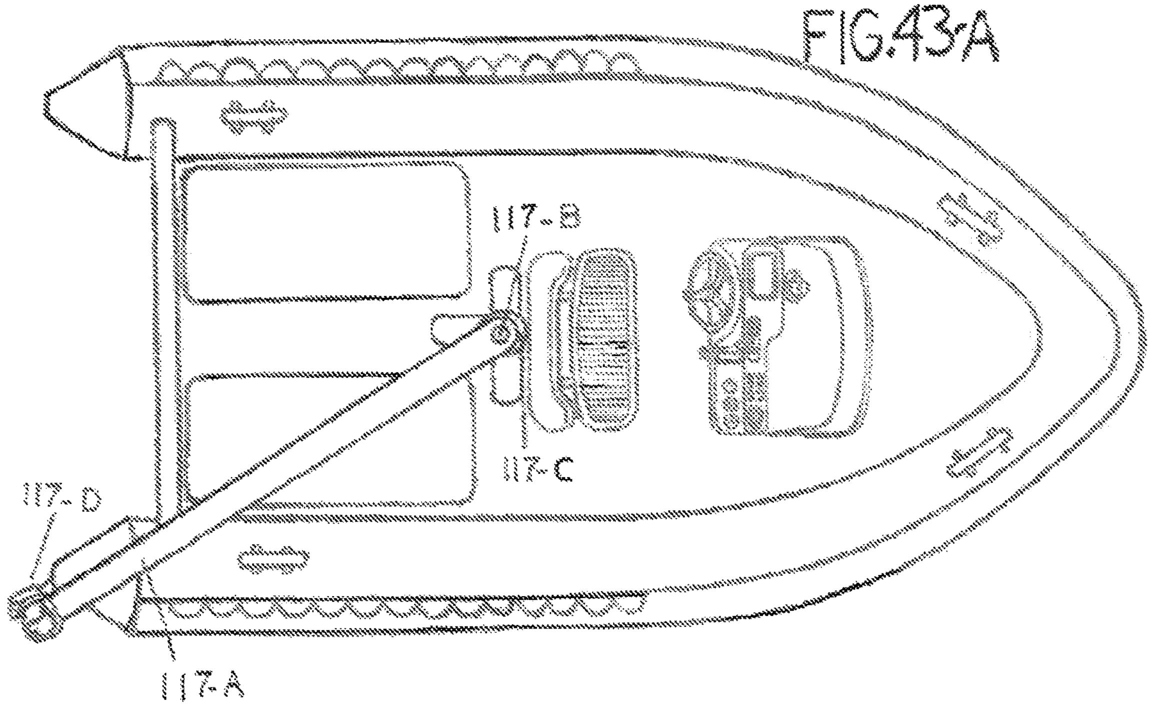
FIG.43-B
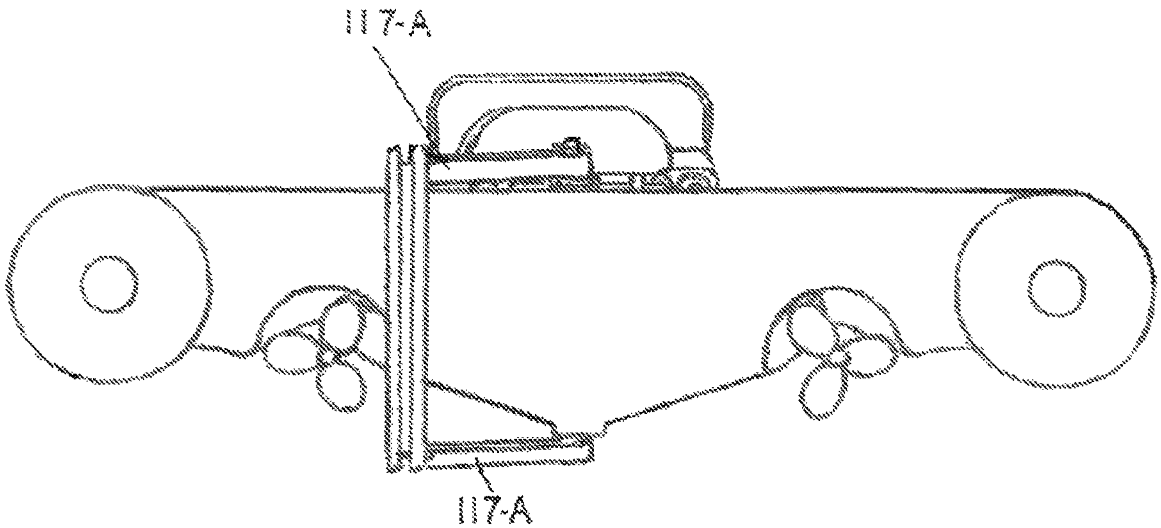

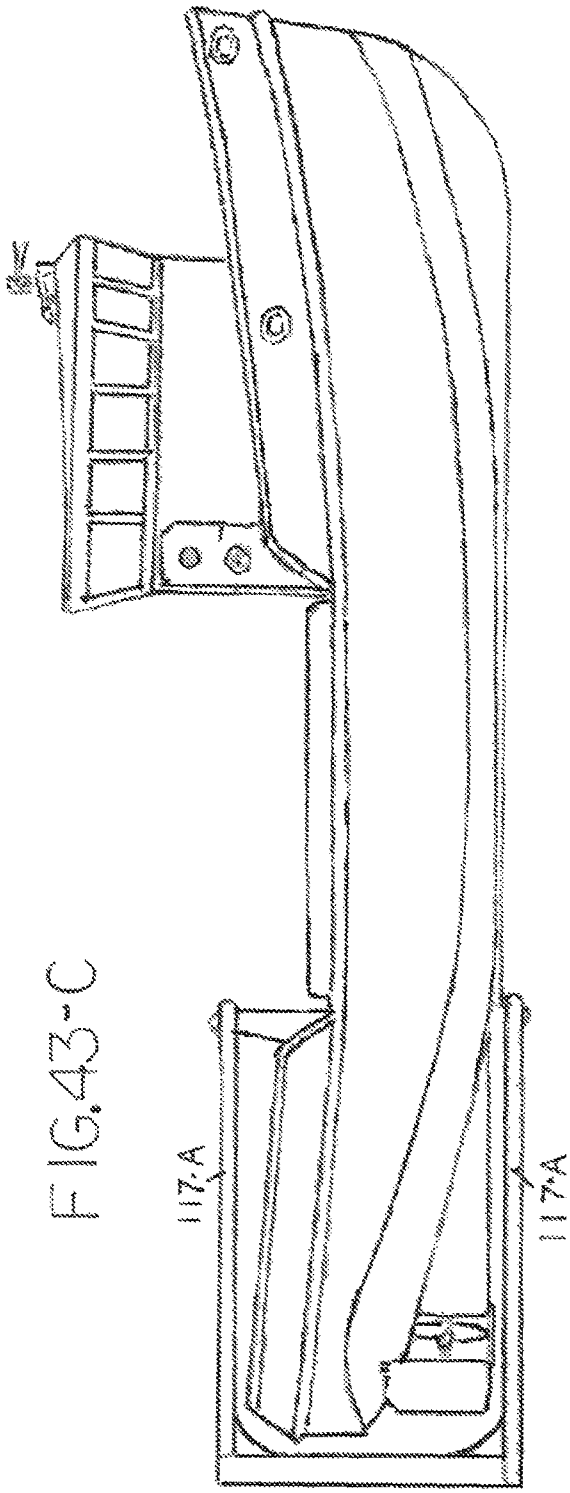
FIG. 43-C
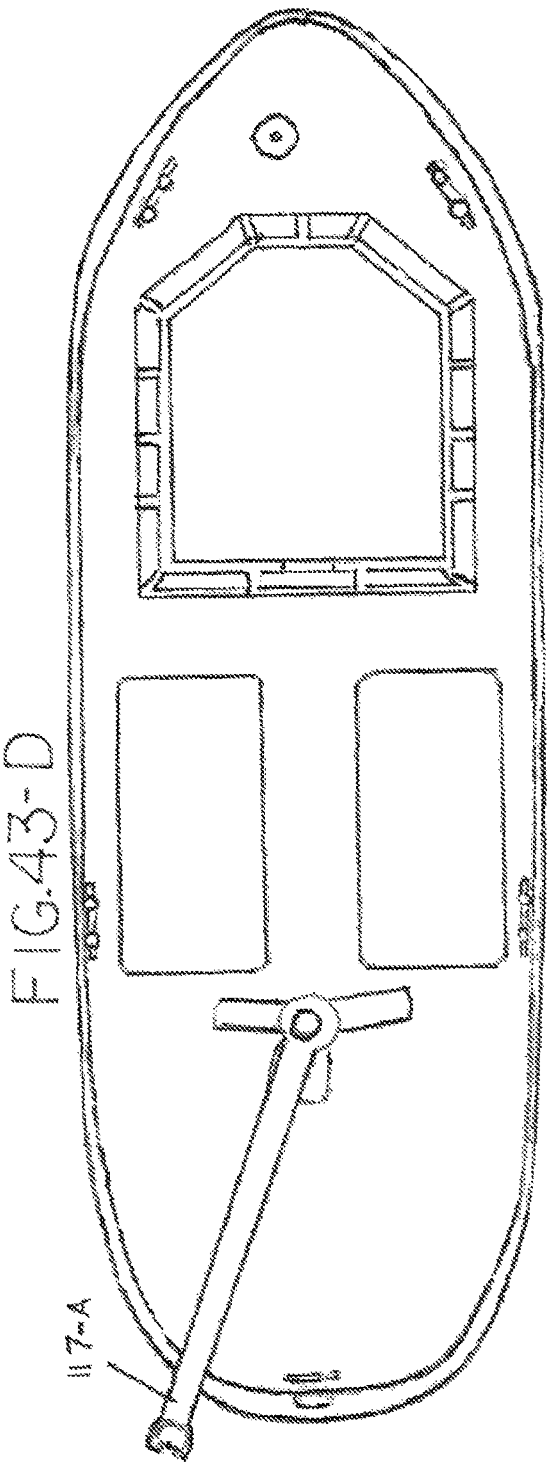
FIG. 43-D

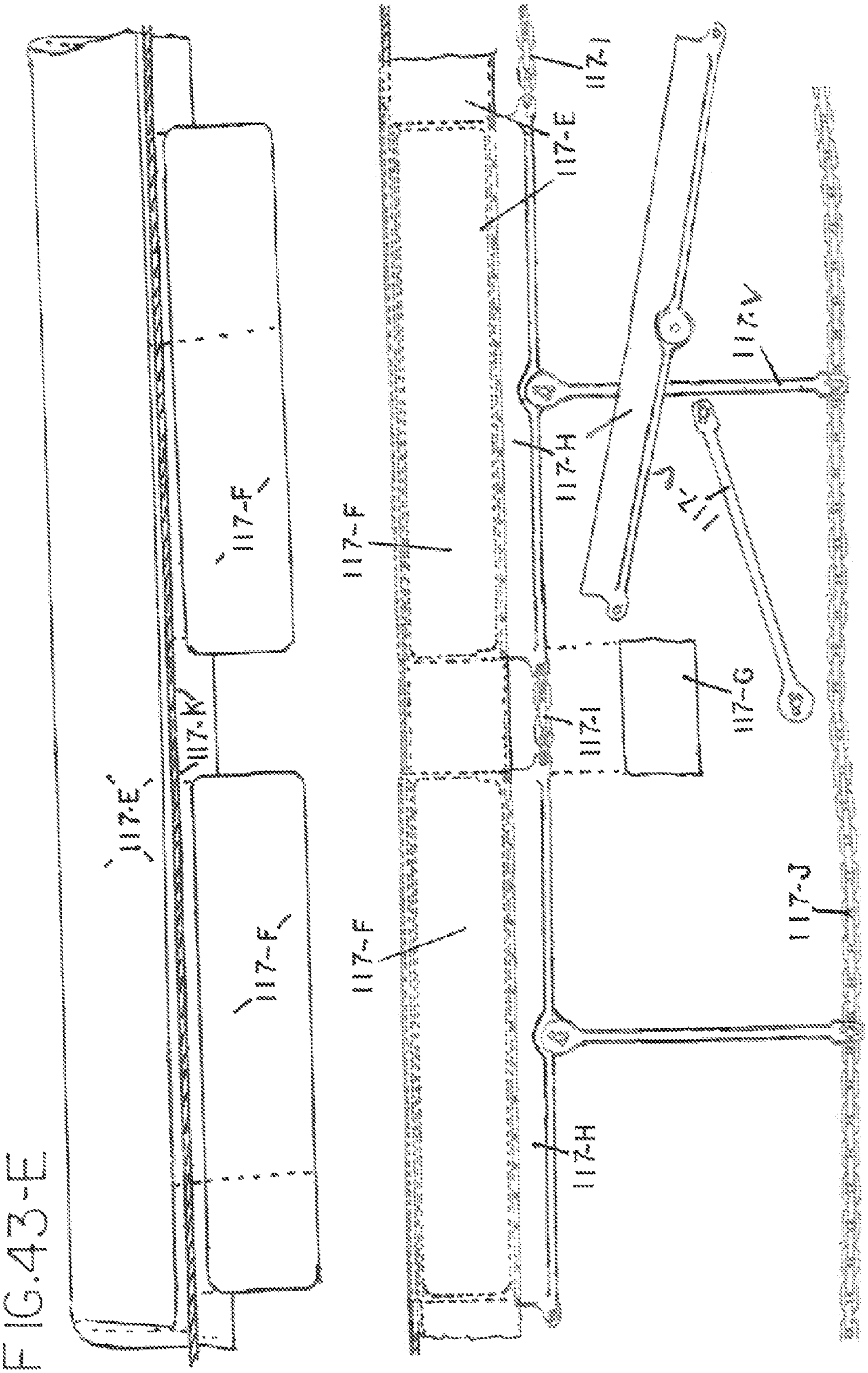
FIG. 43-E

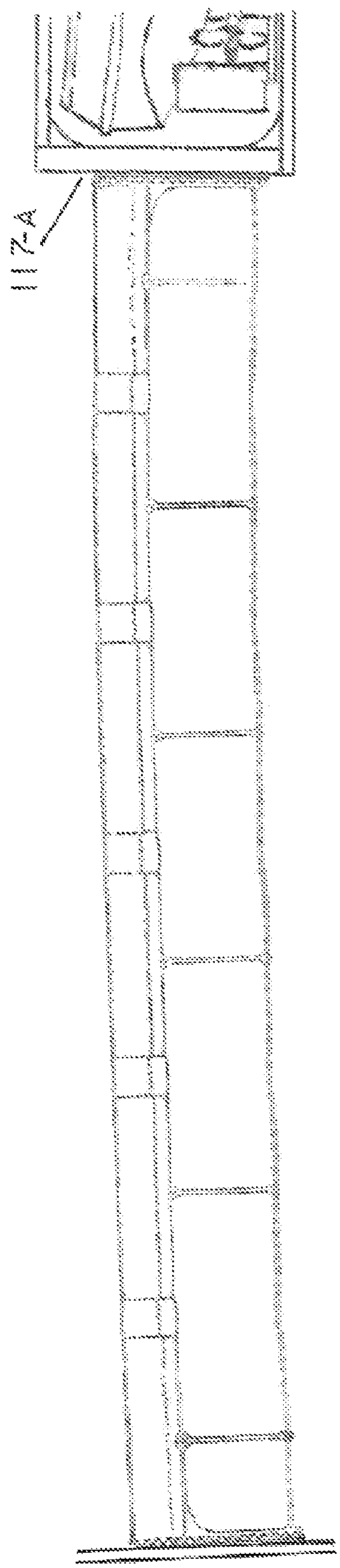
FIG.43-F

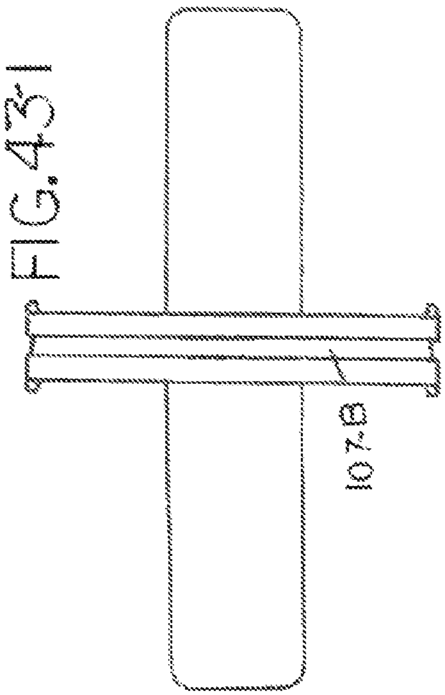
FIG. 43-I
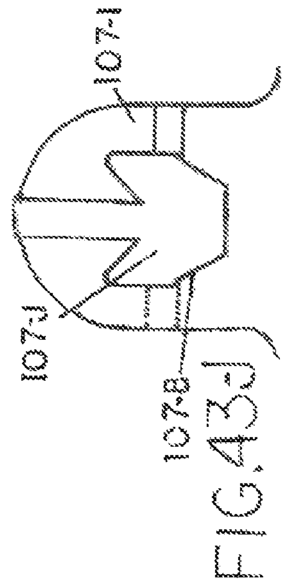
FIG. 43-J
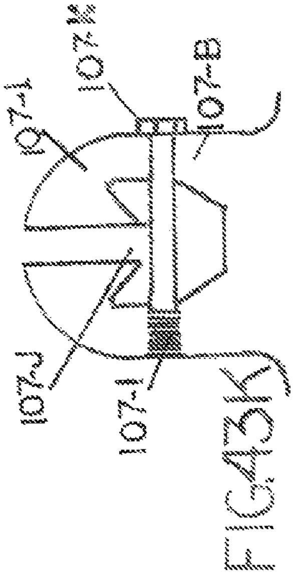
FIG. 43K
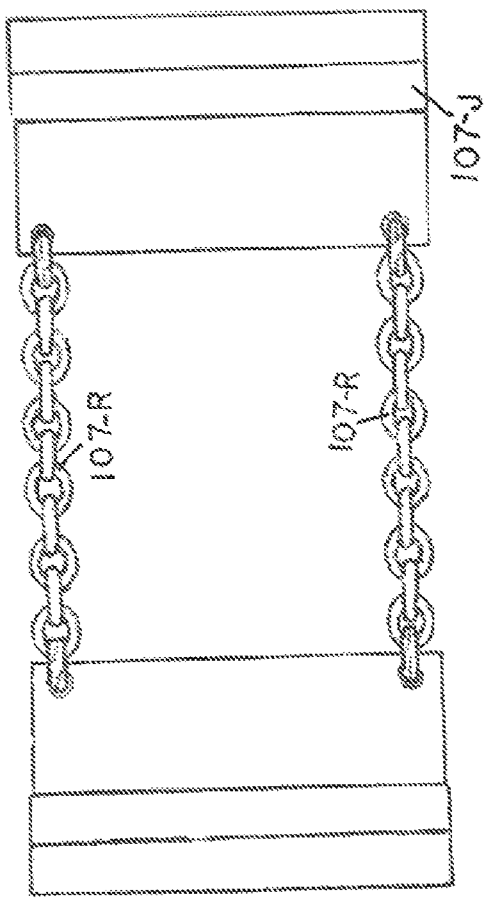
FIG. 43-G
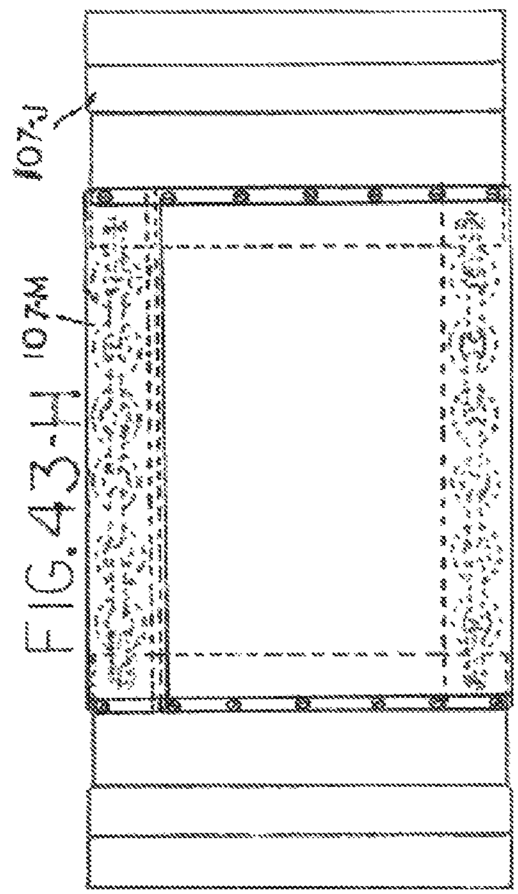
FIG. 43-H FIG. 43-L
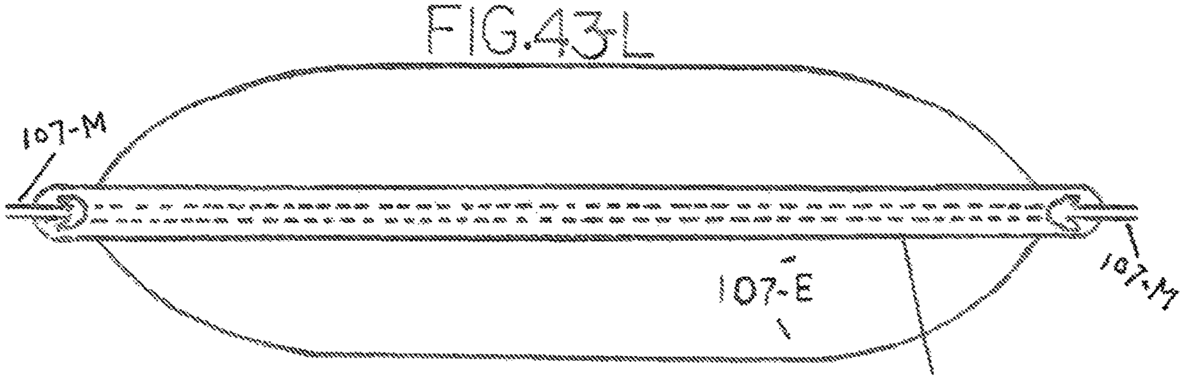
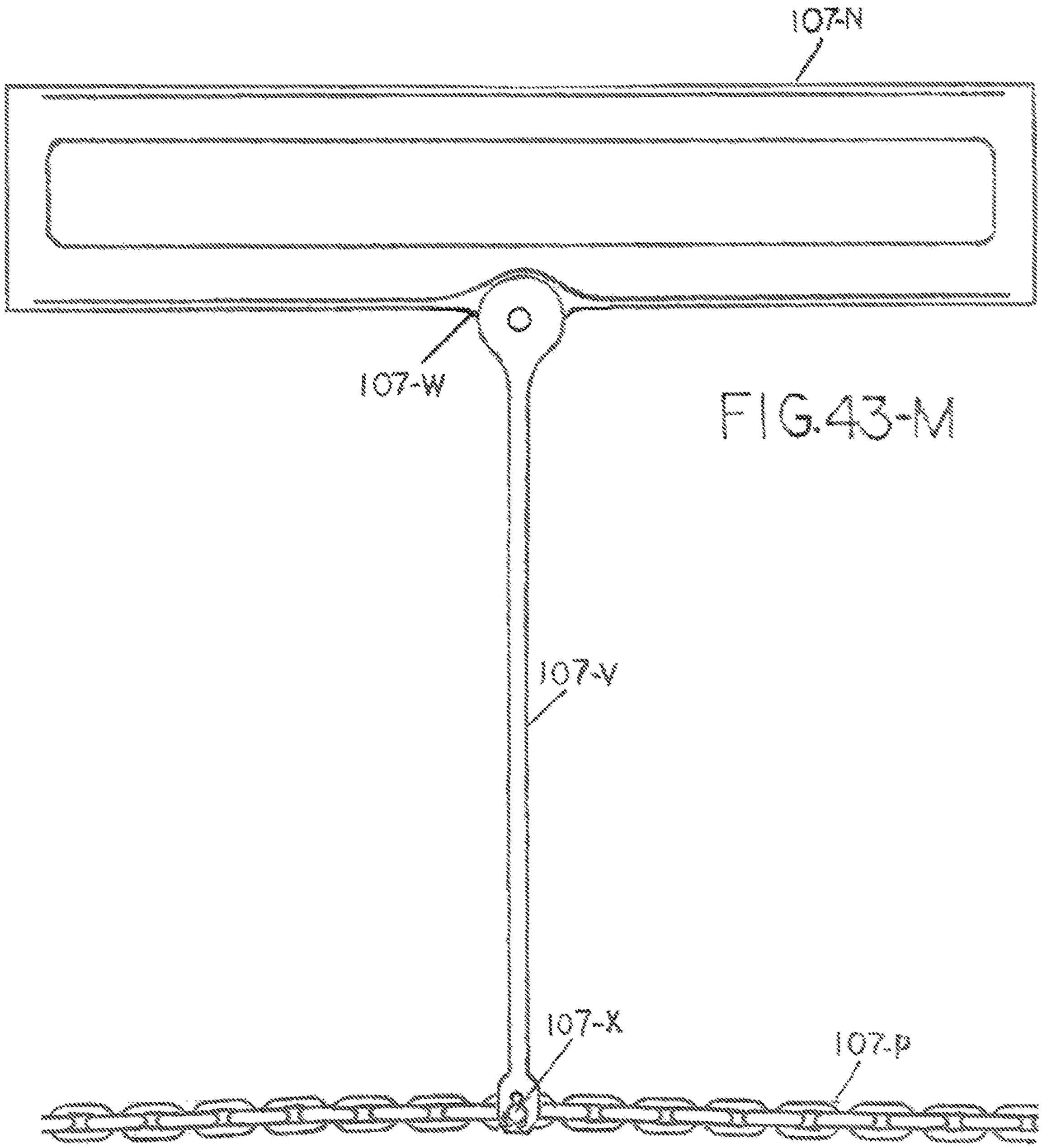
FIG. 43-M

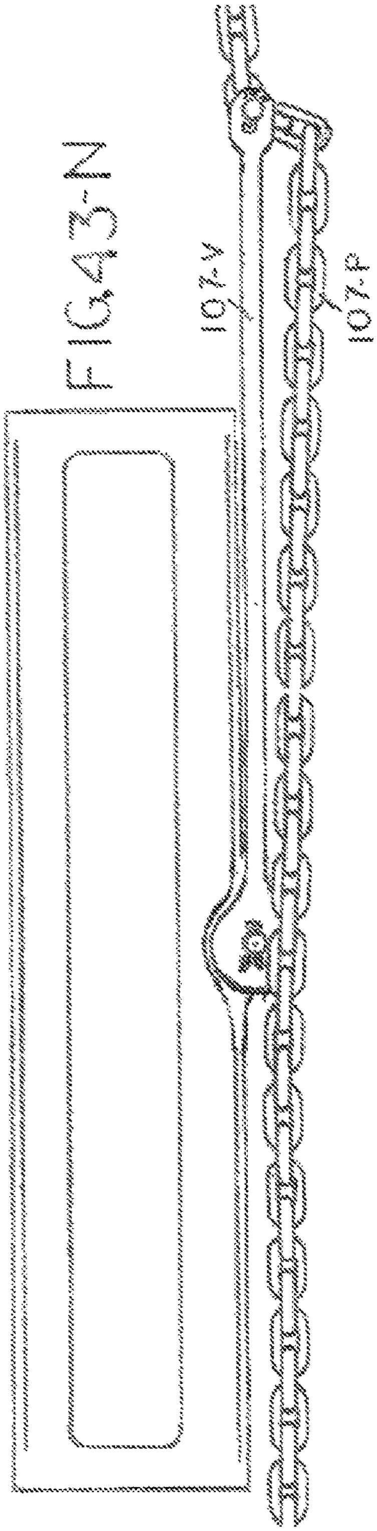
FIG. 43-N
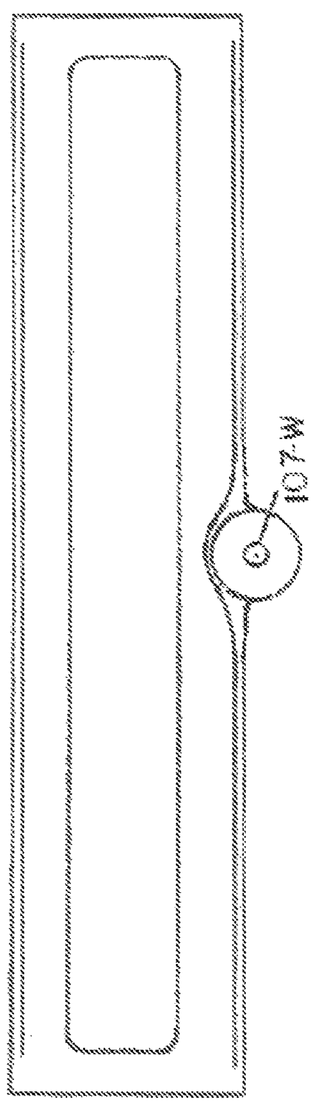
FIG. 43-O
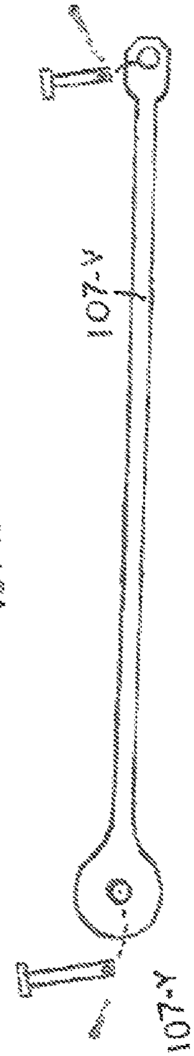
FIG. 43-P
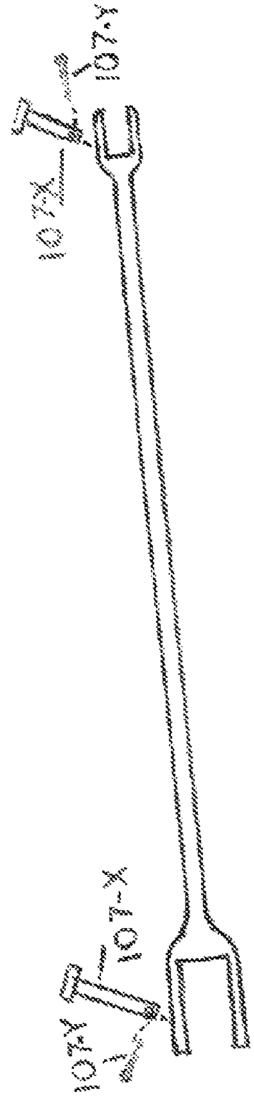
FIG. 43-Q

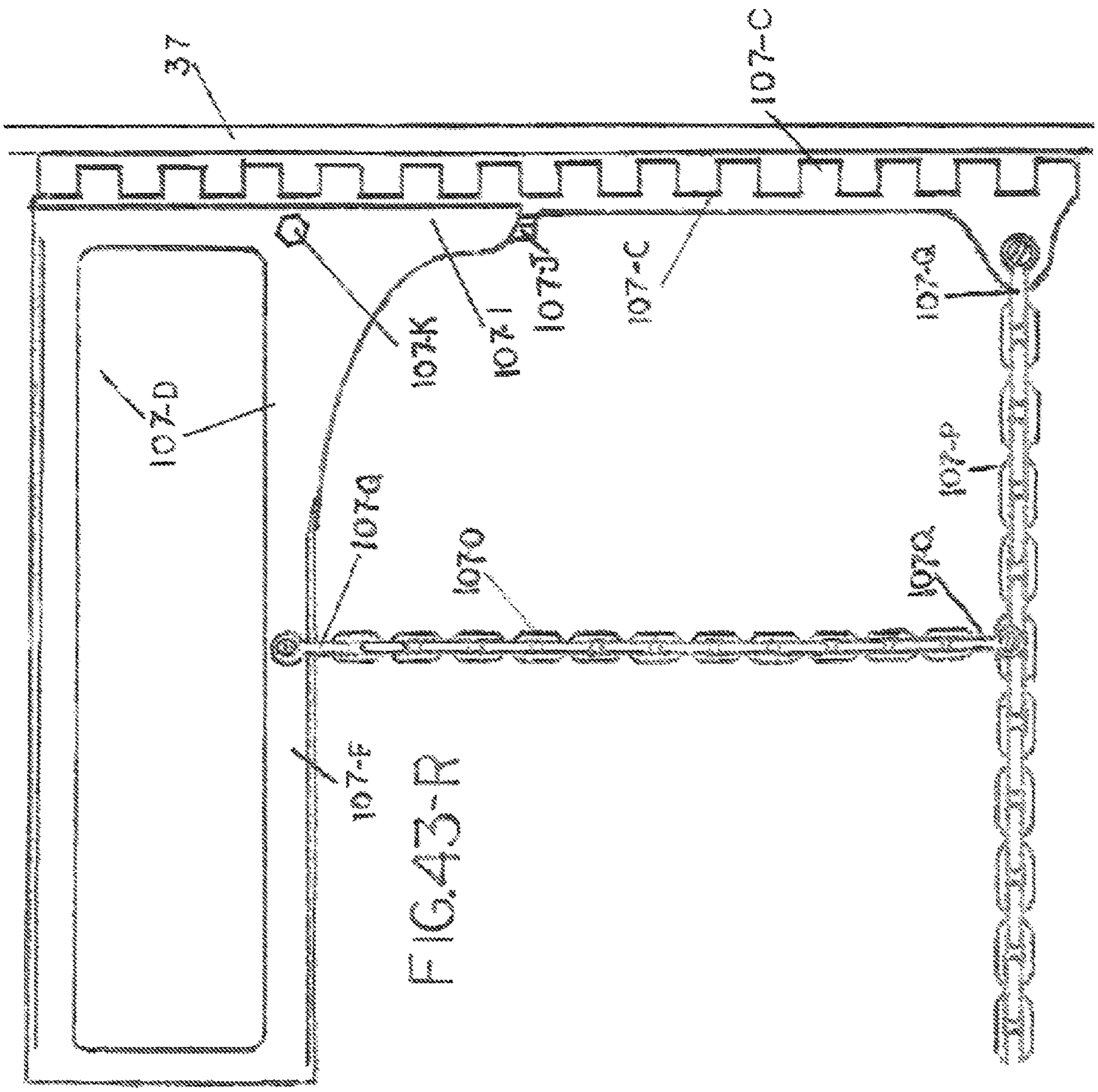
FIG. 43-R

FIG. 43-S
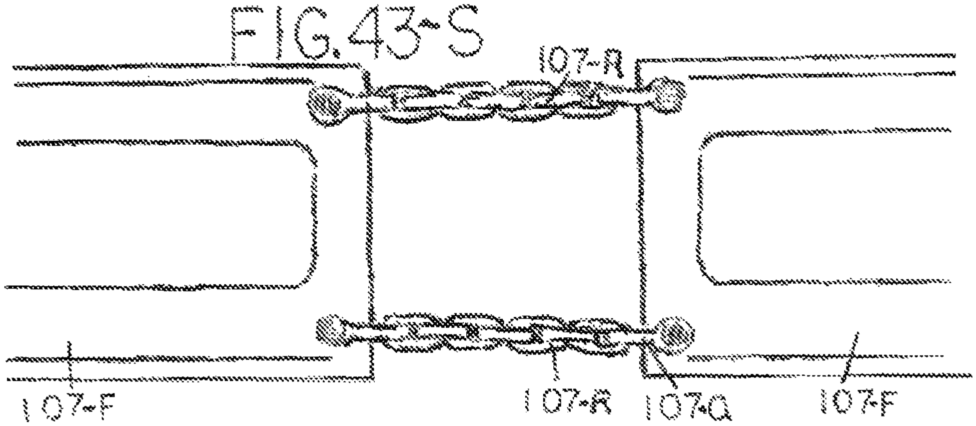
FIG. 43-T
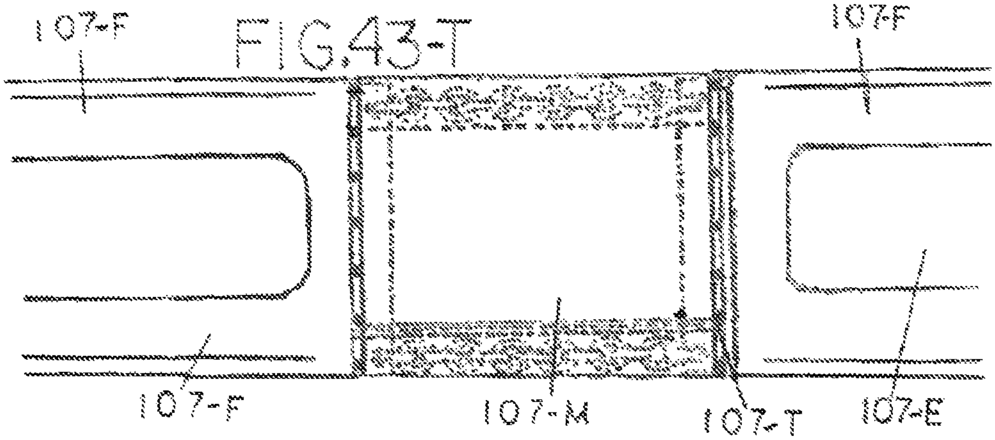
FIG. 43-U
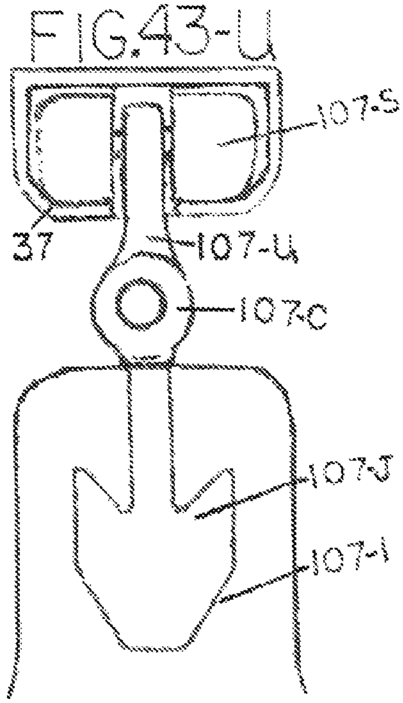
FIG. 43-V
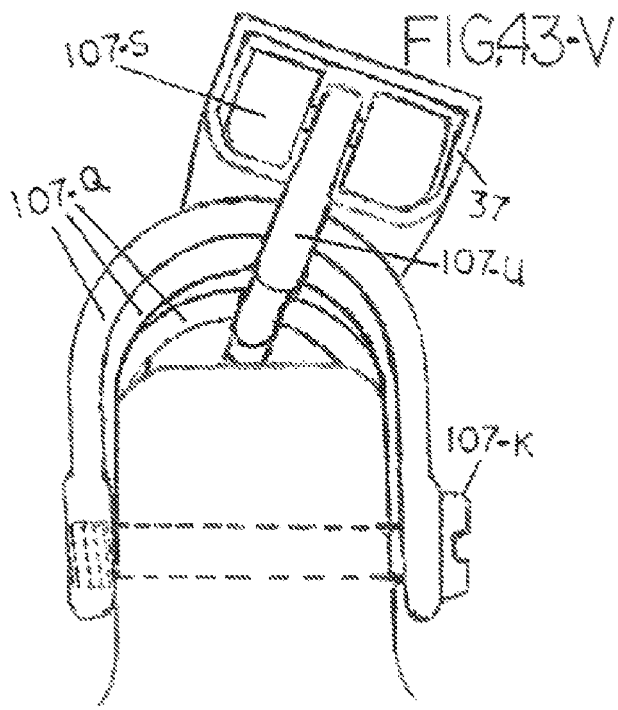

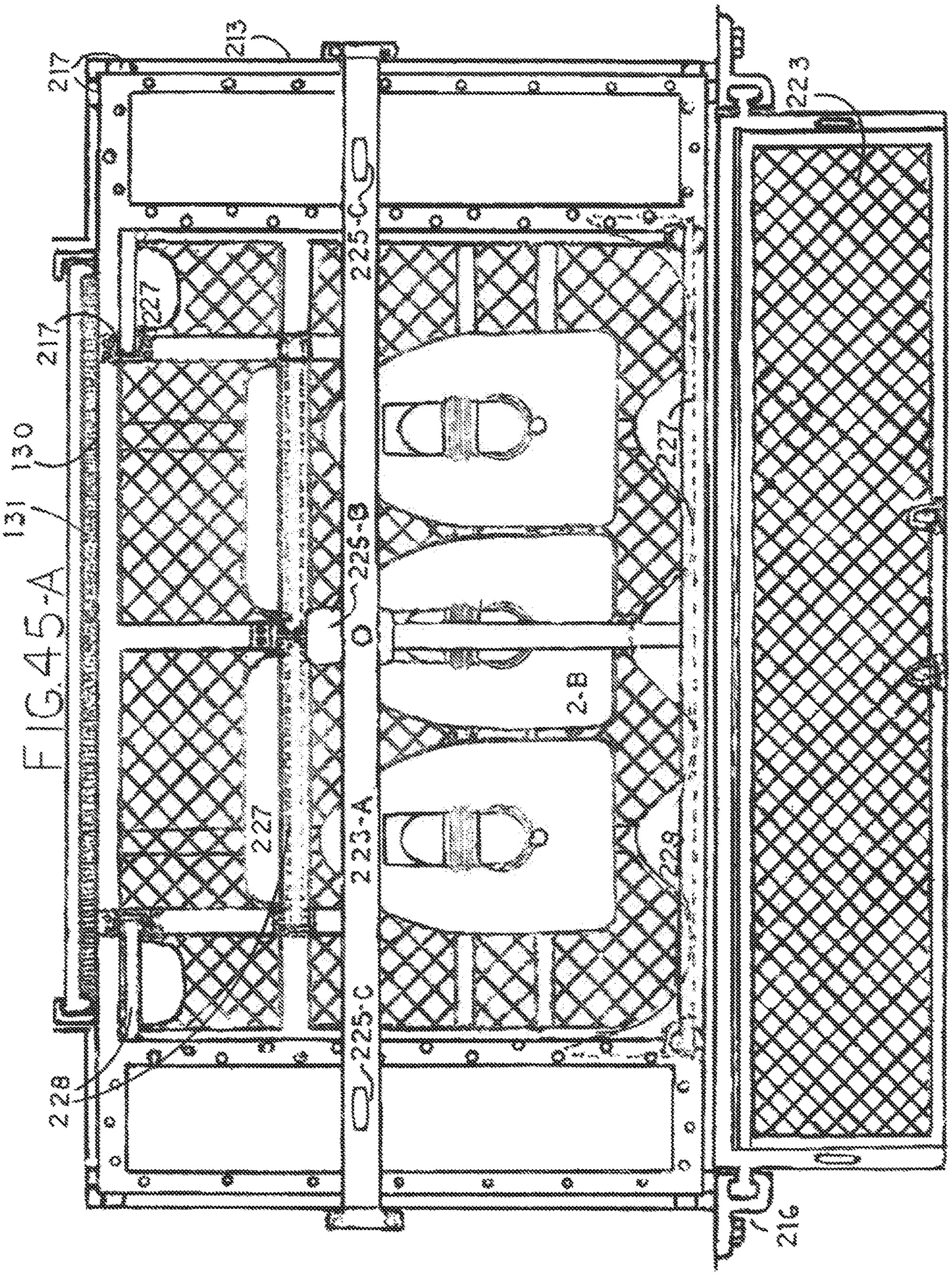
FIG. 45-A

FIG. 45-B
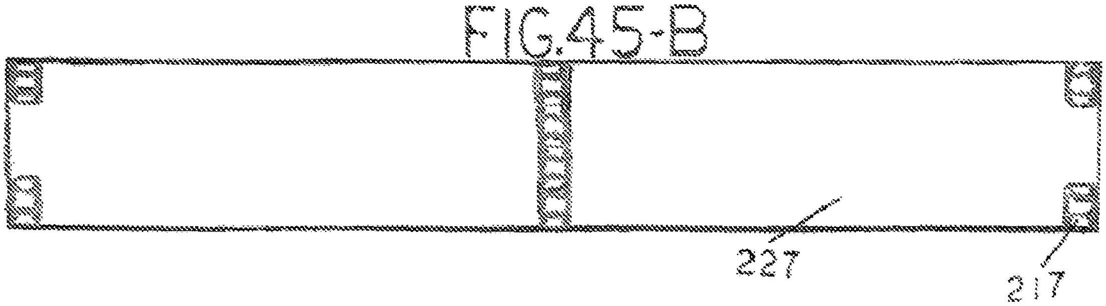
FIG. 45-C
FIG. 45-D
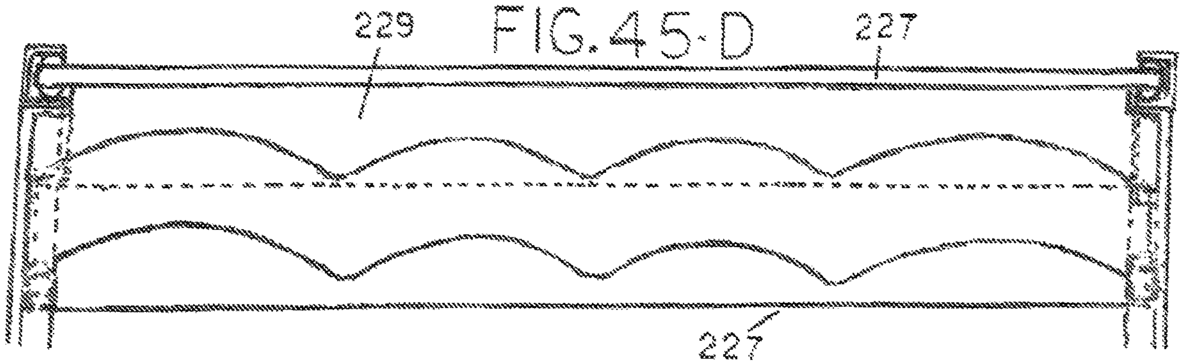
FIG. 45-E
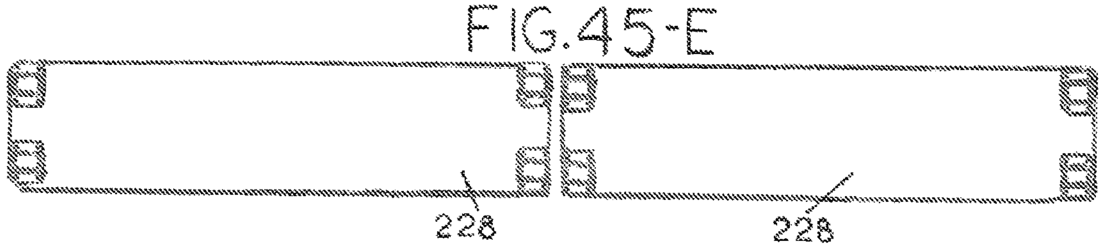

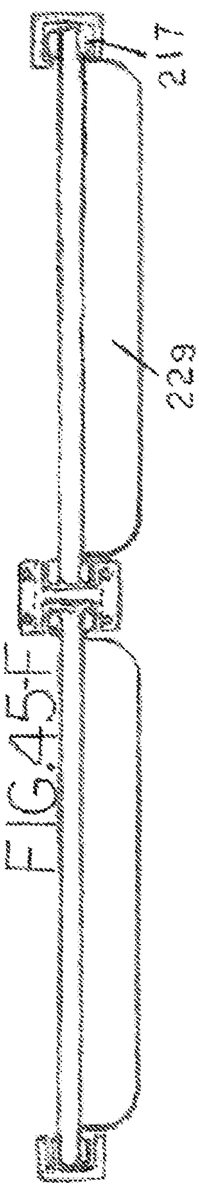
FIG.45F
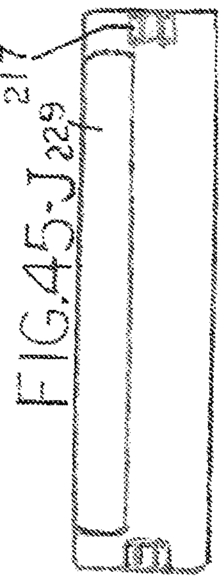
FIG.45-J
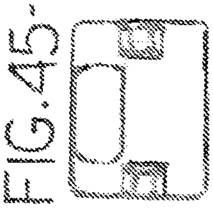
FIG.45-I
FIG.45H
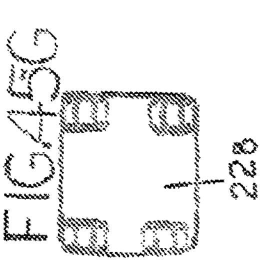
FIG.45G
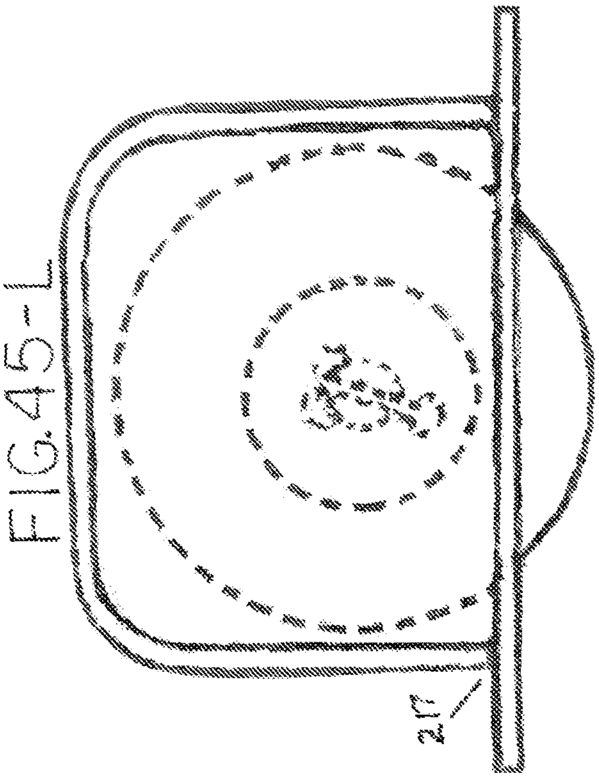
FIG.45-L
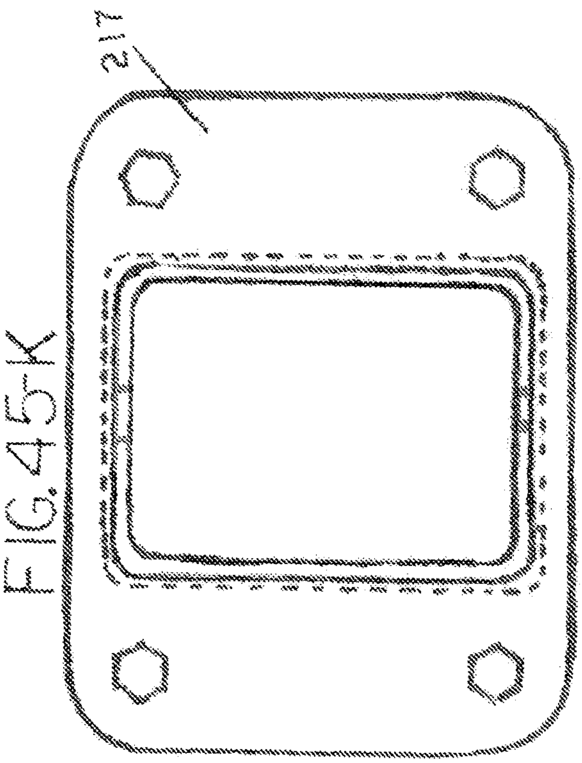
FIG.45-K

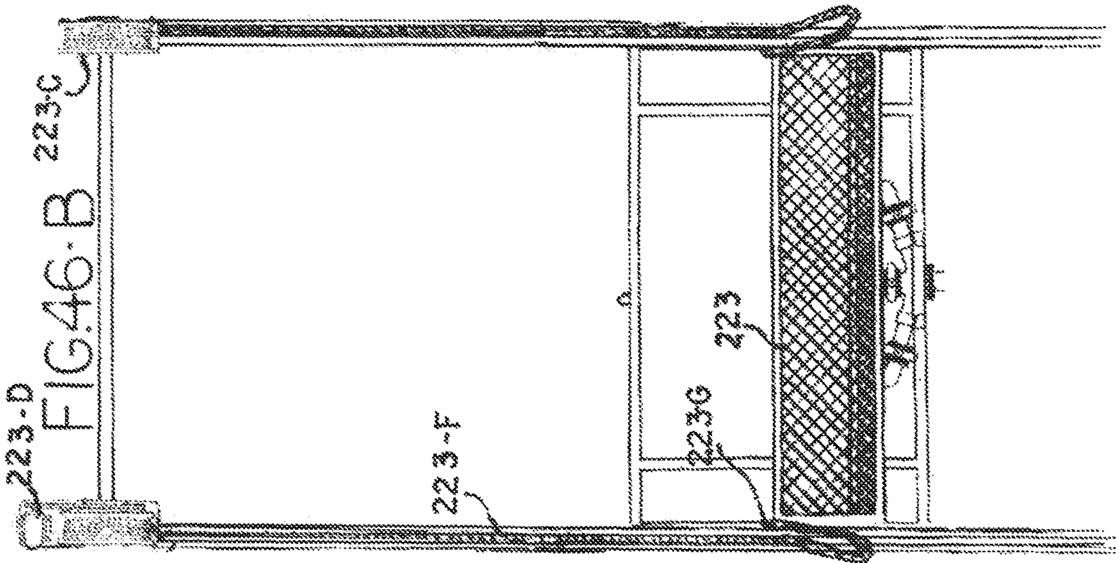
FIG.46-B
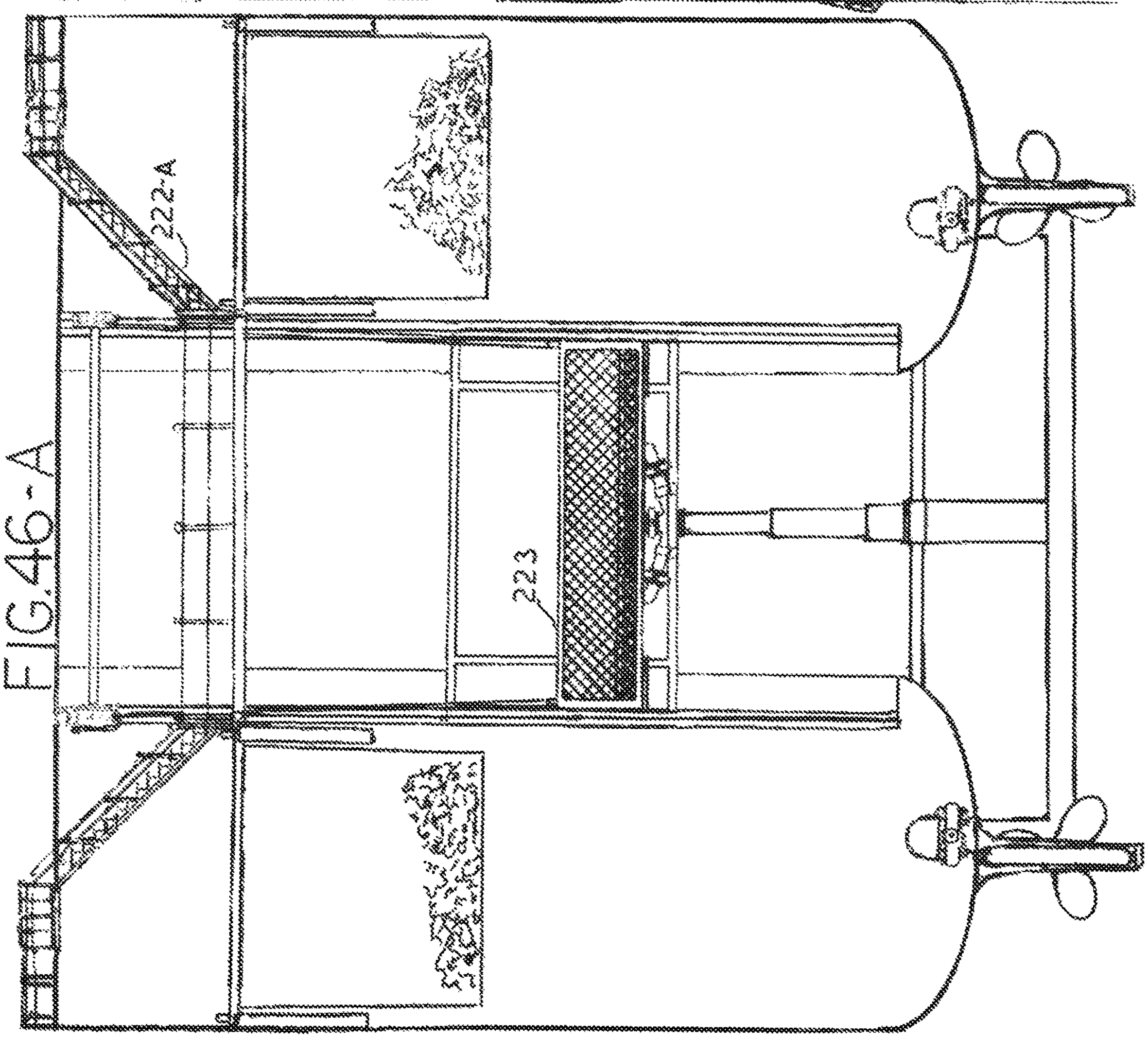
FIG.46-A

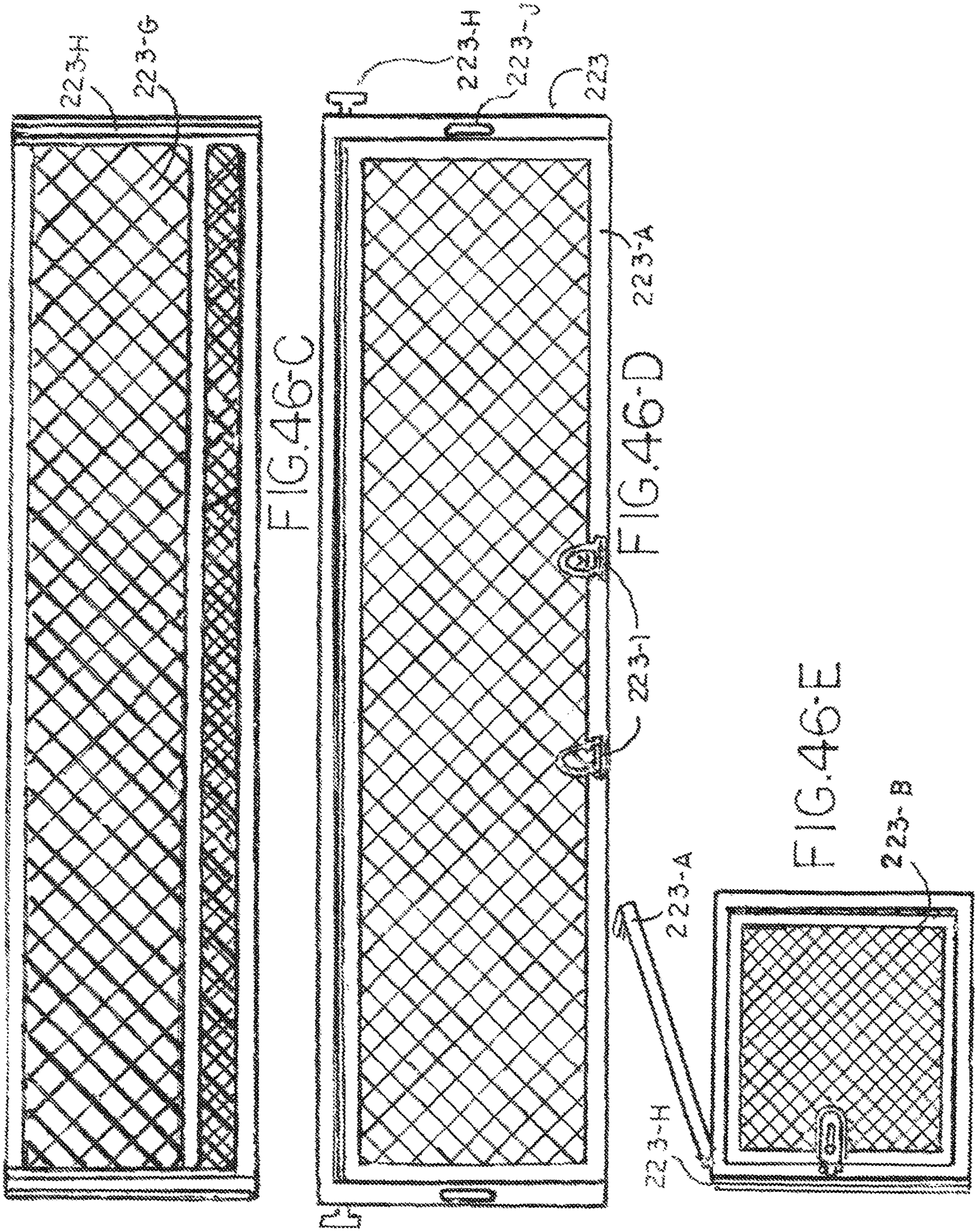
FIG.46-C
FIG.46-D
FIG.46-E

FIG. 47-A
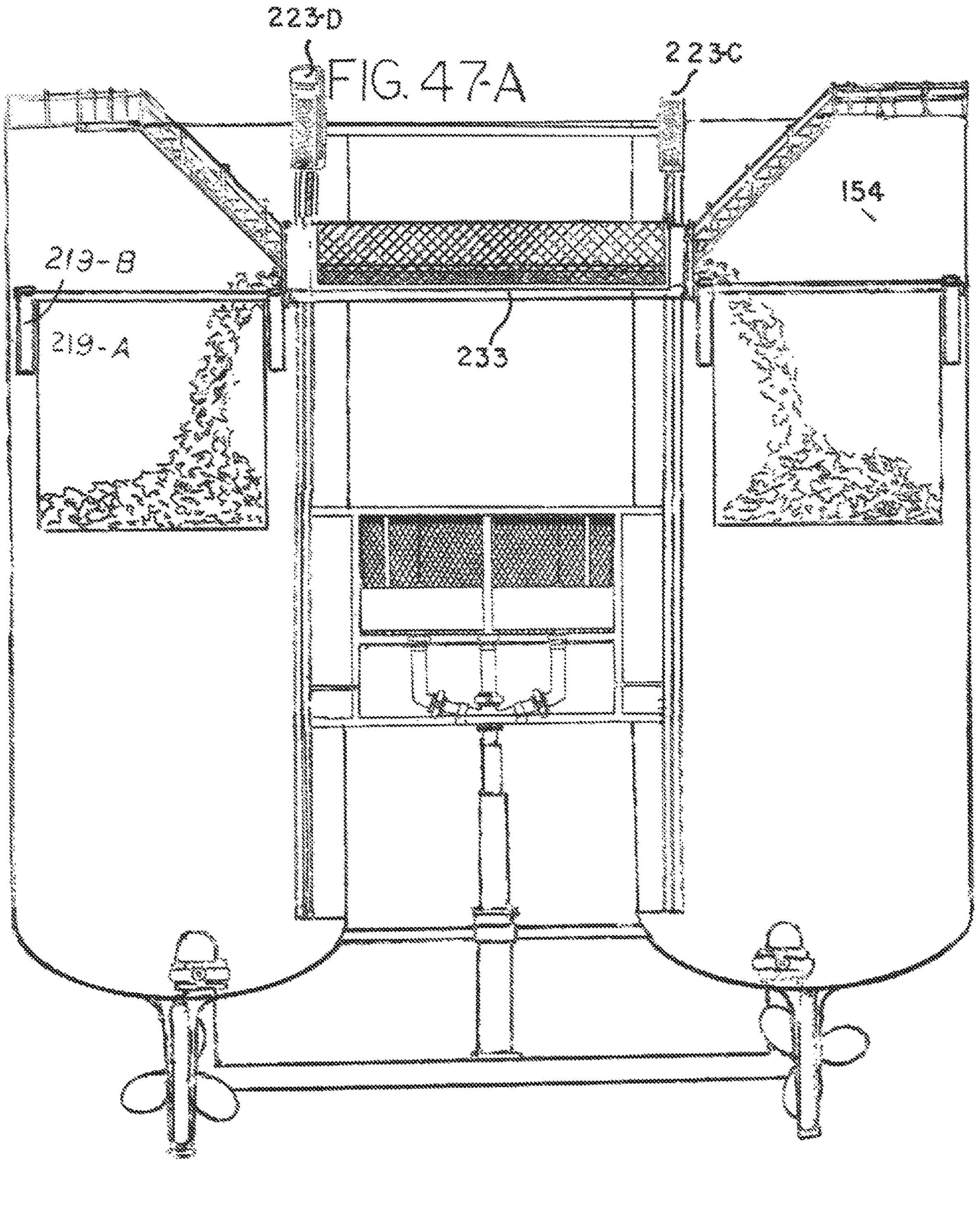

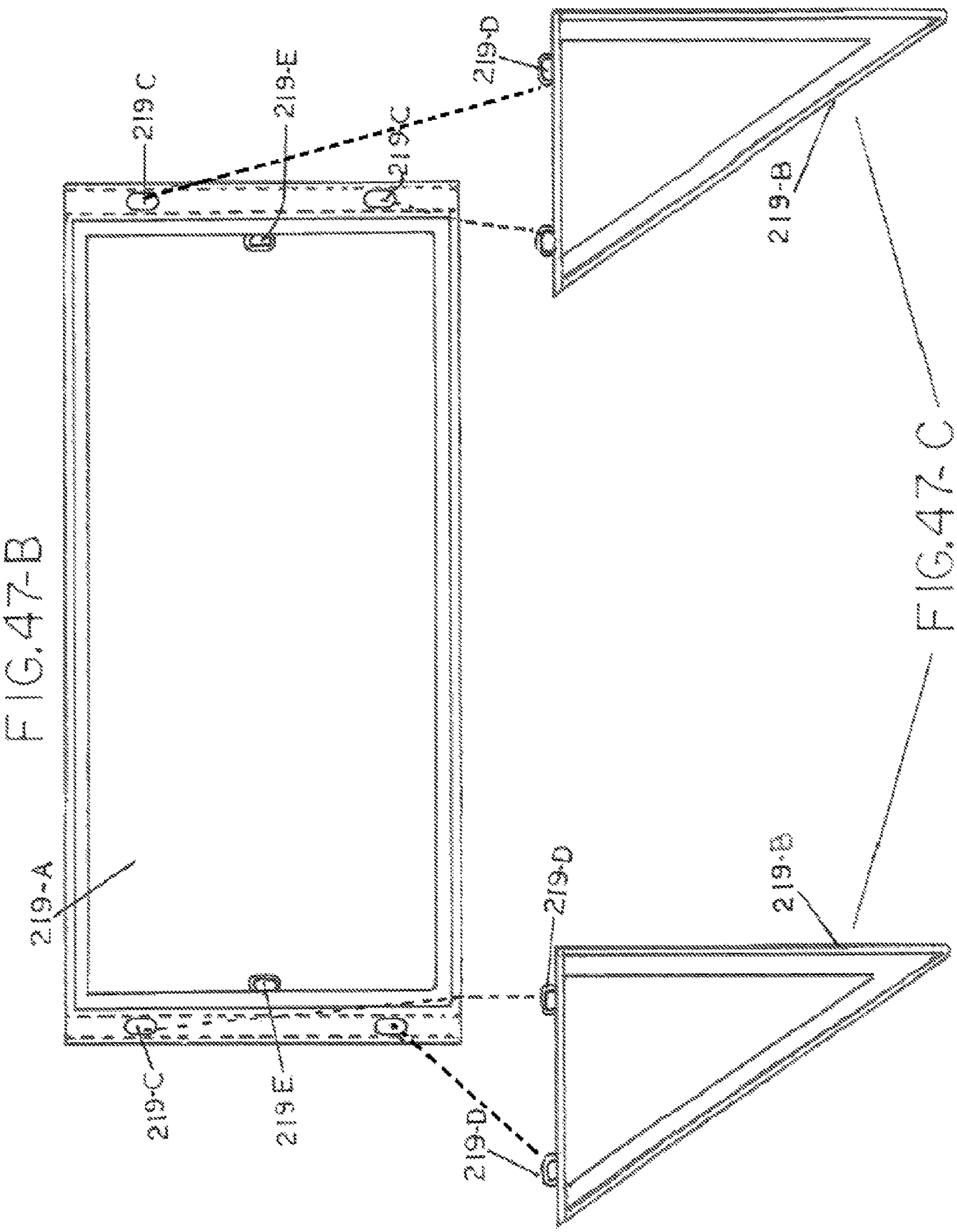
FIG. 47-B
FIG. 47-C

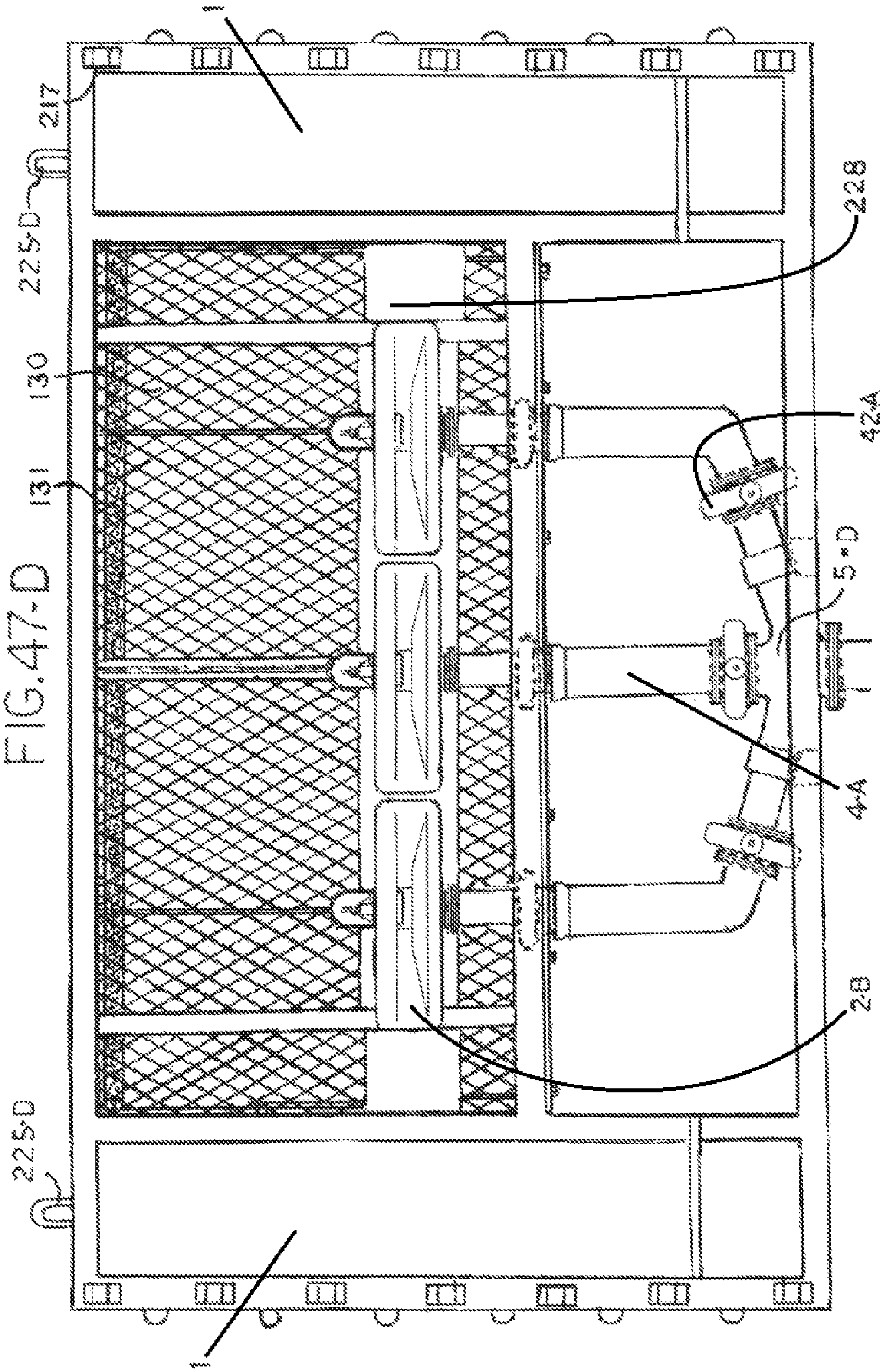
FIG. 47-D

FIG.48-A
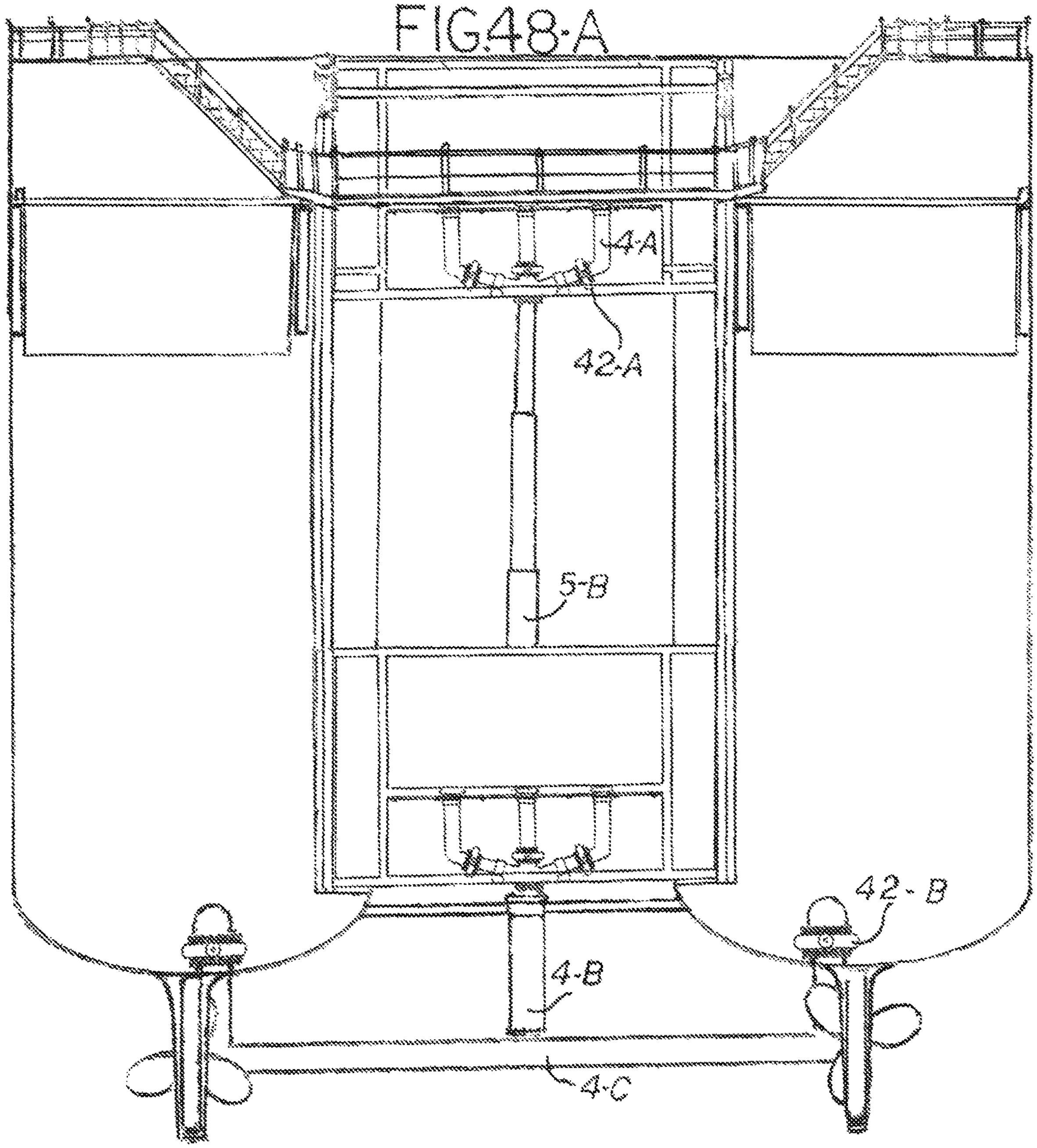

FIG-48-B
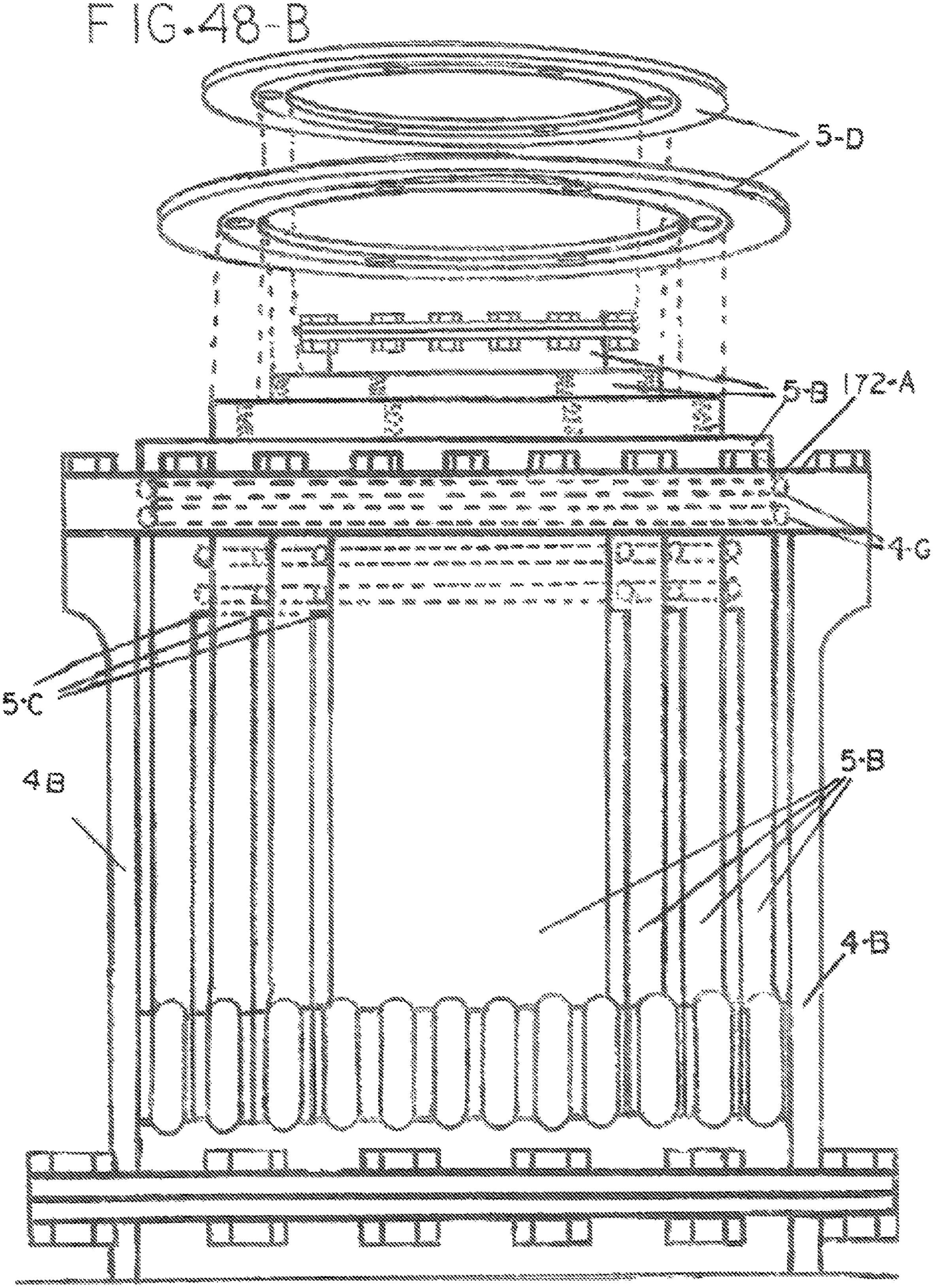

FIG.48-C
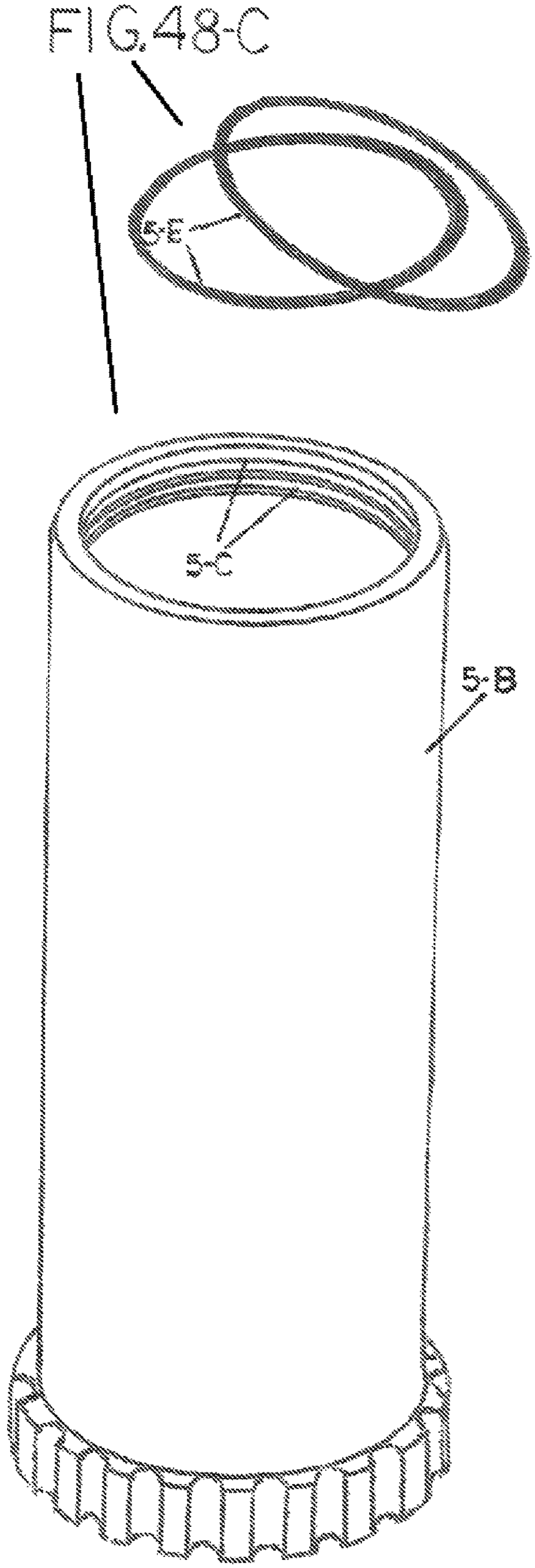
FIG. 48-D
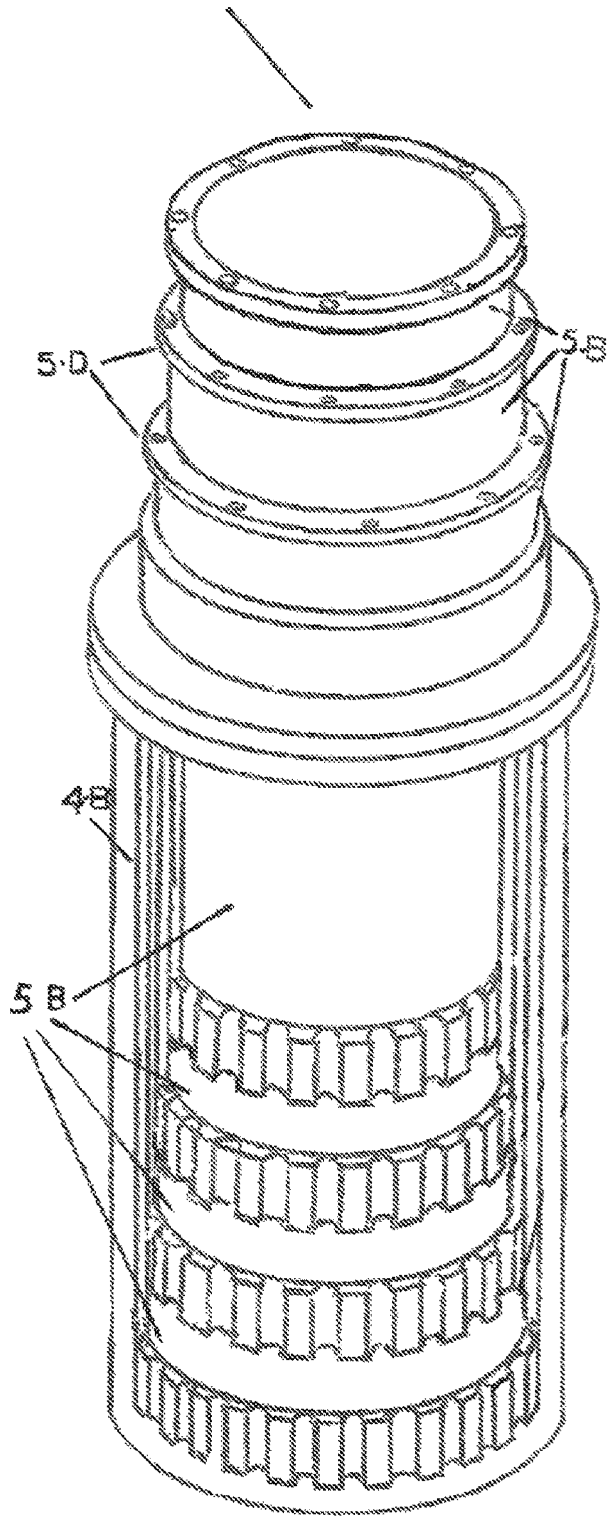

FIG.48-E
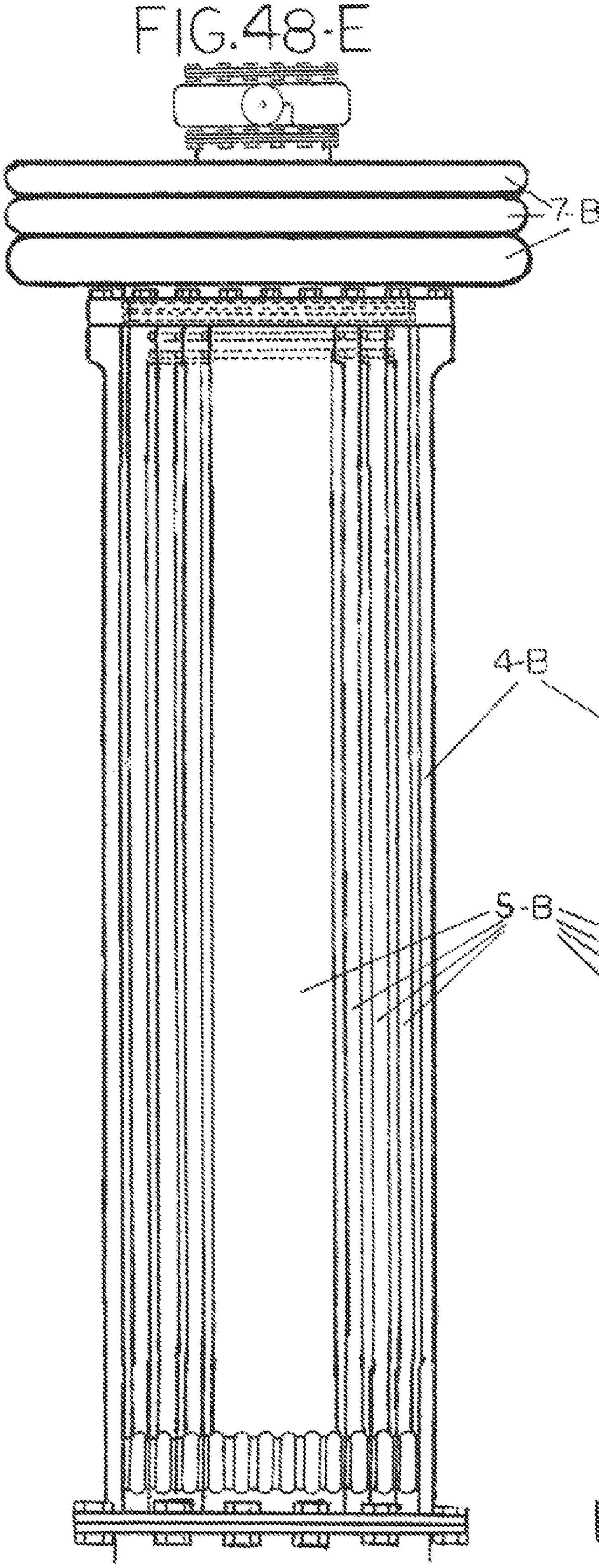
FIG. 48-F
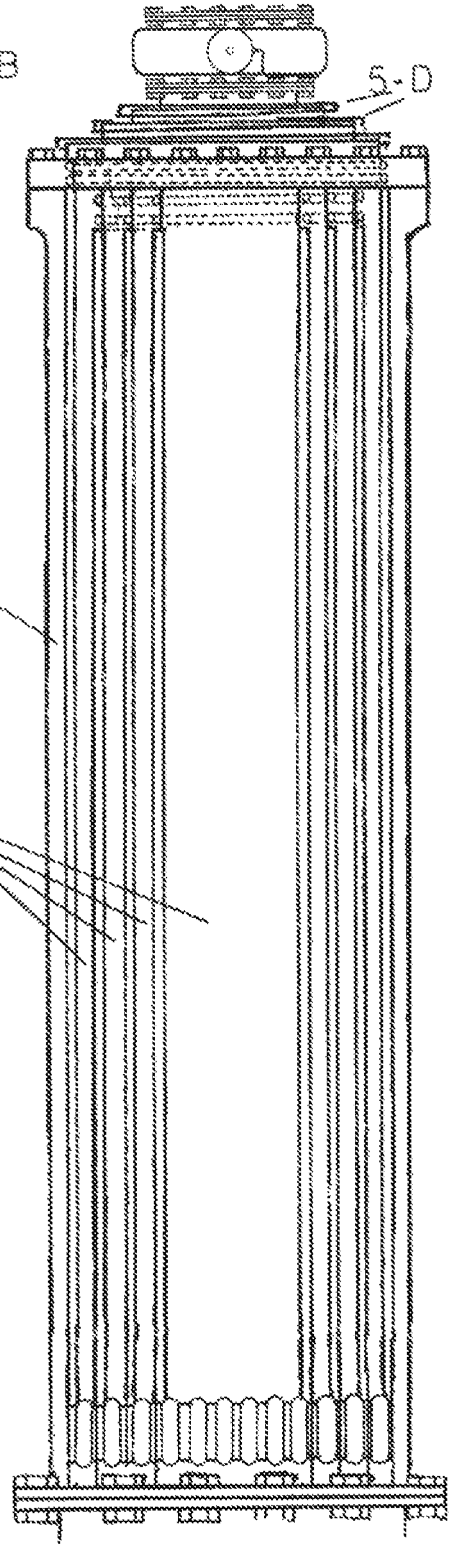

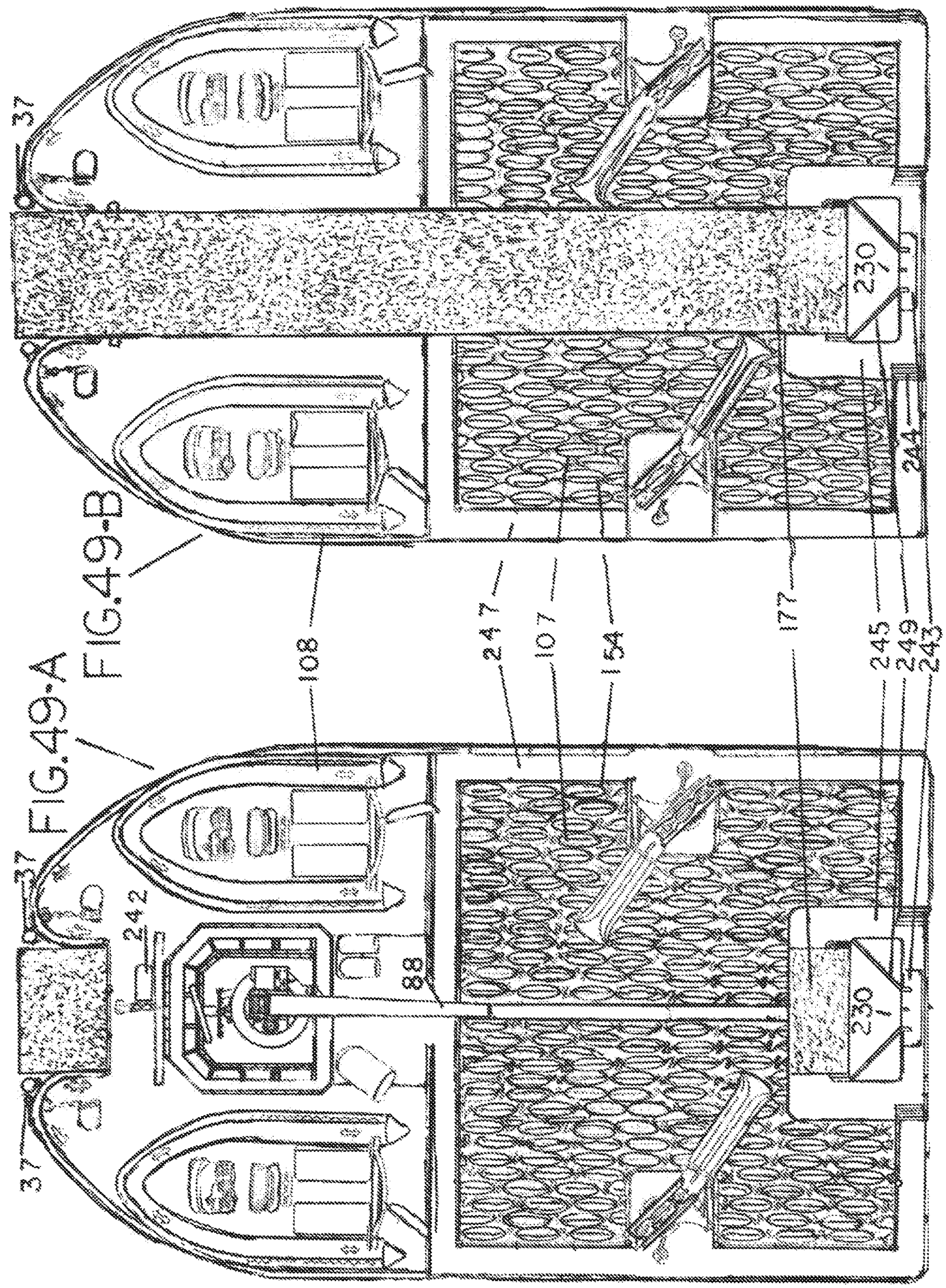
FIG.49-A
FIG.49-B

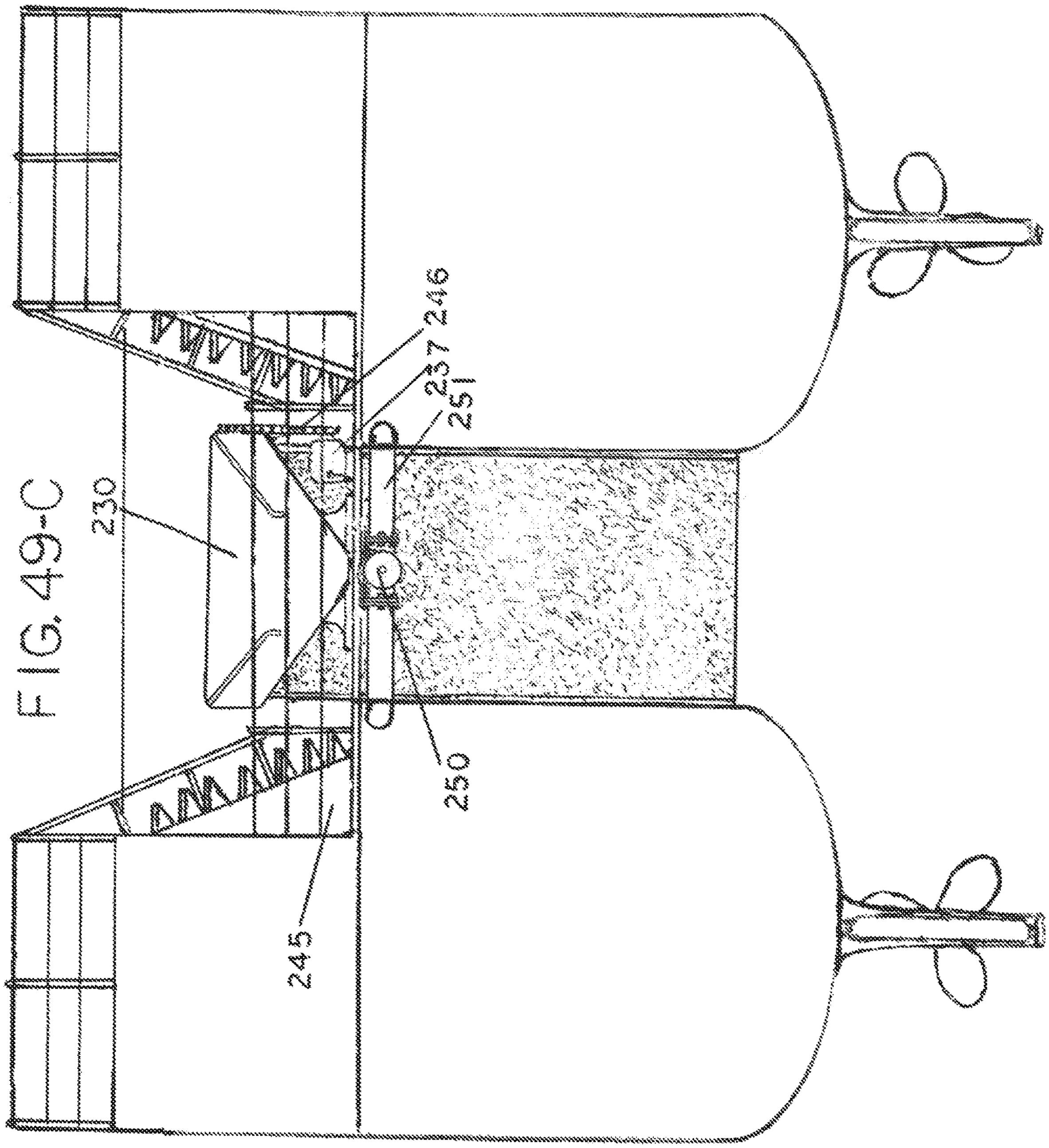
FIG. 49-C

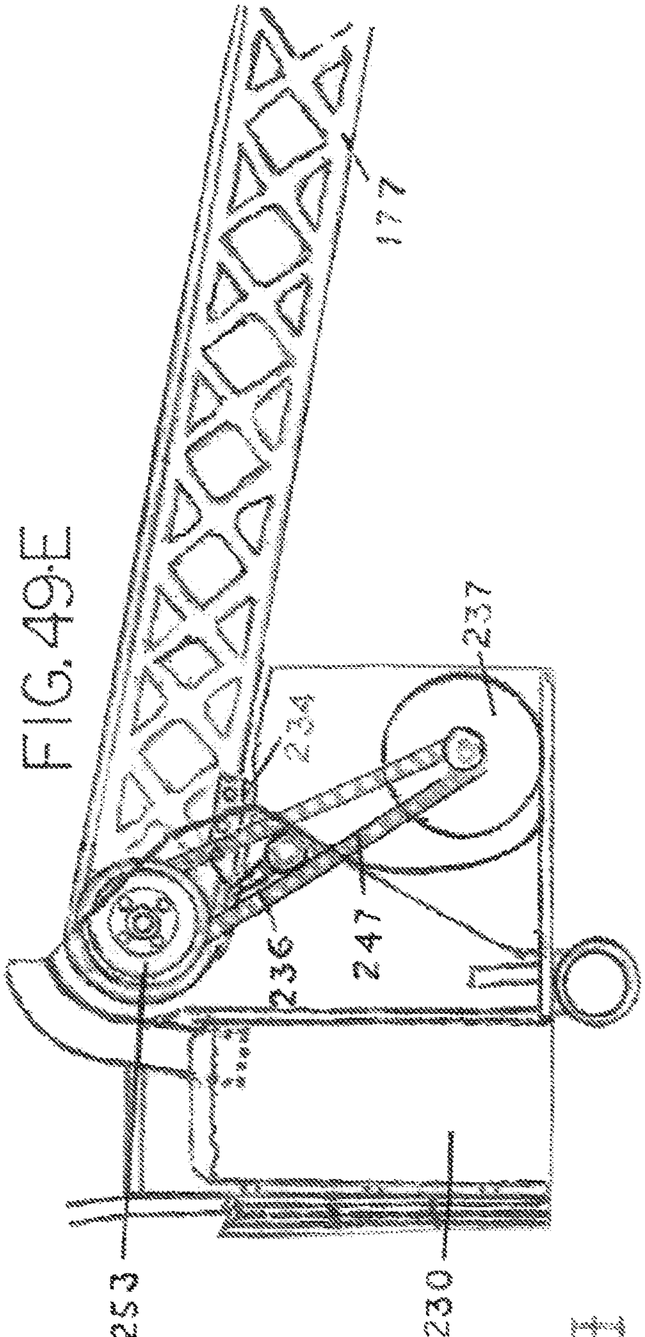
FIG. 49E
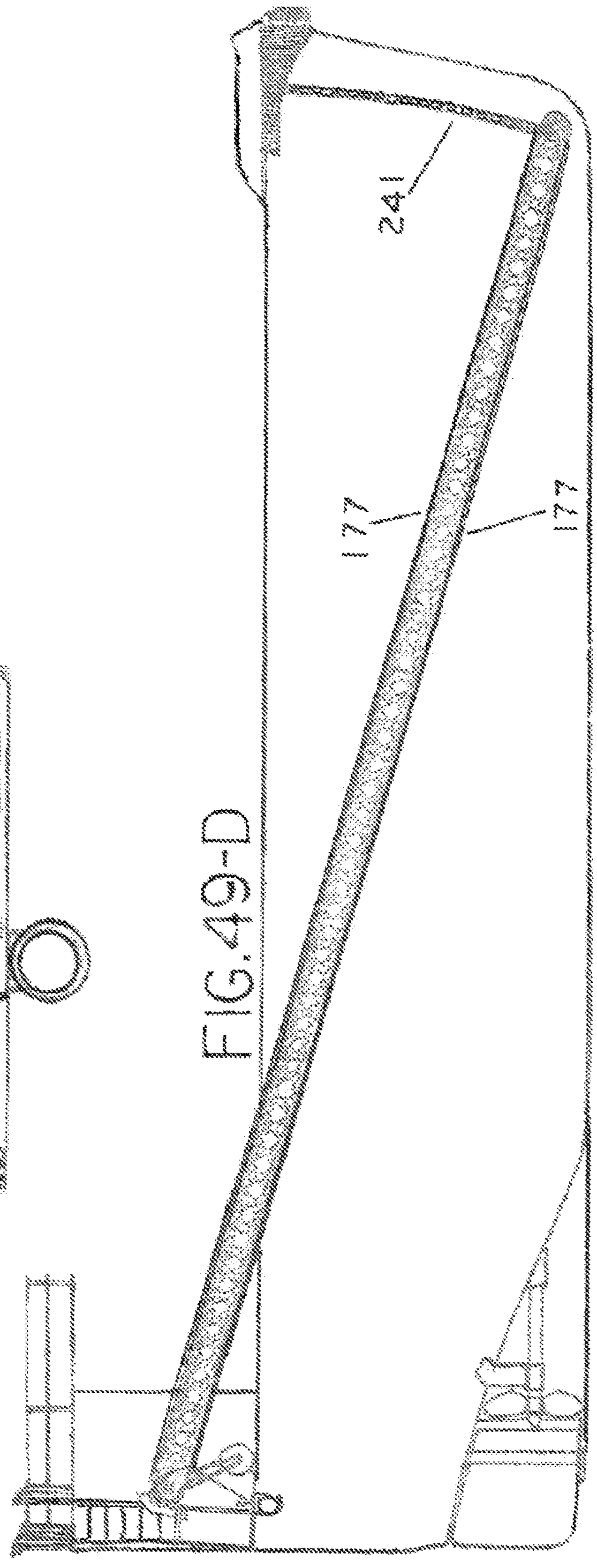
FIG. 49-D

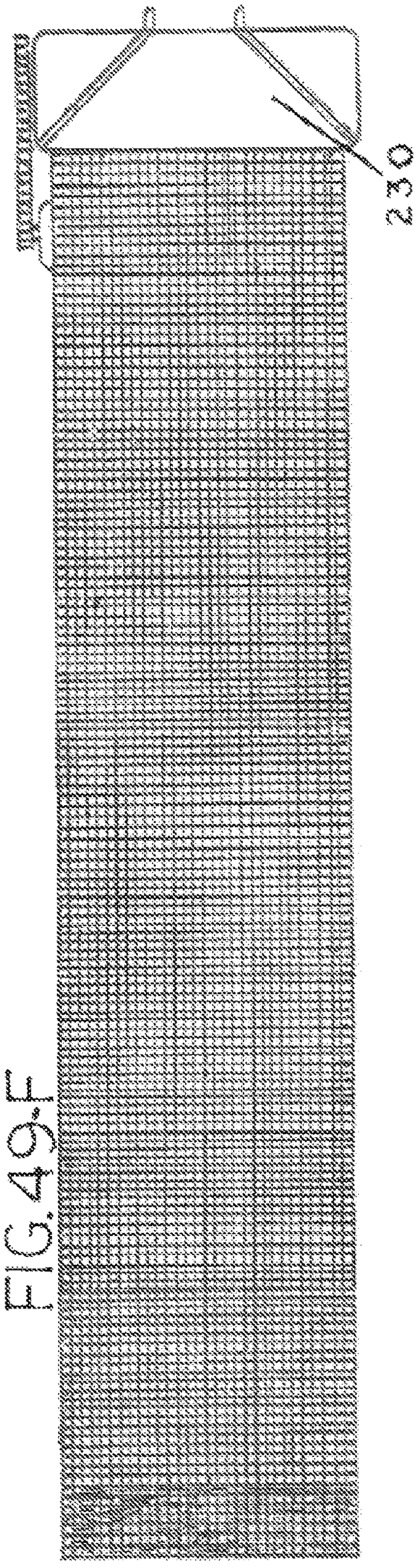
FIG. 49F
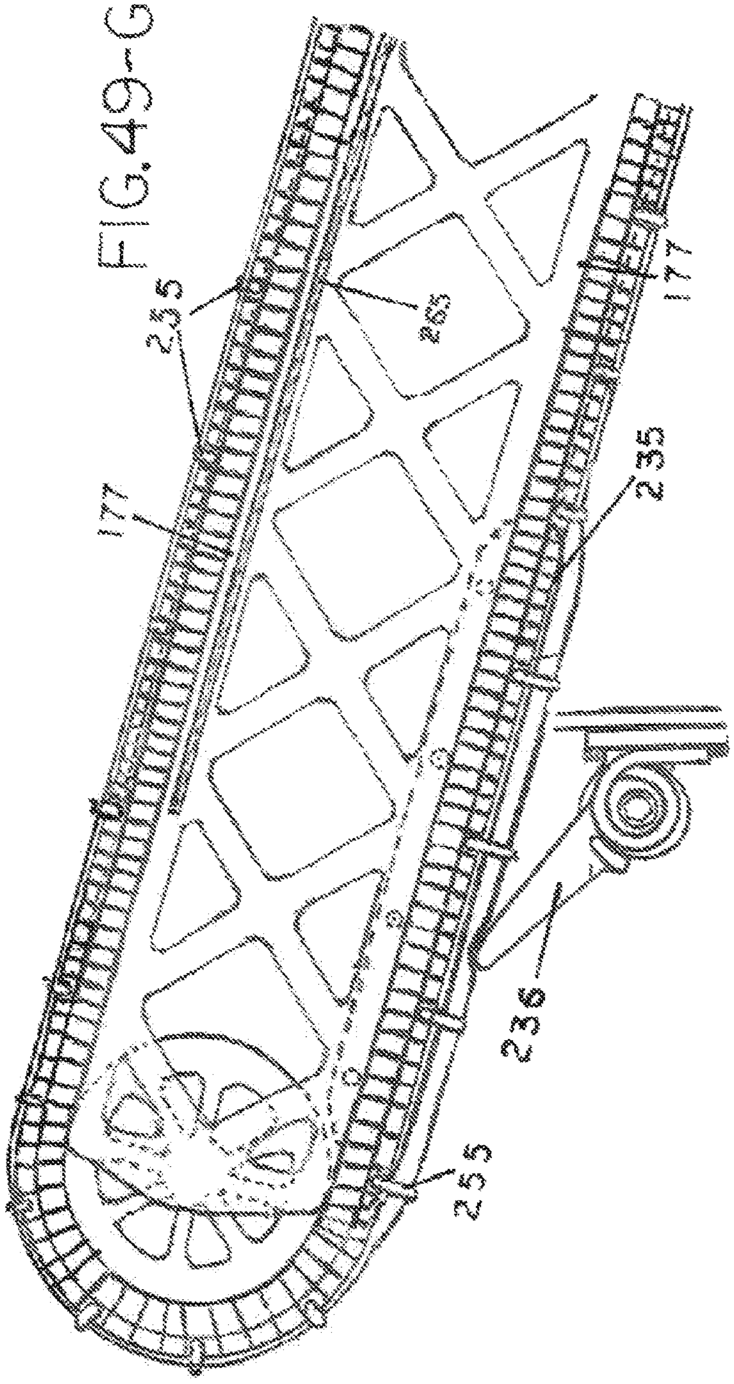
FIG. 49-G

FIG. 49-H
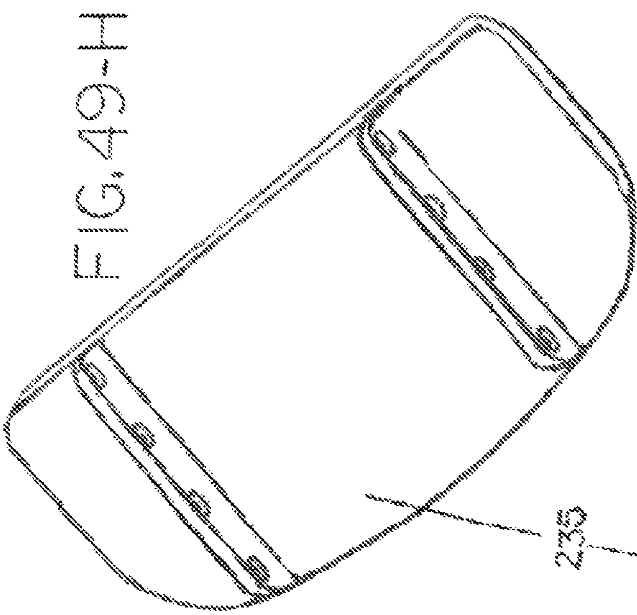
FIG. 49-I
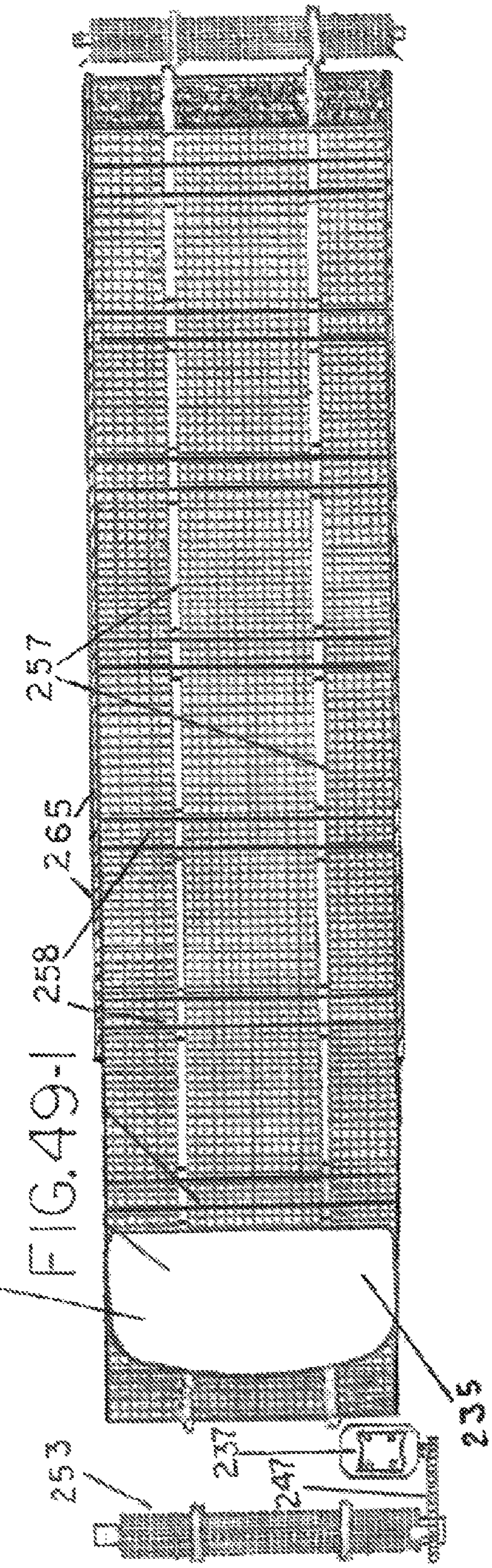

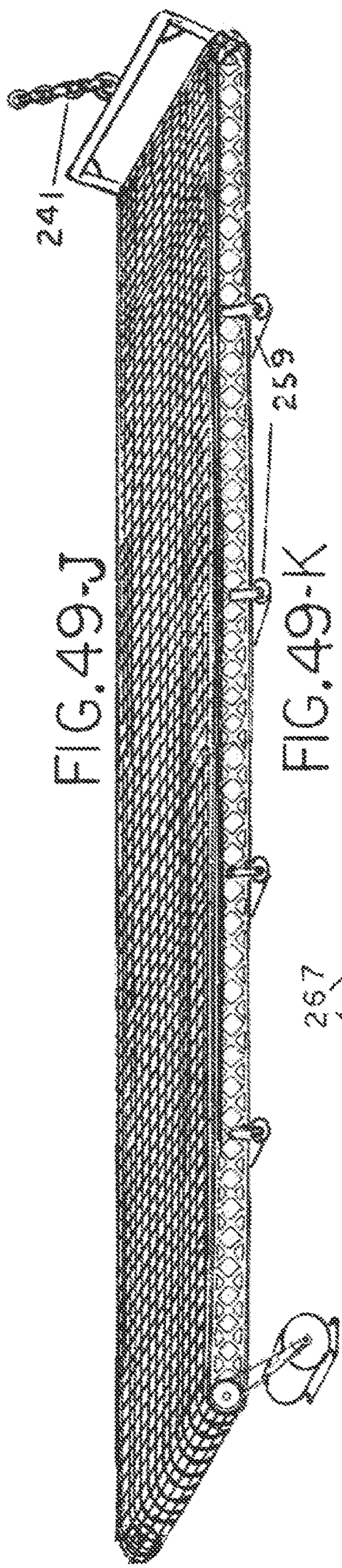
FIG. 49-J
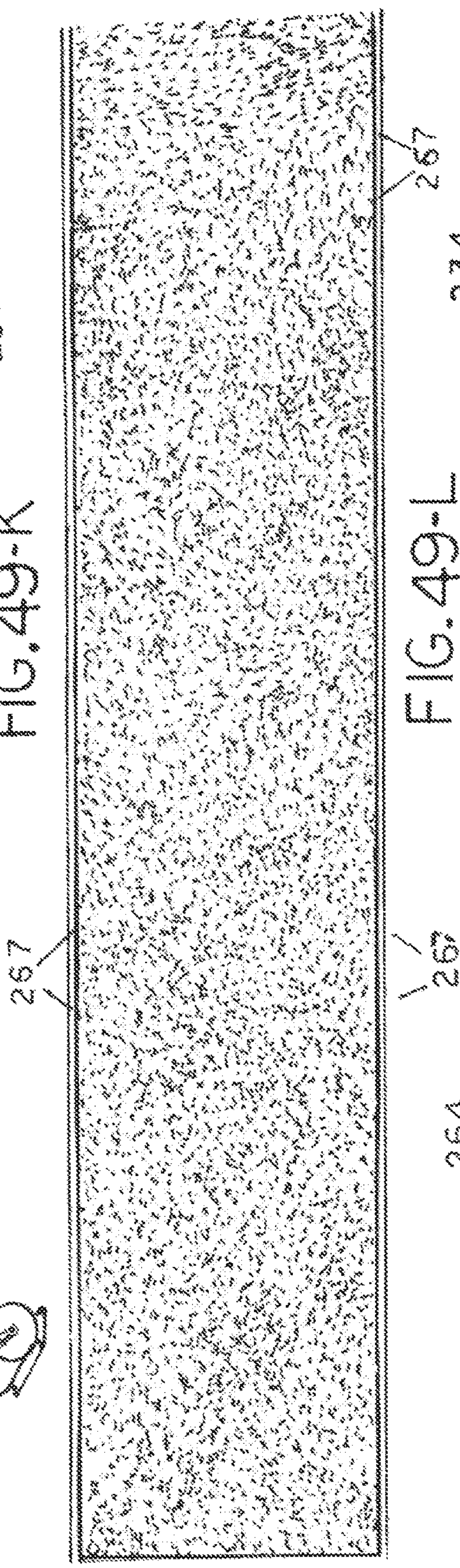
FIG. 49-K
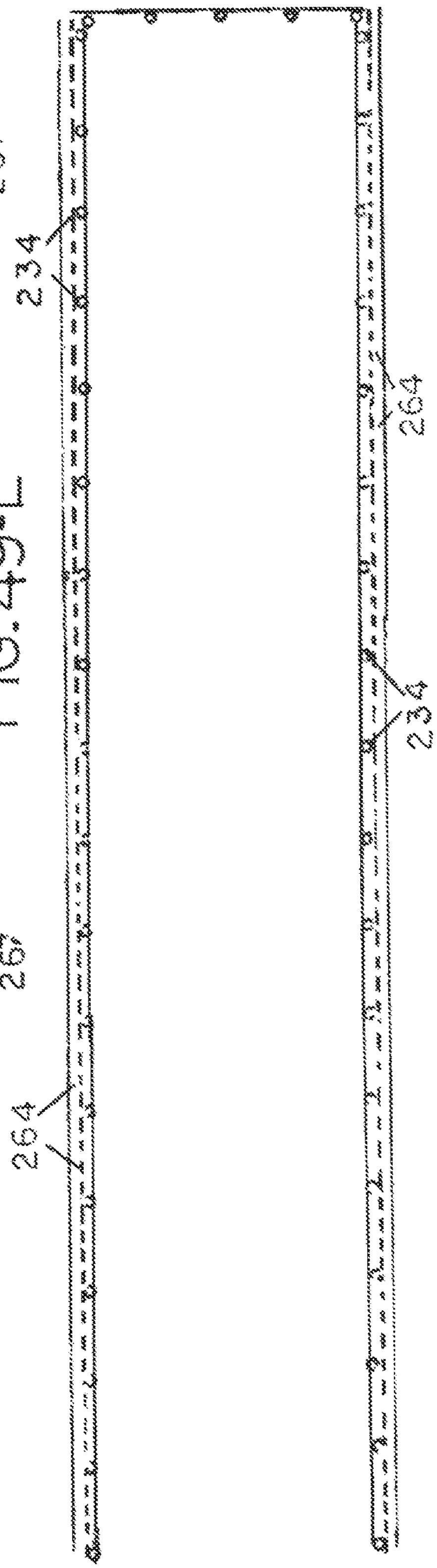
FIG. 49-L

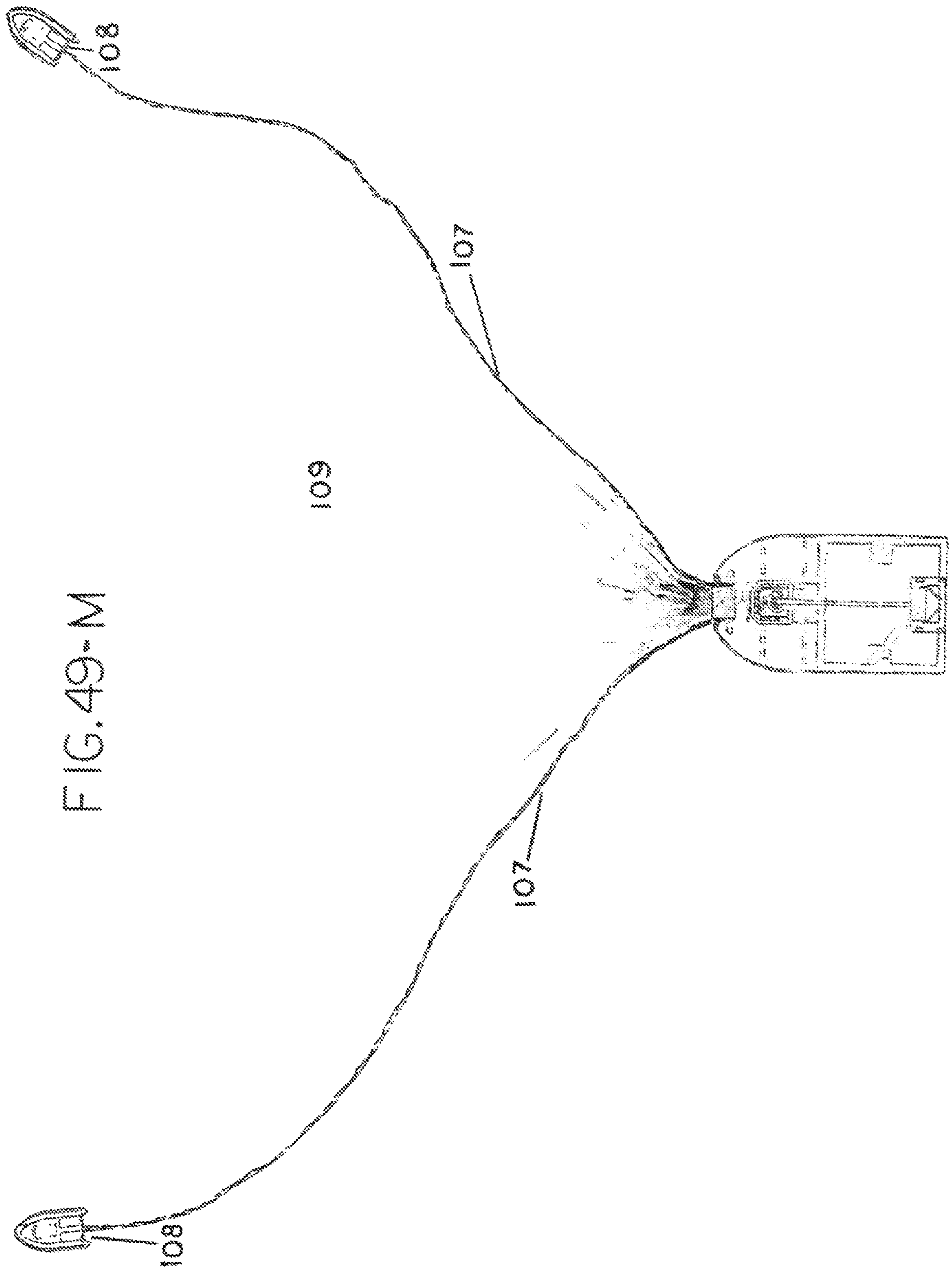
FIG. 49-M

FIG. 51-A
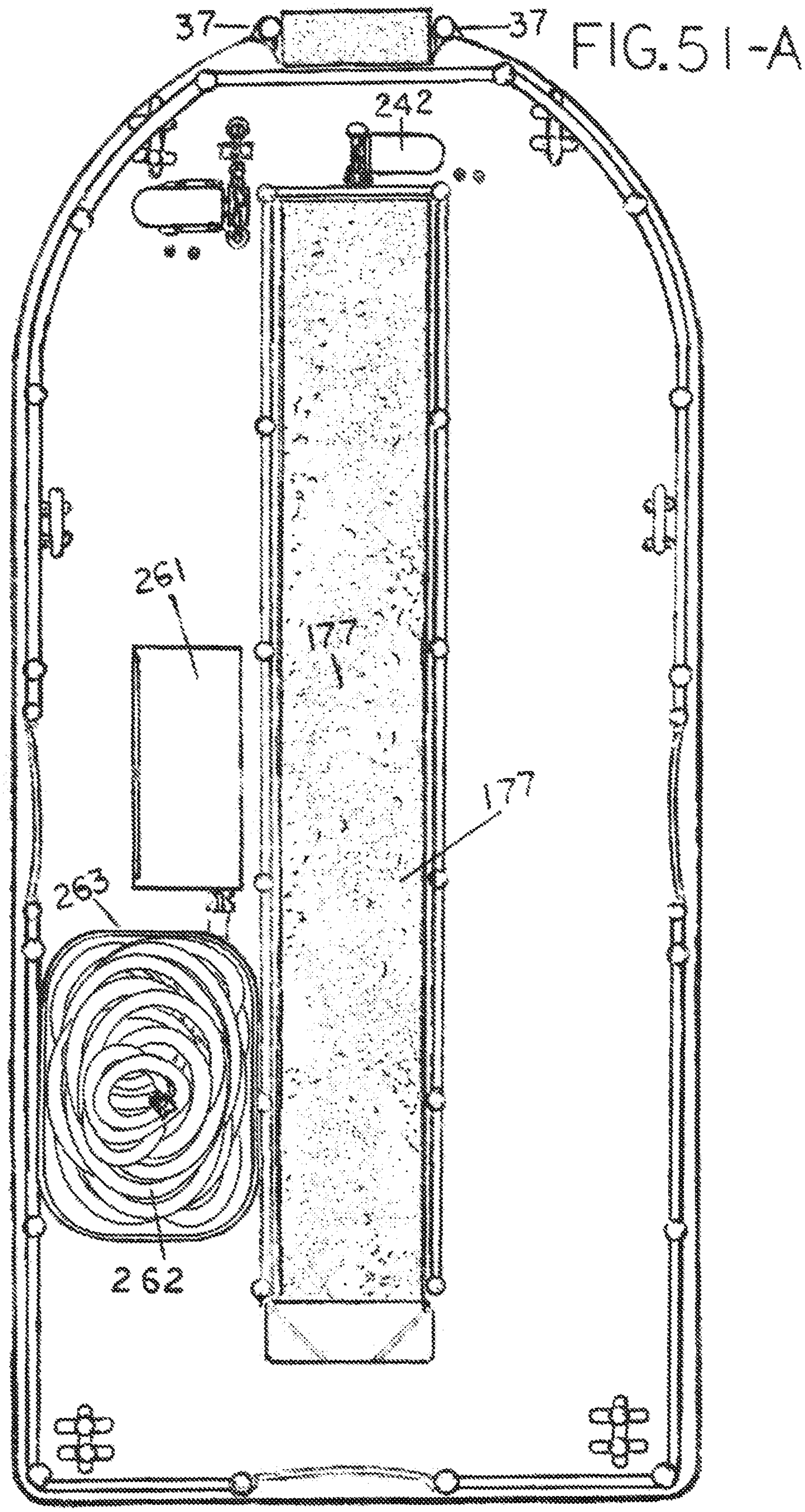

FIG. 51-B
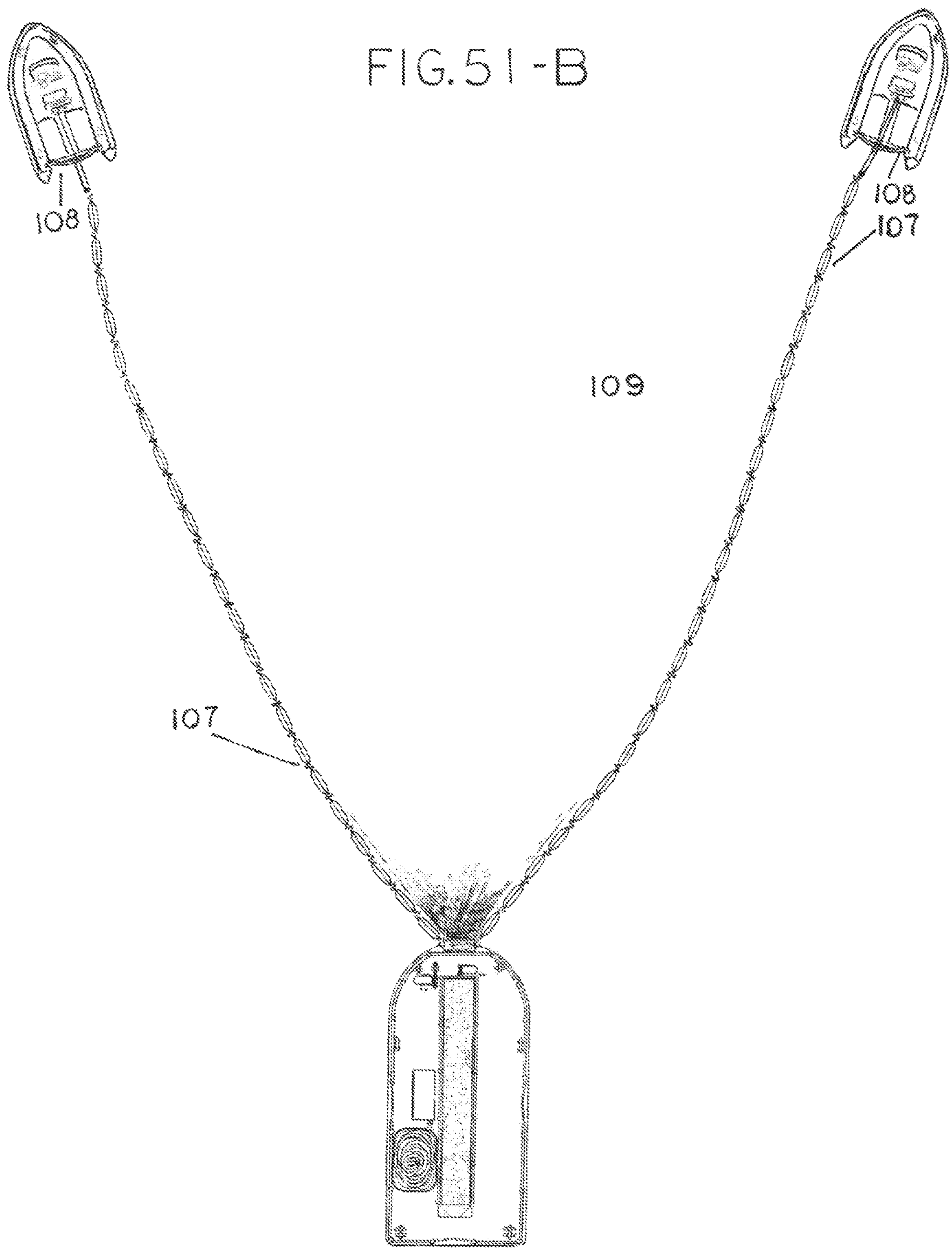

FIG. 52-B
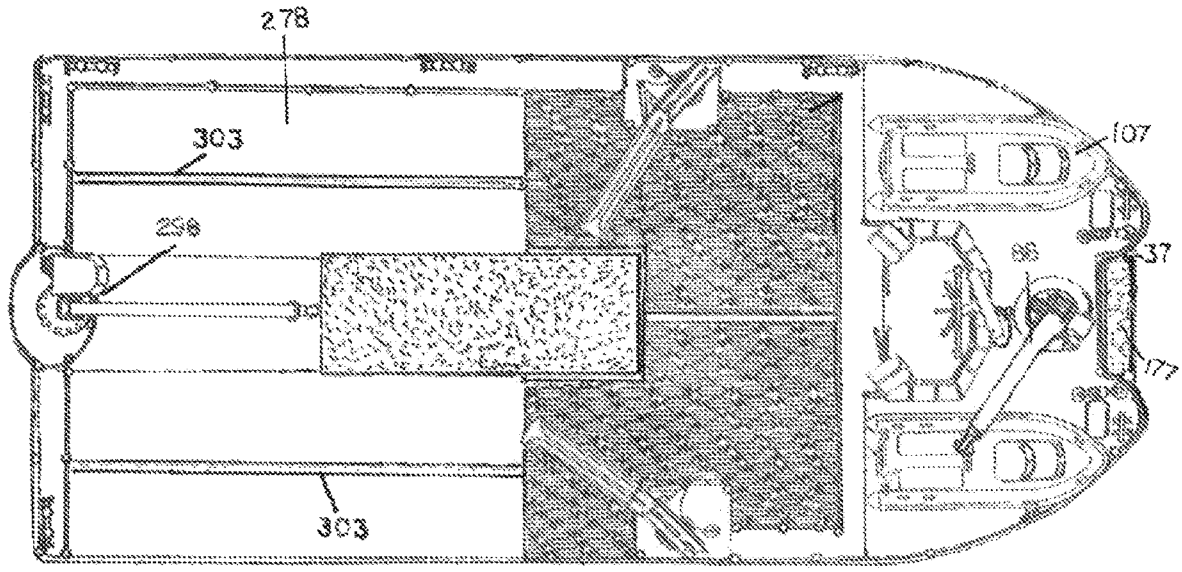
FIG. 52-C
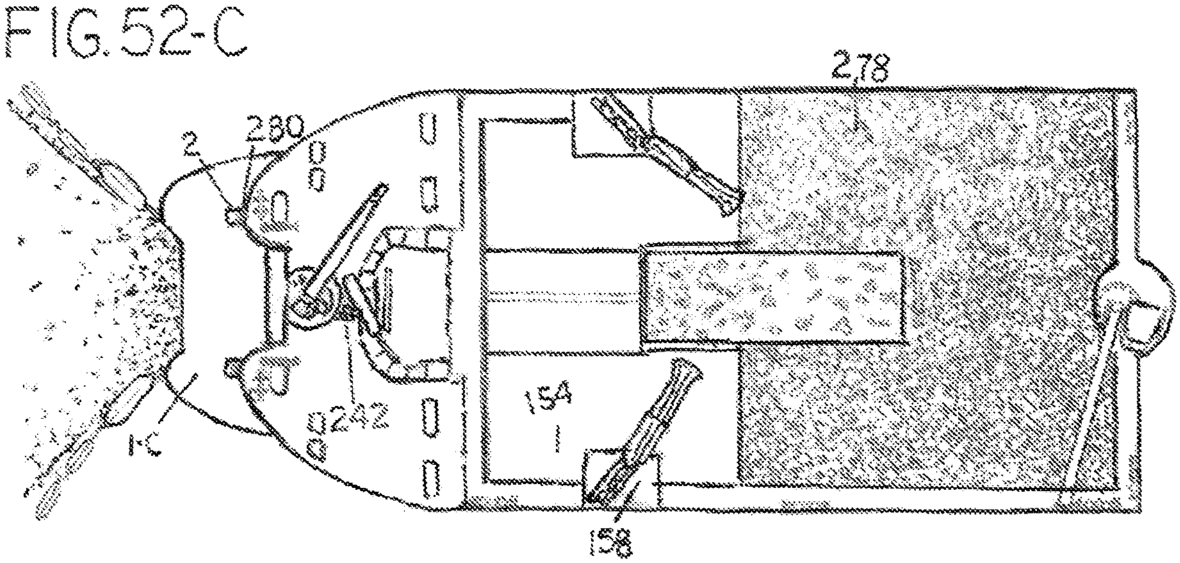

FIG. 52-G
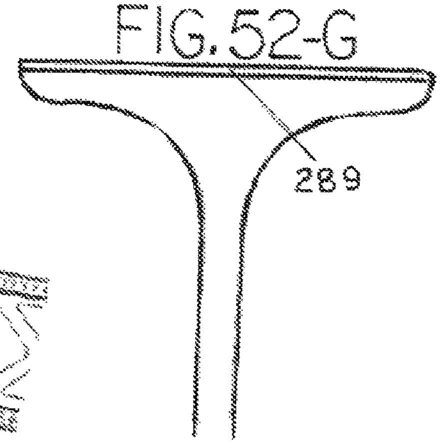
FIG. 52-D
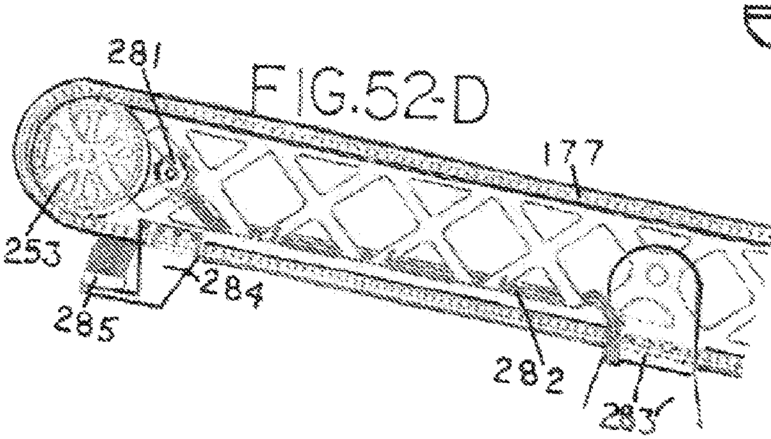
FIG. 52-H
FIG. 52-E
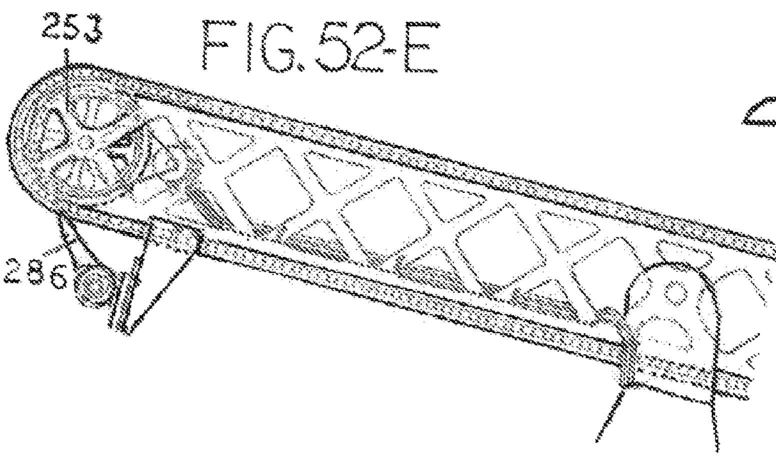
FIG. 52-F
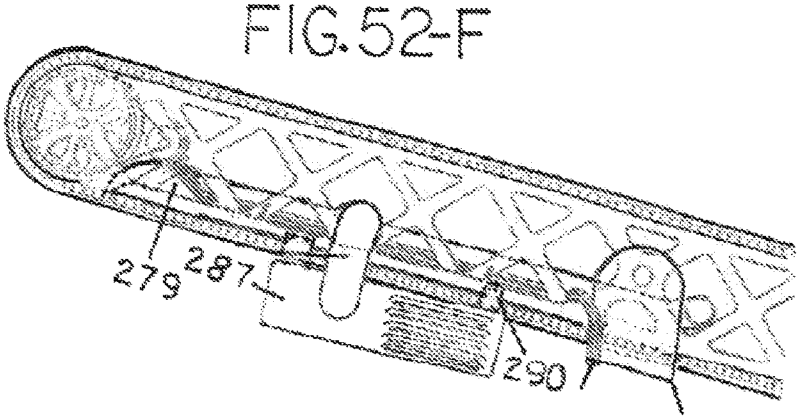
FIG. 52-I
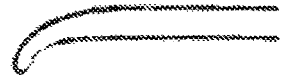

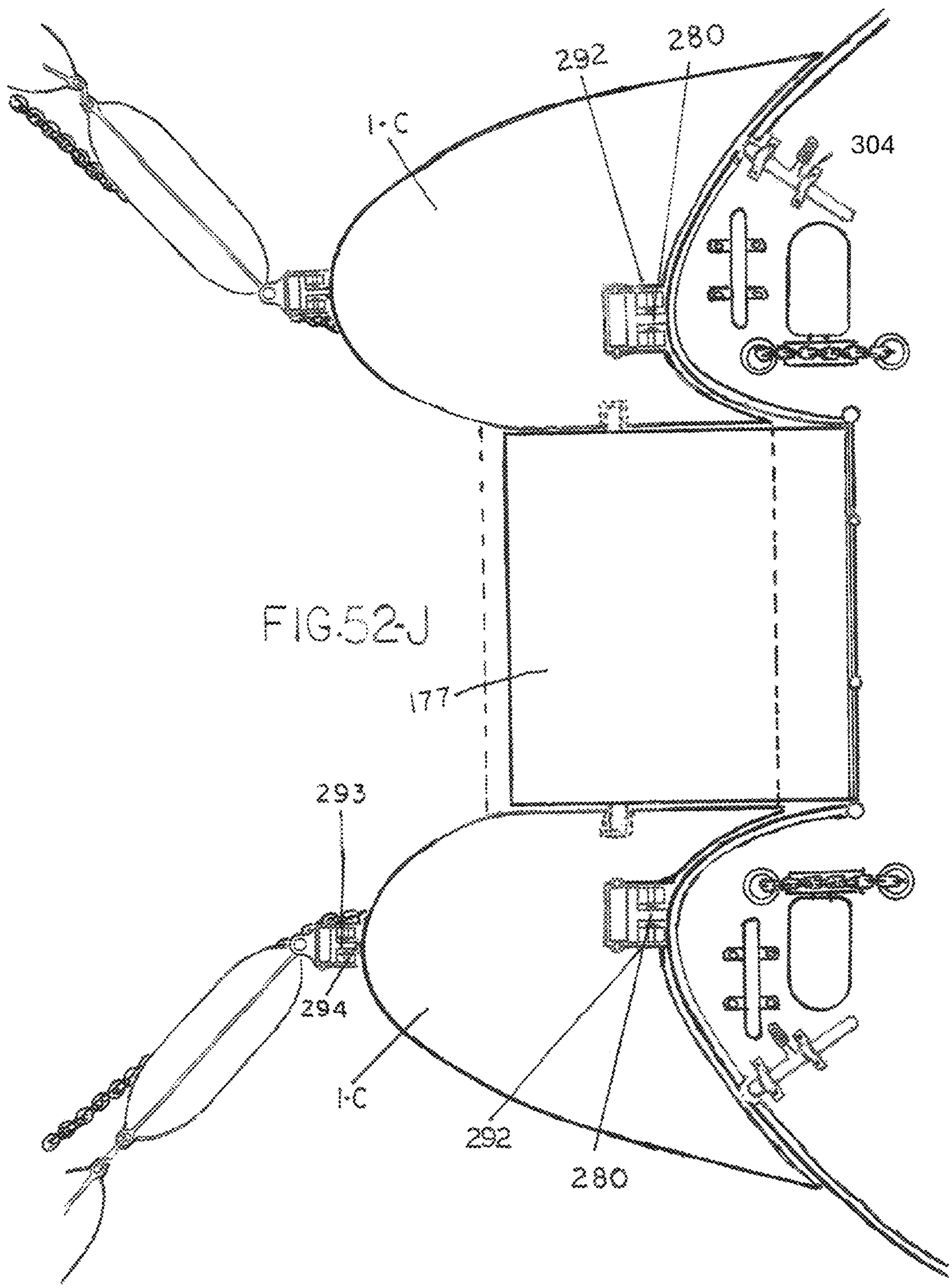
FIG.52-J

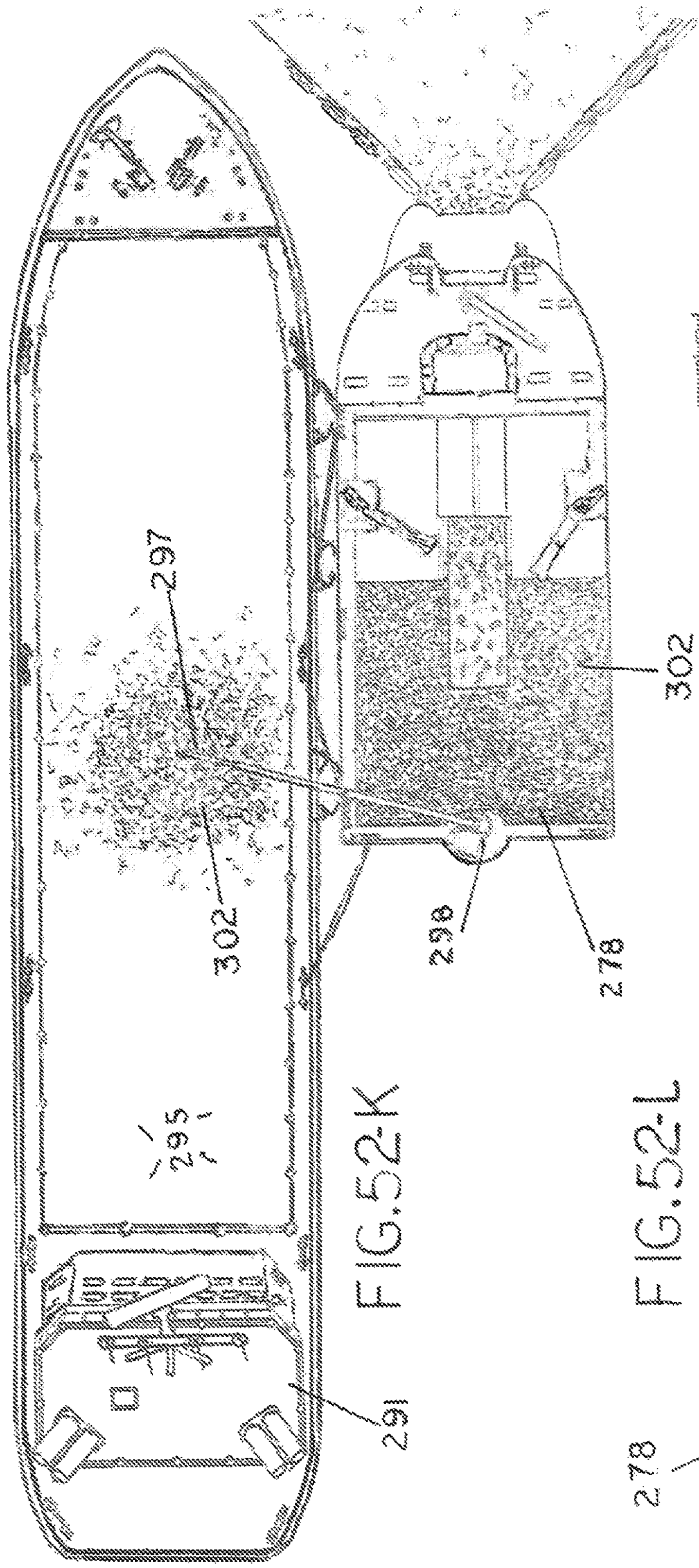
FIG.52K
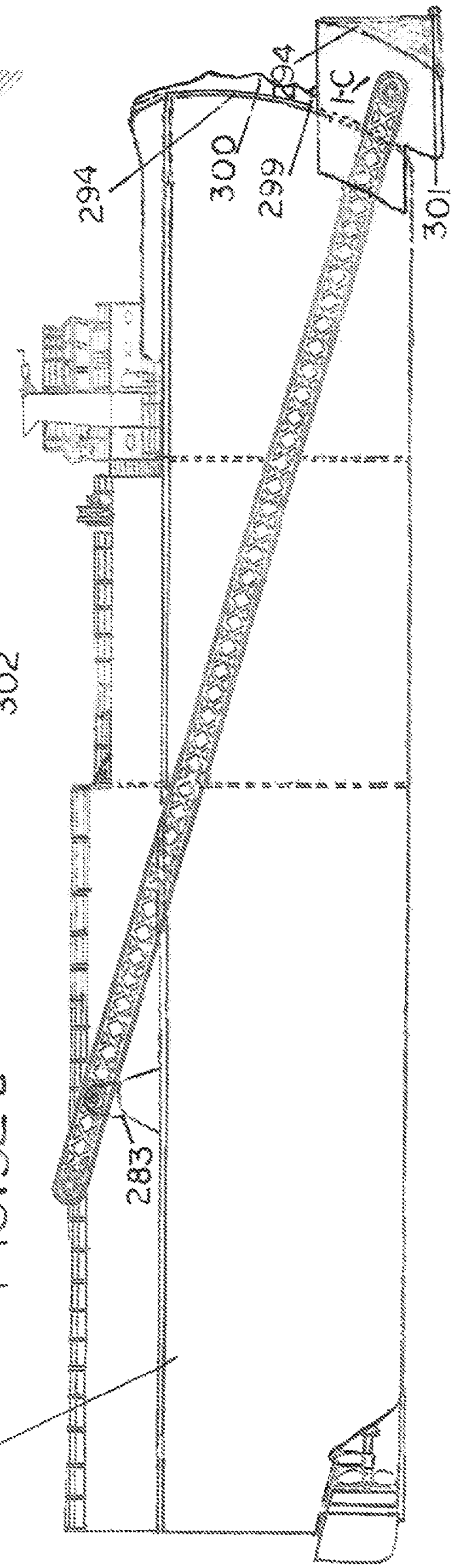
FIG.52-L

EQUIPMENT, SYSTEMS AND VESSELS, FOR THE EFFECTIVE CLEANUP AND RECOVERY OF A BROAD RANGE OF FLOATING CONTAMINANTS

CROSS REFERENCES TO RELATED APPLICATIONS

This application claims the benefit of U.S. Provisional Application No. 63/167,615 filed Mar. 29, 2021, the disclosure of which is hereby incorporated herein by reference in its entirety.

FIELD AND BACKGROUND OF THE INVENTION

This invention relates to the field of floating contaminant cleanup and recovery equipment, vessels, and systems employed by them, for the cleaning up and recovery, of oil a broad range of floating contaminant's, not only out at sea, but also up inland waterways, lakes and other bodies of water.

SUMMARY

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

A system for removing contaminants floating on or near the surface of a body of water, the system may include a floating contaminant cleanup and recovery vessel, which may include contaminant cleanup and recovery equipment that may have at least one intake port capable of removing floating contaminants from the body of water to be transported to the recovery vessel. The system may further include a first towboat and a second towboat. The system may also include a first containment boom capable of being connected to the first tow boat and to a starboard side of a vessel. The system may also include a second containment boom capable of being connected to the second tow boat and a port side of the vessel, such that during operation the first and second towboats extend out from the vessel such that the first and second containment booms gather the floating contaminants from the body of water and channel them to the at least one intake port.

A vessel for removing contaminants floating on or near the surface of a body of water may include a contaminant cleanup and recovery equipment, which may include at least one intake port capable of removing floating contaminants from the body of water to be transported to the vessel. The vessel may include a first towboat and a second towboat, a first containment boom that may be capable of being connected to the first tow boat and to a starboard side of the vessel, and a second containment boom that may be capable of being connected to the second tow boat and a port side of the vessel, such that during operation the first and second towboats may extend out from the vessel such that the first and second containment booms gather the floating contaminants from the body of water and channel them to the at least one intake port.

A system for removing contaminants floating on or near the surface of a body of water may include a floating contaminant cleanup and recovery vessel, which may include contaminant cleanup and recovery equipment that may have a framework capable of being disposed on a hull of the vessel. The framework may include a distal framework section. At least one upper armature may be connected to a first pivot joint capable of being disposed on the hull of the vessel and to a second pivot joint disposed on the distal framework section. At least one lower armature may be connected to a first pivot joint capable of being disposed on the hull of the vessel and to a second pivot joint disposed on the distal framework section. The at least one upper armature and the at least one lower armature may allow the distal framework section to raise and lower relative to the vessel. A first float may house the intake port disposed within the distal framework section. The system may also include a first towboat and a second towboat, a first containment boom capable of being connected to the first tow boat and to a starboard side of a vessel, and a second containment boom capable of being connected to the second tow boat and a port side of the vessel. During operation the first and second towboats extend out from the vessel such that the first and second containment booms gather the floating contaminants from the body of water and channel them to the at least one intake port.

A vessel for removing contaminants floating on or near the surface of a body of water, may include a first contaminant cleanup and recovery equipment capable of being in fluid connection with the vessel. The first contaminant cleanup and recovery equipment may include at least one intake port, capable of removing contaminants from the surface of the body water, to be transported to the vessel.

A system for removing contaminants floating on or near the surface of a body of water may include a floating contaminant cleanup and recovery vessel, which may include contaminant cleanup and recovery equipment that may have at least one intake port capable of removing floating contaminants from the body of water to be transported to the vessel. The system may further include a first towboat and a second towboat, a first containment boom capable of being connected to the first tow boat and to the vessel, and a second containment boom capable of being connected to the second tow boat and the vessel. During operation the first and second towboats extend out from the vessel such that the first and second containment booms gather the floating contaminants from the body of water and channel them to the at least one intake port.

A system for removing contaminants floating on or near the surface of a body of water may include a floating contaminant cleanup and recovery vessel, which may include contaminant cleanup and recovery equipment that may have at least one intake port capable of removing floating contaminants from the body of water to be transported to the recovery vessel. The system may further include a first towboat and a first containment boom capable of being connected to the first tow boat and to the vessel, such that during operation the first towboats extend out from the vessel such that the first containment boom gathers the floating contaminants from the body of water and channels them to the at least one intake port.

Equipment for removing contaminants floating on the surface of a body of water may include a primary float connected to, and providing buoyancy for, an intake port the intake port capable of having a fluid connection to a storage tank. The fluid connection may include at least one tube housing, housing at least one tube. The at least one tube may include a first tube connected to the intake port such that the contaminants collected through the intake port may be capable of being transported through the first tube and the fluid connection to the storage tank.

Equipment for removing contaminants floating on or near the surface of a body of water may include a conveyor having a first end and a second end, wherein the first end of the conveyor is an intake port, and wherein the conveyor, when activated, may be capable of lifting contaminants out of a body of water and conveying the contaminants to a contaminant removal portion such that the contaminant can be deposited into a storage tank.

Equipment for the removal of contaminants from surface of a body of water may include a framework. The framework may include a first framework section that may be disposed on a vessel and a second framework section. At least one upper armature may connect the first framework section to the second framework section. Each armature of the at least one upper armature may have a first pivot joint connecting the armature to the first framework section in a pivoting connection and a second pivot joint connecting the armature to the second framework section in a pivoting connection. At least one lower armature may connect the first framework section to the second framework, section wherein each armature of the at least one lower armature may have a first pivot joint connecting the armature to the first framework section in a pivoting connection, and a second pivot joint connecting the armature to the second framework section in a pivoting connection. The equipment may also include a first float may house an intake port disposed within the second framework section, and at least one tube. The at least one tube may include a first tube connected to the intake port. The at least one tube may be connected to piping that may be capable of being in fluid connection to a storage tank.

Equipment for removing contaminants floating on or near the surface of a body of water may include a framework capable of being disposed on a vessel comprising. The framework may include a distal framework section. At least one upper armature may be connected to a first pivot joint capable of being disposed on the vessel and to a second pivot joint disposed on the distal framework section. At least one lower armature may be connected to a first pivot joint capable of being disposed on the vessel and to a second pivot joint disposed on the distal framework section. The at least one upper armature and the at least one lower armature may allow the distal framework section to raise and lower relative to the vessel. The equipment may further include a first float housing an intake port disposed within the distal framework section.

A containment boom may include a first end and a second end, a float, and an armature. The armature may have a first end pivoting relative to the float, and a second end capable of attaching to a chain.

A tow boat may include a hull comprising a deck, a keel and an aft portion. A pivoting axle may include an upper portion and a lower portion. The pivoting axle may extend through the hull such that the upper portion is disposed above the deck and the lower portion is disposed beneath the keel. An upper pivotable armature may have a first end disposed on the upper portion of the pivoting axle, and a second end. A lower pivotable armature may have a first end disposed on the lower portion of the pivoting axle, and a second end. A connecting member may connect the upper pivotable armature and the lower pivotable armature behind the aft portion of the hull. The upper and lower armatures may pivot around the aft portion of the hull A system for removing contaminants floating on, or near the surface of a body of water the system may include a floating contaminant cleanup and recovery vessel, that may include an open forward end portion of two vertical opposing inner lateral sides. The forward end portion may house floating contaminant cleanup and recovery equipment between two vertical opposing inner lateral sides. The vessel may further include at least one storage tank for storing contaminants captured by same, and at least one towboat maintaining forward motion in front of and off to a side of the open forward end portion of the floating contaminant cleanup and recovery vessel with same towing. A contaminant containment boom may extend from a back portion of the towboat, with the opposite end portion of contaminant containment boom connected to a side of the open forward end portion of the floating contaminant cleanup and recovery vessel. The contaminants floating on, or near the surface of the body of water may be carried and channeled down along the inner side portion of the contaminant containment boom and into the open forward end portion of the floating contaminant cleanup and recovery vessel and captured by the floating contaminant cleanup and recovery equipment, housed between two opposing inner lateral side portions of same.

A floating contaminant cleanup an recovery system may include a floating contaminant cleanup and recovery vessel. The vessel may include at least one storage tank for storing of contaminants captured by at least one floating contaminant cleanup and recovery equipment unit, integral to and extendable from, either the front, back, or from both sides of the floating contaminant cleanup an recovery vessel. The unit may including an open forward end portion between a pair of outer opposing side portions thereof. The forward end portion may be attached to a pair of contaminant containment booms with the opposite end portion of each extending out and attached to, a first and second towboat. The towboats may maintain forward motion with the floating contaminate cleanup and recovery vessel, from positions in front of and out beyond the outer side portions of the floating contaminate cleanup and recovery equipment creating currents by the forward motion of the three vessels. Contaminants floating on the surface of the body of water may be trapped and channeled back between the inner side portions of the two contaminant containment booms back to the aft portions of the floating contaminant cleanup and recovery equipment where same are pulled back forward and into the intake tube portions of same by surface tension.

A floating contaminant cleanup and recovery vessel and equipment may include a floating contaminant cleanup and removal vessel, with a catamaran type hull configuration including two opposing vertical inner portions of the vessels hulls, with a permeable conveyor disposed between same and angularly adjustable therein relative to the surface of the water, with said permeable conveyor additionally comprising of, a cover, that allows water to pass through same while restricting the particular type of contaminants, being removed from the body of water from passing through same.

A floating contaminant cleanup and recovery equipment may include a storage tank with low inner ambient pressure a pipe with a fluid connection between the storage tank and a tube housing. The tube housing may house a lower portion of a telescopic tube capable of being extended or retracted from the tube housing. An upper portion of the telescopic tube may include a vacuum intake port and a float providing buoyancy for the telescopic tube as well as maintaining vacuum intake port portion thereof positioned at the proper distance over the surface of the water and the contaminants floating thereon for the effective removal and transport of same to the storage tank with the low inner ambient pressure maintained in same.

A vertical and laterally stable mounting of floating contaminant cleanup and recovery equipment to vessels, employing them may include one or more upper armatures of equal length and one or more lower armatures of equal length with the upper armatures. The one or more upper and lower armatures may have end portions in hinged attachment to an outer vertical surface portion of the hull of a marine vessel and pivotable outwardly therefrom. The upper armatures and said lower armatures having outer end portions may be in hinged attachment in parallel alignment with each other, to inboard attachment point portions of the floating contaminant cleanup and recovery equipment.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

BRIEF DESCRIPTION OF THE DRAWINGS

FIG. 1-A illustrates a profile view of an embodiment of a floating contaminant cleanup and recovery vessel.

FIG. 1-B illustrates a profile view of a second embodiment of the a floating contaminant cleanup and recover vessel.

FIG. 2-A illustrates a profile view of floating contaminant cleanup and recovery equipment of the vessel of FIG. 1-A.

FIG. 2-B illustrates a cross-sectional view of a framework providing a sliding connection to the cleanup and recovery equipment of FIG. 2-A.

FIG. 2-C illustrates a profile view of floating contaminant cleanup and recovery equipment of the vessel of FIG. 1-B.

FIG. 3-A illustrates a view of the backside of the cleanup and recovery equipment of FIG. 2-A adjusted to a low position.

FIG. 3-B illustrates a view of the backside of the cleanup and recovery equipment of FIG. 2-A adjusted to a high position.

FIG. 4-B illustrates an overhead view of the tank and contaminant pumping system of FIG. 4-A.

FIG. 4-C illustrates profile view of a contaminant pumping system of FIG. 2-C.

FIG. 4-D illustrates a front view of the contaminant pumping system of FIG. 4-C.

FIG. 5-A illustrates a profile view of the cleanup and recovery equipment of FIG. 2-A at an upward pivot.

FIG. 5-B illustrates a profile view of the cleanup and recovery equipment of FIG. 2-A at a downward pivot.

FIG. 5-C illustrates a profile view of the cleanup and recovery equipment of FIG. 2-C at both upward and downward pivot positions.

FIG. 6-B illustrates a profile view of the vessel of FIG. 1-A with the equipment in a raised position.

FIG. 6-C illustrates a profile view of a vessel with an alternative embodiment of floating contaminant cleanup and recovery equipment mounted on the bow of the vessel.

FIG. 6-D illustrates a profile view of a vessel with an alternative embodiment of floating contaminant cleanup and recovery equipment mounted on the bow of the vessel.

FIG. 7-A illustrates a profile view of the cleanup and recovery equipment of FIG. 2-A in a raised and locked position.

FIG. 7-B illustrates a profile vie/w of the vessel of FIG. 1-B with the cleanup and recovery equipment of FIG. 2-C in a raised and locked position.

FIG. 8-A illustrates an overhead view of the cleanup and recovery equipment of FIG. 2-A.

FIG. 8-B illustrates an overhead view of the cleanup and recovery equipment of FIG. 2-C.

FIG. 9-A illustrates a profile view of the vessel of FIG. 1-A with the cleanup and recovery equipment of FIG. 2-A in a raised and locked position.

FIG. 9-B illustrates a profile view of the vessel of FIG. 1-B with the cleanup and recovery equipment of FIG. 2-C in a raised and locked position.

FIG. 10-A illustrates an overhead view of the vessel of FIG. 1-A with the cleanup and recovery equipment of FIG. 2-A in a deployed position.

FIG. 10-B Is an overhead view of the vessel of FIG. 10-A with the tow boats deployed.

FIG. 12-B illustrates the vessel of FIG. 12-A in with the cleanup and recovery equipment in a stored position.

FIG. 12-C illustrates an overhead view of an alternative embodiment of a floating cleanup and recovery vessel with side-mounted equipment in the process of being deployed.

FIG. 12-D is an overhead view of a containment boom winch and boom slide of the vessel of FIG. 12-C.

FIG. 18-A illustrates a profile view of the cleanup and recovery equipment of FIG. 12-A in a deployed position.

FIG. 18-B illustrates a profile view of the back portion the cleanup and recovery equipment of FIG. 15.

FIG. 19-A illustrates an overhead view of a vessel equipped with the cleanup and recovery equipment of FIG. 15, in the process of deployment.

FIG. 19-B illustrates an overhead view of the vessel of FIG. 19-A with its equipment fully raised and stored.

FIG. 20-A illustrates a profile view of the forward side an alternative embodiment of side-mounted floating contaminant cleanup and recovery equipment having hydraulic cylinders and a tee bar brush in a raised position.

FIG. 20-B illustrates the cleanup and recovery equipment of FIG. 20-A with the tee brush in a lowered position.

FIG. 20-C illustrates a profile view of the hydraulic cylinders and tee bar brush.

FIG. 20-D illustrates a profile view of the front side of the cleanup and recovery equipment of FIG. 20-A.

FIG. 21-B illustrates the vessel of FIG. 21-A with the cleanup and recovery equipment in a deployed position.

FIG. 22-A illustrates a profile view of a cleanup and recovery equipment inside of the vessel of FIG. 21-A, including a telescoping pickup pipe connected to a floating assembly.

FIG. 22-B illustrates an overhead view of the telescopic or extendable pipe of FIG. 22-A.

FIG. 22-C illustrates an frontal view of the floating assembly of FIG. 22-A.

FIG. 24-B illustrates an overhead view of the cleanup and recovery equipment of FIG. 12-C.

FIG. 25-A illustrates an overhead view of the cleanup and recovery equipment of FIG. 24-B.

FIG. 25-B. is a drawing of a frontal view of the cleanup and recovery equipment of FIG. 25-A

FIG. 29-A illustrates a frontal view of an alternative embodiment of floating contaminant cleanup and recovery equipment.

FIG. 29-B illustrates an overhead view of an alternative embodiment of floating contaminant cleanup and recovery equipment.

FIG. 29-C illustrates a profile view of a floating contaminant cleanup and recovery vessel with the equipment of FIG. 29-B.

FIG. 30-A illustrates a rear view of gravity-fed cleanup and recovery equipment having a telescopic tubes and a float.

FIG. 30-B illustrates a perspective view of the top flange plate of FIG. 30-A.

FIG. 30-C illustrates a perspective view of the outer periphery of the very lowest portion of the telescopic tube.

FIG. 30-D illustrates a telescopic tube of FIG. 30-A.

FIG. 30-E illustrates a second telescopic tube of FIG. 30-A.

FIG. 31-A illustrates a perspective view of the intake port tube of FIG. 30-A.

FIG. 31-B illustrates a perspective view of the adjustable knob that may engage the intake port of 31-A for manual adjustment.

FIG. 31-C illustrates a perspective view of the reversible motor and threaded rod of FIG. 30-A.

FIG. 31-D illustrates an overhead view of the float of FIG. 30-A.

FIG. 31-E illustrates an overhead view of an alternative embodiment of a flush mountable block for a float.

FIG. 31-F illustrates a back view of an alternative embodiment of float and reversible motor.

FIG. 33-A illustrates a profile view of an alternative embodiment of vacuum cleanup and recovery equipment intake and float portion.

FIG. 33-B illustrates a profile view of an alternative embodiment of vacuum cleanup and recovery equipment intake and float portion.

FIG. 33-C illustrates a profile view of an alternative embodiment of vacuum cleanup and recovery equipment intake and float portion.

FIG. 33-D illustrates a profile view of an alternative embodiment of vacuum cleanup and recovery equipment intake and float portion.

FIG. 34-A illustrates a profile view of an alternative embodiment of gravity-fed cleanup and recovery equipment, with a swing gate.

FIG. 34-B illustrates a profile view of the equipment of FIG. 34-A with the swing gate in a raised position.

FIG. 34-C illustrates a back view of the cleanup and recovery equipment of FIG. 34-A.

FIG. 34-D illustrates a back view of an alternative embodiment having vacuum cleanup and recovery equipment with a float having a swing gate.

FIG. 34-E illustrates a profile view of an embodiment of the vacuum cleanup and recovery equipment that includes also includes a swing gate.

FIG. 34-F illustrates an overhead view of the cleanup and recovery equipment of FIG. 34-A.

FIG. 34-G illustrates an alternative embodiment with vacuum cleanup and recovery equipment.

FIG. 34-H. illustrates an alternative embodiment with vacuum cleanup and recovery equipment.

FIG. 34-I illustrates an overhead view of alternative embodiment of gravity fed cleanup and recovery equipment with interlocking tracks.

FIG. 34-J illustrates a back view of the cleanup and recovery equipment of FIG. 34-G.

FIG. 35-A illustrates an alternative embodiment of a floating contaminant cleanup and recovery vessel with forward-mounted equipment in the process of deployment.

FIG. 35-B illustrates the vessel of FIG. 35-A with the floating contaminant cleanup and recovery vessel in a stored position.

FIG. 38-A illustrates a frontal view of the cleanup and recovery equipment of FIG. 36, with hydraulic cylinders and tee bar brush in its raised position.

FIG. 38-B illustrates a frontal view of the cleanup and recovery equipment of FIG. 36, with hydraulic cylinders and tee bar brush in its lowered position.

FIG. 40 is an overhead view of an alternative embodiment of a floating contaminant cleanup and recovery vessel having a catamaran type hull configuration and the cleanup and recovery equipment disposed between the two catamaran hulls and includes main floats.

FIG. 41-A illustrate an overhead view of a containment boom slide and spool winch of FIG. 40.

FIG. 41-B illustrates a platform and spool winch of FIG. 41-A.

FIG. 41-C illustrates an overhead view of a mounting base for the spool winch of FIG. 41-A.

FIG. 41-D illustrates an overhead view of a rotating drive motor, crown gear and mounting base.

FIG. 41-E illustrates a profile view of the spool winch of FIG. 41-A mounted in armatures.

FIG. 41-F illustrates a bottom view of the containment boom slide of FIG. 41-A.

FIG. 41-G illustrates an overhead view of the containment boom slide of FIG. 41-A.

FIG. 43-A illustrates an overhead view of the containment boom towing vessel.

FIG. 43-B illustrates rear view of the towing vessel of FIG. 43-A.

FIG. 43-C illustrates a profile view of an alternative embodiment of a containment boom towing vessel with an enclosed cabin.

FIG. 43-D illustrates an overhead view of the towing vessel of FIG. 43-C.

FIG. 43-E illustrates a blown-up view of the an embodiment of a containment booms.

FIG. 43-F illustrates a profile view of containment boom of FIG. 43-E.

FIG. 43-G illustrates a profile view of an embodiment of a smaller flexible connecting panel of a containment boom.

FIG. 43-H illustrates a profile view of the connecting panel of FIG. 43-G with a cover.

FIG. 43-I illustrates a frontal view of an embodiment of a containment boom.

FIG. 43-J illustrates an end portion of the containment boom of FIG. 43-I without a securing screw.

FIG. 43-K illustrates an end portion of the containment boom of FIG. 43-I, with a securing screw.

FIG. 43-L illustrates an overhead view of and embodiment of a containment booms of 43I and the connecting panel of FIG. 43-H.

FIG. 43-M illustrates a profile view of the containment booms of FIG. 43-I with lower stabilizing armatures and chains.

FIG. 43-N illustrates a profile view the containment booms, armatures and chains of FIG. 43-M in folded position.

FIG. 43-O illustrates a profile view the containment booms of FIG. 43-M.

FIG. 43-P illustrates a profile view of the armature of FIG. 43-M.

FIG. 43-Q illustrates an overhead view of the armature of FIG. 43-M.

FIG. 43-R illustrates an embodiment of a contaminant containment boom panel and chains attached to a track trolley.

FIG. 43-S illustrates a profile view of connecting panel shackles connecting containment booms.

FIG. 43-T illustrates a profile view of the connecting panel of FIG. 43-S with cover.

FIG. 43-U illustrates an overhead view of an a track trolley riding in a trolley track including a male joint connected to the female end portion of a containment boom of FIG. 43-R. In this embodiment thereof.

Figure 44:
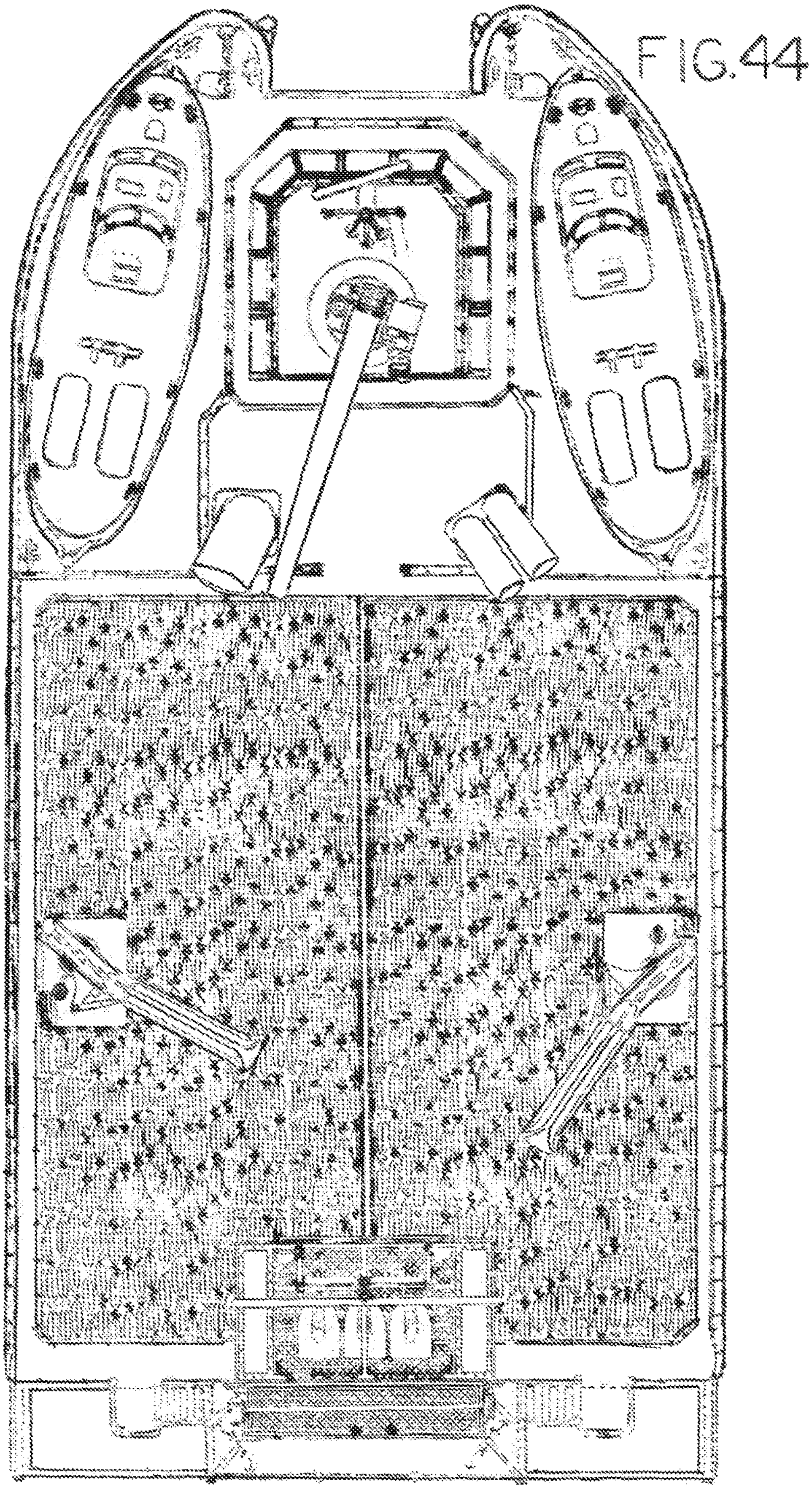

FIG. 43-V illustrates an overhead view of an alternative embodiment of a track trolley connected to the end portion of a containment boom panel by means of shackles FIG. 44 illustrates an overhead view of an alternative embodiment of a floating containment cleanup and recovery vessel having a catamaran type hull configuration.

FIG. 45-A illustrates a drawing of an overhead view, of an embodiment of cleanup and recovery equipment of the vessel of FIG. 44 including debris a catch basin.

FIG. 45-B illustrates a backside view of an embodiment of a floating contaminant containment panel of FIG. 45-A.

FIG. 45-C illustrates an overhead view of the containment panel of FIG. 45-B.

FIG. 45-D is an overhead frontal perspective view the containment panel of FIG. 45-C.

FIG. 45-E illustrates a backside view of an embodiment of the floating deflection panels of FIG. 45-A.

FIG. 45-F illustrates an overhead view of the deflection panels of FIG. 45-E.

FIG. 45-G illustrates a back side view of an embodiment of the smaller floating deflection panels of FIG. 45-A.

FIG. 45-H illustrates an overhead the smaller floating deflection panels of FIG. 45-G.

FIG. 45-I illustrates a frontal view the smaller floating deflection panels of FIG. 45-G.

FIG. 45-J illustrates a frontal view of one of a deflection panel of FIG. 45-E.

FIG. 45-K illustrates a frontal view of one a roller of the panels of FIGS. 45-B, 45-E and 45-G.

FIG. 45-L is a profile view of the internal structure of roller of FIG. 45-K.

FIG. 46-A illustrates a rear view of the vessel of FIG. 44 with cleanup and recovery equipment in a lowered positon.

FIG. 46-B illustrates a rear view the cleanup and recovery equipment of FIG. 44.

FIG. 46-C illustrates a frontal view of the debris catch basin of FIG. 46-B.

FIG. 46-D illustrates an overhead view of the debris catch basin of FIG. 46-B.

FIG. 46-E illustrates a profile of the debris catch basin along of FIG. 46-B.

FIG. 47-A illustrates a rear view of the vessel of FIG. 46-A with the catch basin in a raised position to allow debris and contaminants to be deposited in storage bins.

FIG. 47-B illustrates an overhead view of waste storage bins of FIG. 47-A.

FIG. 47-C illustrates a profile view of two gussets for the waste storage bins of FIG. 47-A.

FIG. 47-D illustrates a backside view of the cleanup and recovery equipment of FIG. 47-A FIG. 48-A illustrates a rear view of a floating contaminant cleanup and recovery vessel with more of a catamaran type of hull configuration, with the cleanup and recovery equipment shown in fully lowered and raised positions.

FIG. 48-B illustrates a side perspective view of an embodiment of cleanup and recovery equipment of FIG. 48-A, including a telescopic tube housing and telescopic tubes.

FIG. 48-C illustrates a top perspective view of the telescoping tube of FIG. 48-B, and related o-rings.

FIG. 48-D illustrates a top perspective view of the telescopic tube housing and the telescopic tubes of FIG. 48-B.

FIG. 48-E illustrates a profile view of telescopic tube housing and telescopic tubes with floats, of FIG. 48-A.

FIG. 48-F illustrates a profile view of a telescopic tubes and housing of FIG. 48-A.

FIG. 49-A. illustrates an overhead view of a catamaran type of contaminant cleanup and removal vessel, equipped with conveyor cleanup and recovery equipment.

FIG. 49-B illustrates an overhead view of the vessel of FIG. 49-A, with components covering the conveyor belt removed.

FIG. 49-C illustrates a rear view of the vessel of FIG. 49-A.

FIG. 49-D illustrates a profile view of the internal conveyor structure of the vessel of FIG. 49-A.

FIG. 49-E illustrates a profile view, of the upper portion of the conveyor cleanup and recovery equipment of FIG. 49-A.

FIG. 49-F illustrates an overhead view of an embodiment the conveyor cleanup and recovery equipment.

Figure 39:
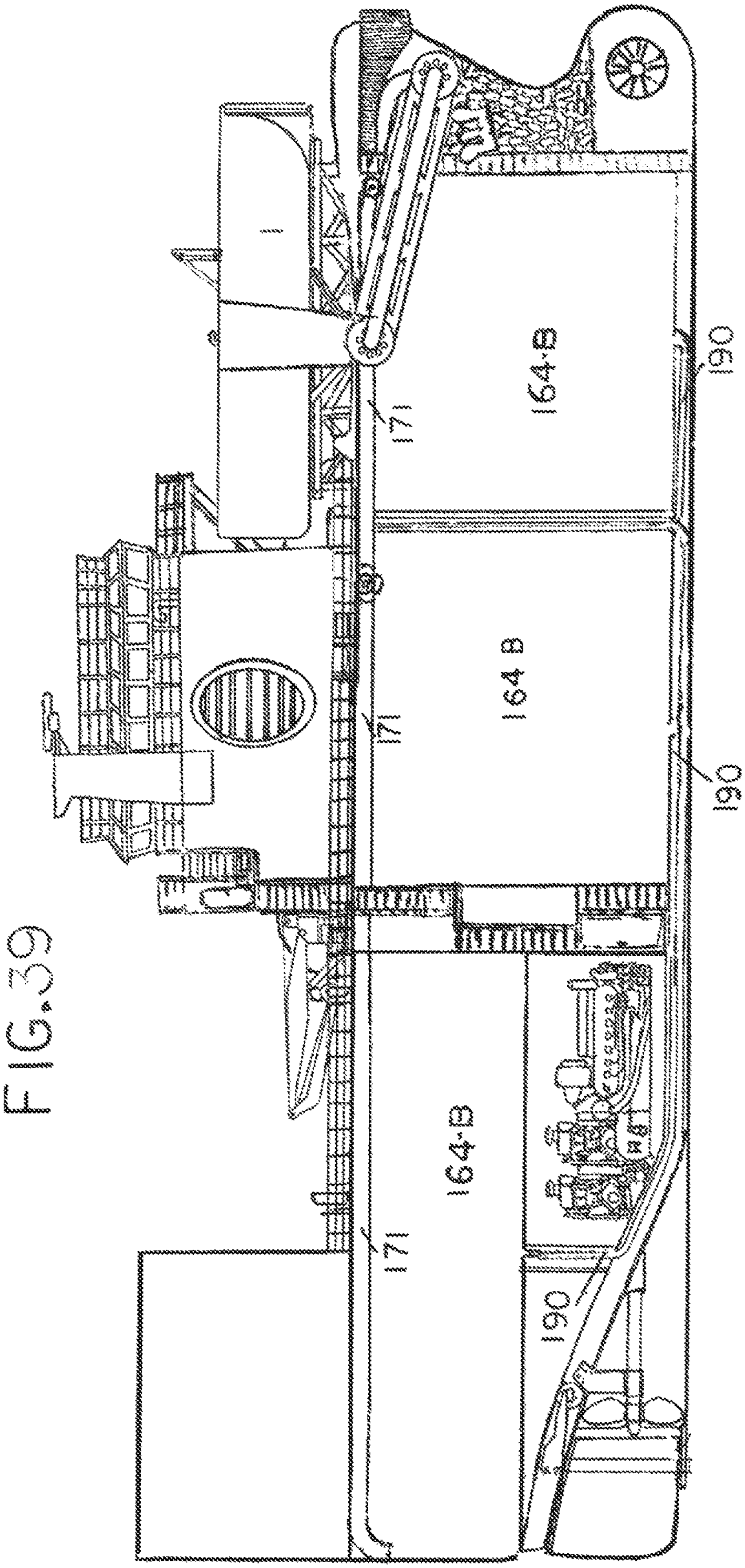
FIG. 39 illustrates a profile view of the vessel of FIG. 35-A with the cleanup and recovery equipment in stored position.

FIG. 49-G illustrates a profile view, of an embodiment of a portion of the conveyor of FIG. 39-E.

FIG. 49-H illustrates a perspective view of a compression plate of FIG. 49-G.

FIG. 49-I illustrates a blown-up, bottom view of a conveyor of FIG. 49-A.

FIG. 49-J illustrates a top, perspective view of the conveyor of FIG. 49-A.

FIG. 49-K illustrates an overhead view of a conveyor of FIG. 49-J with a cover added.

FIG. 49-L illustrates an overhead view of an alternative embodiment of a conveyor cover for the conveyor of FIG. 49-J.

FIG. 49-M illustrates an overhead view the vessel of FIG. 49-A with the cleanup and recovery equipment fully deployed.

Figure 50:
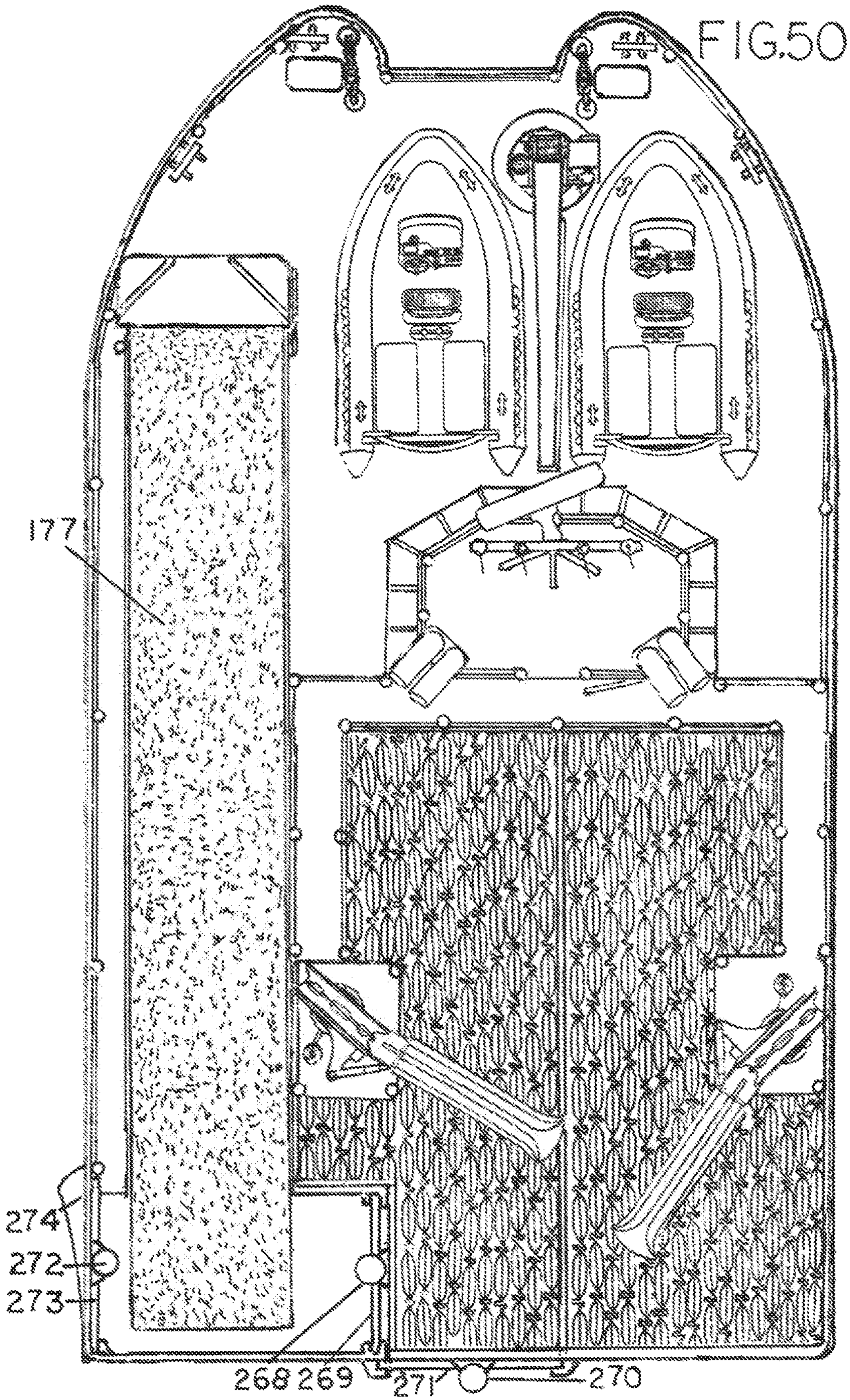

FIG. 50 illustrates an overhead view of an alternative embodiment of a conveyor-type floating contaminant cleanup and recovery vessel.

FIG. 51-A illustrates an alternative embodiment of a conveyor-type floating contaminant cleanup and recovery vessel with no propulsion.

FIG. 51-B illustrates an overhead view of the vessel of FIG. 51-A connected to and towed by two towing vessels.

Figure 52A:
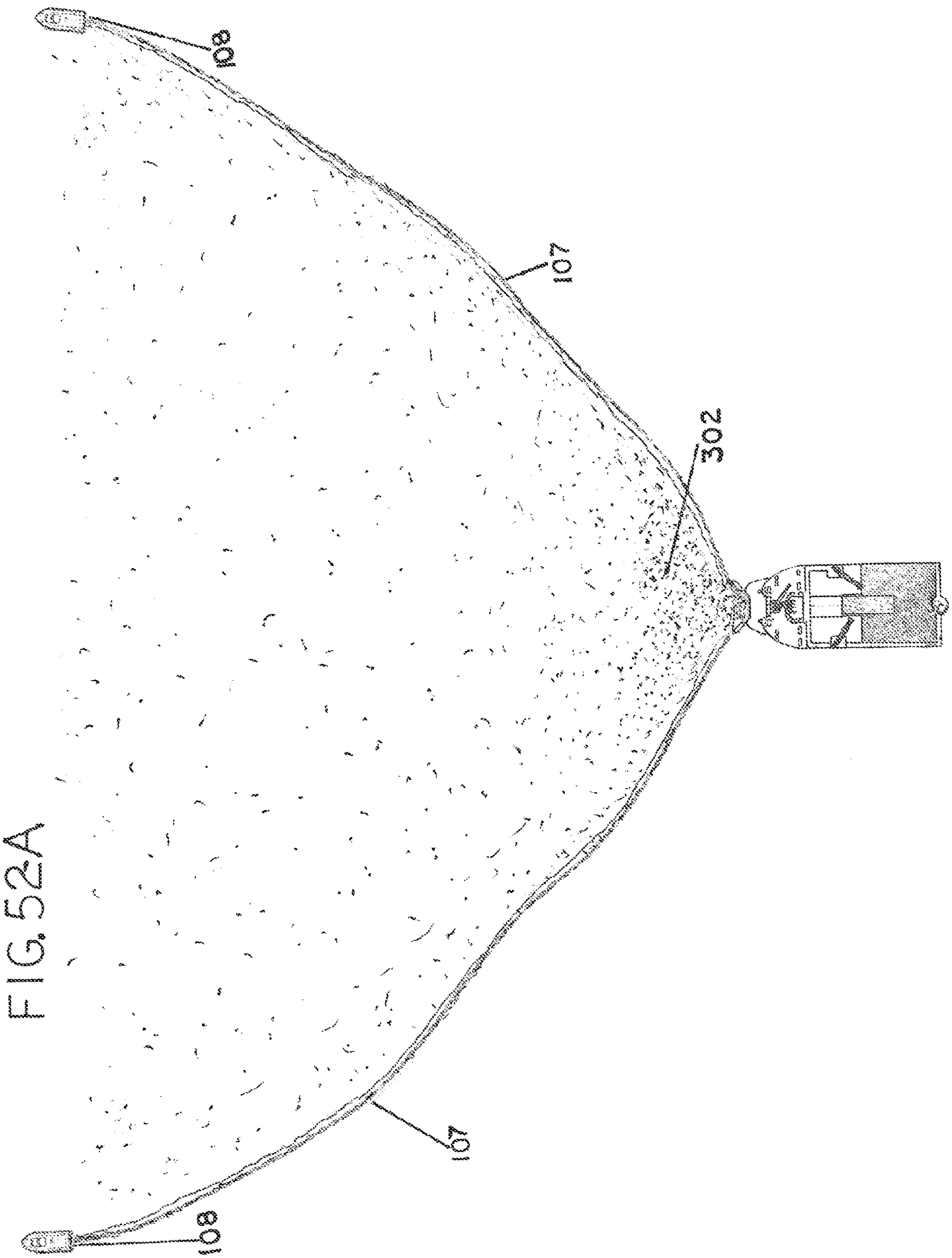

FIG. 52-A illustrates an overhead view of a conveyor-type catamaran floating contaminant cleanup up vessel with the cleanup and recovery equipment deployed.

FIG. 52-B illustrates an overhead view of the vessel of FIG. 52-A, with the cleanup and recovery equipment stored without a forward float.

FIG. 52-C illustrates the vessel of FIG. 52-A with the cleanup and recovery equipment deployed, and intervening, with collected contaminant deposited in the storage compartment.

FIG. 52-D illustrates an embodiment of the conveyor of the vessel of FIG. 52-A with a brush to remove contaminants from same.

FIG. 52-E illustrates an embodiment of the conveyor of the vessel of FIG. 52-A with a blade to remove contaminants from same.

FIG. 52-F illustrates an embodiment of the conveyor of the vessel of FIG. 52-A with an internal blower to remove contaminants from same.

FIG. 52-G illustrates a bottom view the ducting for the blower of FIG. 52-F.

FIG. 52-H illustrates a frontal view of the end portion the ducting of FIG. 52-G.

FIG. 52-I illustrates a profile view of the blower ducting nozzle of FIG. 52-G.

FIG. 52-J illustrates an overhead view of the forward intake portion of the vessel of FIG. 52-A.

FIG. 52-K illustrates an overhead view the vessel of FIG. 52-A rafted to a larger contaminant transporting vessel, and depositing collected contaminants in same.

FIG. 52-L. illustrates a profile, internal view of the vessel of FIG. 52-A showing the full length of the conveyor.

DETAILED DESCRIPTION

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

A system for removing contaminants floating on or near the surface of a body of water, the system may include a floating contaminant cleanup and recovery vessel, which may include contaminant cleanup and recovery equipment that may have at least one intake port capable of removing floating contaminants from the body of water to be transported to the recovery vessel. The system may further include a first towboat and a second towboat. The system may also include a first containment boom capable of being connected to the first tow boat and to a starboard side of a vessel. The system may also include a second containment boom capable of being connected to the second tow boat and a port side of the vessel, such that during operation the first and second towboats extend out from the vessel such that the first and second containment booms gather the floating contaminants from the body of water and channel them to the at least one intake port.

The system's contaminant cleanup and recovery equipment may further include a primary float connected to, and providing buoyancy for, the intake port. The intake port may be capable of having a fluid connection to a storage tank, and may include at least one tube housing, housing at least one tube. The at least one tube may include a first tube connected to the intake port, such that the contaminants collected through the intake port may be capable of being transported through the first tube and the fluid connection to the storage tank.

The system's contaminant cleanup and recovery equipment may further include a conveyor having a first end and a second end, where the first end of the conveyor is the intake port, and wherein the conveyor, when activated, is capable of lifting contaminants out of a body of water and conveying the contaminants to a contaminant removal portion such that the contaminant can be deposited into a storage tank. Such system may further include interchangeable conveyor covers such that each conveyor cover is specifically effective to the removal of a particular type of contaminant from the body of water.

The system's contaminant cleanup and recovery equipment may further include a framework comprising a first framework section disposed on a hull of the vessel, and a second framework section. At least one upper armature may connect the first framework section to the second framework section wherein each armature of the at least one upper armature may have a first pivot joint connecting the armature to the first framework section in a pivoting connection, and a second pivot joint connecting the armature to the second framework section in a pivoting connection. At least one lower armature may connect the first framework section to the second framework section wherein each armature of the at least one lower armature may have a first pivot joint connecting the armature to the first framework section in a pivoting connection, and a second pivot joint connecting the armature to the second framework section in a pivoting connection. A first float may house the intake port disposed within the second framework section. The system's contaminant cleanup and recovery equipment may further include at least one tube, which may have a first tube connected to the intake port. The at least one tube connected to piping that is capable of being in fluid connection to a storage tank.

The system's contaminant cleanup and recovery equipment may further include a framework capable of being disposed on a hull of the vessel. The framework may include a distal framework section. At least one upper armature that may be connected to a first pivot joint capable of being disposed on the hull of the vessel and to a second pivot joint disposed on the distal framework section. At least one lower armature may be connected to a first pivot joint capable of being disposed on the vessel and to a second pivot joint disposed on the distal framework section, such that the at least one upper armature and the at least one lower armature allow the distal framework section to raise and lower relative to the hull of the vessel. A first float may house the intake port disposed within the distal framework section. The system's contaminant cleanup and recovery equipment may further include at least one tube, which may have a first tube connected to the intake port. The at least one tube may be connected to piping that is capable of being in fluid connection to a storage tank.

The system's first and/or second containment booms may further include a first end and a second end, and a float. An armature may have a first end pivoting relative to the float, and a second end capable of attaching to a chain.

The system's first and/or second towboat may include a hull comprising a deck, a keel and an aft portion. A pivoting axle may include an upper portion and a lower portion, and the pivoting axle may extend through the hull such that the upper portion is disposed above the deck and the lower portion is disposed beneath the keel. An upper pivotable armature may have a first end disposed on the upper portion of the pivoting axle, and a second end. A lower pivotable armature may have a first end disposed on the lower portion of the pivoting axle, and a second end. A connecting member may connect the upper pivotable armature and the lower pivotable armature behind the aft portion of the hull such that the upper an lower armatures can pivot around the aft portion of the hull.

A vessel for removing contaminants floating on or near the surface of a body of water may include a contaminant cleanup and recovery equipment, which may include at least one intake port capable of removing floating contaminants from the body of water to be transported to the vessel. The vessel may include a first towboat and a second towboat, a first containment boom that may be capable of being connected to the first tow boat and to a starboard side of the vessel, and a second containment boom that may be capable of being connected to the second tow boat and a port side of the vessel, such that during operation the first and second towboats may extend out from the vessel such that the first and second containment booms gather the floating contaminants from the body of water and channel them to the at least one intake port.

The vessel's contaminant cleanup and recovery equipment may further include a primary float that may be connected to, and provide buoyancy for, the intake port. The intake port may be capable of having a fluid connection to a storage tank, where the fluid connection may include at least one tube housing, housing at least one tube. The at least one tube may include a first tube that may be connected to the intake port, such that the contaminants collected through the intake port are may be capable of being transported through the first tube and the fluid connection to the storage tank.

The vessel's contaminant cleanup and recovery equipment may further include a conveyor having a first end and a second end, where the first end of the conveyor is the intake port. The conveyor, when activated, may be capable of lifting contaminants out of a body of water and conveying the contaminants to a contaminant removal portion such that the contaminant can be deposited into a storage tank. The equipment may further include interchangeable conveyor covers such that each conveyor cover is specifically effective to the removal of a particular type of contaminant from the body of water.

The vessel s contaminant cleanup and recovery equipment may further include a framework which may include a first framework section disposed on a hull of the vessel and a second framework section. At least one upper armature may connect the first framework section to the second framework section, where each armature of the at least one upper armature may have a first pivot joint connecting the armature to the first framework section in a pivoting connection, and a second pivot joint connecting the armature to the second framework section in a pivoting connection. At least one lower armature may connect the first framework section to the second framework section, where each armature of the at least one lower armature may have a first pivot joint connecting the armature to the first framework section in a pivoting connection, and a second pivot joint connecting the armature to the second framework section in a pivoting connection. A first float may house an intake port disposed within the second framework section. The vessel's contaminant cleanup and recovery equipment further may include at least one tube, which may include a first tube connected to the intake port. The at least one tube may be connected to piping that is capable of being in fluid connection to a storage tank.

The vessel's contaminant cleanup and recovery equipment may further include a framework capable of being disposed on a hull of the vessel. The framework may include a distal framework section. At least one upper armature may be connected to a first pivot joint that may be capable of being disposed on the hull of the vessel and to a second pivot joint disposed on the distal framework section. At least one lower armature may be connected to a first pivot joint that may be capable of being disposed on the hull of the vessel and to a second pivot joint disposed on the distal framework section. The at least one upper armature and the at least one lower armature allow the distal framework section to raise and lower relative to the vessel. A first float may house the intake port disposed within the distal framework section. The vessel's contaminant cleanup and recovery equipment may further include at least one tube, the at least one tube comprising a first tube connected to the intake port, and at least one tube connected to piping that is capable of being in fluid connection to a storage tank.

The vessel's first and/or second containment booms may include a first end and a second end, and a float. An armature may have a first end pivoting relative to the float, and a second end capable of attaching to a chain.

The vessel's first and/or second towboat may include a hull comprising a deck, a keel and an aft portion. A pivoting axle may include an upper portion and a lower portion. The pivoting axle may extend through the hull such that the upper portion is disposed above the deck and the lower portion is disposed beneath the keel. An upper pivotable armature may include a first end disposed on the upper portion of the pivoting axle, and a second end. A lower pivotable armature may include a first end disposed on the lower portion of the pivoting axle, and a second end. A connecting member may connect the upper pivotable armature and the lower pivotable armature behind the aft portion of the hull. The upper and lower armatures may be able to pivot around the aft portion of the hull.

A system for removing contaminants floating on or near the surface of a body of water may include a floating contaminant cleanup and recovery vessel, which may include contaminant cleanup and recovery equipment that may have a framework capable of being disposed on a hull of the vessel. The framework may include a distal framework section. At least one upper armature may be connected to a first pivot joint capable of being disposed on the hull of the vessel and to a second pivot joint disposed on the distal framework section. At least one lower armature may be connected to a first pivot joint capable of being disposed on the hull of the vessel and to a second pivot joint disposed on the distal framework section. The at least one upper armature and the at least one lower armature may allow the distal framework section to raise and lower relative to the vessel. A first float may house the intake port disposed within the distal framework section. The system may also include a first towboat and a second towboat, a first containment boom capable of being connected to the first tow boat and to a starboard side of a vessel, and a second containment boom capable of being connected to the second tow boat and a port side of the vessel. During operation the first and second towboats extend out from the vessel such that the first and second containment booms gather the floating contaminants from the body of water and channel them to the at least one intake port.

A vessel for removing contaminants floating on or near the surface of a body of water, may include a first contaminant cleanup and recovery equipment capable of being in fluid connection with the vessel. The first contaminant cleanup and recovery equipment may include at least one intake port, capable of removing contaminants from the surface of the body water, to be transported to the vessel.

The vessel's contaminant cleanup and recovery equipment may include at least one valve in the fluid connection between the at least one intake port, and the vessel. The vessel's contaminant cleanup and recovery equipment may remove contaminants from under the surface of the water by means of surface tension and gravity. The vessel's contaminant cleanup and recovery equipment may remove contaminants from the water by means of gravity alone. The vessel's contaminant cleanup and recovery equipment may remove contaminants from above the surface of the water. The vessel's contaminant cleanup and recovery equipment may remove contaminants from above the surface of the water by means of vacuum, low pressure or pressure differentials. Contaminants captured by the cleanup and recovery equipment may additionally be transported to the vessel by means vacuum, or low air pressure.

The vessel may further include at least one towboat, wherein each of the at least one tow boat may be capable of being connected to at least one containment boom such that when the tow boat is deployed the at least one containment boom connected to the tow boat extends from the towboat to the vessel so as to channel contaminants floating on or near the surface of the body of water to the contaminant cleanup and recovery equipment. The vessel may further include tow boat storage space for the at least one tow boat, and containment boom storage bins for the at least one containment boom for each of the at least one tow boat.

The vessel may further include at least one spool winch and a at least one containment boom slide to facilitate deployment of the at least one containment boom for each of the at least one tow boat. The at least one towboat may include a first tow boat and a second towboat, that may be extended out from the vessel on opposite sides of the at least one intake, thereby forming a funnel to channel floating contaminant toward the at least one intake.

The contaminant cleanup and recovery equipment may be disposed on a bow of the vessel. The contaminant cleanup and recovery equipment may be disposed on a stern of the vessel. The contaminant cleanup and recovery equipment may be disposed on either a port or a starboard side of the vessel. The contaminant cleanup and recovery equipment may be disposed on either a port side of the vessel, and a second contaminant cleanup and recovery equipment disposed on a starboard side of the vessel, the second contaminant cleanup and recovery equipment and with each comprising at least one intake port capable of receiving floating contaminant to be transported to the at least one storage tank.

The vessel may be of a catamaran-type that may include a first hull and a second hull. The contaminant cleanup and recovery equipment may disposed between the first hull and the second hull of the vessel.

The vessel may further include at least one tow boat comprises both a first tow boat towing a first containment boom extended out in from the first hull of the vessel and a second tow boat towing a second containment boom extended out from the second hull of the vessel opposite each other in a funnel formation to channel floating contaminants back to at least one intake. The vessel may not have a propulsion system such that it must be towed by at least one tow boat.

The vessel may further include a crane, where the contaminant cleanup and recovery equipment may be deployable, and the crane may be capable of moving the first contaminant cleanup and recovery equipment to and from a stored position and a deployed position.

The vessel may further include at least one containment boom connected between to the hull of the vessel and the contaminant cleanup and recovery equipment to help channel contaminant to the intake port.

The vessel may further be provided with controls for controlling the contaminant cleanup and recovery equipment. The vessel may further include a contaminant and water separation tank through which contaminant collected at the at least one intake port is passed through to separate out any water that is mixed with the contaminant, before the contaminant is transported to the storage tank. The vessel may further include a pump separate from the first contaminant cleanup and recovery equipment to provide suction to the intake port. The vessel may further include second contaminant cleanup and recovery equipment.

Any of the vessels described above may include any of the equipment for removing contaminants floating on or near the surface of the water described below.

A system for removing contaminants floating on or near the surface of a body of water may include a floating contaminant cleanup and recovery vessel, which may include contaminant cleanup and recovery equipment that may have at least one intake port capable of removing floating contaminants from the body of water to be transported to the vessel. The system may further include a first towboat and a second towboat, a first containment boom capable of being connected to the first tow boat and to the vessel, and a second containment boom capable of being connected to the second tow boat and the vessel. During operation the first and second towboats extend out from the vessel such that the first and second containment booms gather the floating contaminants from the body of water and channel them to the at least one intake port.

A system for removing contaminants floating on or near the surface of a body of water may include a floating contaminant cleanup and recovery vessel, which may include contaminant cleanup and recovery equipment that may have at least one intake port capable of removing floating contaminants from the body of water to be transported to the recovery vessel. The system may further include a first towboat and a first containment boom capable of being connected to the first tow boat and to the vessel, such that during operation the first towboats extend out from the vessel such that the first containment boom gathers the floating contaminants from the body of water and channels them to the at least one intake port.

The system may further include a second towboat and a second containment boom capable of being connected to the second tow boat and the vessel, such that during operation the first towboats may extend out from the vessel such that the second containment boom gathers the floating contaminants from the body of water and channels them to the at least one intake port. The system may further include second contaminant cleanup and recovery equipment. The connection from the first and/or second containment booms to the vessel may be effectuated on the contaminant cleanup and recovery equipment of the vessel.

Any of the systems described above may include any of the equipment for removing contaminants floating on or near the surface of the water described below and/or any of the vessels described above.

Equipment for removing contaminants floating on the surface of a body of water may include a primary float connected to, and providing buoyancy for, an intake port the intake port capable of having a fluid connection to a storage tank. The fluid connection may include at least one tube housing, housing at least one tube. The at least one tube may include a first tube connected to the intake port such that the contaminants collected through the intake port may be capable of being transported through the first tube and the fluid connection to the storage tank.

The equipment's first tube may be a telescopic tube capable of being extended or retracted from the tube housing. The first tube may be provided with a secondary float providing the first tube with buoyancy independent of the primary float. The equipment may further include a second tube connected to and containing the first tube, such that the first tube can be extended from or retracted into the second tube, and wherein the second tube is a telescopic tube capable of being extended from or retracted into the tube housing. The second tube may be provided with a secondary float providing the second tube with buoyancy independent of the primary float. The intake port portion of the tube is height adjustable relative to the secondary float.

The floating contaminant cleanup and recovery equipment may utilize surface tension and gravity to pull the collected contaminants into the intake port and remove same from the surface of the water. The equipment may include air evacuating equipment to create low pressure in the at least one storage tank, both to remove floating contaminants from the surface of the water, as well as transport same to the one, or more storage tanks for same.

The equipment's framework may include at least one deflection panel. The equipment may additionally possess at least one cable connection the vessel.

Equipment for removing contaminants floating on or near the surface of a body of water may include a conveyor having a first end and a second end, wherein the first end of the conveyor is an intake port, and wherein the conveyor, when activated, may be capable of lifting contaminants out of a body of water and conveying the contaminants to a contaminant removal portion such that the contaminant can be deposited into a storage tank.

The conveyor may be height adjustable, to control the depth at which a first end of the conveyor is submerged beneath the surface of the body of water, or the height above the surface of the body of water at which the conveyor is held. The conveyor may be disposed at an angle rising from the first end to the second end. The equipment may further include interchangeable conveyor covers with each specifically effective to the removal of a particular type of contaminant from the body of water. The conveyor may be water permeable such that it allows water to freely pass through same.

The contaminant removal portion of the conveyor may include a compression plate. The compression plate may create a fluid seal between the outer surface portion of the conveyor and the bottom surface of the interchangeable covers, and may effectuate removal of the contaminants from same. The contaminant removal portion may include a brush that brushes contaminant off of the conveyor covers. The contaminant removal portion may include a blade that scrapes contaminants off of the conveyor covers. The contaminant removal portion may include a blower that blows contaminant off the conveyor.

The equipment may include at least one deflection panel. The equipment may include at least one cable with a connection to the vessel.

Equipment for the removal of contaminants from surface of a body of water may include a framework. The framework may include a first framework section that may be disposed on a vessel and a second framework section. At least one upper armature may connect the first framework section to the second framework section. Each armature of the at least one upper armature may have a first pivot joint connecting the armature to the first framework section in a pivoting connection and a second pivot joint connecting the armature to the second framework section in a pivoting connection. At least one lower armature may connect the first framework section to the second framework, section wherein each armature of the at least one lower armature may have a first pivot joint connecting the armature to the first framework section in a pivoting connection, and a second pivot joint connecting the armature to the second framework section in a pivoting connection. The equipment may also include a first float may house an intake port disposed within the second framework section, and at least one tube. The at least one tube may include a first tube connected to the intake port. The at least one tube may be connected to piping that may be capable of being in fluid connection to a storage tank.

The equipment of claim may include a height adjustment control capable of raising or lowering the intake port to control its height relative to a water level of the body of water. The height adjustment control may use hydraulic lifts to raise or lower the intake port. The height adjustment control may electrically raise or lower the intake port. The height adjustment control uses a threaded rod to raise or lower the intake port.

The equipment may include a screen, hydraulic cylinders and a tee bar brush such that the hydraulic cylinders may be capable of raising and lowering the tee bar brush along the screen to brush contaminant off of the screen and towards the intake. The first tube may be a telescopic tube having an upper portion, and a second float is disposed on the upper portion such that the first telescopic tube is rendered neutrally buoyant in the body of water. The second float may be a ring float. The at least one tube may be housed within a tube housing and further may comprises a second tube, wherein the first tube and the second tube are telescopic tubes capable of being extended and retracted relative to the tube housing and each other. The second tube may be provided with a second float disposed on an upper portion of the second tube such that second tube is neutrally buoyant in the body of water. The equipment may further include height adjustment controls that can raise or lower the intake port relative to the second float.

The equipment may further include a receiving tank in fluid connection with the piping such that contaminant received in the intake port can be collected in the receiving tank. The receiving tank may be disposed in the first framework section. The receiving tank may be capable of being in fluid connection with a storage tank on a vessel. The equipment may include an evacuation pump in fluid connection with the intake port and the at least one tube, such that the evacuation pump can draw contaminants into the intake port.

The piping may include a first pipe joint that may be aligned with, and able to pivot with, the first pivot joint. A first pipe section may connect to the first pipe joint. A second pipe joint may be aligned with, and able to pivot with, the second pivot joint, and may connect to the first pipe section. A second pipe section may connect the second pipe joint with the at least one tube. The second pipe section may be provided with a valve. The piping may further include an evacuation pump in fluid connection, such that the evacuation pump can draw contaminants into the intake port, and through the at least one tube and the piping.

The first framework section may include a first portion and a second portion forming interlocking tracks, wherein the first portion is capable of being disposed against a vessel, and wherein the second portion can be slidably raised or lowered relative to the first portion. The equipment may further include hydraulic lifts to raise and lower the second portion relative to the first portion.

The equipment may include a guide cable or rod is provided to keep the float and intake port in a desired alignment. The second framework section may further be provided with rods capable of connecting to containment booms. The second framework section may further be provided with roller tracks capable of connecting to containment booms.

The equipment may further include a second float housing a second intake port disposed within the second framework section, the second intake port connected to the piping by a second at least one tube. The equipment may further include a third float housing a third intake port disposed within the second framework section; the third intake port connected to the piping by a third at least one tube. The equipment may further include a main float disposed on the second framework section, independent of the first float.

The intake port may include an intake port tube. The intake port tube may include a flexible coupling. The first float may include a male slide slidably engaged in a female track. The first float may include a sensor and wiring loom. The first float may include a floating gate. The first float may include a swing gate. The piping may include a vacuum tube.

The framework may further include at least one containment panel. The framework may further include at least one deflection panel. The framework may further include at least one cable possessing a connection to the vessel.

Equipment for removing contaminants floating on or near the surface of a body of water may include a framework capable of being disposed on a vessel comprising. The framework may include a distal framework section. At least one upper armature may be connected to a first pivot joint capable of being disposed on the vessel and to a second pivot joint disposed on the distal framework section. At least one lower armature may be connected to a first pivot joint capable of being disposed on the vessel and to a second pivot joint disposed on the distal framework section. The at least one upper armature and the at least one lower armature may allow the distal framework section to raise and lower relative to the vessel. The equipment may further include a first float housing an intake port disposed within the distal framework section.

The equipment may further include at least one tube, which may include a first tube connected to the intake port. The at least one tube may be connected to piping that is capable of being in fluid connection to a storage tank. The equipment may further include a height adjustment control capable of raising or lowering the intake port to control its height relative to a water level of the body of water. The height adjustment control may control hydraulic lifts to raise or lower the intake port. The height adjustment control may electrically raise or lower the intake port. The height adjustment control may use a threaded rod to raise or lower the intake port. The framework may include a screen, hydraulic cylinders and a tee bar brush such that the hydraulic cylinders are capable of raising and lowering the tee bar brush along the screen to brush contaminant off of the screen.

The first tube may be a telescopic tube having an upper portion, and a second float is disposed on the upper portion such that the first telescopic tube is rendered neutrally buoyant in the body of water. The second float may be a ring float. The at least one tube may be housed within a tube housing and may further include a second tube, where the first tube and the second tube are telescopic tubes capable of being extended and retracted relative to the tube housing and each other. The second tube may be provided with a second float disposed on an upper portion of the second tube such that second tube is neutrally buoyant in the body of water. The equipment may further include height adjustment controls that can raise or lower the intake port relative to the second float. The equipment may further include a receiving tank in fluid connection with the piping such that contaminant received in the intake port can be collected in the receiving tank. The receiving tank is disposed in the framework. The receiving tank may be capable of being in fluid connection with a storage tank on a vessel.

The equipment may further include an evacuation pump in fluid connection with the intake port and the at least one tube, such that the evacuation pump can draw contaminants into the intake port. The piping may include a first pipe joint that may be aligned with, and able to pivot with, the first pivot joint, A first pipe section may be connected to the first pipe joint. A second pipe joint may be aligned with, and able to pivot with, the second pivot joint, and may be connected to the first pipe section. A second pipe section may connect the second pipe joint with the at least one tube. The second pipe section may be provided with a valve. The piping may further include an evacuation pump in fluid connection, such that the evacuation pump can draw contaminants into the intake port, and through the at least one tube and the piping.

The framework may include a first portion and a second portion forming interlocking tracks, wherein the first portion is capable of being disposed against a vessel, and wherein the second portion can be slidably raised or lowered relative to the first portion. The equipment may further include hydraulic cylinders to raise and lower the second portion relative to the first portion. The equipment may further include hydraulic cylinders to raise and lower the distal framework section. A guide cable or rod may be provided to keep the float and intake port in a desired alignment. The distal framework section may further be provided with at least one track capable of connecting to containment booms. The distal framework section may further be provided with roller tracks capable of connecting to containment booms.

The equipment may further include a second float housing a second intake port disposed within the distal framework section; the second intake port may be connected to the piping by a second at least one tube. The equipment may further include a third float housing a third intake port disposed within the distal framework section; the third intake port may be connected to the piping by a third at least one tube. The equipment may further comprising include a main float independent disposed on the distal framework section, independent of the first float.

The intake port may include an intake port tube. The intake port tube may include a flexible coupling. The first float may include a male slide slidably engaged in a female track. The first float may include a sensor and wiring loom. The first float may include a floating gate. The first float may include a swing gate.

The piping may include a vacuum tube. The framework further may include at least one containment panel. The framework may further include at least one deflection panel. The framework may further include at least one cable extending to and connected to the vessel.

A containment boom may include a first end and a second end, a float, and an armature. The armature may have a first end pivoting relative to the float, and a second end capable of attaching to a chain. The first end may include a female track capable of receiving male joint portion of a connecting panel. The containment boom may further include a clevis pin capable of attaching the armature to the chain. The containment boom may further include a connecting panel comprising a pair of male joint parts connected by at least one shackle, and a cover, wherein one of the pair of male joint parts may be disposed in the female track of the containment boom. The containment boom may further include a bolt securing the connection of the one of the pair of male joint parts in the female track. The containment boom may further include a plurality of rigid float portions. The containment boom may further include a plurality of rigid panel portions. The individual float and panel portions may be rigid relative to each other. The containment boom may further include a plurality of rigid float portions.

A tow boat may include a hull comprising a deck, a keel and an aft portion. A pivoting axle may include an upper portion and a lower portion. The pivoting axle may extend through the hull such that the upper portion is disposed above the deck and the lower portion is disposed beneath the keel. An upper pivotable armature may have a first end disposed on the upper portion of the pivoting axle, and a second end. A lower pivotable armature may have a first end disposed on the lower portion of the pivoting axle, and a second end. A connecting member may connect the upper pivotable armature and the lower pivotable armature behind the aft portion of the hull. The upper and lower armatures may pivot around the aft portion of the hull.

Included in the following drawings and descriptions of same, include several different actual types and many examples of variations of embodiment's of floating contaminant cleanup and recovery vessels, equipment and systems, of which possess various advantages and disadvantages to each other, that lend themselves better in one way of another, relative to their primary role and mode of employment. The first two basic types of vessels and floating contaminant cleanup and recovery equipment and systems included in this application and the descriptions of same that follow include two types of equipment, that although both remove floating contaminants from the surface of the water in very different modes. Both employ all but a very small portion of the same basic floating contaminant cleanup and recovery equipment, and are employed on the same basic type of floating contaminant cleanup and recovery vessels. however all types of vessels include component equipment and system differences incorporated or added to same, both internal and external specific to each, However both vessels are employable with much of the same basic types of equipment and systems.

The third type of floating contaminant cleanup and recovery vessels and equipment included in this application are quite different than the first two and as a result thereof, neither the vessels employing same nor the actual portion of the actual contaminant cleanup and recovery equipment that actually removes the floating contaminants from the surface of the water, share anything common with the first two. This with the exception of sharing the same basic type of internal components and systems employed in the vessel itself, to remove water inadvertently captured along with the contaminants during the contaminant cleanup and recovery process This as well as all also being employable with the same basic types of equipment and systems included for the effective storage, deployment, employment and reinstallment of additional equipment employable as common by all. Such as that of the contaminant containment booms as well as the towing vessels employed for the towing of same. This as well as the system provided for the employment of same all are equippable with much of the same equipment enabling the operational speed and ease, both in their ability's to be deployed and put into service within minutes as well as abilities to reinstall same on the main contaminant and recovery vessel in about the same amount of time, but also in the performance of a broad range of all tasks needful or beneficial to the employment of same level of operational ease and efficiency.

All main floating contaminant cleanup and recovery vessels and equipment embodiment's, included in this application, as well as the contaminant containment boom towing vessels, all work together, in the exact same manner, and employ the exact same original mode of the applicants, for gathering and channeling the floating contaminants, back to the main floating contaminant cleanup and recovery vessel and, or the contaminant cleanup and recovery equipment employed on same. This also holds true for all embodiment's thereof, even though the various embodiments of the actual contaminant cleanup and recovery equipment included in this application are both deployed and employed from different positions and in different ways, on the main floating contaminant cleanup and recovery vessels employing same.

A full understanding of all embodiments included in this application, along with their mechanical composition and the operational modes of their employment, as well as the mode and manner in which all components thereof perform all tasks, needful in their individual contributions towards the combined effect and performance of all, will be described in detail and easily understood in the drawings and definitions of same that follows. However the present inventions are described in enabling detail in the following examples which may represent more than one embodiment of the present inventions.

In certain embodiments a system for removing contaminants floating on, or near the surface of a body of water the system may include a floating contaminant cleanup and recovery vessel, having an open forward end portion of two vertical opposing inner lateral sides, housing floating contaminant cleanup and recovery equipment between same. The vessel may additionally include at least one storage tank for storing contaminants captured by same, at least one towboat, maintaining forward motion in front of and off to a side of the open forward end portion of the floating contaminant cleanup and recovery vessel with same towing, and a contaminant containment boom extending from a back portion of the towboat, with the opposite end portion of contaminant containment boom connected to a side of the open forward end portion of the floating contaminant cleanup and recovery vessel. Accordingly, contaminants floating on, or near the surface of the body of water may be carried and channeled down along the inner side portion of the contaminant containment boom and into the open forward end portion of the floating contaminant cleanup and recovery vessel and captured by means of the floating contaminant cleanup and recovery equipment, housed between two opposing inner lateral side portions of same.

In certain embodiments, the floating contaminant cleanup and recovery vessel, may be capable of employing two towboats, with each maintaining forward motion, in front of and off to the sides of the open forward portion of the floating contaminant cleanup and recovery vessel, with each towing a contaminant containment boom, extending from a back portion of each, with the opposite end portions thereof connected to each side of the open forward end portion of the floating contaminant cleanup and recovery vessel, wherein the contaminants floating on, or near the surface of the body of water are carried and channeled between the inner side portions of the two contaminant containment booms and into the open forward end portion of the floating contaminant cleanup and recovery vessel and between two opposing inner lateral side portions of same and captured by means of the floating contaminant cleanup and recovery equipment, housed between same.

In certain embodiments the recovery equipment may include at least one primary float connected to and providing buoyancy for a pipe with a fluid connection to a storage tank and at least one tube housing, housing at least one tube in connection with the intake port, and provided buoyancy by means of a secondary float, such that the contaminants collected through the intake port may be capable of being transported to the at least one storage tank. In certain embodiments, the tube may have an intake port that may be a telescopic tube capable of being extended or retracted from the tube housing. In certain embodiments, the intake port portion of the tube may be height-adjustable relative to the secondary float. In certain embodiments, the floating contaminant cleanup and recovery equipment may utilize surface tension and/or gravity to pull the collected contaminants into the intake port and remove same from the surface of the water. In certain embodiments, the equipment may include air evacuating equipment to create low pressure in the at least one storage tank, both to remove floating contaminants from the surface of the water, as well as transport same to the one, or more storage tanks for same.

In certain embodiments, the recovery equipment may include a conveyor capable of lifting contaminants out of a body of water and conveying the contaminants to a portion of the equipment where the contaminants are removed from same, and then transported to the at least one storage tank. In certain embodiments, the conveyor may be height adjustable, to control the depth at which a first end of the conveyor is submerged beneath the surface of the body of water, or the height above the surface of the body of water at which the conveyor is held. In certain embodiments, the conveyor may be water permeable such that it allows water to freely pass through, but restricts the contaminants from passing through same. In certain embodiments, the system may further include interchangeable conveyor covers with each specifically effective to the allowing of water to pass through the cover being employed while at the same time each restricting the particular type of contaminants needfully removed from the body of water in which same is employed from passing through same.

In certain embodiments, the vessel may be a catamaran type of vessel comprising two hulls, wherein the conveyor portion contaminant cleanup and removal equipment is disposed between the two hulls of the vessel. In certain embodiments, the conveyor portion of the contaminant cleanup and removal equipment may be disposed at an angle relative to the surface of the water. In certain embodiments, the contaminant cleanup and recovery vessel may be equipped with contaminant containment booms. In certain embodiments, the contaminant cleanup and recovery vessel may be equipped with towing vessels. In certain embodiments, the contaminant cleanup and recovery vessel may be equipped with secondary equipment needful to complete a floating contaminant cleanup and recovery operation out at sea. In certain embodiments, the contaminant cleanup and recovery vessel may be equipped with the system may be provided with all modes and equipment to effect the very efficient deployment, employment retrieval and re stowage of same.

In certain embodiments a floating contaminant cleanup an recovery system may include a floating contaminant cleanup and recovery vessel. The floating contaminant cleanup and recovery vessel may include at least one storage tank for storing of contaminants captured by, at least one floating contaminant cleanup and recovery equipment unit, integral to and extendable from, either the front, back, or from both sides of the floating contaminant cleanup an recovery vessel and with same including an open forward end portion between a pair of outer opposing side portions thereof, attached to end portions of a pair of contaminant containment booms with the opposite end portion of each extending out and attached to, and a first and second towboat. The towboats may maintain forward motion with the floating contaminate cleanup and recovery vessel, from positions in front of and out beyond the outer side portions of the floating contaminate cleanup and recovery equipment, such that the currents created by the forward motion of the three vessels the contaminants floating on the surface of the body of water may be trapped and channeled or funneled back between the inner side portions of the two contaminant containment booms back to the aft portions of the floating contaminant cleanup and recovery equipment where same are pulled back forward and into the intake tube portions of same by means of surface tension or gravity.

In certain embodiments, the floating contaminant cleanup and recovery equipment may include a first float comprising a tube housing, a tube having an intake port disposed within the tube housing, and a secondary float attached to the tube, wherein the tube is connected to the tank by a pipe such that the captured contaminants passing through the tube is capable of being transported to the at least one storage tank. In certain embodiments, a portion of the floating contaminant cleanup and recovery equipment is mounted in framework and additionally comprises at least one upper armature and at least one lower armature, of equal length and with each including a first end and a second end, wherein the first end of each is pivotably mounted to portions of the framework. and the second end of each is pivotably mounted with all armatures in alignment with each other, on the side of the vessel.

In certain embodiments, a floating contaminant cleanup and recovery vessel and equipment employed by same may include a floating contaminant cleanup and removal vessel, with a catamaran type hull configuration including two opposing vertical inner portions of the vessels hulls, with a permeable conveyor disposed between same and angularly adjustable therein relative to the surface of the water, with said permeable conveyor additionally comprising of, a cover, that allows water to pass through same while restricting the particular type of contaminants, being removed from the body of water from passing through same.

In certain embodiments, the cover portion of the conveyor, may be both removable from same and interchangeable with a choice of additional types of covers, that all allow water to pass through same in the same basic manner, but with each variation thereof specifically effective to the restricting of a particular type of contaminants from passing through same. In certain embodiments, the vessel and equipment may additionally comprise at least one storage tank, for storing contaminants captured by means of the floating contaminant cleanup and recovery equipment, employed on the vessel.

In certain embodiments, a floating contaminant cleanup and recovery equipment may include a storage tank with low inner ambient pressure, a pipe with a fluid connection between the storage tank and a tube housing, housing a lower portion of a telescopic tube capable of being extended or retracted from the tube housing and with an upper portion of the telescopic tube comprising a vacuum intake port and a float providing buoyancy for the telescopic tube as well as maintaining vacuum intake port portion thereof positioned at the proper distance over the surface of the water and the contaminants floating thereon for the effective removal and transport of same to the storage tank by means of the low inner ambient pressure maintained in same.

In certain embodiments, the vacuum pressure at the intake port is maintained by means of a vacuum pressure regulating valve. In certain embodiments, the intake port portion of the tube is height adjustable relative to the surface of the water and the contaminants floating thereon. In certain embodiments, the floating contaminant cleanup and recovery equipment utilizes surface tension and gravity to pull the collected contaminants into the intake port and remove same from the surface of the water. In certain embodiments, the equipment may further include air evacuating equipment to create low pressure the storage tank both to remove floating contaminants from the surface of the water, as well as transport same to the one or more storage tanks for same. In certain embodiments, an integral portion of a floating contaminant cleanup and recovery vessel and may be deploy-able, employable and re-storable thereon and therefrom, the floating contaminant cleanup and recovery vessel. In certain embodiments, the equipment may include at least one additional float providing needful buoyancy for the tube housing, as well as all of the rest of the floating contaminant cleanup and recovery equipment, except for the equipment including the telescopic tube or tubes that include an intake port portion of same and the float or floats solely providing buoyancy for same.

In certain embodiments, a vertical and laterally stable mounting of floating contaminant cleanup and recovery equipment to vessels, employing them may include one or more upper armatures of equal length; one or more lower armatures of equal length with the upper armatures; said one or more upper and lower armatures having end portions hingably attached to an outer vertical surface portion of the hull of a marine vessel and pivotable outwardly therefrom; said upper armatures and said lower armatures having outer end portions hingably attached in parallel alignment with each other to inboard attachment point portions of the floating contaminant cleanup and recovery equipment.

In certain embodiments, a system for cleaning a contaminant floating near a surface of a body of water, the system may include a vessel comprising at least one storage tank for storing collected contaminant, and a framework extending to a side of the vessel. The framework may house recovery equipment, wherein the framework comprises a front end, a rear end, and a pair of lateral sides, such that the front end is disposed towards a side of the vessel. The system may further include a first towboat and a second tow boat, a first plurality of containment booms extending from the first tow boat to the framework, and a second contaminant boom extending from the second tow boat to the framework. The first tow boat and the second tow boat may be capable of encircling the contaminant floating near the surface of the body of water so as to funnel the contaminant towards the recovery equipment on the framework.

In certain embodiments, a system for cleaning a contaminant floating near a surface of a body of water, the system may include a vessel comprising at least one storage tank for storing collected contaminant, and a framework extending to a side of the vessel. The framework may house recovery equipment, wherein the framework comprises a front end, a rear end, and a pair of lateral sides, such that the front end is disposed towards a side of the vessel. The system may further include a first towboat and a first plurality of containment booms extending from the first tow boat to the framework. The first tow boat may be capable of encircling the contaminant floating near the surface of the body of water so as to funnel the contaminant towards the recovery equipment on the framework.

In certain embodiments the side of the vessel may be the left or right side. In certain embodiments the side of the vessel may be the front side. In certain embodiments the side of the vessel may be the rear side of the vessel. In certain embodiments the vessel may be a catamaran-type vessel and the side of the vessel may be the middle portion of such a vessel.

In certain embodiments the rear end of the framework may have a first roller track. In certain embodiments the first plurality of containment may connect tot the first roller track. In certain embodiments the rear end of the framework may have a second roller track disposed on an opposite lateral side of the rear end from the first roller track. In certain embodiments the second plurality of containment may connect to the second roller track In certain embodiments the recovery equipment may include a first float comprising a tube housing. In certain embodiments the recovery equipment may include a tube having an intake port disposed within the tube housing. In certain embodiments the recovery equipment may include a secondary float attached to the tube. In certain embodiments the tube may be connected to the tank by a pipe such that the contaminant that is collected through the tube is capable of being transported to the at least one storage tank. In certain embodiments, the tube having an intake port may be a telescopic tube capable of being extended or retracted such that it is height adjustable relative to the secondary float. In certain embodiments, the pipe connecting the tube to the storage tank may be an extendible pipe. In certain embodiments, the recovery equipment may utilizes gravity to transport the contaminant collected in the intake port to the storage tank. Certain embodiments may further include a vacuum pump connected to the pipe, such that the recovery equipment utilizes vacuum pressure or low pressure to pull contaminant through the intake port of the tube. Certain embodiments, may further include at least one upper armature and at least one lower armature, the upper and lower armatures each having a first end, a second end, and an equal length, wherein the first end of each is pivotably mounted on the side of the vessel and the second end of each is pivotably mounted to the framework.

In certain embodiments, the recovery equipment may include a conveyor capable of lifting contaminant out body of water and conveying the contaminant to the at least one storage tank. In certain embodiments, the conveyor may be height adjustable, to control the depth at which a first end of the conveyor is submerged beneath the surface of the body of water, or the height above the surface of the body of water at which the conveyor is held. In certain embodiments, the conveyor may be water permeable such that it allows water to freely pass through, but restricts the contaminants from passing through. Certain embodiments may further include a first cover specific to the contaminant that can be equipped on the conveyor. Certain embodiments may further include a second cover specific to a second contaminant that can be interchangeably equipped on the conveyor in place of the first cover.

In certain embodiments, the vessel may be a catamaran type of vessel comprising two hulls, wherein the conveyor is disposed between the two hulls. In certain embodiments, the vessel may be a catamaran type of vessel comprising two hulls, wherein the framework is at least partially disposed between the two hulls.

In certain embodiments, the conveyor may be disposed at an angle relative to the surface of the water. In certain embodiments, the vessel further may be capable of storing on board the first tow boat, the second tow boat, the first plurality of containment booms, the second plurality of containment booms, and the framework and recovery equipment. In certain embodiments, the vessel may further include a hydraulic lift capable of deploying the recovery equipment into the body of water. In certain embodiments, the vessel may further include a hydraulic lift capable of deploying the first tow boat and the second tow boat into the body of water.

In certain embodiments, a system for cleaning a contaminant floating near a surface of a body of water, the system may include a vessel comprising at least one storage tank for storing collected contaminant, and a first and second framework capable of extending to opposite lateral sides of the vessel. Each of the first and second frameworks may house recovery equipment. The frameworks may each have a front end, a rear end, and a pair of lateral sides, wherein the front end is disposed towards the respective lateral side of the vessel, and the rear end comprises a first rod and a second rod disposed on opposite lateral sides of the rear end. The vessel may further include a first vertical rod and a second vertical rod disposed on opposite lateral sides of a the vessel. A first plurality of containment panels may extend from the first vertical rod to the first rod of the first framework. A second plurality of containment panels extending from the second vertical rod to the first rod the second framework. The system may include a first towboat and a second tow boat. The system may further include a first plurality of containment booms extending from the first tow boat to the second rod of the first framework; the system may further include a second plurality of containment booms extending from the second tow boat to the second rod of the second framework. The first and second plurality of containment booms, and the first and second plurality of containment panels may be capable of encircling the contaminant floating near the surface of the body of water so as to funnel the contaminant towards the recovery equipment on the first and second frameworks.

In certain embodiments, a system for cleaning a contaminant floating near a surface of a body of water, the system may include a vessel comprising at least one storage tank for storing collected contaminant, and a first framework capable of extending to a side of the vessel. The first framework may house recovery equipment. The framework may have a front end, a rear end, and a pair of lateral sides, wherein the front end is disposed towards the side of the vessel, and the rear end comprises a first rod and a second rod disposed on opposite lateral sides of the rear end. The vessel may further include a first vertical rod. A first plurality of containment panels may extend from the first vertical rod to the first rod of the first framework. The system may include a first towboat. The system may further include a first plurality of containment booms extending from the first tow boat to the second rod of the first framework. The first plurality of containment booms, and the first plurality of containment panels may be capable of encircling the contaminant floating near the surface of the body of water so as to funnel the contaminant towards the recovery equipment on the first framework.

In certain embodiments the recovery equipment in a framework may include a first float comprising a tube housing. In certain embodiments the recovery equipment in a framework may include a tube having an intake port disposed within the tube housing. In certain embodiments the recovery equipment in a framework may include a secondary float attached to the tube. In certain embodiments, the tube may be connected to the tank by a pipe such that the contaminant that is collected through the tube is capable of being transported to the at least one storage tank. In certain embodiments, the recovery equipment may include a conveyor capable of lifting contaminant out body of water and conveying the contaminant to the at least one storage tank.

In certain embodiments, the contaminant cleanup and recovery equipment may include an intake port tube that extends up through a hole in bottom portion of a float. In certain embodiments, the contaminant cleanup and recovery equipment may include an intake port tube that is manually adjustable relative to the surface of the water. In certain embodiments, the contaminant cleanup and recovery equipment may pull the floating contaminants forward and into the aft portion of the intake port tube portion of same by means of surface tension and gravity. In certain embodiments, the contaminant cleanup and recovery equipment may pull the floating contaminants into the intake port tube portion of same by means of surface tension and vacuum or low pressure. In certain embodiments, the contaminant cleanup and recovery equipment may include an intake port tube that extends downward through an opening in an upper portion of a float. In certain embodiments, the contaminant cleanup and recovery equipment may pull the floating contaminants forward and into the aft portion of the intake port tube portion of same by means of surface tension and vacuum or low pressure. In certain embodiments, the lower portion of the vacuum intake port tube may include cut out vertical slits that maintain continuous air intake along with the contaminant's being removed from the surface of the water during the floating contaminant cleanup and recovery operation. In certain embodiments, the contaminant cleanup and recovery equipment may be mounted on the bow of the vessel. In certain embodiments, the contaminant cleanup and recovery equipment may be mounted on the stern or transom of the vessel. In certain embodiments, the contaminant cleanup and recovery equipment may be mounted on both sides of the vessel. In certain embodiments, the contaminant cleanup and recovery equipment may include an intake port tube that is remotely adjustable relative to the surface of the water. In certain embodiments, the contaminant cleanup and recovery equipment may include a valve that is remotely adjustable. In certain embodiments, the contaminant cleanup and recovery equipment include a screened-in intake portion restricting debris from entering into the equipment and fouling same. In certain embodiments, the contaminant cleanup and recovery equipment include a filtered intake portion restricting debris from entering into the equipment and fouling same. In certain embodiments, the contaminant cleanup and recovery equipment may include a brush extending across the screened in intake portion. In certain embodiments, the contaminant cleanup and recovery equipment may include a brush extending across the screened in intake portion of the equipment is equipped with at least one electric motor. In certain embodiments, the contaminant cleanup and recovery equipment may include said brush extending across the screened in intake portion of the equipment is equipped with at least one hydraulically powered cylinder with an extendable ram-powered. In certain embodiments, the contaminant cleanup and recovery equipment may include a brush extending across the screened-in intake portion of the equipment is controlled from a contaminant cleanup and recovery vessel. In certain embodiments, the contaminant cleanup and recovery equipment may include a brush extending across the filtered intake portion of the equipment is controlled from a contaminant cleanup and recovery vessel. In certain embodiments, the contaminant cleanup and recovery equipment may include at least one pump controlled automatically. In certain embodiments, the contaminant cleanup and recovery equipment may include at least one pump controlled from a contaminant cleanup and recovery vessel. In certain embodiments, the contaminant cleanup and recovery equipment may pull the floating contaminants from each side and forward into the aft portion of the intake port tube portion of same In certain embodiments, the contaminant cleanup and recovery equipment may pull the floating contaminants into same from behind the intake port tube portion of same. In certain embodiments, the contaminant cleanup and recovery equipment may include at least one telescopic tube. In certain embodiments, the contaminant cleanup and recovery equipment may pull the floating contaminants into same from behind and to each side of the intake port tube portion of same. In certain embodiments, the contaminant cleanup and recovery equipment may include a screened-in lower portion restricting debris from entering into and fouling same once swept off of the intake portion of same. In certain embodiments, the contaminant cleanup and recovery equipment may include a filtered lower portion restricting debris from entering into and fouling same once swept off of the intake portion of same. In certain embodiments, the contaminant cleanup and recovery equipment may include a contaminant containment boom extendable from an inner leading edge portion of same to the contaminant cleanup and recovery vessel. In certain embodiments, the contaminant cleanup and recovery equipment may include at least one rod or cable extending through a forward portion of same. In certain embodiments, the contaminant cleanup and recovery equipment may include at least one vertical roller track, or rod mounted on the leading edge of at least one primary float portion of the equipment. In certain embodiments, the contaminant cleanup and recovery equipment may include an upper float portion of additionally employed telescopic tubes rendering same as neutrally buoyant. In certain embodiments, the contaminant cleanup and recovery equipment may be equipped with a flexible coupling between the top portion of the telescopic tube and the intake tube portion of same. In certain embodiments, the contaminant cleanup and recovery equipment may include, at least one vertical roller track, or rod mounted on the leading edge of at least one primary float portion of the equipment. In certain embodiments, the contaminant cleanup and recovery equipment may include a floating gate. In certain embodiments, the contaminant cleanup and recovery equipment may include a floating gate, with at least one vertical tracks. In certain embodiments, the contaminant cleanup and recovery equipment may include a floating gate, with a pivot joint. In certain embodiments, the contaminant cleanup and recovery equipment may include a pipe with pivotable end portions providing a fluid connection between same and the vessel in which its employed. In certain embodiments, the contaminant cleanup and recovery equipment may include a contaminant extraction blade. In certain embodiments, the contaminant cleanup and recovery equipment may include a cable winch or chain windlass to adjust the angle of a conveyor portion of same. In certain embodiments, the contaminant cleanup and recovery equipment may include a contaminant extraction shroud. In certain embodiments, the contaminant cleanup and recovery equipment may include a conveyor mounting hub. In certain embodiments, the contaminant cleanup and recovery equipment may include a contaminant extraction shroud. In certain embodiments, the contaminant cleanup and recovery equipment may include a debris extraction shroud. In certain embodiments, the contaminant cleanup and recovery equipment may include a combination conveyor mounting hub, that is also a combination contaminant extraction and debris extraction shroud. In certain embodiments, the contaminant cleanup and recovery equipment may be mounted between both hulls of a catamaran type of vessel. In certain embodiments, the contaminant cleanup and recovery equipment may include at least one deflection panel. In certain embodiments, the contaminant cleanup and recovery equipment may include a contaminant containment panel. In certain embodiments, the contaminant cleanup and recovery vessel may include at least one hydraulic lift to launch, deploy and re-cradle floating contaminant cleanup and recovery equipment as well as the towing vessels. In certain embodiments, the contaminant cleanup and recovery vessel may include all equipment needful to complete a contaminant cleanup and recovery operation as well as the capacity to store and transport captured contaminants on board same. In certain embodiments, the floating contaminant cleanup and recovery equipment that removes the floating contaminants from the water may be integrally connected to or part of the contaminant cleanup and recovery vessel. In certain embodiments, the contaminant cleanup and recovery vessel may be provided with a system and equipment enabling the removal of water from captured contaminants inadvertently captured during the contaminant cleanup and recovery operation. In certain embodiments, the contaminant cleanup and recovery vessel may be equipped with valves, pumps and/or pipage enabling the selective filtering or transfer of captured contaminants. In certain embodiments, the contaminant cleanup and recovery vessel may be equipped with a vacuum turbine or vacuum fan to remove floating contaminants from the surface of the water. In certain embodiments, the contaminant cleanup and recovery vessel may be equipped with a vacuum turbine or vacuum fan to transfer captured contaminants from an intake or other point of removal to a tank or tanks for the storage and transport of same. In certain embodiments, the contaminant cleanup and recovery vessel may include a system and/or equipment that employs gravity to separate water from captured contaminants. In certain embodiments, the contaminant cleanup and recovery vessel may include at least one contaminant containment boom storage bin. In certain embodiments, the boom storage been may be provided with a spool winch and boom slide enabling the deployment re-stowage of contaminant containment booms. In certain embodiments, the contaminant containment boom spool winch may include an integral connection with the boom slide. In certain embodiments, the contaminant containment boom spool winch may be operable and the boom slide may be equipped to be positionally maneuverable by a crew member. In certain embodiments, the contaminant cleanup and recovery vessel may include a debris catch basin. In certain embodiments, the contaminant cleanup and recovery vessel may include tracks connected to the debris catch basin. In certain embodiments, the debris catch basin may be raised and lowered on such tracks. In certain embodiments, the debris catch basin may be provided with a winch operable by a crew member to raise and lower same. In certain embodiments, the debris catch basin may includes a forward opening and side doors. In certain embodiments, the contaminant cleanup and recovery vessel may include a contaminant containment boom slide. In certain embodiments, the contaminant containment boom slide is equipped is positionally maneuverable by a crew member. In certain embodiments, individual floats, or portions thereof, as well as the upper and lower curtain portions of the floating contaminant containment booms, may be made of non-flexible components, either solidly affixed together as one structurally ridged unit, or simply produced, as one complete ridged unit. In certain embodiments, the float portions of contaminant booms may possess a wide lateral footprint. In certain embodiments, both the upper and lower curtain portions of the floating contaminant containment booms may be connected to gather by means of flexible cable portions. In certain embodiments, both the upper and lower portions of the floating contaminant containment booms may be constructed of non-stretchable materials with both upper and lower portions of same being of the same length and the end connection points of each end portion of same being in vertical alignment with each other. In certain embodiments, both end portions of the floating contaminant containment booms may be equipped with floating panels with connection points for same including rollers or slides located at both the upper and lower end portions of same. In certain embodiments, the contaminant containment boom towing vessels, may include at least one lateral rod or track. In certain embodiments, the lateral track portion, or portions of the contaminant containment boom towing vessels may additionally include. at least one vertical track or rod that rides on said at least one lateral rod or track portion of the contaminant containment boom towing vessel. that an end floating panel portions of a contaminant containment boom attaches to and rides on. In certain embodiments, a rod or cable may be provided with a first end portion of same being pivotably attachable to the at least one vertical track or rod portion of the contaminant containment boom towing vessel, and the opposite end portion of same being pivotably attachable to the Sampson post portion of the towing vessel and thus traversing the load forward to same.

FIG. 1-A Is a drawing of a profile view of an embodiment, of a floating contaminant cleanup and recovery vessel, as well as the floating contaminant cleanup and recovery equipment employed on same. Included as an example of a transom mountable embodiment Thereof, which for easy reference purposes, similar embodiment's will simply referenced as a first embodiment thereof. This embodiment of the oil or other type of floating contaminant cleanup and recovery equipment, is attached to and height adjustable on tracks #124 and raised and lowered on these tracks by means of a hydraulic ram or rams viewable in FIGS. 3A and 3B. These rams maintain this equipment in a height relative to the seas as the vessel fills with oil or other contaminants and the waterline of same is lowered, to maintain this equipment at a height of maximum efficiency. The outer interlocking track is an integral part of framework that encases a receiving tank #139 This receiving tank is the first stop in the oil, or other recovered contaminates and water solutions trip to the oil and water separation and storage tanks located in the interior of the hull of the vessel. embodiment, of this embodiment, thereof.

Housed inside of this tank of this embodiment, of same, includes a pump and valves. The function of which will be described in detail in the descriptions for FIGS. 4-A,-B,-C, and D. Both upper pivoting armatures #12-A and lower pivoting armatures #13-A possess pivoting joints #11 on the ends there of, that connect the framework portion of this embodiment that houses the main float #1 as well as the small floats entry ports, and telescopic tubes (not shown) to the framework #123 that houses the receiving tank #139. These pivoting armatures in this embodiment of same, allow the main float and oil recovery portion of this embodiment to ride over the seas and maintain the oil recovery portion of this embodiment of the contaminant clean up and recovery equipment, at a position to maintain a maximum level of efficiency in the oil recovery process. All additional functions, components and their operational relationship with each, will be further described and fully understood in additional drawings and their descriptions. of this embodiment, thereof.

FIG. 1-B Is a drawing of a profile view, of another embodiment of a contaminant cleanup and recovery vessel, along with the floating contaminant cleanup and recovery equipment portion thereof, also included as another example of an embodiment thereof mounted on the stern of the vessel. which for easy reference purposes, similar embodiment's, will simply referenced as a second embodiment thereof. This embodiment of the contaminant cleanup and recovery equipment's pivoting armatures #12-B and #13-B are attached directly both to the transom of the oil cleanup and recovery vessel as well as to the framework portion of the floating contaminant cleanup and recovery equipment, by means of pivoting joints #11. these armatures actually provide two primary services in that these armatures in this embodiment, thereof, provide the floating contaminant cleanup and recovery equipment not only with the ability to independently ride over waves, but also to do so in a manner that maintains the floating contaminant cleanup and recovery equipment perfectly parallel with the contaminant cleanup and recovery vessel at all times while doing so. of which is better illustrated explained in detail in the drawings and description provided in FIG. 5-C The armatures 12-B and 13-B as well as the pivoting joints 11 also provide these exact same service for the embodiment thereof included in FIG. 1-A This embodiment of the contaminant cleanup and recovery equipment includes two main floats #1 that provide buoyancy for the floating contaminant cleanup and recovery equipment as well as the armatures #12 and #13 for same. In this example of an embodiment of same.

Floating contaminant containment booms (not shown) attach to an embodiment of, the vertical Roller tracks, or Rods #37 located on the outermost leading edge of the main floats #1 located on each side of the actual contaminate cleanup and recovery equipment. These roller tracks, or rods #37 provide the end portions of said oil or other floating contaminant containment booms, with the ability to vertically ride up and down on same as they ride over waves, in this embodiment, thereof.

Said contaminant containment booms run between These roller tracks, or rods #37 directly out to contaminant containment boom tow boats, where same would be gathering and corralling floating oil, or other floating contaminants on each side and while staying in front of the main contaminant cleanup and recovery equipment portion of the vessel, where, by means of all three vessels maintaining forward motion, the oil or other floating contaminants are channeled, and concentrated as same is drawn back to the furthest aft portion of the floating contaminant cleanup and recovery equipment. In this example of an embodiment thereof.

As soon as the very first bit of the floating contaminants arrives, same starts getting pulled back forward across the surface of the water even from several feet away, into intake tubes housed in smaller floats by means of surface tension and continues to do so as fast as same can be gathered by the contaminant boom tow boats. and concentrated back into the recovery aria of the contaminant cleanup and recovery equipment, embodiment's included in this application. (not shown in this drawing, but included various additional drawings and descriptions of all function enabling apparatuses and components comprising and enabling same as well as their operational relationship with each other, and the modes in which all possess the abilities an perform the tasks performed by this embodiment, thereof, will be easily and fully understood.

FIG. 2-A Is a drawing of an embodiment of an oil and, or, other type of floating contaminant cleanup and recovery equipment, previously referenced as the first embodiment thereof. This drawing is a profile view of a transom mountable embodiment, of the floating contaminant cleanup and recovery equipment, also included in FIG. 1-A, This drawing thereof is shown as if removable contaminant containment panels #125 (not shown) were removed so other components, comprising the portion of contaminant cleanup and recovery equipment, that all work together in this initial part of the oil, or other floating contaminant cleanup and recovery process, employed in this as well as some of the other embodiment's thereof, can be viewed.

Small float #2-A, in this embodiment, thereof, houses a contaminant intake port tube #3-A (not shown) #28 is a guide cable, or rod that extends through a forward portion of said small float #2-A. and a bearing therein. This guide cable or rod #28 maintains the forward portion of said small float #2-A always facing forward while additionally allowing same, to freely slide up and down this guide cable or rod #28 as said small float #2-A. goes over waves. In this example of an embodiment thereof.

However This guide cable may or may not be employed in this embodiment, thereof. in that the purpose same serves, could easily accomplished simply by means of manufacturing the telescopic tubes are attached to the bottoms of said small floats #2-A were manufactured in a shape that simply couldn't rotate such as a square or other shaped tubes perhaps with rounded corners. orb even manufacturing same with the telescopic tubes entry point for same being much further forward of which drawings of which are also included in this application, in FIGS. 33-E and FIG. 33-F The intake port tube, housed in an inner portion of said small float #2-A. in this embodiment, thereof. is height adjustable, and of which is equipped to be either preset manually or to be height adjustable remotely on the contaminant cleanup and recovery vessel itself, as included in this drawing by means of an electrically controllable intake port tube height adjustment mechanism #15-A, the employment of same being unnecessary but simply added as optionally employable. in this embodiment, thereof. #34. is an embodiment of a flexible coupling that may or may not be employed between most of the intake port tubes and the first telescopic tube #7-A embodiment's. This flexible coupling serves two purposes the first purpose simply being to make the connection between the intake port tube and the very upper initial intake portion of the first telescopic tube #5-A in this embodiment, thereof. The second service providable by same would be to aide in smaller float's such as float #2-A employed in this drawings ability to remain perfectly parallel as same is going over waves, however later test have show pretty much the same level of efficiency being attainable whether this connection is flexible or simply hard coupled so its highly likely that this flexible coupling will be replaced by another type of coupling that simply makes a solid or non flexible connection between the two or even both the first telescopic tube #5-A and the intake port tube itself simply made as a single unit. which is also included in additional drawings of this embodiment, thereof.

This embodiment thereof. The telescopic tube housing #4-A, houses telescopic tubes 5-A. In this embodiment, thereof and of which extend in and out of same, and thus enabling said smaller float 2-A with the ability to maintain the intake port tube housed therein at the proper position relative the surface of the water to operate properly.

The weight of the first telescopic tube housed in telescopic tube housing #4-A is carried by means of the buoyancy provided by smaller floats 2-A. Additional telescopic tubes, if employed are provided with their own buoyancy, by means of small additional floats #7-A made in the shape of rings that are attached to the very top portions of additional telescopic tubes if employed rendering same as neutrally buoyant so that the weight of the telescopic tubes actually being carried by the buoyancy provided by smaller floats 2-A. always remains the same regardless of how many telescopic tubes actually come out of the housing for same, when employed. in this embodiment, thereof. The only reason additional telescopic tubes would be employed in the first place would simply be the ability to make the telescopic tube housings in a lower profile when needful or advantageous to the dynamics of the embodiment of the contaminant cleanup and recovery equipment, in which same is employed. In this example of an embodiment thereof.

Embodiment's of many of the more basic Aforementioned components, that are actually far more common to, or employable on embodiment's of the contaminant cleanup and recovery equipment included in this application such as the basic components comprising #1, #2-A, #15-A, #29, #34, #5-A, #4-A and #7-A. Were also employed in earlier embodiment's of the contaminant cleanup and recovery equipment, included in earlier patent applications for earlier embodiment's of this the first actual type of floating contaminant cleanup and recovery equipment included in this application, of which have suffered only small changes, and much of which being as optionally employable changes, but the minor differences from the original designs of these components are explained in detail in the definitions for drawings of FIGS. 35A,-B,-C,-D, and E as well as FIGS. 36,-A and -B. as well as others.

This drawing also includes, sections of tubing that carries the oil or other floating contaminants and any water inadvertently captured during sames removal the contaminants from the surface of the water from the valve #42,-A. which is employed to In this example of an embodiment thereof, to optionally open, close regulate flow of same of between telescopic tubes #-5-A and a pump #145-B best viewed in FIGS. #4-B, and FIG. #4-C Pump, #145-A is located inside the recovery tank #139. This section of tubing #128-A, is enabled to pivot by means of pipe joints #26 that are positioned vertically in line with pivoting joints #11-A, which allow this section of tubing to pivot with the rest of the framework #135 that remains parallel to the vessel but pivots up and down vertically as this embodiment thereof, rides over waves by means of the pivoting pipe joints #26, and the pivoting joints #11-A, which are in parallel alignment with each other. in this example of an embodiment, of thereof.

FIG. 2-B Is a drawing of an embodiment of an oil and, or, other type of floating contaminant cleanup and recovery equipment, Included in the example of a transom mountable embodiment thereof included in FIG. 1-B, that shows the manner that the framework #124 that houses the hydraulic ram, or rams and hydraulic cylinders or cylinder #134. viewable in the next two drawings of FIGS. 3-A and FIG. 3-B. Framework #124 mechanically fastens to the transom of the oil recovery vessel, by means of pad eyes #132 that insert into forked pad eyes on the transom of the oil cleanup and recovery vessel and are locked in place with clevis pins. in this embodiment thereof, An extended portion of the framework of #124 creates a track that interlocks into framework #123 that houses the receiving tank #139. This interlocking track allows the entire oil recovery equipment of this embodiment thereof, to be height adjustable on the transom of the oil recovery vessel to achieve and maintain a vertical position thereof to achieve maximum efficiency of the oil cleanup and recovery process, as the hull of the recovery vessels waterline gets lower in the water due to the load of oil or other floating contaminants recovered, these roller tracks, or rods #37 that the oil containment booms attach to and slide up and down on vertically are located on the outer most leading edge of the framework #135 in this embodiment thereof. Is also easily viewable in this drawing. of an embodiment, thereof.

FIG. 2-C Is a drawing of an embodiment of an oil and, or, other type of floating contaminant cleanup and recovery equipment previously referenced as the second embodiment thereof. #1 is one of two floats that provides the buoyancy to carry the outer load of this embodiment of the floating contaminant cleanup and recovery equipment portion of this embodiment thereof. Roller tracks, or rods #37 are located on the outermost leading edge of the main floats #1 that the oil, or other type of floating contaminant containment booms attach to and ride up and down, vertically on. Located between these main floats are one or more of the smaller floats #2-A that house entry ports #3-A (not viewable from this angle of view) The oil, or other type of floating contaminants and a small portion of water flow down the telescopic tubes in the tube housing #4-A and pass through valve #42-A, and pump #145-B where it passes through the first section of tubing #128-B. and then through the first pivot able pipe joint #26 that are positioned vertically in line with pivoting joints #11 which allow this section of tubing with the 128-B, with the ability to pivot with the rest of the framework #135 that remains parallel to the vessel but pivots up and down vertically as this embodiment, of the contaminant cleanup and recovery equipment, as same rides over waves, by means of the pivoting pipe joints #26, and the pivoting armature joints #11, which are in vertical parallel alignment to each other and exactly the same length as each other. The second pivot able pipe joint is integral to a flange that is mechanically fastened over a hole in the transom of the vessel with mechanical fasteners extending through same as well as holes in the transom and additionally through holes in the flange portion a valve inside the transom portion of the vessel, with all sealed and mechanically fastened together as one. This is the entry point for the captured oil or other contaminants are pumped by means of pump #145-B. into separation and storage tanks therein the hull of the contaminant cleanup and recovery vessel. In this example of an embodiment, of thereof.

FIG. 3-A and FIG. 3-B are both drawings, of an embodiment of an oil and, or, other type of floating contaminant cleanup and recovery equipment, previously referenced as the first embodiment thereof these drawings are back side views of the embodiment's of the same floating contaminant cleanup and recovery equipment of FIGS. 1-A and 2-A, as if same was removed from the transom of the contaminant cleanup and recovery vessel, and viewing same from behind and through the framework and the hydraulic lift equipment same is mounted on. Rams #129-A and cylinders for same #134-A as well as the framework and a backside view of the initial receiving tank #139 for the first embodiment of this portion of this oil and, or, other types of floating contaminant cleanup and recovery equipment, could be viewed. FIG. 3-A is a drawing of the floating contaminant cleanup and recovery equipment, lowered to its lowest position on the hydraulic lift equipment therefore. FIG. #3-B is a drawing of the floating contaminant cleanup and recovery equipment, raised to its highest position on the hydraulic lift equipment therefore. #-133 are the flexible hydraulic lines that would run up to the controls for same on the contaminant cleanup and recovery vessel. in this embodiment, thereof.

Figure 4D:
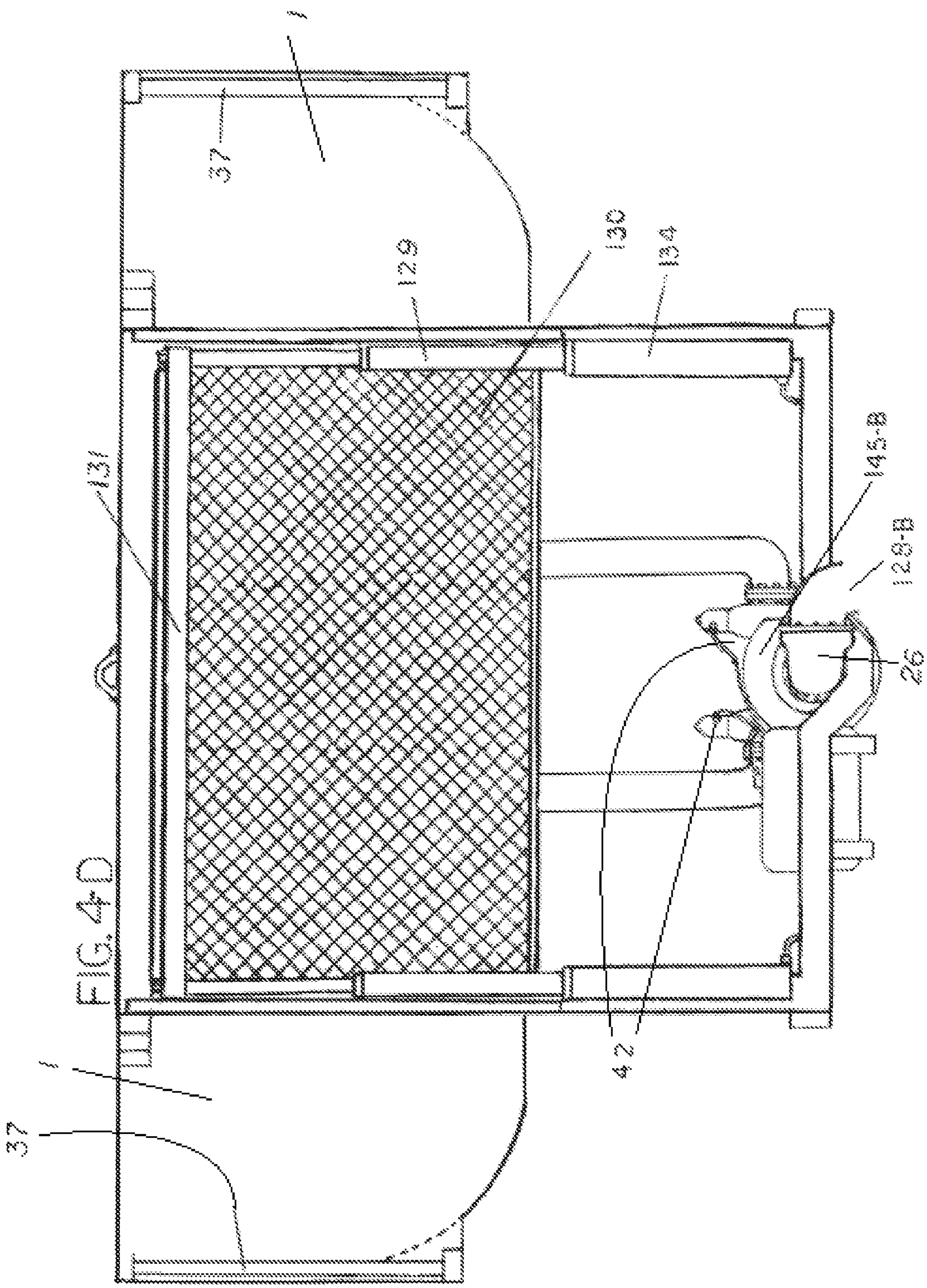
FIG. 4-A illustrates a profile view the tank and contaminant pumping system of the cleanup and recovery equipment of FIG. 2-A.

FIG. 4-A and FIG. 4-B are drawings of an embodiment of a portion of an oil and, or, other type of floating contaminant cleanup and recovery equipment, previously referenced as a portion of the equipment employed on first embodiment thereof. FIG. 4-A is drawing is a profile view of the initial contaminant receiving tank #139. and is drawn as if the side panel of the receiving tank #139 had been cut away and removed to view the inner components and workings thereof. and FIG. 4-B. is a drawing of an overhead view of same as if the access plate #148 of the initial contaminant receiving tank #139 was removed to view the inner workings thereof. Said access plate #148 is simply a large removable access plate mechanically fastened to the top of the initial contaminant receiving tank #139, and of which is provided to enable a crew member or equipment specialist the ability to fully enter therein to easily effect any servicing or repairs needful. This pump and valve system works in two modes. #142, #143,-#144,-#145-A,-#146,-148, and #137, and are all part of a system that pumps the oil and water solution from a pump #145-A that is located inside the receiving tank #139, out of evacuation pipe #137. This pumping system and receiving tank is located inside a lower portion of framework #123. This pumping system allows this embodiment thereof to operate in two different modes. The first mode being with the oil or other contaminants along with a small percentage water, being into pulled into and down the telescopic tubes of #3-A (not seen), by means of gravity as same is being pulled into and down same and gravity fed all of the way back to the initial receiving tank #139, and pumped out of same by means of pump #145-A during the floating contaminant cleanup and recovery process, The second mode is actually the same as the first, in that both of these modes of recovery recover this oil, or other floating contaminants in the exact same manner. However this embodiment thereof unlike most others, when recovering larger and more concentrated spills where heavier concentrations of floating contaminants, are being gathered by the contaminant containment boom tow boats, gathering and corralling floating oil, or other floating contaminants from in front and out to each side of the actual contaminant cleanup and recovery vessel. as all three are motoring forward through the water together and maintaining a substantial forward speed while doing so, as the floating contaminants, being gathered, channeled, and concentrated back to the furthest aft portion of the floating contaminant cleanup and recovery equipment, The volume of same, tests have shown, can be extreme. However tests have also proven that the equipment included for the removal of the floating contaminants from the surface of the water, can very efficiently do so, as soon as the floating contaminants reach the recovery aria for the removal of same, as fast as same can be evacuated from the telescopic tubes, in which the recovered floating contaminants initially enter. in this embodiment, thereof.

Thus reducing the maximum recovery rate of the equipment same is employed in, to the maximum amount of the contaminants that can be evacuated away from sames point of entry once entered. this resulting in some embodiment's of the contaminant cleanup and recovery equipment being able to very efficiently remove the floating contaminants from the surface of the water, much faster, than the actual rate in which the embodiment, that the floating contaminant cleanup and recovery equipment is employed in, can transfer same into the hull of the recovery vessel same is employed on by means of gravity alone. This actually holds true for both of these transom mountable embodiment's thereof included in this application.

This primarily being due to the minimum drop angle between the surface of the water where the floating contaminants were being removed, and the contaminant level in the initial receiving tank #139 and the highest level maintained, as same was being picked up and removed from the initial receiving tank #139, by pump 145-A would only be between 19 to 22 degrees of drop. in this In this example of this the first embodiment thereof.

The second transom mounted example of an embodiment included, even being a little worse and possessing a minimum of only between 16 and 19 degrees of drop between the surface it the water and the entry point of same in the transom of the vessel which is adequate to achieve very high evacuation rates of the telescopic tubes #5-A during the contaminant cleanup and recovery process, by means of gravity alone, but far less than the recovery rate of the actual floating contaminant cleanup and recovery equipment itself employed in same. The solution for which in both embodiment's simply being the installment of pump #145-B in the second embodiment thereof included in FIGS. 1-B, 2-B, and 2-C as well as others in the following which would be optionally employable, with the controls for same being on the floating contaminate cleanup and recovery vessel itself. in this example of an embodiment, thereof.

Pump #145-B would be coupled into, and in align with contaminant transfer pipe #128-B just beyond the base of the manifold for the telescopic tube housings #4-A and mounted in a lower portion of the framework #135 and optionally employed to achieve and maintain, needful recovery rates during times of excessively high volume recoveries. In this example of an embodiment, of thereof.

A solution for the first example of an embodiment thereof, being the pump #145-A. Located inside inside the initial receiving tank #139 included here in the drawings of FIGS. 4-A and 4-B. This contaminant pumping system for this embodiment of the contaminant cleanup and recovery equipment is housed inside of tank #139. This pumping system, consists of a submersible pump and motor #145-A, as well as three valves located on the intake side of the pump. The first valve #142, and the third valve #144, are both mounted on the flange of the pipe tees. Between these two pipe tees is an additional valve #143. This valve is mounted directly in line of the intake line #128-A which is directly in the intake line of pump #145-A. These three valves #142, #143, and #144, would be controllable from the control panel #140 as viewable in FIGS. 10-A and FIG. 10-B on the vessel itself. This oil, or other type of floating contaminants and water pumping system would evacuate the oil, or other type of floating contaminants and any water therein from this embodiment in a choice of two different manners which would all be controllable by the operator of this embodiment from the control panel of this system. This system would be set up or wired in a way that when the switch at the control panel is set to gravity feed, this switch would send power opening the first valve #142, or the valve farthest from the pump as well as the third valve #144, or the valve mounted closest to the pump that are both mounted on the lower flanges of the pipe tees. This same switch would also send power to the float switch #146, as well as send power to close the center in line valve #143, which would allow the oil, or other type of floating contaminants and water solution received from the intake line #128-A of an embodiment to exit out of valve #142, into the tank #139. Then, as the oil, or other type of floating contaminants and water solution raises, it would activate the float switch #146, which in turn would activate a relay and solenoid switch, which in turn would send power to the pump, and in turn the pump would pull the oil or other contaminants and small percentage of water out of the initial receiving tank #139 through valve #144 and in turn evacuate the tank #139 as needed, in that this same float switch would turn the pump #145-A off in the same manner as the water in the tank recedes below the level of the switch #146 and power in turn is cut off from the pump #145-A and this cycle would continue turning the pump on and off as needed as the oil, or other type of contaminants and water level raises and lowers. in this example of an embodiment, thereof.

The second mode that this pumping system included in this drawing of same would operate in, this embodiment thereof would be with the pump #145-A pumping the oil and water directly out from the contaminant intake pipe #128-A to insure the intake portion of the equipment can operate at a recovery rate needful. This recovery system can be switched from a gravity feed system to a mechanically pumped out system simply by activating a switch at the control panel that would send power once again to close valves #142, and #144, and open the valve #143 that is directly in line with the contaminant intake pipe #128, as well as turn on the pump, which in turn would create a direct intake from the pump #145-A to the intake #3 and tubes #5 at their point of recovery (not seen), so that this pump #145-A, would pump the oil, or other recovered contaminants and water solution straight from the telescopic tubes just below sames point of entry and all of the way to contaminants and water separation and storage tanks, in the hull of the vessel. in this example of an embodiment, thereof.

FIG. 4-C. Is a drawing of an embodiment of an oil and, or, other type of floating contaminant cleanup and recovery equipment, previously reference as the second embodiment thereof. This Is a drawing of a profile view of the pump and valve system employed on same. #1 Is one of two main #1 floats that provides buoyancy for the floating contaminant cleanup and recovery equipment of this, embodiment thereof roller tracks, or rods #37 are located on the outermost leading edges of these said main floats #1 that the floating contaminant containment booms attach to and ride up and down vertically on. Located between these main floats #1 are one or more of the smaller floats #2-A and entry ports therein #3 (not viewable in this drawing). The oil, or other type of floating contaminants and a small portion of water flow down the telescopic tubes in the tube housing #4-A and pass through valve #42-A, and pump #145-B where this oil, or other type of floating contaminants and a small percentage of water is pumped through the first section of tubing #128-B. Which extends to, first pivoting pipe joint #26, that are positioned vertically in line with pivoting joints #11 which allow this section of tubing to pivot with the rest of the framework #135 that remains parallel to the vessel but pivots up and down vertically as this embodiment of the embodiment rides over waves, by means of the pivoting pipe joints #26 and the pivoting joints #11 which are in vertical parallel alignment to each other. in this embodiment, thereof.

FIG. 4-D, Is a drawing of an embodiment of an oil and, or, other type of floating contaminant cleanup and equipment, previously referenced as the second embodiment thereof. This drawing Is a frontal view thereof. Included as an example of a bow or transom mountable embodiment thereof also included in FIG. 1-B, FIG. 2-B, and FIG. 4-C This drawing provides a frontal view of The pump #145-B as well as the valves #42-A in the configuration employable on the transom of the vessel. the bases of the telescopic tube housings #4-A. The first section of the contaminant transfer pipe #128-B can also be viewed in this drawing. #128-B extends between the pump #145-B and the first pivot able pipe joint #26 that are positioned vertically in line with pivoting joints #11 which allow this section of tubing to pivot with the rest of the framework #135 that remains parallel to the vessel but pivots up and down vertically as this embodiment rides over waves by means of the pivoting pipe joints #26, and the pivoting joints #11 which are in vertical parallel alignment to each other as well in perfect lateral alignment with #26. #130 is a screened panel covering the entire intake portion of the contaminant cleanup and recovery equipment, and is mechanically fastened the inner framed section between the two main floats #1 This is where the oil, or other floating contaminants would be channeled through as it would enter the point of recovery around and behind floats #2-A (not seen), and height adjustable intake #3-A. in this embodiment, thereof. (not seen)

131 is a cross bar extending across the upper portion of the screened in panel #130 portion. This cross bar, has a brush extending across the entire inner surface thereof. each end of this cross bar includes a whole in which threaded end portions of two hydraulic rams #129 extend through and are compressably secured thereto by means of, threaded nuts for same. The hydraulic cylinder #134 portions of same are attached vertically on each side the screened panel to a lower portion of said inner framed section. Thus enabling the entire forward screened in, intake portion of the contaminant cleanup and recovery equipment, to be swept clean, simply by means of the retraction of the two hydraulic rams #129 into The hydraulic cylinders #134 for same. which pulls the cross bar and brush that extends across the entire inner surface thereof downward across the screened in panel #130, in this embodiment, thereof, and thus all of the floating debris, Sargasso weed, dead fish and other aquatic life or other, that could restrict the flow of the contaminants entering the contaminant cleanup and recovery equipment for the removal of same. during the contaminant cleanup and recovery process. This debris is swept under the contaminant cleanup and recovery equipment, This debris is also restricted from entering the oil, or other type of floating contaminants recovery area from the bottom portion of the equipment during this process, by means of an additional screened in panel similar to the forward screened in panel, that extends across the span of the entire bottom portion of contaminant as well. in this embodiment, thereof.

All embodiment's of the first actual types of floating contaminant cleanup and recovery equipment included in this application are equipped with this same basic type of intake screen sweeping equipment.

FIGS. 5-A and 5-B is a drawing is a profile view of an embodiment of a contaminant cleanup and recovery equipment, previously referenced, as the first embodiment thereof. This drawing shows, the manner in which the pivoting armatures of #12-A and #13-A and pivoting joints #11 operate in perfect unison with the pivoting pipe joints #26 and the contaminant transfer pipe #128-A. And do so, while maintaining the contaminant cleanup and recovery equipment itself, perfectly level with floating contaminant recovery vessel, at the same time. in this embodiment, thereof.

FIG. 5A is a profile views of the first referenced embodiment, provided an example of, a type of bow or transom mountable floating contaminant cleanup and recovery equipment, with the removable containment panels #125 (not seen) removed. so the inner workings therein and their moving components of this embodiment thereof, can be viewed. These drawings shows the basic moving parts of the recovery portion of this embodiment in their full range of use. The armatures #12-A and #13-A and their pivoting joints #11 as well as the pivoting pipe joints #26 pivoted upward. The floating contaminant recovery equipment, inside the furthest aft portion is also drawn as if same was extended to a high point of travel as same just went over a very large wave. small float #2-A is the float that houses the intake port tube #3-A (not viewable) #28 is the guide cable or rod that always maintains float #2-A pointing forward and the open portion aft portion always facing aft while allowing same freely ride up, and down on same when going over waves. #5-A are the telescopic tubes, in which the recovered contaminants travel through as same make their way down to the initial receiving tank #139. These telescopic tubes #5-A freely extend in and out of out of telescopic tube housings #4-A and the small ring float #7-A, attached to the uppermost portion of the second telescopic tube and rendering same as neutrally buoyant after leaving the telescopic tube housing #4-A. #34 is the optionally employed flexible coupling located between #3 (not seen) the uppermost portion of the first telescopic tube #5-A The intake port tube #3 is height adjustable on float #2-A, as well as the optional electrically controllable intake port height adjustment mechanism of #15-A All embodiment's of floating contaminant cleanup and recovery equipment included in this application are equipped with this same intake screen sweeping equipment as viewed and described in the drawings and description for FIG. 4-D. in this embodiment, thereof.

FIG. 5-B shows an embodiment o the same floating contaminant cleanup and recovery equipment as is included in FIG. 5-A pivoted into a very low position as if the recovery vessel employing same had just crested a huge wave. FIG. 5-A and FIG. 5-B are also side or profile views of the first referenced embodiment of the floating oil, or other contaminant cleanup and recovery equipment portions of this embodiment with the removable oil containment panels #125 (not seen) removed so the initial floating oil recovery equipment where the oil recovery port and small float #2-A, as well as the other components that work together in this initial part of the oil recovery process, and its guide cable or rod #28 along with the telescopic tube #S-A, and the telescopic tube housing #4-A as well as #34 the flexible coupling located between #3 the intake port that is height adjustable on float #2 as well as the electrically controllable intake port height adjustment mechanism of #15-A and the small telescopic tube ring float #7, all of which are all basic components employed in the initial patent application that have suffered only minor changes from the original embodiment's thereof. This illustration also shows how the oil, or other type of floating contaminants recovery equipment remains parallel to the oil, or other type of floating contaminants recovery vessel at all times both when raised or lowered. In this embodiment, thereof.

FIG. 5-C is a drawing is a profile view of an embodiment of a contaminant cleanup and recovery equipment, previously referenced, as the second embodiment thereof. This drawing shows, the manner in which the pivoting armatures of #12-B and #13-B and joints #11 operate in perfect unison with the pivoting pipe joints #26 and the contaminant transfer pipe #128-B. And do so, while maintaining the contaminant cleanup and recovery equipment itself, perfectly level with floating contaminant recovery vessel at the same time. in this embodiment, thereof.

Figure 6A:
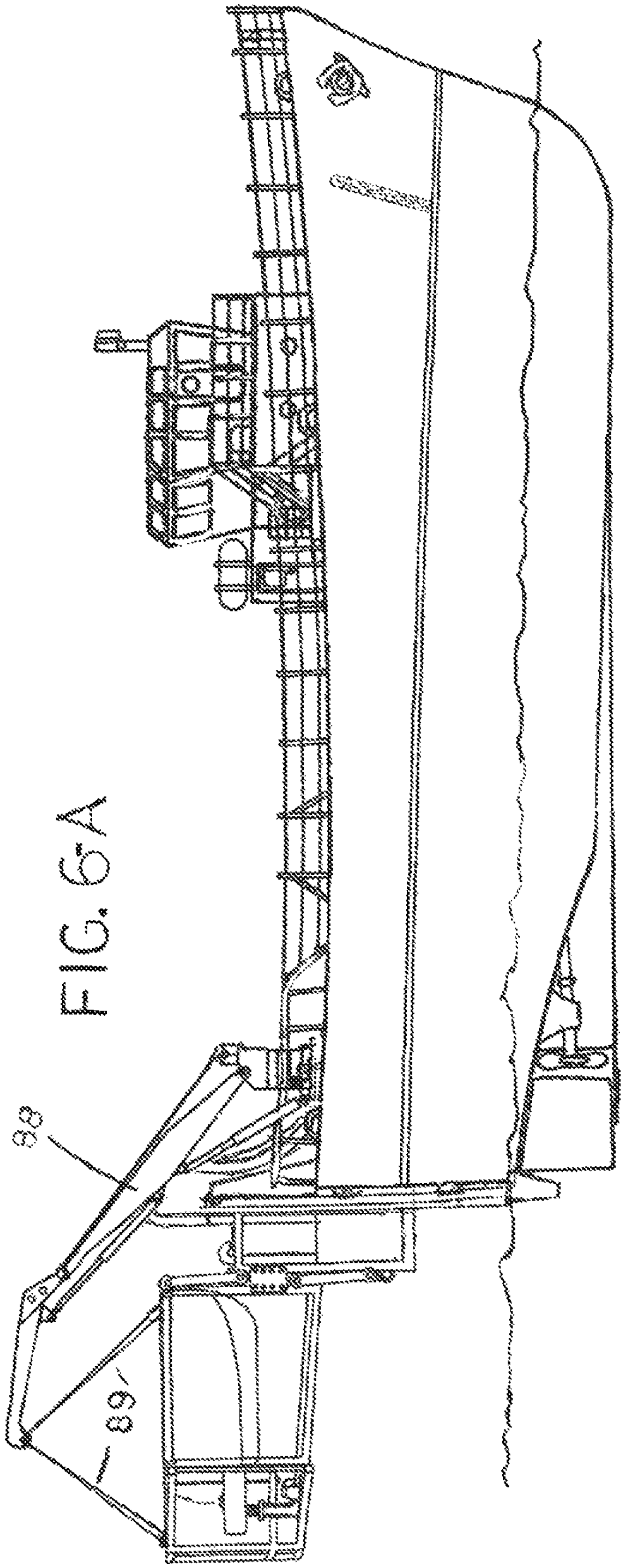
FIG. 6-A illustrates a profile view of the vessel of FIG. 1-A with the equipment in a raised position.

FIG. 6-A is a drawing of an embodiment of an oil cleanup and recovery vessel and the oil cleanup and recovery equipment of the previously referenced, as the first embodiment thereof. showing the employment of the hydraulic lift #88 and the bridal or lifting cables #89 as the hydraulic lift either raises the oil and other types of contaminants cleanup and recovery equipment either up and out of the water, to lock same into a position of transport or non-service. or, optionally employing the hydraulic lift #88. this same hydraulic lift #88 and the bridal or lifting cables would operated by one of the crew members and this crew member working along 1 or 2 other crew members would deploy, operate, and store all of this equipment on this embodiment of a contaminant cleanup and recovery vessel and same would be employed to both launch the oil containment boom tow boats and booms in the putting same into service as well as employing same, to re-cradle same back onto the main floating contaminant cleanup and recovery vessel once the operation is completed. in this embodiment, thereof.

FIG. 6-B Is drawing of an embodiment of a contaminant cleanup and recovery vessel and equipment that cleans up and removes oil and other floating contaminants previously referenced as the second embodiment thereof. This drawing shows the contaminant cleanup and recovery equipment, either being lowered into the water, as same is being put into service as soon as same reaches a spill, by means of the hydraulic lift #88 and the bridal or lifting cables for some #89 or pulling same out of the water as same is being taken out of service to re lock same into its position of storage and transport after the oil spill or other contaminates. had been cleaned up and stored in the hull of the vessel. in this embodiment, thereof.

This same hydraulic lift #88 and the bridal or lifting cables would operated by one of the crew members and this crew member working along 1 or 2 other crew members would deploy, operate, and store all of this equipment on this embodiment of a contaminant cleanup and recovery vessel and same would be employed to both launch the oil containment boom tow boats and booms in the putting same into service as well as employing same, to re-cradle same back onto the main floating contaminant cleanup and recovery vessel once the operation is completed. in this embodiment, thereof.

FIG. 6-C Is drawing of an embodiment of a contaminant cleanup and recovery vessel and equipment that cleans up and removes oil and other floating contaminants previously referenced as the first embodiment thereof. This drawing shows all of the same basic components comprising the contaminant cleanup and recovery equipment, as employed in what has been referred to as the first embodiment thereof, with all of the same basic components simply arranged in just a slightly different configuration and with all comprising same, simply turned around and mounted of the forward portion, or on the bow of the vessel, in that same can be just as easily made to be installed and employed on either the bow or the transom of the vessel. This drawing basically showing the same operation being performed that's being performed off of the stern of the vessel in FIG. 6-A. With the floating contaminant cleanup and removal equipment, either being lowered into the water, as same is being put into service as soon as the vessel reaches a spill, by means of the hydraulic lift #88 and the bridal or lifting cables for same #89. Or pulling same out of the water as same is being taken out of service, to re-locking of same back into its position, of storage and transport after the oil spill or other contaminates. had been cleaned up and stored in the hull of the vessel. in this embodiment, thereof.

The actual differences between this the bow mountable version thereof and the transom mountable version thereof, Being that the float #1, for this the bow mountable embodiment thereof, extends well out in front of the rest of the components comprising same, which all extend out behind the vertical roller tracks or rods #37 that the contaminant containment booms attach to and ride on and the screened in intake portions in which the floating contaminants initially, into the rest of contaminant cleanup and recovery equipment behind same. Thus the intake port tubes as well as the housings #4-A and floats for same as well as the contaminant transfer pipe sections #128-A, and the pivot able pipe joints 26 for same, as well as all upper and lower armatures and pivoting joints for same, the initial receiving tank #139 and the hydraulic lifting mount, all extend out behind the main float #1 and screened in intake portions of the the contaminant cleanup and recovery equipment, in that this embodiment thereof is pushed through the water, by the contaminant cleanup and recovery vessel, In this the bow mountable version thereof, instead of pulled through the water in the manner that the transom mountable embodiment thereof is employed.

Another small difference in this the bow mountable embodiment thereof being in two lower mounting brackets, #13-D welded to and extending out from each side of the lower stem portion of bow of the vessel. of which include a whole or an eye in which the lowest portion of the hydraulic lifting mount mechanically fastens to. in this embodiment, thereof.

FIG. 6-D Is drawing of an embodiment of a contaminant cleanup and recovery vessel and equipment that cleans up and removes oil and other floating contaminants in an embodiment thereof that employs all of the same basic components, simply arranged in just a slightly different configuration and with all comprising same, simply turned around and mounted of the forward portion, or on the bow of the vessel, in that same can be just as easily installed and employed on either the bow or the transom of the vessel. and employs all in a very similar manner as all other embodiment's referenced as the transom mountable version second embodiment thereof.

The only real differences between this the bow mountable version thereof and the transom mountable version thereof. Being that all components comprising same extend out behind the vertical roller tracks or rods #37 that the contaminant containment booms attach to and ride on and the screened in intake portion thereof. Including the contaminant transfer pipe, The pivot able pipe joints, as well as all upper and lower armatures and pivoting joints for same, all extend out behind the screened in intake portion thereof, which is located in the very forward portion of this embodiment thereof, in that same is pushed through the water, by the contaminant cleanup and recovery vessel, In this the bow mountable version thereof, instead of pulled through the water in the manner that the transom mountable embodiment thereof is employed. Another small difference in this the bow mountable embodiment thereof being in two upper armature brackets #12-D, and two lower armature brackets #13-D, The very end portions of these brackets comprise the portions of the pivot joints that the upper and lower armatures attach to and pivot on. Both sets thereof are welded to and extending out from each side of the bow stem portion of the vessel. the inboard pivoting pipe joint #26 would also be provided with a stable mounting platform welded to a portion of same. The inboard pivoting pipe joint #26 also includes an extra small section of the contaminant transfer pipe, of which is integral to a flange that is mechanically fastened over a hole with additional bolt holes around the outer periphery thereof in a lower side portion of the hull, just aft of the bow stem of the vessel with mechanical fasteners extending through same as well as through holes in the flange portion a valve inside the lower inner bow portion of the vessel, with all sealed and mechanically fastened together as one. This being the entry point for the captured oil or other contaminants where same is pumped into separation and storage tanks therein the hull of the contaminant cleanup and recovery vessel, in this embodiment thereof.

All referenced as the first and second embodiment's thereof whether mounted on the bow or the stern of the vessel would perform all operations pertaining to the launching of all equipment requisite the employment of same, as well as all pertaining to the reinstallment of same back on the contaminant cleanup and recovery vessel, when the contaminant cleanup and removal operation is finished would be very similar in every way. This also holds true to the basic manner that hydraulic lift #88 and the bridal or lifting cables #89 would be employed operated by one of the crew members and this crew member working along one or two other crew members would deploy, operate, and re-store all of all equipment requisite to the employment of same back onto the contaminant cleanup and recovery vessel, once the contaminant cleanup operation is completed. in this embodiment, thereof.

FIG. 7-A. Is drawing of an embodiment of a contaminant cleanup and recovery vessel and equipment that cleans up oil and other floating contaminants previously referenced as the first embodiment thereof whether mounted on the transom or the bow of the vessel. This drawing shows how the contaminant cleanup and recovery equipment, could be locked in place for transport as well remain locked in place while not in use. Numbers 131A, #131B, and #131C—are the studs, plate, and nuts. These studs, plates, and nuts in this drawing, are used on both sides of this embodiment used to lock this embodiment's sections of framework 135 and #123 together at this embodiment's highest pivot point. studs #131A, are simply bolts that would extend all the way through both a section of framework #135 and #123 and welded therein, in a pattern that would match up with the pattern of the wholes drilled through plate #131B, so that when the aft portion of this embodiment is lifted up in place with the hydraulic lift, #88, this plate #131-B, is simply placed over these studs with an end portion of these studs extending through this plate; the nuts #131C, would be threaded onto these studs and snugged down. This action would simply enable this vessel to travel great distances at the maximum speed that the vessel was designed to run at without this embodiment slowing the vessel down due to drag in the process this would minimize wear and tear on this device. Once the vessel reaches its destination this embodiment is put back in service in the exact reverse manner by simply lifting the device, with the hydraulic lift #88, just to take the weight off of the studs, then remove the nuts and plates and lower the back into the water and back, into service. in this embodiment, thereof.

FIG. 7-B. Is drawing of an embodiment of a contaminant cleanup and recovery vessel and equipment that cleans up oil and other floating contaminants, previously referenced as the second embodiment thereof, mounted to the transom of the vessel. This drawing is showing by what means, the the contaminant cleanup and recovery equipment, could be locked in place for transport as well remain locked in place while not in use. simply accomplished by means of raising the oil recovery portion of this oil recovery system to its maximum position of height with hydraulic lift #88 where both the upper and the lower armatures #12-A and #12-B would lay up tight against the transom of the floating contaminant cleanup and recovery vessel between forks #122 consisting simply of steel tangs welded to the transom with a holes drilled latterly, in line with each other, in outer end portions of each, and just beyond the outer edge portions of the armatures, in which a large bolt or clevis pin for each included, perhaps with a small chain, welded to same with the other end thereof welded to the transom of the vessel as not to loose same. would simply be extended through said holes and secured in place with a threaded nut or cotter pin. This embodiment could be put back into service, simply by reversing the aforementioned process included for raising and locking same in place, when lowering this embodiment of the floating contaminant cleanup and recovery equipment, back into the water, for the employment of same. in this embodiment, thereof. This drawing shows hydraulic lift #88 turned back around and locked down, along with all other equipment on the vessel stowed, and in rout to a spill. in this embodiment, of same.

FIG. 8-A Is drawing of an overhead view of contaminant cleanup and recovery equipment mountable to a transom of a vessel and employed to clean up oil and other floating contaminants previously referenced as the first embodiment thereof. #130 are mechanically fastenable heavy screened panels that cover the entire inner framed section where the oil, or other type of floating contaminants would be channeled through and runs along the contaminant containment panel #125-A as it inter around and in back of the maim float #1 as same would continue to flow back to the furthest point aft where same would enter the point of recovery around behind smaller float #2-A, where same is pulled back forward by means of surface tension and into the height adjustable intake port #3. in this embodiment, thereof. The process for cleaning or clearing these screened panels would be controllable at the control panel located, on the floating contaminants recovery vessel. This process is completed by means of the activation of the two hydraulic rams #129 which pull the cross member that ties these two hydraulic cylinders #134 together downward across the surface of these screened panels. Located spanning across the inner surface of these cross members is a brush, that in turn brushes all of the floating debris that would be caught up in these screens such as Sargasso weed, trash, or other that would potentially clog or restrict the flow of oil or other floating contaminants, during the oil recovery process. This debris is swept under this device and is simply swept away by the current. This debris is also restricted from entering the oil, or other type of floating contaminants recovery area from underneath of the contaminant cleanup and recovery equipment, during this process. by means of a panel #152 that extends across and encloses the entire bottom of the cleanup and recovery aria. in this embodiment, thereof.

The process for which as well as components comprising same also fully described in the description, of same, included in FIG. 4-D. as well as in the drawings and descriptions thereof included in FIGS. 20-A and 20-B of which being basically the same in most embodiment's thereof, included in this application. #138 Is the tank vent located on the top of the receiving tank. #137 Is the tube that is coupled to the outlet of the submersible pump best seen in FIGS. 4-B and C that pumps the oil, or other type of floating contaminants and water solution from the receiving tank #139, to the oil, or other type of floating contaminants and water separation and storage tanks. This tube is attached to a flexible tube #120 (not seen), at a point just above the receiving tank that carries this oil, or other type of floating contaminants and water solution to a deck fitting that runs to the oil separation and storage tanks in the hull of the vessel. #1 is an overhead view of the top of the main float that carries the weight of this oil recovery device. #138 is the tank vent located on the top of the receiving tank #139. #125-A are the mechanically fastened removable contaminant panels. in this embodiment, thereof. However all designs of the contaminant cleanup and recovery equipment employed with only one main float #1, in the manner as employed in this embodiment the aft portion of float #1 itself, provides the same service provided by the current deflection panels employed in many other embodiment's thereof.

FIG. 8-B. Is drawing of an embodiment of contaminant cleanup and recovery equipment that cleans up oil and other floating contaminants, previously referenced as the second embodiment thereof in this application. This drawing is an overhead view of contaminant cleanup and recovery equipment showing. roller tracks or rods #37 which are located on the outermost leading edge of the main floats #1 that the oil, or other type of floating contaminants containment booms attach to and ride up and down vertically on. #152 is heavy meshed panel that extends across the span of the bottom open portion of this device. 1-B is an overhead view of the main floats #1 that carry the weight of the floating contaminant cleanup and recovery equipment. #125 are current and wave deflection panels, simply added to direct the floating contaminants around and behind the #2-A or 2-B, floats, as well as to help reduce surface chop to a certain extent. These panels are located around the back outer perimeter of the aft portion of framework. #135 is the floating containment panel that extends across the back portion of the equipment behind the smaller floats #2-A. That house the intake port tubes therein #3-A The bottom portion of this floating contaminant containment panel #125 contains the floating contaminants in the aria where same is being continuous removed from the surface of the water by same. in this embodiment, thereof. of the contaminant cleanup and recovery equipment, of which, is shown as having two smaller floats and intake port tubes. However all embodiment's thereof are equippable, with not only, one or more these contaminant recovery devices, but all are also equippable, with one of two different types of these smaller floats #2 and intake ports that actually remove the floating contaminants from the surface of the water in two different modes; although both employ the greatest portion of the exact same components and equipment as well as employ same in the exact same manner to do so, which is included in drawings be described in detail and will be easily understood in other portions of this application.

Armatures 12-B and 13-B. That extend between the framework of the main, floating contaminant cleanup and recovery equipment, and the transom of the floating contaminant cleanup and recovery vessel, in this embodiment, thereof possess hinged or pivoting joints #11 located on the end portions thereof, that connect to mating portions of these hinge joints mounted both on the transom of the recovery vessel as well as a forward end portions; of the main framework #135, of the, floating contaminant cleanup and recovery equipment these pivoting joints #11 are in perfect lateral alignment with the contaminant evacuation pipes pipe joints #26, the pipe section #128-B, are also of the exact length of as both armatures #12-B and #13B and with the joints of all in perfect alignment with each other. in this embodiment, thereof.

FIGS. 9-A and 9-B are drawings of in this embodiment's of contaminant cleanup and recovery vessels and equipment that cleans up oil and other floating contaminants previously referenced as examples of first and second embodiment's thereof. These drawings show the actual equipment portions of these vessels, that clean up oil and other floating contaminants, loaded and in route to contaminant cleanup operation. #167 is a perforated section of pipe that extends down the freeboard of the hull to below the waterline, used as an exit point for water separated from the oil, or other type of floating contaminants to return to the sea in front of the oil, or other type of floating contaminants containment booms so that any residual oil therein, would simply go through the separation process once again. In this embodiment, thereof. This pipe is perforated in this manner so that any residual oil, or other type of floating contaminants that could possibly be in the oil, or other type of floating contaminants during this process, would exit at the waterline of the vessel. in this embodiment, thereof.

FIG. 10-A Is drawing of an overhead view of an embodiment of a contaminant cleanup and recovery vessel and equipment that cleans up oil and other floating contaminants, previously referenced as the first embodiment thereof, as same would appear in route to an oil spill with all equipment stored on deck and the oil recovery equipment mounted on the transom floating contaminant cleanup and recovery vessel, raised and locked into position of non-deployment. in this embodiment, thereof.

The basic configuration, orientation and basic layout of these vessels and all equipment employed on then are included as examples of functionality only, in that all vessels and equipment embodiment's included in this application are constantly being improved, and experiencing, advancements both in design and engineering, most advantageous to the level of service and efficiency providable by same. This holds true with pretty much all included in this application, but even much more so, in these first two embodiment's thereof, in that these drawings of same were produced almost two years ago, and since then, they have suffered several major advancements both in engineering and design since these drawings thereof were made. However the basic components and the implementation of same, as well as the basic mode in which, all included in this application gather and remove the floating contaminants from the surface of the water remain the same. in this embodiment, thereof.

FIG. 10-B Is drawing of an overhead view of the same, embodiment of a contaminant cleanup and recovery vessel as is included in FIG. 10-A. a few minutes after same has reached the oil or other type of contaminant spill, and has already lowered both the floating contaminant cleanup and recovery equipment, on the stern of the vessel into the water. as well as the floating the contaminant containment boom tow boats into the water on each side of the main contaminant cleanup and recovery vessel which is very quick and easily accomplished with the one hydraulic Lift. #88, in that same would be mounted on the vessel in a position most advantageous to performance of all tasks needful of its services. Both ends of both contaminant containment booms, would have also been previously attached both to #37 being the vertical roller tracks or rods located both on the outermost leading edge of the contaminant cleanup and recovery equipment, in this embodiment, thereof. As well as to the contaminant containment boom towing boats. All of the contaminant containment booms, after the last job, would have also been laid out and stored on the vessel in a manner, in which same would simply feed off of the main contaminant cleanup and recovery vessel, In fact more recent designs of same are equipped in a manner more consistent with later developed vessel and equipment embodiment's included in this application that include contaminant containment boom storage bins and boom retrieval winches such as those included in additional vessel and equipment embodiment's, included in this application.

This drawing is drawn as if both contaminant containment boom tow boat #108 had been launched with the contaminant containment boom tow boat on the port side of the main contaminant cleanup and recovery vessel already in position to initiate the floating contaminant cleanup and recovery process (not seen), and the other contaminant containment boom tow boat #108 also in the water on the on the starboard side of the main contaminant cleanup and recovery vessel just heading out to get into position to start the floating contaminant cleanup and recovery operation, with the other two vessels. towing the contaminant booms #107 behind same. in this embodiment, thereof.

Figure 11:
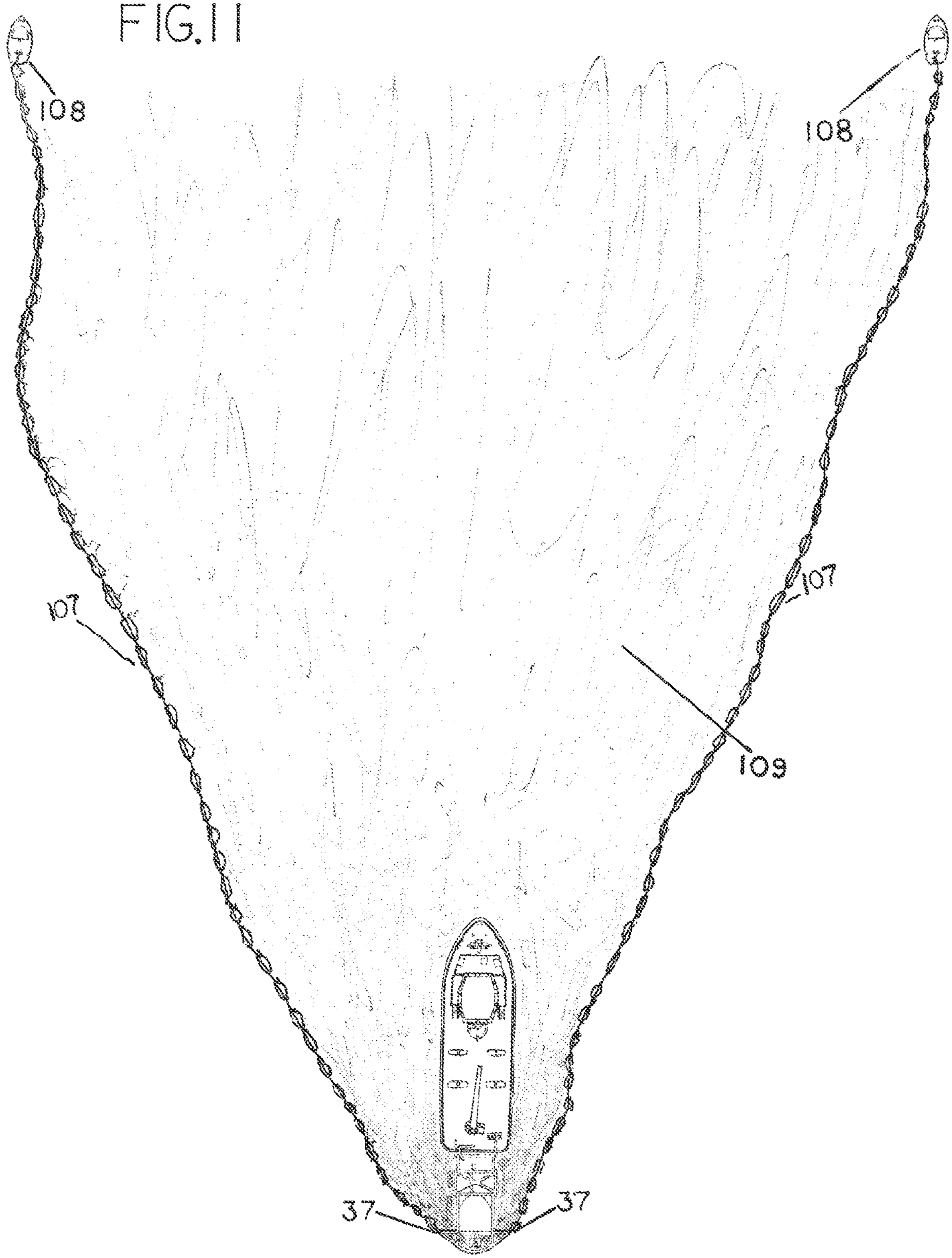
FIG. 11 illustrates an overhead view of the vessel of FIG. 1A fully deployed.

FIG. 11. Is an overhead view of an embodiment of a main contaminant cleanup and recovery vessel and equipment that cleans up oil and other floating contaminants previously referenced as a first embodiment thereof, as it would appear in service with all three vessels traveling forward and working in conjunction with each other, as the containment boom tow boats #108 are towing the containment booms #107, that extend out from behind same, all of the way back to the contaminant cleanup and recovery equipment mounted on the stern of the main contaminant cleanup and recovery vessel with the end panel portions thereof attached to and riding on roller tracks or rods #37 on the outermost leading edges of the screened in, intake portions thereof, and the contaminant containment boom tow boats, gathering and corralling the floating oil, or other floating contaminants #109 in front of the main contaminant cleanup and recovery vessel, where all is channeled and concentrated back to the floating contaminant cleanup and recovery equipment mounted on the stern the vessel where same inters into through screened in, intake panels thereof, as same makes its way back into the recovery aria of the contaminant cleanup and recovery equipment, where same is pulled back forward and into intake port tubes housed in open portions in the backsides of the smaller floats by means of surface tension and continues to do so as fast as same can be gathered by the contaminant containment boom tow boats. in this embodiment, thereof.

All contaminant cleanup and recovery vessels as well as all floating contaminant cleanup and recovery equipment mounted on or employed by same, included in all of the following embodiment's thereof, in this application, are devised and engineered, in every way, with extreme effort directed towards all components and apparatuses comprising same, in a manner that all fluidly and concomitantly work to gather as one, to achieve and provide the highest level, of all services and needful abilities, and do so at the highest provisional level of operational efficiency achievable, in the broad range of conditions, both naturally occurring as well as created during the process of cleaning up and removing same. Which will be fully understood in all of the drawings and drawings and descriptions, therefore, that follow. in this embodiment, thereof.

Figures 12A, 12B:
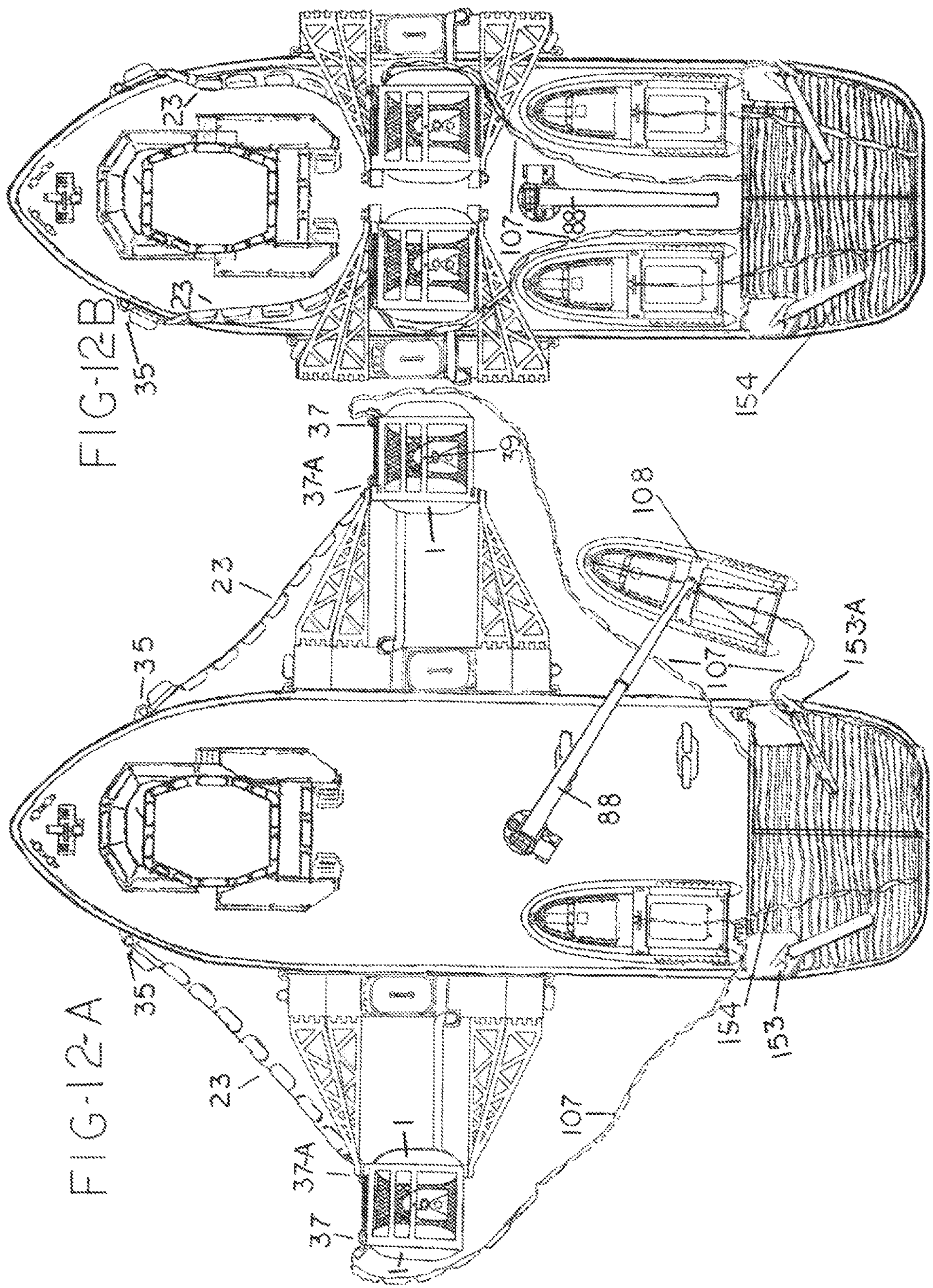
FIG. 12-A illustrates an overhead view of an alternative embodiment of a floating contaminant cleanup and recovery vessel with side-mounted equipment in the process of being deployed.

FIGS. 12-A and FIG. 12-B. are both drawings of an embodiment of a contaminant cleanup and recovery vessel and equipment mounted thereon. This Embodiment thereof cleans up oil and other floating contaminants from the surface of the water by means of, floating contaminant cleanup and recovery equipment, mounted on each side of the. contaminant cleanup and recovery vessel. in this embodiment, thereof.

These drawings are overhead views of this embodiment thereof and of which were included to show the manner in which the this embodiment of the floating contaminant cleanup and recovery equipment, is both deployed, from the contaminant cleanup and recovery vessel when it reaches the spill, same has been dispatched to, as well as how, same is taken back out of service and re-stowed on the contaminant cleanup and recovery vessel, and readied for its next deployment, when the floating contaminant cleanup and recovery operation has been completed. Of which is accomplished very quickly and easily and by only two or three crew members. in this embodiment, thereof.

FIG. 12-A Is an overhead view of an embodiment of the floating contaminant cleanup and recovery vessel and equipment employed on same, as all would appear, shortly after same had reached the oil or other type of contaminant spill, and had already lowered the floating contaminant cleanup and recovery equipment, employed on same, into the water on both sides of the main contaminant cleanup and recovery vessel. This task accomplished by means of the hydraulic lift #88, presently launching, the first of the contaminant containment boom tow boats, into the water, on the starboard side of the vessel. in this embodiment, thereof.

Notice all equipment comprising same is engineered in a manner that all portions thereof needful to the employment of same, remains fully connected and ready both to be put into service within minutes, not only during the transport launching and employment of same. But all components thereof also remain intact and fully connected to each other when same is taken back out of service as well. All is also devised and engineered in manner, that the process of taking all back out of service, and the reinstallment of all equipment back on contaminant cleanup and recovery vessel, and readying all for its next contaminant cleanup and recovery operation, is also accomplished at both the same level of speed, ease and efficiency as same was put into service and employed. in this embodiment, thereof.

Notice in FIG. 12-A the manner in which all containment panels #23 that the ends of which, both extend between, attach to, and ride on, both the inner roller tracks or rods #37-A affixed to the leading edge of the inner floats 1 that provide buoyancy for the floating contaminant cleanup and recovery equipment and with the other ends thereof extending over, and attaching to, and riding on vertical roller tracks or rods #35, affixed to forward portions of the hull on each side of the vessel. This as well as the contaminant containment booms #107, with one end panel portion thereof attached to, and riding on the on the other vertical roller tracks or rods #37 affixed to leading edge of the outer main floats #I that provide buoyancy for the floating contaminant cleanup and recovery equipment and the other end panel portion thereof attached to, and riding on the vertical roller tracks or roller tracks or rods, on the containment boom tow boats #108, of which are not only all fully connected as well as laid out in a manner as to enable all to simply be put into the water and immediately employed but all is also devised and engineered in a manner in which, all comprising same is taken back out of service and re-installed back on contaminant cleanup and recovery vessel, in the same level of speed and efficiency as same was put into service, but also does so in a manner in which all naturally lays out much in the same manner as same is viewed in the drawing included in FIG. 12-B with all for the most part ready to be re-deployed to the next spill or ready to return back to port. in this embodiment, thereof.

Both the launching and re-cradling, of the contaminant containment boom tow boats. #108. As well as the launching of all contaminant cleanup and recovery equipment. As well as the re-racking of seem, on the main deck of the contaminant cleanup and recovery vessel, is very quickly and easily accomplished with the one hydraulic Lift. #88, in that same is mounted on the vessel in a position most advantageous to performance of all tasks needful of its services. in this embodiment, thereof.

However the services of the hydraulic lift, #88. Is not really needed, to effect the deployment, and re-storage of the floating contaminant containment booms #107. The task of which is very quickly and easily accomplished by means of one or two crew members, along with the employment of electric or hydraulic boom winches #153-A, in that the deployment of the contaminant containment booms #107 is simply accomplished by means of letting the contaminant containment booms simply flow through the center portion of the spools of the disengaged electric or hydraulic boom winches #153-A as same are being pulled out of the contaminant containment boom storage bins #154, and feeding out behind the contaminant containment boom tow boats #108 as same are being deployed.

The re-storing of The contaminant containment booms #107 back into their storage bins #154 is simply accomplished by means of laying a portion contaminant containment booms across the tapered and ribbed inner spool portion of the electric or hydraulic contaminants containment boom spool winches #153-A located on each side of the vessel on the upper edge portion of the oil containment boom storage bins #154 as these oil containment booms are being pulled into the contaminant containment boom storage bins #154 by the means of the said contaminants containment boom spool winches. This process of which directed into various portions thereof by means of a slide portion of this device. to fairly evenly spread out same in the contaminant containment boom storage bins #154 but with same allowed to flake into the bins naturally and not laid in neatly as. indicated in the drawings thereof. The process of which would also be accomplished in about the same amount time, same was deployed as well. in this embodiment, thereof.

FIG. 12-B Is drawing of an overhead view of the same embodiment of a contaminant cleanup and recovery vessel and equipment therefore as included in FIG. 12-A and is drawn both as same would as same would appear, in rout or as same would appear shortly after completing contaminant cleanup and recovery operation with all equipment enabling same reinstalled on the main contaminant cleanup and recovery vessel and returning from same, or as same would appear dockside, in a position of non-deployment standing by and ready for the deployment of same. All would remain equipped in the same manner. in this embodiment, thereof.

FIG. 12-C Is an overhead view of another embodiment of a floating contaminant cleanup and recovery vessel and equipment employed on same, which will be referred to as the fourth embodiment thereof for easy reference purposes. This drawing, is showing an example of how an embodiment configured in this manner would appear, shortly after same. had reached the oil or other type of floating contaminant spill, and had already lowered the floating contaminant cleanup and recovery equipment, employed on same, into the water on both sides of the main contaminant cleanup and recovery vessel, and as if the first of the contaminant containment boom tow boats #108, on the port side of the vessel, which has already headed out and is getting into position to start the contaminant cleanup and recovery operation (Not shown) These tasks accomplished by means of the hydraulic lift #88, presently launching, the second of the contaminant containment boom tow boats, into the water on the starboard side of the vessel. in this embodiment, thereof.

This drawing shows how all equipment needful to complete the contaminant cleanup and recovery operation can be quickly and easily put into service by means of the hydraulic lift #88 and done so in basically in the exact same manner and at same level of speed and efficiency as the third referenced embodiment thereof included in FIGS.-12-A and 12-B. which is accomplished in both embodiment's thereof simply by means of hooking up to the hydraulic lift's #88 lifting cable that is attached to a pad eye #39 located on the center top portion of the framework of floating contaminant cleanup and recovery equipment and by simply lifting same until this outer portion of this device lifts over and pivots outward as it is placed in the water This process for launching this, embodiment of the floating contaminant cleanup and recovery equipment, being a very similar mode for the launching of what was previously referenced as the third embodiment thereof and included in FIGS. 12-A and 12-B. Even though much in the composition in both are quite different from each other, This drawing also shows this embodiment as employing floats 2-B that houses the vacuum type of Equipment #3-B that actually removes the floating contaminants from the surface of the water as well, which will be fully understood in following drawings and descriptions therefor also included in this application.

Some of the things that both the third and the fourth embodiment thereof share as common with each other, being the employment of the contaminant containment panels #23, that the ends of which, both extend between, attach to, and ride on, both the inner roller tracks or rods #37-A affixed to the leading edge of the inner floats 1 that provide buoyancy for the floating contaminant cleanup and recovery equipment and with the other ends thereof extending over, and attaching to, and riding on vertical roller tracks or rods #35, affixed to forward portions of the hull on each side of the vessel. This as well as the contaminant containment booms #107, with one end panel portion thereof attached to, and riding on the on the other vertical roller tracks or rods #37 affixed to leading edge of the outer main floats #I that provide buoyancy for the floating contaminant cleanup and recovery equipment and the other end panel portion thereof attached to, and riding on the vertical roller tracks or rods, on the containment boom tow boats #108. Of which both the embodiment's included in FIGS. 12-A and 12-B referenced as the third embodiment thereof and this embodiment referenced as the fourth embodiment thereof both are shown as employing same, and would do so in the same basic manner and purpose as each other. Both also do so with all remaining connected, at all times. Both as launched, as well as, during and after, All is brought back onto and re-stowed on deck of the main contaminant cleanup and recovery vessel all intact. and at the same level of speed and efficiency as same was put into service. and with all either employable or re-employable within a moments notice. This actually holds true for all embodiment's of the main floating portions of the contaminant cleanup and recovery equipment included in this application. All are also employed with or are employable with a variation of the contaminant containment boom spool winches and boom slides employed for the retrieving and re-stowing of the contaminant containment booms in the storage bins for same #154. in this embodiment, thereof.

And even though all embodiment's of the floating contaminant cleanup and recovery equipment, as well as the vessels, employing same, share a great many differences, more advantageous in one way or another, most common to the role of their employment, All posses, all around and never previously achievable levels of operational, ease efficiency, recovery rates that radically surpasses all others while possessing numerous additional abilities enabling same to overcome and remain operable in sea conditions and other recovery scenarios that renders others as inoperable and does so at levels that radically surpasses all others to an extent that will doubtless render others solutions as obsolete.

FIG. 12-D Is a drawing of an enlarged overhead view of an embodiment of a platform #158-A that a crew member would stand on to operate the electric or hydraulic, contaminant containment boom winch #153-A, when pulling the oil containment booms back onto the vessel and storing same into the oil containment boom storage bins #154, as seen in FIG. 12-C. The oil, or other type of floating contaminant containment booms are pulled through the spool of the winch #153-A powered by means of the electric or hydraulic motor, #161-A that would possess a pinion gear, that would be engageable, by means of a solenoid; engaging a bendex that in turn would engage the pinion gear, to a crown gear located under cover #162-A, (not seen) in the same manner that an automotive starter functions, this crown gear would be mechanically fastened to the spool, of the spool winch #153-A which in turn, when activated would turn the spool portion of the spool winch #153-A. A release able cog (not seen) would also be provided that when put into service would momentarily engage a series of notches or protrusions during spool rotation (not seen). This cog would be taken out of service during the deployment processes of the contaminants containment booms as there being pulled out to be put into service, by the contaminant containment boom tow boats and allowed to be pulled back up the boom slide #159-A which would have a raised lip or fiddle #163 on both sides thereof and allowed to freewheel through the spool. #153-A Then when the end is reached it would be simply lifted out of the spool portion of the spool winch #153-A and thrown over the side by said crew member. in this embodiment, thereof. The process employable, for the retrieving and re-storing of same, in this embodiment, thereof. once the contaminant cleanup and recovery operation is completed, would start as soon as the first of the contaminants containment boom tow boats is lifted back onto and same is being placed in the boat skids for same. At which time the crew member simply lays the first portion thereof into the inside portion of the spool winch #153-A, then by means of engaging the cog and turning on the motor for the spool winch with a momentary switch which would be engaged and controlled by a crew member. The spool on the spool winch works much in the same manner as a V belt type pulley works in this embodiment, thereof with the inner portion there of being tapered and ever getting narrower as the inner side portions reach the inner most portion of the hub thereof so that the more resistance the contaminant containment boom encounters as same is being pulled in by these oil, or containment boom spool winches #153-A, the more friction is applied by same, and thus, the level of holding power to the sides of the containment booms would be grabbed ever tighter due to the ever narrower inner portions these spool winches #153-A. The spool portions of same are also shown as being equipped, or configured with, small raised ridges spiraling or curved slightly from the outer periphery of the spool towards the lower portions thereof simply to provide additional friction or grabbing ability to the tapered spool portions of the spool winches. by means of a bar or plate, that would extend upward from the bottom of an inner portion of the contaminants containment boom spool winches frame work, to, but not quite touching, the inner most portion of the spools, which would added simply as a safety precaution to insure the release of the oil containment boom from the spool portion of the spool winch #153-A, where same would fall onto a contaminants containment boom slide #159-A, which would be very similar to a playground slide, with raised outer side portions thereof. in this embodiment, of this slide is shown as possessing a pivot able base, equitable with a horizontal base plate, integral to a rod extending downward at 90 degrees, from the plate, a cheek bearing would slide up around the rod with the race portion of the bearing would lay against the bottom of the plate, with the rod, portion of this base having two additional bearings located one on the top and one on the bottom portion of the rod in this embodiment thereof, where these two bearings and the rod would be inserted into a section of pipe made as a portion of the framework for the spool winch platform with a top plate welded around the pipe entry of the pipes open end portion of the rod and bearings, would be inserted into the pipe, with the race portions of the cheek bearing being compressed between the two plates. An additional cheek or backing plate is shown to be through bolted through the slide and through the base plate in this embodiment, thereof. allowing this embodiment of a contaminants containment boom slide to pivot freely. A handle #160 on the side of this oil, or other type of floating contaminants containment boom slide #159-A is provided which allows the crew member to take hold of and pivot this contaminant containment boom slide #159-A to various areas of the oil containment boon storage bin to equally distribute the containment containment boom back into the bin by this crew member performing this operation. in this embodiment, thereof.

Figure 13:
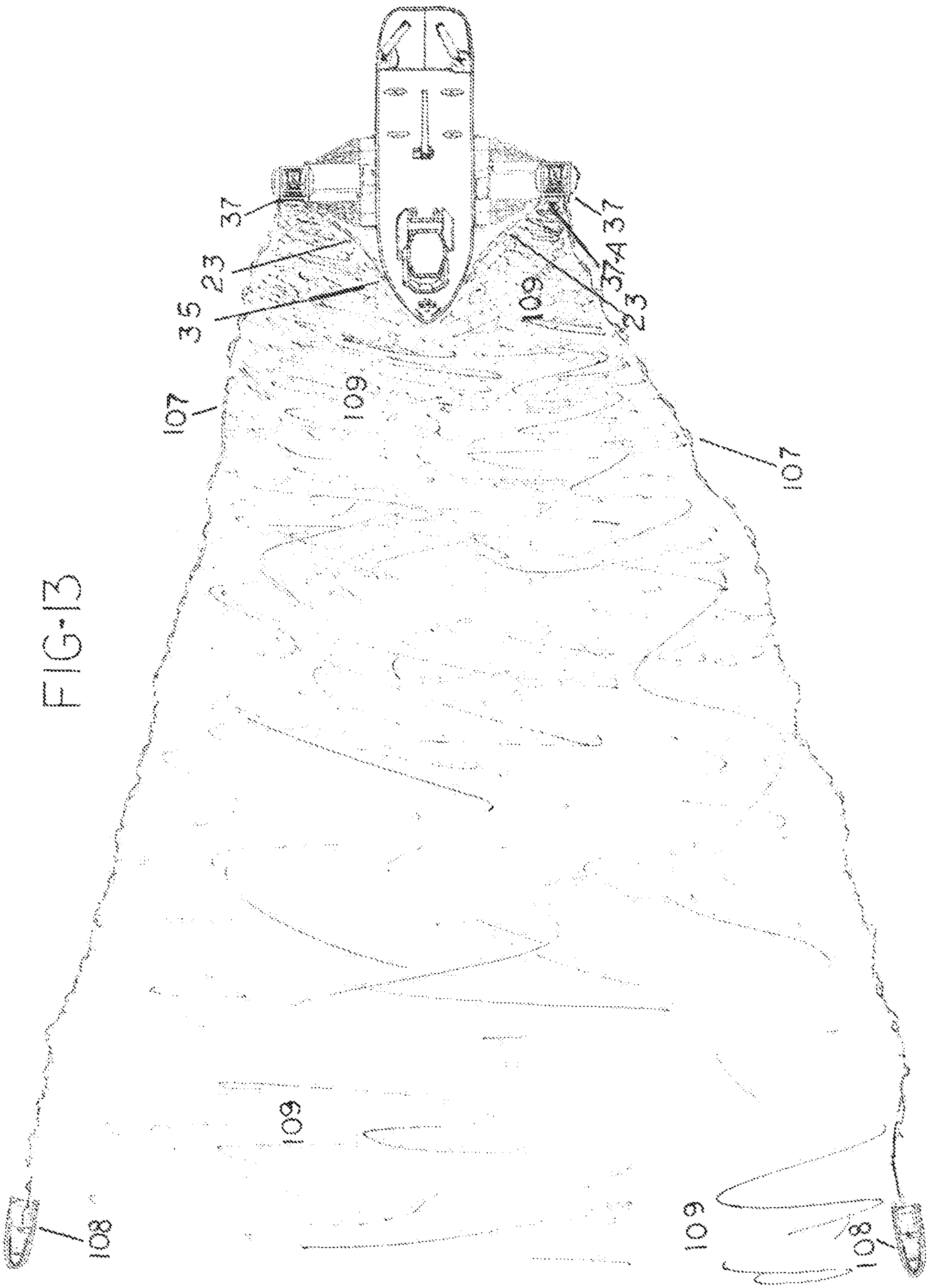
FIG. 13 illustrates an overhead view of the vessel of FIG. 12-A with the cleanup and recovery equipment fully deployed.

FIG. 13 is a drawing of an overhead view of an embodiment of a floating contaminants cleanup and recovery vessel and the floating contaminant cleanup and recovery equipment previously referred to as the third embodiment thereof performing an oil, or other type of floating contaminant cleanup and recovery operation by means of the oil, or other type of floating contaminants being cleanup and recovered by means of all three vessels traveling forward and working in conjunction with each other, as the containment boom tow boats #108 are towing the containment booms #107, that extend out from behind same, and inward all of the way back to the contaminant cleanup and recovery equipment mounted on each side of the main contaminant cleanup and recovery vessel.

1 with the end panel portions thereof attached to and riding on roller tracks or rods #37 on the outermost leading edges of the main floats #1 screened in, intake portions thereof, in this embodiment, thereof. and the contaminant containment boom tow boats, gathering and corralling the floating oil, or other floating contaminants #109 out at different angles on each side in front of the main contaminant cleanup and recovery vessel, where same is further channeled and concentrated back, between both lengths of contaminant containment booms #107 being towed by the contaminant containment boom towboats #108 To the point of where same reaches the forward portion on each side, of the main contaminant cleanup and recovery vessel, where the floating contaminants get further concentrated between main contaminant containment booms #107 attached to and riding on roller tracks or rods #37 on the outermost leading edges of the main floats #1. that provide buoyancy for the floating contaminant cleanup and recovery equipment the contaminant containment panels #23, also on each side of the main contaminant cleanup and recovery vessel, the ends of which, extend between, attach to, and ride on, both the inner roller tracks or rods #37-A affixed to the leading edges of the inner floats 1. in this embodiment, thereof. that also provide buoyancy for the floating contaminant cleanup and recovery equipment and with the other ends thereof extending over, and attaching to, and riding on vertical roller tracks or roller tracks or rods #35, which are shown as being affixed to forward portions of the hull on each side of the main contaminant cleanup and recovery vessel, in this embodiment, thereof. Where all oil or other floating contaminants trapped and running between same, inters into through screened in, intake panels thereof, as same makes its way back into the recovery aria of the contaminant cleanup and recovery equipment, where same is pulled back forward and into intake port tubes housed in open portions in the backsides of the smaller floats by means of surface tension and continues to do so as fast as same can be gathered by the contaminant containment boom tow boats. #108. and provided for same to remove. in this embodiment, thereof.

Figure 14:
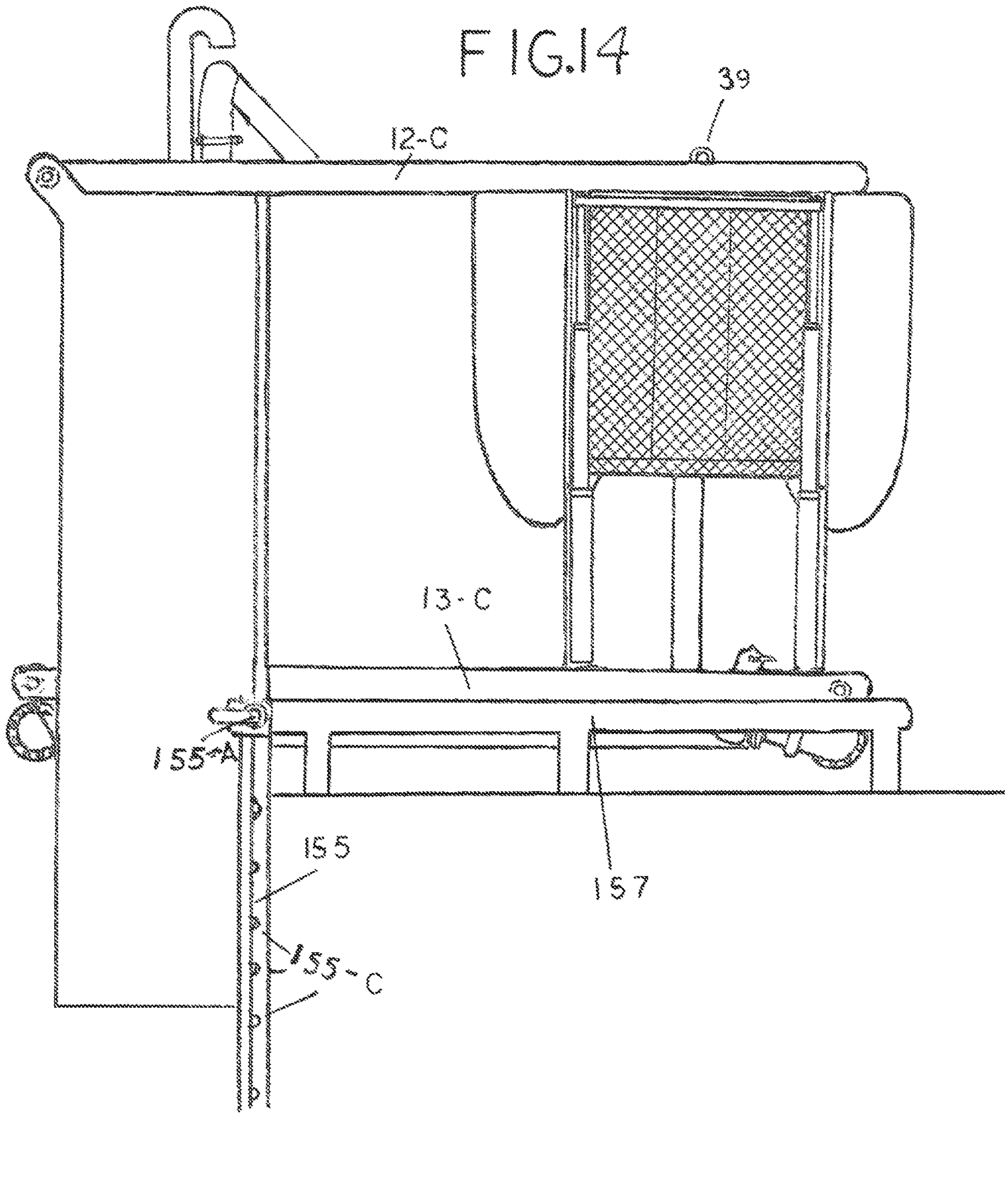
FIG. 14 illustrates a profile view of the cleanup and recovery equipment of FIG. 12-A in a stored position.

FIG. 14 is a drawing of a profile view of an embodiment of a type of floating contaminant cleanup and recovery equipment, previously referred to as a third embodiment thereof of which is an example of an embodiment of the floating contaminant cleanup and recovery equipment. The tracks #155 for same to attach to and be vertically adjustable on, are welded or mechanically fastened to the freebord between the chine and main deck, on each side of the main contaminant cleanup and recovery vessel. Cradles or racks, for a portion thereof to rest on during transit, or periods non-use. Are located directly behind said tracks #155 that the contaminant cleanup and recovery equipment attach to and are vertically adjustable on, and of which are welded or mechanically fastened to the main deck of the contaminant cleanup and recovery vessel. in this embodiment, thereof.

This drawing is a profile view of the same type of floating contaminant cleanup and recovery equipment, previously referred to as a third embodiment thereof. raised on its tracks #155 to a position where the top of the oil contaminants recovery tank and armature base hinge #11 are level with the top of the rack portions of the cradle #157, where at this point, same is locked in place by means of a latch pin #155-A that extends through said tracks #155 as well as portion of the floating contaminant cleanup and recovery equipment, riding in same. At this point the process of cradling of the floating contaminant cleanup and recovery equipment is accomplished by means of the hydraulic lift #88, and lifting cable #89 (Neither of which shown in this drawing), attached to the padeye welded to an upper center framework portion of the floating contaminant cleanup and recovery equipment. As same is lifted by means of said hydraulic lift #88. (not shown) lifts the floating contaminant cleanup and recovery equipment to a point in which the armatures 12-C and 13-C for same pivot past their its highest pivot point of 90 degrees, and then all the way over. The floating contaminant cleanup and recovery equipment, is simply laid into the cradles #157 for same on each side of the main deck, of the floating contaminant cleanup and recovery vessel. in this embodiment, thereof. in which same rests in when not actually in use. An overhead drawing thereof, is included in FIG. 15, in another example of an embodiment thereof.

Figure 15:
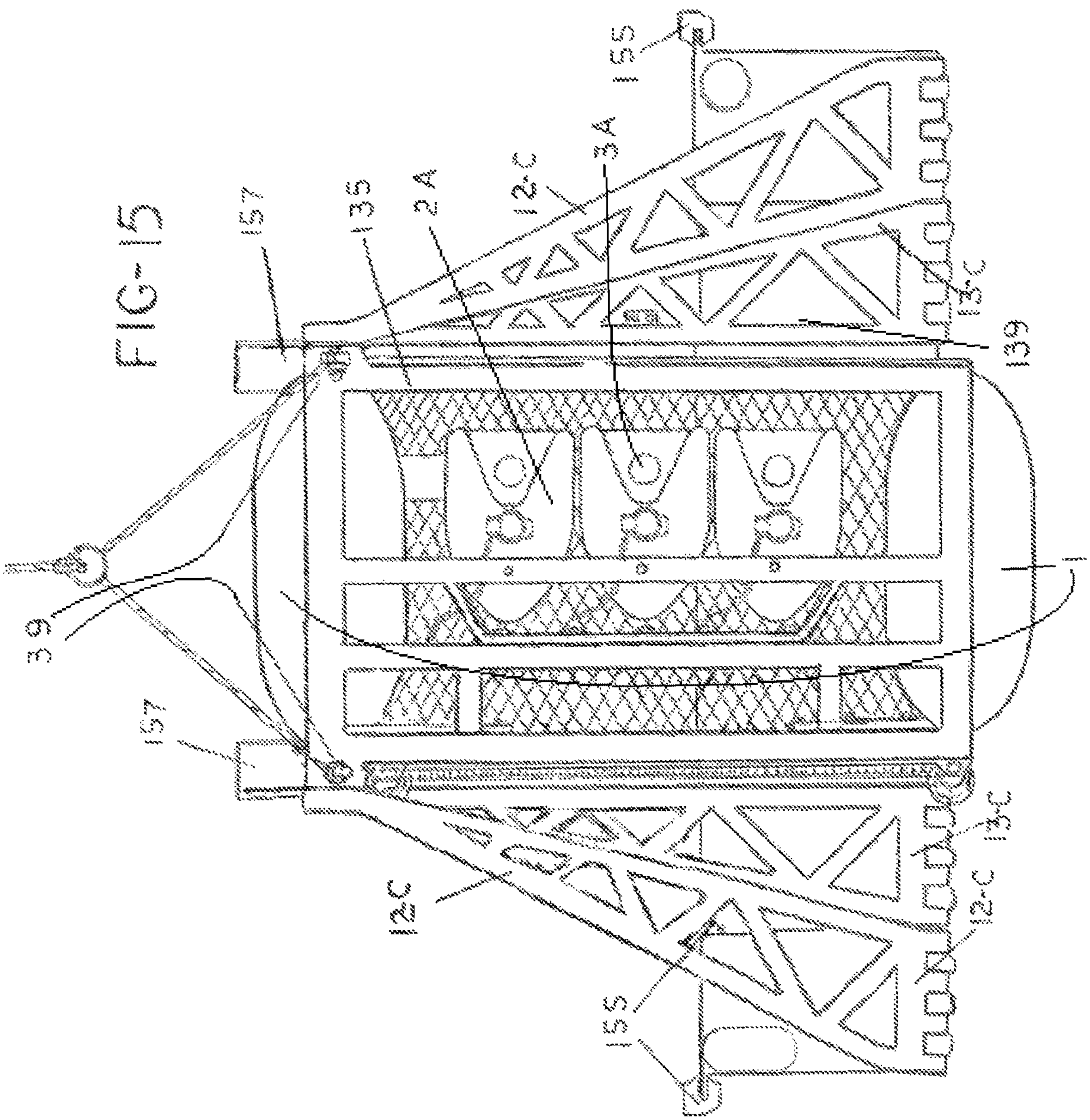
FIG. 15 illustrates an overhead view of an alternative embodiment of side-mounted cleanup and recovery equipment.

FIG. 15. Is a drawing of a overhead view of an embodiment of a type of floating contaminant cleanup and recovery equipment, previously referred to as a third embodiment thereof. of which. The initial receiving tank #139 (not seen) along with the upper portions of the hydraulic rams (not seen) and the base and joint portions of armatures #12-C and #13-C remain on The tracks for same #155, that same attaches to and be vertically adjustable on, and of which is welded or mechanically fastened to the freebord beneath the waterline and main deck, on each side of the main contaminant cleanup and recovery vessel. in this embodiment, thereof.

The rest of the floating contaminant cleanup and recovery equipment is pivoted over and resting on the Cradles or racks, provided for same to rest on during transit, or periods non-use, located behind said tracks #155 that the contaminant cleanup and recovery equipment are attached to on each side of the contaminant cleanup and recovery vessel, and of which same, are vertically adjustable on, These Cradles or racks, (not shown) are also, welded or mechanically fastened to the main deck of the contaminant cleanup and recovery vessel and on which the floating portion of the contaminant cleanup and recovery equipment, is securely stored on the main deck of the contaminant cleanup and recovery vessel in their cradles, #157 in this embodiment, thereof.

This drawing shows, this embodiment, of the contaminant cleanup and recovery equipment employed on this example of an embodiment thereof, stored on the main deck of the contaminant cleanup and recovery vessel in a bit larger configuration that possess 3 floats #2-A and intake port tubes #3-A. This embodiment is also configured in a manner that the floating contaminant containment panels #23 (Not shown) that attaches to and rides on roller track or rod #37-A (not viewable) on the leading edge of the closest inboard float #1 and extends over to, attaches to, and rides on roller track or rod #35 (Not shown) on a forward freebord portion of the vessel (not seen), as well as the floating contaminant containment booms #107 (Not shown) that attaches to and rides on roller track or rod #37 (not viewable) affixed the forward leading edge of the out board float #1 and withe other end thereof attached to the contaminant boom tow boats on each side of the vessel, when pulled up and out of the water, the containment panels #23 (Not shown) simply lays around the outer portion of the forward hydraulic ram housing portion of this embodiment thereof that basses of the pivoting joint portions of the upper armatures are attached to, and the contaminant booms #107 (Not shown) when pulled up and out of the water, simply lays around the outer portion of the aft hydraulic ram housing portion of this embodiment thereof that basses of the pivoting joint portions of the upper armatures are attached to, when the floating portion of the contaminant cleanup and recovery equipment is being placed in the cradles for same. Both contaminant booms #107, (Not shown) as well as the floating contaminant containment panels #23 (Not shown) simply go back into their positions of service once lifted back over and set into the water by hydraulic lift. in this embodiment, thereof.

So that whether dockside standing by in transit being deployed or taken back out of service and in transit to the next contaminant cleanup and recovery operation all containment panels #23 (Not shown) and containment booms #107. (Not shown) can remain attached at all times, and can be deployed, or taken back out of service of service and re-cradled very fast and easily simply with one, or two crew members deck hand operating the hydraulic crane. in this embodiment, thereof.

Figure 16:
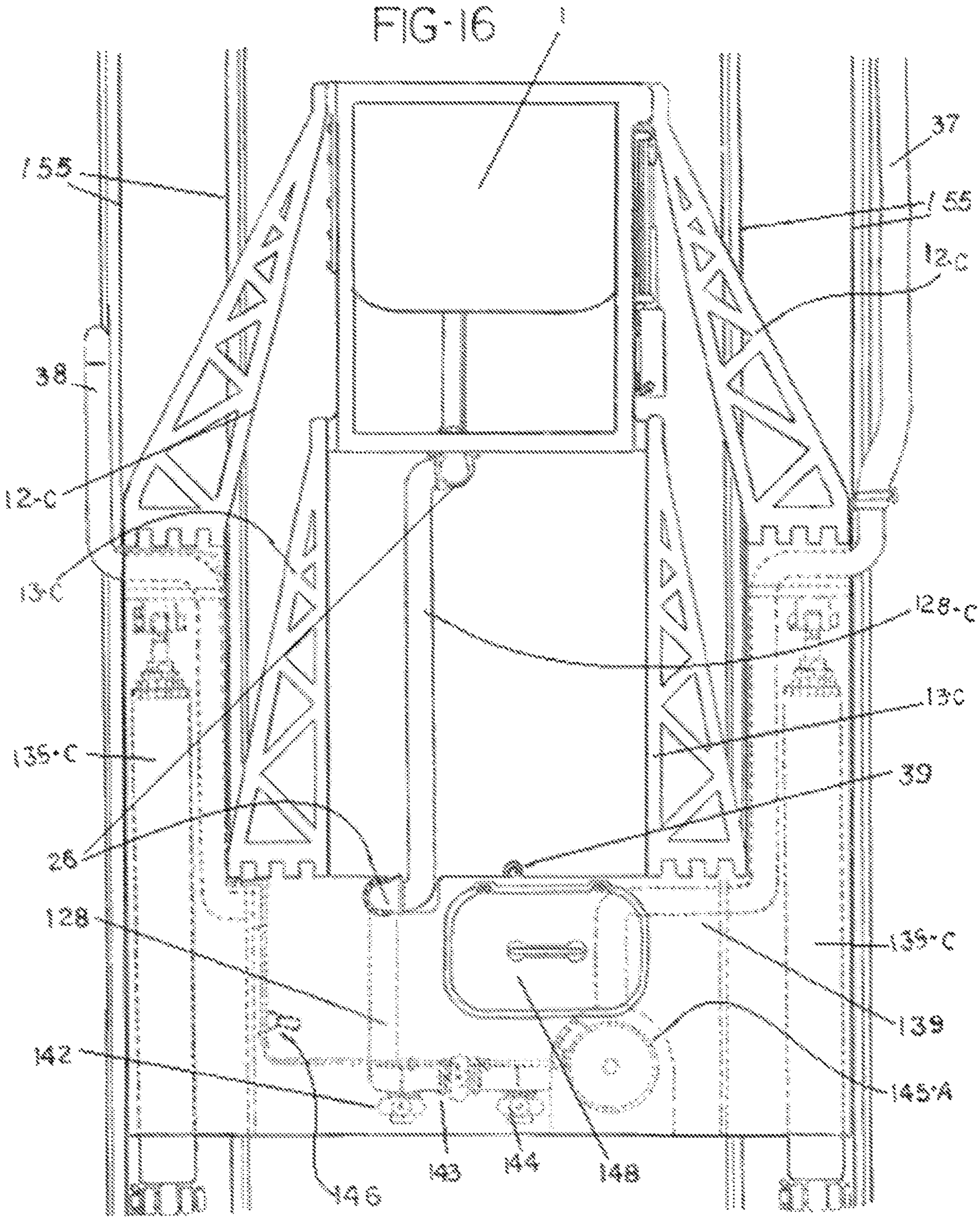
FIG. 16 illustrated a frontal view the cleanup and recovery equipment of FIG. 12-A in a fully raided and pivoting position.

FIG. 16 Is a drawing of a frontal view of an embodiment of a type of floating contaminant cleanup and recovery equipment, previously referred to as a third embodiment thereof of which is an example of an embodiment of the floating contaminant cleanup and recovery equipment. This drawing shows same mounted on the side of the floating contaminant cleanup and recovery vessel on tracks #155 as the contaminant cleanup and recovery equipment portion thereof, has been out of the cradle for same #157, on the main deck of the contaminant cleanup and recovery vessel, as viewed in the drawing thereof provided for FIG. 14. This drawing thereof, shows same, lifted to its highest pivot point by means of hydraulic lift #88 (Not shown,) as if same was being put into service by means of the launching of same, would be accomplished by means of the hydraulic lift or crane also mounted on this embodiment, of the main deck of the contaminant cleanup and recovery vessel, lifting same past its highest pivot point and lowering same into the water, with all height adjustments made to same relative the surface of the water accomplished by means of the hydraulic rams and cylinders same #135-C, inside housings on each side of the initial receiving tank #139 These rams are provided for remotely making height adjustments to the contaminant cleanup and recovery equipment to maintain maximum efficiency of same, as the draft of the main contaminant cleanup and recovery vessel gets lower in the water due to the. volume and weight of the contaminants collected. The portion of this embodiment including the components comprising the hydraulic lift portions thereof, if employed would always possess a backup system for same simply provided by means of a lifting cable #155-C (not shown) with swedge eye in each end thereof one of these eyes would be shackled to a padeye #39-A on the top inboard portion of initial receiving Tank #139 and the other end thereof tied loose at deck level with quick and easy access thereto with the hook on the end portion of the hydraulic lifts #88 cable for the auxiliary lifting and lowering of same. additional holes #155-B. of the same size and orientation in relation to pin engagement of the same latch pin #155-A employed to lock the floating contaminant cleanup and recovery equipment on the tracks therefore at deck level, when taking floating contaminant cleanup and recovery equipment in and out of service and cradling same. These said holes #155-B (viewable in FIG. 15) are provided for the engagement of said latch pins #155-A are evenly spaced at approximately a foot or less apart from each other down the entire span of the tracks at the proper positions for the pin portions of said latch pins m #155-A, to extend through said tracks and thus releasably lock the contaminant cleanup and recovery equipment on the tracks at a height thereon most advantageous and beneficial the level of efficiency and employment of same, Of course this also meaning that alternative embodiment for same would also be in the manufacturing of same without the employment of hydraulic rams and cylinders therefore #135-C and simply employing the hydraulic lift #88 (not shown) for all lifting and lowering of the floating contaminant cleanup and recovery equipment. and latch pin #155-A (not shown) for the releasable securement and the maintaining the floating contaminant cleanup and recovery equipment most advantageous to the overall efficiency of same, embodiment, thereof.

All components housed inside the initial receiving tank #139 included in this embodiment, are basically identical to all of the internal comportment thereof included in whats been referenced as the first and the third embodiment thereof, and was explained in explicit detail in FIGS. 4-A and 4-B in this application. The portion of the systems employed, both in this what was referred to as the third embodiment thereof, and what was referred to as the first embodiment thereof, and the two alternative modes for bringing the contaminants into the tank #139 and pumping same out are exactly the same in both. Both employ all of the components therein in, and do in the exact same manner, and to the provision of the two exact same services and perform same with the exact same internal components that are both arranged in the same basic manner from the manner all is brought into same through the contaminant intake pipe #128 to the alternate ways the contaminants are brought the valve system and the manner same are controlled and alternate manner same is brought through the internal valves, #142 #143 #144 therein to the alternative mode in which the float switch float switch #146, is employed to activate the evacuation pump #145-A, to pump the evacuate pipe #37 to the basic way the tank is vented with tank vent #38 and even to the manner both are provided with access ports even though both very in design both provide the same service and do so in the same basic manner. In this embodiment, thereof.

The contaminant transport pipe #128-C even thou in a completely different configuration provide the same service and employs the same type of pivoting pipe joints #26 as well, in this example of an embodiment thereof.

Figure 17:
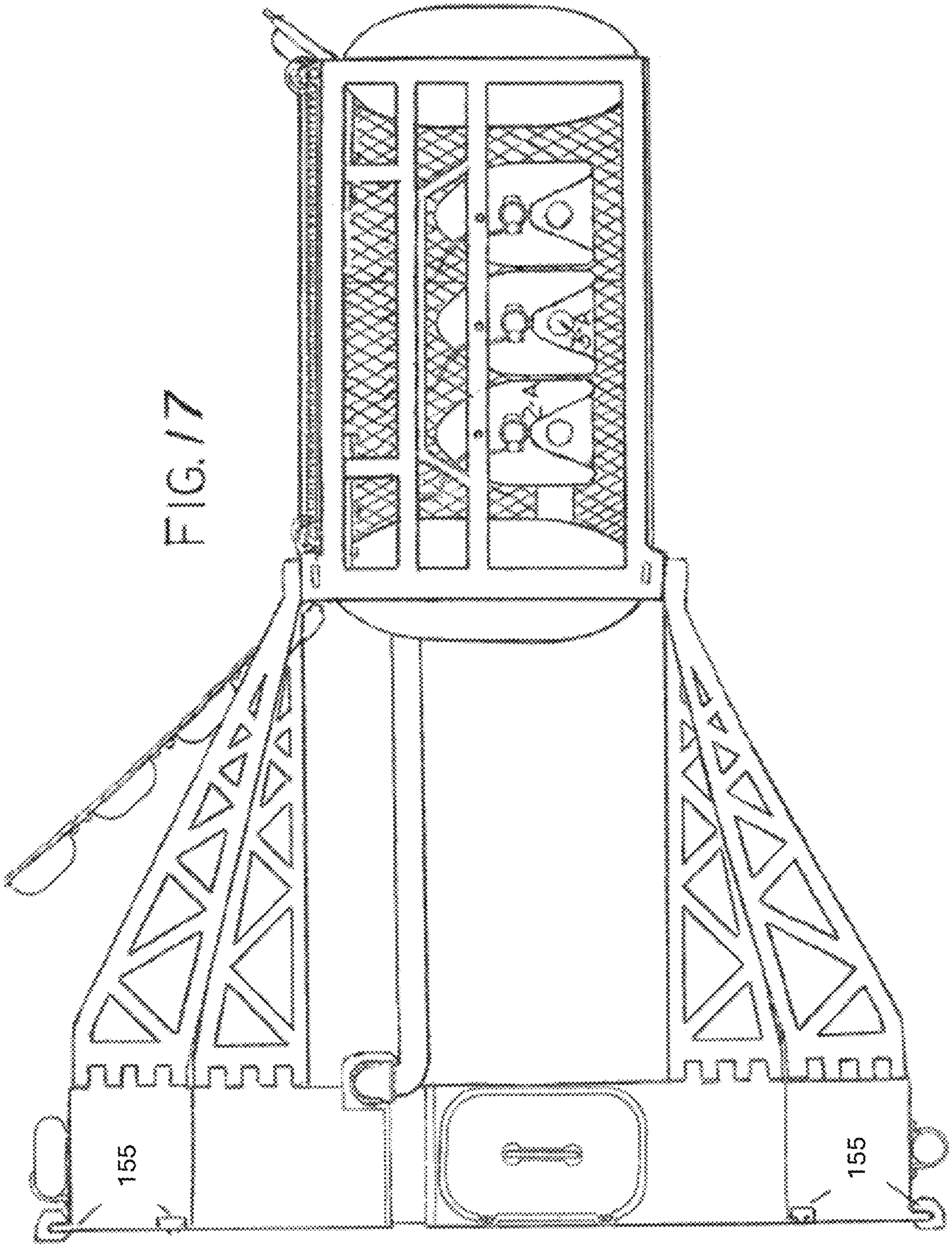
FIG. 17 Illustrates an overhead view of the cleanup and recovery equipment of FIG. 15 in a deployed position.

FIG. 17 Is a drawing of a overhead view of an embodiment of a type of floating contaminant cleanup and recovery equipment, previously referred to as a third embodiment thereof. in raised and lowered on tracks #155. Notice this drawing is showing the oil recovery portion of as having three small floats #2-A and intake port tubes #3-A but all embodiment's of which may have one or more. This drawing is showing this embodiment thereof as same would appear, launched and in service. In this embodiment, thereof.

FIG. 18-A Is a drawing of a profile view of the back portion view an embodiment of a type of floating contaminant cleanup and recovery equipment, previously referred to as a third embodiment thereof. This drawing shows floating contaminants cleanup and recovery equipment portion of this embodiment thereof, with the rear panel removed to expose the float #2-A intake port tube #3-A as well as the auxiliary height adjustment mechanism for same #15 and wiring that supplies its power to it, as well. Notice this recovery portion possess only one #2-A float and intake port tube #3-A and would probably be employed on a smaller vessel still used in the open ocean but more equipped for cleanups around marinas and inland waterways. In this embodiment, thereof.

FIG. 18-B Is a drawing includes a profile view of the back portion an embodiment of a type of floating contaminant cleanup and recovery equipment, previously referred to as a third embodiment thereof. This drawing of the floating contaminant cleanup and recovery equipment embodiment is shown, with the with the rear panel #125-C re-installed. The inner configuration of this in most embodiment's thereof is also configured in a different manner as well that simply that could possibly prove to be slightly more efficient. This panel is removable primarily just for assemblage prepossess as well as for better access to many components therein, in that The entire bottom portion thereof, is covered in a screen mesh, which holds true fore all embodies thereof included in this application. However, the entire top portions of all embodiment's of the floating contaminant cleanup and recovery equipment included in this application are totally open without a cover of any kind and thus allowing full access to any components thereof, therefrom. This drawing is also with the recovery equipment portion thereof, possessing three intake port tubes and the telescopic tube housings #4-A. for same #42-A is the valve employable to open, close or regulate intake rate of same. in this example of an embodiment thereof.

FIG. 19-A Is a drawing of an overhead view of an embodiment of a type of floating contaminant cleanup and recovery vessel ant the equipment, employed on same launched and the contaminant containment boom towing vessels in the process of being launched and put onto service by means of the second hydraulic lift #88-A, on this larger vessel, primarily employed just for launching of the contaminant containment boom towing vessels. #88-A On this embodiment, previously referred to as a third embodiment of the floating contaminant cleanup and recovery equipment as well as the vessel same is employed on. This drawing like the drawing included in FIG. 12-A of the smaller vessel, is both equipped and employed in the same basic manner and is engineered in same basic manner that all contaminants containment panels and booms both the inner panels #23 that run between the inner float #1 and the ships hull. As well as the outer end portion of contaminant containment booms #107 that run from the outer float #1 and to the contaminant containment boom towing vessels both deploy along with the floating portion of the contaminant cleanup and recovery equipment, with the length of the contaminant containment booms being fed out to the contaminant boom towing vessels #108, either strait out of their storage bins #154 and are easily fed out as well as retrieved and restored by means of the spool winches #153-A, with both the deployment of all as well as the retrieving and re-storing all back on the main contaminant cleanup vessel very quickly and easily. In this example of an embodiment thereof.

FIG. 19-B Is a drawing of a overhead view of an embodiment of a type of floating contaminant cleanup and recovery vessel and equipment, previously referred to as a third embodiment thereof securely stored on deck in its cradle, #157 on the main deck of the vessel. in this example of an embodiment thereof.

This drawing is of a larger contaminant cleanup and recovery vessel recovery vessel that's more the size of a small island tanker The floating contaminant cleanup and recovery equipment employed thereon would naturally be of a larger size as well. These included in this drawing are in a configuration that possess 3 floats and three intake port tubes on each side of the vessel. The basic configuration that the equipment employed thereon is very similar to the embodiment thereof included in FIGS. 12-A and 12-B with the only real differences in the two being in the placement of the contaminant containment boom storage bins #154. All other equipment employed to effect the entire contaminant cleanup and recovery operation included on this vessel is simply a larger version of that employed, on the smaller embodiment thereof included in FIGS. 12-A and 12-B. All equipment employed thereon is employed in the same basic manner as well, with all employed thereon including the floating contaminants containment panels #23 which even in this drawing thereof have been thrown over the forward upper armature #12-C so all would be on the main deck of the vessel instead of leaving same extended around the outer portion of the forward hydraulic cylinder and ram housing in the manner same would naturally go when re-cradling the floating portion of the contaminant cleanup and recovery equipment, all contaminant containment booms and panels like other embodiment's thereof in this application, can remain attached as well as all equipment is configured and engineered in a manner that all can be easily deployed or taken out of service and re-cradled very fast and easily, simply with one deck hand operating the hydraulic crane. #88 and two more deck hands operating the contaminant boom spool winches #153-A retrieving and restoring same into their storage bins #154. In this example of an embodiment thereof.

FIGS. 20-A and FIG. 20-B. Is are drawings of a profile views of forward facing sides, of an embodiment of a type of floating contaminant cleanup and recovery equipment, previously referred to as a third embodiment thereof.

These two drawings were simply added to show the screen or grating that allows floating oil, or other type of floating contaminants to easily pass through, to be recovered as well as the two small hydraulic cylinders #134 along with the hydraulic rams for same #129 with the tee bar brush #131 that ties the two rams together both in sames fully raised position where same would remain until employed, as is included in FIG. 19-A. The operation thereof. Controlled by a crew member, by means of the controls for same on the main contaminant cleanup and recovery vessel it self. by means of the hydraulic cylinders #134 and rams fore same #129 the tee bar brush #131 brush is drawn downward across the screen to the very bottom portion thereof as included in FIG. 19-B the results of which, removing all turtle grass, Sargasso weed plastic bags, or any other floating debris and sweeps same under the device where it same is carried under same by the current and clears behind the floating contaminant cleanup and recovery equipment. The entire bottom portion inside the framework is also covered by means of an additional screen or grating to keep debris from entering and possibly fouling the recovery equipment, when doing so. in this example of an embodiment thereof.

All floating contaminant cleanup and recovery equipment included in this application is devised and engineered in every way to not only to maximize the volume and level of efficiency that all equipment included in this application possess to actually remove any kind of contaminants from the surface of the water, but all included in this application is also devised and engineered in every way, to maintain its ability to do so in ways that overcome all of the sea conditions and other challenges, present, created or encounterable to the highest level achievable. The levels of successes experienced in all tests performed show contaminant cleanup and recovery equipment included in this applications will not only possess recovery rates many times greater than anything else known of by the applicant but. All tests performed on same show they will maintain their ability to do so in sea conditions many times worse than anything else known of by the applicant, In fact all known of by the applicant that possess recovery rates of any measurable level significance are rendered all but inoperable in anything but the most favorable of conditions and are totally unemployable in even moderate seas. in this example of an embodiment thereof.

Nevertheless the applicants ongoing efforts to ever improve and the maximize the level of efficiency attainable All floating contaminant cleanup and recovery equipment included in this application also resulted in the applicant testing different types of wire mesh and grating to determine the type most beneficial to the to the employment on all, when something rather amazing was discovered when testing a type of expanded metal grating, configured in a manner that possess fairly wide portions cut latterly that extend back at slightly different angles on a horizontal plane that when performing pool test and pulling same through thick floating oil and very choppy artificially created sea conditions, this particular type grating would reduce the surface chop at a fairly significant level which could possibly even further enhance the profound level of performance and efficiency all embodiment's of the floating contaminant cleanup and recovery equipment included in this application already possesses. In this example of an embodiment thereof.

FIG. 20-C Is a drawing of an embodiment of two small hydraulic calenders #134 and rams #129. The two small hydraulic rams #129 with the tee bar brush #131. This tee bar brush ties the two rams together in their fully raised positions and by means of the employment thereof. The brush is drawn downward across the screen and removes all turtle grass, plastic bags, or any other floating debris and sweeps same, under the floating contaminant cleanup and recovery equipment, where the cleared contaminants, clears behind same. #134 are the hydraulic cylinders and rams #129. #150 are tracks that an end portion of the tee bar brush slides in and that maintains the brush tight to the screen. In this example of an embodiment thereof.

FIG. 20-D. is a drawing of an embodiment of a floating contaminant cleanup and recovery equipment, mountable to the sides of the contaminant cleanup and recovery vessel, previously referenced as a third embodiment thereof. The profile frontal view of this embodiment provides a good view of The two hydraulic rams #29 and tee bar brush included in one form or another in all embodiment's of the contaminant cleanup and recovery equipment included in this application. this drawing also shows the positioning of the vertical roller tracks or rods 37 that the contaminant booms and panels attach to and ride on allowing same to freely ride over waves. in this example of an embodiment thereof.

This drawing also shows telescopic tube housings #4-A. These, being the telescopic tubes housings that house one or more telescopic tubes the weight of last one of which, carried by the #2-A or #2-B float, (Not included in this drawing) the telescopic tubes and housings for same are included in all contaminate cleanup and recovery equipment embodiment's included in this application. This drawing also provides a good view of the valves #42-A mechanically coupled to a flange on the lower end portions of the telescopic tube housings #4-A. in this example of an embodiment thereof.

This embodiment of valves 42-A are employable, either on the individual telescopic tube housings or on the end portion of a manifold for two or more telescopic tube housings. These valves would be employed on all embodiment's of the contaminant cleanup and recovery equipment included in this application and the employment of same can prove to be of great benefit, to the recovery equipment s attainable level of efficiency. These valves would likely be hydraulic simply due to the dependability of same but also due to the need of all to employ hydraulics, any way along with hydraulic controls for same and the need for two small flexible hydraulic lines running from the controls on the contaminant cleanup and recovery vessel and out from the basses of the armatures (not shown) and out to the two cylinders that power the hydraulic rams #129 to activate the tee bar brush #131 to periodically clear the screened of intake portion of the equipment from debris, in this example of an embodiment thereof. The addition of a several more of these lines, running along with same would be very simply accomplished. Same could also be very simply accomplished, by means of electric rams and valves, or even very simple and inexpensive solenoid valves. However even when made as submersible, the employment and reliance on same in the harsh marine environment of their employment would provably not be a wise choice, but weather electrically or hydraulically operated same would be accomplished from the contaminant cleanup and recovery vessel it self. in this example of an embodiment thereof.

The actual employment of Valves #42-A in this embodiment if same, is actually unnecessary in that, All floating contaminant cleanup and recovery equipment included in this application, is capable of maintaining a high level of efficiency, with only a small percentage of water inadvertently recovered with same, even when operating in sea conditions that render all others as inoperable or when removing floating contaminants of a thin mill thickness from the surface of the water, In fact none of the prototypes created during the development and testing of all, possessed shutoff valves of any kind and still maintained a very high level of efficiency and maintained same with only a small loss of efficiency even recovering thin films of oil from the surface of the water, and maintained same with only a small amount of additional water being inadvertently recovered along with the floating oil, even during tests in the worst of adverse sea conditions artificially created. However after adding a substantial amount of oil, to simulate the various recovery conditions and scenarios of the employment of same. in this example of an embodiment thereof.

Something rather profound was discovered! This being that simply by means of a slight positional adjustment of the equipment at sames point of intake. it was discovered that floating oil, or any type of floating petroleum based contaminants, such as that of an oil spill, could be easily removed from the surface water, even in unfavorable sea conditions, at, or, extremely close to 100 percent efficiency. In other words without inadvertently removing any water with same, during the recovery process at all.

Figure 21A:
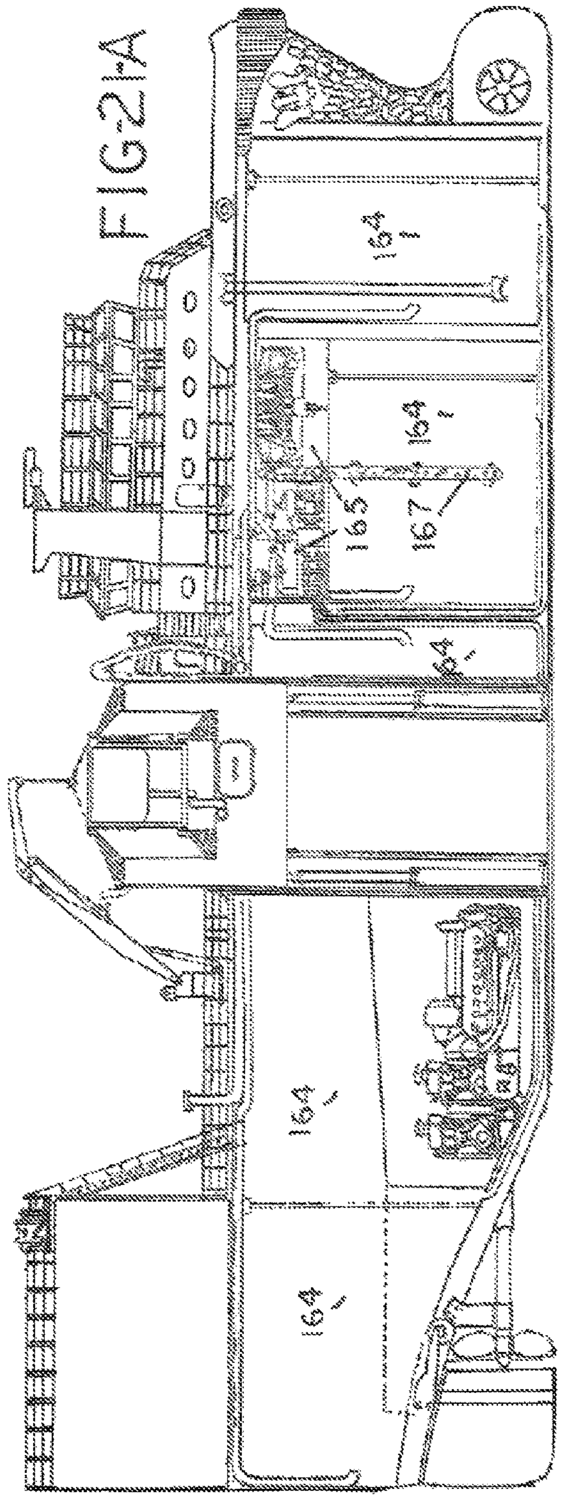
FIG. 21-A illustrates an alternative embodiment of a floating contaminant cleanup and recovery vessel with side-mounted equipment in a raised position.
Figure 21B:
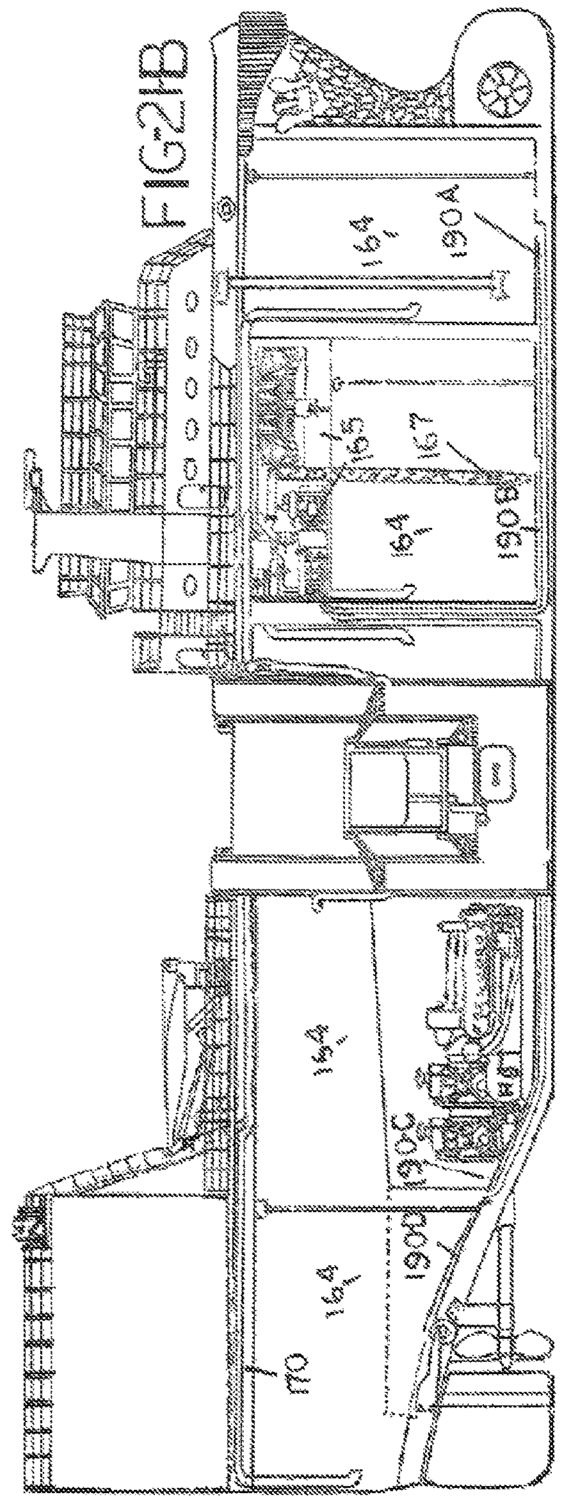

The revelation of same resulting in the applicant instantly realizing that valves 42-A could play a far more significant role in a recovery operation than he had initially realized and that same would radically, reduce the benefit and literally eliminate any real need, in most recovery vessels to employ much of the water and contaminant separation equipment included in FIGS. 21-A and B, as well as those included in FIGS. 22-A,B, and C, which include drawings and descriptions of embodiment's of water and contaminant separation Equipment employable, for the purpose of removing any water content inadvertently recovered along with the floating contaminants during a floating contaminant cleanup and recovery operation, which made the applicant realize that may be he'd devoted more time and effort into the development of all of the water and oil separation equipment and modes for the employment of same, than the benefit of same really merited. However even if the entire system isn't employed in most recovery vessels. portions thereof are still needful and others that would still be beneficial, in this example of an embodiment thereof.

There are also recovery scenarios where as a result of very choppy wave action over an extended period of time fine droplets of water will become churned up in the oil, and as a result thereof the equipment included in FIGS. 21-A and B, and FIGS. 22-A,B, and C in the hull of the vessel for the removal of same would be of real benefit, and could well merit the installment and employment of same at least on some of the larger recovery vessels.

The ability to both to view the recovery operation as well as the ability to remotely operate valves #42-A from the contaminant cleanup and recovery vessel enables anybody, responsible for same, to allow the floating contaminants to build up to a substantial mill thickness, or depth during recovery operations, before removing same. This ability even proving of greater benefit in recovery operations, in extremely rough seas, or even moderate seas, where a much thinner mill thickness of floating contaminants are present and spread out, or recovery scenarios where the floating contaminants have broken up into patches, resulting in the two contaminant boom towing boats channeling and, supplying same to the floating contaminant recovery equipment, in small intermittent amounts over long periods of time. These valves #42-A, along with the ability to operate same, at will and only when needed either individually or all at once, provides the floating contaminant cleanup and removal equipment included in this application, with the ongoing ability to let same build up to thicknesses, most efficiently removed, before removing same, from the surface of the water and thus maintaining a level of efficiency, of at, or, very close to 100% regardless of sea conditions, or recovery scenarios. in this example of an embodiment thereof.

This embodiment of the floating contaminant cleanup and recovery equipment included in this applications role of employment is not limited to the cleanup and removal of floating contaminants that are hydrophobic to water such as oil or other floating petroleum based substances, In fact the floating contaminant cleanup and recovery equipment included in this application maintains the same profound recovery rates and level of operational efficiency, when removing any type of floating contaminants from the surface of the water, in this example of an embodiment thereof.

In fact plans are to employ some of the smaller vessels, with shallower draft and more of a catamaran type hull design, to be primarily engineered for the gathering and removing of blue green algae booms, in lakes and up inland waterways, which not only is all of the floating contaminant, cleanup and recovery equipment included in this application very capable of doing, but their also the only viable solution to same found that can effectively remove blue green algae from the surface of the water with any real measurable level of effect. Nor can any prior art come close to removing any type of floating contaminants of any kind from the surface of the water, for that matter, at any where close the profound recovery rates that any embodiment's thereof included in this application are capable of, and certainly not with the ability to maintain same in a broad range on conditions and recovery scenarios, that render other solutions as inoperable. In fact statistics tell us that due to the miserable failings of the prior art to produce any solution, capable of providing any real significant effect to cleaning up oil or any other types of floating contaminants, has resulted in approximately only ten percent of the oil spills, recovery vessels are sent out to cleanup, actually get recovered, with the rest left to go into the environment to do its worst. and to the applicants knowledge nothing, until now has been devised that could effectively, cleanup and remove blue green algae blooms, that causes, irreparable environmental damage not only to the marine environment and the aquatic inhabitants therein, but even to health and well being of those coming into contact with same. Which is absolutely unacceptable.

Even though blue green algae, is non-hydrophobic to water and more biological in nature same can be gathered and recovered in the same basic manner as the vessels and equipment included in this application would be employed to cleanup an oil spill. However another vessel and equipment design for same is in the engineering and design stages at this time by the applicant, solely for the purpose of removing blue green algae blooms, that's even better suited for the task, and possess an even higher level of efficiency at doing so (Not included in this application). Although a certain percentage of water would still be removed along with the blue green algae primarily due to same comprising a certain percentage of water. In fact oddly enough blue green algae also comprises between 45 and 53 percent oil. In fact the applicant has already heavily researched and been in contact with a company to make biofuel out of same once recovered.

Testing on cyanobacteria or whats commonly referred to as toxic blue green algae, has proven same as being removable even by the initial rough equipment prototypes of these first two basic types of floating contaminant cleanup and recovery equipment for same included in this application, at the same speed and ease as same could remove floating hydrocarbons from the surface of the water. Both of which, to the applicants knowledge also being the first two basic types of floating contaminant cleanup and recovery equipment that actually possess the ability to very remove cyanobacteria or whats commonly referred to as toxic blue green algae blooms from the surface of the water at all. However there's an additional type of floating contaminant cleanup and recovery vessels and equipment for same, with embodiment's thereof included in FIGS. 49-A through FIG.

51-B. included in this application, that possess profoundly efficient and effective abilities to do so. in those examples of embodiment thereof.

FIGS. 21-A and B, as well as those included in FIGS. 22-A,B, and C, include drawings of embodiment's of water and contaminant separation system, slowing the mode in which same in this example of an embodiment thereof. is accomplished as well as the composition of all components and equipment. along with the arrangement and implantation of same to very effectively remove any of the water content recovered along with the floating contaminants during a floating contaminant cleanup and recovery operation that would be optionally employable in any of the examples of an embodiment of the floating contaminant cleanup and recovery vessels included in this application.

FIG. 21-A Is a drawing of a profile view of an embodiment of a type of floating contaminant cleanup and recovery vessel and equipment, previously referred to as a third embodiment thereof, with the hydraulic rams that control their height adjustment to maintain them at their position of maximum efficiency in relation to the water line of the vessel in relation to its load, extended to a position where the recovery equipment would be locked in its tracks at deck level and with the hydraulic lift #88 lifting the floating contaminant cleanup and recovery equipment therefor past its pivot point of 90 degrees, in relation to the cradle for same, on the main deck of the recovery vessel. Both FIGS. 21-A and 21-B are drawn as if the outer skin of the hull of the vessel was transparent to enable the inner workings thereof in this example of an embodiment thereof.

FIG. 21-B Is another drawing of a profile view of an embodiment of a type of floating contaminant cleanup and recovery vessel and equipment thereof previously referred to as a third embodiment thereof. This drawing like the drawing provided for FIG. 21-A as if the outer skin of the vessel was transparent, to view the inner portions and workings therein. This drawing among many other things includes the actual floating contaminant cleanup and recovery equipment lowered down and into a position of employment and being employed on the contaminant cleanup and recovery vessel. In this example of an embodiment thereof.

However the main focus and reason these drawings were provided. was to acquire an understanding of the vessel itself and the inner workings thereof all equipment employed and included in the drawings and definitions therefore included in this drawing FIGS. 21-A, 21-B, 22 All include drawings and the descriptions of equipment and systems employed inside the contaminant cleanup and recovery vessel, in this example of an embodiment of a contaminant and water separation process and systems employed by same. In this embodiment, all is both controlled and monitored in the equipment and control room #165 are the combination holding and storage tanks where the oil or other separation process is performed in by mechanical means but enabled by natural forces. in that not only is salt water heavier at 8.60 lbs. per gallon than crude oil which is 7.2 lbs. per gallon. Oil, or other type of hydrocarbon type of floating contaminants and water are also totally hydrophobic to each other and naturally repel and separate from each other, which simply makes the water sink to the bottom and the floating contaminants float to the top making the separation process of the two very effectively and efficiently performed, by first creating the if the proper environment and conditions and providing same to do so, along with the implantation of the proper equipment and components arranged and implanted in a manner to effectively perform same. in this example of an embodiment thereof.

The equipment needful to create a system capable of accomplishing same, is fairly common and easily obtainable and can be accomplished by means of the re-purposing of equipment already employed in the petroleum industry. Arraigned and employed in a manner that enables, almost every bit of the water to be removed from the oil so that none of the storage capacity of the vessel is wasted on hauling water back to port.

The actual mode in which the equipment employed in this example of an embodiment of the main contaminant cleanup and recovery vessel removes water inadvertently recovered along with the oil, or other floating contaminants recovered, is accomplished both by natural forces, as well as that of forces and abilities acquired by means of the employment of a combination both mechanical and electronic components along with the fabrication of a couple of simple apparatuses, unattainable but all will be easily understood by means of this as well as additional drawings and the descriptions for same in the following examples of embodiment's thereof.

The separation process included in this drawing of an embodiment thereof, actually includes a valve and pump, control room #165. which along with all pumps and valves needful to effect same also includes the displays for all sensors and gauges which actually require a crew member to oversee and operate same. However the oil, or other type of floating contaminants separation and storage process could operate in two different manners or modes. The first of which would be with all of the recovered oil, or other type of floating contaminants along with a small portion of water would be initially pumped into one tank that would serve as a contaminants and water separation tank as well as a contaminants storage tank, with the separated water being continuously pumped out of the bottom of the separation tank, and from which just the separated oil, or other type of floating contaminants would be pumped from an upper portion of the tank from a pickup pipe or hose attached to a float that rides on a tracks viewable in FIG. #22-B. of which would remove only pure separated oil or other contaminants which intern would be pumped into the remaining tanks in the hull of the vessels until they reached capacity, at which time, the receiving tank would continue the separation process until it reached capacity, at which time it would simply function as the last holding tank. All water pumped from the bottom of the tank would exit the vessel forward of the recovery equipment so that the possibly of any contaminants escaping the detection retainment of same faces the possibility returning to the water would simply be recaptured and go through the recovery process again. The perforations in the return pipe #167 are simply provided so that the water can exit the pipe at the waterline of the vessel no matter how low the draft of same is due to the volume and weight of the contaminants previously captured and stored therein. In this example of an embodiment thereof.

The second mode of separating oil, or other types of floating contaminants from the water same was removed from, included in this example of an embodiment thereof, would be accomplished by means of filling all tanks #164 and simply monitoring the separation process from the control station #165 in the valve, pump and control room #165 where the separated water would be pumped out of the bottom of the tanks and out through the pipeage #190-A, #190B, #190-C, AND #190-D, that leads back to the control and pump room and additional recovered oil, or other type of floating contaminants would be selectively added to the tanks until they reach capacity, where all would be monitored and in the valve, pump and control room #165 where all of the intake and separation lines pass through their respective valves and pumps where oil, or other type of floating contaminants is transferred between tanks and separated water is selectively removed from the bottom of the tanks and returned to the sea, in this example of an embodiment thereof. All of which will be illustrated and explained in detail in FIGS. 21-B and FIG. 22 #170 is the combination exit and fill pipe where oil, or other types of floating contaminants would either be removed from the vessel, selectively from the various tanks through the corresponding valves and the same pump to either another vessel or into tanks dock side recovered oil, or other type of floating contaminants from smaller recovery vessels could be pumped into this vessel in the same manner. This combination fill and exit pipe could also be located on the stern of the vessel and could easily be equipped to secure the other vessel to its transom much in the same way that push boats tie up, but the recovery vessel rigged to do so where this process could even be performed while remaining underway without disrupting the cleanup and recovery process. in this example of an embodiment thereof.

FIGS. 22-A, is actually a drawing an embodiment of a portion of contaminant cleanup and recovery vessel's control room that contains valve and pump portion of this room along with the composition of the components comprising same, in this example of an embodiment thereof. Wherein their mode of operation as well as their operational relationship with each other of which could be accomplished in many ways. These drawings and the descriptions for same simply include a couple of very viable and functional options that accomplish all tasks needful. The largest part of pumps valves and plumbing is viewable in this drawings thereof in FIG. 22-A The actual valves and pumps included in this drawing are components that would likely be located in one room as well as other controls for simply for centralized to same however that would be totally up to builders and their marine architects and engineers. the actual control room was not included in this drawing simply in that same fit in the drawing. In this example of an embodiment thereof.

Two optional systems are included in the following, as was described in the description included for FIG. 21-B The first system including a separate and initial receiving tank The first of which would be with all of the recovered oil, or other type of floating contaminants along with a small would initially inter the vessel in one of three different manners, The actual contaminant and water separation process employed would remain the same for all three. However the modes in which the contaminants and water initially enter the vessel are slightly different one of which entering the hull at deck level, and another embodiment thereof would bring the contaminant and water solution all of the way from sames point of recovery and into lower portion of the vessel by means of gravity at which time same would inter directly into pump #174-B. in this example of an embodiment thereof.

The third mode included in this application however, is completely different, in that same, both removes the contaminants from the surface of the water and caries same all of the way into the storage or separation tank or tanks, by means of low pressure. The for same are included in other drawings and the descriptions for same in other parts of this application, However all pumps, valves and equipment employed for the water separation process could and likely would be employed for both systems and employed in the exact same manner for both, in this example of an embodiment thereof.

The newly recovered contaminant and water solution, when the vessel is equipped with a variation of an embodiment, of the floating contaminant cleanup and recovery equipment that possess its own pump such as the embodiment's referred to as the first, and third embodiment thereof, included in this application. Of which is included on the far left portion of this drawing. #123. Is the framework that encases the tank #139 and drawn as if the side panel of the initial receiving tank #139 had been cut away and removed to view the inner works thereof. This pump #145-A pumps the recovered oil through the evacuation line #137 which pumps the oil, or other type of captured contaminants as well as a small portion of water directly through one of the intake lines #181 and into intake to manifold #178-A and through valve 192-A where this solution travels through and valve #192-A line #195-A, and intern would pump the contaminant and water solution all of the way into the manifold #178-A through lines #181, would then pass through valve #192-A, and then through line #193-A and into the intake side of pump 174-B that if ever needed, would maintain its prime by means of the vacuum pump #175. in this example of an embodiment thereof. Pump 174-B would be separately located in a lower portion of the vessels hull where same would maintain a prime when the recovery equipment being employed both recovers as well as transports the captured contaminants. to the recovery vessel by means of gravity alone, in which case the recovered contaminants and water solution would run directly through valves #193-C and intake line #193-B. and into the intake side of Pump #174-B. At which time same pumps the newly recovered contaminants and water solution through valve #193-B and through manifold line #193-E and into manifold #178-B located back in pump, valve, and control room #165 with the only valve open being valve #164-C thereon being the valve that leads to the contaminant and water separation tank #164-C. In this example of an embodiment thereof.

If employing the second embodiment of a system included in this application, of which uses all of the contaminant storage tanks on the vessel as combination, contaminant separation and storage tanks. Then the process for selectively directing the contaminants and water solution through manifold #178-B is simple accomplished by means of closing valve 164-C, and selectively opening valves 196 on the manifold through valves leading to the separation and storage tanks located in the hull of the vessel and selectively filling same. In this example of an embodiment thereof.

In the case of vessel employing only the water and contaminate separation tank #164-A, in this example of an embodiment thereof, to separate all water from the contaminants before pumping same into the separate contaminant storage tanks on the vessel, then only contaminate separation tank #164-A would be equipped with censers and gauges to monitor and either automatically or manually control the process. If the vessel is solely employing the second system included in this application in which uses all of the contaminant storage tanks on the vessel 164-B as combination, contaminant separation and storage tanks as viewable in FIGS. 21-A AND 21-B. Showing all tanks on the vessel 164-B would be equipped with the censers and gauges, to monitor and either automatically, or manually control the filling and water separation process, If only the water separation tank, it self is being employed and just pure oil other is being pumped into the storage tanks 164-B as viewable in FIG. 21-B from the water separation tank. the separated water, would be periodically pumped out of the bottom of the contaminant and water separation tank, #164-A, and the separated oil, or other type of contaminants would be pumped from an upper portion of the tank, where same would be acquired from the very end portion of the pickup pipe #197-A attached to the float for same #200-A that rides on a tracks for same #200-B viewable The levels of each, as well as control of all pumps and valves could be right in pump, valve, and control room #165. Employable gauges are widely available, which would not only show tank levels but would also show water to oil density levels, at various depths in the contaminant separation tank, which makes the actual separation process extremely easy in that all that's required by the operator working in the control room #165 to open the main valve, #197-B on the pressure side of pump #174-A that's pulls just the thoroughly separated oil or other contaminants into the suction side of the pickup pipe #197-A of which float #200-A that rides on tracks #200-B maintains the very end, pickup portion thereof, just under the surface of the oil or other contaminants at all times so that only pure oil is pulled out of same, and sent through valve #197-B and through line #197-C and into manifold #178-C where the operator simply opens the valve leading to the desired tank to fill, and then simply monitors the separated oil level on the gauges for same in the control room #165 and simply periodically engages pump 174-A wile monitoring the level of the tank presently being filled then simply opening the next valve #194 on manifold 178-C and close the valve of same leading to the filled tank and simply continuing to do so until all tanks are filled to capacity, in this example of an embodiment thereof.

Pump #174-C in this embodiment thereof, is employed for the purpose of selectively evacuating the separated water from the bottom of the tanks through lines #190-A, 190-B, 190-C, 190-D, of which are all lines all to the bottoms of the different tanks viewable in FIG. 21-B. These lines initially pull their prime by means of closing valve #184 and selectively pulling a vacuum through valve #189-A, #189-B, #189-C, OR #189-D, and cosponsoring line #190 #190-A, #190B, #190-C, OR #190-D, means of vacuum pump #175 which is illustrated as being reversible to also operate as a pressure pump to selectively back flush these same lines #190 by means of opening their respective valves integral to lines #190 that pull separated water out or the bottom of the tanks if oil, or other type of floating contaminants, or other type of floating contaminants detection sensors #187 sense oil, or other type of non-conductive contaminants during the periodic separated water evacuation process, which would probably prove as unnecessary, in that by means of closing valve #179 in the exit line this water is directed through valve #185 integral to line #176 which is an integral portion of the perforated water exit pipe that exits in front of the oil, or other type of floating contaminants containment booms and recovery equipment where any residual oil, or other type of floating contaminants would simply go through the cleanup and recovery process for the second time. The valve #179 located on the other side of line #188 connects to line #170 that transports recovered oil, or other type of floating contaminants, or other type of floating contaminants from the holding tanks in the vessel to other transport vessels or storage tanks dock side from the tanks, which would also employ pump #174-C for this oil, or other type of floating contaminants evacuation process, example of an embodiment thereof.

Figure 36:
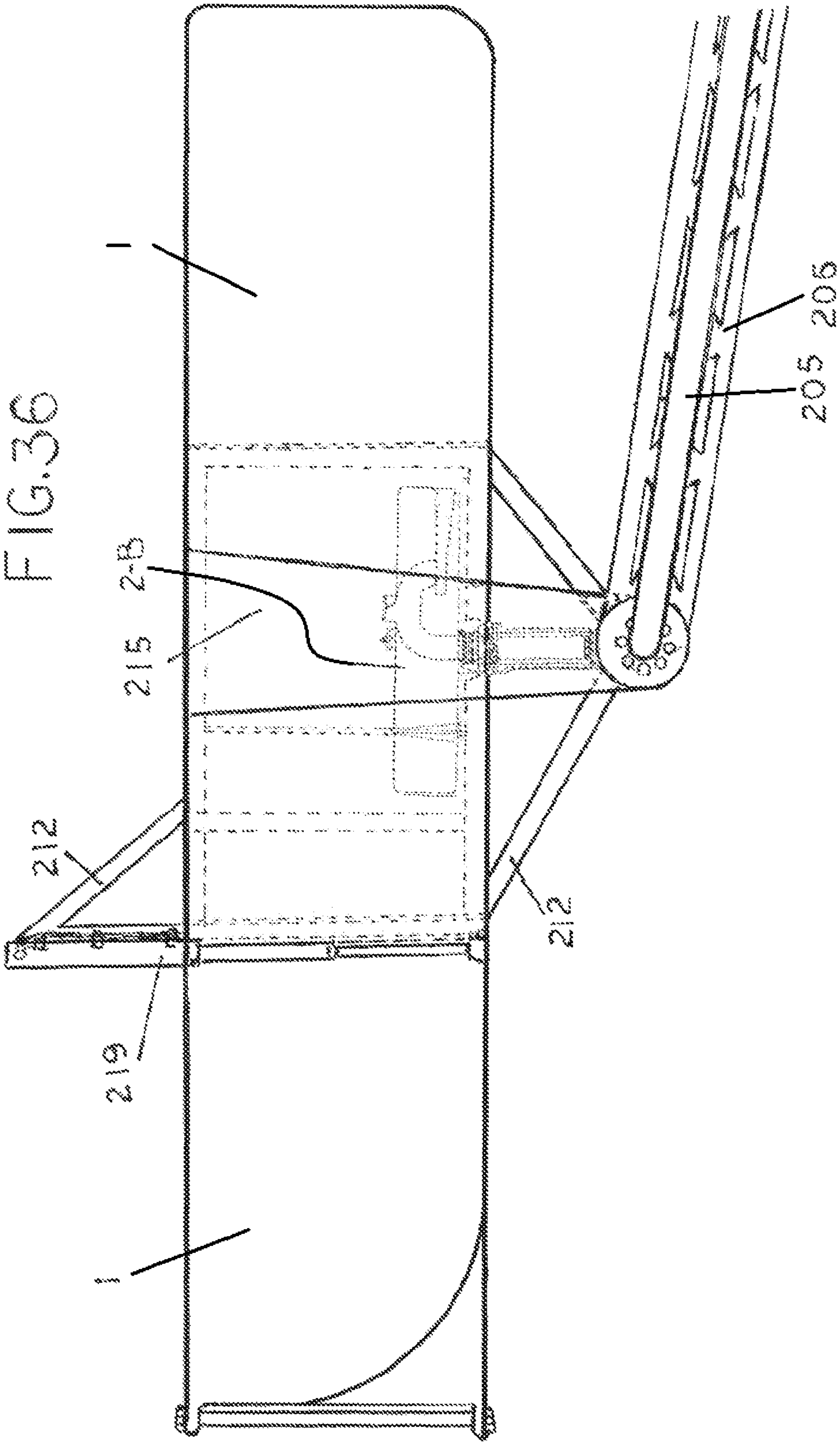
FIG. 36 illustrates a profile view of the cleanup and recovery equipment of FIG. 35-A.

FIG. 22-B Is a drawing of an embodiment of a telescopic or extendable pipe constructed in the same basic manner as the telescopic tube and intake tube housing #4-A with a pivot-able joint #198, the largest portion of the components thereof, operating in the same basic manner as those of the pivot-able armature and pipe joint seen in FIG. 36. These pivot able pipe joints consist of three main components, in this example of an embodiment thereof the first of which being the 90 degree pipe joint housing #198. These joints are coupled together by means of a separately removable 2 piece flange #199 that fits over and extends around the outer edge of the raised ridge end portion of the pipe, several inches from the end thereof, where O rings, fit in dished out portions that extend around the perimeter of the end portion of the pipe and in turn are inserted into the bell portion of pivot able joint #198 that is of a depth to allow all seals to be housed therein without bottoming out in the housing so that both can freely turn in each other after flange #199 is mechanically fastened to the end bell portion of the pivot able joint #198. The inner part of the straight portions of pipe sections #197-A a section of extendable pipe #176 with O ring seals (not shown) that fit into dished out portions that extend around the circumference of the pipe and are of a diameter that seals against the inner circumference of the pipe #197-A. in this example of an embodiment thereof.

FIG. 22-C includes a drawing of an embodiment of a framed float #200-A that rides in tracks #200-B that are an integral portion of the oil, or other type of floating contaminant separation and holding tank and is mechanically fasten able to a panel that spans the inner area between the 2 floats and maintains the intake portion of the pipe #197-A at the perfect height to pump the oil, or other type of floating contaminants, to be pumped to the other storage tanks inside the hull of the vessel by means of pump 174-A. in this example of an embodiment thereof.

Figure 23:
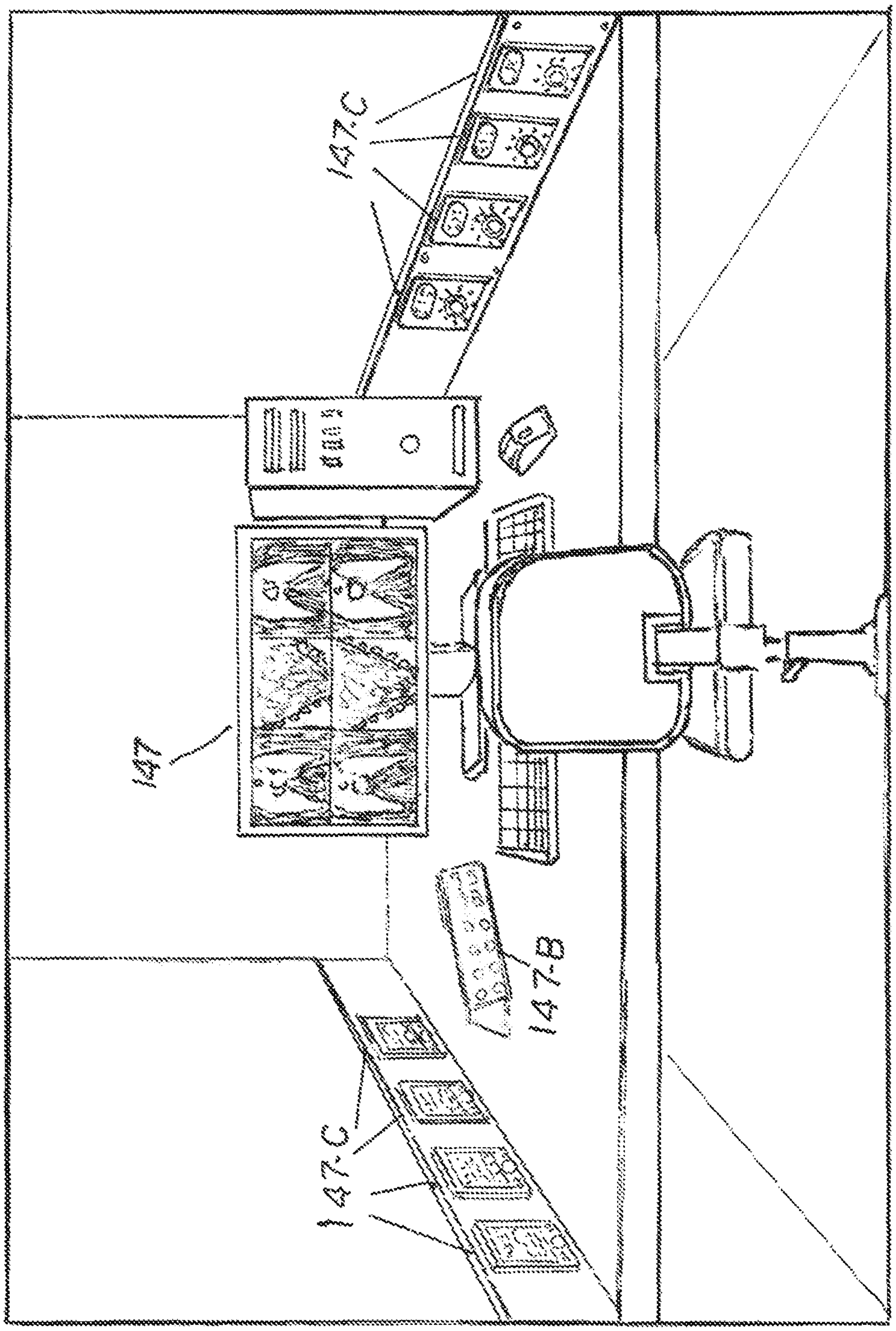
FIG. 23 a perspective view of a control room for the cleanup and recovery equipment of the vessel of FIG. 21-A.

FIG. 23. Is just a simple drawing of an embodiment of a control station #165. This drawing simply shows, images on the computer screen #147-A provided by all cameras viewing same, along with all swishes, #147-B as well as gauges and electronic controls and displays #147-C, showing contaminant to water consistence percentages along with tank depth gauges for same, of which could be stationed or additionally stationed and viewed from the bridge of the vessel, as well as controlled from same if all pumps, valves and other equipment needful to perform all tasks to effect same, were electric, along with the controls for same, could feasibly stationed and controlled any where on the vessel, however all included in the drawings and the descriptions for same included in portions FIGS. 21-A and B, as well as those included in FIGS. 22-A,B, and C refer to same as being stationed in control station #165 This drawing included in FIG. 23 simply show images from cameras mounted on the framework of the floating contaminant recovery equipment in this example of an embodiment thereof. Where same would be positionally oriented to oversee the floating contaminant recovery process. All controls for the shut-down valves and the hydraulic screen cleaning brushes that remove the debris from the intake screen as well as any other controls could be operated from this control station as well, of which all duties and tasks in the valve, pump and control room could simply be accomplished by either one trained crew member, or alternatively this system could be easily automated with all sensors switches in electrical communication with all pump relays and solenoid activated valves electronically automated with all systems simply monitored from the bridge of the vessel or else-ware on the vessel. in this example of an embodiment thereof.

All monitors for all censers and gauges as well as all needful to effect the both the monitoring and control of all contaminant cleanup and recovery equipment, both in, as well as on the contaminant cleanup and recovery vessel, are shown in all drawings and descriptions, in this example of an embodiment thereof, as being located in the combination pump, valve and control room #165 viewable in FIG. 23 That may or may not be the case.

Said switches and monitors for all gauges and sensors included in this example of an embodiment of. the system's monitoring station if employed, would simply be monitoring tank levels as well as the oil to water density levels, with the sensors and sending units, of which there are numerous brands, and many types to chose from, these gauges, would either extend from the top to the bottom of the tanks, and run all of the way to the bottom of same, or alternatively be of the type, that would consist of individual sensors stationed at intervals from the top to the bottom of the tank, or tanks similar to the oil and water sensors #187 in water evacuation lines #190-A, B,-C, AND D viewable in FIG. 22-A these sensors when employed in the tanks water to oil or other contaminant density, or percentage levels, but all except for the highest sensor of many types also double as depth gauges as well. There are actually, many various types of these water content sensors gauges and even complete monitoring systems, by several companies, that are made for various uses in refineries and other industries which are both very applicable and easily attainable, that would lend themselves very well to all tasks needfully performed and even provide optional types of equipment employable. in this example of embodiment's thereof.

Figure 24B:
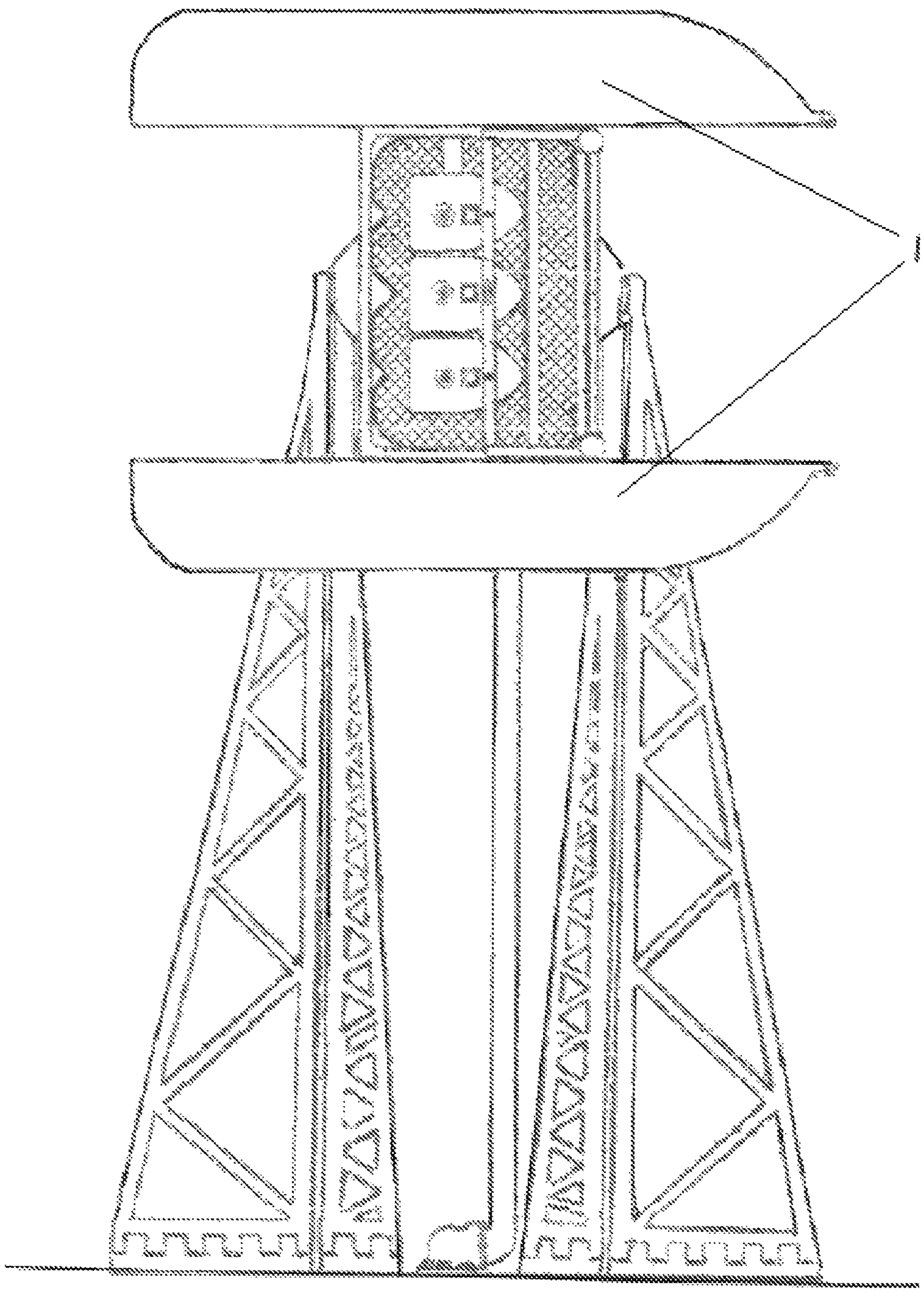
FIG. 24-A illustrates an overhead view of an alternative embodiment of side-mounting cleanup and recovery equipment.

FIG. 24-A and FIG. 24-B are both drawings of overhead views of embodiment's of floating contaminant cleanup and recovery equipment, mountable on the side of the contaminant cleanup and recovery vessel, previously referenced as fourth embodiment's thereof. The differences between the embodiment of the floating contaminant cleanup and recovery equipment included in FIG. 24-A and the embodiment thereof included in FIG. 24-B firstly being the size and number of float's and intake port tubes employed in both, and secondly in the type of intake port tubes and floats employed in both and modes each employ to actually remove the floating contaminants from the surface of the water. FIG. 24-A is a drawing of a version the equipment, previously referenced as a fourth embodiment thereof with only one float #2-A and one intake port tube #3-A. This embodiment, is also employing, the first type of equipment included in this application, as well as in other applications of the applicants that uses surface tension and gravity to remove floating contaminants from underneath the surface of the water. in this example of an embodiment thereof.

This embodiment included in FIG. 24-A is equipped, with both upper armatures #12-D as well as lower armatures #13-D, much in the same manner as all embodiment's referenced as the first, second and third embodiment's thereof which employ both upper and lower armatures. which is doubtless the manner most of this a fourth embodiment thereof would be equipped. This being with both upper and lower armatures, in that the manner in which same are employed in this drawing as well as others equipped with same in this application, maintains the actual contaminant cleanup and recovery equipment portion of the equipment both vertically and laterally relative to the main contaminant cleanup and recovery vessel at all times, regardless of sea conditions, thus enabling same with much greater stability, especially in beam seas.

Both #12-D and #13-D. examples of an embodiment's of. Armatures are hingably connected to the recovery portion of this embodiment, to the recovery vessel, in a manner in which The inner hinge portion of these armatures, are actually one half of a hinge that would be, either welded, or mechanically fastened to or through the hull of the vessel. itself. this inner half of these hinges are pivotally connected to the other half of the hinge #11-D, and these two halves are joined to each other by means of a hinge pin. The centers of all lower hinge pins are mounted in perfect linear alignment with each other, and the centers of all upper hinge pins are mounted in perfect linear alignment with each other and spaced the same distance between both the upper and lower hinge points, same at their connection points on the recovery vessel, as well as where the opposite end portions thereof pivotally mounted to the framework portion of the contaminant cleanup and recovery equipment itself in this example of an embodiment thereof. The distance or length between all armature hinge points as well that of the centers of the pivoting pipe joints, would also be the exact same distance or length between and equal with each other. Thus allowing all to freely pivot with each other, without the possibility of creating stress to any of the components thereof while doing so. The two cables #27 could be added, extending from connection points out towards the end of each armature and anchored in linear alignment with said hinge pins, in positions for and aft on the freebord on each side of the vessel as well which is shown as not attached to the vessel in FIG. 24-A These two cables may or may not actually be added. However, the employment of same would provide all lateral strength needed which would eliminate the need for all of the lattice framework in the armatures. as well as the extra wide footprint of, these embodiment's of the floating contaminant cleanup and recovery equipment, in that the addition of these two cables, very easily provides all of the lateral strength and stability needful to these embodiment's of the floating contaminant cleanup and recovery equipment. In fact the employment of these Additional two cables #27 could add enough strength and stability, allow modified versions of this embodiment to and with same comprising of only a very ridged version of #128-D and #26 to be employed as a single combination hinged armature contaminant transfer pipe. or one, lower and one upper more simplistic armatures, with a flexible contaminate transfer hose affixed to one of same. The employment of both at least on upper as well as one lower armature, in an embodiment thereof, that employs both upper and lower armatures, which additionally maintains the lateral stability of same, as relative to the main contaminant cleanup and recovery vessel at all times, regardless of sea conditions. in this example of an embodiment thereof.

This additional embodiment thereof was added as an embodiment thereof, employing only lower armatures was in an effort to provide an option possibly preferable in the employment on much smaller vessels primarily employed close to shore as well as up inland waterways, around marinas or in smaller bodies of water, while maintaining their ability to be employed well out at sea.

FIG. 24-B is drawn as an example of a fourth embodiment thereof employing only lower armatures. This additional embodiment thereof was added as an embodiment thereof, employing only lower armatures was in an effort to provide an option possibly preferable in the employment on much smaller vessels primarily employed close to shore as well as up inland waterways, around marinas or in smaller bodies of water, while maintaining their ability to be employed well out at sea. In this example of an embodiment thereof.

This drawing in this example of an embodiment thereof of which is also employing three #2-B floats, with #3-B intake port tubes (Port tubes not viewable.) Of which looks very similar and employs almost all the same components and equipment to cleanup and recover floating contaminants from the surface of the water. The actual intake port tubes

#2-B employed in these floats #3-B remove the floating contaminants from the surface of the water in completely different mode that uses surface tension and low pressure, or a vacuum to draw the floating contaminants into their point of recovery then actually removes the floating contaminants from above the surface of the water, and transports same all of the way into the storage and separation tanks, in the hull of the contaminant containment and recovery vessel, at the same time and in the same manner. in this example of an embodiment thereof.

Both this variation of the fourth embodiment thereof, as well as the embodiment included in the drawing of FIG. 24-A of the contaminant cleanup and recovery equipment, would still operate in an extremely efficient manner. Neither embodiment s thereof, require hydraulic rams for height adjustment or an external tank, of any kind in the employment of either as well.

These embodiment's of the floating contaminant cleanup and recovery equipment like all others are also very easily deployed, as well as taken back out of service and lowered into its storage cradle on the deck of the vessel by means of the lift cable #91 as seen in FIG. 24-A that could be left attached to the lifting pad eye #39 provided for same, and left with enough slack to allow for wave action. This embodiment of the floating contaminant cleanup and recovery equipment, as shown is employable with either type of equipment, that actually removes the floating contaminants from the surface of the water. In fact all embodiment's and variations of the floating contaminants cleanup and recovery equipment included in this application is actually employable with either the gravity or vacuum type of floating contaminant removal equipment, that actually removes the floating contaminants from the surface of the water. Although of course both the floating contaminant cleanup and recovery equipment, as well as the vessel employing same, would have to be equipped with the equipment and, or, modified, in the manner requisite the employment of each type. of embodiment's thereof.

#128-D. Is an example of an embodiment of a section of pipe, that could and may be replaced with a flexible contaminate transfer hose, simply affixed too an inside portion of one of the armatures. However these drawings show the contaminate transfer pipe #128-D as a ridged pipe that possesses two 90 degree end portions #26 with one on each end thereof, both of which actually being pivot-able pipe joints of the same basic type employed in most other embodiment's thereof, in this application. These joints possess a mechanically fasten-able flange on the ends thereof that fasten to the bell portions of two additional 90 degree pivotal joints. Another bell portion located on the other end of this pivotal 90 degree joint being integral to the main recovery tube out on the recovery equipment itself, and with the other end thereof mechanically fastened through the hull of the vessel, to a valve installed primarily as an emergency shut off, Additional pipe and joints needful would run from said valve to pump 174-B as viewable in FIG. 22-A, if employing #2-A floats with the #3-A intake port tubes, that remove the captured floating contaminants from the surface of the water by means of surface tension and gravity. In which case, the captured contaminants, along with a small percentage of water, inadvertently captured along with same, would be pumped the remainder of its journey to the separation and storage tanks located in portions of the inner hull of the vessel, by means of pump 174-B as viewable in FIG. 22-A. in this example of an embodiment thereof.

FIG. 25-A. Is a drawing of an embodiment of the floating contaminant cleanup and recovery equipment, mountable on the sides of a contaminant cleanup and recovery vessel, previously referenced as a fourth embodiment thereof. FIG. 25-A. shows the three floats #2-B. These floats house the vacuum type of intake port tubes that removes the floating contaminants from above the surface of the water by means of vacuum or low pressure. The smaller floats #2-B provide buoyancy for the first telescopic tube, as well as all internal components comprising same (Not shown), and the main floats #1 provide all buoyancy needful for the rest of the contaminant cleanup and recovery equipment including buoyancy needful for armatures #13-D, and contaminant transfer pipe. in this example of an embodiment thereof.

FIG. 25-B. is a drawing of an embodiment of the floating contaminant cleanup and recovery equipment, mountable on the side of the contaminant cleanup and recovery vessel, previously referenced as the fourth embodiment thereof. The profile frontal view of this embodiment provides a good view of The two hydraulic rams #129 and tee bar brush included in one form or another in all embodiment's of the contaminant cleanup and recovery equipment included in this application. this drawing also shows the positioning of the vertical roller tracks or rods 37-A, that the contaminant booms and panels attach to and ride on allowing same to freely ride over waves. that when activated by means of the controls for same on the recovery vessel This drawing also shows a housings #4-A being the telescopic tubes housings that house one or more telescopic tubes the weight of last one of which, carrier by the #2-A or #2-B float, of which are included in all contaminate cleanup and recovery equipment included in this application. This drawing also provides a good view of the valves #42-A mechanically coupled to a flange on the lower end portions of the telescopic tube housings #4-A.

These valves #42-A, in this example of an embodiment of a contaminant cleanup and recovery vessel are opened, closed, or regulated from either at the basses of the individual telescopic tube housings or on the end portion, of a manifold for all telescopic tube housings. The employment of these valves, can eliminate the need for the water separation equipment on the recovery vessel itself, in that if employed properly, especially during recovery operations in very adverse sea conditions, or in recovery operations in conditions where only a fine film of oil or other contaminants are floating on the surface of the water film. These valves along with the ability to control same from the recovery vessel itself, enables someone responsible for same with the ability keep these valves #42-A, closed until a the floating contaminants reach a mill thickness that can be removed without removing any water with same, simply by means of periodically opening and closing valves #42-A as needed, and leaving same open during recovery operations where same are being supplied with massive amounts and a steady supply of contaminants, by the contaminant boom tow boats, And even then the level of efficiency can be even further maximized, by means of regulating of the flow or selectively closing a number of valves to maintain a substantial mill thickness to recover same close to, or water free and thus reduce the need to remove same. However certain recovery scenarios can exists when on oil cleanup and recovery operations, where extremely choppy seas, or other adverse sea conditions has resulted in a percentage of water droplets to get churned up in the oil. In conditions of this nature of course the water droplets would be recovered along with the oil, and of which time could simply removed with the contaminant separation equipment on board if equipped with same, and if not simply removed in port as same is being pumped off of the vessel. contaminant cleanup and recovery vessel. In this example of an embodiment thereof.

Figure 26:
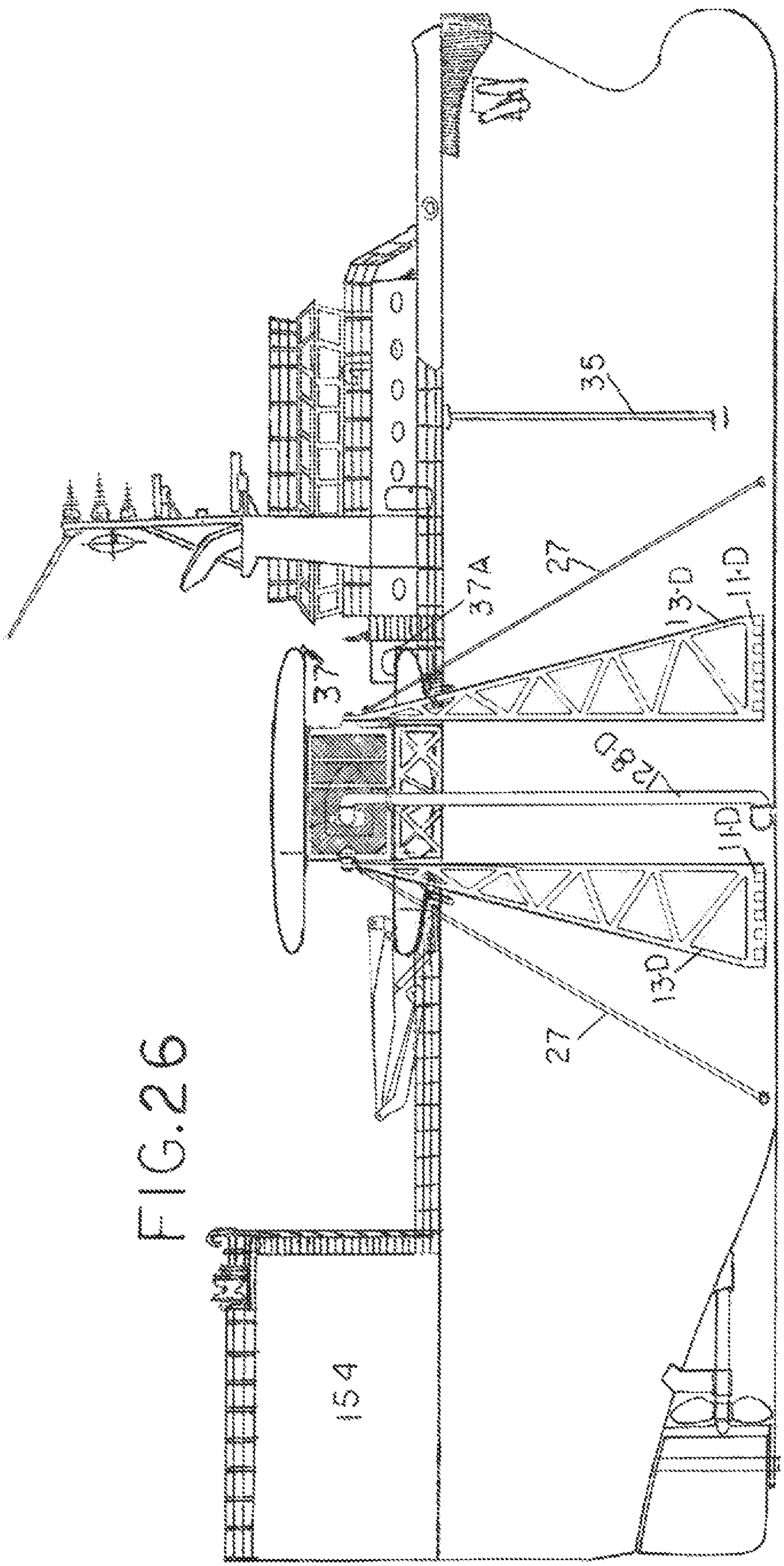
FIG. 26 illustrates a profile view of a floating contaminant cleanup and recovery vessel with the equipment of FIG. 24-B in a raised and stored position.

FIG. 26. Is a drawing of a profile view of an embodiment thereof floating contaminant cleanup and recovery equipment embodiment of the of the same basic type previously referenced as a fourth embodiment thereof mounted one of the two sides that same mount on. This example of a floating contaminant cleanup and recovery equipment embodiment of a fourth embodiment thereof, like all other side mountable embodiment's thereof included in this application, mount both on the port and starboard side of the vessel. The roller tracks or rods #37 are located on the outermost leading edge of the main floats #1 that the oil, or floating contaminant containment booms (not shown) attach to and ride up and down vertically on. All of which also deploy and are re-stored into the contaminant containment booms storage bins #154 on the floating contaminant cleanup and recovery vessel in the same manner as the third embodiment thereof as well. #1 are two large floats, that provide all needful buoyancy for the floating contaminants recovery equipment. in this example of an embodiment thereof.

An example of an embodiment of an additional set of shorter oil, or other type of floating contaminants containment panels (not shown) function in the same manner but extend between the roller track or rod #37-A on the leading edge of the inner float #1 and extend over to rod roller track or rod #35 located on the floating contaminants recovery vessel, in the same manner as seem included in the third embodiment thereof. The oil recovery vessels of the first, second and fifth embodiment included in this application would not possess these inner, floating contaminant containment panels, in that the contaminant containment booms extend from roller track or rod #37 directly out to the contaminant containment boom tow boats. These contaminant containment panels channel floating oil, or other types of floating contaminants over to the floating contaminant recovery equipment, located between the two catamaran type hulls #1. This drawing shows the screened in bottom portion of the equipment, in that this embodiment thereof like all others included in this application both the entire bottom portion of the floating contaminant cleanup and recovery equipment is covered with a grating or a wire mesh just like the forward intake portion thereof to allow the floating contaminants to pass through same, but keep all other floating debris from entering in and possibly fouling the portion of the equipment therein that actually removes the floating contaminants from the surface of the water.

This recovery equipment of this, a fourth embodiment's pivoting armatures #13-D's inner hinge portion of 11-D would be welded or mechanically fastened directly to lower portion of the freebord on the side of the floating contaminant cleanup and recovery vessels hull, with these armatures would be removable for servicing or maintenance simply by the removing of the hinge pin portions of the hinge's, The pivoting pipe joints 26 would also be easily removed as well simply by means closing the valve for same inside of the hull of the vessel and removing one of the flange portions of the contaminant transfer pipe joints, of which the very center of the point of rotation thereof, wound would also mounted between, the hinge joints and in perfect alignment with the hinge pins of 11-D. #26 Are the pivoting pipe joints, for the contaminant transfer pipe or pipe #128-D that carries the recovered oil, or other type of floating contaminants and a small portion of water from, The floating contaminants recovery equipment's point of recovery to the floating contaminant cleanup and recovery vessel. in this example of embodiment's thereof.

Figure 27:
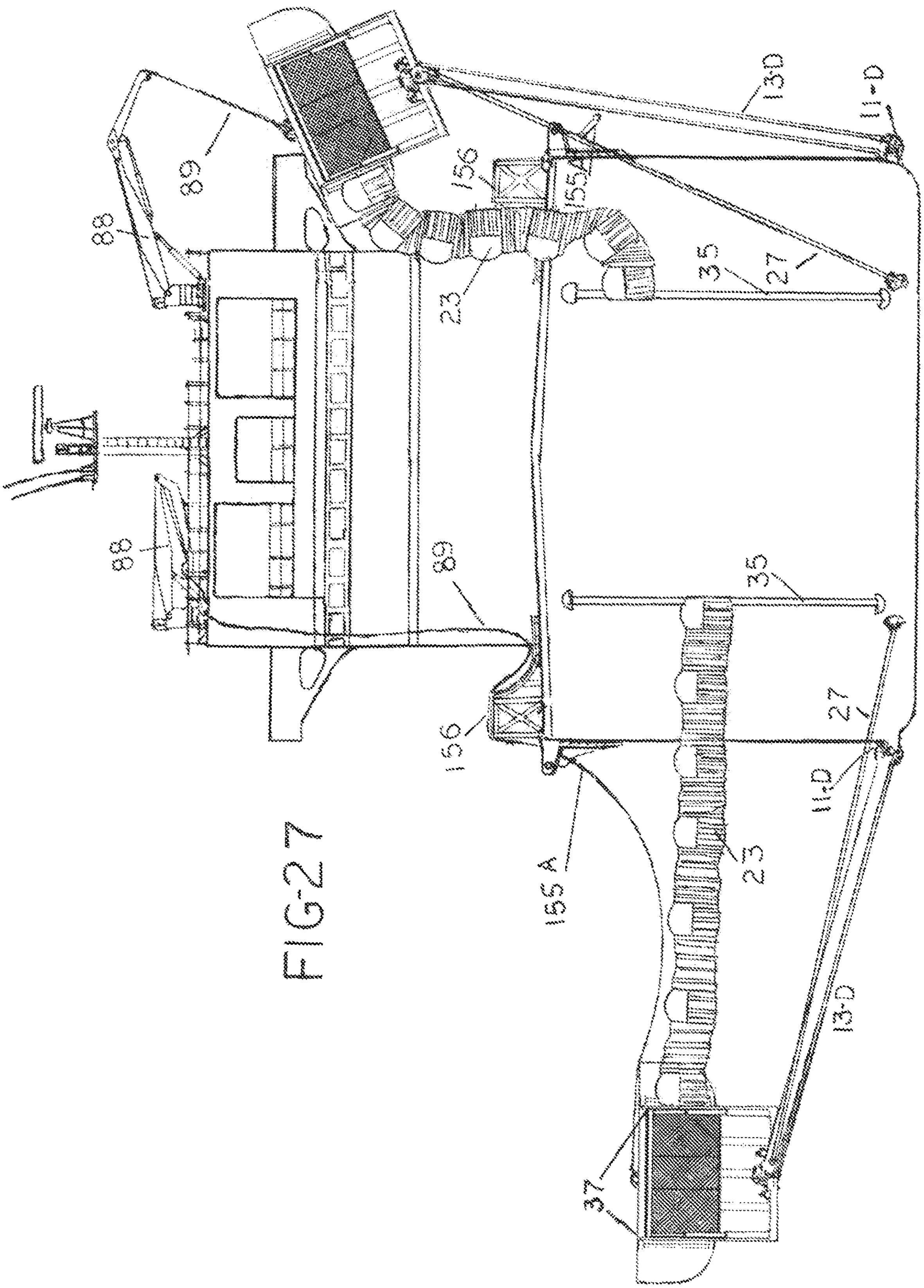
FIG. 27 illustrates a frontal view of the vessel of FIG. 26, with the cleanup and recovery equipment deployed on one side and in the process of deployment on the other.

FIG. 27. Is a drawing of a forward, profile view of an embodiment of a type of floating contaminant cleanup and recovery vessel and equipment thereof previously referred to an example of a fourth embodiment's thereof.

This drawing was added to provide a better understand this embodiment's mode of storage and deployment of the equipment of this version of the fourth embodiment employed on seme, as well as for the viewing of some of the other, not easily viewed equipment such as their cradling system #156. As well as a profile view of the armatures for same #13-D as well as a side view of the armatures hinges #11-D, connecting the armature portions of this embodiment to the vessel, viewable in this drawing also.

This embodiment of the floating contaminant cleanup and recovery equipment also requires no pump on the recovery portion thereof, or in an exterior tank portion of the recovery device of any sort, in that this embodiment is totally gravity fed to the vessel when employing floats #2-A and intake port tubes #3-A (Not shown) where this solution enters the hull of the main contaminant cleanup and recovery vessel by means of gravity alone. and is carried to a pump, that pumps the contaminants and a small portion of water, either to the, separation tank or selectively to other tanks in the hull of the vessel. However like all other embodiment's thereof, if the #2-B floats and the #3-B (Also not shown) intake port tubes are employed the contaminants would be carried all of the way to same, by means of low pressure or a vacuum, when employing the #2-B floats and #3-B intake port tubes. The composition of both along with modifications suffered by same since the submission of the last application submitted for earlier embodiment's thereof are included in FIG. 30 through FIGS. 33-D. in this example of embodiment's thereof.

This drawing of a floating contaminant cleanup and recovery vessel. is drawn as it would appear with the floating contaminant cleanup and recovery equipment employed on same, were being raised and cradled into its cradles for same #156, or taken out of same and set in the water, by means of hydraulic lifts #88. taken out of service, by means of hydraulic lifts #88 and lift cables for same #89, which could simple be tied off while leaving enough slack in them as not to hinder the full range of operation, of the floating cleanup and recovery equipment, so they could be taken out of service, or deployed, in the same basic manner, and with the same level of ease and efficiency, as all other variations of the fourth embodiment's thereof.

This drawing also shows an embodiment of the inner contaminant deflection panels #23. connected both to roller tracks or rod 35 on a forward side portion of the vessel or the other end thereof connected to the roller track or rod #37 located on the inner leading edge of float #1 or the contaminate containment booms, would be connected both to roller track or rod #37 on the outer leading edge of float #1 running back to the storage bins for same #154 or connected to the contaminant containment boom tow boats. (Neither of which shown in this drawing.) However same, could remain connected, both to the contaminant containment boom tow boats. and readied for quick and easy deployment like other embodiment's of the floating contaminant cleanup and recovery vessels and equipment employed on same. in this example of embodiment's thereof.

Figure 28:
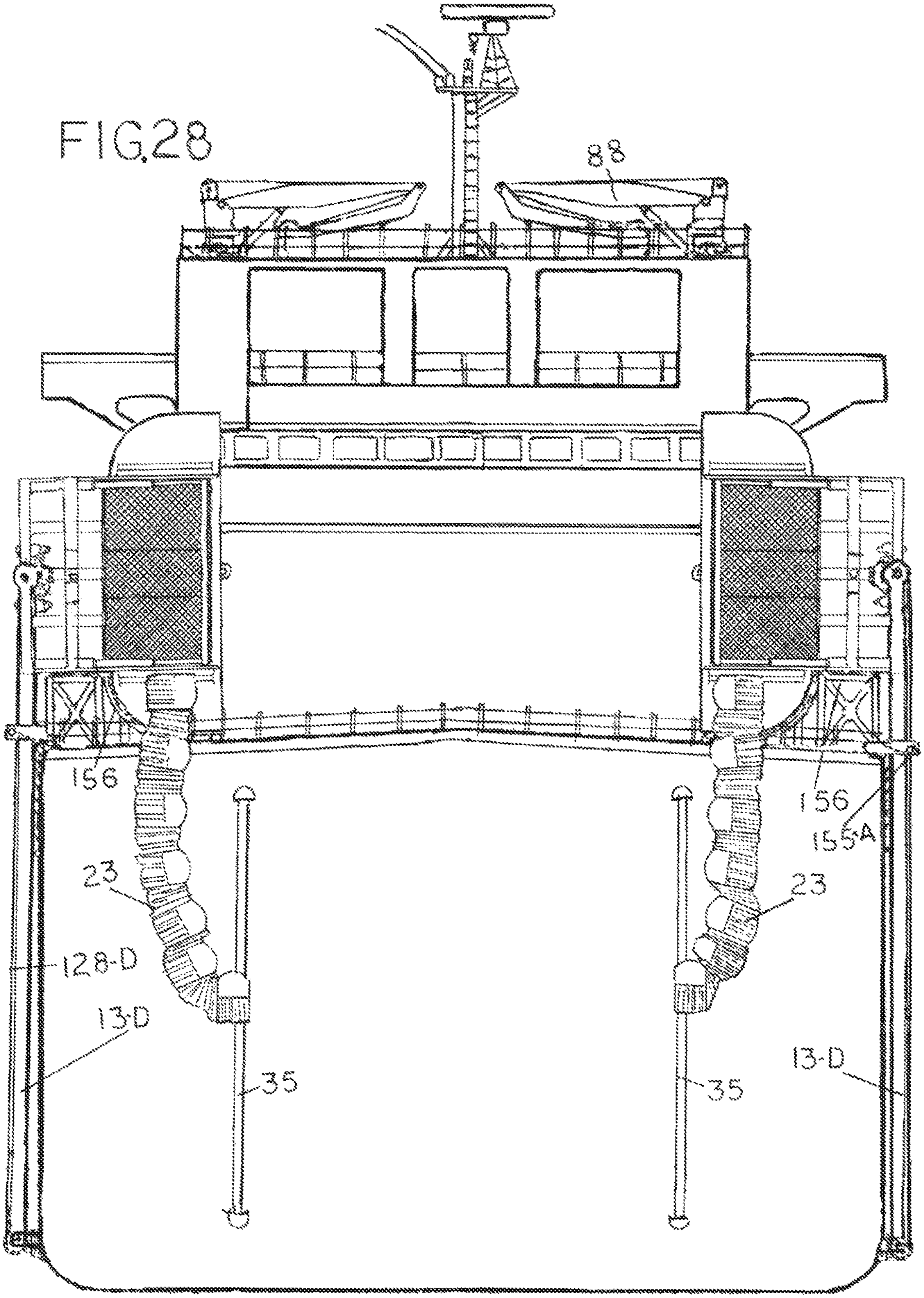
FIG. 28 illustrates a frontal view of the vessel of FIG. 26 with the cleanup and recovery equipment stored.

FIG. 28 Is a drawing of a profile frontal view of an embodiment of a type of floating contaminant cleanup and recovery vessel and equipment employed by same, previously referred to as an example of a fourth embodiment thereof. This drawing is of a large sized floating contaminate cleanup and recovery vessel. Recovery vessels of this size would be primarily employed to clean up very large spills such as that of a ruptured tanker, or large leak at a drilling platform or even spills of the size and nature of the gulf horizon spill, in that not only is the equipment employed on same capable of cleaning up floating contaminants at a profound and never previously achievable level of speed and efficiency but vessels of this size and even larger would likely be capable of remaining on site recovering same and even load and contain recovered contaminants from other recovery vessels cleaning up the same spill until repairs could be made and the leak could be stopped before the vessel exhausted its storage capacity for the recovered oil, or other type of floating contaminants and would have to return to port. This embodiment's employable equipment and modes of employing same, possess the ability do so in an extremely efficient manner and at a rate only restricted by the size and number of the intake port tubes as well as in a path of recovery which is only restricted by the length of the oil, or other type of floating contaminant containment booms and with the total recoverable volume of recovery restricted only by the holding capacity of the vessel itself. Naturally all sizes of these vessels are employable and would maintain a high rate of efficiency even in heavy seas no mater what size vessel same is actually employed on, but vessels of this size, would most likely be primarily employed in the cases of much larger and major spills. In fact, if this nation possessed several of these much larger floating contaminants cleanup and recovery vessels, enabling a couple of them to remain in service and alternately transport same to shore, even of this size, and could have employed during the Gulf Horizon spill, they could have easily cleaned up and even recovered the oil, faster than it spewed out of the well. This illustration shows the oil, or other type of floating contaminants cleanup and recovery equipment of the fourth embodiment thereof, secured in their cradles on the main deck of the recovery vessel, in their position of transport to or from a spill, or simply as tied to the dock in standby mode. in this example of embodiment's thereof.

This drawing shows an embodiment of armatures #13-D and contaminant transfer pipe #128-D still in a partly raised position as if same were being either put in, or being taken out of service these armatures lock into their brackets that consist simply of two tangs or lengths of steel flat bar welded at 90 degrees perpendicular to the hull and in parallel alignment with to each other and positioned just below deck level and on each side of an outer portion of the freebord of the vessel These sections of flat bar would have holes located in the outer portions thereof, in this example of embodiment's thereof. a latch pin #155-A is provided that would extend through these holes securing and locking armatures 13-D into their positions of storage, transport or non-use, up against the hull of the recovery vessel where the floating contaminant cleanup and recovery equipment portion of this embodiment, would be pulled up and pivoted over and laid into its cradle #157 on the main deck of the main contaminant cleanup and recovery vessel as part of the lifting process, by the hydraulic lift #88. as also seen in FIG. 27 This drawing also shows stabilizing cables #27 that would add a significant amount of rigidity and strength to the pivot able armatures #13-D but would probably not be implemented if the armatures and the rest of the framework for this portion of this embodiment was built as shown in drawings thereof in this application. These stabilizing cables were added to this drawing simply to show a simple mode of attaining tremendous strength and rigidity to this rig by simply adding these cables. Of course these cables, chain plates or connecting points would have to be in parallel alignment to the rest of the connection and pivoting armature or pipe joints on the hull of the vessel, in this example of embodiment's thereof.

FIG. 29-A Is a drawing of a forward, profile view of an embodiment of a the of floating contaminant cleanup and recovery equipment previously referred to as an example of one of a fourth embodiment's thereof. Notice this embodiment is equipped with both upper armatures #12-D as well as the lower armatures #13-D which are solely employed on some of the previous embodiment's thereof. The employment of the upper armatures, in conjunction with the lower the lower armatures, in the manner same are employed in this embodiment, as well as all other embodiment's included in this application as well as those previously submitted by the applicant, maintains the floating contaminant cleanup and recovery equipment, both in perfect linear as well as vertical alignment with the main contaminant cleanup and recovery vessel, same is employed on at all times, which intern provides the floating contaminant cleanup and recovery equipment with the same level of stability as the main contaminant cleanup and recovery vessel at all times, regardless of the seas same are being employed in This is accomplished first of all by making all of the armatures the exact same length, and mounting both the lower armatures #13-D hinge points in perfect lateral alignment with each other, as well as the upper armatures #12-D hinge points in perfect lateral alignment with each other. This as well as the hinge points of, the upper and lower armatures being in vertical alignment with each other. Notice pivoting joints #11. These hinge points of #11 are spaced the same vertical distance apart from each other, on the framework of the floating contaminant cleanup and recovery equipment, as same are vertically spaced apart from each other on the main contaminant cleanup and recovery vessel, This results in the floating contaminant cleanup and recovery equipment neither pitching or rocking as same are being employed, any more than the main contaminant cleanup and recovery vessel, regardless of how rough or adverse the sea conditions same are being employed in.

The process of cradling the main cleanup and recovery equipment portion of this embodiment. would simply consist of the removing the armature pin #12-G. this pin simply inserts through an open portion of both the upper pivoting joints #11, then through the crossmember portion of the framework and would be kept in place by means of a quick release cotter pin or other. The removal and reinstallation of same would be accomplished, once the armatures are brought up and locked into their brackets for same up against the hull of the vessel while the hydraulic lifts, and lifting cables for same are still supporting main cleanup and recovery equipment portion thereof, releasing armatures from the framework portions thereof and thus, allowing the cleanup and recovery equipment portion thereof to be lied over on its side and locked into the cradle for same, a forward view of same is included in FIG. 28. as is included in this example of embodiment's thereof.

FIG. 29-B Is a drawing of an overhead view of an embodiment of the floating contaminant cleanup and recovery equipment thereof previously referred to as one of an example of the fourth embodiment's thereof. This drawing is drawn as if same was in service and being viewed, from the port side of the main deck of the floating contaminant cleanup and recovery vessel. This embodiment thereof would be employed on both sides of the main contaminant cleanup and recovery vessel, and would employ the floating contaminant panels #23, (Not shown) attached to the vertical roller tracks or rods #37 on the leading edge of the inner main floats #1 and running between same and the vertical roller tracks or rods #35 (not shown) on each side of the main contaminant cleanup and recovery vessel, as well as the contaminant containment booms attached to the vertical roller tracks or rods #37 on the leading edge of the outer main float of each, with same running out to the contaminant boom tow boats on each side of and in front of the main contaminant cleanup and recovery vessel, in the same manner as all other embodiment's thereof referred to as the third and fourth embodiment's thereof in this example of embodiment's thereof.

FIG. 29-C. Is a profile view of an embodiment of another larger sized cleanup and recovery vessel, as is included as an example of along with the floating contaminant cleanup and recovery equipment of the same basic type previously referred to as a fourth embodiment thereof, with both upper and lower armatures as is included in FIGS. 29-A and FIG. 29-B. This drawing thereof shows the floating cleanup and recovery equipment portion of this embodiment, with same in a position of non service either in rout to a contaminant spill or shortly after same has been taken out of service, by means of hydraulic lifts #88, in this example of embodiment's thereof.

This embodiment of a floating contaminant cleanup and recovery vessel, like almost all others possesses contaminant boom storage bins #154 and spool winches #153-B or the containment booms freely feeding out and automatically deploying with their tow boats as seen in some of the other drawings for the third embodiment thereof. In fact the entire process of putting all equipment needful into service and taking same back out of service when the jobs completed, in this example of embodiment's thereof.

FIGS. 30-A to 34-D Include drawings and the descriptions, of embodiment's of two different types, of floating contaminant removal equipment. Both variations of the equipment included in the following, comprise the actual portions of the floating contaminant cleanup and removal equipment that actually removes the floating contaminants from the surface of the water. Both types or variations of floating contaminant removal equipment, physically look almost identical to each other. This Primarily due to the fact that both share, all but a small percentage of the exact same components. in this example of embodiment's thereof. However the modes both employ to actually remove the floating contaminants from the surface of the water and transports same into the hull of the recovery vessel are quite different from each other. is even a slight bit easier and faster than performing same with the third embodiment thereof.

The first examples of embodiment's thereof. type of floating contaminant removal equipment included in this application, referred to as employing float #2-A and intake port tube #3-A. This of the same basic type that was included in all of the applicants previous applications for same, and of which has suffered only several modifications and optional modifications from the original designs of same. This first type, or variation thereof removes the floating contaminants from the surface of the water by means of, surface tension and gravity in a manner that removes the floating contaminants from underneath the surface of the water, and many of equipment embodiment's employing same also transports the recovered contaminants, all of the way to the contaminant cleanup and recovery vessel by means gravity alone. This being the type of same that employs floats #2-A and intake port tubes #3-A. and for easy reference purposes will simply be referenced to as the first embodiment of the floating contaminant removal equipment in this example of embodiment's thereof.

The other variation or type of embodiment's of equipment included in the following that actually removes the floating contaminants from the surface of the water, initially pull same back forward and into the intake portion of the equipment both by surface tension in the same basic manner as the first embodiment of the floating contaminant removal equipment, but this the second embodiment floating contaminant removal equipment, additionally uses low pressure or a vacuum that once the floating contaminants actually reaches equipment s point of recovery same becomes airborne by means of the uses low pressure or a vacuum from above the surface of the water, and transports same all of the way into the storage and separation tanks, for same in the hull of the contaminant cleanup and recovery vessel, by means of low pressure. This would be the portion of the floating contaminant removal equipment, equipped with floats #2-B and intake port tubes #3-B. Which for easy reference purposes will simply be referenced to as the second embodiment of the floating contaminant removal equipment. in this example of embodiment's thereof.

All embodiment's of employable equipment, in the contaminant vessel itself, provided to actually remove any water inadvertently recovered along with the oil or other contaminants captured and stored in the vessel, is included in FIGS. 21-A and B as well as FIGS. 22-A,-B,-C, and FIG. 23 would be shared as common to both. However the modes both employ to transport the captured contaminants into the contaminant cleanup and recovery vessel itself are quite different, in that vessels employing the portion of the floating contaminant cleanup and removal equipment that actually removes the floating contaminants from the surface of the water referred to as the second embodiment thereof, does so by pulling a vacuum into the separation and, or the contaminant storage tanks themselves, in the hull of the vessel and employing same much like extremely large wet vacuum tank. Equipment employable and a mode accomplishing same, is included in the drawing and described in detail and will be easily understood in the descriptions for same included in FIG. #39.

The modes in which both the first and second embodiment's of the floating contaminant removal equipment. removes the floating contaminants from the surface of the water, as well as the equipment differences between the two, are included and described in detail in the drawings and the descriptions for same, included in FIGS. 30-A through FIG. 33-D However even though both have different modes for actually removing the floating contaminants from the surface of the water, both the first and the second embodiment's thereof share all but a small percentage of the exact same equipment to do so. Both also employ same in the exact same manner as well. both embodiment's thereof also employ the same mode to gather, corral and channeling the floating contaminants back, to supply the recovery equipment with the floating contaminants in the exact same manner as well. Most floating contaminant cleanup and recover equipment and recovery vessels employing same, included in this application could be equipped to employ either types or variations of this floating contaminant cleanup and removal equipment as well. in this example of embodiment's thereof.

Both the first and second embodiment's of the floating contaminant removal equipment. that actually remove the floating contaminants from the surface of the water, along with all other equipment that they both share as common with each other, when employed in manner as prescribed in this application, have also not only proven themselves as easily capable of achieving recovery rates many times greater that any other type of oil or other type of floating contaminant removal equipment known of by the applicant, but both also possess the ability to maintain same, in adverse sea and other conditions, that render others as inoperable, and do so at levels of efficiency, that should litterly render all except for a few very low volume special application types, as obsolete. in this example of embodiment's thereof.

The internal differences between The first and second embodiment's of the floating contaminant removal equipment. that actually remove the floating contaminants from the surface of the water and variations, along with several embodiment variations of each, along with some of the components that both share as common to each other and that provide the same services to both, will be described and easily understood in the drawings and descriptions of same included in FIGS. 30-A through 33-D. In this example of embodiment's thereof.

FIG. 30-A. Is a drawing of a profile view of an embodiment of the floating contaminant cleanup and recovery equipment. Including float #2-A and adjustable intake port tube 3-A that extends up through a platform portion of 2-A and is vertically adjustable within float #2-A to be adjustable relative to the surface of the water. This is an embodiment previously referred to as a first embodiment of the floating contaminant removal equipment. that actually removes the floating contaminants from the surface of the water and of which employs all of the same basic components and employs them in the exact same manner as same were employed in first application for same, with the only exceptions being in the lower platform portion of 2-A. in this example of embodiment's thereof. which was not included in the first application for same.

The basic configuration of the intake port tube portion of this embodiment thereof, has undergone a couple of small changes from the original design, but only to provide same with the ability to extend up through the newly designed bottom plate or platform portion of float #2-A which will be described and easily understood in FIG. 31-A. However all additional components comprising same including #15 the reversible motor and threaded rod for same #8 that raises and lowers the intake port relative to the surface of the water within intake float #2-A remain unchanged from embodiment's thereof in earlier applications of the applicants submitted for same. Float 2-A however has undergone configurational modifications from the original design of same, that has shown to slightly improve the level of efficiency attainable by same, in very unfavorable sea conditions. in this example of embodiment's thereof.

These configurational differences, in this embodiment thereof. simply comprising of a bottom plate or shelf portion of float 2-A, that the Intake port tube portion of #3-A extends up through, and is height adjustable therein by means of the reversible motor #15 in this embodiment thereof is an integral portion of float #2-A and simply comprises the configuration of same. in this example of embodiment's thereof.

The open portion of intake port tube portion of #3-A. in this embodiment thereof, extends up through an open portion of the integral shelf or plate portion of float #2-A, is the initial point of entry for the recovered oil, or other type of floating contaminants. This integral shelf or plate portion of #2-A, has shown to improve the level of efficiency attainable by same, by means of restricting uneven waters around the intake port tubes point of entry, especially in heavy, or very adverse sea conditions. The intake port tube portion of this, the first embodiment of the floating contaminant removal equipment. that actually removes the floating contaminants from the surface of the water, along with all others comprising both the first and second embodiment's thereof are connected to and employ the exact same, telescopic like tubes #5-A as well as the housings for same #4-A, employed in this embodiment of the portion on contaminant cleanup and recovery equipment that actually removes the floating contaminants from the surface of the water, as well as all others both in this application as well as all previous applications of the applicants for same. The inner workings of the telescopic tube housings, as well as that of the telescopic tubes themselves, although providing the exact same service and doing so in the exact same manner. Have also suffered a few internal modifications, but simply to provide same with a higher level of durability and dependability rather than to change the service provided by same in any way. The telescopic tube housing #4-A. in this drawing is drawn as if the housing itself was transparent to view the two telescopic tubes #5-A, as well as the configurations and inner workings of same housed within telescopic tube housing #4-A. in this example of embodiment's thereof.

FIG. 30-B. Is a drawing of an embodiment of a top flange plate #172 as if the mechanical fasteners and sealant, fastening and sealing same to the upper flange portion of the telescopic tube housing #4-B was removed. in this example of embodiment's thereof.

FIG. 30-C. Is a drawing of an optional embodiment of a lower raised ridge portions of #5-G that extends around the outer periphery of the very lowest portions of each additional smaller telescopic tube. This is an embodiment of a mechanically fastenable version of thereof, although same would likely be welded to the outer periphery of the telescopic tubes rather than mechanically fasted, in this example of embodiment's thereof.

FIG. 30-D and FIG. 30-E show embodiment's of two telescopic tubs previously housed inside of the telescopic tube housing #4-A, With same, removed and with the telescopic tub 5-A included in FIG. 30-D pulled out of the bottom of the telescopic tub 5-A, included in the FIG. 30-E and set beside same. The inside fascia portion of flange plate, #172, possesses inset groves in which receive O-rings #4-G. These o-rings provide a seal between the outer surface portions of largest outer telescopic tube seen in FIG. 30-E. in this example of embodiment's thereof.

The upper inside portion of each embodiment of the telescopic tube, also possess an inner ridge portion #5-C, the inner diameter of which being slightly smaller than the inner diameter of the rest of the telescopic tube. The inner fascia portion of this inner ridge #5-C, also possesses inset groves in which receive o-rings #5-E that seal to the outer periphery of each of the progressively smaller telescopic tube like the smallest tube included in FIG. 5-E that actually connects to intake port tube #3-A tube included in FIG. 5-A.

This embodiment of a bottom portion of these upper inner ridge portions of all but the very smallest of the telescopic tubes, serves as stop for each of the next progressively smaller telescopic tubes, and the lower portion of the flange plate, #172, becoming the stop for the outer or largest of the telescopic tubes, by simply by means of same abutting, the top surface portions of lower raised ridge portions of #5-G that extends around the outer periphery of the very lowest portions of each additional smaller telescopic tube. A mechanically fastenable version of same in included in the drawing of FIG. 30-C although same would likely be welded to the outer periphery of the telescopic tubes rather than mechanically fasted thereto and probably wider, more like those included in FIG. 30-A these lower raised ridge portions of the telescopic tubes, is in close tolerance to the inner diameter of each of the next larger sized telescopic tubes its housed in, in a manner that the outer portions of these ridges become slides that slide in the inner portions of its next larger sized telescopic tube. in this example of embodiment's thereof.

These embodiment's of the lower grooved out portions, also digitally oriented around the lowest portion of each telescopic tube, between each raised ridge portion in this embodiment thereof, allow captured contaminants along with a small percentage of water between these tubes to freely pass through these grooved out portions thereof and in and out of the bottom portion of the tube housing #4-A during the insertion and extension between each of the telescopic tubes.

The O ring seals #4-G inserted around the upper inner ridge portions flange plate #172 seen in FIG. 5-C and in all upper, inside portions of each except for the very last of the telescopic tubes #5-A maintain a seal between each of the telescopic tubes, along with the outer portion of the largest telescopic tube being sealed by means of the O ring seals #4-G in inner portion of flange plate, #172.

These telescopic like tubes #5-A as well as the a housings #4-A for same, enable the floats #2-A and #2-B maintain the intake port tubes #3-A and #3-B perfectly even with the surface of the water at all times without changing the load or downward force on same regardless of the amount of fluid passing through same at any given time. This holds true for all embodiment's of the contaminant cleanup and recovery equipment, and variations thereof included in this application.

In fact its the manner in which these telescopic like tubes always remain open and vertical at 90 degrees in relation to the seas, and never actually supporting any of the weight or actually holding any of the fluid therein or passing through same at any time or in any way. and does so in a manner in which the only thing that the #2-A or #2-B floats are providing buoyancy for at any time or in any way is the intake port tube and any other components therefore on or in the float itself, and the very first telescopic tube same is attached to, This also holds true no matter how many tubes are actually housed in the telescopic tube housing #4-A as well simply in that if an embodiment thereof is employing more than one telescopic tube. like the embodiment included in this drawing. the additional tube or tubes are rendered as neutrally buoyant by means of a small ring float #7.

Thus resulting in the #2-A and #2-B floats as well as the intake port tubes housed in same always remaining totally unaffected by the weight, or the volume of the contaminants passing through them at any time because none of which is ever held by same in any way, or at any time, during the contaminant cleanup and recovery operation. This allowing the floats #2-A or #2-B along with the intake port tube portions of same to remain floating and recovering the floating contaminants at the exact same level relative to the surface of the water at all times during the recovery operation regardless of the seas same are employed in, or the rate in which the oil or other contaminants are being recovered.

This drawing of an example of embodiment's thereof. also includes valve 42-A mechanically coupled to a flange on the lower end portion of the telescopic tube housings #4-A. The employment of these valves #42-A. In this embodiment thereof. can enable the contaminant cleanup and recovery equipment included in this application maintain the profound level of operational efficiency all are capable of achieving, even in the worst of sea and other conditions, simply by means of opening, closing, or regulating valve or valves #42-A when needed from the main contaminant cleanup and recovery vessel. The employment of these valves, especially during recovery operations in very heavy seas or even just in very adverse sea conditions, or when same exists in very slow recovery operations where only a much thinner film of the floating contaminants are being recovered, or where the floating contaminants are broken up and periods of time pass between times that same is gathered by the contaminant boom towing vessels and provided to the recovery equipment. These valves along with the ability to control same from the recovery vessel itself, allows a crew member, responsible for the operational employment of same, keep these valves #42-A, closed until a the floating contaminants reach a mill thickness that can be removed without inadvertently removing water with same, simply by means of periodically opening and closing valves #42-A as needed, and leaving same open during recovery operations where same are being supplied with massive amounts and a steady supply of contaminants, by the contaminant boom tow boats, And regulating of the flow or selectively closing a number of valves to maintain a substantial mill thickness to recover same water free and thus reduce the need to remove same even in some of the worst recovery scenarios. In these embodiment's thereof.

FIG. 31-A shows an embodiment of an intake port tube #3-A. The bottom portion of which to be coupled to the first telescopic tube (not shown) This combination intake port tube and the off set threaded portion thereof has suffered only a couple of modifications from the original design of same. The first of which being the lower cut out portion between solid threaded portion of #3-A and the intake port tube portion thereof, which simply allows the height adjustable tube to extend up through the hole in the bottom of the integral plate or shelf portion of float #2-A, The threaded portion of this component has also received modifications from its original design, this being the shape of the outer surface thereof being cylindrical in shape. This portion of this component possesses a threaded hole extending through the center portion of which receives the threaded rod #8 integral to, adjustment knob #14, as seen in FIG. 31-B. or the electrically powered reversible drive motor as seen in FIG. 31-C in this example of embodiment's thereof.

FIG. 31-B This embodiment of, the adjustable knob of FIG. 14 comprises a first optional embodiment offered as employable to effect the manual height adjustment of the upper intake portion of #3-A relative to the surface of the water. The combination knob and threaded rod portion thereof #8 extends through the base plate for same and is retained therein by means of the washer and C-clip for same. Threaded rod #8 threads into the threaded portion of #3-A, and the base plate portion thereof, mechanically fastens to the top outer surface of float #2-A, and by means of rotational adjustments of knob #14, height of the height adjustable intake port tube of #3-A is made when initially setting up same to a position of maximum overall efficiency, and maintaining same by means of valve #34, as seen and described in FIG. 30-A. in this example of embodiment's thereof.

FIG. 31-C. Shows an embodiment of an additional, optional embodiment, offered as employable to effect the remote height adjustment of the upper intake portion of #3-A relative to the surface of the water, by means of #15, which is as a reversible electrically powered device that provides reversible rotation to threaded rod #8 that raises and lowers the height adjustable tube #3-A, Which can also be employed to maximize the level of efficiency, of this, the first embodiment of the floating contaminant removal equipment, that actually removes the floating contaminants from the surface of the water, by means of remotely monitoring and controlling the recovery operation and by means of, raising and lowering the intake port tube #3-A, by means of #15, remotely with the controls for same, of which would be on the main contaminant cleanup and recovery vessel itself. The employment of same in this manner actually provides the same basic service as would providable by means of opening and closing of valve #42-A, as included in the drawing and description of FIG. 30-A.

FIG. 31-D. Is a drawing of an is an overhead view of an embodiment of a float equipped with the components requisite to the removing of contaminants from the surface of the water, by means of surface tension and gravity. This being the float #2-A and intake port tube #3-A of which has been previously referred to as the first embodiment of the floating contaminant removal equipment. that actually removes the floating contaminants from the surface of the water, and although several modifications have been suffered by earlier embodiment's thereof, This embodiment is still of the same basic type, or variation of the floating contaminant removal equipment as was included in previous applications submitted by the application for same. One of these modifications suffered by this embodiment included in this application is the lower shelf or plate portion of #2-A. This newly added portion float #2-A has shown to improve the level of efficiency attainable by same, by means of restricting uneven waters around the intake port tubes point of entry, especially in heavy, or very adverse sea conditions, notice that the intake port tube #3-A comes up through the hole in the bottom of the integral plate or shelf portion of float #2-A, and of which is adjusted relative to the level of the seas same is floating in to a position most efficient, by means of the reversible drive motor #15. The controls same being on the main contaminant cleanup and recovery vessel itself. This reversible drive motor #15 can be employed much in the same manner that valve #43-A which can be employed in the same manner as described in FIG. #30-A simply by means of raising same up to allow the oil or other floating contaminants build up to a depth most efficiently recovered especially in very heavy seas or very adverse sea conditions, and lowering same to a height where same can be recovered close to or water free. #48. Is a mounting base plate for #49 which is a slide basically consisting of a small donut shaped bearing made out of bronze, stainless steel, or even a non-metallic such as a hard durable plastic that the cable or rod #28 (Not shown) that extends through #49 that maintains the forward portion of floats #2-A and #2-B always facing forward and the aft and side portions thereof in which the floating contaminants are pulled into during the recovery process always properly facing aft and aiming out to the sides in a position to most effectively cleanup and recover the floating contaminants from the surface of the water. in this example of embodiment's thereof.

FIG. 31-E. Is a drawing of an is an overhead view of an embodiment of a flush mountable block. This block has been added as an employable option to the employment of slide #49 included in FIG. #31-D. This block includes a mounting base plate #47 that additionally comprises an outer frame portion #52 that houses an inner housing portion, that includes two sheaves #50. that the cable or rod #28 (Not shown) that maintains the forward portion of floats #2-A and #2-B always facing forward. Cable or rod #28 would extend through this block between the two sheaves. #50 #51 are clevis pins or axles that extend through each end portion of both the outer housing of this block as well as the inner housing portion thereof that the two sheaves #50 are housed in and provides this block with the ability to freely pivot however if the flexible coupling #34, (Not shown) is not employed between the intake port tube and the first telescopic tube then a much more simple block could be employed, in which, the two sheaves #50. are mounted directly into outer frame portion #52 of the mounting base plate #47. in this example of embodiment's thereof.

FIG. 31-F. Is a drawing of a rear profile view of an embodiment of a float equipped with the components requisite to the removing of contaminants from the surface of the water, by means of surface tension and gravity. This being the float #2-A and intake port tube #3-A of which has been previously referred to as the first embodiment of the floating contaminant removal equipment. that actually removes the floating contaminants from the surface of the water.

The lower shelf or platform portion of this embodiment included in this drawing is of the same basic configuration of same in the embodiment's thereof included in FIG. 30-A and FIG. 31-D. the exception thereof being in that the lower platform portion #2-C of float #2-A, in this embodiment thereof is an integral portion of the intake port tube of #3-A and of which would be employed in the exact same manner as the other embodiment's thereof, with the only difference being, that the lower shelf or platform portion #2-C of this embodiment included in FIG. 31-F. would be raised and lowered along with, intake port tube, when adjusting same relative to the surface of the water. In an embodiment taught herein. in this example of embodiments thereof.

Figure 32:
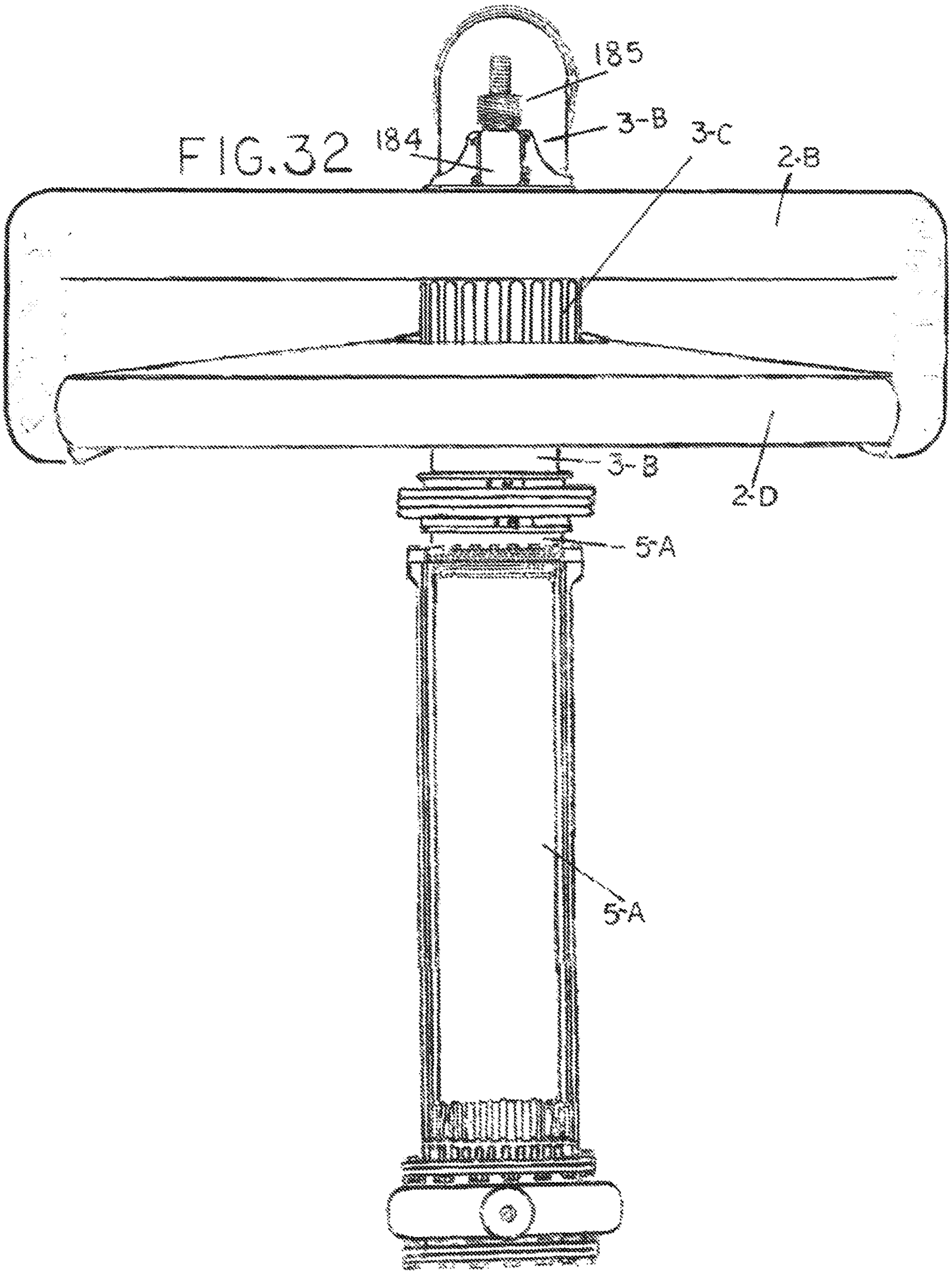
FIG. 32 illustrates a rear view of vacuum cleanup and recovery equipment having a telescopic tubes and a float.

FIG. 32 through FIG. 33-D in the following includes, various embodiment's of an additional type of equipment with a composition of components requisite to the removing for removing floating contaminants from the surface of the water, by means of a vacuum or low pressure. This being a variation of whats previously been referred to as the second embodiment thereof. Both the first and the second embodiment thereof. included in this application as well as all others previously submitted by the applicant for earlier embodiment's of same, have come about as result of several prior incidences happening in the applicants life.

The first of which being the gulf horizon oil spill of 2010 in that just prior to the spill, the applicant, had started and owned the greatest portion of a company, named Newcobatre LLC, and at the time had put down a major portion of every dollar he'd worked for his entire life, on two pieces of property the first being a three and a half acre piece of property with 519 feet of deep protected water frontage in town as well as a 9.1 acre piece of property with 1071 feet of waterfront in the residential aria, in a little city on the gulf coast, after commissioning feasibility studies and acquiring approval from the city to build a 480 dry boat storage facility on the first property in town and a 52 unit fish camp. Which are actually little retirement or vacation homes, on the other property. At which time, due to the applicants inability to finance both himself, he gave up 50% of his holdings in the company to a partner under the agreement that he would cover all financial requirements of the applicants as well as his own for the construction of same. The applicant had already had all surveys, engineering plans, approvals and permits from the city, etc. in place, and was in the process of getting estimates from contractors for seawalls and the sight work, in the summer of 2010 when the gulf horizon oil rig blew up and caused the largest oil spill in American history. Two weeks later the applicant's partner, pulled his resources, by means of a clause in the contract. and for over 5 years thereafter the applicant maintained his debt service on the property's, in hopes of the marine environment coming back enough to possibly restore the confidence of the general populous, as well as the lending institutions, in the health and future of the marine environment enough to possibly put everything back to gather, of which never quite came gather before the applicant could no longer maintain the dept service on same. Resulting in the applicant loosing the property's, and having to start all over at sixty two years old.

However if it wasn't for the gulf oil spill, and all of the problems it had caused, with nobody in the entire world possessed a solution of any kind that could cleanup up and recover any more than a very small and insignificant amounts of the floating oil, and even then only in the most favorable, of sea and other conditions. With the largest percentage of vessels sent out to cleanup the spill litterly burned more fuel in their efforts to do so than they successfully cleaned up and removed from the surface of the water.

However if it wasn't for the gulf oil spill of 2010, along with the applicants constant observance of same, as he was watching everything he owned, along with his family's financial future go down the toilette, as a result thereof, and B.P. Refusing to take any of the responsibility for same. Their response, being that as a result of the facility only being in its initial stages of construction at the time of the spill and as a result thereof, hadn't yet generated income, and therefore couldn't prove loss of income, even though the entire business in every way was in total reliance of the sport fishing industry and the health of the marine environment was therefore a loss, even though the applicant ended up loosing both properties and over 1.5 million dollars as a result thereof.

These things constantly directing and maintaining the applicants thoughts, towards a real solution to the problem, and constantly towards the development of equipment and modes to effectively cleanup oil spills. Then its very doubtful that any of the solutions included in this application, or those previously submitted by the applicant, would have ever come about.

The second incident that happened in the applicant's life, that proved to be responsible for the applicant's initial concept of the, embodiment previously referred to as the first embodiment of the floating contaminant removal equipment. that actually removes the floating contaminants from the surface of the water by means of surface tension and gravity, would have never come about if it wasn't for the applicants observance of a raised sink drain, in the bar portion of a restaurant, over thirty years prior. This being the type of drain that basically consists of a small section of pipe with a threaded end that threads into the upper inside portion of the sink drain a manner that the other end of the pipe extends up to a height just a couple of inches below the top of the sink and intern the upper end of the section of pipe becomes the drain for the sink. This sink at the time of the applicants observance of same, was full of water glasses and other utensils, with the sink also full of water, with the water still running very slowly out of the faucet, resulting in the excess water in the sink, slowly flowing over the edge of the raised drain. It was at this time that the applicant first witnessed the effects, that surface tension could have on things floating on the surface of the water, which resulted in the applicant sitting there for quite some time, observing things such as soap suds and food particles floating on the entire surface of the water, being pulled around the tops of glasses and other utensils sticking out of the water as same made its way to be pulled over the edge of the pipe and down the drain, from all surface portions of the water and from every corner of the sink.

The applicant recalling of his observance of these things, during his initial efforts to come up with a solution to effectively cleanup oil spills, resulted in the applicant filling his bath tub full of water and purring several quarts of oil in same. At which time he also got a large drinking glass out of his cupboard, and by means of firmly grasping same with one hand on the side of the drinking glass and the other hand on the bottom of same and pushed the drinking glass, bottom first, strait down into the water, until the upper edge of drinking glass just started to go under the surface of the water with the oil floating thereon, the oil was pulled across the surface of the water, and into the drinking glass and was pulling same from several feet away and when the applicant pulled the large drinking glass back out of the water, there was only a small percentage of water in the very bottom of the glass with the rest of the entire glass full of oil, the process of which the applicant repeated many times, and at many different oil thicknesses floating on the surface of the water. and it was the profound level of success the applicant experienced in these first simple and very crude tests performed by him, that became the beginning of a four year full time process of bringing this the first embodiment as well as all else included in this application to where everything is now.

However this first embodiment thereof, would have never happened, if it wasn't for the applicants first witnessing of the effects of surface tension pulling all of the little food particles and other things across the surface of the water and into the raised sink drain. This along with his memory of same, sticking in his mind for the many years thereafter simply due to his lack of understanding of the forces causing same.

The third incident that happened in the applicant's life, that proved to be responsible for the applicant additionally acquiring his initial concept of the embodiment's included in this application, previously referred to as the second embodiment of the floating contaminant removal equipment. that actually removes the floating contaminants from the surface of the water by means of surface tension and vacuum or low pressure, probably would never have come about, if it wasn't both for the profound levels of successes, he'd experienced in removing floating oil from underneath the surface of the water, in the aforementioned floating oil in the bathtub tests, instrumental in the applicants initial development of whats previously been referred to as the first embodiment thereof. In that the actual incident responsible for the applicant initially discovering that oil, and other floating substances, could also be very effectively removed from the surface of the water by means of vacuum or low pressure, came about as a result of the type of work the applicant did, largest portion of his life, in that he worked in yacht repair business and owned a company named yacht construction and repair specialists, of which consisted of several shops he'd had in different boat yards in Miami and Fort Lauderdale Fla., for many years, and of which among other things he did fiberglass and interior wood work, as well as the installation and repair of mechanical systems, on yachts, and of course a large percentage of jobs performed, inside same, resulted in things falling, or running down into the bilges, whether hydraulic oil from a pump, transmission, or steering system worked on or replaced, or fiberglass or saw dust from a woodworking or fiberglass job completed, would almost always find its way into the lowest aria in the vessel, This of course being bilges where same would end up floating on the surface of the water therein.

Of course all jobs required the cleanup and removal of any mess created, when the job was completed. Standard procedure in the industry for completing this task was to pump as much of the water out of the bilges as possible with the vessels centrifugal bilge pumps which could never remove the last couple inches of water from same, which always required someone to go down into the bilges, usually head first, to set up a small electric pump and hose, or with a hand pump to first remove the rest of the water from the bilges. This usually including the pumping of same into five gallon buckets, and hauling same up to the main deck to dump same over the side of the vessel. Then having to cleanup everything that was floating on the surface of the water, that's now sticking the sides and bottom of the bilges that had to be cleaned out; also usually head first, by hand with soap and a little water and many rolls of paper towels or other.

The actual incident happening during a job where the applicant and employees of his, were replacing the lines to a hydraulic steering system in an 85 foot yacht, in which a less experienced employee of the applicants had removed a line before the system was bled and before same was realized, several gallons of hydraulic oil got pumped out of same and directly down into the bilges of the yacht and started to spread out therein. In the applicants desperate efforts to contain the oil before same migrated throughout the entire bilges of the yacht, this along with the profound levels success the applicant was experiencing in removing of floating oil from just under the surface of the water, during tank tests, the applicant had already performed on some of his first and very rough component prototypes, which resulted in the applicant grabbing a close by wet and dry vacuum and tried to vacuum up same, by holding the end of the hose of the wet dry vacuum, just over the surface of the hydraulic oil floating on the surface of the water, in basically in the exact apposite manner in which he had removed floating oil, from just under the surface of the water. To the amazement of the applicant not only was the vacuum very effectively removing the floating hydraulic oil from the surface of the water but as long as he maintained the hose at the right distance from the surface of the water, but the hydraulic fluid along with anything else floating on the surface of the water, was drawn to the end of the hose where same was being removed, from as much as 10 or 12 feet away by means of surface tension in the same manner as the applicant was experiencing in numerous additional tests he'd performed in the removing of floating contaminants from under the surface of the water in some of the applicants initial efforts to develop equipment to efficiently do so.

This incident along with the knowledge acquired from same pretty much being responsible for the applicant including the removal of floating contaminants from above the surface of the water by means of surface tension and vacuum or low pressure, being developed. In fact it was this, along with his along with, constant advancements the applicant was experiencing in his development of the first embodiment thereof, that resulted in the applicant shutting down his business almost four years ago, to dedicate full time to the development of both, as well as to the development of all else comprising this application. and to bring all, to the profound level of operational efficiency and recovery rates they now possess. Which at this point, have proven to possess abilities, that will out perform anything, preciously devised, litterly many times over.

FIG. 32 is a drawing view of the back side of a float embodiment equipped with the components requisite to the removing of contaminants from the surface of the water, by means of a vacuum or low pressure. This being a variation of whats previously been referred to as the second embodiment thereof comprising of an embodiment of float #2-B and intake port tube #3-B The intake port tube #3-B portion of this, the second embodiment of the floating contaminant removal equipment. that actually removes the floating contaminants from the surface of the water, by means of a vacuum or low pressure, that the oil or other floating contaminants are initially pulled into the lower section of this embodiment thereof #3-C which is actually just a lower extended portion of 3-B that's coupled to the upper portion of same #3-B The lower intake portion of same #3-C in this embodiment thereof is designed in a manner that maintains continuous air intake, by means of the vertical cut out slit portions in same, of which even in the case of sudden irregularities, in the water levels around the bottom intake portion of #3-C along with the floating contaminants same is pulling in towards the intake port tube. from behind and both sides of float #2-B and into the aft and side portions in this embodiment of same, by means of surface tension along with ever increasing lower ambient pressure as same makes it way down the ever narrowing inner portion of #2-B, until same enters the lower intake portion of this vacuum intake tube #3-C from around the lower periphery portion's thereof, at which time, same becomes air born and carried all of the way into the separation and, or, holding tanks inside the hull of the vessel for same in this embodiment thereof, which themselves in one embodiment thereof are employed much like very large wet vacuum tanks. Which will be fully understood by means of the drawing and definition for same included in FIG. 39.

This embodiment of the vacuum intake port tube #3-B that possesses an embodiment of an lower extended intake portion #3-C is either mechanically fasted to or made as an integral portion of the lower shelf #2-D of float #2-B in a manner in which same is height adjusted to a position of maximum efficiency during the recovery process by means of a low rpm reversible electric drive motor #184 and worm gear #185. which when employed raises and lowers this embodiment of the intake end portion of the intake vacuum port tube #3-C along with the lower shelf #2-D, which is the height adjustable portion of float #2-B, in relation to the surface of the water and the oil, or other type of contaminants floating thereon. The controls for which being of the main recovery vessel itself. This worm gear and drive motor is simply added as optionally employable, to maximize the level of efficiency attainable in various sea conditions and recovery scenarios. in this example of embodiment's thereof.

#34 is an optionally employable flexible coupling, This flexible coupling was included in the first applications submitted by the applicant for previous embodiment variations of this same basic type of floating contaminant cleanup and recovery equipment. That was included to allows pivotal movement between the first telescopic tube #5-A and height adjustable intake port tube #3-A and in turn providing float #2-A or #2-B and intake tube #3-A or #3-B with the ability to freely pivot and remain parallel to uneven waves between the main floats 31 (Not shown) during the cleanup and recovery process. However later tests showed this flexible coupling to be unnecessary and simply not needed, which why many of the contaminant cleanup and recovery equipment drawings, included in this application show same has simply been replaced with a non flexible coupling or boot.

Notice that the telescopic tube housing #4-A in this drawing is housing only one telescopic tube, unlike the drawing of the embodiment thereof included in FIG. 30-A, which is employing two telescopic tubes. This also being why the embodiment in this drawing also has no need for the small ring shaped float #7 providing buoyancy for the second telescopic tube included in FIG. 30-A.

FIG. 33-A is a drawing of an embodiment of a float equipped with the components requisite to the removing of contaminants from the surface of the water, by means of a vacuum or low pressure. This also being a variation of what's previously been referred to as the second embodiment thereof comprising of an embodiment of float #2-B and intake port tube #3-B.

This drawing of #2-B and #3-B being the portion of this, the second basic embodiment type of the floating contaminant removal equipment. that actually removes the floating contaminants from the surface of the water, by means of a vacuum or low pressure. Notice this embodiment thereof, has no electrical adjustment apparatus of any sort, but instead is initially set up to a floating level, with the vacuum intake port tube portion thereof sat at to a level relative to the surface f the water, of maximum efficiency when employing same in conditions most common by means of adding the proper amount of weights #122-A, fastened to the top of float #2-B by means of a threaded stud #122-B until the float reaches its position of maximum efficiency. which can also be changed simply adding or removing weights #122, prior to launching of the floating contaminant cleanup and recovery equipment. once arrived at a spill and recovery conditions can be properly evaluated, to set the floats at levels, most efficient, relative to conditions present. This embodiment although more simplistic in design has proven to be as efficient as others the only set back to the employment of same is that of convenience more than anything else and the inability to very finely adjust settings on same while employed from the main recovery vessel itself, which could result in a lesser level of attainable efficiency in some recovery conditions and scenarios. This drawing of this embodiment, also provides a good view of cable or rod #28 that extends through the bearing or slide #49 (Not shown) that maintains the forward portion of floats #2-A and #2-B always facing forward and the aft and side portions thereof in which the floating contaminants are pulled into during the recovery process always properly facing aft and aiming out to the sides in a position to most effectively cleanup and recover the floating contaminants. in this example of embodiment's thereof.

All equipment embodiment's included in this application that employ a vacuum or low pressure for the actual removing of contaminants from the surface of the water. This being of the type thereof previously referred to as the second embodiment thereof, of which are configured and engineered in a manner in which the ambient pressure becomes progressively lower the closer the floating oil or other floating contaminates being cleaned up gets to its point of recovery. This due the mitered or angled inner wall or fascia portion of the floats #2-B becoming narrower or closer together as it reaches its point of recovery and thus the oil, or other type of floating contaminants are drawn back by means of progressively lower ambient pressure to where the intake portion of the intake port tube #3-C is positioned, at which time same inters into the sides of the lower periphery portions thereof where the vacuum pressure becomes much lower, to the point in which same becomes instantly airborne and carried from this its point of recovery all of the way to the contaminant and water separation and, or, storage tanks on the main cleanup and recovery vessel. in this example of embodiment's thereof.

FIG. 33-B is a drawing of a profile view of an embodiment of a float equipped with the components requisite to the removing of contaminants from the surface of the water, by means of vacuum or low pressure. This also being a variation of whats previously been referred to as the second embodiment thereof comprising of an embodiment of float 2-B. and intake port tube #3-B in which, an upper portion of intake port tube #3-B extends through a sieve #3-D that extends through an upper portion of float #2-B. the lower portion of intake port tube #3-B is mechanically coupled to the actual intake portion thereof #3-C of which additionally includes a lower plate portion thereof, 3-G in this embodiment of same mechanically fastened into an inset portion of a separate lower shelf portion of #2-D of which may includes at least one a male slide #2-E located on the forward end portion of the lower shelf of #2-D that may be inserted into and is vertically adjustable in at least one female track #2-F located of a lower aft fascia portion of float #2-B. Sieve #3-D additionally includes a flange that is mechanically fasted to a top portion of float #2-B. a raised portion of sieve #3-D additionally comprising a vertical cut out portion thereof, with two small plate portions of sieve #3-D extending out, and perpendicular from the edges of the cut out portion thereof, said two small plate portions of sieve #3-D additionally comprising a mounting bracket bridging the outer periphery of same said mounting bracket for the mounting of a low rpm reversible electric drive motor #184 and worm gear #185, which engages lateral gear teeth #3-F in the outer periphery of a raised flat or rack gear attached to a portion of the intake port tube #3-B. Same is height adjusted to a position of maximum efficiency during the recovery process by means of a low rpm reversible electric drive motor #184 and worm gear #185. which when employed engages teeth in the raised flat or rack gear, which intern raises and lowers the intake end portion of #3-C of the intake vacuum port tube #3-B along with the lower shelf #2-D portion of float #2-B in relation to the surface of the water. #3-E is a flexible coupling between the two sections of #3-B allowing the full vertical adjustment to the intake side thereof #3-C. The lower portion of #3-B in this example of embodiment of same includes small cut out inverted v shaped slits in same, instead of the simple vertical slits cut out of other embodiment's thereof, which also performed very although not really proving to possess any advantage over same. In this example of an embodiment thereof.

FIG. 33-C is a drawing of a profile view of an embodiment of a float equipped with the components requisite to the removing of contaminants from the surface of the water, by means of a vacuum or low pressure. This also being a variation of whats previously been referred to as an example of the second embodiment thereof comprising of an embodiment of float 2-B. and intake port tube #3-B, This upper portion of intake port tube #3-B extends through an upper portion of float #2-B. and inserts into the upper portion of intake port tube #3-C, at very close tolerances therein. The lower portion of the intake port tube #3-C is where the floating contaminants are initially pulled into and recovered. in this example of embodiment's thereof.

The lower plate portion of this embodiment of same 3-G as well as the tracks #2-E and #2-F, that the separate lower shelf portion #2-D, is height adjustable relative to float #2-B on, is basically shown as being the same in this embodiment thereof, included in the drawing and description for same in FIG. 33-B. This also holds true for the embodiment's included in FIGS. 33-C as well as FIG. 33-D. These height adjustable shelf #2-D portions of float #2-B. extends from the furthest inner open portion of float 2-B to a point either even with the aft portion of #2-B. or perhaps further if deemed as beneficial to the level of efficiency attainable by same. These embodiment's thereof also show the lower plate portion of a height adjustable. intake port tube #3-C as being mechanically connected to and height adjustable with the height adjustable shelf #2-D portion of float 2-B, Which may, or may not hold true in additional embodiment's thereof.

This drawing shows the mechanism employed to raise and lower the lower shelf portion #2-D of this embodiment being, by means of threaded rod #8 that is threaded through a threaded insert portion of height adjustable shelf #2-D and is height adjusted by the means of the rotation thereof, by means of the electric reversible drive motor and gear box, #15, in that as the oil, or other type of floating contaminants thickness around the float builds, this height adjustable shelf can be adjusted to a position where the oil, or other floating contaminants can be retrieved at its highest rate of efficiency, which can be easily determined during the recovery process. in this embodiment thereof. This due to this embodiment thereof being equipped, with a type of water to oil level and consistency sensor, of which there are many types thereof commonly employed in petroleum storage tanks as well as in many other applications in the petroleum and other industry's.

This embodiment of water to oil level and consistency sensor #203 would detect both the thickness of the floating oil relative to the bottom if the intake port tube and could be employed on any of the embodiment's of the floating contaminant cleanup and recovery equipment included in this application. This drawing shows the water to oil level and consistency sensor #203 mounted in and extending vertically out of an upper portion of height adjustable shelf 2-D. The wiring loom for same #204 is shown as becoming an integral portion of or simply mounted with, wiring loom #205 that contains the wires that supply power to the revertible drive motor #15 that turns threaded rod #8 that raises and lowers, lower shelf #2-D, lower intake port tube #3-C along with sensor #203.

This wiring for same would run back, to the control station in the main contaminant cleanup and recovery vessel where these levels could be monitored as well as the equipment for same could be controlled. in this example of embodiment's thereof.

FIG. 33-D is a drawing of a profile view of an embodiment of a float equipped with the components requisite to the removing of contaminants from the surface of the water, by means of a vacuum or low pressure. This also being a variation of whats previously been referred to as the second embodiment thereof comprising of an embodiment of float 2-B. and intake port tube #3-B in which, an upper portion of intake port tube #3-B extends through a sieve #3-D that extends through an upper portion of float #2-B. the lower portion of intake port tube #3-B is mechanically coupled to the actual intake portion thereof #3-C. with the only difference in this embodiment thereof and the embodiment included in FIG. 33-B being just in in the basic design differences between the two embodiment's thereof. However all else comprising same being the same as included and described in detail in FIG. 33-B.

This embodiment of valve #188, is a vacuum pressure regulating Valve which has been drawn, as included in all second embodiment vacuum intake port tubes included in this application. in that same proved a very needful service in earlier embodiment's thereof. Although along with the advanced development of same and the further engineering and the development of other portions of supporting equipment in many ways provided the same service. However these vacuum pressure relief valves provisional service of always maintaining the proper vacuum pressure in the vacuum intake port tube, in very close relation to, sames point of recovery, simply insures very smooth and unwavering intake and recovery of the floating contaminants, along with a far greater ability to maintain same in very adverse sea conditions and recovery scenarios. in this example of embodiment's thereof.

This valve #188 was added simply to maintain even vacuum pressure and to eliminate vacuum surge which would occur periodically, during the initial tests of this type of recovery equipment when artificial conditions of heavy seas, were created, in the test tank with only one float and vacuum intake port tube was employed, which intern would make the intake portion thereof become unstable and gulp water along with the floating contaminants, of which would happen periodically, when adverse sea conditions were simulated.

These vacuum pressure regulating Valves #188 if employed would not resemble those included in the drawings in this application, although in many ways do resemble those employed in them during the largest portion of their development, This simply due to the fact that during most of the time the applicant was developing same, he was unaware of a very applicable diaphragm type of vacuum pressure relief valves, developed for multiple inline commercial vacuum systems. and as a result thereof the applicant made his own, by means of re-engineering water swing check valves, by means of cutting off an upper portion of same and mechanically fastening a spring with the right amount of resistance between the back side of the round gate portion of the valve and an inner portion of the valves housing, behind same. Then simply installed same in an upper portion of the vacuum port tube, which in turn, worked quite well. after much testing and a springs providing the proper amount of resistance could be determined.

An embodiment of vacuum pressure regulating valve #188, included in this drawing as well as all others employing vacuum intake port tubes of the second embodiment thereof, was the first of several, very successful modifications developed by the applicant to overcome some of the problems faced in the development of this, the second embodiment of the floating contaminant cleanup and recovery equipment, The other needful solutions were created during the various stages of the advanced development, during the further engineering and the development of other portions thereof, as well as other supporting equipment, totally resolved all of the problems faced by the applicant during the development process of same. with most remedies being provided in several different ways.

However the applicant recently came to the realization that these valves #188 may not be needed at all, in that conditions created during the tank testing of same are quite different than those that will be provided on the recovery vessel itself, All tank tests were also performed with equipment employing only one float and vacuum intake port tube the problems associated with actual vacuum surge experienced in earlier embodiment's thereof may well not even exist once employed on an actual recovery vessel employing equipment with more than one float and one vacuum intake port tube. In that the ambient vacuum pressure would always be maintained for the most part, due to same, equalizing through the other vacuum intake tubes. This along the volume of the oil or other contaminant storage tanks employed like very large wet vacuum tanks would be of a size and volume, that the vacuum pressure would remain, or could easily be maintained at the same vacuum pressure at all times.

The applicants development of this vacuum type of floating contaminant cleanup and recovery equipment, to the level of efficiency in the broad range of sea conditions and recovery rates they now possess. did not come about easily in that the development process of same, included problems and obstacles that were initially very difficult to overcome.

Some of the remedies for which being rather simple once discovered. However they only came about as a result of a very long and arduous process that, although being developed at the same time, and along with all else included in this application. The development of this vacuum type of floating contaminant cleanup and recovery equipment received the greatest amount of attention, time and effort on the applicants part, to bring same to the profound level of efficiency they now possess, and along with the adverse sea conditions their capable of maintaining same in, all tests also indicate that once brought to scale, same will also possess recovery rates comparable to the first embodiments thereof, that remove floating contaminants from under the surface of the water by means of surface tension and gravity, of which possesses recovery rates that are almost limitless.

FIGS. 34-A through FIG. 34-F include additional drawings of embodiment's of floats #2-A and #2-B these float embodiment's are equipped with the same basic components requisite to the removing of floating contaminants from the surface of the water, and of which do so, in the same basic manner as others included in this application. However the #2-A and #2-B float portions thereof included in these embodiment's thereof have been further equipped with additional floating gates that would be weighted and configured in a manner in which the buoyancy thereof would both maintain the open portion thereof just barely under the surface of the water, at all times during the employment of same. Modifications or adaptations of this nature will most likely never be implemented in that the only real reason same was added in this application was to provide an example of one of many simply engineered modes, in which the #2-A and #2-B float portions of the floating contaminant cleanup and recovery equipment could be further modified, to possibly provide same with the ability to attain even slightly higher levels of operational efficiency during the employment of same in very rough and adverse sea conditions, simply in that not only would same add an additional level of refinement but possibly even better reaction time to the equipment's ability to maintain the intake portions of the #2-A and #2-B floats at levels most efficient relative to the surface if the water and the contaminants floating thereon, in the worst and absolute least favorable of sea conditions. This embodiment of an adaptation was simply added as a very simple mode to provide an even slightly higher level of operational efficiency in the applicants ongoing efforts to provide same with the highest possible levels thereof.

The manner in which equipment components and prototypes were tested was actually accomplished by means of continuous currents created and maintained at various speeds in a very large above ground pool with vertically ridged but flexible side panels, which along with the ability to very effectively simulating forward rates of speed, also enabled a broad range of easily creatable and fairly accurate sea conditions, simply by means of pushing and thus flexing the upper portions side panels of the pool at various intervals and amounts of pressure from various positions around same. Thus enabling floating contaminant cleanup and recovery equipment as well as contaminant boom prototypes and combinations thereof to be effectively tested both in various simulated sea conditions and rates of forward speed tethered off of stationary framework extending out from above side portions of the pool.

All #1 as well as all #2-A and #2-B float prototypes tested were simply constructed of polyurethane foam and the actual telescopic tubes and tube housings, were simply constructed of sections of tubing with outer diameters of the actual tubes carried by the #2-A or #2-B float prototypes tested being of a slightly smaller diameter than the inner diameters of the telescopic tube housing prototypes constructed to house same. A slidable seal between the two was simply accomplished by means of the employment of a standard packing gland, of the type used to maintain a watertight seal between the shaft log and the propeller shaft in marine vessels. Of which were simply installed on the uppermost end portion of the telescopic tube housing by means of a rubber boot and employed in the same basic manner to create a slidable seal between the telescopic tubes and the telescopic tube housings and the lower end portions of same, were simply equipped with all fittings needful to create a single outlet in which a first end portion a section of very flexible tubing was connected simply by means of a hose clamp and with the second end portion of same connected in the same manner to a common marine through hull fitting, extending through a hole, previously cut through a lower portion of the vinyl liner and the outer panel portion of the pool of which same was tightened and well sealed with sealant. An additional section of flexible hose was then connected to the outlet portion of same with the opposite end thereof running to and disposing captured contaminants along with a small percentage of water inadvertently captured along with same into transportable containers in which ratios of same could be checked before pouring their contents back into the pool, to be recaptured by same. when testing the type of floating contaminant cleanup and recovery equipment, that removes contaminants from the surface of the water and recovers same by means of surface tension gravity alone.

When testing the second type of floating contaminant cleanup and recovery equipment, that employs both surface tension in conjunction with low or vacuum pressure to remove and transport recovered floating contaminants, the end of said flexible hose extend out from a lower portion of the pool was connected directly to a the intake portion of a very powerful vacuum, that was actually manufactured to be employed with carpet shampooing equipment.

FIG. 34-A Is a drawing of a profile view of an embodiment of a float equipped with the components requisite to the removing of contaminants from the surface of the water, by means of surface tension and gravity. This drawing shows an embodiment of a modified version of the floating contaminant removal equipment. Notice the float portion, #2-A in this embodiment thereof has been modified and added as an example of a simple manner, in which this embodiment of float #2-A has been provided with an additional floating gate, added to possibly even further advance sames level of efficiency attainable in very adverse and unfavorable sea conditions simply by means of cutting an aft portion of float #2-A off in the proper position and configuration and then reattaching same back to the aft portion of float #2-A by means of an armature #2-G on each side of a lower portion thereof with hinge points located on the opposite end portions thereof providing both points of attachment as well as a pivoting joint for the floating gate #2-H simply made from the cut off aft portion of float #2-A. This floating gate #2-H in this embodiment thereof would include an aft portion of the lower shelf portion of float #2-A as well as the upper side panel portions thereof and provided with just the proper amount of buoyancy to maintain the lower shelf portion of same just slightly beneath the water with the forward extended ledge portion thereof #2-E. resting on the aft lower shelf portion #2-F. of float #2-A until same encounters irregular water levels under and around same at which time same instantly rises and maintains the upper end portion of the forward extended ledge portion #2-E. of floating gate #2-H at the same level relative to the surface of the water at all times when employed, by means of the extra buoyancy provided by the upper side panel portions of floating gate #2-H. in this embodiment of float 2-A. in this example of embodiment's thereof.

FIG. 34-B. Is a drawing of the same float and intake portion of the floating cleanup and recovery equipment embodiment included in FIG. 34-A, with the modified aft floating swing gate #2-H portion of float 2-A in a raised position as if same reacted to a very fast moving and steep wave and came into service faster than the rest of the #2-A float and intake portion thereof could respond to same.

FIG. 34-C. Is a drawing of an aft view the same float and intake portion of the floating cleanup and recovery equipment embodiment included in FIG. 34-A, and FIG. 34-B as if the aft floating swing gate #2-H portion of float #2-A was all of the way down with the forward ledge portion thereof #2-E. resting on the aft lower shelf portion #2-F of float #2-A.

FIG. 34-D Is a drawing of an aft view an of embodiment of float #2-B float and an embodiment of the intake portion of same #3-B. That removes floating contaminants from the surface of the water and transports same into separation and storage tanks for same. by means of vacuum or low pressure, of which, like the embodiment's of float 2-A is equipped with a floating swing gate 2-H, with this example thereof also just very simply constructed from an aft portion of float #2-B, in these examples of embodiment's thereof.

FIG. 34-E. Is a drawing of a profile view another embodiment of float #2-B equipped with a height adjustable lower aft shelf portion of same. This drawing shows an example of an embodiment thereof in which the aft portion of float #2-B, is also equipped with a floating swing gate, that's also simply constructed from an aft portion of float #2-B, in much the same way as the embodiment of float #2-B included in FIG. 34-D. in this example of embodiment's thereof.

FIG. 34-F. Is a drawing of an overhead view of the same version of an embodiment of a float #2-A, as is included in FIGS. 34-A through FIG. 34-C, equipped with the components needful for the removing of contaminants floating on the surface of the water, by means of surface tension and gravity, additionally equipped with a floating swing gate, simply constructed from an aft portion of float #2-A. This drawing thereof also provides a view of an axle or pin #2-I extending through a lower aft portion of aft floating gate #2-H made from the cut off aft portion of float #2-A. providing both a point of connection as well as a pivot point for same. in this example of embodiment's thereof.

FIG. 34-G Is a drawing of a profile view an example of another embodiment of float #2-B with an embodiment of an intake portion of same #3-B. That removes floating contaminants from the surface of the water and transports same into separation and storage tanks for same. by means of vacuum or low pressure, This float, like the embodiment's of both float, 2-A and 2-B, included in FIGS. 34-A through FIG. 34-F. is also equipped with a floating gate, of which is also very simply constructed from an aft portion of float #2-B, However this floating gate 2-L, instantly raises and lowers on vertical slidably coupled tracks 2-J and 2-K with a first mail or female portion of said tracks mounted on the aft fascia portion of float 2-B. and the second interlocking track portion thereof, mounted on the forward fascia portion of this additional type of floating gate 2-L. This also holding true for the floats included in FIGS. 34-H and FIG. 34-I This example of another type of floating gate #2-L included in the embodiment's of float's 2-A and 2-B in FIGS. 34-G through FIG. 34-I, are also shown as possessing a small forward extended lateral shelf portion 2-M lightly resting on the upper surface portion of shelf 2-N, located on an aft portion of float #2-B. The upper end portion this lateral shelf 2-M is maintained at the same level, relative to the surface of the water at all times by means of the total weight of the floating gate 2-L. and the buoyancy of same. maintaining the upper surface portion of the forward extended shelf portion #2-M, of floating gate 2-L, just slightly beneath the water with the lower surface portion thereof, lightly resting on the aft lower ledge portion #2-N. of float #2-B, until same encounters fast moving very irregular, or choppy waters, under and around same at which time, this aft floating gate portion of float 2-B, instantly rises and maintains the upper forward end portion of the extended ledge portion #2-M of floating gate #2-L at the same level relative to the surface of the water at all times, with the instant response thereof provided to same, by means of the extra buoyancy provided by the sides and upper portion of floating gate #2-L. in the same basic manner as the other embodiment's of the floating gate portions of floats 2-A and 2-B included in FIGS. 34-A through FIGS. 34-F.

FIG. 34-J. Is a drawing of an aft view of the floating gate #2-L. of FIG. 34-G as if same was removed from the aft portion of float 2-B. This drawing thereof was simply added to better show the location of the extended shelf portion thereof #2-M, as well as the vertical tract portions indicated as the two sets of dotted vertical lines #2-K in this example of the embodiments thereof included in FIG. 34-G. through FIG. 34-I.

FIG. 34-H. Is a drawing of a profile view another embodiment of float #2-B equipped with a height adjustable lower aft shelf portion of same. This drawing shows an example of an embodiment thereof in which the aft portion of float #2-B, is also equipped with a floating gate #2-L, simply constructed from an aft portion of float #2-B, of which would also simply adjust vertically along with the combination height adjustable intake #3-C, and lower aft float portion 2-D. by means of the bottom portion of the forward extended shelf portion #2-M of floating gate #2-L resting on the aft lower ledge portion #2-N. of the height adjustable lower aft float portion of 2-D, maintaining same at the proper level relative to the surface of the water at all times when employed.

FIG. 34-I. Is a drawing of an overhead view of an embodiment of a float equipped with the components requisite to the removing of contaminants from the surface of the water, by means of surface tension and gravity. This drawing shows an example of float 2-A modified in the same basic manner as the embodiment's thereof included in FIGS. 34-G and FIG. 34-H The forward float portion, #2-A in this embodiment thereof is shown as possessing the female portion of the interlocking track #2-K and the floating gate #2-L as possessing the male portion of the interlocking track #2-J This drawing also shows the upper surface portion of the extended shelf portion #2-E. of floating gate #2-L. Resting on the upper ledge #2-F. represented as the dotted line.

FIGS. 35-A. and FIG. 35-B are both drawings of an embodiment of a contaminant cleanup and recovery vessel and equipment mounted thereon. This Embodiment thereof cleans up oil and other floating contaminants from the surface of the water by means of, gathering and channeling, all of the floating contaminants to a forward portion of the main contaminant cleanup and recovery vessel, of which for easy reference purposes, these vessels and equipment employed by same, that do so, will simply be referred to as the fifth embodiment thereof. These drawings are overhead views of this the fifth embodiment thereof.

FIG. 35-A. This drawing was included to show an example of the manner in which this embodiment of the floating contaminant cleanup and recovery vessel and the equipment employed on same is equipped to deploy the contaminant cleanup and recovery equipment employed on same, when it reaches the spill, as well as how, same is taken back out of service and re-stowed on the contaminant cleanup and recovery vessel, and readied for its next deployment, when the floating contaminant cleanup and recovery operation has been completed. Of which is accomplished very quickly and easily and by means of only one, to three crew members.

This embodiment of the floating contaminant cleanup and recovery equipment would be deployed by means of lifting same up and out of its mounting platform #215 by means of the forward mounted hydraulic lift. #88. then simply by means of booming out and lowering same. The floating contaminant cleanup and recovery embodiment is set into the water. The lifting cable for same #89 would simply be left attached with enough slack in the cable as not to hinder its full range of operation. The floating contaminant containment booms could would be attached to the vertical roller tracks or rods #37 prior to launching same were, like other embodiment's thereof could remain at all times, for that that matter. Like other embodiment's thereof the boom panels on ends of the floating contaminant containment booms could also remain connected to the vertical roller tracks or rods that they connect to and slide up and down on, on the contaminant containment boom tow boats, at all times like other embodiment's thereof, as well. These contaminant containment boom tow boats, would be both launched, and re-cradled, by means of the aft hydraulic lift #88.

The containment booms like most other embodiment's thereof would be deployed either by means of feeding same, on to the boom slide portion of spool winch #162 and over the spool #153 portion of same, or directly out of the storage bins for same. #154 by the contaminant boom tow boats, as same pull away from the main contaminant cleanup and recovery vessel and get into position to initiate the floating contaminant cleanup and recovery operation, in the same basic manner as all other embodiment's of the floating contaminant cleanup and recovery vessels and equipment are employed.

Taking this equipment back out of service, like other embodiment's thereof, would require no more time, effort, or manpower than was required to initially deploy same and of which like other embodiment's thereof and would be achieved simply by means of re-cradling both recovery equipment and containment boom tow boats #108 with the contaminant booms #107 left attached thereto. Then retrieving and restoring the floating contaminant containment booms simply by means of placing the oil containment boom over the spool #153 portion of the spool winch #162 as seen then simply by means of operating same from platform #158 and guiding the containment boom down the pivot able boom slide #159 and back into their storage bins then simply get underway and back to port or to the next spill.

This embodiment thereof is employed in the same basic manner as all other embodiment's thereof, wherein two contaminant containment boom towing vessels towing floating contaminant containment booms are employed to gather the floating contaminants each contaminant containment boom towing vessel out ahead with one on each side of the main contaminant cleanup and recovery vessel to channel same back between the contaminant containment booms towed by same to provide same to this the fifth embodiment of the floating contaminant cleanup and recovery equipment in the same manner as all other embodiment's thereof.

FIG. 35-B. Is a drawing that shows the same embodiment of the floating contaminant cleanup and recovery vessel and the equipment employed by same, as is included in FIG. 35-A. This drawing shows the vessel and equipment employed on same, as it would appear after finishing a contaminant cleanup and recovery operation with all equipment re-stowed and the contaminant booms tow boats #108 re-cradled on the main deck of the main contaminant cleanup and recovery vessel, as same would appear either in route to another spill or returning to port from a floating contaminant cleanup and recovery operation. in this example of embodiment's thereof.

FIG. 36 is a drawing of a profile view of an embodiment the contaminants cleanup and recovery equipment previously referred to as a fifth embodiment thereof.

This portion of this equipment, is equipped to recover floating contaminants from in front of the recovery vessel. and is attached to, pivots on, and transports the recovered oil, or other contaminants recovered by same, to the main contaminant cleanup and recovery vessel employing same by means of the pivoting armatures #206 and vacuum tube #206 combination that will be described and illustrated in detail in the write up and drawings of FIG. 3. Notice the rest of the components of this embodiment are all simply slightly modified variations of other embodiment's of the floating contaminant cleanup and recovery equipment included in this application. The starboard float #1 is drawn in a manner as if same was semi transparent so the dotted outline of a #2-B float and the intake port tube #3-C as well as the inner framework and other components for this equipment housed therein can be viewed. #215 is a reinforcement plate that's welded or mechanically fastened both to the inner fascia of the collar portion of the female coupling that will be seen and fully described in FIG. 3.

Figure 37:
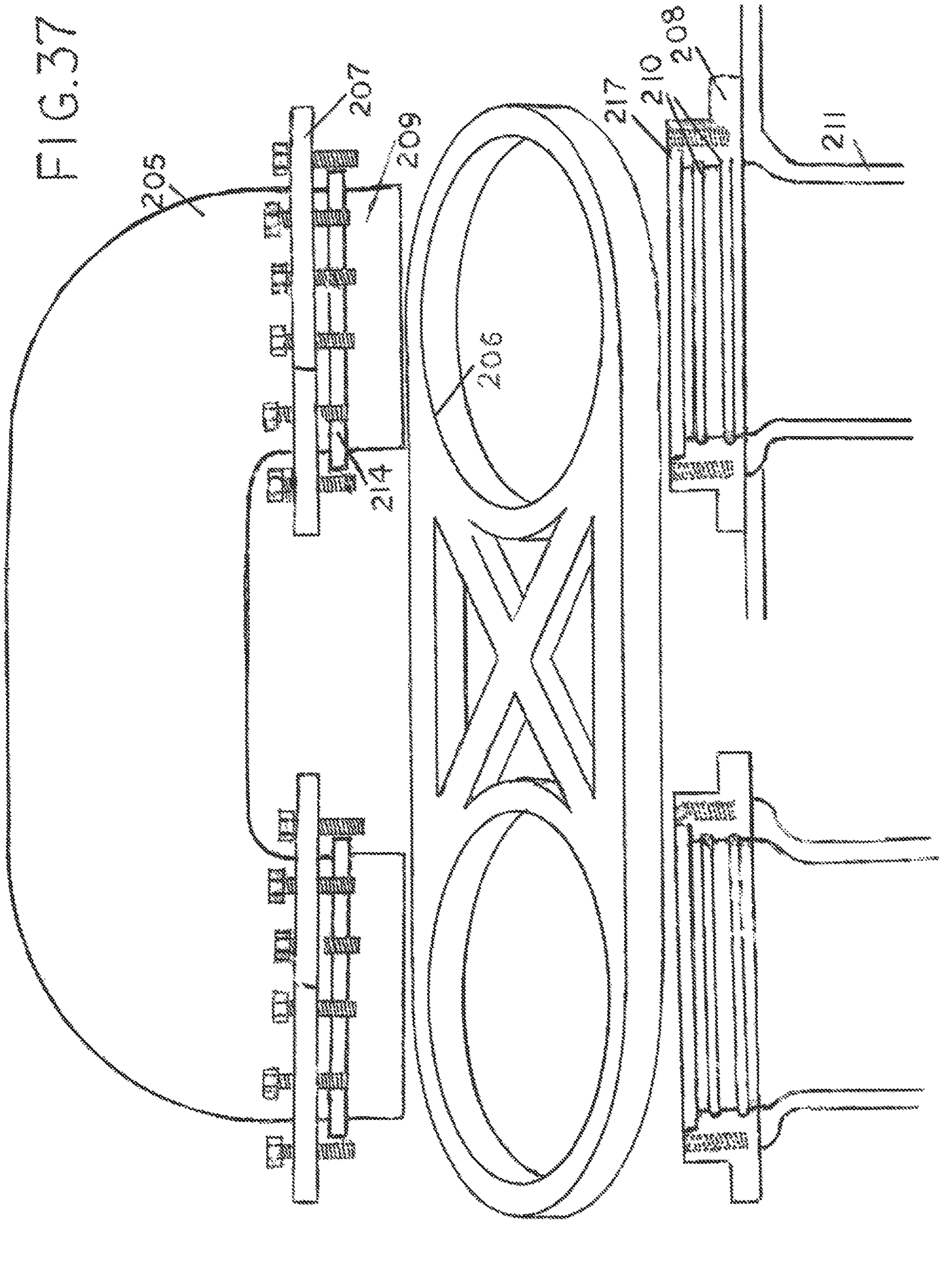
FIG. 37 illustrates an blown-up perspective view of a rotatable armature and vacuum tube combination.

FIG. 37 is a blow-up drawing of a shortened version of an embodiment of the rotatable armature and vacuum tube combination #206 and 205. That when mechanically coupled together pivot-ably connect this portion of the recovery equipment to the recovery vessel with a very strong, rigid, and perfectly sealed joints, on each end thereof. This vacuum tube #205 possesses 90 degree end portions thereof, with a raised ridge portion #214 made as an integral cast portion of the outer vacuum tube section #205 located several inches in and extending around the outer periphery of the male end portion of thereof. The outer vacuum tube male end portions extends through the sleeve end portions of armature #206 and into the female end portions of the section of the vacuum tube #211 that extends across on the lower portion of the cleanup and recovery equipment and that's tied into or made as an integral portion the telescopic tube housings #4-A (Not shown) each end portion of these vacuum tubes #205, in this example of embodiment's thereof, that actually make up one half of rotatable coupling portions on each end of #211. The very end of the outer vacuum tubes #211 possess a raised collet portion thereof #214 that extends through the open circular end portion of the armatures #206 and into the female portions of vacuum tube #211. that possess at least one inner grove with an O-rings or cup seals #210 therein, in this example of embodiment's thereof.

This embodiment's of these male end portions of #205 past and through the o rings or cup seals #210 and all the way in until the raised collect #214 abuts the inner milled out portion #217, of the female portion #211. #208 is a split coupling comprising of two halves that extend around the outer female end portions of #211 of which is coupled together with a split flange #207 also comprising of two halves that extend around the outer male end portions of #205 that abuts the outer fascia portion of #214, the inner portion of flange #207 mechanically fastens to an inner fascia end portions of the two piece coupling #208, in this example of embodiment's thereof.

This embodiment of the open circular end portion of the armatures #206 extends over the outer periphery of the inset split coupling until it abuts the raised collar portion thereof, with the armatures thickness ending up just shy of the outer portion of a split coupling opposite the raised collar portion thereof, so that when both halves of the split or two piece flange #207 is solidly mechanically fastened thereto the split coupling #208. with the joints of both offset one another. These rotate-able combination armature and vacuum tubes pivot-ably connect this equipment to the hull of the recovery vessel itself in the same manner, and do so in a way that the vacuum tubes and their armatures become united together in a manner, that. provides each other with strength, while also allowing both to freely pivot or rotate relative to, and independent each other. while the sections of the vacuum tube maintain a perfect seal with each other. In this example of embodiment's thereof.

FIG. 38 are drawings of frontal views of an embodiment of the floating contaminant cleanup and recovery equipment included in FIG. 34 through FIG. 39, equipped to cleanup and recover contaminants from in front of the recovery vessel. The drawings of this embodiment thereof actually shows #211 as being made as an integral portion of the telescopic tube housings #4-A. in that the valves employable for the shutting the vacuum pressure on and off; would simply be on the vessel itself, of course any of the embodiment's of the floating contaminant cleanup and recovery equipment of whats previously been referred to as the second embodiment thereof would still benefit from same if equipped in this manner. This portion of the vacuum tube #211 is also drawn as being both tied into the framework of this embodiment as well as to a reinforcement plate #215 that's either welded or mechanically fastened both to the inner fascia of the upper inside fascia portion of the two part coupling. in this example of embodiment's thereof.

FIG. 38-A. shows an embodiment of the hydraulic cylinders #134, and the end of the rams thereof #129 bolted to a bar brush #131, raised all of the way up Notice unlike other equipment embodiment's included in this application. These cylinders and rams are mounted upside down, in a manner that when the hydraulic rams are extended the bar brush is pushed downward to sweep all debris off of the forward screen portion thereof. in this example of embodiment's thereof.

FIG. 38-B shows an example of an embodiment of these rams and bar brush extended all the way down as if same just finished sweeping, Sargasso weed turtle grass or other floating debris from the front screen #130 where it would simply be carried away by means of under currents beneath the recovery equipment itself, in the same manner as many other embodiment's, included in this application. This simple modification of These hydraulic cylinders and rams being mounted upside down on raised portions of the framework #212, simply keeps these cylinders out or the water so as not to experience any possible problems associated with excessive corrosion or growth inside cylinders or on the rams themselves or other possible issues from operating under water. in this example of embodiment's thereof.

FIG. 38 is an overhead view of the floating contaminant cleanup and recovery equipment portion of this embodiment equipped to cleanup and recover floating oil from in front of the recovery vessel. Notice that all embodiment's of the floating contaminant cleanup and recovery equipment included in this application, employ almost of the same basic components, and all operate, and are employed in the same basic manner as each other, save the actual modes that the two different types of floats and intake port tubes #2-A and 3-A and #2-B and 3-B actually remove floating contaminants from the surface of the water, and its easy to see that either mode of recovery as well as either type of recovery equipment could, and probably would be employed in various combinations on either the front, sides or stern of the floating contaminant cleanup and recovery vessel. in this example of embodiment's thereof.

For instance this variation of the floating contaminant cleanup and recovery equipment mounted on the front of the oil, or other type of floating contaminant cleanup and recovery vessel could easily be mounted on the stern of the vessel with the combination rotatable arms and tubes #205 and #206 not shown but viewable in FIGS. 35,36 and 39 thereof rotated forward and coupled to a lower portion of the hull of the recovery vessel just forward of the transom. For instance another alternative would be to mount this same portion of the of the oil, or other type of floating contaminant cleanup and recovery equipment on the sides of the recovery vessel, by means of the employment of the same armatures and vacuum or drain tube employed by the fourth embodiment thereof of with the only modification having to be done to this equipment being that of the reconfiguration of the lower lateral portion of the vacuum or drain tube #211 to match that of the lineal drain or vacuum tube of the fourth embodiment thereof.

FIG. 39 is a drawing of an embodiment of a contaminant cleanup and recovery vessel equipped for the employment of the type of contaminant cleanup and recovery equipment previously referred to as the second embodiment thereof that removes the floating contaminants from the surface of the water and transports same into the hull of the vessel by means of vacuum or low pressure This drawing is drawn as if the hull of the vessel was transparent so the inner workings therein could be easily viewed.

The basic equipment differences comprising this embodiment of the inner workings of the basic composition of components enabling all functions needful for the equipping of the main contaminant cleanup and recovery vessels, to be employed with the vacuum type of contaminant cleanup and recovery equipment, other than plumbing modifications, would be in the installment of a large low pressure vacuum fan and motor, along with all of the ducting and valves directing the low pressure provided by the vacuum fan and motor, that provides the vacuum or low pressure that actually pickups up and transports the recovered oil, or other type of contaminants recovered to, one of two places. The first of these optional destinations being to the contaminant and water separation tank, with same once separated then pumped into the storage tanks for same as seen in FIGS. 21-B through FIG. 23 along with all of the pumps, valves and other equipment provided to accomplish same, which is not included in this drawing. This drawing simply shows the intake vacuum line #171 from the starboard side of the vessel, that's plumbed into the various combination storage and separation tanks in which the contaminants are pulled into by means of the vacuum pressure in the tanks, which pulls the contaminants into the storage tanks, along with a small percentage of water, that's initially vacuumed up into the vacuum intake port tubes #2-B not shown where this oil, or other type of floating contaminants and a small percentage of water becomes air born and is pulled through the pivot able tubes as well as the rest of vacuum pipe or pipes #171 as its being carried to the combination contaminant separation and storage tanks #164-B which their-selves have been basically made as very large vacuum tanks by means of a very large and low pressure vacuum fan and motor, The valves in the intake ducting are selectively opened into the various tanks to create the vacuum therein additional, either, electric or hydraulic valves setup to be remotely opened and closed, by means of controls either on the bridge the vessel or, in the control room for same, or other and of which could be located either inside, or outside of the vessel in the intake tube conduits #171 running between the intake tube portions of the recovery equipment and the tanks inside the vessel that intern accomplish this task. The large vacuum itself is drawn as being housed inside of the lower portion of the superstructure of the vessel, with the large vent on the side of the vacuum room This large vacuum fan and motor would selectively pull a vacuum into the oil, or other contaminant storage tanks #164-B That operate much in the same manner as the tank portion of a very large wet and dry shop vacuum. The separated water would be pumped through lines #190 into the valve, pump and control room, if employed. (Not shown) The ambient vacuum pressure at all intakes would be maintained at the vacuum pressure of maximum efficiency and further maintained if needed by means of the vacuum pressure regulating valves #138 in the intake port tubes, located in the very top portion of each intake tube which if employed would simply insure vacuum at each intake port tubes maintaining uniform vacuum pressure and air mixture at levels of maximum efficiency during the recovery process. The ambient vacuum pressure in the tanks themselves and moisture content realized and regulated if employed by means of common and widely available sensors and gauges, as well as adjustable by means of controls for the regulating of same located either in the control room, or on the bridge of the vessel. and by which both levels of efficiency in the vacuum pressure would be easily maintained at the vacuum pressures most efficient and easily maintainable in very small variables thereof simply due to ability to equalize through the additional vacuum intake port tubes, as well as the size and volume of the recovery tanks themselves always providing almost limitless intake volume at the same vacuum pressure litterly making same impossible to experience an instant surge in vacuum pressure, of any kind, Maintaining the ambient vacuum pressure inside the tanks is also very easily regulated in a less efficient but extremely easy manner, simply by means of a means of vacuum pressure relief valves of the same basic type as valve #138 but simply larger versions of same in the tanks themselves. Then simply to conserve energy more than anything the fan speed of the vacuum fan, or vacuum turbine simply regulated by a rheostat if powered electrically or throttle controls if diesel powered, so in other words this system could be put together as a partially, or even a fully automated system very easily. in this example of embodiment's thereof.

FIG. 40 is an overhead view of an embodiment of a floating contaminant cleanup and recovery vessel of the fifth embodiment thereof with more of a catamaran type hull configuration. This vessel employs, or is employable with, all of the same systems and the same basic type of contaminant cleanup and recovery equipment, that actually removes the contaminants from the surface of the water, as employed or employable in all other embodiment's the contaminant cleanup and recovery equipment included in this application, however there are a few differences included in this embodiment thereof wherein the main recovery vessel possess more of a catamaran hull deign.

One of these differences being in the positioning of the roller tracks or rods #37 in this which the end contaminant containment panel attaches to and rides up and down over the waves on, that are included as part of, or attached to the outboard leading edge of the #1 floats in drawings of other embodiment's thereof are located and attached to or part of the forward leading edge of the inner portion of each of the vessels hulls which is where all of the floating oil or other floating contaminants, that have been corralled channeled and concentrated by means of the contaminant containment booms and their tow boats initially inters, at which time the inside surface portion of the hulls of the main contaminant cleanup and recovery vessel and channels same back and into the recovery equipment portion of the vessel where same is removed and transferred directly into the main cleanup and recovery vessel it self, for the removal of any water inadvertently recovered during the contaminant cleanup and recovery and water separation process. Once removed the water is pumped back into the aria or water between the two hull portions of the recovery vessel where the possibility of any remaining oil or other floating contaminants inadvertently remaining therein would simply be recaptured and go through the water separation process again. the oil or other recovered floating complainants, would be stored and transported, in the same basic manner and by means of the same types of equipment as is included in the drawings and descriptions, included in this application for other embodiment's of the main contaminant cleanup and recovery vessels and equipment employed by same. in this example of embodiment's thereof.

Notice this embodiment of the actual floating containment cleanup and recovery equipment as well as the primary float portions thereof #1 of this embodiment is actually positioned and rides up and down, over the waves between the two hull portions of the main recovery vessel, instead of on armatures off of the front, stern, or the sides or the main recovery vessel. #223 is a crossmember equipped with an electric or hydraulic chain-fall or winch, simply employed to pull up and maintain the cleanup and recovery equipment up into a position of non-deployment. #222 is a walkway that extends around the upper perimeter of the contaminant containment boom storage bins #154 as well as that provides access to the debris catch basin 223 and the work station therefore, seen and described in FIGS. 46-A,B,C,D,E,F,G,H, and FIG. 46-I.

This vessel as well as all embodiment variations thereof included in this application also employs or employable with all of the same basic systems, equipment and basic operational modes of the applicants, employed on other embodiment's thereof, enabling the extremely effective and efficient removal of mass quantities, of any and all types of floating contaminates even when spread out over large arias of very adverse sea conditions. All vessel and equipment variations and modifications included in this application, including these, embodiment's thereof, also employ the same basic system of the applicants, enabling the very effective and efficient gathering, containing, channeling and concentrating, floating contaminates of any kind, in the exact same manner and mode, of which comprises a combination of three vessels, two of which being contaminant containment boom towing vessels, and the third being the main cleanup and recovery vessel of which in this embodiment thereof comprises more of a catamaran type hull configuration for the main recovery vessel, However this contaminant cleanup and recovery vessel, employs the exact same mode of the applicants of which includes, two floating oil or other floating contaminant boom towing vessels of which tow lengths of floating contaminant containment booms, extending between the towing vessels and the main cleanup and recovery vessel, and do so in the exact same manner as all other embodiment's included in this application.

This by means of the two contaminant containment boom towing vessels, maintaining the relative positioning ahead and to each side of the main cleanup and recovery vessel, and taking full advantage of the forces created by means of maintaining the forward in motion of all, along with the maneuverability of the two contaminant containment boom towing vessels corralling the floating contaminants, same can be gathered in mass quantities, whether in heavy concentrations and somewhat isolated, to that of a very thin film, spread out over large arias.

All examples of embodiment's of systems, vessels and equipment, included in this application, not only possesses the ability to gather, concentrate and remove any viscosity of oil, or other type of contaminants floating on the surface of the water, but additionally possesses the ability to gather, concentrate and remove any type of contaminants floating on the surface of the water, regardless of the types or various viscosity's thereof, and maintain their ongoing abilities to do so in a very broad range of both sea, and other conditions both existing, as well as those created during the recovery process. no other oil or other type of floating contaminant cleanup vessels or equipment, previously devised has ever come close to being capable of doing same.

FIG. 41-A. includes is a drawing of an embodiment of a type of equipment, employed for the deployment and recovery of the contaminant containment booms. This equipment is mounted on, and operated from platform #158 in this embodiment thereof. This embodiment of a type of contaminant containment boom, deployment and recovery equipment, includes a spool winch #153-A, as well as a multi-positionable boom slide #159 that's all mounted on, as well as operated from platform assembly #158. This equipment is devised and engineered for the purpose of accommodating a type of contaminant containment booms devised by the applicant and of which are also included in this application, that have also recently undergone many changes and modifications that even further enhance levels of operational efficiency attainable by them. Especially in the employment of embodiments of them, in extreme lateral currents and very heavy and adverse sea conditions. Of which are also included in descriptions and drawings included in FIGS. 10-A. through FIG. 10-V. These contaminant containment booms included in same possess much greater levels of operational efficiency in a broad range and theaters of employment along with the ability to remain operational in lateral currents many times that of any other types of oil or other contaminant containment booms known of the applicant, and of which were created for the deployment on all floating contaminant clean-up and recovery vessels of the applicant, both in this application as well others submitted by him and of which were created to provide same with even greater levels of operational efficiency when employed in conjunction with all contaminant clean-up and recovery equipment of the applicant's.

This drawing includes an embodiment of the contaminant containment boom deployment and recovery equipment that have suffered the several modifications to same to better accommodate the recent modifications suffered by the aforementioned contaminant containment booms also included in this application. One main and obvious modification suffered by this contaminant containment boom deployment, recovery, and re stowing equipment includes confrontational differences in the spool portion of the spool winch, #153-A. This spool winch is angularly adjustable by means of the rotation of the base portion of same, #216-A. This spool portion #153-B of the contaminant containment boom spool winch #153-A includes an inset portion #153-D extending around the entire outer circumference of same. Stationed inside this inset portion of the spool portion of this spool winch includes a plurality of partitions #153-C. These partitions include cut sections in same that extend from center lowest portions of the inner circumference of the spool itself and extend outward through the entire span of each partition. These partitions are stationed between the inner and outer portions of the inner circumference of the spool, and at a distance apart from each other to accommodate the rigid float and rigid panel portions of the contaminant containment booms between each. These partitions are also configured in a manner in which each guide and channel the much shorter flexible curtain portions as well as the chain or cable portions of the contaminant containment booms into the cut out center portions of these partitions, as same abuts and pulls the next rigid float and rigid panel section of the contaminant containment boom into the next inset portion of the spool between the partitions in a manner in which the spool portion of the spool winch, in a way operates a large female sprocket, with the partition portions thereof being the teeth for same and the rigid float and rigid panel portions of the contaminant containment booms, in a way acting much like links in the chain for same and thus insuring a firm and un-slip-able grasp of same at all times during the employment of same. During the deploying, recovering and re-storing of this embodiment of the contaminant containment booms into the contaminant containment boom storage bins (not included in this drawing).

Positioned at the lower inner base portion #216-A of the spool winch #153-A portion of this embodiment of this equipment includes a hydraulically extendable and multi-position-able boom slide #159, The controls for same #184 in this embodiment thereof shows same as including a plurality of two way hydraulic valves and control levers provided as controls for the various hydraulic rams and power takeoffs employed in and by same, similar to the controls employed on a four lever backhoe. Other components and the engineering of these particular embodiments of same, are included and described in detail and easily understood by means of the drawings and their descriptions included in FIGS. 41-B through FIG. 41-G.

FIG. 41-B is another overhead view of an embodiment of the contaminant containment boom spool winch #153-A as well as the operating platform for same #158. A crew member would stand on this platform to operate the electric or hydraulic contaminant containment boom winch #153-A as well as all functions needful for the operation of boom slide. Both for the purpose of deployment, as well as for the purpose of pulling the contaminant containment booms back onto the vessel and storing them back into the contaminant containment boom storage bins, by means of the controls, therefore #184, in this embodiment thereof.

This drawing shows the actual boom-slide-#159 portion thereof removed so the portion of the angularly position-able mounting platform #216-A for the contaminant containment boom winch #153-A. The boom-slide mounts to and pivots on #216-B. The hydraulic ram #185-A enables the lateral positioning of the contaminant containment boom slide in this example of an embodiment thereof.

FIGS. 41-C and FIG. 41-D are drawings of embodiments of the components comprising of an electric or hydraulic angularly adjustable mounting base #216-A for the electric or hydraulic contaminant containment boom spool winch and boom-slide. #216-B is the mounting base that the boom-slide mounts to and pivots on, also viewable in FIG. 9-C. #215-A is the mounting platform therefor, or alternately, simply a portion of the operating platform. #158. #216-E is the ball portion of a ball joint that the hydraulic cylinder side of the hydraulic ram #185-A it attaches to and pivots on, located on an outermost extended portion of mounting base #216-A. #215-B is a drawing of a crown gear. This crown gear, of which in this embodiment thereof attaches to and rotates on a post portion with a threaded end located on the center of platform #215-A, and is maintained thereon, by means of the nut and cotter, or press pin and of which is mechanically rotatable by means of its drive motor and the pinion gear portion of #215-D that is solidly mounted to a portion of the mounting base #215-A. viewable in FIG. 41-D. The crown gear #215-B possesses a plurality of threaded holes in the upper side portion thereof to accommodate mechanical fasteners that would extend through the contaminant containment boom winch mounting base #216-A and of which would be threaded into and mechanically fastened to the upper side portion of crown gear #215-B enabling same to be angularly adjustable by a crew member by means of controls for same #184 viewable in FIGS. 9-A and FIG. 41-B. FIG. 41-E includes an armature portions of the spool winch mounting base #216-A that the contaminant containment boom spool winch mounts to and rotates on, in these embodiments thereof.

The ball joint portion of the hydraulic ram #185-A attaches to and pivots on the ball #185-D mounted on a bottom portion of the contaminant containment boom slide, in this embodiment thereof, which is viewable in FIG. 41-F.

FIG. 41-E. is a profile view of an embodiment of a contaminant containment boom spool winch #153-A, along with the armature portions #216-A of the mounting base #216A for same. The floating contaminant containment booms are pulled over the spool portion of the contaminant containment boom winch #153-A, by means of its electric or hydraulic drive motor, #161. This drive motor possesses a pinion gear, that would be engage-able, to a crown gear, that is mechanically fastened to a side of the spool portion of the contaminant containment boom winch (not shown) by means of a solenoid; engaging a Bendix equipped with a pinion gear, that in turn would engage a crown gear, located under drive motor and gear cover #162, in this embodiment thereof, the internal content of which easily understood (not shown.) The crown gear would be mechanically fastened to the spool portion, of the spool winch #153-A which in turn, when activated, would turn the spool portion 153-B of the spool winch. The drive motor #161 would be a reversible motor and of which would be taken in and out of service as well as lockable in place, by means of said controls #184 and in turn would be employable both for the enabling of a very controlled deployment of the contaminant containment booms when feeding same out to the contaminant containment boom tow boats, as well as for the pulling out and the re-storing of same into their storage bins when taking same out of service when the job is completed, in this embodiment thereof.

FIG. 41-F is an overhead view of an embodiment of the bottom side, of the contaminant containment boom slide #159. This drawing of an embodiment of the boom slide as well as the contaminant containment boom winch included in FIGS. 41-A and FIG. 41-B, include hydraulic rams #185-A, #185-B, #185-C and #185-D enabling many of the functions providable by boom-slide #159, in this embodiment thereof.

This drawing shows an example of an embodiment of the boom-slides as possessing three extendable sections, but it is understood that the actual number of which as well as the actual lengths of same could and would be made as most effective to the vessels of their employment. Each section thereof, slide-ably interlocks with each other and with configurations of each simply being slightly larger than the previous section thereof, but with the interlocking portions thereof configured as identical to each other, in turn enabling each section both to be housed as well as to freely slide inside the next slightly larger section thereof. The only exception being in the flared configuration of the very outer end portion of the last section thereof.

Each ball portion of the ball joint portions of hydraulic rams #185-C and 185-D in this embodiment thereof, are mechanically fastened or welded to a reinforced bottom side of a portion of its next interlocking section of boom-slide #159 with the total length retractable and extendable, enabling the boom-slide to be shortened of lengthened to lengths most advantageous as well as to maintain an end portion of each encased in its next larger section thereof when fully extended. These hydraulic rams #185-C and 185-D. as well as the number and lengths of same enable the overall extendable and retractable length of the contaminant containment boom slides to be produced at basically any length needful in this example of embodiments thereof.

The hydraulic ram #185-A included in the drawing of FIG. 41-A. and FIG. 41-B. enables the lateral positioning of the contaminant containment boom slide #159 by means of a first ball joint #216-E on the first end portion of hydraulic cylinder #185-A being attached to an extended portion of mounting base #216-A and the second ball joint portion of the hydraulic ram #185-A attached to and pivotable on the ball portion of the ball joint #185-D mounted on a bottom portion of the contaminant containment boom slide #159.

The vertical adjustability of same is enabled by means of hydraulic ram #185-B of which the first ball joint end portion of hydraulic ram 185-B attaches to and pivots on the ball #185-E mounted on a bottom portion of the contaminant containment boom slide #159. The other ball portion of this ball joint is mounted to a bracket for same under platform #158 and thus not viewable. All of these hydraulic rams are also controlled by means of controls #184 viewable in FIG. 41-A and FIG. 41-B by a crew member, in this example of an embodiment thereof.

FIG. 41-G is an overhead view of an embodiment of the top of a boom-slide #159. This drawing shows how the raised outer fiddle portion of each section of boom-slide #159 extended all of the way around the raised outer fiddle portion of its previous slightly smaller fiddle portion thereof and ends just a short distance from the top outer inside surface portion of its previous slightly smaller section of contaminant containment boom that its slide-ably connected to, and in turn leveling all both rigidly connected to each other as well as easily slide-able within each other, in this embodiment thereof.

This enables one crew member with the ability, both to quickly and easily deploy as well as to retrieve and equally distribute all of the contaminant containment booms back into all of the various portions and areas of the contaminant containment boom storage bin, with a high level of speed and ease.

All embodiments of the vessels, equipment and systems are also devised and engineered in a manner in which the contaminant containment booms can remain connected and ready for deployment both to the main containment clean-up and recovery vessel as well as to the containment boom towing vessels with all being deploy-able as well as taken out of service with all properly stored on the main recovery vessel ready to re-deploy same when time is critical, at a moments notice and at an extreme level of speed and efficiency. in this embodiment thereof.

Figure 42:
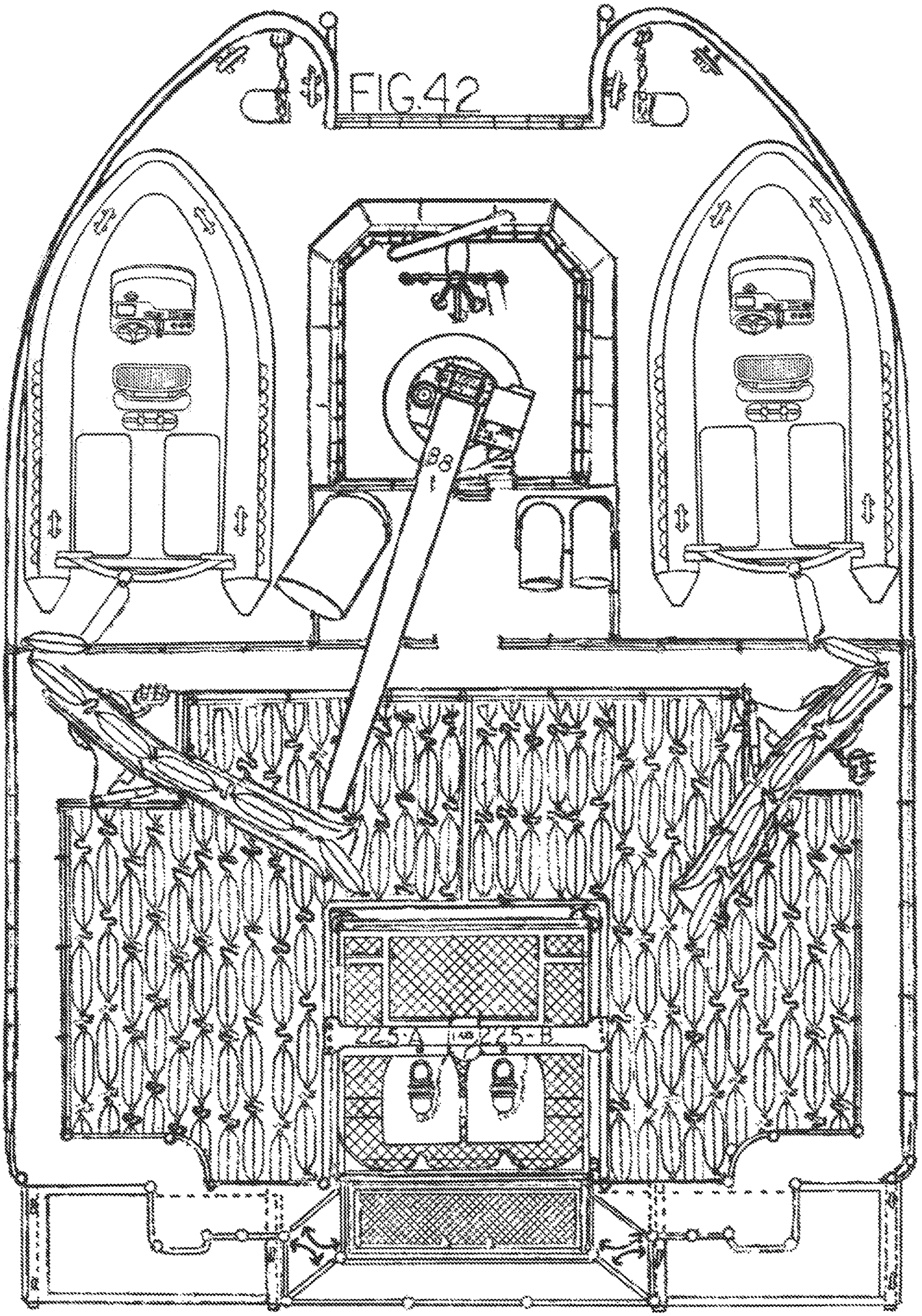
FIG. 42 illustrates an overhead view of an alternative embodiment of a floating contaminant cleanup and recovery vessel with a catamaran type hull configuration where the cleanup and recovery equipment is hydraulically or electrically adjustable.

FIG. 42. Is an overhead view of an embodiment of a floating contaminant cleanup and recovery vessel that also possesses a catamaran type hull configuration much like the vessel included in FIG. 40 and of which also employs much of the same basic type of contaminant cleanup and recovery equipment, that actually removes the contaminants from the surface of the water, as is included in all other embodiment's of a cleanup and recovery vessels included in this application, save only one exception. This exception being the absence of the primary float's #1, in that the contaminant cleanup and recovery equipment, in this drawing is solely employing the hulls of the a floating contaminant cleanup and recovery vessel itself, for the provision of the flotation for same, with the positioning of the actual contaminant cleanup and recovery equipment, to the right height relative to the surface of the water as the main cleanup and recovery vessel is being filled and the waterline thereof rises as a result thereof, this is accomplished by means of periodic height adjustments made to the contaminant cleanup and recovery equipment, by means of a hydraulic or electric winch #225-B mounted to the center of a bottom portion of the crossmember #225-A that extends across the top of the open trunk portion of the vessel. in this example of embodiment's thereof.

As a result of employing the contaminant cleanup and recovery without the main #1 floats, the only portion of the equipment that rides over the waves during the contaminant cleanup and recovery process would be the #2-A or #2-B float's and the intake portions thereof.

However even though this method or type of contaminant cleanup and recovery equipment that's solely equipped with the #2-A or #2-B float's and the intake portions thereof, when installed in the more catamaran type hulled contaminant cleanup and recovery vessels, would remain functional and even close to equally efficient, Its doubtless that any of the contaminant cleanup and recovery vessels or equipment would be equipped, without the main or #1 floats in combination with the #2-A or #2-B float's in the manner that all other embodiment's of the contaminant cleanup and recovery equipment included in this application are employed with. This simply in that the absence of which would not only require constant monitoring and adjustments as well as an extra crew member dedicated to the task thereof. the absence of the main or #1 float's, would also restrict the seas and the height of the waves that the contaminant cleanup and recovery equipment would be efficiently employable in. when equipped in this manner. simply due to the lessened effect that wave action would have on the main contaminant cleanup and recovery vessel it self in this example of embodiment's thereof.

The end portions of this example of an embodiment of the crossmember #225-A that extends across the top of the open shaft portion of all of the catamaran type of contaminant cleanup and recovery vessels included in this application. is mechanically fastened into upper edge portions of the two contaminant containment boom storage bins #154, and as a result thereof same are also removable, simply by means of removing same after hooking onto a pad eye located on a top center portion of the contaminant cleanup and recovery equipment, with the hook on the end of the cable portion of the main hydraulic winch #88 and then by means of closing all intake valves and unbolting either the upper or lower flange portion of the main exit tube, (not shown) of the contaminant cleanup and recovery equipment, same can be removed for maintenance or repairs dock side or other if ever needed. even though the entire top portion of the contaminant cleanup and recovery equipment, is open framed, and not covered by a screen or other, like all other sides thereof, and thereby creating easy access from the top portion thereof for maintenance purposes of all components housed therein. in this example of embodiment's thereof.

FIGS. 43-A. through FIG. 43-D. include drawings of embodiments of a new type of floating contaminant cleanup and recovery equipment that possess provides towing vessels in which this equipment is employed, with the ability to maintain extreme levels of maneuverability when towing floating contaminant containment booms as well as the ability to do so with extreme levels of operational efficiency, regardless of the load angle of the contaminant booms being towed relative to heading of the vessel towing them. This is accomplished, primarily by means of the pivotable armature #117-A. and the mode in which same not only maintains the perfect linear alignment of the load, all of the way forward to the pivoting axle #117-B. portion of same. Of which is not only well forward of the towing vessels props and rudders, but is also stationed fairly close to the center portion of the towing vessel. Of which not only provides the towing vessel with extreme levels of maneuverability regardless of the forces the load relative to the on heading of the vessel. But also due to the mode in which both ends of both the upper and lower pivotable armature s #117-A. are tied together by means of the axle at its pivot point and the trolley track assembly. #117-D. as seen in the profile view of same included in FIG. 143-C. of which not only maintains the contaminant booms floating at the perfect level and angle on the surface of the water at all times, as well as the forces of the load on same when towing the contaminant containment booms primarily at and slightly below the waterline of the vessel, but also equally distributed on the entire span of the trolley track assembly. #117-D. as well as equal loads both the top and bottom of the vessel, also provides and maintains tremendous amounts of additional stability to the towing vessel at all points of tack, but especially when towing the containment booms, at angles more off to the side of the vessel. when the ability to maintain lateral stability is most needed.

FIG. 43-A. Includes a drawing of an overhead view of an embodiment of a smaller contaminant containment boom towing vessel, Of which a stern view of same is also provided of same in FIG. 43-B. This vessel is configured in every way, for the provision of an advanced level of service, both in that, needful when maneuvering around other vessels and docks when cleaning up and removing contaminants such as blue green algae, oil or other contaminants floating on the surface of the water around marinas and up inland waterways, as well as when cleaning up spills out at sea, all equipment employed on them, and by them, was created by the applicant, for sames provision of a much higher level of service and operational efficiency as well as that of maneuverability in a broad range of sea depths and conditions when towing the new types of contaminant containment booms, included in this application. the floating contaminant cleanup and recovery vessels included in the drawings of FIGS. 43-C. and FIG. 43-D. are basically just larger versions of embodiments thereof with a deeper draft as well as a cabin for the operator thereof to operate same from a helm that is out of the weather. and to be employed in conjunction with larger floating contaminant cleanup and recovery vessels and primary well off shore.

FIG. 43-A. Includes an overhead view of an embodiment of a contaminant containment boom towing vessel with a pivotable armature #117-A and trolley track assembly. #117-D. That includes, both a top armature and a bottom armature extending laterally from both the top as well as the bottom of the towing vessel with one end portion of each welded to each end portion of a vertical section of trolley track #117-D and the opposite end portion of each including an opening for an axle #117-B. With the ability to pass through a shaft log #117-C. and be connected to the lower armature portion of the pivotable armature and trolley track assembly. #117-A. The axle is housed in a shaft log 117-C. in this embodiment thereof. This shaft log extends vertically through the hull of the towing vessel and is solidly either welded or fiber-glassed into both the deck and keel portions of the towing vessel where same extends through same. Thus allowing the entire pivotable trolley track assembly. #117-A. Both with the ability to freely pivot while maintaining all portions of the containment boom sections with solid vertical stability, as well as the end portion of same floating right at the aft portion of the towing vessel, as well as with extreme levels of lateral stability and maneuverability of the towing vessel when in service. In this embodiment thereof.

FIG. 43-B. Includes an aft view of the same embodiment of a contaminant containment boom towing vessel with a pivotable trolley track assembly. #117-A. As is included in FIG. 43-A. Notice this contaminant containment boom towing vessel, unlike many others, is more that of a twin engine, hard bottom inflatable which is included both in this drawing as well as the drawing included in FIG. 43-A. Simply as an example of a type of towing vessel option. Firstly in that similar hard bottom inflatables are now being made by a number of companies, and in similar, as well as numerous, other configurations as well as in sizes ranging between 12 to well over 40 feet in length.

The tube portions of the vessels also not only possess a far greater level of stability and but same also possess many additional advantages over other vessels as well, including, but certainly not limited to the tube portions thereof, acting much like boat fenders and chafe guards, so as to neither damage themselves, other vessels, or anything else, when maneuvering around tight places such as boat docks and in marinas or even when tied up to the contaminant clean-up and recovery vessel employing same.

This drawing also shows this example of a contaminant containment boom towing vessel possessing a very broad beam, as well as a tunnel hull, protecting the props of same as well as the vessels props spaced far apart from each other, giving the vessel an even greater level of maneuverability. This view of the stern portion of the containment boom towing vessel also provides a clear view of the aft track portion of this example of a pivotable trolley track assembly. #1. This equipment was devised by the applicant in this basic manner for several reasons. Including the provisional ability of the first contaminant containment boom panel with the ability to remain floating on the surface of the water right behind the transom of the contaminant containment boom towing vessel and maintaining the capture of contaminants all of the way from the bow of the contaminant containment boom towing vessel to the floating contaminants point or removal from the surface of the water, by the floating contaminant clean-up and recovery equipment.

This equipment was also created and configured in the manner to accomplish same while maintaining total maneuverability of the towing vessels while doing so, which this equipment accomplishes by means of maintaining the angle of the force created by the contaminant containment booms being towed, well forward of the propellers of the contaminant containment boom towing vessel towing same. This drawing of an embodiment of the contaminant containment boom towing vessel and towing equipment provides a view of this embodiment of both the upper and lower armatures as well as the open track portion of this embodiment of a vertical trolley track portion #4 of pivotable trolley track assembly. #1. of which the track trolley portions of an embodiment of the contaminant containment boom panels attaches to and ride in providing same with the additional ability to vertically ride up and down a short distance over waves, this as well as freely pivot from side to side of the towing vessel relative to the towing load thereon.

However although perhaps beneficial. The actual trolley track portion, of this pivotable trolley track assembly. #117-A. could simply be replaced with a vertical armature with padeyes welded at the connection points of the cables and or chain portions of the floating contaminant containment booms. and thus rely on the relative buoyancy and waterline of the contaminant containment boom towing vessels themselves provision of a slightly less efficient provision of same.

The opposite end portion of the contaminant containment booms when employed on a catamaran or other type of floating contaminant cleanup and recovery vessel itself, would include an embodiment of the track trolley rollers or slides of one sort or another. This as well as well as trolley tracks located primarily on the inner bow stem portions of same.

However although also less efficient the opposite end portions of the contaminant containment booms could also be simply attached to padeyes welded at the connection points of the cables and or chain portions of the floating contaminant containment booms, on the inner leading edges of the main float portions of the floating contaminant cleanup and recovery equipment itself employed on many embodiments of the floating contaminant cleanup and recovery vessels, and thus rely on the relative buoyancy and waterlines slightly less efficient provision of the main float portions of same as well. Although all drawings and descriptions of embodiments thereof always included provisions for same to freely travel independently at the attachment points of same included in embodiments thereof in this application.

FIG. 43-C. Simply includes a drawing of view of another embodiment of a bit larger contaminant containment boom towing vessel with a pivotable trolley track assembly. #117-A. As is included in FIG. 43-A. and FIG. 43-B. This contaminant containment boom towing vessel is also of a twin engine design, but this drawing was simply added to provide a profile, as well as a much better view of a towing vessel equipped with an embodiment of the pivotable trolley track assembly. #117-A. in this example of an embodiment thereof.

FIG. 43-D. Simply Includes a drawing of an overhead view of the same larger embodiment of a contaminant containment boom towing vessel equipped with a pivotable trolley track assembly. #117-A. As is included in FIG. 43-C.

FIG. 43-E through FIG. 43-V. include descriptions and drawings of several embodiments of a new type of contaminant containment booms of which were also devised and engineered by the applicant to overcome many of the inherent problems suffered by all other contaminant containment booms known or findable by the applicant.

Problems associated with all other types of contaminant booms findable by the applicant being that all others couldn't be employed in lateral currents of more than a couple knots without failing and spilling their contents. This doubtless being due to the previous lack of need, in that no other type of floating contaminant clean-up and recovery equipment known of the applicant could be employed in the same manner or conditions as those included in this application, without failing. The development of this new type of containment booms by the applicant took place at the same time and in conjunction with the greatest portion of the numerous rough but operational prototypes of floating contaminant clean-up and recovery equipment, developed by him, and of which were primarily devised and developed for the employment of same in conjunction with the vessels, systems and equipment of the applicant's, to even further advance and enhance the level of operational efficiency attainable by all of the applicant's containment clean-up and recovery vessels, equipment, and systems.

The development of this new type of floating contaminant containment booms, along with the applicants ongoing drive, to devise and refine the develop all included in this application with the ability to remain vertically stable and operationally and efficient employable while maintaining forward speeds in lateral currents many times that of any other type of contaminant containment booms known of the applicant and thus attainable recovery rates many times greater than anything previously devised.

The applicant's witnessing of these things during the deployment stages of same also resulting in the applicant's development of the system employed by all. That includes contaminant containment boom towing vessels, towing same from angular positions forward and various degrees and speeds off to the sides of the main clean-up and recovery vessel in a manner devised by the applicant for floating contaminant clean-up and recovery equipment of the applicant's to be employed, that enabled the gathering and concentrating floating contaminants back to the recovery equipment in mass volumes.

Embodiments of these contaminant containment booms are devised and engineered in a manner that tests show same remaining perfectly stable regardless of the lateral currents they were being employed in. Same also suffer very little effect in their abilities to do so even in very rough and adverse simulated sea conditions and of which possessed the ability to radically out-perform all others known of the applicant many times over, due to a combination of many unique features and attributes possessed by them. Included in the following drawings and descriptions, which include several embodiments of new types of contaminant containment booms that are quite different in basically every way than any others known of the applicant.

This holds true not only of the basic configuration and mechanical composition of components comprising same, but also for the mode in which same are employed. The structural composition of the panel portions of all embodiments of the contaminant containment booms includes in this application are ridged and non flexible, This also holding true for most embodiments of the float portions of embodiments thereof included in this application as well as the overall configurations of same which are quite different to all others known by the applicant as well. Of which even additionally contributes to the profound levels of vertical stability and operational dynamics possessed by all. However the profound levels of stability and operational efficiency possessed by embodiments of them. is attained, not only by means of the unique composition and configurations of components comprising the containment booms and the composition of components and combinations of equipment devised to work in conjunction with and enable same to effectively perform all tasks needfully performed as well as to maintain their ability to do so in all conditions and recovery scenarios encounterable. But also by means of the systems and modes in which all were devised to work together and be employed. Of which is described in detail and will be easily understood, by means of the drawings and descriptions that follow.

FIG. 43-E. Includes drawings comprising both a blown up, as well as a partially reassembled view of an embodiment of one of the variations of the towable containment booms that like all others included in this application include ridged lower panel or curtain portions. However unlike all other floating contaminant containment booms included in this application. These examples of an embodiment thereof like all other floating contaminant containment booms known of the applicant also simply include foam flotation #117-F. Covered with a flexible waterproof material #117-E. This embodiment thereof also includes an upper cable #117-K. This as well as a lower chain portion thereof #117-J that extends the entire length of the floating contaminant containment booms between the floating contaminant boom towing vessels and the floating contaminant cleanup and recovery vessel or the floating contaminant cleanup and recovery equipment employed on same, where both ends thereof are attached to, or are attached to and vertically ride up and down on, the trolley tracks thereon.

This drawing thereof includes the two mostly assembled sections of the contaminant containment boom as if the linear center portion of the upper flexible waterproof material cover portion thereof #117-E, draped over and sown around the upper cable portion #117-K, of same. This drawing also includes both lower portions of cover #117-E. Sown together up just a small distance from the center portions thereof and across the length of same. Thus leaving the lowest UN-sown portions thereof opened back up and the upper edge portions of the ridged panel or curtain portions thereof both mechanically fastened and laminated to same.

The next step needfully accomplished during the assemblage process of this embodiment thereof includes the insertion of the foam flotation portions of same into and between the two upper outer cover portions of same and centered over each ridged panel portion of same and sown at the end portions thereof encapsulating same therein. The next step needfully accomplished during the assemblage process of this embodiment thereof being the covering the lower small sections of chain #117-I tying all lower ridged panel or curtain portions of same together, as well as the lower portions of same between the ridged panel portions thereof and sown to the lower end portions of the upper cover portions of same, as well as both mechanically fastened to and laminated to the end portions of each ridged panel portions of the contaminant containment booms. In this embodiment thereof. The lower chain and armature portions of this embodiment of the floating contaminant booms are of the same basic configuration and of which would be operable as well as employed in the same basic manner as those included in FIGS. 43-M. through FIG. 43-Q and are described in detail in the descriptions of the drawings included for same. As a result thereof same was removed from this portion of the application simply to avoid redundancy in the descriptions for same.

FIG. 43-F. includes a drawing of a fully assembled section of the same embodiment of the type of contaminant containment boom included in FIG. 43-E. As if this small section thereof was being employed. This drawing includes this section of same extending between the trolley track portion of the pivotable armature and trolley track assembly. #117-A on the aft portion of a contaminant boom towing vessel, and a trolley track that would either be located on an inner leading edge of one of the hulls of a catamaran type of floating contaminant cleanup and recovery vessels, or on the on the leading edge of one of the main float portions of the floating contaminant cleanup and recovery equipment employed on same.

FIGS. 43-G. through FIG. 43-R. includes embodiments of this new type of contaminant containment booms that although possessing obvious differences to those included in FIGS. 43-E and FIG. 43-F. same would be employed in the same manner and would be employable in conjunction with the same secondary equipment, and attain the profound levels of operational efficiency possessed by all included in this application in the greatest portion of the same basic modes and although one may prove to possess slightly higher attainable levels of efficiency or desirable differences in the operational dynamics, possessed by one over the other. However the largest advantage one may prove to possess over the other may be that of production or maintenance cost, or that of durability more than anything else.

The greatest differences included in the composition of components included in the following embodiments thereof, include not only the contaminant panel or curtain portions of same being rigid, but rather the entire float, as well as the upper and lower panel portions of same would be made of a rigid material with embodiments thereof likely manufactured as single sections and of which could be constructed of any one of several types of ridged materials. However the most logical choice of materials employed for the production of same would doubtless prove to be one of several types of plastic or reinforced plastic. The differences in the various types of plastics and reinforced plastics, range greatly in that of strength, rigidity, resiliency, durability. same also possess modes employable for the manufacturing of same that renders the production of same very inexpensively and easily manufactured as complete units and in large quantities, by means of several optional manufacturing modes, that enable both the float and rigid panel portions of these contaminant containment booms be very inexpensively mass produced as single units that would not only lend themselves quite well to all tasks required of them, but the composition of same would also be impervious both to corrosion and chemical exposure as well as to the mode and harsh environment in which these embodiments thereof would be employed. in these examples of embodiments thereof.

FIG. 43-G. and FIG. 43-H. include drawings of a profile view of an embodiment of a smaller flexible connecting panel #107-M. These small flexible connecting panels are included as an employable mode both to effectively connect the rigid combination float and panel sections of the following embodiments of the contaminant booms sections included in FIGS. 43-K. Through FIG. 43-R. together but also to provide same with the ability freely turn and traverse waves as needed. in this examples of an embodiment thereof.

FIG. 43-G. includes a drawing of a profile view of two male joint portions #107-J of same, separated apart from each other, but with both top and bottom portions of each connected together, by means of two short lengths of chain #107-R and by means of split links, or shackles, on each end thereof and with same passing both through the last link portion of each, as well as through openings, both top and bottom, on the inboard side of each of the two male joint portions of this embodiment, of one of the smaller flexible connecting panels #107-M, of which by means of inserting each male end portion of same into the female end portions of two rigid float and rigid panel portions of the contaminant containment boom. This female joint best seen in the end view of same in FIG. 43-H, or the overhead views of one of these joints included in FIGS. 42-I of which the view of the drawing of same on the right side shows same mechanically fastened or pinning in place as seen in The male and female portion of this joint becomes solidly locked inside of the male portion of this joint and thus both are solidly locked together, in this embodiment thereof.

Of course, these short lengths of chain and split links or shackles could have been replaced by means of short lengths of stainless-steel cable with swedged thimbles and eyes in each end of same, or other could have been employed to serve this same purpose. However, chain was included in these drawings thereof simply due to the flexibility and versatility of same in this embodiment thereof.

The male joint portions #107-J of these short flexible panels could also easily be manufactured out of cut sections of an extruded anodized aluminum alloy or other as well. These male and female joint portions employed in this embodiment of these contaminant containment booms were simply added to provide a fast, easy way to change the lengths of same. However, another example of an embodiment thereof is also included in FIG. 43-S. and FIG. 43-T. that simply includes the elimination of these joints all together.

FIG. 43-H. simply shows the composition and components of an embodiment of the smaller flexible connecting panel #107-M of FIG. 43-F, with this embodiment thereof fully assembled in an optional manner in which this panel could be manufactured to provide same with all properties needful to its role of employment. This drawing includes a cover made of a plastic impregnated material shown as if same was transparent so the two short lengths of chain could remain partly viewable. That same is wrapped around the outer periphery thereof and then sown through both sides of the plastic impregnated material up close to, and along the inner edges of the two short lengths of chain. This embodiment of this small flexible panel also includes the end portions of the plastic impregnated material extending out and around the male inboard portions of each of the male joint sections, and laminated to same with the assurance of same remaining affixed thereto provided by means of sections of stainless steel, anodized aluminum molding, or other extending over and around these inboard portions of each of the male joint sections #107-J covered with the plastic impregnated material, with same mechanically fastened through the material and into drilled and tapped holes in this embodiment thereof.

FIG. 43-I includes a view of an end portion of an embodiment of a combination rigid upper and lower panel and float section of a contaminant containment boom. This drawing was simply added to provide a view of an optional configuration of this embodiment thereof. This inner female portion of this embodiment of same includes a void that extends the length of the end portion of the rigid float and rigid panel portions of the contaminant containment boom in this embodiment thereof, which will be described in detail along with the description provided for FIG. 43-J. and FIG. 43-K. that follows.

FIG. 43-J. and FIG. 43-K. include views of either the top or of the bottom of an embodiment of one of the end portions of one of these new types of contaminant containment boom sections of the applicant. These drawings include overhead views of the end portions of the combination rigid float and rigid panel sections, which includes the female joint portion of this connection joint #107-B as seen in FIG. 43-J. FIG. 43-K. includes both the male joint #107-J portion of the short flexible panel and the female connection joint #107-B end portion of a combination rigid float and rigid panel section of the contaminant containment boom, of which once inserted into each other, same remain locked together by means of a mechanical fastener #107-K as viewable in FIG. 43-K. This mechanical fastener inserts through a hole in the side of 107-B and through the hole in the male portion of the joint #107-J as viewable in FIGS. 43-I. and solidly threaded into a threaded portion of the other side of #107-I as viewable in FIG. 43-K. Of course, same could be easily accomplished by means of one of several types of clevis pins or other, in this example of embodiments thereof.

Notice the configuration of both the male and female portions in this example of a joint, as viewable in FIGS. 43-J. and FIG. 43-K. are engineered and configured in a manner by the applicant in which once both are coupled together same literally could not be pulled apart, no matter how much tensile force is applied to the joint, due to the manner in which the inner mitered or tapered portions of the male portion of this joint locks into the inner mitered or tapered portions of the female portion of the joint, in a manner in which not only can neither be pulled apart from the other, but the more tensile force that is applied to this joint, the tighter both the male and female portions thereof become solidly locked together, in that as pulling force is applied to inner mitered or tapered portions of the female portions of this joint, same pull in tight to the male portions of this joint #107-K, in a manner that neither could possibly be pulled out of the other without literally ripping same apart, in this example of an embodiment thereof.

FIG. 43-L. is a drawing of an overhead view of an embodiment of a combination rigid float and rigid panel portion of this example of an embodiment of this new type of contaminant containment booms, the wider outer portions of the upper and lower rigid panel portions thereof, #107-N are indicated by the solid lines, with the inner surface portion of these rigid panel portions of this embodiment thereof indicated by means of the two dotted lines, just inside of the outermost lines, extending across the outer portions of the viewable rigid panel portion of a combination rigid float and rigid panel portion of this example of an embodiment of this new type of contaminant containment booms.

FIG. 43-M. is a drawing of profile view of an embodiment of a combination rigid float and rigid panel portion of this new type of contaminant containment booms. The thicker outer portions of the upper and lower rigid panel portions thereof, #107-N are indicated by the lines, just inside of the outermost lines, extending across the top and bottom portions thereof, and of which indicate portions of these rigid upper and lower panels that extend outward creating a berm #107-N extending down the length of the outer periphery portion of the rigid panel portions of the combination rigid float and panel portions of the containment boom. This berm is provided simply to ensure the containment of any contaminants, by restricting same from passing over the rigid panel portions of the containment booms, while traversing along the inner surface portion of same These embodiments of the contaminant containment booms are devised and engineered in a manner that the floating contaminants would traverse both along the outer most periphery of the portions of the float portions thereof. However if any contaminants inadvertently get under the float portions of this embodiment thereof same are devised and configured in a manner that simply allows the contaminants to traverse a short distance under water along the rigid lower panel portions of same, until the contaminants come back out from under the rigid float portions of same and up against the side portions of the small flexible panel portions of the contaminant containment booms, where same simply floats upward enough to continue traversing along the outer surface portions of the rigid floats and small flexible panel portions of the contaminant containment booms, until same once again due to wave action or other ends up back under the float portions thereof, where same simply repeats this process until same reaches the containment clean-up and recovery equipment and is removed from the surface of the water and transported into the containment clean-up and recovery vessel, in this embodiment thereof.

The top rigid panel portions of this embodiment of the contaminant containment booms, viewable in the profile views of same, included as the top portions of FIGS. 43-M as well as in the drawings of the end portions thereof included in the drawing of FIG. 43-I. Notice the rigid top panel portions of this embodiment of the combination rigid float and rigid panel portions of the containment boom are the same basic dimensions as the bottom rigid panel portion of same, in this embodiment thereof, in that the basic configurations and structural composition of both the rigid upper and lower rigid panel portions thereof were devised, configured, and engineered in the manner they were to serve more than one purpose, in this example of an embodiment thereof.

The first of which being that of an even higher providable level of stability to all as a whole, due to both the manner all of these rigid upper and lower rigid panel portions, as well as all equipment and systems created for the employment of same were additionally devised, to literally take advantage of the forces created by the lateral currents created as a result of their mode of employment. This accomplished in part by means of the vertical span between the very top and very bottom portions of the upper and lower rigid panel portions thereof. This, as well as, by means of both the vertical span between the top and bottom inner chains or cables inside the smaller flexible panels, as seen in FIGS. 43-G. and FIG. 43-H. along with the positional orientations of same were all devised in a manner in which the load created by the lateral currents pressing against the inner side portions of the contaminant containment boom is actually carried both through the top and chains inside the smaller flexible panels, 107-M, as well as along the very top and very bottom portions of the rigid panel portions of the contaminant containment boom, and across the entire span thereof, to where the forward end portion thereof with the containment boom with track trolleys portions of same as included the drawing thereof in FIG. 43-U. attaches to and rides on, while remaining in alignment with the vertical roller track or rod with track trolleys #117-F on the back of one of the contaminant containment boom towing vessels, and all of the way aft to where the opposite end portion thereof with the containment boom panel 107-D with track trolleys 107-C attaches to and rides vertically and in alignment with the vertical roller tracks or rod #37.

Also included the drawing thereof in FIG. 43-R. located of the leading edge of the main float portion of the containment clean-up and recovery equipment, or the leading edges of the hulls of the main contaminant clean-up and recovery vessel itself, as seen in FIG. 2-A.

These contaminant containment boom panels 107-D with track trolleys, as seen in FIG. 43-U. are devised and engineered in a manner in which same always remain in perfect vertical alignment with the roller tracks or rods in which they attach to and ride on. As a result thereof, in conjunction with all aforementioned pertaining to the composition and dynamics of these contaminant containment booms, provides same with an additional level of stability no matter what speed same are employed. In that all were additionally devised and engineered in a manner in which employs the same forces created by the currents pushing up against the sides of these contaminant containment booms to maintain all in vertical alignment, with the end portion of these contaminant containment booms with track trolleys that always remain in alignment with the vertical roller tracks or rods, same attach to and ride up and down on. As a result, same further enhance their ability to maintain stability regardless of the forces created as a result of the mode and speed in which same are being employed Embodiments of these floating contaminant containment booms included in this application additionally include either sections of chain #107-O. as seen in FIG. 43-R. or ridged rods attached to a rigid armature mounting portion #107-W. as is included in this drawing of an embodiment thereof. This lower rigid armature mounting portion consists of an extended lower plate shaped center portion of each of the lower rigid contaminant containment boom panels. In this embodiment thereof. and with the opposite end portions of the ridged rods as seen in this drawing. Or the opposite end portion of each of the sections of chain as seen in FIG. 43-R. Would be connected to links, in an additional length of chain #107-P. running at a span, or depth, beneath the entire length of the contaminant containment booms and with the end portions of each affixed to each of the lower track trolley portions of the contaminant containment boom panels attached to and riding on the trolley track portions of the contaminant clean-up and recovery vessel or floating contaminant clean-up and recovery equipment employed thereon and the opposite end portion thereof attached to the containment boom towing vessels employed by same, with the lower connection points between each section of these chains in this embodiment thereof, spanning the same distance or at a slightly longer distance than the upper connection points for same on the lower panel portion of each of the combination rigid float and panel portions of these rigid floating sections of the contaminant containment booms, in this particular embodiment thereof, thus leaving a small amount of slack in the entire length of same extending between connection points for the end portions of same located at a distance directly under, or to end portions of the rods or tracks that the track trolley end portions the contaminant booms attach to, and vertically ride up and down over waves on, both on the containment boom towing vessels, as well to the vessels or leading edges of the float portions of the recovery equipment employed on same.

These connection points of these individual sections of chain or rigid rods being very low and centered between both ends of each of the lower rigid panel sections of the contaminant booms, not only provide each with the ability to freely pitch, fore and aft, as the sections of same go over waves, but the employment of these chains in this manner also does not interfere with the maneuverability or hinder the operational dynamics of these contaminant booms in any way. This due to the beneficial forces provided by same being perfectly centered in a lower portion of the lower panel portion of each and with the actual forces on same, not only being directly downward, but the sections of chain #107-P. or rigid rods employed in this manner also provides the contaminant containment booms with a tremendous amount of additional vertical stability and actually does so in many ways. This firstly due to both the forces of the lateral currents against the sections of chain themselves, along with the low centralized ballast provided to all simply by means of the weight and positioning of same, which provides same in a manner that not only provides these forces to all as a whole, but also provides combined forces of all to each individually as needed.

The employment of these chains in this manner, also employs the same basic dynamics, providing these contaminant containment booms with the added level of vertical stability provided to same by means of the vertically maintained span between the upper and lower connection points of same. However, the added provisional level of vertical stability provided by these same dynamic effects provided by means of the employment of these chains in this manner, literally multiplies these beneficial effects due to the even much longer added vertical span maintained between the rigid lower panel portions of the containment booms and the lower chain.

The combined effects of all of these factors provide these embodiments of contaminant containment booms with levels vertical stability and an overall level of performance providable by same, many times greater than any other contaminant booms known of the applicant. Of which will also hold true in the employment of same in very rough and adverse sea conditions as well. in this embodiment thereof.

FIG. 43-N. includes a drawing of profile view of another embodiment of a combination rigid float and rigid panel portion of this type of contaminant containment booms. The differences between this embodiment thereof and the embodiment thereof included in FIG. 43-M. firstly, being that of this embodiment's employment of a rigid member shown as a rigid armature #107-V, with same attached both to lower center portions of the lower rigid panel portions of the combination rigid float and rigid panel portion of these contaminant containment booms, with the opposite end portions thereof possessing a mechanical connection to the lower chain #107-P. Instead of a flexible section of chain, as is included in FIG. 43-M. These sections include both an upper joint, in the upper end portions thereof, as well as a lower joint in the lower end portions of same.

Both these upper and lower joint portions of these rigid armatures are configured in a manner that allows these rigid armatures to freely pivot, linearly fore and aft on the extended lower rigid panel portion of each section of the rigid float and rigid panel portions of the containment booms, but totally restrict same from pivoting from side to side of same. In this embodiment thereof.

This drawing thereof includes the pivotably attached rigid armature #107-V, along with the lower chain #107-P attached to the opposite end portion thereof, pivoted all of the way back with the side portion of the rigid armature laid up against the bottom portion of the rigid lower panel portion of this section of this embodiment of a contaminant containment boom, as if the contaminant clean-up and recovery operation had been completed and same was being hauled back onboard to be re-stored in the storage compartments for same, by means of one of the spool winches, employed on the contaminant clean-up and recovery vessel. Notice that the spool portion of the spool winches included in FIGS. 9-A. and 9-B. Of which are devised and engineered to also accommodate this embodiment of the contaminant containment booms as well. The mode in which these joint portions of these rigid armatures accomplish this task. In this embodiment thereof will be fully described and easily understood in the drawings and descriptions of same. included in FIGS. 43-0. through FIG. 43-Q. of the lower armature and rigid float portions of this same embodiment thereof dissembled.

FIG. 43-O. Includes another drawing of a profile view of the same embodiment of a combination rigid float and rigid panel portion of the contaminant containment booms as is included in FIG. 43-N. This drawing as well as the drawing included in FIG. 43-P. includes a disassembled embodiment thereof as is included in FIG. 43-N. This drawing of same provides a good profile view of a rigid armature mounting portion #107-W. consisting of an extended lower plate shaped center portion of the lower rigid panel. Of this embodiment thereof. Notice the mounting base portion of same is in the basic outer shape and diameter as the cheek plate portions of the upper joint portion of the rigid armature #107-V as seen in FIG. 43-P removed from same.

The configuration of this embodiment of the mounting base portion of the extended lower center portion of the lower rigid panel portion of this embodiment thereof is in the basic configuration of a round plate and of which would be of an equal thickness throughout and include flat surface portions on both outer side portions thereof. In this embodiment thereof.

FIG. 43-P. Includes a drawing of profile view of a side of the embodiment of a rigid armature, as is included in FIG. 43-M, FIG. 43-N, as well as FIG. 43-Q. This drawing thereof shows the upper pivotable joint portion of same removed from the extended lower center portion of lower rigid panel portions of the combination rigid float and rigid panel portions of the contaminant containment boom. This is accomplished simply by means of the removal of the clevis pin #107-X by means of first removing the cotter pin #107-Y, retaining same in the opening in both the center upper joint portion of the rigid armatures, as well as the opening in the center, extended lower rigid panel portion of the combination rigid float and rigid panel portion of the contaminant containment boom. This drawing also includes the lower chain #107-P also removed from the lower joint portion of this embodiment of the rigid armature. This is also accomplished in the same manner simply by means of the removal of the clevis pin #107-X by means of first removing the cotter pin #107-Y, retaining same in the opening in the lower joint portion of the rigid armatures, in this embodiment thereof.

FIG. 43-Q includes a drawing of an overhead view of the embodiment of the rigid armature, as is included in FIG. 43-M, FIG. 43-N and FIG. 43-P. This drawing thereof, provides a good view of the inner configurations of both the upper and lower joint portions of this embodiment of same. Notice the lateral view of this upper joint portion of this rigid armature provided for the mechanical attachment of same, to the extended lower center portions of lower rigid curtain, or panel portions of the combination rigid float and rigid panel portions of this embodiment of these contaminant containment booms are configured in a manner in which the inner surface of the upper cheek plate portions of this joint have a fairly large surface area and of which also fit over the lower center portion of these lower rigid panel portions of the combination rigid float and panel portion of these contaminant containment booms, at fairly close tolerances. These joints are configured in this manner to allow these rigid armatures, pivotably attached to same, with the ability to freely pivot linearly fore and aft relative to the combination rigid float and panel portions of this embodiment of these contaminant containment booms but restrict same from pivoting laterally relative to same. The employment of these rigid armatures #107-V in this manner, in conjunction with the rigid lower panel portions and section of lower chain #107-P in this manner provides a level of righting moment and vertical stability to this embodiment of contaminant containment booms that is even further multiplied many times over. In fact even by means of the employment of much shorter rigid armatures in this manner would provide same with ample levels of vertical stability In this embodiment thereof. Regardless of the modes, conditions or recovery scenarios of their employment. In this embodiment thereof.

FIG. 43-R includes a drawing of an embodiment of a contaminant containment boom panel #107-D with much of the following references also viewable in FIG. 43-U. such as female joint #107-I extending down the entire length of the end portion of the rigid contaminant containment boom panel #107-D in this embodiment thereof, with same attached to the upper portion of this embodiment of a track trolley #107-C, of which includes an extended outer, upper portion thereof comprising a male joint portion of same, #107-J inserted into and down the entire length of the female joint #107-I on the end portion of this embodiment of a rigid contaminant containment boom panel #107-D with same secured in place on same by means of mechanical fastener, #107-K. In this embodiment thereof.

Of course, another embodiment, of a contaminant containment boom panel #107-D could include this end portions of same, not including female end joint portions #107-I, but instead simply being solid, with the attachment of same to outer end portions of the track trolley for same, simply by means of several shackles much in the same manner as the shackle #107-Q portion lower chain #107-P of the contaminant containment boom, connected to the lower pad eye portion of the track trolley #107-C. Also included in FIG. 43-R, notice that the float portions #107-E of this rigid contaminant containment boom panel, #107-D are much thicker and thus would both be heavier as well possess more buoyancy than the rigid float portions of the other sections of the embodiments of the contaminant containment booms, included in the drawings of the end portions of same, in FIG. 43-S and FIG. 43-0. This is simply to ensure that same is provided with a bit more upward and downward force to make up for any drag caused by friction between the roller portions #107-S as seen in FIGS. 43-U. and 43-V. of the trolley #107-C and the trolley tracks for same #37, as seen in the overhead view of the embodiment of same included in FIG. 43-U, during the employment of same in this embodiment thereof.

FIG. 43-S includes a drawing of a profile view of an embodiment of two end portions of an embodiment of the rigid float and panel portions of an embodiment of the contaminant containment booms. This embodiment thereof would not include inset female joints in the end portions of same, but instead would simply be solid all the way to the ends thereof, in this embodiment thereof. These rigid float and panel portions of the contaminant containment booms would also include holes in close proximity both to the top and bottom and end portions of same. This embodiment thereof, although likely not necessary, would also include stainless steel or other tubes, provided simply as chafe guards pressed in and extending through same until same comes flush to the outer surface portions of the solid end portions of the rigid float and panel portions of the contaminant containment booms with both providing an opening for pin portions of shackles #107-Q attached to the end portions of two short sections of chain #107-R. These short sections of chain are actually the upper and lower chain portions of another embodiment, of one of the smaller flexible connecting panel portions of this example of an embodiment of the contaminant containment booms.

FIG. 43-T. includes a drawing of a profile view of the embodiment of the two solid end portions of the rigid float and panel portions of FIG. 43-S. This drawing also includes the fully assembled embodiment of the smaller flexible connecting panel portion of the embodiment of the contaminant containment boom portion of FIG. 43-S. This embodiment thereof, like the embodiment of the smaller flexible connecting panel included in FIG. 43-G. also includes a cover made of a plastic impregnated material shown as if same was transparent so the two short lengths of chain, included in the drawing of same in FIG. 43-S, could remain partly viewable that this plastic impregnated material is wrapped around the outer periphery of, which in this embodiment thereof, same is sown through both sides of the plastic impregnated material up close to, and along the inner edges of the two short lengths of chain, in a manner in which the end portions could still be pulled far enough inward to expose the pin portions, and the end portions the shackles so the attachment of both the upper and lower short lengths of chain could be attached to two of the solid end portions of the rigid float and panel portions of the contaminant boom, at which time, during the assemblage of same, the plastic impregnated material extending out and around the two solid end portions of the rigid float and panel portions of the contaminant containment boom could both be laminated to same. This, as well as the added employment of band of stainless steel, anodized aluminum, or other #107-T formed over and around the end portions of same covered with the plastic impregnated material, with same mechanically fastened through same and into the solid end portions of the rigid float and panel portions of the contaminant containment booms. In this example of an embodiment thereof.

FIG. 43-U includes a drawing of an overhead view of an embodiment of a trolley track #37 made of stainless steel or other, with either the back portion thereof, or either of the side portions of same weldable to either the inner leading edges of the vessel or portion of the equipment same is being employed on. This embodiment of a trolley employed in this trolley track #37 includes an inner bar or plate portion of same #107-U. The inner portion of same including a plurality of axles extending perpendicularly through inner portions of the bar or plate and stationed in alignment with each other and with a roller #107-S on the portion of each axle, extending out of each side of the bar or plate. #107-U portion of this embodiment of a track trolley, enabling the plurality of rollers #107-S, on each side of the bar or plate #107-U extending out the center opening of trolley track #37, freely role up and down the inner portion of the trolley track. The outer portion of this inner bar or plate portion #107-U of this embodiment of a track trolley includes one half of a piano type hinge portion of same, with the outer, one half of a piano type hinge portion of same, including plate portions of same configured for the attachment of the contaminant boom panel and the lower chain #107-P, in this embodiment thereof. This portion of same is also described in better detail in the description of FIG. 43-R.

FIG. 43-V includes a drawing of an overhead view of an embodiment of a much more simplistic track trolley #107-U. This embodiment thereof included in this overhead drawing thereof still shows the track trolley still employing the same embodiment of a trolley track #37. as seen in FIG. 43-R, as well as an inner bar or plate #107-U portion and axle portions of same as well as the same basic type of rollers #107-C. However this embodiment thereof simply shows the inner bar or plate portion thereof simply including several portions of same with oval openings in the outer portions of same, simply providing an opening for shackles to pass through and the bail portions of same to ride as well as rotate side to side in, with the outer pin portions of the shackles #107-Q. Extending through both top and bottom solid end portions of the rigid float and rigid panel portions of the contaminant containment booms, as well as for the attachment of the lower chain portion of same #107-P as seen in FIG. 43-L. In this embodiment thereof.

An additional embodiment of the track trolley portion thereof could simply include three or more hinged pad eye portions of same and employing the shackles #107-Q. Much in the same manner as same are employed in FIG. 43-V. in another embodiment thereof.

FIG. 44 is simply a drawing of an overhead view of an embodiment of a floating containment cleanup and recovery vessel in an embodiment, that is a much larger vessel such as is included in FIGS. 19-A, and 19-B. as well as the vessel included in FIG. 28 and FIG. 29, but still possesses a catamaran type hull configuration. This drawing simply showing that this type of hull design isn't limited to smaller vessels equipped to be employed in shallower waters, although the main reason that the applicant initially included the development of smaller catamaran type contaminant cleanup and recovery vessels, (not included in this application) along with all of the engineering of the smaller contaminant boom towing vessel included in FIGS. 43-A and FIG. 43-B and the devising of much of the their equipment employed on same, was for same to be employed on smaller catamaran vessels that were used in a very broad range of employment ranging from cleaning up oil spills or any other type of floating contaminants for that matter around marinas and up inland waterways, to the employment of same well out at sea on smaller spills, or to work along with larger vessels out to sea on larger spills. In this example of an embodiment thereof.

However vessels possessing more of catamaran type hull configuration possess many additional advantages in the development and employment of same as contaminant cleanup and recovery vessels both large and small. including catamaran type hull designs possessing far greater levels of maneuverability due the distance between their props, but the basic footprint of their hulls also provides them with far greater levels of stability in heavy and adverse sea conditions. This along with the floating contaminant cleanup and recovery equipment mounted and employed between the two hulls of the catamaran, same are even further sheltered and provided with even calmer seas. along with other advantages such as deck space, speed and fuel efficiency as well as the two hulls of these vessels can also be designed to haul far more volume and weight in shallower waters, broadening the range in which same can be employed, among other advantages. such as this example of an embodiment thereof.

FIG. 45-A is a drawing of an overhead view, of an embodiment of, the actual contaminant cleanup and recovery equipment portion of this vessel. The outer framework portions of the contaminant cleanup and recovery equipment, includes rollers #217 stationed at intervals between the top and bottom portions, of both sides, of all four outer corners, and extend out just beyond the outer most portions of the framework, housing the main floats #1. These rollers in this embodiment thereof are best viewed in FIGS. 47-B and FIG. 47-C.

The rollers on the aft outer portions of the framework In this example of an embodiment of the contaminant cleanup and recovery equipment ride on the inner surfaces of tracks #216 of which fasten to, or are welded an outer surface portion, of both transom portions of the contaminant cleanup and recovery vessel as well as on outer surface portions of the contaminant containment boom storage bins #154 These tracks #216 extend from a bottom portion of each transom and extend all the way to the top aft portions of the contaminant boom storage bins #154. These rollers #217 that are stationed at intervals between the top and bottom portions, of both sides, of all four outer corner portions thereof, ride either on tracks or directly on inner surface portions of a trunk #213 constructed both in, cut out inner portions of each of the vessels hulls as well as cut out inner portions of each of the contaminant boom storage bins #154 of which would also extend from a bottom portion of each inner portion of the vessels hulls and extend all the way to the top of the contaminant boom storage bins #154, as to allow the contaminant cleanup and recovery equipment to freely float therein and ride throughout the inner surfaces and, or, track sections therein. In this example of an embodiment's thereof.

these example. of an embodiment of. The floating deflection panels #228 as well the floating containment panel. #227 also comprise similar smaller rollers in this embodiment on the outer end portions thereof. These rollers ride in inner frame portions of the frame work of the contaminant cleanup and recovery equipment, viewable in this drawing of an embodiment thereof, and also viewable in FIGS. 45-B through FIG. 45-1

This embodiment of the contaminant cleanup and recovery vessel as well as many others is also equipped with a floating debris catch basin #223 which also rides in its own tracks, which are actually side portions of tracks #216. This floating debris catch basin, #223 includes a frame, covered with a wire mesh. The forward the forward facing side thereof possessing an open portion that that hangs below the floating contaminant cleanup and recovery equipment with the weight of the floating contaminant catch basin resting on tabs welded to a portion of the framework thereof and of which rides up and down over the waves along with, and like, as if, a part of, the floating contaminant cleanup and recovery equipment. In this example of an embodiment thereof.

This embodiment of a debris catch basin, catches the floating debris, that's carried by the currents once swept off of the screened intake panel #130 by means of the hydraulically operated crossmember and brush #131 as seen in drawings 19-A 19-B and 19-C and intern inter into and are captured and trapped inside of the floating debris catch basin #223, after interring in the front open portion thereof, and maintained therein by the same currents created during the contaminant cleanup and recovery process. This debris catch basin once filled is raised independently in its own tracks #216 by means of its own winch. to a station where a crew member empties the debris catch basin onto storage bins, and then simply lowers same back into service, without disturbing, or interrupting the normal operations of the floating contaminant cleanup and recovery equipment or the contaminant cleanup and recovery operation in any way while doing so. of which will be seen and described in better detail in the drawings and descriptions included in FIGS. 46-A through FIG. 47-A. In this example of an embodiment thereof.

FIGS. 45-B through FIG. 45-L, Include embodiment's of a type of both, floating wave and current deflection panels #228 as well as a floating rear contaminant containment panel #227. that additionally include floats #229 that extend across upper portions thereof as well as rollers #217 on the outer end portions thereof.

These floating panels were added as an example of embodiment's of optional replacements, for the stationary wave and current deflection panels and the rear contaminant panel. that are mechanically fastened the framework of the of the floating contaminant cleanup and recovery equipment, with the lower portions of these panels extending under the water at depth, most efficient to their employment, relative the floating level of the rest of the floating contaminant cleanup and recovery equipment.

The possible added Bennett to the employment of the additional floats and rollers, added on the wave and current deflection panels, and the rear contaminant containment panel, would be the maintaining of all, in positions most beneficial relative the surface of the water at all times, especially in heavy and adverse seas conditions.

This additional type of floating panels, were simply added as an example of an embodiment thereof. in this as well as a couple of the other drawings of embodiment's of the floating contaminant cleanup and recovery equipment as optionally employable. And any benefit providable by the employment of same, may or may not outweigh, or merit, the added cost and maintenance of same. in that the small gain in the level of efficiency providable to these panels by these modifications. would likely be of very little benefit, to the overall level operational efficiency of the contaminant cleanup and recovery equipment as a whole, in that all prototype testing, during the development process of different embodiment's of the contaminant cleanup and recovery equipment and components thereof, was performed employing stationary deflection and containment panels, and not only, performed during the employment of same, at profound levels of operational efficiency, but also maintained the ability to do so, in all sea conditions artificially created. during the testing of stationary embodiment's thereof.

FIGS. 45-B through FIG. 45L, Include drawings of, different views, of embodiment's of the floating deflection panels #228, and the floating containment panel. #227, as well as the rollers and the housings for same #217 of which are simply smaller versions of the rollers employed in the floating contaminant cleanup and recovery equipment. In this example of an embodiment thereof.

FIGS. 45-B is a view of an embodiment of the backside of floating contaminant containment panel #227. A drawing of the same backside view of thereof installed is viewable in FIG. 47-D. The rollers employed in both sides of the end portions this panel like the others, included in FIGS. 45-B through FIG. 45-L, actually ride on the inside surfaces of sections of the channel shaped framework for the contaminant cleanup and recovery equipment itself. The only exception being the rollers included in the center portion of this panel. These rollers actually ride on the forward surface of a vertical frame centered in the back framework portion of the contaminant cleanup and recovery equipment.

FIG. 45-D is an overhead view of the floating contaminant containment panel #227. the. In this drawing, the rollers #217 employed in both sides of the end portions this panel are viewable, riding on the inside surfaces of sections of the channel shaped framework portion of the contaminant cleanup and recovery equipment. FIG. 45-D is the applicants attempt at drawing a three dimensional view of the floating contaminant containment panel #227. so both the float and the lower panel portions thereof could be viewed. In this example of an embodiment thereof.

FIGS. 45-E are backside views of an embodiment, of the floating panels that are stationed directly in front of the smaller floats #2-A or #2-B in which house the actual contaminant intake portions of the contaminant cleanup and recovery equipment. as viewable in the overhead view of FIG. 45-A FIG. 45-F is simply an identical but much larger and better overhead view, of the floating panels that get stationed directly in front of the smaller floats #2-A or #2-B in which house the actual contaminant intake portions of the contaminant cleanup and recovery equipment, in which the roller portions of this panel riding on the inside surfaces portions of the channel shaped framework, of the contaminant cleanup and recovery equipment. as well as a better view of the float and panel portions thereof, In this example of an embodiment of same.

FIGS. 45-G is a view of an embodiment of the forward side of one of the smaller floating panels also viewable in the drawing of the overhead view of the contaminant cleanup and recovery equipment. included in FIG. 45-A. These smaller panels are stationed forward and just inside, of each side, of same on the back side thereof. Included in FIG. 45-G, facing forward, and the float side thereof as viewable in FIG. 45-I, facing aft. FIG. 45-H is also simply an overhead view of one if these same smaller panels included in FIGS. 45-H and FIG. 45-I where the rollers and float portions thereof can be better viewed. In this example of an embodiment thereof.

FIG. 45-J is simply a forward view of one of the same panels included in FIGS. 45-E and FIG. 45-F in which the float portion of #229 can be viewed. In this example of an embodiment thereof.

FIG. 45-K is an overhead view of one of the rollers and the housings portion of an embodiment of #217 included in both sides of the outer end portions of these panels, which are simply smaller versions of the rollers employed in the floating contaminant cleanup and recovery equipment. best viewed in FIGS. 47-B and FIG. 47-C The outer flange portions thereof are shown as possessing holes drilled therein to allow mechanical fasteners to pass through to effect the mechanical fastening of same onto inset portions of the panels and, or the framework portions of the floating contaminant cleanup and recovery equipment, to accommodate same. In this example of an embodiment thereof.

FIG. 45-L is a profile view of FIG. 45-K. being one of the rollers and the housings portion thereof #217 This profile view of same, is drawn as if, one side of the housing thereof, had bin removed so the roller portion thereof could be viewed. The fang portions of these rollers could also be welded into the inset portions of the framework portions of the floating contaminant cleanup and recovery equipment, to better maintain the structural integrity of the framework. The clevis pin, or axle portion, of these rollers could still be easily accessed and removed to enable the removal and replacement of a failed or damaged roller simply by drilling a hole in the side of the framework and re-welding same back in when finished, or simply creating small access holes in the sides of the framework with small removable plates over each at the same time all are initially installed. another solution for same could also easily accomplished by means of the employment of larger frames in the portions of the framework that the rollers are installed in or simply sistering in additional frames welded to the sides of same. In this example of an embodiment thereof.

FIG. 46-A and FIG. 46-B are views of the backside of an embodiment of both the floating cleanup and recovery vessel as well as embodiment's of the floating contaminant cleanup and recovery equipment employed by same. This drawing was included both to provide a view of the floating debris catch basin #223 being employed as well as to provide a better understanding of how same performs the tasks it was devised to perform. This drawing shows the floating debris catch basin #223 lowered down in its own tracks, by means of its own winch #223-C and the electric or hydraulic drive motor #223-D, the controls for same operated by the crew member working on the aft platform #233 who both raises same up to platform #233 and empties same by means of opening doors #223-B located on each of the outboard end portion of the floating debris catch basin and latching same into stanchions on the other side of the walkways thereat. The crew member at the same time opens additional doors #224 directly across from said stanchions and latches same into stanchions located on a portion of the aft working platform by each outboard aft corner of the floating debris catch basin when same is raised up and locked in place. level with said aft working platform. Best viewed in the drawing included for FIG. 47-A and thus creating a clear path between the inside of the floating debris catch basin #223 and the top of the debris waste bins #219-A hanging on both the port and starboard aft portions of the containment. containment boom storage bins #154. for the said crew member to scoop of drag the debris into the waste bins by means of a square nosed shovel of other. These doors #223-B and #224 opened and latched into place as well as the clear pathway created, between the inside of the floating debris catch basin and the top of the debris waste bins. is best viewed in FIG. 42. In this example of an embodiment thereof.

The process for lowering the, the debris catch basin 223 and redeploying same, behind the floating contaminant cleanup and recovery equipment, In this example of an embodiment thereof is simply accomplished by means of the crew member, reversing the aforementioned process, where all gates are re-closed and latched in place, and the debris catch basin 223 is simply lowered back into its position of employment as seen in FIGS. 46-A and FIG. 46-B where same rests on smaller lateral frame sections welded to, and extending out beyond the rest of the framework of the floating contaminant cleanup and recovery equipment, at which time extra slack is left in the winch cables #223-F as seen in FIG. 46-B in a manner in which both ride over waves together, and operate as if integral portions of the same equipment, with the debris catch basin 223, positionally orientated, behind the floating contaminant cleanup and recovery equipment, with the open frontal portion of the debris catch basin #223-G viewable in FIG. 46-C, extended down below the aft bottom portion of the screened over framework portion of the floating contaminant cleanup and recovery equipment, and with the upper cross-member portion of the debris catch basin #223 up against the aft surface portion of the said screened over lower framework portion, of the floating contaminant cleanup and recovery equipment, and thus providing a wide open aria below same for all of the trash, Sargasso weed, dead marine life and other debris; that's carried by the currents once swept off of the screened intake panel #130 by means of the hydraulically operated crossmember and brush #131 as seen in drawings 19-A 19-B and 19-C and intern all is captured and trapped inside of the debris catch basin #223, after interring in the front open portion thereof. This debris is maintained therein both by a wire mesh covered berm portion thereof, as well as, the same currents created during the contaminant cleanup and recovery process. Until the said crew member, once again by means of the debris catch basin winch controls raises same independently in its own tracks #216, and locks same in place with the bottom portion thereof level with the work station #233 and simply repeats the same aforementioned process. In this example of an embodiment thereof.

This entire process, is performed while underway, and accomplished without disturbing, or interrupting the normal operations of the floating contaminant cleanup and recovery equipment or the contaminant cleanup and recovery operation in any way while doing so. In this example of an embodiment thereof.

FIG. 46-C is a frontal view of an embodiment of the debris catch basin in which both the open frontal portion of the debris catch basin #223-G where all debris swept off of the screened intake panel #130 by means of the hydraulically operated crossmember and brush #131 viewable in FIG. 45-A inters into this debris catch basin, as well as the wire mesh covered lower berm portion #2234 thereof, can be viewed. #223-H are the male track slides that extend the vertical length of each forward side portion, of the debris catch basin. These male track slides are inserted into and ride in the side female portion of track #216 also best viewable in FIG. 45-A. In this example of an embodiment thereof.

FIG. 46-D is an overhead view of an embodiment of the debris catch basin in which the upper forward crossmember, as well as the upper door hinged thereto as the handles and latches therefore can be viewed. This upper door #223-A is provided to enable a crew member with the ability to access the captured debris therein, for the removal of same by means of pushing, or sliding same, out of the side doors #223-B thereof, viewable in the drawing of FIG. 46-E and into the debris waste bins #219-A hanging on both the port and starboard aft portions of the containment. containment boom storage bins #154. best viewed in FIG. 47-A. The tops portions of the male track slides that extend the vertical length of each forward side portion, of the debris catch basin. #223-H are also viewable in this drawing of an example of an embodiment thereof.

FIG. 46-E is a profile of an embodiment of the sides of a debris catch basin along with the door portion thereof #223-B this drawing also provides a frontal view of the male track slide #223-H that extends from the very bottom to the very top portions of the forward leading edges of the debris catch basin #223. In this example of an embodiment thereof.

FIG. 47-A is an additional backside view of the same embodiment's of the floating cleanup and recovery vessel included in FIG. 46-A This drawing was simply included both to provide a view of the floating debris catch basin #223 raised independently in its own tracks, by means of its own winch #223-C and the electric or hydraulic drive motor #223-D, and locked into position level with the aft working platform #233 as well as the debris previously captured therein emptying into the debris waste storage bins #219-A hanging on both the port and starboard aft portions of the containment. containment boom storage bins #154. as fully in described in detail in the description included for FIGS. 46-A and FIG. 46-B. In this example of an embodiment thereof.

FIGS. 47-B is an overhead view of an example of an embodiment of a debris waste storage bins #219-A that hang on outside aft portions of the containment. containment boom storage bins #154. as aforementioned in the description included for FIGS. 47-A as well as the tasks performed by same, fully in described in detail in the description included for FIGS. 46-A and FIG. 46-B. The two outermost lines on each side portion of this drawing, is an upper flat plate portion laterally extending out from each side of the upper periphery portion of the debris waste storage bins #219-A. these upper flat plate portions each rest on the top portions of their own gussets, #219-B Included in FIG. 47-C #219-D are pad eyes welded to the tops of the gussets in a manner in which the eye portions thereof extend through the holes #219-B. In this example of an embodiment thereof.

FIG. 47-C. is simply a profile view of a set, of two gussets, In this example of an embodiment thereof. These gussets are welded to the back sides of both the port and starboard aft portions, of the containment boom storage bins #154. The two dotted lines in FIG. 47-B included between the two solid lines indicating the upper flat plate portions of the debris waste storage bins #219-A included in FIG. 47-B, are the very top surface portions of the of these gussets, that the bottom surface portions of the upper flat plate portions of the debris waste storage bins #219-A, rest's on. #219-D are the pad eyes welded to the top surface portions of the gussets. These pad eyes extend through the openings #219-C in the flat plate portions of the debris waste storage bins #219-A in a manner in which a clevis pin, bolts with nuts or other, can extend through to maintain the debris waste storage bins in place once installed. The additional pad eyes #219-E welded to the upper inside portion of each side of the debris waste storage bins #219-A are provided as attachment points provided to enable same to be optionally removed and re-installed. In this embodiment thereof.

FIG. 47-D Is a backside view of an embodiment of the floating contaminant cleanup and recovery equipment included in the embodiment's of the floating contaminant cleanup and recovery vessels included in FIGS. 40-A through FIG. 48-A this drawing thereof was simply added to provide a better and more detailed view of some of the previously referenced key components. of this embodiment of the floating contaminant cleanup and recovery equipment, with the optionally employable floating type of containment contaminant panel #227 removed to enable a better view thereof. firstly this drawing has the best view if the rollers and housings for same #217. In this example of an embodiment thereof.

Looking through the back side of this embodiment of the floating contaminant cleanup and recovery equipment and all of the way to the forward portion thereof is the screened in forward intake portion thereof where all of the contaminants floating on the surface of the water initially inter before same is removed from the surface of the water. This screened in aria previously referenced as the screened in intake panel #130. This panel actually just comprises a wire mesh, that covers the entire forward upper framed in aria between the inner frames housing the #1 floats that provide buoyancy for all of the floating contaminant cleanup and recovery equipment and extends down to the bottom forward portion of the framework that extends back across the forward aria between the two main floats #1. The hydraulically operated crossmember and brush #131 that's employed to sweep all of the debris of this forward intake aria covered with a wire mesh can also be partially viewed through same, extending across the upper portion of this forward screened in aria in this drawing. In this example of an embodiment thereof.

This forward screened in aria In this example of an embodiment of same, extends all of the way down to another attached portion of the framework also covered with a wire mesh that extends all of the way back and across the entire aria between the inner surface portions of the #1 floats, so that the entire aria surrounding the components requisite, to the effective removal, of the floating contaminants, from the surface of the water, included in the contaminant cleanup and recovery equipment, needful to the effective operations of same is protected on all sides, with either a solid surface such as the sides of the #1 floats, or a wire mesh, as included in the entire aria in front of, as well as the entire aria underneath, these #2-B floats with the vacuum type intake tubes #3-B as well as the wave and current deflection panels #228 as included in this drawing, both in a manner that same is protected on all sides from any debris or any other solids floating on the surface of the water, larger than the openings in the screens, from possibility entering in and fouling any of the equipment, effectively removing, the floating contaminants seme from the surface of the water, in a manner that allows all floating contaminants to freely pass through, while restricting any debris, floating along with the actual contaminants on the surface of the water, from possibility entering in and fouling any of the equipment effectively removing, the actual floating contaminants from the surface of the water. In this example of an embodiment thereof.

Thus enabling all equipment requisite to the effective removal of same to freely operate uninterrupted, at their, maximum attainable level of operational efficiency, at all times. Of course all aforementioned, would remain unchanged and hold true, if the equipment employed in this embodiment of the floating contaminant cleanup and recovery equipment, was replaced with the #2-A floats and the #3-A gravity intake tubes type of floating contaminant cleanup and recovery equipment, and the stationary deflection and containment panels, also included in this application, All would also hold true in all embodiment's thereof, included in this application, in that all are equipped much in the same basic manner. All also employ the exact same modes and equipment that actually remove the floating contaminants from the surface of the water, as well as those that restrict floating debris from entering in and fouling same. All also employ the exact same type of telescopic tubes #5-A and telescopic tube housings #4-A, and employ same in the same manner as well. In this example of an embodiment thereof.

FIG. 48-A. Is also a view of the backside of an embodiment of both floating cleanup and recovery vessel with more of a catamaran type of hull configuration, This drawing was included To show the mode and equipment in which this embodiment of a contaminant cleanup and recovery vessel transports all contaminants captured, into the hull of the vessel regardless of the level of the waterline of same. In this example of an embodiment thereof.

The telescopic like tubes #5-B as well as the housings for same #4-B employed in this embodiment of a contaminant cleanup and recovery vessel, to provide a conduit between the bottom portion of this embodiment of the floating cleanup and recovery equipment, to the lowest portion of the vessels hull. These telescopic like tubes, as well as the housings for same are of the same exact type of telescopic tubes as the #5-A and housings #4-A employed, on all, to allow the #2-A as well as the #2-B floats in all embodiment's of the contaminant cleanup and recovery equipment, and variations thereof of the applicants. That maintain all perfectly even with the surface of the water at all times without changing the load or downward force on same regardless of the amount of fluid passing through same at any given time. This holds true for all embodiment's of the contaminant cleanup and recovery equipment, and variations thereof of the applicants. both in this application as well as in all prior patent applications of the applicant's.

These telescopic like tubes always remain open and vertical at 90 degrees in relation to the seas, and never actually hold any fluid at any time, or in any way. which of course holds true for the #2-A or, #2-B float and #3-A or, #3-B intake tube portions thereof, resulting in same always remaining totally unaffected by the weight, or the volume of the contaminants passing through them at any time because none of which is ever held by same in any way, or at any time, during the contaminant cleanup and recovery operation. In this example of an embodiment thereof.

This holds true in every way for both modes employed for actually removing the contaminants from the surface of the water and transporting same to the tanks where same is stored and the final separation process takes place. in this application.

The only difference, between the telescopic tubes #5-A and housings for same #4-A, employed on the first two types and embodiment's of the applicants cleanup and recovery equipment to maintain the #2-A and #2-B floats floating at the same level relative to the surface of the water at all times, and The telescopic tubes #5-B and housings for same #4-B that maintain the main #1 floats that provide buoyancy for all of the contaminant cleanup and recovery equipment and a framework therefore as a whole is the size of the telescopic tubes #5-B and number of same, as well as the size of the housing for same #4-B. In this example of an embodiment thereof.

The crossover tube 4-C In this example of an embodiment thereof. is mechanically connected to the base of telescopic tube housing 4-B by means of a flange This crossover tube 4-C In this example of an embodiment thereof, which allows the captured contaminants therein, to be selectively pass through electric, or hydraulic, remotely operable valves 42-B in each hull of the vessel, that selectively direct the captured contaminants, to one or the other, or simultaneously into both hulls of the vessel at the same time.

The types of equipment and systems employed for the transporting of same and removal of any water inadvertently captured during the contaminant cleanup and recovery operation inside of the hulls of the vessel would be basically the same type as employed in the mono-hulled vessels included in this application.

The embodiment's of the electric, or hydraulic, remotely operable valves 42-A In this example of an embodiment thereof are mechanically attached to the base of telescopic tube housings 4-A by means of a flange enable both the ability of selective employment as well as that of volume regulation to each of the intake tubes 3-A or #3-B housed in the floats #2-A Or #2-B. The upper flange portions of the intake tube housing manifold #4-D are mechanically coupled to the valves 42-A which are additionally mechanically coupled to the basses of the intake tube housings #4-A, and of which all come together as one, by means of the said intake tube housing manifold #4-D and the lower flange portion thereof, which is mechanically coupled, to the upper flange portion of 5-B, that extend all of the way down to the housing for same #4-B. The base of which is coupled to the crossover intake tube #4-C portion of the vessel itself. In this example of an embodiment thereof.

This embodiment of catamaran type contaminant cleanup and recovery vessel and equipment therefore, as well as all others included in this application, are engineered in a manner that provides unfettered access to all mechanisms and components comprising the floating contaminant cleanup and recovery equipment, at any time same isn't actually in service, enabling same to be easily repaired, on site, if the need should ever arise, and thus the dependability of same. These things hold true for all embodiment's, both large and small of these catamaran type of contaminant cleanup and recovery vessels and equipment of the applicants as well.

However even though all embodiment's of the floating contaminant cleanup and recovery vessels and equipment included in this application employ the exact same primary mechanisms and components and gather, channel concentrate and recover floating contaminants in the exact same manner. However the engineering process requisite of the applicant to bring all to the levels of operational efficiency in the employment of vessels with more that of catamaran type hull configurations created some all new obstacles challenges, that took a great deal of time and effort in the bringing of all catamaran types of floating contaminant cleanup and recovery vessels, of the applicants to their present provisional level of service and abilities that all now possess, Although the process and modes of insuring the floating contaminant cleanup and recovery equipment employed in these catamaran type, contaminant cleanup and recovery vessels. maintain their highest ongoing level of operational efficiency and service free dependability, when deployed, in part includes the telescopic tubes #5-B being free or marine growth that could create drag and hinder sames level of the operational efficiency. when deployed.

However a solution is provided, that enables the easy removal and storage of the Telescopic tubes 5-B, inside of the tube housing for same, 4-B up under the framed out portion of the contaminant cleanup and recovery equipment.

This is accomplishable In this example of an embodiment thereof. Firstly by means of pulling the framed portion of the contaminant cleanup and recovery equipment, all of the way up to the crossmember #225-A, that extends across the very highest portion of the trunk for same. #223 by means of the electric or hydraulic which #225-B, of which is anchored to a bottom portion of a crossmember #225-A All of which, best viewed in FIG. 45-A. An upper portion of the framework, of the contaminant cleanup and recovery equipment. possesses two pad eye's #225-D welded thereto, these pad eyes pass through openings #225-C in said crossmember, Once again all of which best viewed in FIG. 45-A. These pad eye portions of the framework, would be attached to the said crossmember by means of extending a clevis pin, bolt with a nut, or other, through same. the process of which, solidly locking the contaminant cleanup and recovery equipment, in place in the highest portion of the trunk. at which time the hook or shackle portion of the winch cable is removed from the main pad eye welded on top of a center portion of the framework for the of the contaminant cleanup and recovery equipment, and given to a diver who takes same along with a couple of wrenches down and remove the mechanical fasteners connecting the lower flange portion, of the base of the telescopic tube housing 4-B, from the flange portion of the crossover tube 4-C, as well as the mechanical fasteners connecting the support armature #4-F from the upper bracket portion #4-E of the telescopic tube housing 4-B, then simply by means of attaching the shackle on the end of the said winch cable to same. The telescopic tube housing along with all telescopic tubes 5-B housed therein is pulled all of the way up to the connection point of the upper fang portion of the telescopic tubes #5-B and the bottom flange portion of the intake tube manifold #4-D by means of the by means of same hydraulic or electric winch #225-B mounted to the center of a bottom portion of the crossmember #225-A that extends across the top of the open trunk portion of the vessel, where same is rinsed of with fresh water and simply stored thereat along with the rest of the contaminant cleanup and recovery equipment during periods of non-deployment. to maintain the telescopic tube sections in pristine condition. and ready for reemployment of same. Of which is quickly accomplished simply by means of a reversal of the aforementioned process. Same is also engineered to be easily removed as one unit along with the crossmember #225-A simply by means of the removal, of the mechanical fasteners, fastening same to the upper edge portions of the contaminant cleanup and recovery equipment trunk #213 In this example of an embodiment thereof. Of which is also best viewed in FIG. 45-A This process doesn't apply at all for the mono-hull, contaminant cleanup and recovery vessels included in this application. in that none of the components of the floating contaminant cleanup and recovery equipment thereof would have to remain in the water during periods of non-deployment that marine growth would hinder the functionality of in any way, simply meaning that the procedure most likely employed after a contaminant cleanup operation is completed for the storage of the floating contaminant cleanup and recovery equipment portions of the mono-hull floating contaminant cleanup and recovery vessels included in this application, simply being the rinsing of same off with fresh water, once the job is completed. and the floating contaminant cleanup and recovery equipment, is lifted and re-racked back on the floating contaminant cleanup and recovery vessel.

The applicants main motivating factor in his development of embodiment's of more catamaran types of floating contaminant cleanup and recovery vessels and equipment therefore. being in his ability to develop same with the ability to be employed, both out a sea. but primarily in his ability to engineer same with the ability to be employed much shallower waters of lakes and inland waterways, at an extremely high level of efficiency, while maintaining a high load capacity, and even a far greater level of maneuverability due to the positioning and distance between the props of catamaran type vessels, which all proves advantageous in the employment of same in the cleanup and removal of oil, or other type of floating contaminants spills, in marinas and up inland waterways.

One of the main motivating factors, in the applicants advanced development of embodiment's of these catamaran type contaminant cleanup and recovery vessels, is both in the contaminant cleanup and removal equipment of the applicants ability to very effectively remove huge volumes of anything floating on the surface of the water, meaning even contaminants that are more biological in nature. this along with the mode in which all embodiment's of the applicants contaminant cleanup and recovery vessels, gathers and corrals all of the floating contaminants as it removing same from the surface of the water, that lends itself extremely well to smaller versions of these catamaran type contaminant cleanup and recovery vessels being employed in lakes, and inland waterways, as well, with much of the applicants focus directed towards an effective solution to the cleanup and removal of not just oil spills, but of any floating contaminants needful of being removed.

This including the removal of cyanobacteria or whats commonly referred to as toxic blue green algae blooms, that periodically wreak havoc, not only in numerous lakes and inland waterways, nation wide to one extent or another, but in over two thirds of the countries of the world as well, where the toxins produced by these periodic blue green algae blooms, cause a broad spectrum of problems, not only in the populations of aquatic creatures, these toxins comes in contact with same, but these toxins are proven as responsible for many health issues, that can be suffered by people just coming in contact with these toxins. These health problems can be far worse for many residing near, or having long term exposure to these blue green algae blooms. or that ingest same in any way.

This blue green algae once removed can also be converted into bio diesel, that not only removes all of the toxins during the production process of same, but that also burns over 80 percent cleaner than petroleum diesel.

FIG. 48-B. is a drawing of an embodiment of, a telescopic tube housing #4-B. with embodiment's of telescopic tubes #5-B housed therein. This drawing is drawn as if the both the telescopic tubes #5-B as well as the telescopic tube housing #4-B. were cut down and shortened to only a fraction of their actual length. This drawing shows, one half of the outer housing portion of telescopic tube housing #4-B. as if same was cut away, to provide an unobstructed view of the telescopic tubes housed therein, and all telescopic tubes are drawn as if same were partly extended out of telescopic tube housing #4-B so that a full view and a better understanding of how all work in conjunction with, and relative to each other.

This drawing also shows an example of an embodiment, of a top flange plate #172-A, as if the mechanical fasteners and sealant, fastening and sealing same to the upper flange portion of the telescopic tube housing #4-B was removed, this flange plate, #172-A, possesses a series of holes digitally oriented around and extending through same. These holes line up with a series countersunk and threaded holes around the upper surface of the upper flange portion of the telescopic tube housing #4-B, in which the flange plate, #172-A, mechanically fastens and seals to. by means bolts or machine screws (not shown) extending through same and threading into said threaded holes in the upper flange portion of the telescopic tube housing #4-B. In this example of an embodiment thereof.

The inside fascia portion of flange plate, #172-A, in this drawing is shown, as same possessing inset groves in which receive O-rings #4-G. These o-rings provide a seal between the outer surface portions of largest outer telescopic tube #5-B and flange plate, #172-A, The very upper inside fascia portion of flange plate, #172-A, is also machined to very close tolerance to the outer circumference of the said largest outer telescopic tube #5-B as well to insure that anything adhering to the outer surface of same in simply scraped off by same before interring the telescopic tube housing #4-B The upper inside portion of each telescopic tube, In this example of an embodiment thereof, also possess an inner ridge portion #5-C, the inner diameter of which being slightly smaller than the inner diameter of the rest of the telescopic tube. The inner fascia portion of this inner ridge #5-C, also possesses inset groves in which receive o-rings #5-E that seal to the outer periphery of each of the progressively smaller telescopic tubes #5-B The bottom portion of these upper inner ridge portions of all but the very smallest of the telescopic tubes, serves as stop for each of the next progressively smaller telescopic tube #5-B by simply by means of same abutting, the top surface portions of lower raised ridge portions that extends around the outer periphery of the very lowest portions of each additional smaller telescopic tube. In this example of an embodiment thereof.

This lower raised portions of this embodiment of each of the telescopic tubes possesses a series of ridges and grooves digitally oriented around the outer periphery of the bottom portion of each telescopic tube. The outer diameter of the outer most portions of the said ridges digitally oriented around the lowest portion of each telescopic tube is in close tolerance to the inner diameter of each of the next larger sized telescopic tubes its housed in, in a manner that the outer portions of these ridges become slides that slide in the inner portions of its next larger sized telescopic tube.

The outer portions of these ridges digitally oriented around the outer periphery of the bottom portion of the largest of these telescopic tubes, also being in close tolerance to the inner diameter of the telescopic tube housing it self and become slides therein, with the lower portion of the flange plate, #172-A, becoming the stop fore same. In this example of an embodiment thereof.

These lower grooved out portions, of this embodiment thereof, also digitally oriented around the lowest portion of each telescopic tube, stationed between each raised portion thereof, allow captured contaminants along with a small percentage of water between these tubes to freely pass through these grooved out portions thereof and in and out of the bottom portion of the tube housing #4-B during the insertion and extension between these telescopic tubes experienced during the normal operation thereof and the O ring seals #4-G inserted around the upper inner ridge portions #5-C of each of the telescopic tubes #5-B maintain a seal between each of the telescopic tubes, along with the outer portion of the largest telescopic tube being sealed by means of the O ring seals #4-G in inner portion of flange plate, #172-A, so that during the normal operations of same, as these the telescopic tubes are inserted into each other fluid intrusion occurs by means of fluid freely flowing through these digitally oriented grooved our portions around and between each of the telescopic tubes and in turn discharges through same when extended, while the outer surface of the raised ridge portions stationed between each of the said grooved our portions thereof, become both guides and slides, that both keep all telescopic tubes in perfect alignment with each other, as well as slides that insure all freely travel inside of each other during the employment of same. In this example of an embodiment thereof. #5-D are stops consisting of a flanges. These flanges are mechanically fastened to the uppermost ridge portions of all except for the outermost and innermost telescopic tubes. The drawing included for FIG. 48-B shows these flanges #5-D as if same were employed, with same, which would be mechanically fastened to the uppermost ridge portions of the two inner telescopic tubes. This drawing shows an example of this embodiment of these flange stops as if same were removed in FIG. 48-D along with a full description of same.

FIG. 48-C. Is a drawing of an embodiment of a cut down and much shorter version of the largest, outermost telescopic tube 5-B. as if same was removed from its housing #4-B, and with the rest of the telescopic tubes removed from the inner portion thereof, so the inner ridge portion #5-C in the uppermost portion thereof can be viewed with the O-rings #5-E removed from same and the grooved out inset portions extending around the inner periphery of same can also be seen. In this example of an embodiment thereof.

FIG. 48-D is a drawing of an embodiment of, the telescopic tube housing #4-B. with telescopic tubes #5-B housed therein. This both the telescopic tubes #5-B as well as the telescopic tube housing #4-B. were cut down and shortened, to only a fraction of their actual length, as well as if the telescopic tube housing #4-B was transparent, as to enable all of the internal components therein to be viewed as if fully assembled. This drawing is drawn as if the stops that restrict the upper end portions of all telescopic tubes, between the largest and smallest telescopic tube, from being retracted beyond the upper O-ring seal's, or the lower portion thereof with the ridges and groves from being retracted out of the inner portion of the telescopic tube same is riding in. Each of these stops consist of a flange. These flanges are mechanically fastened to the uppermost ridge portions of all except for the outermost and innermost telescopic tubes. The drawing included for FIG. 48-B shows these flanges #5-D as if same were removed to provide a better understanding of same. in this embodiment thereof.

The applicant's initial solution to this problem included embodiment's of rings inserted and mechanically fastened into in the inner periphery of the lowest portions of all telescopic tubes, oriented between the largest and smallest telescopic tube, and of which were mechanically fastened to, the inner wall portions thereof, and thus also removable as well allowing both assemblage and dissemblance therefrom. These flanges #5-D included in this drawing but better viewed in The drawing included in FIG. 48-D. dont have to be employed if the neutrally buoyant telescopic tubes viewable in FIGS. 48-E and 48-F are employed, in that the float portions thereof #7-B serve this purpose as well. these flanges are stops that restrict the upper end portions of all telescopic tubes, between the largest and smallest telescopic tube, from being retracted beyond the upper O-ring seal's, or the lower portion thereof with the ridges and groves from being retracted out of the inner portion of the telescopic tube, same is housed in. Each of these stops consist of a flange. These flanges are mechanically fastened to the uppermost ridge portions of all except for the outermost and innermost telescopic tubes. The basic design and engineering of these telescopic tubes included in this application are simply included as examples thereof in that the applicants very aware that these telescopic tubes could be designed and engineered in many ways, to perform the same basic task. The drawing included for FIG. 48-B shows these flanges #5-D as if employed, with same removed from the uppermost ridge portions of the two inner telescopic tubes. In this example of an embodiment thereof.

The applicant's initial design of same, included in earlier applications of same included rings inserted and mechanically fastened into in the inner periphery of the lowest portions of all telescopic tubes, oriented between the largest and smallest telescopic tube, and of which were mechanically fastened to, the inner wall portions thereof, and thus also removable as well allowing both assemblage and dissemblance therefrom. These flanges #5-D. dont have to be employed if the neutrally buoyant telescopic tubes viewable in FIGS. 48-E and 48-F are employed, in that the float portions of #7-B serve this purpose as well. In this example of an embodiment thereof.

FIG. 48-E Is a drawing of an embodiment of a telescopic tube housing #4-B, with the telescopic tubes housed therein equipped with float's #7-B. These telescopic tube floats #7-B are mechanically fastened to the uppermost ridge portions of the telescopic tubes, in the same manner as the telescopic tube flange stops included and described as removed in FIG. 48-D and re employed in FIG. 48-F These floats; when employed; render each telescopic tube as neutrally buoyant when extended out of the telescopic tube housing #4-B, and thus as weightless, relative to each other, as well as weightless, relative to the rest of contaminant cleanup and recovery equipment and the main floats #1, that provide buoyancy for same, so that regardless of how many of these telescopic tubes #4-B are being carried by same during the contaminant cleanup and recovery process, and the draft and waterline, of the main contaminant cleanup and recovery vessel, ever changing, due to the weight of the contaminants, as same is being recovered and stored therein during the floating contaminant cleanup and recovery process.

As a result of the employment of an embodiment of these floats #7-B rendering all telescopic tubes #5-B as neutrally buoyant. The waterline of the main #1 floats (Not shown) of the contaminant cleanup and recovery equipment always remains at the same level, regardless, of how many of the telescopic tubes, are pulled out of the telescopic tube housing, #4-B and being carried by the rest of the contaminant cleanup and recovery equipment, and the main #1 floats providing buoyancy for same. The elimination of the additional inertia, created as a result of the main floats #-1 additionally carrying the telescopic tubes over waves in heavy seas along with the rest of the contaminant cleanup and recovery equipment, would also provide same with a slightly higher level of efficiency in very heavy seas as well. In this example of an embodiment thereof.

The reason these telescopic tube floats #7-B are not included in many of the other drawings included in this application, is that same are simply included as optionally employable, in that the level of, operational efficiency gain-able by the employment of same would be minimal and may or may not merit their employment, in that the weight of these telescopic tubes, #5-B, are carried by the main #1 floats, of which provide buoyancy for the bulk of the contaminant cleanup and recovery equipment.

However the telescopic tube floats #7-A, employed on all of the additional smaller telescopic tubes of #5-A, that are carried by the smaller floats of #2-A and #2-B. that additionally house the intake tubes of #3-A and #3-B (None of which shown in this drawing), but included in numerous other drawings in this this application, are important, and play a much more vital role, in the provisional contribution they provide to the maintaining of the intake portion of the intake tubes #3-A and #3-B positional orientation relieve to the surface of the water and the floating contaminants being removed from same. In this example of embodiment's thereof.

FIG. 48-F is drawing of this example of an embodiment of the telescopic tubes #5-B of FIG. 48-F and others along with the housing for same #4-B, This drawing is of the exact same embodiment of the telescopic tubes #5-B as well as the telescopic tube housing #4-B as those in the drawings included in FIG. 48-B FIG. 48-D and FIG. 48-E, All are also drawn as if all of the telescopic tube housings #4-B were also all drawn as transparent to provide different views of the internal components of same. The only real exceptions being that this drawing, both shows the flange stops #5-D that are drawn as removed in FIG. 48-D. As re installed in this drawing, this drawing also shows same in a full length, instead a much shorter and wider embodiment thereof as included in FIG. 48-D. The difference between the embodiment thereof include in this drawing, and the embodiment of same included in FIG. 48-E Is simply in the employment of the telescopic tube floats #7-B, included in FIG. 48-E, have been removed in this drawing and replaced with flange stops #5-D In that example of an embodiment thereof.

The only difference between the embodiment thereof include in this drawing, and the embodiment of same included in FIG. 48-B is in the length thereof as well as the drawing included in 48-B shows same from a slightly different angle of view, as well as with the telescopic tubes housed therein being drawn as being partially extended out of telescopic tube housing for same #4-B. In this example of an embodiment thereof.

FIGS. 49-A through FIG. 49-J Includes examples of embodiment's of an additional type of contaminant cleanup ad recovery equipment, along with examples of a type of vessel, specially equipped for the effective employment of same.

FIG. 49-A is a drawing of an overhead view of an embodiment of a catamaran type of contaminant cleanup and removal vessel, equipped with, an embodiment of a type of contaminant cleanup and recovery equipment, completely different than the other two types optionally employable on the other floating contaminant cleanup and recovery vessels included in this application. Both overhead drawings of an embodiment of one of these additional types of contaminant cleanup and recovery vessels employing this new type of contaminant cleanup and recovery equipment included in FIGS. 49-A and FIG. 49-B. Show these vessels as being equipped with much of the exact same type of equipment, included in drawings included as examples of embodiment's thereof employable on other floating contaminant cleanup and recovery equipment included in this application, such as the same contaminant booms #107 as well as same stored in the same type of storage bins for same #154 as well as the exact same type of equipment, employed for the deployment and retrieval and re-storage of the contaminant containment booms This as well as containment boom towing vessels #108 stored on the decks of these vessels as well as the hydraulic lift #88 as seen in FIG. 49-A. employed for the launching and re-cradling of same among other tasks on the vessel just like all other floating contaminant cleanup and recovery vessels included in this application This simply due to the fact, that all employ the exact same mode, developed by the applicant for the effective gathering and supplying of the floating contaminants to the floating contaminant cleanup and recovery equipment employed on same, The recovery vessels themselves could also be employable with the same basic type of internal components and systems, employed in the inner hull portions of the floating contaminant cleanup and recovery vessel itself, for the removal of inadvertently captured water during the recovery process, if being employed for the removal of oil or other floating hydrocarbons, however if being employed for the cleanup and removal of contaminants more biological in nature, of course same, would likely Bennett from and intern, endure modifications to same, as well as the possibility of the incorporation of additional equipment added to same, to best effect the removal of water from the particular contaminants, the equipment on same is being employed to capture and remove the water from.

Notice that the containment removing equipment itself, In this example of an embodiment of same included on these vessels bear no resemblance to the other two types of floating containment cleanup and recovery equipment employed for the actual removing of the contaminants from the water. This simply due to the fact that this equipment, remove's the floating contaminants from the water, in a completely different mode. This equipment also does so by means of a completely different type of actual floating contaminant clean up and recovery equipment, than the aforementioned first two types of equipment included in this application. This type of equipment actually includes a conveyor #117, with the very aft portion of an embodiment of this conveyor viewable in an open equipment access aria #245 included in FIG. 49-A In this example of an embodiment thereof.

FIG. 49-B is a drawing of an overhead view of the same embodiment of the catamaran type contaminant cleanup and removal vessel, as is included in FIG. 49-A. As if the entire center portion between the two hull portions of this embodiment of a contaminant cleanup and recovery vessel, had been removed to attain a full view of the upper portion of the conveyor an embodiment of a #177. This embodiment thereof, shows this conveyor as being very long, and with same extending the full length of the vessel which may or may not be the case depending on the length of the vessel. However these drawings of this embodiment thereof, shows this conveyor portion of same extending from a pivot point for same, located in an embodiment of a combination debris extraction shroud and conveyor mounting hub #230 located on an upper, aft portion of the vessel, and with same extending downward at a gradual angle, all of the way to where the apposite end portion thereof is at an adjusted position below the water and extending, just past the forward leading edges of the inner hull portions of the contaminant cleanup and recovery vessel. #37 are the two vertical roller tracts or rods in which pivotable roller trolley portions of the end panels of each containment boom towed by the contaminant boom towing vessels, attach to, enabling same to always remain floating at the correct level relative the surface of the water as well as same being enabled to freely ride up and down over waves on same. These roller tracks or rods in this embodiment thereof would be welded both to an upper as well as to the inner stem portions of each hull just where same start to curve outward so same always maintain an enclosed seal at and below the water level at all times. The inner edge portions of each vertical roller track or rod would be positioned in close proximity but where the end attachment portions of the containment boom panels clear the outer edge portions of the conveyor at all times. In this example of an embodiment thereof.

Angular adjustment's made to the conveyor portion of the equipment, included in this example of an embodiment thereof, as well as the ability to pull same up and into a much higher position during transport, in this embodiment thereof is shown as being accomplished simply by means a chain running between a bracket attached to, forward outer side portions of the conveyor as seen in FIG. 49-J. And an open forward portion of the main deck of the vessel where this chain comes through same either over a chain roller and into, or directly through to a fair lead into the gypsy portion of a common reversible anchor windlass #242 as seen in FIG. 49-A. #245 In this embodiment thereof is shown as an equipment access aria. Of which could be located on top of the contaminant containment boom storage bins #154, or elsewhere on the vessel. However these drawings shows this embodiment of same as being located in a recessed equipment access aria between the two containment storage bins #154 and accessible by means of a walkway #247 and stairs #244 in the drawing included of the embodiment's thereof included in a FIGS. 49-A and FIG. 49-B #249 are simply small vertical panels that guide trash or other debris into debris catch bags #243 as included in FIG. 49-A and FIG. 49-B. In this example of an embodiment thereof.

The conveyor #177 portion of the floating contaminant cleanup and recovery equipment, continually pulls the contaminants out of the water, with the contaminant removal and transporting portion of this conveyor either being made of a materiel, or covered with a material that allows water to pass through, while at the same time restricts or restricts and absorbs the contaminants being captured from passing through same. This portion of the equipment is constructed of a material, or in most cases a combination of materials, and, in some cases with the surface portion thereof additionally configured in a manner specifically effective and advantageous to the removal of the type of contaminants same is being employed to capture. Thus enabling same ability to cleanup and recover, different types of contaminants, even though they possess very different, dynamics, characteristics and consistencies. This being attributable to several additional factors as well, including the interchangeability, adjustability and versatility of the cover portions conveyor itself. being easily interchangeable, or recoverable with another, made of a material, and, or, with the surface thereof, configured in a manner most effective in the removal of the type, of the contaminants being removed by same. In this example of an embodiment thereof.

This additional type of embodiment's of the contaminant cleanup and recovery vessels and equipment, like all others included in this application employs the same system that includes the forward motion of same in conjunction with additional two towing vessels towing contaminant containment booms to gather and supply the contaminates to the contaminant cleanup and recovery equipment it self, in that not only is this equipment employed capable of being employed while achieving substantial forward motion through the water, that the contaminants are being removed from, but this equipment like all other types and embodiment's of variations thereof, included in this application, are devised in ways that benefit from and actually employ the currents created, to the benefit to the efficiency attainable during the employment of same, in many ways.

FIG. 49-C. Includes a drawing of a rear view of an embodiment of the same contaminant cleanup and recovery vessel, equipped with the same contaminant cleanup and recovery equipment, as is included in FIGS. 49-A. and FIG. 49-B. This drawing simply providing a better view of different angles, of many of the equipment embodiment's of those also included in FIGS. 49-A. and FIG. 49-B. this drawing provides a good view of an embodiment of an external drive motor #237 as well as the conveyor drive chain #236 and the sprocket #246 powering the conveyor portion of this equipment itself in this embodiment thereof. This drawing also provides a good view of bottom portions this embodiment of this conveyor #177 extending through an open opening in a portion of the deck in the equipment access aria #245 located in a lower recessed aria between the two contaminant containment boom storage bins #154, in this embodiment thereof, This drawing also provides a much better view of the small vertical panels and shoot #249 in which large debris removed from the upper leading edge of the opening portion of the combination debris extraction shroud and conveyor mounting hub #230, where the upper portion of the conveyor first inters same and larger debris floating in and along with the contaminants and therefore captured along with same, are removed from the upper portion of the conveyor. simply due to the size of same, are channeled down, the back outer portion, of the combination debris extraction shroud and conveyor mounting hub #230 and simply into removable and replaceable storage bags inside open trash containers for same. In this embodiment thereof.

This embodiment of the said small vertical panels and shoot #249 in this embodiment thereof, would be either welded to, or simply made as an integral portion of the upper and back outer portions of the combination debris extraction shroud and mounting hub #230. The inner lower portion of the combination debris extraction shroud and mounting hub #230, is shown as being configured in a manner that channels the contaminants removed from the bottom surface portion of the conveyor #177 down through an opening in the mounting base portion of the combination debris extraction shroud and conveyor mounting hub #230, as well as the deck same is mounted to. A by-directional pumping evacuation pump #250 is included in this embodiment thereof, with the open intake portion of this pump, through bolted over said opening on the bottom side of the deck, in a manner in which all captured contaminants are pulled directly into the intake portion of this by-directional pumping evacuation pump #250, capable of pumping the contaminants captured through either outlet end portions thereof, simply by means of a switch, employed to revers the polarity of the current powering the drive motor portion of same. Thus enabling the person employing said switch being capable of optionally pumping the contaminants captured through a choice of either outlet flange portion of the by-directional pumping evacuation pump #250, mechanically fastened to flange portions, on the end of each conduit #251 and thus into a choice of either hull of the vessel and through the distribution manifolds in an inner portion of each, directing the captured contaminants to a choice of storage and, or water separation tanks, or to other equipment located in the hulls of the vessel needful to effect the further processing or distribution of same. In this example of an embodiment thereof.

FIG. 49-D Includes a drawing of a profile view, of the same embodiment of the contaminant cleanup and recovery vessel, equipped with the same contaminant cleanup and recovery equipment, as is included in FIGS. 49-A. through FIG. 49-F. This drawing shows same as if the starboard hull, as well as the wheelhouse and contaminant containment boom storage bins, were removed from the vessel, to provide of a better view of portions of the contaminant cleanup and recovery equipment employed on this embodiment of same. This profile cut away view of this portion of this vessel and the contaminant cleanup and removal equipment employed thereon provides a better view of many of the basic components comprising this embodiment thereof #241. Is the chain employed on this embodiment of the contaminant cleanup and recovery vessel that runs up to the standard anchor windlass. The description for same also included in the description for the drawing in FIG. 49-A. That's employed for the raising and lowering of the conveyor #177. To best effect the level of efficiency achievable relative to sea conditions, and the type of contaminants being removed by same. This as well as for maintaining the conveyor portion of the equipment at the same depth relative to the surface of the water as the draft of the vessel changes due to the weight of the contaminants recovered fill up the vessel. The speed in which the moving portion of this conveyor removes and transports the contaminants to their point of removal from same, would also be adjustable by means of a rheostat or other regulating the voltage, and thus speed of the drive motor. to best effect the level of efficiency attainable relative to the same conditions as well, in this example of an embodiment thereof.

FIG. 49-E. Includes a drawing of a profile view, of a portion of the same embodiment of the contaminant cleanup and recovery equipment, as is included in FIGS. 49-A. through FIG. 49-D. This drawing was added simply to provide, the same, but a bit larger profile view of this portion of the contaminant cleanup and recovery equipment, included in FIGS. 49-D simply to provide better view of some of the basic components comprising this embodiment thereof. There are actually two different embodiment's of the conveyor portions of this equipment included in this application. Both of which employ stainless steel grated conveyors, in which not only allow water to freely pass through them, but same are also very ridged laterally as well as light relative to the strength same possess. Both embodiment's thereof included in this application employ, easily interchangeable covers made out of materials best suited for the type of contaminants being removed from the water, the only difference between the first and second basic types of covers included in this application, being the mode in which same are attached to the stainless steel grating portion of these conveyors, and the only real differences between the first and second basic embodiment's of the conveyors included in this application being modifications made to each to best employ the two basic versions of the covers for same included in this appellation. In this example of an embodiment thereof.

This the first version of an embodiment thereof, doesn't actually include any provisions of any sort, nor, is same employable with a cover for same, mechanically fastened to the actual stainless steel grated moving portion of this embodiment of the conveyor at all. In that tests performed on materials tested show that there simply is no need what so ever to do so. This simply due to the angles relative to the surface of the water the conveyor portion of this contaminant cleanup and recovery equipment was devised to be employed, which firmly holds the covers employed on same to the upper grated surface of the conveyor extremely well, both due to friction created by the weight of same both on the upper surface of the conveyor as well as the weight of the portion of same returning down the back side of the conveyor literally adding to the weight of the cover on the top surface of the conveyor at the same time, this along with even additional forces created as a result of water passing through and draining out of same during the entire time same is being employed actually creates many times the actual forces needed to keep same firmly in place during the entire employment process of same. However assurances of these things these hadn't become fully evident until sections of covers were being made and tested out of materials employable on sections of same. and the full dynamics of same could be realized. In this example of an embodiment thereof.

However before these things became fully evident the applicant had already developed a mode enabling the firm securement of covers constructed of any type of material to be securely fastened to same without hindering the level of operational functionality to the conveyor portions of the contaminant cleanup and recovery equipment in any way. As a result thereof the conveyor and cover modifications enabling same were added to this application and included in FIGS. 49-G through FIGS. 49-I as well as FIG. 49-L.

This drawing includes the aforementioned first embodiment, of a conveyor, and of which like the drawings of the second embodiment thereof, shows the drive motor for the conveyor portion of this embodiment of the equipment #237. As well as the chain and sprockets for same #247. as being separately stationed and mounted, as well as the pivot point for the conveyor portion of this embodiment thereof, actually showing same being, extended end portions of a very heavy duty shaft for the main drive roller #253. Which may or may not be included as the pivot point for same in the final design of same. This conveyor drive roller best viewed in the drawing of same removed in in a portion of FIG. 49-I for the conveyor portion of this embodiment thereof. In addition to these extra long end portions of the shaft for the conveyor drive roller, extending through the bearings for same in each side of the end portion of the framework for the conveyor itself. This embodiment thereof also includes the outer portions of these extra long end portions of the shaft for this conveyor drive roller, additionally extending through an additional cheek bearing portions of a re-enforced side portion of each side of the combination debris extraction shroud and conveyor mounting hub #230, and thus becoming the pivot point for same. Of course this shaft as well as all portions the combination debris extraction shroud and conveyor mounting hub #230, in this embodiment thereof would be very strongly constructed and anchored in accordance, with same easily being capable of withstanding the forces encounterable during the employment of same. In this embodiment thereof. Of course this drive motor could be either mounted inside the framework of the conveyor but same was drawn in this manner, to better access the drive motor than if same was mounted behind the compression plate #234 as well as the mounts for same. The bottom surface portion of this embodiment of the compression plate #234 extends across the outer moving surface portions of the conveyor with the mounting brackets for same extending outward and up around the outer side moving portions of this embodiment of the conveyor and solidly mount to outer side portions of the framework of same, in a manner in which the outer moving portions of the conveyor #177, ride across the inner portions of the compression plate #234 and the inner surface of the cover employed on same rides over the outer surface portions thereof. During this process, the contaminant extraction blade #236, of which in this embodiment thereof includes a plate or blade that extends across the conveyor cover and in this embodiment thereof and of which is employed simply as a device that continually applies pressure across the conveyor cover, as same goes over said compression plate #234 and intern squeezes the contaminants out of the conveyor covering and into the inner portions of the combination debris extraction shroud. An interchangeable alternative to the employment of the contaminant extraction blade, comprising an embodiment thereof, employing a roller instead of a blade to compressably squeeze the cover between same and the compression plate, could be employed for the same purpose, but only as applicable as optionally employable for the extraction of some hydro carbon type contaminants. In this example of an embodiment thereof.

FIG. 49-F. on the lower portion if this page, Includes a drawing of an overhead view of an embodiment, of the combination debris extraction shroud and conveyor mounting hub #230, as well as an embodiment of the moving portion of the conveyor portion of the contaminant cleanup and recovery equipment. as is included in the embodiment's thereof included in FIGS. 49-A through FIG. 49-E This drawing of this embodiment thereof shows this conveyor #177 as if same was of a version thereof that employs the easiest of interchangeable type of covers for same, but as if the cover for same had been removed to view the stainless steel grated moving portion of this conveyor, that would both, allow water to freely flow through same, as will as provide same with ample lateral strength and stability. In this example of an embodiment thereof.

FIG. 49-G. Includes a drawing of a profile view, of a portion of an embodiment of a conveyor portion the contaminant cleanup and recovery equipment, embodiment of same are also included in FIGS. 49-H. and FIG. 49-I. as well as an embodiment of cover for same included in FIG. 49-L and of which being what was previously referred as the embodiment of a conveyor equipped for the actual mechanical fastening of embodiment's of the conveyor covers, to the outer edges of the stainless steel grated moving portions of this embodiment of the conveyor. However This design of this actual embodiment of same, will likely never actually be put into service, due to the lack of need for the cover portions of same to actually be mechanically fastened to the moving portion of the conveyor it self. In this example of an embodiment thereof.

This drawing was added simply to provide, large profile view of an embodiment of some of the basic components comprising this embodiment of a conveyor, that's also employable with an embodiment of said easily interchangeable covers for the moving portion of this embodiment of the conveyor portion of the contaminant cleanup and recovery equipment This embodiment thereof includes a plurality of grommets along the outer edges of same providing same with attachment points, with this drawing of an embodiment thereof, showing same as being attached to slightly raised portions of the outer edges of a stainless steel grated moving portions of this embodiment of the conveyor by means of heavy duty wire ties #255 with the tails cut off. This simply being one design of this cover for same as well as a method for the quick and easy attachment of said cover, although of course same could be designed and attached many other ways, as well as with other types of fasteners, but the attachment of the cover, in this manner makes this portion of the conveyor very easily clipped and removed and another type of same to be quickly and easily replaced and refastened to same.

One of the mounting brackets attaching an embodiment of a compression plate #235 to a portion of the framework for the conveyor itself is shown as the dotted line outlining same. These brackets for an embodiment of a compression plate #235, would extend between the individual sections of the actual moving portions of this conveyor and be mechanically fastened to portions of the framework for the conveyor in a manner in which the outer moving portions of the conveyor #177 ride across the inner portions of the compression plate #235 and the inner surface of the cover for same rides over the outer surface of thereof. During this process, This drawing an embodiment of a contaminant extraction blade #236, is a bit larger than the drawing of same included in FIG. 49-E, and thus this drawing of this same basic embodiment thereof as is included in FIG. 49-E, provides a better view of a plate or blade portion thereof that extends across the conveyor cover and applies pressure to same, as the cover portion of the conveyor. In this embodiment of same goes over this embodiment of a compression plate #235 in the same manner same goes over plate another embodiment thereof #234, and intern squeezes the contaminants out of this embodiment of a conveyor cover and into the inner portions of the combination debris extraction shroud (not shown in this drawing). this embodiment of a contaminant extraction blade #236 is simply shown as being of a very simplistic non adjustable design, However although same likely employing springs of one sort or another the tension of the springs employed would likely be of a design, in which the tension applied by same would be adjustable.

#265 in this drawing of an embodiment of a is a flexible seal, either mechanically fastened to of inserted into a mounting rail for same that's either mechanically fastened, or welded to the outer, upper, side portions of the framework portions of the conveyor, in this embodiment thereof and extend from same upward just under the outer periphery portions of the conveyor cover and thus create a flexible seal between the outermost portions of the cover on the conveyor itself and the inner most vertical surfaces of the two hulls of the floating contaminant cleanup recovery vessel, equipped for the employment of same. This embodiment of a seal, if employed intern would restrict any contaminants trying to escape capture, through any possible gaps between the outer most periphery of the conveyor cover and the two inner most surfaces of the two hulls of the vessel instead of remaining captured on the surface of the conveyor, or cover itself from escaping back into the water between the two hulls of the vessel, This embodiment of a flexible seal would simply cause same to simply run back down the small channel created on top of the flexible seal between the outermost portions of the cover or portions of the conveyor itself and the inner most vertical surfaces of the two hulls of the floating contaminant cleanup recovery vessel, and simply be recaptured on the top of the conveyor cover in this embodiment thereof during the normal contaminant cleanup and recovery operation.

An embodiment of another type of a flexible seal on the outer periphery of an embodiment of mechanically fastenable conveyor cover is included in FIG. 49-L. An embodiment of a non-mechanically fastenable conveyor cover with a small flexible seal extending around the outer periphery portions of same. In this example of an embodiment thereof, is also included in FIG. 49-K FIG. 49-H. simply includes a drawing of the bottom surface portion of an embodiment of a compression plate #235 employable on this embodiment of the conveyor with the two mounting brackets for same being viewable on this side of same, another embodiment of same could simply have only one bracket down the center of same, and thus only employing two, sections of the stainless steel grated moving portions of the conveyor as well. In this example of an embodiment thereof.

FIG. 49-I. Includes a drawing of the outer surface portion of an embodiment of a compression plate #235 of FIG. 49-H. with the bracket portions of same of this embodiment thereof extended down and between, the outer bottom surface portions of the stainless steel grated moving portions of the conveyor #177, This drawing also includes an embodiment of a conveyor drive roller #253 as well as an embodiment of a free wheeling roller, #254 removed from the apposite end of the conveyor, as if both, had been removed from the bearings in the framework portion of the conveyor, to better view same. Notice these embodiment's thereof include raised teeth extending across the circumstance of same insuring, all three individual moving sections of the stainless steel grated portions of the conveyor turn simultaneously with each other. This portion of the drawing also shows an embodiment of the drive motor #237 and the sprockets and chain #247, as if same had also been removed. Notice this embodiment of both the drive roller as well as the free wheeling roller #254 removed from the apposite end of the framework portion of the conveyor of this embodiment thereof, both includes raised sections that extend up between the individual moving sections of the stainless steel grated conveyor sections. These raised portions simply act as spacers maintain the three separate stainless steel grated sections of the moving portions of the conveyor properly spaced and in alignment with lineal spacers #257 welded to outer portions of the entire length of the bottom outer surface portion of the framework, of this embodiment of the conveyor, between the end portion of the compression plate #235, and the upper outer surface portion of the framework of the conveyor to the free wheeling roller #254 on the very end portion of the conveyor The (not seen in this drawing thereof. However if viewable, same would include and. with the raised portions of all spacers, extending up between and even with the outer surface portions of the moving sections of the stainless steel grated conveyor sections. This embodiment thereof also includes sections of these raised lineal spacers #257, welded to outer upper portions of the framework, between a series of smaller rollers #258 extending laterally across upper portions of the conveyor and under all three of the stainless steel grated sections of the moving portions of the conveyor and thus providing friction free support during the employment of same in this embodiment of the conveyor. In this example of an embodiment thereof.

This embodiment thereof actually includes three separate stainless steel grated moving portions of this conveyor, however this version of same would more than likely only be two, However same would be employable with two or more, in this embodiment thereof, depending on how mounting brackets are employed on the back side of the compression plate #235. The only reason that this embodiment of the conveyor includes more than one section of the stainless steel grated moving portion of the conveyor in this embodiment thereof, is due to the interchangeable covers employable on this embodiment thereof actually being mechanically fastenable to the stainless steel moving portion of this embodiment conveyor for same.

This drawing also provides an overhead view of an embodiment, of the flexible seal, #265 included in the more detailed description of a partial profile view of same in FIG. 49-G, This drawing provides only the outer edge portion of this this overhead view of same embodiment of FIG. 49-G. extend out from just under and at a slight angle upward and sticking out a very short distance beyond the lower edges of the outer periphery of the stainless steel grated side portions of the conveyor, which would be directly under the outer periphery portions of the conveyor cover itself if a cover was installed on same, in that this flexible seal between would insure a seal between the outermost portions of the cover on the conveyor itself and the inner most vertical surfaces of the two hulls of the floating contaminant cleanup recovery vessel, equipped for the operational employment of same, by means of restricting any contaminants trying to escape capture, through any possible gaps between the outer most periphery of the conveyor cover itself and the two vertical inner most surfaces of the two hulls of the vessel.

Another far more simplistic embodiment of the conveyor portion of the contaminant cleanup and recovery equipment, included in FIG. 49-I that although far more subject to ware, would still provide all of the separate sections of stainless steel grated moving portions of the conveyor, portion, of the contaminant cleanup and recovery equipment, with full support, as well as the likelihood of, very trouble free operational employment of same, would simply be accomplished by means of replacing all of the smaller rollers #258 under the stainless steel grated moving portions of the conveyor as well as the spacers #257, between same, with very simple tracks, constructed of sections of right angle polished stainless steel or other, lineally welded or affixed to the outer framework portions of the conveyor, and properly spaced across the lateral span thereof, making up the tracks for each, of the individual stainless steel grated moving portions of the conveyor, in a manner in which, the outer edge portions, of each, are maintained and confined in the inner vertical portions, and slide on. the inner horizontal surface portions, of the right angle sections of polished stainless steel or other, of an embodiment of a more simplistic embodiment of a conveyor portion of the contaminant cleanup and recovery equipment.

FIG. 49-J. Includes a drawing of a profile view, of an embodiment of a conveyor portion of the same type of contaminant cleanup and recovery equipment included in FIGS. 49-A through FIG. 49-F This drawing thereof includes a bracket attached to, forward, outer side portions of this conveyor, with the upper portion of this bracket extending across the forward upper portion of the conveyor. This drawing also includes a small section of chain #241 simply to show the attachment point of same in this embodiment thereof. The other end of this chain runs up to a standard reversible anchor windless #242 as seen in FIG. 49-A. employed to adjust both elevation as well as the angle relative to the surface of the water of the conveyor portion of this contaminant cleanup and recovery equipment.

This drawing of an embodiment of the conveyor portion of the contaminant cleanup and recovery equipment, shows same as also including a plurality of mounting brackets with end portions of rollers #259 mounted to same and extending laterally across outer bottom surface portions of the stainless steel grated moving portion of the conveyor with the brackets for same mechanically fastened, or welded to a low outer portion of the framework portion of this embodiment of the conveyor. These rollers may, but will most likely, not actually be employed, in that the only reason that this embodiment thereof was included was simply provide an optionally employable mode, to insure that the outer cover for same wouldn't hang very far below, the stainless steel grated moving portion of the conveyor, as same travels down the back side of the conveyor during the employment of same. This simply due to the covers employable for this embodiment thereof, not actually an embodiment thereof that's mechanically fastened to the stainless steel grated moving portions of this embodiment of the conveyor in any way. However, this should prove to be a non issue, simply due to the mode employed for the installation of the cover portion of the conveyor, to the stainless steel moving portion of the conveyor, insures a very tight fit to same. In this example of an embodiment of same.

FIG. 49-K. Includes a drawing of an overhead view of an embodiment of one of many optional variations of the covers employable on embodiment's of the grated moving and transporting portions of the conveyors, and of which are made of materials that allow water to freely pass through while at the same time restrict, and in some types thereof also comprise materials that additionally absorb the types of contaminants same are made to cleanup and remove. This drawing includes an embodiment of a conveyor cover, that's additionally textured with external fibers or in another manner, that even further improves the levels of efficiency and, or, rates and volumes of recovery attainable. This cover portion of the conveyor portion of the contaminant cleanup and recovering equipment, is of the type, that are not actually mechanically fastened to same, in any way, but instead these cover portions of the conveyor them selves are secured to the surface portion the grated moving and transporting portion of conveyor, simply by means, of friction and gravity, created both, by means of the weight of the cover on the upper surface portion of the grated moving and transporting portion of conveyor it self, as well the additional friction created as a result of the manner in which the cover portion of same, tightly secured around the stainless steel grated portion of the conveyor due in part to the installation process of same. The positional orientation of this embodiment of a cover portion of the conveyor is also maintained on the center of the surface portion, of the stainless steel grated moving and transporting portion of the conveyor, simply by means, and as a result of, same being of a width, in which the outer periphery portions thereof possess a fairly snug fit, between the two vertical inner side portions of the two hulls of the vessel. This drawing of a portion of this embodiment a conveyor cover additionally includes a flexible seal. #267 made of a small strip of neoprene, or other, affixed to the outer periphery portions of each side of same as well, thus further insuring a seal between same and the two vertical inner side portions of the two hulls of the contaminant cleanup and recovery vessel, employing same. In this example of an embodiment thereof.

FIG. 49-L. Includes a drawing of an overhead view of an embodiment of another one of many variations of conveyor covers employable on an embodiment of the same basic type of conveyor as embodiment s thereof included in FIGS. 49-G and FIG. 49-I. referred to as an additional, or second embodiment thereof.

All drawings of examples of embodiment's of conveyor covers included in this application, simply comprise examples of various optionally employable embodiment's of the portion of the contaminant cleanup and removal equipment that ride on top of embodiment's, of the stainless steel grated surface portion of the moving and transporting portion of conveyor, simply by means, with these easily interchangable cover portions of same, affixed to the surface portions of the said stainless steel grated surface portions of the conveyor, by means of heavy duty wire or cable ties, or another type of mechanical fasteners, in this embodiment thereof and by means of friction and gravity alone in an embodiment thereof included in FIG. 49-K. However all variations thereof comprise the portion of the conveyor in which the contaminants are deposited and captured, on while at the same time the captured contaminants are transported, up to the contaminants point of removal and removed from same. and after which continues around the back side of the conveyor and around the forward end, where this portion of the conveyor cover repeats this ongoing process, where the lower portion of the conveyor cover is continually being covered and re saturated with the type of contaminants being removed from the waters being cleaned up at the same time same is continually having any residual water drained through and out of the backside of same on its way back to where again and again the contaminants are being continually being removed from same. In this example of an embodiment thereof.

These embodiments of the cover portions of this conveyor are made of a material, or as in most cases comprise a combination of materials, that in most cases, allow water to pass through the cover portion of the conveyor, while at the same time restrict the contaminants being captured from passing through same. This portion of the equipment in some applications are not only constructed of materials specifically most effective to the type of contaminants being removed, but the surface portions of same are also configured in a manner or covered with strands or fibers constructed of a material additionally advantageous and specific to the type of contaminants the cover is designed and equipped to capture. such as the drawing of the embodiment thereof included in FIG. 49-K The only difference between whats been referred to, for reference purposes as the first embodiment thereof as included in FIGS. 49-J and FIG. 49K, and the second basic type of conveyors cover, included in this drawing of an embodiment thereof, being the mode in which same are attached to the stainless steel grating portion of these conveyors, and the only real differences between the first and second basic embodiment's of the conveyors included in this application being modifications made to each to best employ the two basic versions of the covers for same included in this appellation. This the second basic embodiment types of these conveyor covers are actually mechanically fastenable to the stainless steel grated moving portions of this embodiment of the conveyor, With this embodiment thereof, including the attachment points for same in this embodiment thereof as consisting of small grommets #234 located on the very outer edge portions of the cover and with the attachment points for same simply comprising a series of holes in a raised portion of the outer edge portions of the stainless steel grated moving and transporting portions of the embodiment of the conveyor equipped to employ same.

This embodiment of a mechanically fastenable cover portion an embodiment of the conveyor, additionally includes a seal, provided for same simply by means of a narrow strip of neoprene or other. #264 with an example of an embodiment thereof included in this drawing of FIG. 49-L. In which the inner most edge of same in this embodiment thereof is affixed to the upper, outer surface portions of the conveyor cover itself with the inboard edges of same, referenced as solid lines just inboard of the grommets, or other fastening points of the cover if included, and extending around the outermost periphery portions of the cover. Referenced as the dotted lines, which indicate the outer most portions of the cover itself, The outermost sealing portion of this seal is referenced as the solid outermost lines. This seal is attached to the cover portion of the conveyor, in this manner, both to maintain the easy attach ability, of the cover portion of the conveyor to the attachment points for same on the slightly raised outer edge portions of the of the stainless steel grated moving and transporting portions of the conveyor equipped to employ same, simply by means of lifting the outer edge portions of seal #264, while attaching the cover portion thereof to same. In this example of an embodiment thereof.

FIG. 49-M. Includes a drawing of an overhead view of an embodiment of a contaminant cleanup and recovery vessel of the same basic type and size as the embodiment thereof included in FIG. 49-A, With this drawing thereof showing same as if this embodiment thereof was being employed to ether to cleanup a spill such a diesel fuel or oil, or a spill out at sea. Or as if same was being employed to remove contaminants more biological in nature such as cyanobacteria or whats commonly refereed to, as toxic blue green algae blooms. from a large lake or inland waterway. In this example of an embodiment thereof.

FIG. 50. Includes a drawing of an overhead view of another embodiment of the same basic type on floating contaminant cleanup and recovery vessel, and of which is equipped with, all of the same basic type of floating contaminant cleanup and recovery equipment, as the embodiment's thereof included in FIGS. 49-A through FIG. 49-M. This embodiment thereof was included as an optional variation, of the same basic type of floating contaminant cleanup and recovery vessel as included in FIGS. 49-A and 49-B. This embodiment of an optional variation thereof, at this time actually remains untested. However notice this embodiment thereof shares many things common, with the first two types of floating contaminant cleanup and recovery equipment, also included in this application, of which have been extensive tested. In fact the modifications included in this embodiment thereof, were primarily added simply as a result of knowledge acquired along with numerous ongoing successes and advancements made during the process of developing, both the first and second types of floating contaminant cleanup and recovery equipment, also included in this application. A couple of these similarities including the equipment's mode of capturing the contaminants from behind and to the sides, of the actual entry point for the floating contaminants being captured. Another similarity being in the provision and employment, of contaminant deflection and contaminant containment panels. in a manner that not only controls the currents created by means of the system created for the employment of all floating contaminant cleanup and recovery equipment included in this application which employ's the combined forward motion of both the floating contaminant cleanup and recovery vessel along with two containment boom towing vessels towing contaminant containment booms gathering channeling and concentrating the floating contaminants between same back to the floating contaminant cleanup and recovery equipment. developed for the employment of all included in this application, with all employing same to the utmost advantage to the type of equipment devised and developed by the applicant for the employment of same.

The employment of contaminant deflection and contaminant containment panels. by means and in the manner in which same are employed by the first two types of floating contaminant cleanup and recovery equipment included in this application proved to be extremely effective in their ability to manipulate and control currents in extremely effective and advantageous ways by means of the implementation of same in an advantageous orientational manner to the advancement of the level of efficiency and service providable by the first and second types of floating contaminant cleanup and recovery equipment also included in this application, which provides same with several very significant and effective characteristics that contribute greatly to the levels of efficiency attainable by the. The first of which acquired by means of the surface currents along with the contaminants floating thereon being met by a series of deflection panels of which same comes up against and then is forced around the process of which not only smooths out surface chop, to a major extent, but even has a significant effect to the smoothing out and even taming wave action, to a certain extent, simply by means of the process of the surface currents coming up against same and being forced to change direction several times before the surface portion of the currents along with the contaminants floating thereon makes its way back to the aft portion of the equipment where same are temporarily halted, as a result of same reaching and abutting up against the contaminant containment panel stationed in the furthest aft portion of the contaminant cleanup and recovery equipment, The process of which not only contributing greatly to the, even further smoothing out of the surface of the water, this process also causes surface currents along with the contaminants floating thereon to simply be carried along on the surface of the water along with the rest of the floating contaminant cleanup and recovery equipment, while at the same time the deeper currents under the lower portion of the contaminant containment panel simply passes under same, as the floating contaminants are pulled back forward and from behind and each side, into the intake portion or portions of the equipment. In this example of an embodiment thereof.

However although the serious reduction of surface chop as well as the smoothing effect the contaminant deflection and containment panels have on the rest of the surface of the water, being advantageous to this. The third actual type of floating contaminant cleanup and recovery equipment included in this application. However the presents of surface chop during the employment of this new type of floating contaminant cleanup and recovery equipment has far less effect on the performance of same.

This example of an additional embodiment, of this, the third type or variation of the contaminant cleanup and recovery equipment and vessels equipped for the employment of same included in this application, may, or may not ever be implemented, simply due to the profound level of efficiency attainable by means of the much more simplistic and more easily developable variation of embodiment's of same, included in FIGS. 49-A and FIG. 49-B This as well as the far less effect that wave action and surface chop actually has on the level of efficiency attainable by this, the third type of contaminant cleanup and recovery equipment included in this application. However the additional advantage attainable by means of the implementation of same, in the far greater level, of over all control same provides, especially in very heavy and adverse sea conditions, may well merit the implementation of same in some applications and roles of employment of this or a similar embodiment thereof.

This additional design or variation of this embodiment of the third actual type of floating contaminant cleanup and recovery equipment included in this drawing Possesses some distinct differences between the examples of another variation thereof included in FIGS. 40-A and 49-B. The first very obvious difference being in the actual conveyor portion, of this embodiment of the floating contaminant cleanup and recovery equipment is mounted on this embodiment of a floating contaminant cleanup and recovery vessel, and the positional orientation of same, actually faceting the apposite direction, than the embodiment's thereof included in FIGS. 49-A and 49-B relative to the embodiment of the floating contaminant cleanup and recovery vessel same is employed on this embodiment thereof including the lower portion of the of the conveyor, that actually extends down under the water, where the floating contaminants are initially deposited on the upper surface portion of same, as well as the upper end portion of same wherein the contaminants are extracted therefrom are positionally oriented on apposite end portions of the vessel same are employed on, This drawing shows the higher apposite end portion of the conveyor as being stationed forward on the port side of the vessel, however, this conveyor portion of the floating contaminant cleanup and recovery equipment employed of same could just as easily extend back 180 degrees to the opposite side of the vessel or oriented on the contaminant cleanup and recovery vessel at another angle more advantageous to the employment of same just as easily. This simply due to the actual advantage provided to the possible level of efficiency attainable by means of the current and sea condition manipulation by same, of which is primarily acquired by means of the mode and employment of the contaminant deflection and contaminant containment panels, and the mode in which same both halts and changes of the direction of currents and seas. by means of the implantation and orientation of same. In this embodiment thereof.

Notice this embodiment of a floating contaminant cleanup and recovery vessel, allows the floating contaminants entering between the two vertical roller tracks or rods #37 in which the end panel portions of the contaminant booms attach to, and slide up and down on, to travel all of the way back between the two inner portions of the hulls to the very aft portion of this embodiment of a floating contaminant cleanup and recovery vessel where same is restricted from exciting through same, by means of an embodiment of a vertically adjustable combination of a contaminant containment and contaminant deflection panel. #271. positionally orientated in a manner in which same bridges the span between the two inner portions of the hulls of the vessel, in this embodiment thereof. With elevation and thus the adjustable depth of lower portion of same, as well as the ability to take same in and out of service provided by means of a hydraulic cylinder and ram #270. Of which the end of the hydraulic ram portion of same would include a mechanical attachment to a top portion of in this embodiment of a combination of a contaminant containment and contaminant deflection panel #271. The lower cylinder portion of this hydraulic cylinder in this embodiment thereof is shown as if same was mounted upside down with the bottom portion of hydraulic cylinder #270 mounted to an upper, outer portion of the back side of one of the two contaminant containment boom storage bins #154. An end of the ram portion of same in this embodiment thereof would also include a mechanical attachment to a top portion of in this embodiment of a combination contaminant containment and containment deflection panel #271. Thus by means of the employment of same the lower portion of panel #271 is adjustable down, to positions most efficient extending under the water both to restrict the surface portion the water, along with the contaminants floating thereon, from passing through and between the two hulls of the floating contaminant cleanup and recovery vessel, in this embodiment thereof.

This as well as to deflect same through an open panel #269 in an aft portion of the inner freebord portion of the port hull. In this embodiment thereof, and opening into a passageway #275, This passageway extends through an inner aft portion of the port hull in this embodiment thereof. This passageway #275 is also sealed from the rest of the inner portions of the hull of the vessel, but provides full passage of the water and contaminants floating thereon over to the conveyor portion of the floating contaminant cleanup and recovery equipment in this embodiment thereof and employed for the removal of same, as well as the lower portions of the water carrying same out of the opening under the lowest portion of the third contaminant containment panel #273. located forward of the lower end portion of this embodiment of the conveyor portion of the floating contaminant cleanup and recovery equipment. With the rate and speed of the currents carrying and transporting the floating contaminants over and onto the upper surface portion of this embodiment of the conveyor, regulatable by means of depth and elevation adjustment differences of contaminant containment panel #273 and the embodiment of the combination contaminant containment and contaminant deflection panel. #271. In this example of an embodiment thereof.

The elevation of second panel #269. As well as sames ability to be completely closed is provided for same in this embodiment thereof by means of a hydraulic cylinder and ram #268. This embodiment thereof is shown as if same was mounted upside down with the bottom portion of hydraulic cylinder #268 mounter to an upper, outer portion of the side of the port contaminant containment boom storage bin #154. with an end of the ram portion of same possessing a mechanical attachment to a top portion of in this embodiment of the contaminant containment panel #269. This is a long panel extending the greatest portion of the distance between just below the waterline of the vessel when empty and extending upwards to a point above the waterline when the vessel is fully loaded, in this embodiment thereof. This panel is located on an inner aft freebord portion of the port hull in this embodiment thereof and when open leads to an open passageway, sealed from the rest of the vessel and extends over to the conveyor portion of the floating contaminant cleanup and recovery equipment employed on same, in this embodiment thereof. This drawing shows this passageway as being open and viewable from above the vessel which may or may not be the case in those actually developed and employed. However, this passageway would extends upwards at least to a point above the waterline when the vessel is fully loaded and below the waterline of the vessel when empty, in this embodiment of same.

This panel #269, is included both for the purpose of opening same and in most cases simply leaving same all of the way open when in service and closing, this panel and leaving same closed when the vessels in transit, or resting dockside. Although this panel could also be adjusted to a position most beneficial above the surface of the water in the case of very heavy seas, to knock down the upper portion of waves and better maintain the level of the seas passing through same and interning into the aria where the contaminants are removed from the surface of same. by means of conveyor #177 in this embodiment of contaminant containment panel #269. although the employment of same in this manner would be totally unnecessary.

The hydraulic cylinder and ram #272 in this embodiment thereof is also shown as if same was mounter upside down with the bottom portion of hydraulic cylinder #272 mounted to an upper, inner portion of the floating contaminant cleanup and recovery vessel and above the main deck of same, with an end of the ram portion of same possessing a mechanical attachment to a top portion of an embodiment of another contaminant containment panel 273. This embodiment of same is also a fairly long panel extending the greatest portion of the distance between and just below the waterline of the vessel when empty and extending upwards to another optional point of adjustability below the waterline and under the contaminants floating thereon when the vessel is fully loaded, in this embodiment thereof. This embodiment of a contaminant containment panel #273 is located on an outer aft freebord portion of the port hull in this embodiment thereof in a manner in which when employed is adjusted by means of hydraulic cylinder and ram #272 to a position under the waterline of high efficiency, wherein the bottom portion of the panel extending under the water, both halts the currents on the upper portion of the water, along with the contaminants floating thereon, as well as, provides an exit point for the water under same, to flow back into the body of water from which the floating contaminants were removed in a continuous cycle wherein additional water passing through passageway #275 and out of the exit point for same, in the outer freebord portion of the port hull of this embodiment of a contaminant cleanup and recovery vessel where same would be continually carrying additional contaminants on the surface of the water back to and continually depositing same on the upper surface portion of the conveyor portion of the floating contaminant cleanup and recovery equipment in this embodiment of the floating contaminant cleanup and recovery vessel.

This contaminant containment panel #273 as well as the combination containment and contaminant deflection panel #271 would easily and probably would be equipped with water depth gauges along with the monitors for same, as well as the controls for the hydraulic cylinders and rams #270, 272. For same and probably also for panel #268 as well located together on the bridge or elsewhere on the vessel and probably along with a display providing a view. of same provided by means of Surveillance cameras stationed at advantageous vantage points of same, as well as of the conveyor portion of the equipment to view of the recovery operation in process for that matter.

#274 is simply an embodiment of partial cowling mounted around the outer perimeter of the opening provided by contaminant panel #273 in the outer aft portion of the freebord portion of the hull of the vessel itself in this embodiment thereof. Cowlings of this nature around water as well as exhaust exit points are usually employed only on very fast vessels for the purpose of redirecting water running along the sides or bottom portions of a vessel out and away from the open exit point of same. when traveling at very high speeds and of which the employment of same creates very low pressure over the opening same is around which intern literally pulls the water or exhaust through same. A cowling of this nature would likely never actually see employment on any embodiment's of the floating contaminant cleanup and recovers vessels of this nature simply due to the lack of need of same however same were simply added to these drawings to show cowlings of this nature as optionally employable if deemed as being beneficial to the employment of same.

FIG. 51-A. Includes a drawing of an overhead view an embodiment of a type of equipment that would usually employ much smaller versions, but the same basic type of contaminant cleanup and recovery equipment, as is employed on the vessels included in FIG. 49-A and FIG. 49-B. As well as same included in the drawings and descriptions of the contaminant cleanup and recovery equipment included in FIGS. 49-C through FIG. 49-M, However this equipment in most applications would possesses no propulsion system its own, but instead are towed, by the two towing vessels, towing same with the same basic type of contaminant containment booms, that are also included in this application. during the operational employment of same. during the contaminant cleanup and removal operation.

This drawing includes a large version of an embodiment of this towable contaminant cleanup and recovery equipment, with same being of a size that would be close to the limit of the size of which same, could both maintain a high level of operational efficiency, as well as of a size in which same would remain easily trailer-able and thus quickly and easily transportable in the same basic manner as the towing vessels employed in conjunction with same. The containment booms for same could also be simply delivered along with all of the rest of the equipment by truck, to any navigable body of water, with road access to same. Thus whether same was deployed to cleanup man made spills, such as that of diesel fuel, oil spill, or other. Or in the case of same being deployed to cleanup natural occurring contaminants, more biological in nature such as that of cyanobacteria or whats commonly refereed to, as toxic blue green algae, when same is in bloom. from a lake, inland waterway, or other, same could be deployed, and put into full operation, in very little time.

This drawing shows a large embodiment of this equipment, That includes, both its own combination generator and evacuation pump compartment #261 as well as a storage bin, #263 storing an evacuation hose #262 for same. and although many embodiment's thereof may not be large enough to be equipped with their own generator, all would be equipped in a manner for the contaminants captured to be easily removed from or by same.

This equipment was added in this example of an embodiment thereof, simply to show how same could be easily equipped to provide same, with the ability, to pump the captured contaminants, either to a larger transport vessel, or how same could be anchored close to shore and simply by means of running the hose to shore, with one of the contaminant boom towing vessels the contaminants could be pumped to an awaiting tanker truck, on shore, or after towing same by means of the contaminant boom towing vessels towing same to a refinery where the captured contaminants could be pumped from dockside into receiving tanks, or in the case of the contaminants being removed being toxic blue green algae, the captured contaminants could be pumped directly to receiving tanks at the plant that detoxifies and converts same into biodiesel, which actually burns over 80% cleaner than regular diesel fuel.

FIG. 51-B. Includes a drawing of an overhead view of the same embodiment of the contaminant cleanup and removal equipment as is included in FIG. 50-A. This drawing thereof, is showing the operational employment of same, with the two towing vessels #108 equipped with the same basic type of towing equipment, and towing same with the same basic type of contaminant containment booms, #107 that are also included in this application for same. #109 are floating contaminants. As if same had had been deployed to cleanup natural occurring contaminants, more biological in nature such as that of cyanobacteria or whats commonly refereed to, as toxic blue green algae, when same is in bloom. from a lake, inland waterway, or other, same could be deployed, and put into full operation, in very little time, In this embodiment thereof.

FIG. 52-A. Includes a drawings of overhead view of an embodiment of an ocean going floating contaminant clean-up and recovery vessel along with the conveyor type of floating contaminant clean-up and recovery equipment of the applicant, being employed to clean-up a concentration of floating cyanobacteria or whats commonly refereed to as toxic blue green algae or other floating contaminants by means of the system created for the employment of all floating contaminant clean-up and recovery equipment of the applicant which employ currents created by means of the combined forward motion of the floating contaminant clean-up and recovery vessel along with two containment boom towing vessels #108 towing contaminant containment booms #107 extended between same and the floating contaminant clean-up and recovery vessel and the equipment employed on same, to gather, channel, and concentrate the floating contaminants #302 contaminants partially floating at a depth just under the surface of the water between the two contaminant containment booms as well as transport same back and onto to the floating contaminant clean-up and recovery equipment by means of the currents created by means of the forward motion of the three vessels. in the same manner and by means of the same basic system developed by the applicant for the employment of all floating contaminant clean-up and recovery vessels and equipment of the applicants. In this example of an embodiment thereof.

FIGS. 52-B. and FIG. 52-C. Include drawings of overhead views of slight variations of two embodiments of a catamaran type of contaminant clean-up and removal vessel, equipped with an embodiment of a type of contaminant clean-up and recovery equipment, that includes a conveyor, housed between the two inner freeboard portions of the hulls of the vessel. These vessels, as well as the contaminant clean-up and recovery equipment employed on same are actually just additional embodiments of the applicant's contaminant clean-up and recovery vessels and equipment that employ a conveyor to remove contaminants floating on and under the surface of the water, with the largest portion of the differences being in the mode in which the contaminants are actually stored and removed from the vessel itself, that enables same with the additional ability to collect, store, transport, and unload recovered contaminants in a little more simplistic manner, however the greatest portions of the rest of this embodiment of a cleanup and recovery vessel share most things common with other embodiments thereof, included in this application and would be capable of employing numerous different types conveyor covers that provide them with the ability to be employed to clean-up and recover a broad range of other types of contaminants, such as hydrocarbon contaminants of all kinds and others, as well as contaminants more biological in nature such as that of cyanobacteria or possibly even red tide.

#107 in both FIGS. 52-A. and FIG. 52-B. Are contaminant containment booms and of which are stored in storage bins for same #154 in positions of non-use or when the vessel is in transport to a contaminant clean-up and recovery operation as represented in the drawing of FIG. 52-B. FIG. 52-C. Including drawings include contaminant containment booms as well as the floating contaminant clean-up and recovery vessel employing same, on site and cleaning up floating contaminants either or lakes and inland waterways out at sea, in the same basic manner as other embodiments thereof included in this application These drawings also include added embodiments of the equipment operable from platform #158 employed for the deployment and retrieval and re-storage of the contaminant containment booms, that have also suffered embodiment modifications, to better effect the deployment and re-storage of same. Most of these examples of modifications employable by embodiments thereof are included in FIGS. 41-A through FIG. 41-G.

Embodiments of the contaminant clean-up and recovery vessels included in this application also, like other applications of the applicant, include accommodations and equipment for the optional storage, deployment and re-storage of the contaminant containment boom towing vessels #108 stored on the decks of embodiments of these vessels, with hydraulic lift #88 employed for the launching and re-cradling of same, among other tasks on the vessel.

These contaminant containment boom towing vessels #108, like all other embodiments thereof of the applicant are primarily employed to tow the contaminant containment booms #107, simultaneously from in front of and off each side of the contaminant clean-up and recovery equipment. However, one of these contaminant containment boom towing vessels #108, like in the employment of same in all other contaminant clean-up and recovery equipment and vessel embodiments of the applicants, could be employed towing only one length of the contaminant containment booms #107 between same and off to a much shorter distance to only one side of the contaminant clean-up and recovery vessel where same could still maintain steerage while employing same, in the case of a breakdown of the other contaminant containment boom towing vessel, or in the case of same being employed for a very small clean-up and recovery operation. In this embodiment thereof.

FIG. 52-B. Includes a drawing of an overhead view of an embodiment of the catamaran type contaminant clean-up and removal vessel, This vessel is also shown as being equipped with the greatest portion of the same basic type of equipment as is employed on other contaminant cleanup and recovery equipment included in this application. the only difference between this embodiment and the embodiment thereof included in FIG. 52-C. Being in the manner in which the forward portion of the conveyor portion of the equipment is supported as well as the manner in which depth relative to the waterline of the vessel, as well as angular adjustments to same are performed. Angular adjustments are made to the conveyor portion of the equipment, to best effect the level of efficiency achievable relative to sea conditions, and the type of contaminants being removed by same. This, as well as, for maintaining the conveyor portion of the equipment at the same depth relative to the surface of the water as the draft of the vessel changes due to the weight of the contaminants recovered fill up the vessel included in this example of an embodiment thereof. This as well as the ability to pull same up and into a much higher position when the vessel is in transport or dockside. This task is accomplished simply by means a chain running between a bracket attached to forward outer side portions of the conveyor and an open forward portion of the main deck of the vessel where this chain comes through same either over a chain roller and into, or directly through, a fair lead into the gypsy portion of a common reversible anchor windlass #242 with a chain stop, in this embodiment thereof.

This embodiment of a contaminant clean-up and recovery vessel, also includes two vertical trolley tracts #37, provided for the employment and the attachment to pivotable roller trolley portions, of the end panels of each contaminant containment boom as well as to an extension of same with an additional pivotable roller trolley on an end portion thereof for the attachment of same to the end of the lower chain portion of the contaminant containment boom, enabling all to freely ride, vertically up and down on and thus enabling same to always remain floating at the correct level relative to the surface of the water as well as same being enabled to freely ride up and down over waves on same.

Both of these trolley tracks in this embodiment thereof would be welded to the inner stem portions of each hull just where same start to curve outward so same always maintain an enclosed seal at, and below the water level at all times. The inner edge portions of each vertical roller track or rod would be positioned in close proximity, but where the end attachment portions of the contaminant boom panels clear the outer edge portions of the conveyor at all times, in this example of an embodiment thereof.

This drawing also includes a good view of an embodiment of a telescopic boom crane #298 that would possess a fitting on the very end of the telescopic tubular boom portion of same for the optional attachment of a hose. This telescopic boom crane #298 was simply provided as very versatile and easily employable mode for the unloading of the contaminants captured, in this embodiment thereof.

This drawing also includes a clear view of raised hollow cove shaped intake tube #303, of which are actually intake ports for the captured contaminant pumps. In this embodiment thereof and of which are secured to and linearly extending the length of the lowest portions of the hull portions of the captured contaminant storage compartment #278, of which could also include a lower channel portion to with a oil sensor and switch to remove inadvertently captured water when equipped for and employing the vessel to clean op oil and other floating hydrocarbon spills and simply covered with a fine screen or membrane, fine enough to allow water to freely pass through same, but restrict the smallest colonies of cyanobacteria or toxic blue green algae from passing through same when equipped and employing embodiments of these vessels to clean-up and remove toxic blue green algae, from bodies ow water. in this example of an embodiment thereof.

FIG. 52-C. Includes a drawing of an overhead view of another embodiment of the catamaran type contaminant clean-up and removal vessel, employing the greatest portion of the same equipment and employing same in the same basic manner as the embodiment thereof included in FIG. 52-B. With the only significant difference being this drawing of an embodiment is shown as if same was under full employment gathering, concentrating, removing, transporting and filling the contaminant storage compartment #278 portions of this embodiment of the contaminant clean-up and recovery vessel, by means of the equipment employed on same.

The main differences between this embodiment thereof and the embodiment included in FIG. 52-B. Being in the addition of two large floats #1-C. These floats are included in this embodiment thereof to additionally provide flotation for, as well as the maintaining of the forward intake portion of the conveyor portion of the equipment at a desired depth under the water regardless of sea conditions during the employment of same.

These two large floats #1-C would be stationed with one, on each side of a forward portion of the conveyor portion of the equipment #177 in this embodiment thereof, and pivotably attached to same by means of short rod and bearing portions of same extending out from each side of a forward portion of the conveyor portion of the equipment and into vertical inset inboard side portions of each of two large floats #1-C with a simple threaded mechanism provided for the vertical height adjustment of same while maintaining a pivotal attachment of same to the forward intake portion of the conveyor portion of the equipment, in this embodiment thereof.

These two large floats #1-C in this embodiment thereof are shown as being structurally unitized and combined together as one by means of an upper platform and lower cross-member portions of same. Aft portions of each of these two large floats #1-C, in this embodiment thereof, include inset trolley portions of same #292 as seen in FIG. 52-J. That include sets of bearings vertically stationed along the aft inner couture of each float portion of same, with each stationed in perfect parallel alignment with each. This of course also holding true for the trolley tracks #280 provided for same to ride in and on, stationed on the forward leading edge of each hull of this catamaran type of floating contaminant clean-up and recovery vessel. These things will be more easily understood, both by means of the larger drawing of this embodiment thereof, included in FIG. 52-J. As well as the profile drawing of same included in FIG. 52-L.

FIGS. 52-D through FIG. 52-F. include drawings of embodiments of the upper end portions of the conveyor portion of the floating contaminant clean-up and recovery equipment #177 employed on embodiments of the contaminant clean-up and recovery vessels included in this application. The actual drive motor employed in these embodiments thereof are shown as being internally housed in an aft portion of the framework of the conveyor portion of the equipment itself, with same simply including a hydraulic drive motor, or power take off #281 equipped with a small pinion sprocket and chain, in mechanical communication with, and providing controllable rotation to the larger sprocket portion of the main drive roller #253 portion of the conveyor. Of which, along with many other components comprising the actual contaminant clean-up and recovery equipment employed on same, should prove to be very dependable and maintenance free, if constructed of stainless steel and/or other nonferrous materials capable of holding up to the corrosive environment of their employment. and with all internals sealed from the elements. #282 are simply the hydraulic lines that would run to and be in fluid communication with the hydraulic pump employed by same. In these embodiments thereof.

The speed in which the moving portion of this conveyor removes and transports the contaminants to their point of removal from same would also be adjustable by means of a rheostat or other provided to regulating the voltage, to the motor for the hydraulic pump and thus the speed of the power tack off, or hydraulic drive motor, to best effect the level of efficiency attainable relative to conditions and rate contaminants are being gathered and supplied to the intake portion of the conveyor, as well, in these examples of embodiments thereof.

#283 is the conveyor mount. The lower portion of this mount is viewable in the drawing of FIG. 52-1. And shown as welded to and thus as an integral portion of the upper wing section portion of the vessel inside an upper portion of the captured contaminant storage compartment portion of this embodiment of the contaminant clean-up and recovery vessel. This embodiment of the conveyor portion of the floating contaminant clean-up and recovery equipment, both pivots on this mount with same also supporting a large portion of the weight of same in these examples of embodiments thereof.

FIG. 52-D. Includes a drawing of the upper portion of an embodiment of the conveyor portion of the floating contaminant clean-up and recovery equipment #177 employed on embodiments of a contaminant clean-up and recovery vessels included in this application, that simply include a mounting bracket #284 mechanically fastened to a lower end portion of each side the framework of the conveyor portion of the contaminant clean-up and recovery equipment, with a brush #285 mounted to same, that would extend across and push up against the lateral span of the conveyor cover or screen portion of same just under the drive roller portion of the conveyor and simply employed to insure the extraction of all captured contaminants are removed from the conveyor during the employment of same, in this embodiment thereof.

FIG. 52-E. Includes a drawing of the upper portion of an embodiment of the conveyor portion of the floating contaminant clean-up and recovery equipment #177, employed on embodiments of the contaminant clean-up and recovery vessels included in this application, that like the embodiment thereof included in FIG. 52-D, This embodiment thereof also includes a mounting bracket mechanically fastened to a lower end portion of each side of the framework of the conveyor portion of the contaminant clean-up and recovery equipment, and extending across a lower end portion of same, with this embodiment thereof including a blade or plate #286 mounted to same, and equipped with a spring providing compressive pressure that would extend across and push up against the lateral span of the conveyor cover or screen portion of same just under the drive roller portion of the conveyor, with same also provided as a mode employable to insure the extraction of all contaminants from the conveyor during the employment of same in this embodiment thereof.

FIG. 52-F. Also includes a drawing of the upper portion of an embodiment of the conveyor portion of the floating contaminant clean-up and recovery equipment, #177, employed on embodiments of the contaminant clean-up and recovery vessels included in this application. This embodiment thereof is shown as employing high volumes of air pressure provided by means of a blower with the ducting for same simply comprising a large hose or tube #279 entering through an open portion or portions of a side or each side of the framework of the conveyor portion of the contaminant clean-up and recovery equipment, and with same extending up through an inner portion of the framework of the conveyor close to the upper end portion of same. This drawing of this embodiment thereof includes the end portion of the ducting for same simply including an opening extending across the lower inside lateral span of the conveyor and configured in a manner to force high volumes of air down through all open portions of the conveyor and cover or screen employed on same to insure all captured contaminants, are dislodged from the conveyor and/or cover for same and thus disposed within the contaminant storage compartment portions of this embodiment of the contaminant clean-up and recovery vessel. The actual blower for same #287, included in this drawing, is mounted to brackets for same #290 extending upward mechanically fastened to a lower portion of each side the framework of the conveyor portion of the contaminant clean-up and recovery equipment, in this embodiment thereof with a pipe or hose #279 employed for the ducting for same extending through an open side portion of the frame work portion of the conveyor and up through a center portion thereof to a lateral open portion of same, where the lateral blower portion of same is mounted. in this embodiment thereof. This mounting position would simply be one of a number of placement and mounting options including an embodiment of same remotely mounted below decks, with ducting running to same. in this embodiment thereof.

FIG. 52-G. includes a view of the bottom of the end portion of an embodiment of the ducting for the blower #287 included in FIG. 52-F. That includes an opening #289 extending across the lower lateral span of same that would be mounted in a manner inside the conveyor to force high volumes of air down through all open portions of the conveyor, cover, or screen do dislodge contaminants from same in this embodiment thereof.

FIG. 52-H. Includes a frontal profile view of the end portion of the embodiment of the ducting included in FIG. 52-F. For the blower, that includes an opening extending across the lower lateral span portion of same, that would mount in a manner inside the conveyor to force high volumes of air down through all open portions of the conveyor, cover, or screen employed on same to insure the removal of any and all types of contaminants thereon same, in this embodiment thereof.

FIG. 52-I. includes a profile view of a side of the end portion of the embodiment of the ducting for the blower included in FIG. 52-I. That includes an opening extending across the lower lateral span of same that would mount in a manner inside the conveyor to force high volumes of air down through all open portions of the conveyor, cover, or screen employed on same to ensure the removal of any and all contaminants thereon same, in this embodiment thereof.

FIG. 52-J. Includes a drawing of a much larger and more detailed overhead view of the embodiment of the two floats 1-C included in the embodiment of the floating contaminant clean-up and recovery vessel included in FIG. 52-C. This drawing thereof is drawn as if the upper platform portion of the two floats of 1-C, has been removed, to better view the composition of components under same and replaced with the two lateral dotted lines provided simply to indicate the location of same, in this embodiment thereof. #177 is the upper surface of the lower end portion of the conveyor portion of the contaminant clean-up and recovery equipment, of which, in this embodiment thereof, is pivotably attached to the lower inboard side portions of these two large floats #1-C in this embodiment thereof, to same by means of short rods welded to portions of the outer lower framework portions of each side of the conveyor and extending outward on each side of a lower portion of the conveyor portion of the equipment of which are inserted into vertical inset inboard side portions of each of the two large floats #1-C, of which include internal adjustment threaded members enabling vertical adjustability to the forward intake portion of the conveyor as well as a pivotable attachment of same to the two float portions of 1-C, in this embodiment thereof. #280 are the tracks provided for the inset trolley #292 portions of floats 1-C to ride in and on stationed on the forward leading edge of each hull of this catamaran type of floating contaminant clean-up and recovery vessel. #304 were added to this drawing simply to include a simple way to lock the two floats #1-C and the conveyor portion of the equipment to its highest point and lock same to the main deck of the vessel by means of the locking pins #304. The smaller trolley cars #293 and the vertical plate and trolley track for same #294 were added simply as an employable option with the only possible service providable by same being the assurance of same never being overtaken during the employment of same in extremely rough and adverse sea conditions. However, the only real service providable by same in this embodiment thereof is already provided by the float portions of 1-C. However, a form of same would be employed by the embodiment of the floating contaminant clean-up and recovery vessel included in FIG. 52-B. That would include a vertically mounted trolley track #37 extending from the main deck of the vessel down vertically the entire length of both inner leading edges of the bow stem portion of both hulls of the vessel for the trolley car #170, which are shown as portions of, or attachable to the end contaminant containment boom panel that includes a lower chain attachment eye portion of same. Of which would attach to, and vertically ride up and down over waves on, in an embodiment thereof.

FIG. 52-K. Includes drawing of an overhead view of an embodiment of a much larger contaminant transporting vessel #291 rafted up to a side of the embodiment of the floating contaminant clean-up and recovery vessel included in FIG. 52-C. with the telescopic boom crane #298 mounted on an aft platform portion of this embodiment of same, to positionally pump and unload the captured contaminants #302 from the captured contaminant storage compartments #278 portion of the embodiment of the floating contaminant clean-up and recovery vessel of FIG. 52-C. And load same into the larger contaminant storage compartment #295 of the larger contaminant transporting vessel #291. This drawing was simply added to show a mode in which a number of floating contaminant clean-up and recovery vessels could remain employed and continuously cleaning up the contaminants in the area of their employment, without having to spend a large percentage of the time of their employment simply transporting the contaminants captured back and forth to shore simply to unload same once filled to capacity, in this embodiment thereof.

FIG. 52-L. Includes drawing of profile view of the embodiment of the floating contaminant clean-up and recovery vessel included in FIG. 52-C. As if the starboard hull of the vessel was transparent so that the conveyor portion of the floating contaminant clean-up and recovery equipment and the basic positioning of same could be easily viewed and the operational dynamics of this embodiment of same could be easily understood. Notice the gradual radius of the bow stem and the trolley track #294 thereon in this embodiment of the vessel corresponds with the same radius created at the connection point of the inset trolley roller portion of the two large floats #1-C providing buoyancy for the conveyor portion of the contaminant clean-up and recovery equipment and the pivot point at the mounting bracket for the conveyor #283 when raised and lowered between sames highest and lowest points. Of course, this could also very easily be accomplished by means of welding a mounting plate or other mounting bracketry for a trolley track of the same radius to the bow stem of a vessel with a bow stem of any configuration. This embodiment of the floats #1-C that share a mechanical connection to and provide buoyancy for the conveyor portion of the contaminant clean-up and recovery equipment in this embodiment thereof is shown as including a pad eye #299 with the lower portion of same welded to the aft portion of the upper platform portion of 1-C.

This drawing thereof shows a cable #300 loosely attached to pad eye #299. This cable in this embodiment thereof would simply be employed to maintain an easy connection with same and the hydraulic lift, or by means of a separate winch for same, employed to raise same up to its highest point and lock same to the main deck of the vessel by means of the locking pins #304 for same as seen in FIG. 52-J. This drawing also provides a view of the conveyor mount #283 welded to and thus as an integral portion of the upper wing section portion of the vessel inside an upper portion of the captured contaminant storage compartment #278 portion of this embodiment of the contaminant clean-up and recovery vessel.

This embodiment of the conveyor portion of the floating contaminant clean-up and recovery equipment both pivots on this mount with same also supporting a large portion of the weight of same in these embodiments thereof. This drawing also provides a view of the additional, optional employable vertical mounting plate and trolley track for same, #294; this trolley track and mounting plate was added, simply as an employable option, with the only possible service providable by same being the assurance of the first combination contaminant containment boom float and mounting panel that would ride up and down on waves, could never be overtaken during the employment of same in extremely rough and adverse sea conditions. However, the only real service providable by same in this embodiment thereof is already provided by the float portions of 1-C and as a result thereof these float portions of #1-C would simply be employed as the first rigid float portions of the contaminant booms attached to same, as well as the lower pad eye portion of same. #301 would be the attachment point for the lower chain portion of same, as an option to this embodiment thereof.

This drawing shows the conveyor portion of the equipment as being very long, and with same extending a large portion of the full length of the vessel and of which in many applications of same may even be longer and employed at even more gradual angles relative to the surface of the water depending on the length of the vessel. The drawing of this embodiment thereof shows this conveyor portion of same extending from beyond the pivot point for same, located on an the upper, aft portion of the wing section inside the contaminant storage compartments of the vessel #278, and with same extending downward at a gradual angle, all of the way to where the opposite end portion thereof is at an adjusted position below the water and extending just past the forward leading edges of the inner hull portions of the contaminant clean-up and recovery vessel.

The actual mode in which embodiments of these conveyor types of floating contaminant cleanup and recovery vessels and equipment included in this application, like all others of the applicants, employ the same basic system, to initially gather and supply the contaminant cleanup and recovery equipment portion of, or employed on the contaminant clean-up and recovery vessels.

Of which has always been accomplished by means of currents created by means of the forward motion of the contaminant clean-up and recovery vessel as well as primarily that of two towing vessels, towing contaminant containment booms from various positions in front of and of to each side of the main contaminant cleanup and recovery vessel. wherein same not only gathers, corrals, channels, and concentrates the contaminants directly back to the lower intake portion of the conveyor portion of the contaminant clean-up and recovery equipment, stationed between the two hull portions, of this embodiment of a catamaran type of floating contaminant cleanup an recovery vessel, but the currents created during the process as well as the mode in which the conveyor cover portions of the contaminant cleanup and recovery equipment, allows water to freely pass through same, while restricting the contaminants being cleaned up and recovered from passing through same, creates pressures that literally not only forces the contaminants up and onto the conveyor, but also secures same thereto, during the clean-up and recovery operation, and continues to maintaining same positionally secured thereon, as a result of residual water inadvertently captured, along with the contaminants, drains through and out of the lower portions of the conveyor portion of the contaminant clean-up and recovery equipment. included in this application. Scaled tests have also proven them to possess extreme levels of operational efficiency, not only when employed at very substantial forward speeds, and while removing heavy concentrations and mass qualities of floating contaminants while doing so, but they have also proven capable of maintaining their ability to do so in very unfavorable simulated sea conditions as well. in this as well as all embodiments thereof.

It will be apparent to one with skill in in the art of floating contaminant cleanup and recovery equipment, vessels and systems of the inventions may be provided using some or all of the mentioned features components and systems, without departing from the spirit and scope of the present inventions. It will also be apparent to one with skill in in the art of floating contaminant cleanup and recovery equipment, vessels and systems of the inventions that embodiment's described above are specific examples of single broader inventions, which may possess broader than any of the singular descriptions taught. There may be many alterations made in the descriptions, without departing from the spirit and scope of the inventions included in this application.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims.

I claim:

1. A system for removing contaminants floating on or near the surface of a body of water, the system comprising:

a floating contaminant cleanup and recovery vessel, the vessel comprising contaminant cleanup and recovery equipment comprising at least one intake port capable of removing floating contaminants from the body of water to be transported to the recovery vessel;

a first towboat and a second towboat;

a first containment boom capable of being connected to the first tow boat and to a starboard side of a vessel; and a second containment boom capable of being connected to the second tow boat and a port side of the vessel, such that during operation the first and second towboats extend out from the vessel such that the first and second containment booms gather the floating contaminants from the body of water and channel them to the at least one intake port;

wherein the contaminant cleanup and recovery equipment further comprises:

a framework comprising a first framework section disposed on a hull of the vessel;

a second framework section;

at least one upper armature connecting the first framework section to the second framework section wherein each armature of the at least one upper armature has a first pivot joint connecting the armature to the first framework section in a pivoting connection, and a second pivot joint connecting the armature to the second framework section in a pivoting connection; and at least one lower armature connecting the first framework section to the second framework section wherein each armature of the at least one lower armature has a first pivot joint connecting the armature to the first framework section in a pivoting connection, and a second pivot joint connecting the armature to the second framework section in a pivoting connection;

a first float housing the intake port disposed within the second framework section.

2. The system of claim 1 wherein the contaminant cleanup and recovery equipment further comprises:

at least one tube, the at least one tube comprising a first tube connected to the intake port; and the at least one tube connected to piping that is capable of being in fluid connection to a storage tank.

3. A system for removing contaminants floating on or near the surface of a body of water, the system comprising:

a floating contaminant cleanup and recovery vessel, the vessel comprising contaminant cleanup and recovery equipment comprising at least one intake port capable of removing floating contaminants from the body of water to be transported to the recovery vessel;

a first towboat and a second towboat;

a first containment boom capable of being connected to the first tow boat and to a starboard side of a vessel; and a second containment boom capable of being connected to the second tow boat and a port side of the vessel, such that during operation the first and second towboats extend out from the vessel such that the first and second containment booms gather the floating contaminants from the body of water and channel them to the at least one intake port;

wherein the contaminant cleanup and recovery equipment further comprises:

a framework capable of being disposed on a hull of the vessel comprising:

a distal framework section;

at least one upper armature connected to a first pivot joint capable of being disposed on the hull of the vessel and to a second pivot joint disposed on the distal framework section;

at least one lower armature connected to a first pivot joint capable of being disposed on the vessel and to a second pivot joint disposed on the distal framework section, such that the at least one upper armature and the at least one lower armature allow the distal framework section to raise and lower relative to the hull of the vessel;

a first float housing the intake port disposed within the distal framework section.

4. The system of claim 3 wherein the contaminant cleanup and recovery equipment further comprises:

at least one tube, the at least one tube comprising a first tube connected to the intake port; and the at least one tube connected to piping that is capable of being in fluid connection to a storage tank.

5. The system of claim 4 further comprising at least one additional float providing buoyancy for the distal framework section, armatures, or piping.

6. A system for removing contaminants floating on or near the surface of a body of water, the system comprising:

a floating contaminant cleanup and recovery vessel, the vessel comprising contaminant cleanup and recovery equipment comprising at least one intake port capable of removing floating contaminants from the body of water to be transported to the recovery vessel;

a first towboat and a second towboat;

a first containment boom capable of being connected to the first tow boat and to a starboard side of a vessel; and a second containment boom capable of being connected to the second tow boat and a port side of the vessel, such that during operation the first and second towboats extend out from the vessel such that the first and second containment booms gather the floating contaminants from the body of water and channel them to the at least one intake port;

wherein the first towboat comprises:

a hull comprising a deck, a keel and an aft portion;

a pivoting axle comprising an upper portion and a lower portion, the pivoting axle extending through the hull such that the upper portion is disposed above the deck and the lower portion is disposed beneath the keel;

an upper pivotable armature having a first end disposed on the upper portion of the pivoting axle, and a second end;

a lower pivotable armature having a first end disposed on the lower portion of the pivoting axle, and a second end;

a connecting member connecting the upper pivotable armature and the lower pivotable armature behind the aft portion of the hull;

such that the upper an lower armatures can pivot around the aft portion of the hull.

7. A vessel for removing contaminants floating on or near the surface of a body of water, the vessel comprising:

a contaminant cleanup and recovery equipment comprising at least one intake port capable of removing floating contaminants from the body of water to be transported to the vessel;

a first towboat and a second towboat;

a first containment boom capable of being connected to the first tow boat and to a starboard side of the vessel; and a second containment boom capable of being connected to the second tow boat and a port side of the vessel, such that during operation the first and second towboats extend out from the vessel such that the first and second containment booms gather the floating contaminants from the body of water and channel them to the at least one intake port;

wherein the contaminant cleanup and recovery equipment further comprises:

a framework comprising a first framework section disposed on a hull of the vessel;

a second framework section;

at least one upper armature connecting the first framework section to the second framework section wherein each armature of the at least one upper armature has a first pivot joint connecting the armature to the first framework section in a pivoting connection, and a second pivot joint connecting the armature to the second framework section in a pivoting connection; and at least one lower armature connecting the first framework section to the second framework section wherein each armature of the at least one lower armature has a first pivot joint connecting the armature to the first framework section in a pivoting connection, and a second pivot joint connecting the armature to the second framework section in a pivoting connection;

a first float housing an intake port disposed within the second framework section.

8. The vessel of claim 7 wherein the contaminant cleanup and recovery equipment further comprises:

at least one tube, the at least one tube comprising a first tube connected to the intake port; and the at least one tube connected to piping that is capable of being in fluid connection to a storage tank.

9. A vessel for removing contaminants floating on or near the surface of a body of water, the vessel comprising:

a contaminant cleanup and recovery equipment comprising at least one intake port capable of removing floating contaminants from the body of water to be transported to the vessel;

a first towboat and a second towboat;

a first containment boom capable of being connected to the first tow boat and to a starboard side of the vessel; and a second containment boom capable of being connected to the second tow boat and a port side of the vessel, such that during operation the first and second towboats extend out from the vessel such that the first and second containment booms gather the floating contaminants from the body of water and channel them to the at least one intake port;

wherein the contaminant cleanup and recovery equipment further comprises:

a framework capable of being disposed on a hull of the vessel comprising:

a distal framework section;

at least one upper armature connected to a first pivot joint capable of being disposed on the hull of the vessel and to a second pivot joint disposed on the distal framework section;

at least one lower armature connected to a first pivot joint capable of being disposed on the hull of the vessel and to a second pivot joint disposed on the distal framework section, such that the at least one upper armature and the at least one lower armature allow the distal framework section to raise and lower relative to the vessel;

a first float housing the intake port disposed within the distal framework section.

10. The vessel of claim 9 wherein the contaminant cleanup and recovery equipment further comprises:

at least one tube, the at least one tube comprising a first tube connected to the intake port; and the at least one tube connected to piping that is capable of being in fluid connection to a storage tank.

11. The vessel of claim 10 further comprising at least one additional float providing buoyancy for the distal framework section, armatures, or piping.

12. A vessel for removing contaminants floating on or near the surface of a body of water, the vessel comprising:

a contaminant cleanup and recovery equipment comprising at least one intake port capable of removing floating contaminants from the body of water to be transported to the vessel;

a first towboat and a second towboat;

a first containment boom capable of being connected to the first tow boat and to a starboard side of the vessel; and a second containment boom capable of being connected to the second tow boat and a port side of the vessel, such that during operation the first and second towboats extend out from the vessel such that the first and second containment booms gather the floating contaminants from the body of water and channel them to the at least one intake port;

wherein the first towboat comprises:

a hull comprising a deck, a keel and an aft portion;

a pivoting axle comprising an upper portion and a lower portion, the pivoting axle extending through the hull such that the upper portion is disposed above the deck and the lower portion is disposed beneath the keel;

an upper pivotable armature having a first end disposed on the upper portion of the pivoting axle, and a second end;

a lower pivotable armature having a first end disposed on the lower portion of the pivoting axle, and a second end;

a connecting member connecting the upper pivotable armature and the lower pivotable armature behind the aft portion of the hull;

wherein the upper and lower armatures can pivot around the aft portion of the hull.

13. A system for removing contaminants floating on or near the surface of a body of water, the system comprising:

a floating contaminant cleanup and recovery vessel, the vessel comprising contaminant cleanup and recovery equipment comprising a framework capable of being disposed on a hull of the vessel comprising:

a distal framework section;

at least one upper armature connected to a first pivot joint capable of being disposed on the hull of the vessel and to a second pivot joint disposed on the distal framework section;

at least one lower armature connected to a first pivot joint capable of being disposed on the hull of the vessel and to a second pivot joint disposed on the distal framework section, such that the at least one upper armature and the at least one lower armature allow the distal framework section to raise and lower relative to the vessel; and a first float housing the intake port disposed within the distal framework section;

a first towboat and a second towboat;

a first containment boom capable of being connected to the first tow boat and to a starboard side of a vessel; and a second containment boom capable of being connected to the second tow boat and a port side of the vessel, such that during operation the first and second towboats extend out from the vessel such that the first and second containment booms gather the floating contaminants from the body of water and channel them to the at least one intake port.

* * * * *